US012400523B2

(12) United States Patent
Lutnick

(10) Patent No.: US 12,400,523 B2
(45) **Date of Patent: *Aug. 26, 2025**

(54) GAME OF CHANCE SYSTEMS AND METHODS

(71) Applicant: CFPH, LLC, New York, NY (US)

(72) Inventor: Howard W. Lutnick, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,438

(22) Filed: Jun. 12, 2023

(65) Prior Publication Data

US 2023/0316865 A1 Oct. 5, 2023

Related U.S. Application Data

(63) Continuation of application No. 17/485,635, filed on Sep. 27, 2021, now Pat. No. 11,816,961, which is a continuation of application No. 16/689,912, filed on Nov. 20, 2019, now Pat. No. 11,132,870, which is a continuation of application No. 14/311,871, filed on Jun. 23, 2014, now Pat. No. 10,535,230, which is a continuation of application No. 13/536,582, filed on Jun. 28, 2012, now Pat. No. 8,758,111, which is a continuation-in-part of application No. 12/759,757, filed on Apr. 14, 2010, now Pat. No. 8,758,109, which is a continuation-in-part of application No. 12/194,593, filed on Aug. 20, 2008, now Pat. No. 8,142,283.

(51) Int. Cl.

| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *G07F 17/34* | (2006.01) |

(52) U.S. Cl.

CPC .......... *G07F 17/3276* (2013.01); *G07F 17/32* (2013.01); *G07F 17/322* (2013.01); *G07F 17/3223* (2013.01); *G07F 17/3232* (2013.01); *G07F 17/3237* (2013.01); *G07F 17/3239* (2013.01); *G07F 17/3241* (2013.01); *G07F 17/3279* (2013.01); *G07F 17/3288* (2013.01); *G07F 17/3293* (2013.01); *G07F 17/34* (2013.01)

(58) Field of Classification Search

CPC ... G07F 17/32; G07F 17/3214; G07F 17/3222
USPC ...................... 463/17, 20, 22, 25, 29, 39, 42
See application file for complete search history.

(56) References Cited

U.S. PATENT DOCUMENTS

2003/0228902 A1 12/2003 Walker et al.

FOREIGN PATENT DOCUMENTS

| | | |
|---|---|---|
| JP | 3814544 | 8/2006 |
| KR | 20010107151 | 12/2001 |

*Primary Examiner* — Adetokunbo O Torimiro

(57) ABSTRACT

In various embodiments, players may compete in a gaming context.

20 Claims, 66 Drawing Sheets

FIG. 44
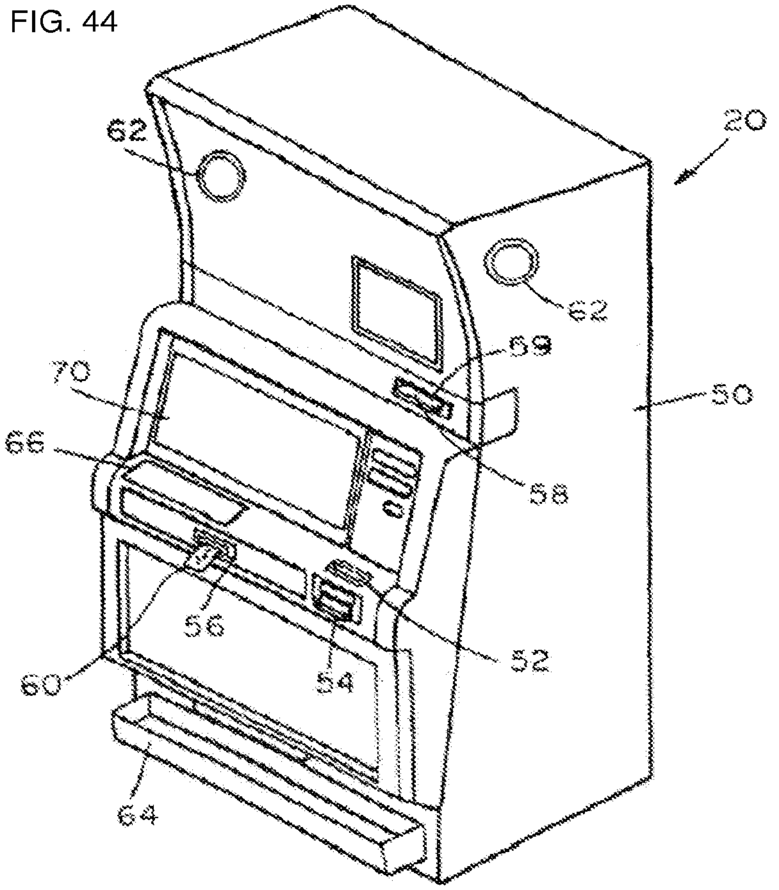
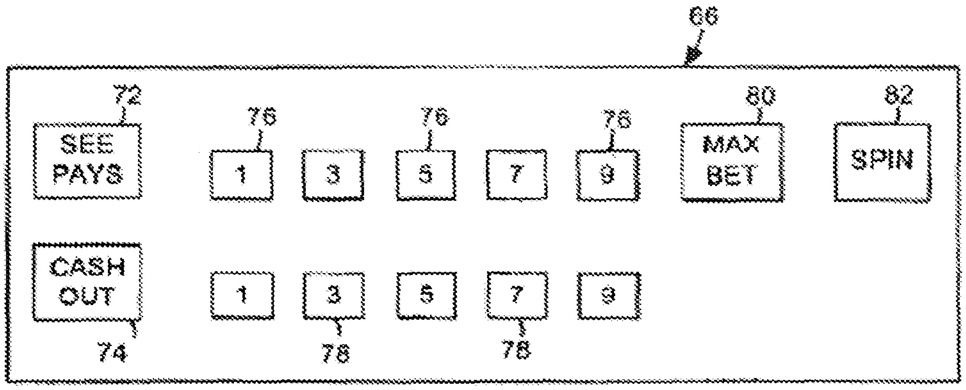
FIG. 44A

Database Entry for a Primary Player 700

705

Player Identifier: P234567

710

Player Name: Sam Hunter 715 720 725 730 735 740

| Game Identifier | Date | Time | Amount Bet | Amount Won | Profits, Trailing 100 Games |
|---|---|---|---|---|---|
| G11112222 | 8/7/2011 | 7:21:03 AM | $1 | $0 | $40 |
| G11112297 | 8/7/2011 | 7:21:09 AM | $1 | $0 | $39 |
| G11112350 | 8/7/2011 | 7:21:16 AM | $1 | $4 | $42 |
| G11112412 | 8/7/2011 | 7:21:21 AM | $2 | $0 | $40 |
| G11112490 | 8/7/2011 | 7:21:27 AM | $1 | $0 | $39 |
| G11112545 | 8/7/2011 | 7:21:37 AM | $1 | $0 | $38 |
| G11112610 | 8/7/2011 | 7:21:44 AM | $3 | $30 | $65 |
| G11112699 | 8/7/2011 | 7:21:52 AM | $1 | $0 | $64 |
| G11112770 | 8/7/2011 | 7:22:00 AM | $1 | $1 | $64 |

FIG. 54

1010

| TIME 1020 | GAMING MACHINE 1030 | AMOUNT BET 1040 | OUTCOME 1050 | AMOUNT WON 1060 |
|---|---|---|---|---|
| 1:10:45PM | PIRATE GOLD | $1 | Gld-Gld-Skull | $5 |
| 1:10:47PM | RED JOKERS | $0.25 | AsJdKsQsAh | $0 |
| 1:10:56PM | DIAMONDVILLE | $0.75 | Coal-Ruby-Diamnd | $0 |
| 1:11:00PM | PEARL BAY | $0.15 | Clam-Pearl-Oyster | $0.05 |
| 1:11:00PM | PIRATE GOLD | $1 | Hook-Gld-Patch | $1 |
| 1:11:04PM | DIAMONDVILLE | $0.75 | Ruby-Ruby-Ruby | $50 |

FIG. 57

FIG. 63
Balance: $7894.00
Current Bet: $100
FIXED ODDS
PROP. BETS
PARLAY BETS
QUICK SPIN
11
13
16
23
11
TIME TO BET
0:16
GAME NUMBER
9510
GAMES
1
5
7
8
10
15
20
PREVIOUS GAMES
WINNER
GAME 9509-9509
BLACK
GAME 9508-9508
RED
GAME 9507-9507
EVEN
RED
BLACK
1/1
1/1
5
25
100
MORE GAMES
HELP
MY BETS
PLACE BET

FIG. 64
Balance: $7894.00
Current Bet: $100
FIXED ODDS
PROP. BETS
PARLAY BETS
QUICK SPIN
32
5
28
24
5
TIME TO BET
0:12
GAME NUMBER
9511
Bet on an outcome for the next game
ANY 0 or 00
Exact Outcomes
2
3
5
5/2
35/1
650/1
23000/1
2.1M/1
35/1
5 RED
5 BLACK
35/1
6/1
4 RED 1 BLACK
4 BLACK 1 RED
6/1
5/2
3 RED 2 BLACK
3 BLACK 2 RED
5/2
1
5
25
100
MORE GAMES
HELP
MY BETS

FIG. 65
Balance: $7894.00
Current Bet: $100
NEXT GAME IN 0:01
GAME NUMBER 9510
FIXED ODDS
PROP. BETS
PARLAY BETS
QUICK SPIN
GAMES
1
10
20
PARLAYS
3
4
CHOOSE PARLAY WINNERS
RED
RED
RED
BLACK
BLACK
BLACK
Odds for this parlay are: 7/1
1
25
100
MORE GAMES
HELP
MY BETS

FIG. 66
Balance: $7894.00
Current Bets: $100
FIXED ODDS
PROP BETS
PARLAY BETS
QUICK SPIN
32
5
28
24
5
TIME TO BET 0:27
GAME NUMBER 9511
GAMES
5
10
15
20
30
60
RED 0
BLACK 0
0 or 00 0
ADVANTAGE
EVEN
AFTER 0 GAMES
5 GAMES REMAINING
BETS
13/5
Black 4 or More
11/4
B 1-2-3
10/1
Even
11/4
R 1-2-3
13/5
Red 4 or More
5
25
100
MORE GAMES
HELP
MY BETS

GAME OF CHANCE SYSTEMS AND METHODS

CROSS REFERENCE TO RELATED APPLICATIONS

This application is a continuation of U.S. patent application Ser. No. 17/485,635 filed Sep. 27, 2021, which is a continuation of U.S. patent application Ser. No. 16/689,912 filed Nov. 20, 2019 (now U.S. Pat. No. 11,132,870 issued Sep. 28, 2021), which is a continuation of U.S. patent application Ser. No. 14/311,871 filed Jun. 23, 2014 (now U.S. Pat. No. 10,535,230 issued Jan. 14, 2020), which is a continuation of U.S. patent application Ser. No. 13/536,582 filed Jun. 28, 2012 (now U.S. Pat. No. 8,758,111 issued Jun. 24, 2014), which is a continuation-in-part of U.S. patent application Ser. No. 12/759,757 filed Apr. 14, 2010 (now U.S. Pat. No. 8,758,109 issued Jun. 24, 2014), which is a continuation-in-part of U.S. patent application Ser. No. 12/194,593 filed Aug. 20, 2008 (now U.S. Pat. No. 8,142,283 issued Mar. 27, 2012), each of which is incorporated by reference herein in its entirety.

BACKGROUND

Games of chance have enjoyed widespread popularity. Traditional systems for playing these games suffer some drawbacks. Computer implemented systems may alleviate some of these drawbacks.

SUMMARY

In various embodiments, computer systems may allow competition or other interaction between players.

BRIEF DESCRIPTION OF THE FIGURES

FIG. 44 is a perspective view of various possible embodiments a gaming unit.

FIG. 44A illustrates an embodiment of a control panel for a gaming unit.

FIG. 54 shows a database entry including various games played by a player.

FIG. 57 shows a tabular display with information about various games, according to some embodiments.

DETAILED DESCRIPTION

VR Gaming—Generally

Figure 1:
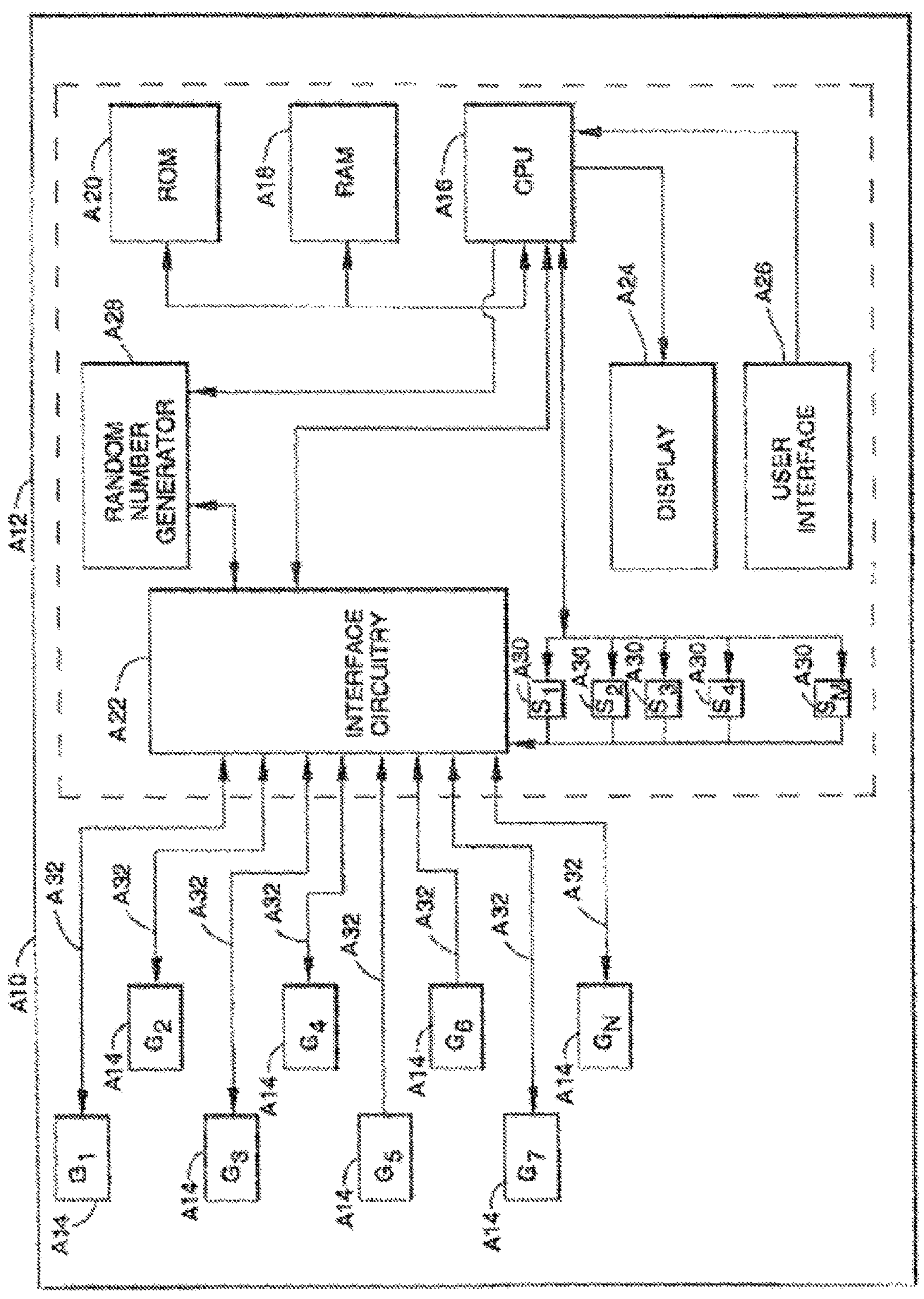
FIG. 1 shows a block diagram of interactive gaming system A10 according to various embodiments.

In various embodiments, a player may play a second game while he's waiting during a first game. For example, a player who is playing a game of poker with other live players may have to wait while the other players are deciding their move. During this wait time, the player could play another game. The other game could even be based on aspects of the first game. For example, a second game that a player plays while he waits for a first game to continue could be based on cards that have been dealt during the first game. For example, the two cards dealt to a player in a game of Texas Hold'em poker could serve as the starting hand for a game of blackjack that the player plays while he waits for the action to continue in a game.

In various embodiments, a player may play in a first game via a network connection. The player may be playing in a game over the Internet, while sitting at a game terminal, while sitting at a gaming device, or while using a mobile gaming device. Software within the player's personal computer, betting terminal, or other device may track cards or other outcomes that have occurred in a first game. The computer, betting terminal, etc., may allow the player to use those outcomes to serve as the basis for a second game. The betting terminal, for example, may allow the player to make an additional bet and/or to initiate an additional game which is based off the initial game in which the player has been participating. The player may make decisions in the additional game, such as decisions of whether to hit or stand in a game of blackjack, or such as decisions of how many cards to draw in a game of video poker. The device of the player (e.g., the betting terminal; e.g., the mobile gaming device) may then determine a final outcome of the game, such as by dealing additional cards to the player. The device of the player may then determine a payout for the player. The player may then be paid, e.g., through the crediting of a player account.

In various embodiments, a player may be sitting at the same table as other players in a live game, e.g., in a game of blackjack. While the player waits for another player's decision, the player may begin playing a second game, e.g., using a mobile gaming device. The second game may be based off cards or other outcomes or indicia that the player, dealer, or other players have received in the game. For example, the player may have his player tracking card inserted into a slot corresponding to the player's position at the table. The casino may track cards that have been dealt to the player, e.g., via a card reader built into an automatic shuffler or dealer used at the table. The casino may thereby determine what cards have been dealt to the player. Such cards may then serve as a basis for an additional game the player may play, e.g., on his mobile gaming device.

VR Gaming Characters

In various embodiments, one or more players may participate in a game over a network. In various embodiments, two or more players may participate in a game over a network. The game may be a live game. One or more of such players may play from or using a player device, such as a kiosk, betting terminal, mobile gaming device, slot machine, video poker machine, or other device. In various embodiments, players may not be physically proximate to one another. Rather, players may be physically spread out, such as throughout a casino, throughout a city, or even throughout the world. Nevertheless, players may view images or representations of one another. By viewing representations of other players, a player may feel a greater sense of camaraderie with the other players in the game.

In various embodiments, a representation of a player may include a simulated character, an avatar and/or computer generated imagery (CGI). A player may customize the character representing him. The player may customize the character to have a particular look (e.g., hair color; e.g., height; e.g., girth), to have particular expressions (e.g., smiling; e.g., frowning; e.g., looking angry); to have a particular voice (e.g., a raspy voice; e.g., a smooth voice); and/or to have any other characteristics.

In various embodiments, a player may customize or select the actions that his character representation performs. A player may customize the manner in which his character rolls dice, the manner in which his character deals cards, the manner in which his player moves chips into the pot, the manner in which his character collects money from the pot, the manner in which the character thinks or contemplates (e.g., the player holds his head between his hands), the manner in which a character indicates a decision (e.g., in a game of blackjack, a character might indicate a "hit" decision by either thumping the table hard twice or by lightly tapping the table twice), the manner in which a character walks (e.g., the manner in which a player gets up and walks away from a table), or any other mannerisms or actions of a character.

In various embodiments, a player may select characteristics, actions, or other mannerisms of a character through navigating a set of one or more menus. For example, a player may select a default expression for his character from among the following list: happy; sad; angry; grumpy; bored; excited; crazy. Similarly, the player may select a particular manner in which his character will take some action. For example, a player may select from among the following list for how his character might roll the dice: (a) throw the dice as hard as he can; (b) shake the dice then roll them; (c) roll them gently along the surface of the table; (d) turn around and throw the dice over the back of his head; (e) throw the dice from the side of his hand; (f) throw the dice over his fingers; (g) throw the dice one at a time.

In various embodiments, a first player in a game may view the character representations of other players in his game. The player may view the other players via a monitor or display screen for example. If a player is at a terminal with multiple monitors, the player may view a character representation of each other player in the game, one other player per monitor, for example.

In various embodiments, games with multiple players may include craps, poker, blackjack, roulette, and other games.

"Trading Desk" Gaming Kiosk

In various embodiments, an automatic card dealer may deal cards to a player. The dealt cards may be read (utilizing various technologies) by the dealing device. A terminal or kiosk may receive information about the cards from the dealing device so that the terminal may display information about the cards on a screen. The dealing device and/or the terminal may also pipe information about the cards to other terminals or to other devices. This may allow other players besides the player at the immediate terminal to use information about the cards to participate in the game. In some embodiments, other players may participate (e.g., play; e.g., bet on) in the same game as the player immediately at the terminal plays in. In some embodiments, cards dealt by the dealing device may be used by a player at a first terminal for a first game, and by a player at a second terminal for a second game.

In various embodiments, a terminal may show a display of a floor plan (or other physical space), such as a casino floor plan. The floor plan may show the locations of certain games, such as the locations of certain slot machines or such as the locations of certain table games. In some embodiments, a player at the terminal may select a game from the display (e.g., from the display of the floor plan). A card dealer from the selected game may read cards dealt at the game and may transmit information about such cards to the terminal. The player at the terminal may then participate in the live game and/or may participate in a separate game which is based on the live game.

In various embodiments, the terminal may have various input devices, such as input buttons. In various embodiments, input buttons may allow the player to make standard decisions in games. A terminal may have buttons (e.g., dedicated buttons) for making a decision to "hit" or for making a decision to "stand" in a game of blackjack. A terminal may have a button to "draw" a button to "hold" and/or a button to "discard," where such buttons may be utilized in a game of video poker.

In various embodiments, a first player at a first terminal may have the ability and/or the option to link with a second player at a second terminal. The first player and the second player may compete against one another, such as by playing different positions in the same game. For example, the first player and the second player may play a game of Texas Hold'em poker against one another. In some embodiments, the first player and the second player may link together to cooperate. For example, the first and second players may both wish to participate in a game of blackjack with a minimum $50 bet. However, both the first and second players may wish to bet a maximum of $25 each. Thus, the first and second players may pool their bets so as to participate in the game of blackjack. In various embodiments, a first player may link to a second player so as to "piggyback" off the decisions made by the second player. The first player may, for example, participate in games played by the second player. The first player may copy all the decisions made by the second player in the game. Thus, the first player may benefit from the skill of the second player. For example, the second player may be an experienced blackjack player, while the first player may be a novice. In various embodiments, the first player may get advice from the second player. The second player may provide advice over a text channel and/or over a voice channel, for example. Game outcomes achieved by the first player may be automatically displayed at the terminal of the second player. For example, the first player's initial hand of blackjack may be automatically displayed for the second player to see at the second player's terminal. The second player may thereby have the opportunity to provide advice to the first player.

In various embodiments, a first player may peruse a display which shows information about potential other players to whom the first player might link up. For example, a display may provide a list of other players. The display may show geographically the locations of second players. The list may show whether or not a second player is available for linking up to the first player (e.g., whether the second player is willing to link up; e.g., whether the second player is not already involved in a sufficient number of games to occupy him). The display may show any other pertinent information about other players. For example, the display may show demographic information about other players. The first player may choose other players to whom to link up based on desired demographic characteristics.

In various embodiments, a terminal may include an input device which converts player motions into game commands. The input device may detect the motion of the device as a whole, including forward and backward motions, twisting or turning motions, up and down motions, accelerations and decelerations, and any other motions. The input device may contain accelerometers, gyroscopes, and/or other devices for detecting motion.

In various embodiments, an input device that converts motion into commands may be connected to the terminal via a cord. The cord may bring power to the input device. The cord may also transmit signals from the input device to the terminal. In some embodiments, the input device may not be physically attached to the terminal. The input device may be battery powered, powered through motion, or powered in some other fashion. The input device may communicate with the terminal via wireless signals, such as via Wi-Fi or via infrared communication.

Motions of the input device may be translated into various game commands or into other commands. For example, motions may be translated into amounts to bet, into decisions to be made in a game, or into any other commands.

In various embodiments, a device at the terminal may track the motion of a player's eye. For example, a camera may be pointed at the eye level of a typical player (e.g., at the eye level of a person of average height). Image processing algorithms may determine whether the pupil of the eye is looking straight into the camera, to the left, to the right, up, down, etc. Such image processing algorithms may recognize the degree to which the pupil is centered or off-centered. It may thereby be determined what the player is focusing on at any given moment in time. As will be appreciated, other methods of tracking a player's eye motion may also be employed.

Relative Bet

In various embodiments, a first player may make a bet that a second player will fare better than does a third player. A second player may fare better than a third player by winning more games, winning more money, winning more high paying outcomes, or by exceeding any performance metric of the third player. Thus, in various embodiments, a first player may bet that a performance metric or statistic describing a second player will exceed a performance metric or statistic describing the third player. In various embodiments, a first player may bet that a performance metric or statistic applied to a second player will exceed the same performance metric or statistic applied to the third player. In various embodiments, the second player and the first player may be one and the same. Thus, for example, a first player may bet that he will perform better than another player. A first player may bet that he will perform worse than a second player.

A bet that a second player will fare better than a first player may pertain to some time period. For example, a first player may bet that a second player will win more than does a third player over a period from 2:00 pm to 3:00 pm in the afternoon. A bet that a second player will fare better than a third player may apply to sessions or to trips. For example, a first player may bet that a second player will fare better during his trip to Las Vegas than does a third player during her trip to Las Vegas.

In various embodiments, a performance metric may apply to different players over different time periods. For example, a first player may bet that a second player will win more money from 3:00 pm to 4:00 pm than does a second player from 5:00 pm to 6:00 pm. As another example, a first player may bet that a second player will win more money from 3:00 pm to 4:00 pm than does a second player from 3:00 pm to 5:00 pm.

In various embodiments, the performance of a second player relative to a third player may be compared even if the second and third players play different games. For example, the second player may play slot machines while the third player plays blackjack at a live table game. Though the two players play different games, the winnings of the two players, for example, may still be compared.

A performance metric may measure any one or more of the following: (a) an amount won; (b) an amount wagered; (c) net winnings; (d) gross winnings; (e) a number of payouts over a predetermined amount that have been won; (f) a number of a particular outcome that has been achieved; (g) a number of bonus rounds that have been achieved; (h) a number of times any winning outcome has been achieved; (i) a largest streak of winning outcomes; (j) a level of skill employed; and any other measure.

A bet on the relative performance of two players may be received by a casino. The bet may be received at a casino desk, casino cage, slot machine, gaming device, mobile gaming device, kiosk, over the Internet, or in any other fashion. The first player placing the bet may identify a second player and a third player. The first player may identify a performance metric. The first player may identify which of the second or the third player he wants to bet on to have the superior or highest performance metric. The first player may select a time period as well. The first player may identify games or types of games that will be relevant for the performance metric. The first player may select any other parameters of the bet.

In various embodiments, only certain games, or only certain events are counted in determining how a player performed. For example, a performance metric may describe the net winnings achieved by a player at table games. Thus, if the player plays both table games and slot machine games during the time period of the bet, the games at the slot machines may not count towards determining the performance metric.

Ultimate Gaming Championship

In various embodiments, players may compete in a gaming tournament. The winner may be determined based on some performance metric applied to all players in the tournament. Thus, for example, if the performance metric is a total amount won, then the winning player may be determined based on which player in the tournament has won the most during the time period of the tournament. In various embodiments, a computer player or simulated player may participate in a tournament. Thus, it may be possible for only a single living human to participate in a tournament.

In various embodiments, players may compete in a tournament over a given time period, with all players competing during the same time period. In some embodiments, players may compete during different time periods. For example, a first player may compete from 4:00 pm to 6:00 pm while a second player competes from 7:00 pm to 9:00 pm. The performances of the two players may still be compared against one another.

In some embodiments, each player in a tournament has a fixed amount of money to bet. For example, each player has $2000 to bet. Players may be free to bet the money in any manner they wish. For example, a player may be free to make 2000 $1 bets, or to make 20 $100 bets. The fixed amount of money may be "toy money" or "play money." For example, the money may not be actual U.S. currency and may be useable only for play in a tournament. In this case, players may be able to use what feels like a large amount of money without they themselves, or the casino, having to outlay a large amount of actual U.S. currency. In some embodiments, a player is responsible for using his own money to play in a tournament. For example, a player bets $2000 of his own money in order to complete a tournament.

In various embodiments, the winner of a tournament may be the player who wins the most money. In various embodiments, the winner of a tournament may be the player who wins the most times. In various embodiments the winner of a tournament may be determined based on any one or more of the following: (a) the player with the highest gross winnings; (b) the player with the highest net winnings; (c) the player with the most payouts over a certain amount; (d) the player who has reached the most bonus rounds; (e) the player who has won the most payouts over a predetermine amount; (f) the player who has the highest credit balance, e.g., at the end of the tournament period; (g) the player who has won the most per unit time; or any other criteria or metrics.

In order to be eligible to win a tournament and/or to win a prize in a tournament, a player may have to comply with certain rules or criteria. Any one or more of the following rules may apply to tournament play: (a) a player must play a minimum number of games; (b) a player must play no more than a maximum number of games (in some embodiments, the player may play more than the maximum number of games, but the extra games don't count); (c) a player must play a certain type of game (e.g., poker; e.g., blackjack; e.g., video poker; e.g., Wheel of Fortune); (d) a player must bet a minimum aggregate amount; (e) the player must bet no more than a maximum aggregate amount; (f) each bet made by a player must be a certain minimum amount (e.g., $1); (g) each bet made by a player must be no more than a maximum amount; (h) a player must play at a particular table; (i) the player must play at a particular gaming device; (j) the player must use a particular mobile gaming device; (k) the player must use a particular betting terminal; (l) the player must use only mobile gaming device, though the player may be free to use more than one during the tournament period; or any other rules. In various embodiments, if a player plays a game or takes some other action that is not in accordance with tournament rules, the game or action may not count towards the tournament.

In various embodiments, a player may join a tournament. For example, the player may provide his name, provide an indication of a desire to participate in the tournament, provide a registration fee, acknowledge that he has read or understands tournament rules, and/or take any other actions to get involved in the tournament. When a tournament begins, the player may provide his identity to a gaming device that he is using. For example, a player may keep a tracking card inserted into a gaming device that he is using. In this way, the gaming device may track the play of the player and allow such play to be counted towards the tournament results. In some embodiments, a player may use a mobile gaming device to compete in a tournament. The mobile gaming device may be specifically assigned to that player. In some embodiments, the player may wear a wristband or other device which communicates with the mobile gaming device, and which identifies the player to the mobile gaming device. The player's play at the mobile gaming device may thereby be tracked. Thus, the player's play at the mobile gaming device may count towards the results of the tournament.

In various embodiments, a player may compete in a tournament through bets made on other players. For example, a secondary player may make a bet on a game being played by a primary player. The secondary player may bet, for example, that a primary player will win a live game in which the primary player is playing. The results of the bet of the secondary player may count towards the results of the tournament.

In various embodiments, performance metrics for one or more players in a tournament may be available for viewing by other people, such as by other players in a tournament. In some embodiments, for example, performance metrics for the five tournament leaders may be publicly displayed or made available to other tournament participants. Leaders may be listed by name, alias, or other identifier. Leaders' performance metrics may be posted. For example, the leaders' gross winnings may be listed. With information about other participants made available, tournament participants may be able to plan or change their own methods of play accordingly. For example, a player who is well behind the leaders may decide to increase his bet size, while a person who is in the lead may decide to reduce his bet size so as to minimize risk. In various embodiments, a player in a tournament may view his own standings in the tournament. For example, a player may view where he currently ranks among all players, or how far he is from the leader (e.g., according to the relevant performance metric).

In various embodiments, a casino server or other device may track the progress of all players engaged in tournament play. The casino server may periodically determine performance metrics for all the players in the tournament. The casino server may use the performance metrics to sort the players and thereby to rank them. The casino server may make the rankings available for display. The rankings may be available for display at a slot machine, video poker machine, gaming device, gaming terminal, mobile gaming device, kiosk, or at any device, such as any device connected via a network to the casino server. Thus, for example, a player at a slot machine may select an option to view the current tournament rankings or standings for players participating in the same tournament in which he is participating.

Paper Display/Epaper

In various embodiments, a paper display may be used as, or in conjunction with, a mobile gaming device. A paper display may include a display that has one or more of the following properties: (a) it is extremely thin (e.g., thinner than 1 or 2 millimeters); (b) it is flexible (e.g., it can be bent, wrapped, or folded); and (c) it is lightweight. A mobile gaming device may include an electronic paper display manufactured or developed by E Ink Corporation.

Event Footage

Various events at a casino may occur too quickly for a player to perceive, or too quickly for a player to fully enjoy. For example, when dice are thrown in a game of craps, the dice may be spinning many times per second. The tumbling of the dice and the bouncing of the dice may occur too quickly for a player to perceive every bounce and rebound. Thus, in various embodiments, a player may wish to view the events, such as the rolling of dice, at a slower pace.

In various embodiments, cameras or other imaging devices may capture footage of events. The cameras may include high speed cameras. Such cameras may capture hundreds, thousands, or tens of thousands of frames per second, for example. Footage captured from events at a casino may be made available to players for viewing. The footage may be played back at a different speed from that at which the event occurred. For example, an event that unfolded over a 1-second period may be replayed so that the event appears to unfold over a period of 20 seconds.

In some embodiments, a player may not watch an original event, but may instead watch a replay, such as slow motion replay of the event. In this way, a player may experience more suspense and excitement as he anticipates the final resolution of the event.

Events that may be captured and replayed include the rolling of dice, the spinning of a roulette wheel, the dealing of cards, the spin of slot machine reels, the spin of bonus wheels on gaming devices (e.g., the spin of a Wheel of Fortune), or any other events.

In various embodiments, special cameras or other imaging devices may be focused on places where events of interest are to occur. For example, a high-speed camera may be built into a craps table to capture the rolling of dice. A high-speed camera may be built into a roulette table to capture the spinning of a roulette wheel. In various embodiments, a camera may capture game events as well as other events throughout a casino. For example, a camera may capture footage of people walking through a casino in order to look for security problems. The same camera may also capture the action at a game. Footage taken by the camera may be used to replay action from the game.

In various embodiments, cameras in a casino could photograph people. The photos could later be sold to the people or provided as a guest service.

In various embodiments, a picture which includes a first person (e.g., the subject of the picture) may incidentally include a second person (e.g., an incidental passer-by). Regulations, privacy concerns, or other concerns or issues may make it desirable to remove the image of the second person from the photo before the photo is sold or otherwise provided to the first person (or to some other person). Thus, in various embodiments, a photo may be taken of one or more people. It may then be determined which people are meant to be in the photo and which are not. The people who are not meant to be in the photo may then be removed. In place of the people removed from the photo, background footage of that same area may be inserted (e.g., background footage that had previously been captured). In some embodiments, incidental passers-by who appear in a photo may be grayed out or blurred, but not completely eliminated. The blurring process may prevent such people from being easily identified. In various embodiments, if an incidental passer-by appears in a photograph, the passer-by's consent may be obtained before the photograph can be distributed, e.g., to the main subject of the photo.

In various embodiments, a person may wear or carry an item which identifies that person as someone who wants or is willing to have his picture taken. A person might wear a bracelet or another special item of clothing. A mobile gaming device or other portable device might signal to an overhead camera that a person wants a photo taken. In various embodiments, a gaming device may include a camera. The camera may photograph a person when his player tracking card is in the gaming device, or when the gaming device senses the presence of a mobile gaming device. If the player is to get his photo taken, the player may have some indication on record associated with his account that he wants photos to be taken.

In various embodiments, a camera may be placed so as to photograph a particular area. A person may be directed to stand or sit in that area so as to be photographed. For example, a person may wish to be photographed while rolling dice. The person may be directed to stand in a particular area while rolling the dice. An area may be designated through markings on the floor. For example, a circle may be marked on the floor. A person may stand in the circle in order to have his photo taken.

In various embodiments, a person may control a camera with a mobile gaming device or with motion control device. For example, a person may stand near a ceiling-mounted camera. The person may signal the camera by clicking three times on a button on the motion control device. Then, the person might move the device left or right in order to direct the camera to turn left or right. When the camera is pointing at the person, the person may move the motion control device up and down in order to direct the camera to take a picture.

In various embodiments, a camera may include an antenna array or other detector which can detect the direction from which a signal is coming. A person at a casino may carry a mobile gaming device. The mobile gaming device may emit a signal which can be detected by a ceiling mounted camera, or by another camera, for example. The camera may lock onto the signal and then point towards the source of the signal. The mobile gaming device may then direct the camera to take a picture. The camera may wirelessly transmit the picture to the mobile gaming device.

Reconstructing an Event with Graphics

In various embodiments, an event may occur out of sight of an interested party. The event may have occurred in a different location from where the interested party is located. The event may have occurred at a time before the interested party arrived at the location of the event. The event may have been missed by the interested party because the interested party was looking away or not paying attention. According to various embodiments, one or more details of an event are recorded. Details may be recorded using a recording device, such as a camera, microphone, scanner, or any other device. In a game, for example, a card shuffler may incorporate scanners to scan in card images of cards that are dealt. The details may then be stored in a server or in some other computer or computing device. The details may be stored in a networked environment and made available to one or more other computing devices connected to the network. The details may later be accessed by one or more other computing devices.

In various embodiments, recorded details of an event may be used to reconstruct the event. Recorded details may first be interpreted. For example, image processing algorithms may determine the rank and suit of a card that has been dealt based upon a captured image of the card. Details of an event may be interpreted by the server storing such details, or by any other computing device.

After details of an event have been interpreted, representations of the event may be constructed. For example, a cartoon representation of an event may be generated based on recorded details of the event. For example, a representation of a card may be generated by a computer.

Representations of events may then be presented to people. Representations may be presented in the form of video, audio, tactile sensations, or in any other form. In various embodiments, representations of games which have been played may be presented to people who were remote from such games or who did not see the games when they happened. People may include secondary players, or players who bet on the outcomes of games without directly participating in the games themselves.

In various embodiments, details of an event are not interpreted. Rather, details of events are presented just as they were recorded. For example, a video of an event may be presented.

Showing Information to a Player at a Table

In various embodiments, players at a gaming table may be sitting shoulder to shoulder with other players and may generally have little space to put cash, gaming chips, food, drinks, or other items. Further, players may have limited space to view desired information, such as information about other players, information about game statistics, or information unrelated to a game. According to various embodiments, a terminal with a plurality of screens allows a player to view a number of information feeds and many different types of information. A desk area at the terminal allows the player space to put personal items or gaming items. Various buttons allow the player to call up information on demand. A player may also, in various embodiments, participate in games at the terminal. Thus, the terminal may serve to alleviate space constraints present with traditional gaming tables.

Using a terminal, a first player may call up information about a second player. The first player may call up information indicating how many times the second player has won or lost in a given period of time. The first player may call up information indicating what strategies the second player has used. The first player may call up information indicating an amount that has been won or lost by the second player. The first player may call up any other information about the second player. The first player may view multiple different items of information, such as different statistics about a second player, or such as a given statistic about many different other players (e.g., amounts won by each of 10 other players).

The terminal may also include various input devices, such as keyboards, computer mice, telephone pads, cameras, microphones, and other input devices. The player may use the input devices to indicate his desire to see information about other players, information about any games that he is currently playing, or any other information.

Playing People at Different Places in Casino, being Able to See them all, Server Based Gaming In various embodiments, people participating in a mutual event may be unable to congregate in the same physical location. For example, people may have physical frailties that inhibit easy movement from one place to another. In a casino, for example, players may wish to play in the same poker game but may be unable or unwilling to all move to the same area of a casino. Thus, in various embodiments, each of a plurality of players may go to his or her own terminal. The terminal may include a number of display screens. Each display screen may display an image of another player participating in the same poker game. Each terminal may include a camera. The camera may capture an image of the player at the terminal. Images captured by the camera may be transmitted to a central server. The server may, in turn, transmit the images from the camera to the terminals of other players. The terminals of other players may receive the images and such images may be posted on one of the display screens at a terminal. Accordingly, a player may sit at a terminal and play games against other players at other terminals. The player may see each of the other players on one of the display screens his own terminal. In various embodiments, players may also have audio links to one another. Each player terminal may include a microphone. Words spoken into the microphone may be captured, sent to the central server, and forwarded to the other terminals. The other terminals may broadcast the spoken words to the players at those terminals. Accordingly, a first player may say something like "bet" or "raise" after which other players may hear the spoken word at another terminal. Thus, in various embodiments, players may engage in a game traditionally played in person, but remotely from other players. The terminal may still allow a player to clearly see and hear all the other players.

Playing Multiple Games at Once

In various embodiments, a terminal with multiples screens (e.g., with 6 screens) may allow a player to engage in the play of multiple games at once. Traditionally, a player at a gaming device, such as a slot machine, may have limited space on a display screen with which to view the action in a game. A terminal according to various embodiments provides numerous display screens. The display screens may be spread out in semi-circular fashion in front of the player. Thus, the player may have plenty of viewing space on which to view the action in multiple games at once.

You Don't Play from Same Deck as Other Players at Live Games. But You Play Against Dealer's Cards In various embodiments, an apparatus combines information from a live game played at a table with additional information to allow for game play by another player who is not at the table. An information capturing device sits in proximity to a table. For example, a camera films the play at a table. Details of game play are captured by the information capturing device. The details are transmitted to a central server. The details may then be interpreted to determine salient game information, such as what cards have been dealt or what a dealer's hand is. Additional information may then be generated. This additional information may include new cards, dice rolls, indicia, or other game outcomes or results. The additional information may be used in conjunction with information from the live game in order to create a new game or game experience for the player at the terminal. A computer processor of the terminal generates cards for a player. The processor uses random number generators, for example, to select cards to deal to the player. Whether the player has won or lost is then determined based on the additional information generated and based on the salient game information from the live game. For example, the player may receive a blackjack hand that is generated by the processor of his terminal. The player's hand may then be compared to the dealer's hand from the live blackjack game. The comparison may be performed by the processor of the terminal using standard rules of blackjack.

Guide to Interpreting the Present Application

The following sections I-X provide a guide to interpreting the present application.

I. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed and does not imply that numerical methods must be used and does not imply that an algorithm or process is used.

The term "determining" does not imply that any particular device must be used. For example, a computer need not necessarily perform the determining.

II. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

III. Terms

The term "product" means any machine, manufacture and/or composition of matter, unless expressly specified otherwise.

The term "process" means any process, algorithm, method, or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment," "embodiment," "embodiments," "the embodiment," "the embodiments," "one or more embodiments," "some embodiments," "certain embodiments", "one embodiment," "another embodiment" and the like mean "one or more (but not all) embodiments of the disclosed invention(s)," unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car, and a wheel. The phrase "at least one of", when such phrase modifies a plurality of things does not mean "one of" each of the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on."

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number, and the data also represents something else".

The term "whereby" is used herein only to precede a clause or other set of words that express only the intended result, objective, or consequence of something that is previously and explicitly recited. Thus, when the term "whereby" is used in a claim, the clause, or other words that the term "whereby" modifies do not establish specific further limitations of the claim or otherwise restricts the meaning or scope of the claim.

The term "e.g." and like terms mean "for example," and thus does not limit the term or phrase it explains. For example, in the sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "respective" and like terms mean "taken individually." Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. § 1.72(b).

The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits, and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material, or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of, or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Various Embodiments

Game in the Different Environments

In various embodiments, a gaming system provides a platform for rapid play of card games, for maintenance of proper odds in games, for more easy viewing of the gaming experience by a player, for remote playing by a player, for allowing players to play each other when the players are not near each other, and for other benefits.

In various embodiments, a computerized gaming system manipulates electronic representations of cards. The gaming system may randomly determine an order of cards, using e.g., pseudo random algorithms. The gaming system may then deal cards to one or more players by sequentially dealing the cards to one or more players and/or to a house or dealer. Depending on the game, players may make one or more bets. Bets may be keyed in using any of a number of possible interfaces, such as buttons, touch screens, computer mice, trackballs, and so on. Depending on the game, players may make one or more decisions in a game, including decisions concerning whether to be dealt another card, whether to fold, whether to split their hands, or whether to make any other appropriate decision. Players may make decisions using any number of interfaces, such as using computer mice, buttons, touch screens, trackballs, or any other interfaces.

In various embodiments, a computer system reshuffles cards after each game, or after a small number of games. The reshuffling may be performed electronically, and so may occur near instantaneously. This may save time over a shuffling process that would be performed with a physical deck of cards.

Reshuffling a deck of cards after each game may ensure that odds in each game remain constant or relatively constant. For example, if cards are reshuffled after every game, then counting strategies used in blackjack or other card games may be rendered less effective or completely ineffective.

In various embodiments, cards numbered 1 through 6, or equivalently labeled, for example are used to play a game of craps or to play another dice game. For example, in a game of craps, a "roll" is simulated with the deal of two cards. As will be appreciated, each roll of the dice is considered to be an independent, random event. However, with a deck of cards used to conduct a game of dice, one could in principle make a prediction as to the next deal based on previous cards dealt. This is because each card dealt alters the composition of the remaining deck by depleting the deck of one card, now known.

A computerized system according to various embodiments may allow games using cards to more closely simulate games using dice. The computerized system may do this, in some embodiments, by frequently reshuffling electronic decks, so that new cards dealt are independent of prior cards dealt, just as new rolls of dice would be independent of prior rolls of dice.

Infinite Deck of Cards

A computerized system may also simulate an infinite deck or a very large deck of cards. An infinite deck or very large deck may be impractical with respect to a physical deck of cards. To simulate an infinite deck of cards, a computer system may deal a randomly chosen card when required. However, after each card is dealt, the computer may make no change to its selection process, e.g., the computer may make no assumptions that a deck of remaining cards has been depleted. Thus, the computer may, on the next card, deal the exact same card that it had previously dealt. As will be appreciated, there may be other ways of simulating an infinite deck. When an infinite deck is used, the odds of certain cards being dealt do not depend on what cards have previously been dealt. Thus, an infinite deck may be used to closely simulate a game of dice.

Magnification

A computer system for playing card games according to various embodiments features a zoom or magnification option. A player can press a button to increase the size of cards displayed on his screen. The player may further touch particular cards on a touch screen, or otherwise indicate such cards. The cards that a player has indicated may expand in terms of their display size on a display screen, so that they are more easily visible to a player. The player may also reduce the size of cards or other items displayed, e.g., so as to increase his field of the game. For example, where a player is playing against multiple opponents, the player may shrink the view of an individual opponent's cards so as to be able to see all opponents' cards at once on the same display screen.

In various embodiments, a game may be played at a physical gaming table. The table may include a felt tabletop with markings, chip racks, seats, positions for players and positions for dealers. However, some players at the table may be visually challenged and unable to see cards, bets, or other items at the table. According to some embodiments, a camera or other imaging device may capture an image of the table. The image may be displayed on a monitor or other display screen proximate to the player. The player may be able to change the magnification of the image by zooming in or zooming out. Thus, a visually impaired player may still be able to follow the action at a table by referring to a display screen where he can magnify an image of the display screen.

Simultaneity

In various embodiments, a computer system is designed to allow simultaneous actions or decisions by players in a game. In some embodiments, players compete against one another in a card game using the rules of blackjack, for example. Players bet and raise each other by putting money into a pot. The winning player is the player who has a hand with the point total closest to 21 without exceeding 21. In some embodiments, games can be played with different maximum point totals, e.g., with 22 as a maximum point total. In some embodiments, in such a game, a first player may derive an advantage by delaying a decision to hit or stand until he has seen whether or not another player has chosen to hit or stand. Thus, to prevent any one player from deriving an advantage, game rules may dictate that all players in game should make a particular decision (e.g., a hit/stand decision) simultaneously, or at least without knowledge of other players' hit stand decisions.

In various embodiments, a computer system may receive decisions from multiple players in a game. As the computer system receives each decision, the computer system may store the decision in a computer memory. The computer may track how many player decisions have been received. When all player decisions have been received, the computer system may reveal all decisions to all players, such as by showing the words "hit" or "stand" on a diagram representing player positions at a virtual table and/or by showing the actual cards.

In various embodiments, each player in a game may be prompted to make a decision in turn with the decision not being made known or only partially known to other players. For example, a player may make a hit decision, with the resulting card being shown only to that player. Alternatively, the player may make the hit decision, with the resulting card being shown only to that player but with other players receiving an indication of the decision. In either case, another player may then be prompted to make a hit decision, either having no or only limited knowledge of the pervious hit decision (i.e., when an indication of the decision was at least provided). At some later time, such as at the end of the game, for example, all cards may then be made visible to all players.

In a similar fashion, in various embodiments a computer system may allow simultaneous bets to be placed. For example, all players in a game may simultaneously make the decision to bet or not and when all player decisions have been received, reveal all decisions/bet amounts to all players. Thereafter, a player(s) that entered a lesser amount than another may be prompted to fold or enter an additional bet such that all players have entered an equal amount, for example. In this way, no one player can gain an advantage by watching others bet before making his decision to bet.

People Don't Touch Cards

In traditional games of blackjack, it may not be desirable to allow players to touch cards. When players touch cards, there is a risk that the players will mark the cards or even replace the cards with card that are more to their benefit. In traditional games of blackjack, cards are dealt face up, so there is no particular need for a player to touch a card, because the player can see everything he needs to know about the card without touching it. However, if cards were dealt face down, a player may be unable to see the card without touching it.

Computer systems according to various embodiments allow certain cards to be visible only to an individual player, and not his opponents, while still making it unnecessary for a player to touch his cards. A computer system according to various embodiments allows players to play blackjack against one another, for example. Each player is dealt at least one card which he is privileged to know, but which no other player knows. The system allows players to play at remote devices, terminals, computers, mobile gaming devices, or other interfaces. Since the players are separate from one another, cards can be displayed on a first player's terminal without risk that the cards would be visible to other players. A given player's terminal may display some of the cards belonging to other players, but not all cards belonging to other players. For example, in a game of blackjack, each player may begin with a hand in which one card is private (visible only to that player) and in which one card is public (visible to all players) and/or may receive a hit that is kept private (visible only to that player) or public (visible to all players). At some later time, such as at the end of the game, for example, all cards may then be made visible to all players.

Interface screens used with the computer system may thus display cards for players to see privately, without the necessity of players touching cards.

In some embodiments, a physical table, such as a blackjack table, may include display screens. However, the screens may be viewable from only a very narrow viewing range, e.g., due to barriers placed along the sides of the display screen.

Such screens may also allow players to privately view cards without the necessity of having them touch cards.

In various embodiments, any device that includes a display (e.g., a mobile gaming device; e.g., a slot machine; e.g., a personal computer) may display some or all cards dealt in a game. For example, a mobile gaming device may display not only the cards dealt to a particular player but may also display cards dealt to all other players. For instance, in the early phases of a game, a player may be able to see only the cards in his own hand. However, at the end of a game, a central server may transmit to all player devices an indication of all cards that had been dealt to all players in the game. Each player device may then display the cards of every player in the game. In this way, a player may be able to verify for himself why he won or why he lost, since he may be able to compare the value of his hand with the value of the other players' hands.

Table without Walls

A traditional craps table has one or more walls or barriers. The dice can be thrown against the wall to ensure the randomness of the throw. The wall further prevents the dice from escaping the confines of the table surface. In various embodiments, a game of craps, or another dice game is played at a table without walls and/or without confinement of any kind. Cards are used at the table in place of dice. Cards are dealt from a deck consisting of only cards numbered 1 through 6. Since the cards are not thrown like dice, confinement for cards may be unnecessary. Therefore, various embodiments may include a table for craps without walls. The table may include standard felt markings, such as areas for a pass line bet, a come bet, a don't pass bet, odds bets, and other standard areas. However, the table may lack walls.

Mobile Gaming

In various embodiments, players may play blackjack versus one another using a mobile gaming devices. Players may each carry a handheld gaming device (i.e., mobile gaming device). Each mobile gaming device may be in communication with a central server. A player may use his mobile gaming device to enter decisions in a game. Decisions may include indications of amounts to bet, indications of whether to hit or stand, etc. A mobile gaming device may have buttons corresponding to one or more possible decisions. For example, there may be a "hit" button, "stand" button, a "double down" button, and other buttons appropriate to blackjack. The mobile gaming device may transmit the decisions made by players to the central server. The central server may shuffle cards using an electronic shuffling algorithm. The central server may use other algorithms for determining what cards should be dealt to what players. The central server may then transmit to each mobile gaming device an indication of cards that have been dealt. At the end of the game, the central server may reference a set of game rules (e.g., game rules that are stored in computer memory), in order to determine a game winner. The central server may then provide an indication to each participating player of the game winner. The central server may also reveal hidden cards for one or more players and transmit an indication of such cards to other players.

The central server may maintain an account associated with a player. The account may comprise one or more records stored in a database. The records may be stored in computer memory. A player account may include information, such as a name of a player, an address of a player, any other identifying information about a player, and/or any other information about a player. The account may further include information about a monetary balance, a balance of casino credits, or any other balance of value. Thus, the account may store a record of how much money belongs to a player. In various embodiments, when a player indicates a bet or wager, such as at a mobile gaming device, the server may deduct the amount of the bet or wager from the player's account. In various embodiments, when the player wins money, the money won may be added back to the player's account.

In various embodiments, a player device, such as a mobile gaming device, personal computer, standalone slot machine, or other device, may prompt a player to take an action in a game. For example, a mobile gaming device may display text prompting the player to either hit or stand in a game of blackjack. A player device may prompt a player to make a bet. For example, a player device may prompt a player to decide whether to bet the pass-line or the don't-pass-line in a game of craps. As another example, a player device may prompt a player to decide how much to bet in a game. A central server may initiate prompt messages, and transmit such messages to a player device, at which time the player devices may display the prompts. In some embodiments, a player device may initiate prompts, e.g., when logic stored within the device determines that a prompt must be shown to encourage a player to take action and move a game along.

In various embodiments, a player may play craps or another dice game using a mobile gaming device. The mobile gaming device may present cards to a player in place of dice. The cards may be numbered 1-6. On a given roll, the central server may determine two cards from a randomly shuffled deck of cards. The central server may then transmit an indication of such cards to the mobile gaming device of the player. The player may indicate bets through the mobile gaming device. The player may press a button on the mobile gaming device indicating a desire to make a new roll (e.g., in the event that a game has not ended).

Motion Control

In various embodiments, a mobile gaming device may include one or more motion sensors. For example, the mobile gaming device may include an accelerometer or gyroscope. The mobile gaming device may include one or more location or positioning devices, such as a Global Positioning System sensor. Logic contained within the mobile gaming device or within the server may differentiate position sensor readings in order to detect motion.

A player may move the mobile gaming device in order to indicate decision in a game. Sensors within the mobile gaming device may pick up the motion of the mobile gaming device. Logic within the mobile gaming device or within the central server may interpret the motions as commands to be used in a game. The motions may be interpreted as commands to make a bet, to bet a certain amount, to raise, to fold, to call, to check, to hit, to stand, to double down, to bet the pass-line, to bet don't pass, or to make any other type of bet in any game, or to take any other action in any game.

Blackjack Motion Control

In various embodiments, a player may use a mobile gaming device to play in a game of blackjack. In various embodiments, the player may compete against other players. In traditional games of blackjack, a player might indicate a decision with a tapping motion. For example, in traditional games of blackjack the player may tap the table twice in order to indicate a decision to hit. In various embodiments, a player using a mobile gaming device to play blackjack may shake the mobile gaming device twice in an up-and-down motion.

Card Dice Motion Control

In various embodiments, a player may make a motion with a mobile gaming device as if he is rolling the dice. For example, the player may shake the mobile gaming device from side to side as if he is cradling dice in his hands and rolling them around in his hands. Then, the player may make a large sweeping motion with the mobile gaming device as if actually rolling dice onto a table. The mobile gaming device may deal one or more cards (e.g., from a deck of cards numbered 1-6) upon detecting the player's sweeping motion.

Terminal Motion Control

In various embodiments, a wristband, bracelet, or other device may be used to interact with a betting terminal. The terminal may include a terminal with multiple displays (e.g., with six displays), with speed dial functions, with keyboards, or with any other devices. The wristband may include motion or position sensors, such as accelerometers, gyroscopes, tilt sensors, sensors for a positioning system (e.g., for GPS) or any other motion or position sensors. A player may thereby make wrist motions, or other bodily motions, which can be translated into commands. For example, the wristband may include a processor which interprets readings from the various sensors in the wristband. The processor may determine intended commands based on the motions of the wristband. The processor may then direct the commands be wirelessly transmitted to the terminal. Commands may include commands to bet a certain amount, to begin a new game, to select a particular pay line, to cash out, to hold a particular card, to hit in blackjack, to double down in blackjack, to look at a pay table, or to take any other action. In various embodiments, a wristband may be used to issue various other commands or to perform other functions. In various embodiments, any article worn or handled by the player may be used to sense motions. The article may convey information about motions detected to the terminal or to some intermediary device which relays information to the terminal. The article may also interpret motions that have been detected and determine an intended command. The article may then transmit information about the command to the terminal.

Internet

In various embodiments, players may participate in games over a network. Thus, in various embodiments, a computer system may include a central server in communication over a network with one or more player devices. Player devices may include mobile gaming device, personal computers, slot machines, or other devices. The network may be a wireless network or a wired network. The network may be the Internet. In various embodiments, players may participate in games via personal computers while communicating over the Internet with the central server. As with mobile gaming devices, the central server may receive commands and instructions from player devices, may determine cards dealt, may calculate winners and losers, and may credit and debit player accounts as appropriate.

Standalone Slot Machine.

In various embodiments, a player may participate in a game, such as a game of blackjack or a game of dice using cards in place of dice, at a standalone gaming device. A standalone gaming device may include a fixed device, such as a slot machine, video poker machine, video keno machine, bingo machine, or other device. The gaming device may be networked to other gaming devices. For example, a number of gaming devices may be linked to the same central server. Thus, as with mobile gaming device and personal computers, a central server may facilitate gaming competition among players at different standalone devices.

In some embodiments, a player may play a game of blackjack according to various embodiments by himself at a standalone gaming device. The gaming device may simulate "virtual players" who are in competition with the player. Thus, the real, or human player may play against e.g., six virtual players in a game of blackjack. Each of the real and virtual players may make bets and make decisions in the game. The winner may be determined based on which of the players is closest to 21 without having folded and without having exceeded 21. If it is the real player who has won, then the amount in the pot may be credited to the real player's account, paid out in cash to the player, or otherwise provided to the player. If it is a virtual player who has won, then the house may keep any money from the pot.

A player may play dice games at a standalone device. The standalone device may deal cards that are numbered 1-6, so as to simulate rolls of dice. The player may win or lose according the rules of the applicable dice game, e.g., craps.

Deck Sorting Device

In various embodiments, a deck with only cards 1-6 may be formed from another deck, such as from a standard 52 card deck or such as from a plurality of such decks. The card deck may be formed using a card sorter. According to some embodiments, in operation, the card sorter may receive a deck containing the cards 1-6 as well as other cards, (e.g., 7, 8, 9, 10, J, Q, K). The card sorter may form two decks from this. The first deck may include cards numbered 1-6, and the second deck may contain all other cards. The two decks may be separated, such as into two different stacks or heaps of cards.

A card sorter may include an optical reader or scanner for reading card faces. The card sorter may further include a processor and memory. The processor and memory may be formed from semiconductors or from any other materials. The processor may be a standard Intel processor, or any other processor.

Non-Computer Embodiments

In various embodiments, where applicable, embodiments described herein may also be practiced without a computer system. For example, players may play blackjack against one another using physical cards and physical chips for betting. Players may also play craps or other dice games using a physical deck of cards, where such cards have been numbered 1-6.

In general, like reference numerals in different figures do not necessarily refer to the same item. Reference numerals below, until otherwise specified, refer only to FIG. 1 through FIG. 21.

Architecture of a System According to Various Embodiments

Referring to FIG. 1, there is shown a block diagram of interactive gaming system A10 according to various embodiments. System A10 comprises controller A12 and a plurality of gaming devices or machines G.sub.1, G.sub.2, G.sub.3, . . . G.sub.N (collectively referred to herein as "gaming machines A14"). Each gaming machine A14 has a wagering game that such as a multi-spinning reel type wagering game, e.g. video slot machines. Each gaming machine A14 includes at least one display screen for viewing the player's results as well as other player's results. If the wagering game is a video slot machine, then the display screen can be used to view the wagering game. Controller A12 is linked to and controls gaming machines A14. Controller A12 includes central processing unit ("CPU") A16, random access memory A18, read-only-memory A20, programmable interface circuitry A22, display A24, user interface A26, random number generator A28, and one or more servers S.sub.1, S.sub.2, S.sub.3, . . . S.sub.M (collectively referred to herein as "servers" A30. Each server A30 is assigned to handle a specific number of gaming machines A14. Interface circuitry A22 includes multiplexing circuitry. However, it is to be understood that this multiplexing circuitry can be replaced with address/data bus and suitable decoders within each gaming machine A14. System A10 further includes communication links A32. Communication links A32 electronically link controller A12 with gaming machines A14. Random number generator A28 is in communication with and controls gaming machines A14, via interface circuitry A22, such that gaming machines A14 have totally impartial, random outputs as a function of stimuli provided by random number generator A28. Each of the gaming machines A14 are provided with an enabling means such as a push button, joystick, video-game pad arm or "touch screen" to activate and thus play the wagering game.

Referring to FIG. 1, programmable interface circuitry A22 may be programmed to effect data communication between gaming machines A14 and controller A12 when machines A14 and controller A12 are arranged in different configurations. In various embodiments, controller A12 is located in one particular location and each gaming machine A14 is located at an internet location. In another embodiment, controller A12 and gaming machines A14 are located in the same physical location, e.g. within the same casino. When each gaming machine A14 is located at an internet location, each gaming machine A14 generally comprises the player's personal computer and the appropriate software. In various embodiments, the player downloads software made available on the internet by servers A30. The software enables the player to communicate with controller A12 and to play the wagering game and the desired theme game.

When system A10 is configured such that gaming machines A14 are located at remote sites that are linked to the internet, the display screen of each player's personal computer is programmed to initially display the interior of a casino. The player can scroll using the keyboard or mouse to "move about the casino". In one embodiment, the player's personal computer and software are configured to provide "sounds" of a typical casino environment. The "casino" displayed on the display screen includes a plurality of groups or banks of slot machines. Each group of slot machines is associated with a particular theme game. Indicia are provided to identify which group of slot machines is associated with a particular theme game. Each slot machine is associated with an icon representing a chair or stool. When the player decides to play a slot machine that is associated with a particular theme game, he or she uses a computer mouse to "click" on the "chair icon" in front of a slot machine that is part of the bank of gaming machine associated with the desired theme game. System A10 then "tags" that particular chair with the player's name or alias that he or she uses on-line. The pre-programmed computer then provides a particular screen configuration that corresponds to the selected theme game. This is discussed in detail below.

System A10 can be controlled by a software program that effects implementation of the steps of the processes according to various embodiments. Thus, it is to be understood that system A10 can have any one of a variety of configurations, as described above, and that interface circuitry A22 can be configured by CPU A16 to handle data transfer between controller A12 and gaming machines A14 in a manner that is compatible with any of the particular configurations discussed above. It is also to be understood that controller A12, as described above, is just one example of a suitable controller and that other suitable controller architecture can also be used.

Gaming system A10, according to various embodiments, can be played by one or more players. Some of the theme games are configured so that a plurality of players playing at a particular bank of gaming machines can play as a group. If a group of players are playing gaming system A10, the group of players are referred to as a "Group". In some embodiments, games may be configured in manner such that the players play against each other instead as a group. In various embodiments, the system allows all players to communicate with one another via e-mail while simultaneously playing the wagering games.

Remote Participation in a Live Casino Game

Various embodiments pertain to the playing of casino table type games such as roulette, dice, and cards, from remote locations while viewing actual games being played at a casino or similar location.

One of the games played in a casino is roulette. This game is played at a table around which a number of players sit or stand and bet by placing chips on a betting grid of numbers in blocks, intersections of blocks, black and red plays and odd and even number selections. A wheel is spun and a ball falls into a numbered pocket as the wheel stops thereby determining the winner of the game who is paid off at various odds depending upon the type of bet placed. Such a game is played at casinos throughout the world. There is usually a considerable amount of interest and excitement around the table as the game is played.

The game of roulette is also played via the Internet. Here there is a computer generated simulation of the roulette table betting grid and spinning wheel. This type of game originates from any location capable of housing the computer and having the necessary telecommunication connections. The player can play the game for fun only or make wagers over the Internet such as by establishing and using a credit card account. The Internet and other telecommunication media may permit playing roulette from any location in the world having the necessary equipment.

A similar situation exists with other casino table games such as blackjack, dice and baccarat. In each of these games players place bets on a table and there is player interaction as the game is played as well as reaction in the crowd watching.

In various embodiments, a player establishes an information link with a casino from an interface station including a video monitor and keypad. In response to the player's entry of financial account information, the casino establishes an information line with the player's financial institution. The casino assigns the player to a gaming table at which a "live" game is occurring, transmitting all images of game play and instructions to the player. The player transmits bet and game play information to the casino. Because of the open line between the casino and player's financial institution, bets are checked, winnings paid, and losses debited.

Various embodiments include a system and method for playing a roulette game in an interactive manner at a site remote from the actual casino table while still having a view of and experiencing the live casino action where the game is being played. In accordance with various embodiments a camera follows a game that is being played at a roulette table in a casino. A microphone can also pick up the sound of the players at the table and the game play.

In some embodiments, terminals are provided at various locations in the casino remote from the table. The terminals are connected to a distribution device that provides the necessary communication between the players at the remote terminals and the game being played at the casino table.

A remote terminal accepts cash or credit cards to set up an account for the player. The remote terminal displays a picture (video) of the actual casino table where the game is being played. The remote terminal also contains its own computer (microprocessor) that has various functions. Among these are the generation and display of an electronic representation of the table betting grid, this display also having a touch type keypad in some embodiments. The player at the terminal uses the keypad and electronically places a bet on the computer representation of the table betting grid under the casino (house) roulette rules in the normal manner. He also uses the touchpad to select the amount of the bet to be placed. The remote terminal microprocessor is programmed with the required information of odds to pay off when the player makes a winning bet.

At the casino table the croupier conducts the game in the normal manner. At a given time, normally just before or when the ball is placed in the spinning wheel, no more bets are accepted. This is signaled to the computers at the remote terminals which locks out the players at these terminals from placing any more bets. The players at the remote terminals can watch the actual game play at the casino table and the reactions of the players. When the ball drops in the wheel pocket and the game at the casino is finished, the player sees the winning number result. The result also is also made available electronically at the remote terminals.

In various embodiments, the remote terminal microprocessor maintains the terminal player account balance information. Upon the result of the game winning number being transmitted to the remote terminal, the terminal microprocessor make a calculation against the bet made. If the bet was a loss, then the amount of the bet is subtracted from the player's account. If the bet was a win, the amount of the win is calculated at the usual casino odds, or at some other odds as set, and the appropriate amount of the win is credited to the player's account.

Various embodiments pertain to players who are not at the casino and, effectively, can be located anywhere in the world. Here, the game being played at the casino is followed by the camera and the picture of the game play and results are transmitted via telecommunications to remote locations. The transmission mode can be the Internet, satellite or other wired or wireless communication system, to players who play the roulette games using devices such as personal computers or modalities such as a TV set connected to the Internet with control boxes such as offered by WEBTV or AOLTV. The devices can be either of stationary type or of the portable type which can communicate by wireless. A program can be installed in or downloaded to the remote player's device that has the features of the previously described casino remote terminal, such as betting odds calculation, generation, and display of a betting grid, placing a bet on the grid, etc.

In the remote player embodiments, the game being played at the casino may be viewed and the game play sounds heard by the player at the remote location. The player maintains an account preferably at his own device that can have access to a central computer such as at a bank or credit card company in communication with the player's device. The player follows the table game by viewing the transmission from the camera. When a game is completed at the casino the result is transmitted and the player's computer makes the necessary win and loss calculations based upon the result of the game and this is entered in the player's account at his device.

In some embodiments, a player who is not at the casino table experiences the actual table play and crowd response and is able to make wagers without having to be physically present at the game table in the casino. The results of a bet are computed at the location of the player and the player is presented with a running total of his account so he can see the results of his wager and monitor the amount wagered.

Various embodiments pertain to games played at a table such as blackjack, dice, baccarat, and similar games.

Various embodiments may allow players to play roulette and other casino table type games at remote locations while following an actual game that is being played at a casino table and using the results of the casino game to determine betting results.

Various embodiments provide a system and method for playing roulette and other casino table type games in which a player at a terminal or other device remote from a game played at a casino game table follows the game at the casino table, in which the player uses a computer located at the terminal or device to place bets, and in which computations are made of the winnings and losses as the actual game is played.

Various embodiments provide a method and system for viewing a roulette or other table game played at a casino from a remote location from which bets are made and wins and losses are adjusted against an account balance of the remote player.

Figure 2:
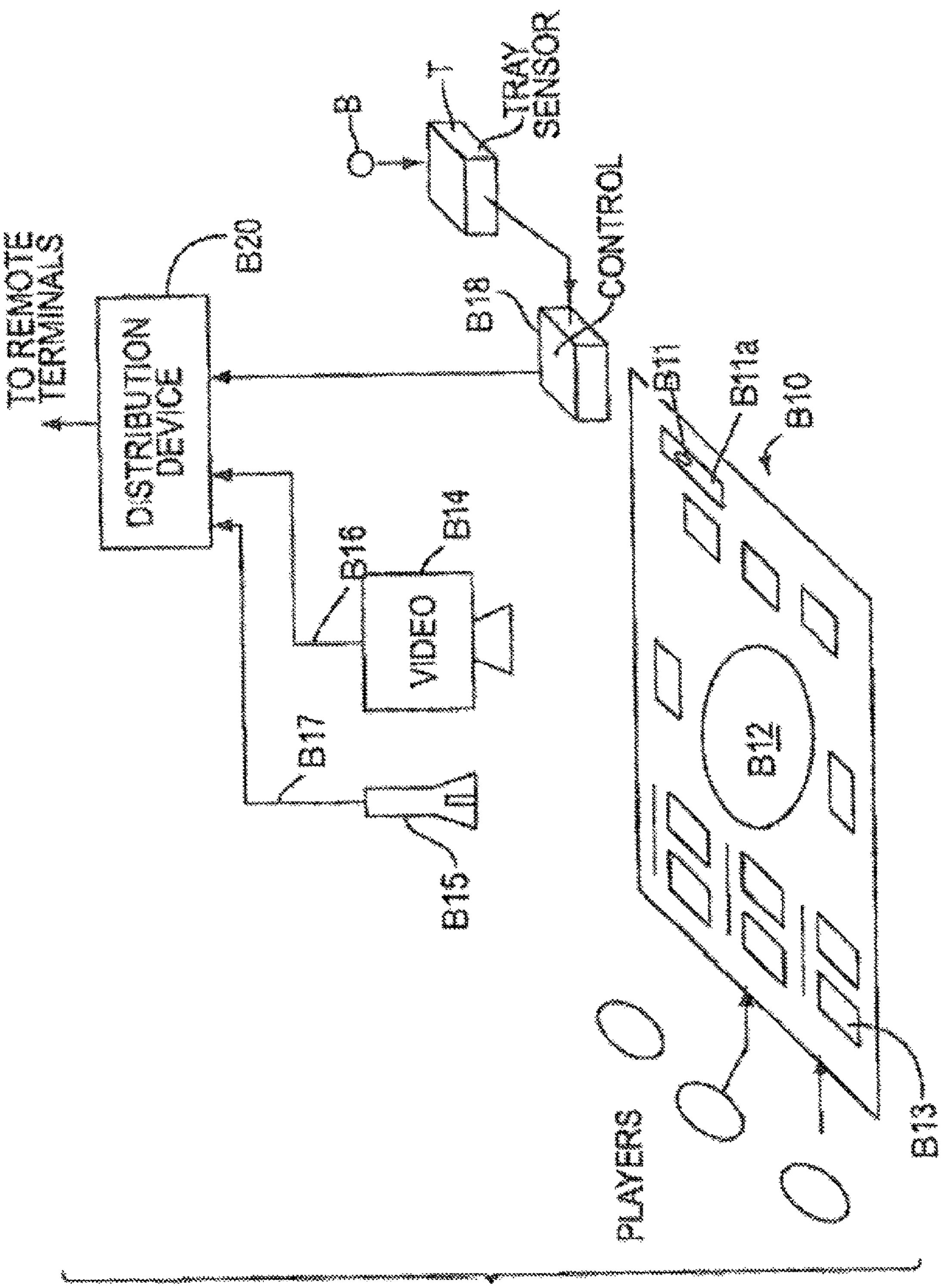
FIG. 2 is a schematic diagram of a roulette table in a casino with associated video camera and other parts of the system in schematic form.

FIG. 2 shows a conventional roulette table B10 that is in common use at a casino. While various embodiments are described relative to a roulette table its principles are applicable to other table games such as blackjack, dice, and baccarat. The table has the usual wheel B12 that is manually spun by a croupier into which a ball B11 is dropped at the beginning of the game. The ball B11 is usually placed in a tray B11*a* during the time it is not in use. A betting grid B13 is on the table, the grid containing the usual format of squares or rectangles with a number in each and other bet areas such as odd/even number, and red/black. A number of players stand or sit around the table. A player makes a bet by placing one or more chips of a given denomination on a number, intersection of corners, on red/black, etc.

Shown located above the table is a video camera B14, such as a video camera that is of the full color type. The camera B14 can be hidden, as are many cameras in a casino used for surveillance purposes, or can be a standalone visible type if, for example, the presence of the remote play feature is to be advertised. The camera field of view may be limited to the hands of the players as they place bets on the table and may not show the faces of the players. This may be done to maintain privacy. A microphone B16 is also placed adjacent the table to pick up the "crowd noise" of the players. The microphone can be directional to pick up the sound of the spinning wheel and ball.

The output cable B16 of the camera B14 and the output cable B17 of the microphone B15 are shown. These are connected to a distribution device B20 at a suitable location that includes the type of broadcast facility that is to be used for the system. For example, if the game is to be used only with remote terminals at the casino, then there would be a type of a closed circuit TV system. If the camera and audio output is to be broadcast over the Internet, then there would be a suitable transmitter such as by "streaming video" and "streaming audio". If broadcast is to be by satellite then there would be communication such as by digital transmission.

Also associated with the table B10 is a control box B18. This is to be used to indicate specific events of a game during its play, such as start of a game and the close of betting for a game, that is, betting status signals. The control box B18 can be actuated in a suitable manner, such as manually actuated by the croupier, voice actuated and actuated at a remote location such as by an operator at a central location that monitors play at a table. In some embodiments, the control box B18 can be associated with physical devices such as, for example, a tray T in which the game ball B is placed, and which has a micro switch or other type of sensor. Placing the ball in the tray triggers a signal that indicates the start of betting for a new game and removing the ball from the tray to place it in the wheel triggers a signal that the betting for the game is terminated. The close of betting also can be indicated by a motion detector or the video camera each for sensing start of spinning of the wheel and opening of betting for a new game by sensing the wheel stopping its rotation. These betting status signals are transmitted via the distribution device B20 to the remote terminals.

Figure 3:
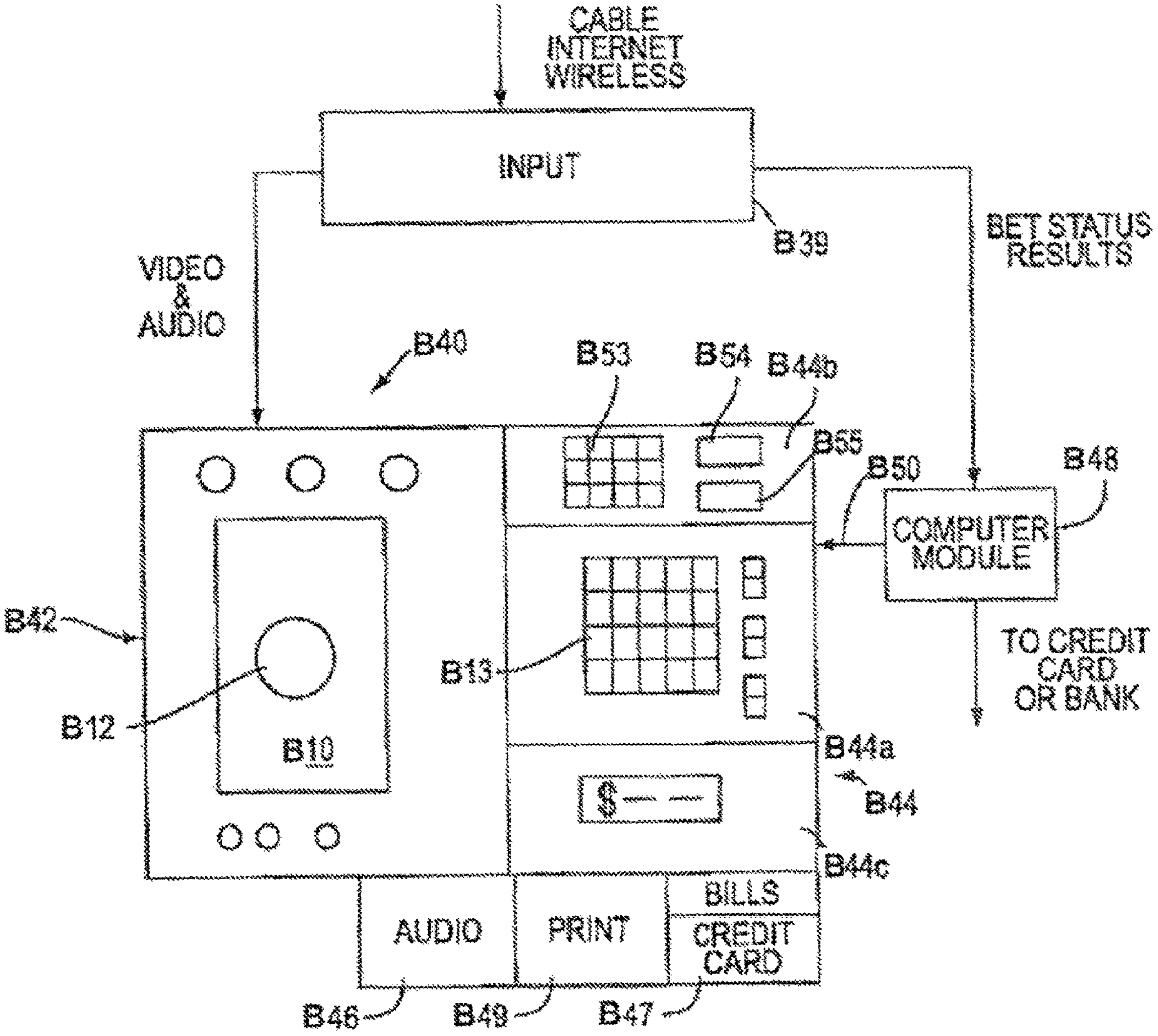
FIG. 3 is a schematic diagram of a terminal, computer, or TV type of display.

FIG. 3 shows a remote terminal B40 for use at a casino or other location. The terminal B40 has an input section B39 that receives the video and data signals originating from the table. Terminal B40 includes a video display B42 which receives the video pictures of the table B10 action broadcast from the casino camera B14. There is also an audio module B46 that has a speaker and suitable volume control to play the sounds picked up from the casino table by the microphone and other audio information, as described below. The picture of the game being played at the table and the table sound are features that add to more realism for the player who is playing the game remote from the casino table.

Terminal B40 also includes a computer module B48 which has a microprocessor and a memory. The computer module preferably is of the type that makes the terminal B40 self-contained. That is, it has an application program that can generate various displays, perform the necessary computation for the odds of playing a game, and for keeping a running account of the wins and losses of the player. The terminal computer module B48 receives the betting result and betting status data type signals produced at the table B10.

Remote terminal B40 also includes a display B44 which basically comprises three sections. The display B44 is controlled by the terminal computer module B48 and a connecting communication line B50 between the two is shown. The display B44 essentially is an electronic table having features that corresponds to the actual casino table.

The display B44 has a section B44*a* that displays a computer module B48 generated simulation of the table betting grid. This section also can display other information such as the odds for various bets and bet combinations. The latter type of information can be displayed continuously or only on demand.

The second section B44*b* of the display B44 is a touch type screen that has a numeric keypad B53 with the usual 0-9 numbers, a touch type Enter key B54 and a display window B55 that displays data that has been entered. As part of a menu on the touch screen B44*b* is a set of keys for the selection of the type of bet, that is, straight number, combination of numbers, red/black and odd/even. The third section B44*c* displays the account balance of the player. All of the sections of the display B44 are generated and controlled by the terminal computer module B48.

The terminal B40 audio module B46 also interacts with the computer module B48. The audio module can be used to provide information to help the player place his bets. For example, it can give messages to the effect that a new game is starting, direct a player to place a bet on grid number(s), and indicate that betting is closed. Instead of the audio messages, the messages can be displayed on any one of the sections of display B44 and there can be a combination of audio and visual messages.

A bill acceptor B47 is also part of the terminal B40. Here the player inserts bills of currency to build up credits in his/her account. The bill acceptor accepts currency of the type used at the casino or other type and of one or more denominations. As the player inserts one or more bills into the acceptor to open his account, the value is displayed in the display section B44*c*. The acceptor B47 also can be replaced by a credit card reader, or one can be provided in addition to the acceptor.

The remote terminal B40 also has an internal printer B49. When the player completes play at the terminal, he can request a printout of his account which is provided by the printer B49. This can be presented to a cashier at the casino to be redeemed for cash or chips when there is a positive balance. If the player is playing via a credit card, he can request from the terminal that winnings in his account as stored in the computer module B48 be electronically credited to his credit card account at a credit card company or bank. A player can obtain cash from a credit card, such as from an ATM machine.

In the operation of a remote terminal B40 for a new player, the player inserts bills into the acceptor B47 or uses a credit card. This opens the terminal, and the amount of the account is displayed on section B44*c*. The player then selects a preferred bet amount, that is, the base amount of a bet such as would correspond to a chip. For example, if a player opens an account for $100 and a preferred bet amount of $5, he would have the equivalent of 20 $5 chips if actually playing at the casino table. A stack or stacks of electronic chips of the proper amount and values can be displayed such as on the electronic betting grid section B44*a*. The value of a chip can be any amount, for example, even as small as 25 cents. The small betting amounts usually are not permitted at the casino table which often has a minimum bet of $5 or $10. The remote terminals expand the customer base and the amount that the casino owner or game operator can make during game play.

The player views the play in process at the casino table on the video display B42 and can play along with the play at the casino. The video display B42 preferably is left on at all times to attempt to induce play at a terminal.

The player is advised that a new game is to start and to place his bet. The start of a new game message, either audio or visual, is triggered from the control box B18 associated with the casino table. For example, as the ball B11 is placed in the tray B11*a* at the casino table or the spinning of the wheel stops, the distribution device at the casino broadcasts this to the remote terminals. The player enters his bet via the touch screen B44*b*. That is, the player selects whether it is a straight number, combination, or other type of bet. Different types of bets can be made, like playing at the casino table. At the time of placing a bet the player can consult the betting grid in display section B44*a*. Instead of a touch type screen section B44*b* to designate the number(s) or other type of bet, numbers can be selected by a computer mouse point and click arrangement on the electronic grid table B44*a*. This is of use particularly where the terminal is a PC or other device that is off the casino physical site. In a PC or similar device, a part of the display screen can be used for the video display and another part for the computer generated functions, such as the betting grid. In a device using an AOLTV or WEBTV converter box or similar device the display screen of a television screen would be similarly divided.

The type of bet selected is displayed in window B55. The player enters the number or grid intersection numbers if the bet is a combination. This is also displayed in window B55. The number, intersection, red/black or odd/even bet also is displayed on the electronic betting grid section B44*a*. The player then enters the amount of the bet which also is displayed in window B55. The amount of the bet also can be displayed on the betting grid section B44*a* such as by showing the stacking of the electronic chip or chips of the selected amount at the proper location of the grid. The chips that are bet are removed from the player's purchased stack of electronic chips.

The complete bet is displayed in window B55. If it is acceptable, the player touching the Enter key B54. If not acceptable, the bet is cancelled by touching a key on the keypad B53, such as the star key, or a special Cancel key provided in section B44*b*. At this time the bet data is entered in the memory of the terminal computer module B48. If a mouse is used, there would be a point and click at an Enter or cancel box displayed on the screen.

The player can place additional bets for the game until a signal originating from the control box B18 at the casino game table, such as by removing the ball B11 from the tray B11*a* or the start of the wheel spinning, indicates that the betting is closed for the present game. The computer B48 at the remote terminal is locked out from accepting any more bets. This can be indicated to the player at the remote terminal by one or both of an audio and computer generated visible message. During the time allotted for making bets the player at the terminal can watch the action of the players and the bets placed at the casino table B10.

The game is played at the casino table B10 and the players at both the casino and at the remote terminals watch the wheel spinning and the ball dropping. The sounds at the table also are broadcast to the players at the remote terminals. The game result, that is, the winning number of the pocket into which the ball dropped and its color, is sent from the casino distribution device B20 to the individual remote terminals. The computer module B48 at a remote terminal B40 uses the game result and the bet(s) placed information to compute whether there was a loss or a win. If a loss, the computer subtracts the amount of the bet from the player's account. If there was a win, the remote terminal computer module B48 computes the amount of the win in accordance with the odds of the type and the amount of the bet. That is, each of straight number and number combination have different odds and red/black and odd/even have the same odds but different from the number type bets. The computer B48 has a program that provides for this calculation. The calculated win amount is then credited to the player's account. The account amount is displayed in the display section B44*c*.

As can be seen, a player at a location remote from the actual casino table can follow an actual game and can experience much of the actual casino player reaction and sounds. This makes the remote player's participation in playing much more realistic and interesting.

The foregoing description is based on a standard casino setting, such as found in Nevada and New Jersey U.S.A. It also applies to private casinos. That is, a religious or veterans organization holds a gambling night. The roulette table and camera would be brought to the location of the organization as well as remote terminals and communication apparatus. The remote terminals can be placed throughout the location for those who like to play alone or to handle any overflow.

Various embodiments are described relative to a roulette table but have application to other casino table play type games. For example, there can be a dice table at the casino which has the camera and microphone described above. Here, the remote terminal would have a video display of the casino dice table and a computer generated representation of the table. The player at the remote terminal places a bet and plays along with the player at the casino. Here also, appropriate betting status signals are sent to the remote terminals to designate the opening and closing of betting, placing additional bets and results of the game. As before, a program in the remote terminal computer module calculates the winning based on house or other odds and credits this to the remote terminal player's account. Losses are subtracted.

The remote terminal video display of actual game content is also applicable to card games such as blackjack, poker, and baccarat.

A separate remote terminal can be provided for each type of game, or a single universal terminal can be provided for two or more of the table games.

Specific features of the various embodiments are shown in one or more of the drawings for convenience only, as each feature may be combined with other features in accordance with various embodiments. Alternative embodiments will be recognized by those skilled in the art and are intended to be included within the scope of the claims. Accordingly, the above description should be construed as illustrative and not limiting.

Casino with on-Line Presence

Figure 4A:
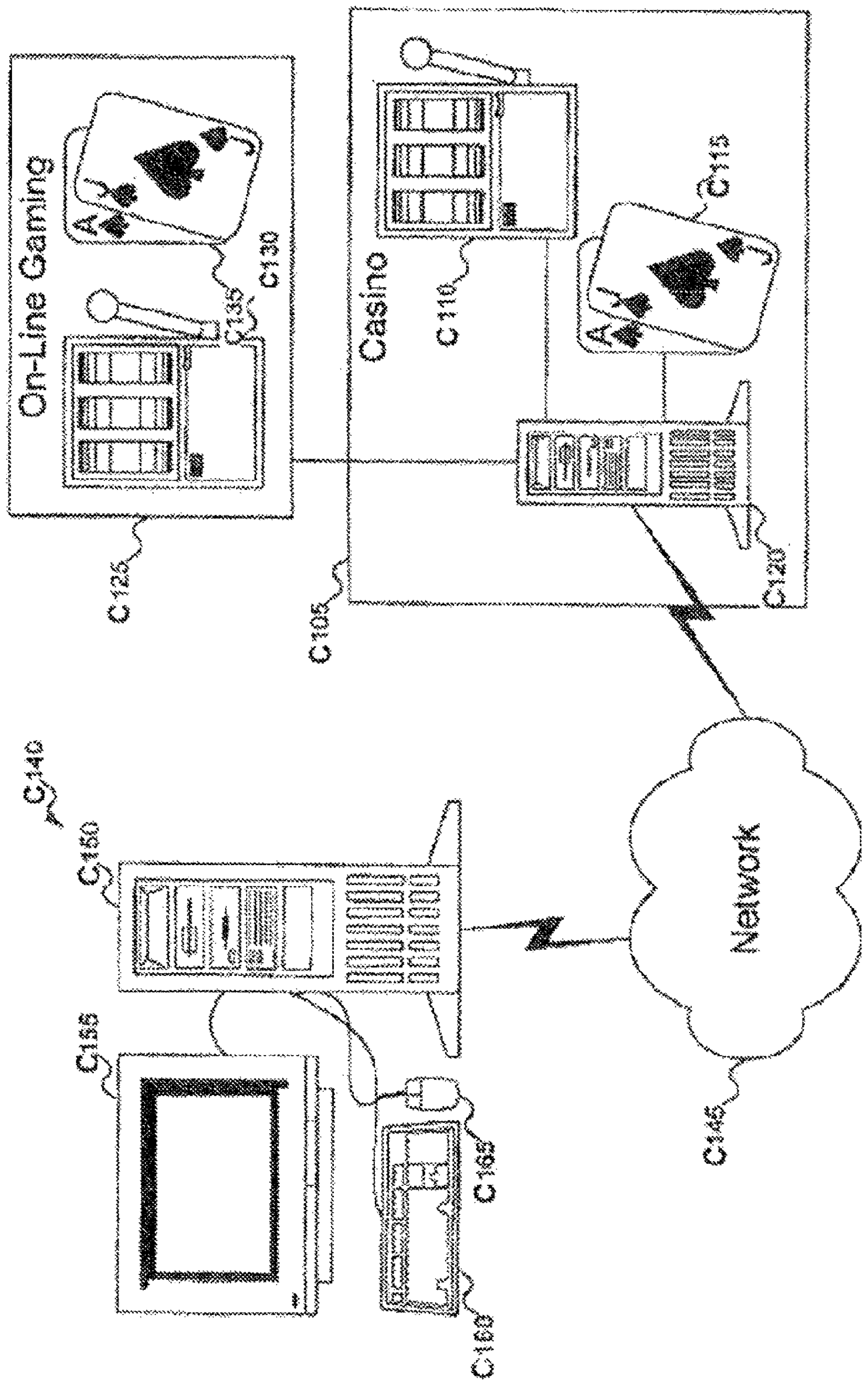
FIG. 4A shows a casino offering both in-house and on-line (over a network) gaming, according to various embodiments.

FIG. 4A shows a casino offering both in-house and on-line (over a network) gaming, according to various embodiments. In FIG. 4A, casino C105 includes various gaming devices, such as slot machine C110 and blackjack C115. (A person skilled in the art will recognize other games casino C105 might offer.) Casino C105 also includes server C120, which tracks a player's activity within the casino. Thus, as the player uses slot machine C110 or blackjack table C115, the player's coin-in, winnings, etc. is all tracked via server C120. The tracked data can be stored locally on server C120, or it can be stored in a secure server offsite (see FIG. 5 below). In addition, server C120, although shown as physically within the confines of casino C105, can be located outside casino C105.

Casino C105 also offers on-line gaming web site C125. Web site C125 offers Internet gaming similar to that offered in-house at casino C105, but without using the physical devices available in-house. For example, web site C125 might offer on-line versions of slot machine game C130 or blackjack game C135. The credits used by the player in Internet gaming can come from any desired source. For example, the player can input a credit card number to web site C125, which then issues the player a number of credits in exchange for a charge to the player's credit card. Or the player can use credits associated with the player's account. Systems for transferring credits from a player's account to a gaming device are described in U.S. patent application Ser. No. 09/134,285, filed Aug. 14, 1998, and U.S. patent application Ser. No. 09/694,065, filed Nov. 19, 2000, which are hereby incorporated by reference. A person skilled in the art will recognize how the systems can be modified to transfer credits to a web site offering Internet gaming.

To use web site C125, a user connects to web site C125 from a computer, such as computer system C140, across network C145. Computer system C140 conventionally includes computer C145, monitor C150, keyboard C155, and mouse C160. A person skilled in the art will recognize that although computer system C140 is shown as a desktop personal computer, other types of computers are contemplated in various embodiments. For example, computer system C140 can also be an Internet appliance, with monitor C150, keyboard C155, and mouse C160 integrated into the housing of computer C145. Computer system C140 can also take other forms: for example, a personal digital assistant (PDA) or other handheld device, or even a cellular telephone. Optional equipment not shown as part of computer system C140 in FIG. 4A are other input/output devices, such as a printer. Also not shown in FIG. 4A are the conventional internal components of computer system C140: e.g., a central processing unit, memory, file system, etc. Similarly, network C145 can be any variety of network, such as a local area network (LAN), wide area network (WAN), wireless network, or global network (such as the Internet), among others. Network C145 can also be any combination of the above networks used to connect computer system C140 and web site C125.

Figure 4B:
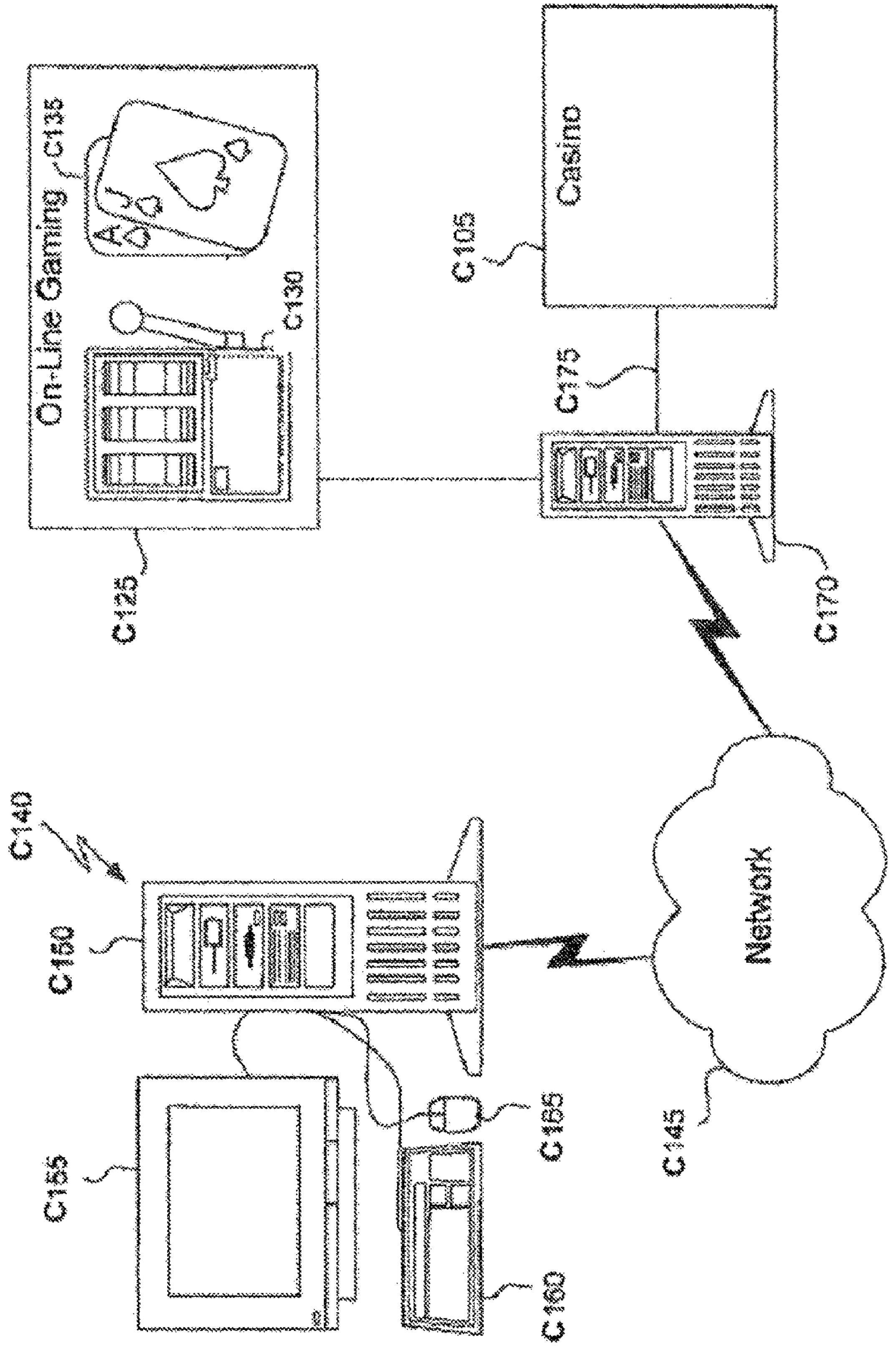
FIG. 4B shows a casino according to some embodiments.

Although FIG. 4A shows web site C125 as being stored on server C120 within casino C105, a person skilled in the art will recognize that web site C125 can be stored on other servers. Similarly, web site C125 can be accessible through server C105 or can be totally separate, so that connecting to web site C125 does not require a path through server C120. For example, FIG. 4B shows an alternative embodiment. In FIG. 4B, web site C125 is hosted by server C150, which is separate from casino C105. Server C150 can be owned by casino C105, but physically separate from server C120. In this embodiment, where server C150 and server C120 are separate devices, typically server C150 does not store any player tracking information, which is preferably stored on server C120. Server C150 can also be located in a different environment, outside casino C105. Or server C150 can be a third party server, operated by a third party instead of casino C105 (but perhaps with direction from casino C105). A person skilled in the art will recognize other possible variations.

Even if casino C105 does not own or operate server C150, casino C105 will want to be able to track the player's activity on web site C125. To enable this tracking, server C150 can report the player's activities to casino C150. Connection C155 enables server C150 to report a player's activities to casino C105. A person skilled in the art will recognize that connection C155 does not have to be a direct physical connection. Instead, server C150 can connect to casino C105 via network C145.

Although FIGS. 4A and 4B show web site C125 as providing the on-line equivalent of gaming in-house at the casino, web site C125 can provide other forms of entertainment to players. For example, rather than playing for money, web site C125 can offer players a play-for-fun site. In this configuration, when players use web site C125, they are not risking their own money. Nevertheless, casino C105 might want to track the player's activities, to reward the player for loyalty. For example, the player might earn points that are redeemable at the casino. Thus, even though the casino does not directly profit from the player's activities, there is an indirect profit motive, as the player will eventually visit the casino to redeem the points accrued, and hopefully spend money gambling at the casino. In addition, if the casino offers multiple web sites to players, some of the web sites can be configured for on-line gaming, and others can be configured for play-for-fun.

Figure 5:
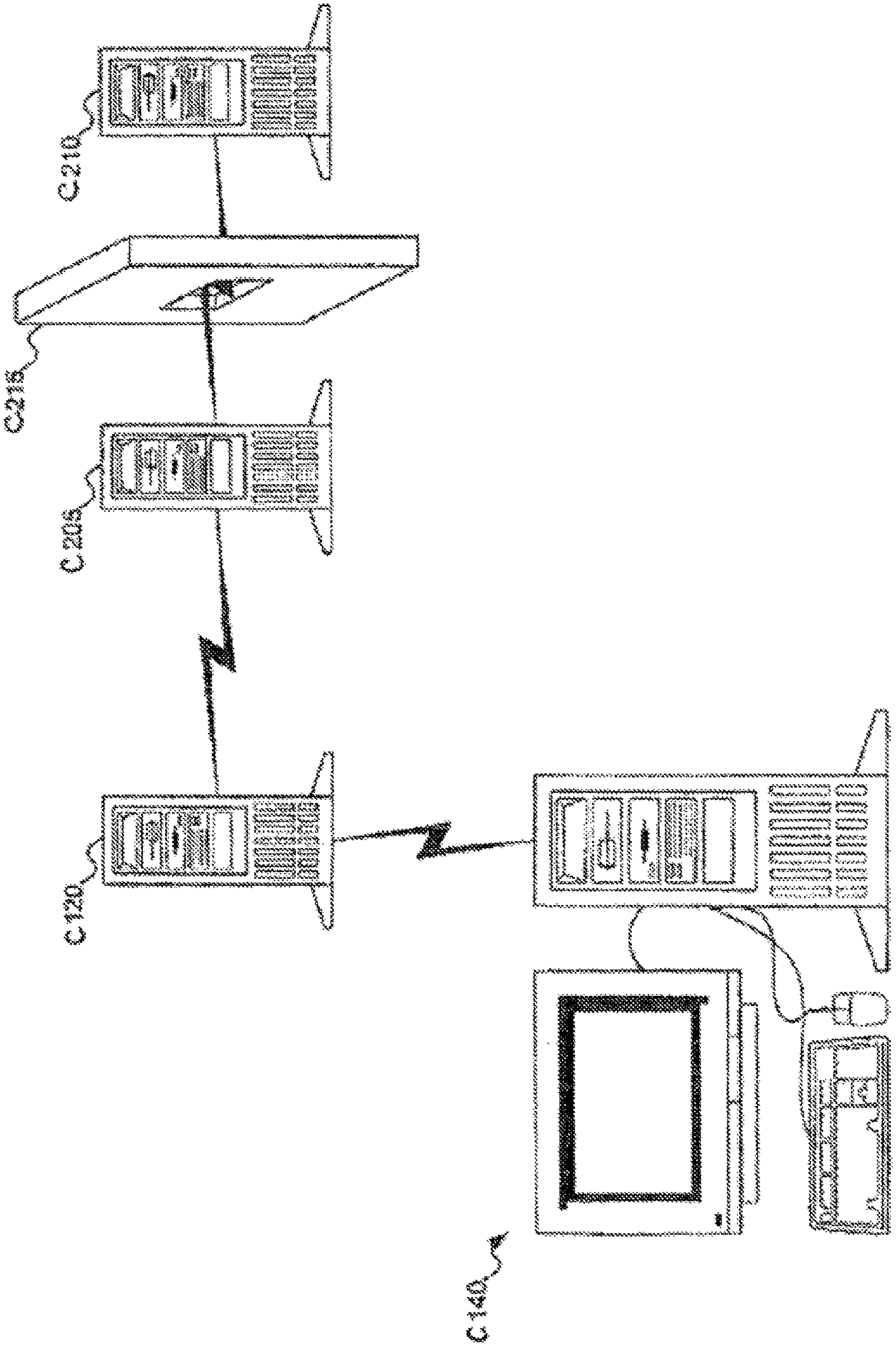
FIG. 5 shows a player communicating through the server of the casino of FIG. 4A, according to some embodiments.

Returning to FIG. 4A, as the player plays in-house at casino C105, playing for example slot machine C110 or blackjack table C115, information about the player's activity is tracked. Similarly, as the player plays on-line at web site C125, playing for example slot machine game C130 or blackjack game C135, information about the player's activity is tracked. In some embodiments, the combined data is stored offsite in a secure server (as shown in FIG. 5 below). In a second embodiment the combined data is stored in server C120. Regardless of where the data is stored, the combined data gives the casino more information about the player that it might otherwise have had.

Although FIGS. 4A and 4B only show a single casino, a person skilled in the art will recognize that various embodiments may include multiple casino properties. For example, a single web site can track on-line gaming activity for players registered with more than one casino property. In addition, a single casino can have more than one web site (hosted on one or more servers, all of which can be distinct from server C120), with player tracking data being reported to server C120. A person skilled in the art will recognize other possible variations.

FIG. 5 shows a player communicating through the server of the casino of FIG. 4A, according to some embodiments. In FIG. 5, computer system 140 is shown communicating with server C120. Server C120, in turn communicates with ASP server C205, which in turn communicates with secure server C210 behind firewall C215. Secure server C210 can be used to store sensitive data: for example, a player tracking data storing data about a player's activities and his personal information, among other possibilities.

ASP server C205 is responsible for managing secure communications between server C120 and secure server C210. In a preferred embodiment, server C120 sends eXtensible Markup Language (XML) requests to ASP server C205, which is the only device permitted to access secure server C210 behind firewall C215. But a person skilled in the art will recognize that server C120 can communicate with ASP server C205 other than by using XML. By having secure server C210 communicate with ASP server C205 rather than secure server C210, sensitive data can be kept secure on secure server C210 but still accessible from outside firewall C210 if the request is transmitted in the correct manner. ASP server C205 can then communicate with secure server C210 to obtain the response to the requests, which can be securely transmitted back to server C120, preferably using XML. Server C120 can then transform the XML response into HyperText Markup Language (HTML) using an eXtensible Stylesheet Language (XSL) Transformation (XSLT). The resulting HTML can then be displayed to the player on computer system C140.

Communication between server C120 and ASP server C205 may be encrypted. Any encryption scheme can be used: the Secure Sockets Layer (SSL) encryption protocol used on the Internet is a standard that can be applied to encrypt the communication. Similarly, communication between ASP server C205 and secure server C210 is preferably encrypted.

As an example of how the communications scheme of FIG. 5 can be used, consider the situation in which the player wants to update his personal information. (In this example, encrypted communications are not described, but a person skilled in the art will recognize how to introduce encrypted communications into the example.) Since personal information is sensitive (the player would not want it publicly available), the data would be stored on secure server C210, behind firewall C215. So, using server C120 the player can request to view his player data. (It is assumed at this point that the player has identified himself to the system.) The browser request made of server C120 is translated into an XML request of ASP server C205, which is forwarded to secure server C210. Secure server C210 responds with the personal information, which is formed into XML and forwarded to server C120. Server C120 uses XSLT to transform the XML data into an HTML page, which can then be presented to the user. Using a form, the player can update his personal data. XML form data can then be posted to ASP server C205, which can update the database on secure server C210. ASP server C205 sends an XML confirmation message back to server C120, which again uses XSLT to transform the XML confirmation message into HTML, which can be presented to the user.

Registering a Player

Figure 6:
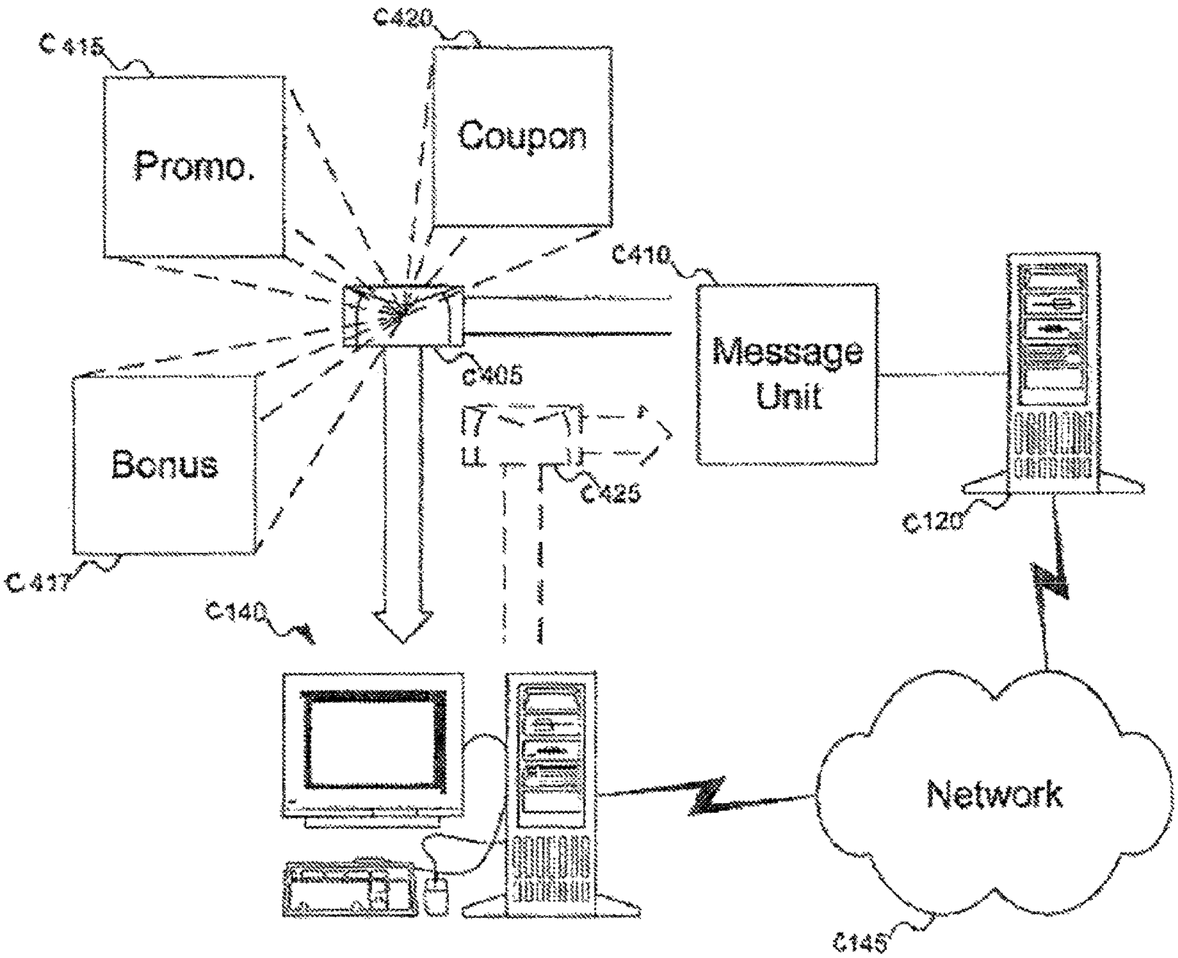
FIG. 6 shows the casino of FIG. 4A delivering a benefit to the player, according to some embodiments.
Figure 7:
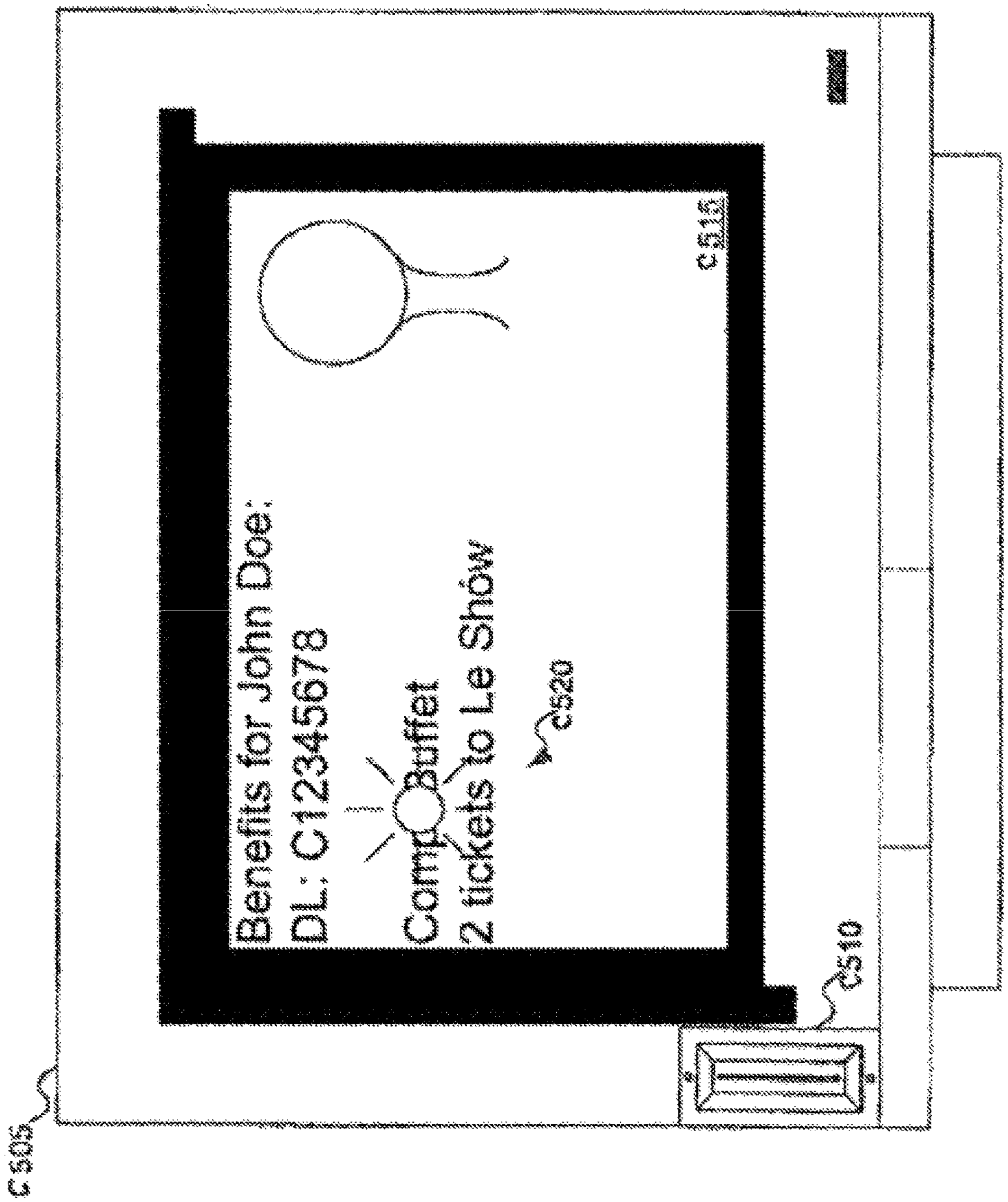
FIG. 7 shows a display used by the casino of FIG. 4A to verify electronically that a player is entitled to a benefit, according to some embodiments.

In some embodiments, before a player can receive a benefit according to FIGS. 6 and 7, the player may be required to register with the casino. The most traditional way for a player to register with the system is to have the player come into the casino to register. A casino employee enters player data (either from a form prepared by the player or live as the player provides the data) into a computer and gives the player a player card. Then, when the player uses the player card at any gaming device, the system can track the player's activity. The player card can also have a number imprinted on it that is unique to that player card: the player can then use that number to identify himself for on-line gaming.

Instead of having players come to the casino in person to register an account, there are other ways in which players can be registered with the system. For example, the player can fill out an electronic form over the Internet. The player can then be mailed the player card, and/or can be issued electronically an identification number that can be used for on-line gaming.

Other ways can also be used to register the player. For example, software exists that allows the Internet Protocol (IP) address of a computer to be located geographically. Using such software, a player can be located without having to type any information. When the player first sets up his account, the system can determine the player's location based on his IP address. But IP addresses identify computers, not persons: it is not possible to determine who is using the computer from the IP address. Further, if IP addresses are dynamically assigned, they do not even uniquely identify a computer.

Instead of assigning the player an identification number, an existing ID for the player can be used. For example, each state assigns persons in the state a unique driver's license number. The combination of the issuing state and the ID number can uniquely identify a player. The player can input this information to the system, and the system can forward the information to a third party database. The third party database can then return information about the player. The combination of issuing state and ID number can be used both to obtain information about a player for registration purposes (in setting up the player's account) and for identification purposes (for using the account).

In various embodiments, a combination of methods is used to register a player. First, the IP address of the computer is checked to determine the player's location. Then the player is prompted for his ID number and issuing agency. The ID number and issuing agency are forwarded to the third party database, both to verify the player's location as determined by IP address and to obtain player demographic information. If the player's location is verified, the account is registered using the player's IP address, ID number, and issuing agency. But if the player's location is not verified, then the player is requested to telephone the casino or come in personally and have a casino employee register the player's account.

Setting Player Preferences

Various embodiments provide a gaming machine that may be customized according to one or more player preferences. A player may view and modify player preferences stored in a player preference account as preference account information. The preference account information may include but is not limited to loyalty point account information, loyalty point account settings, promotional opportunities, preferred games, preferred game features for the preferred games, preferred gaming machine settings, preferred bonus games, preferred service options and preferred progressive games. The preference account information may be stored in a plurality of preference accounts on a preference account server. Using a preference account interface which may be compatible with a web-browser, a player may be able to view and modify preference account information stored on the preference account server from a number of remote devices such as a gaming machine, a home computer, a hotel room video interface, and a casino kiosk.

Collusion Detection

It will be appreciated that the game of poker is a mixed game, combining elements of both chance and skill or strategy. It is known for two or more players in a poker game to co-ordinate their respective playing strategies in order to gain an advantage over the remaining players in the game, thereby destroying the fairness of the game.

Some embodiments will be described with particular reference to a system for detecting and controlling collusion in a game of poker. However, this application is not to be construed as limiting, in various embodiments.

Figure 8:
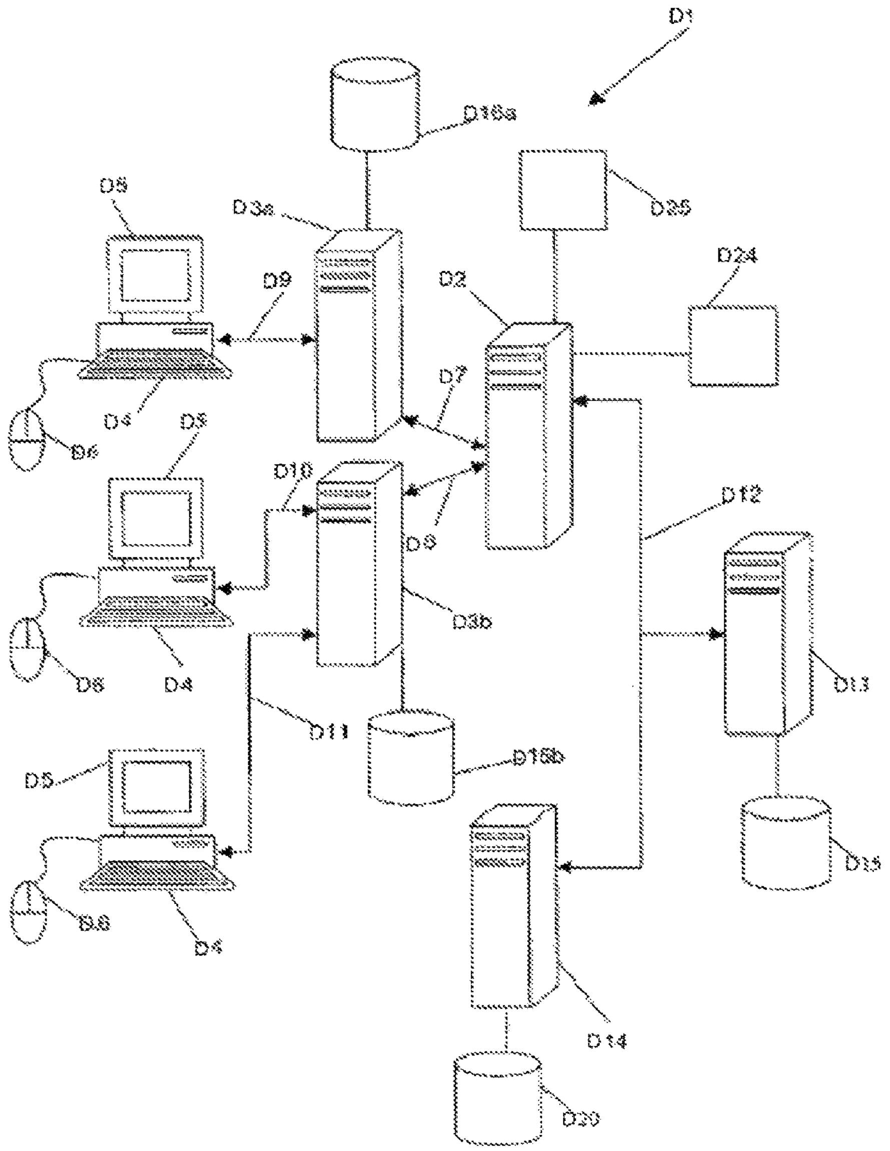
FIG. 8 shows a system for detecting and controlling collusion in a game, according to some embodiments.

Referring to FIG. 8, a system for detecting and controlling collusion in a game of poker is indicted generally by reference numeral (D1). The system (D1) includes a gaming server (D2) and a number of portals (D3*a*, D3*b*) in the form of websites on the World Wide Web of the Internet. In this embodiment, each one of the portal websites is an online casino website hosted on a corresponding casino web server (not shown). For convenience, various embodiments will be described with particular reference to only two such online casino websites (D3*a*, D3*b*). Each one of the casino websites (D3*a*, D3*b*) is accessible by one or more would-be poker players (not shown). Each would-be poker player accesses a casino website by means of a corresponding Internet-enabled computer workstation having a display (D5) and an associated pointing device (D6), such as a mouse, a touchpad and/or any other device. In this embodiment, casino website (D3*a*) is shown as having one computer workstation (D4) logically connected thereto, whereas casino website (D3*b*) is shown as being logically connected to two such computer workstations. It will be appreciated by those skilled in the art that such online casino websites (D3*a*, D3*b*) can be logically connected to any number of computer workstations (D4) simultaneously, which number is physically limited only by considerations of processing power and Internet access bandwidth.

The system (D1) includes, further, an administration facility (D13) in the form of an application web server, which is communicable with the gaming server (D2) along a communication channel (D12). The detailed operation of the application web server (D13) will be outlined in the description that follows. The system (D1) also includes a collusion detection server (D14) that is communicable with the gaming server (D2) along the communication channel (D12).

The gaming server (D2), the online casino web servers (not shown) corresponding to the online casino websites (D3*a*, D3*b*), the computer workstations (D4), the application web server (D13) and the collusion detection server (D14) are capable of communicating with each other by means of an open communication channel that is, in this embodiment, the Internet. Although the Internet is a single packet-switched communication network, it is represented in FIG. 8, for convenience, as separate logical communication channels (D7, D8, D9, D10, D11 and D12).

The application web server (D13) maintains a clearing account facility (D15) that has a clearing account corresponding to each one of the casino websites (D3*a*, D3*b*). Analogously, each online casino web server (D3*a*, D3*b*) includes a corresponding credit account facility (D16*a*, D16*b*) with a credit account corresponding to each player who participates in the game of poker through one of the computer workstations (D4). In the illustrated embodiment, the credit account facility (D16*a*) therefore has one player account associated with it, while credit account facility (D16*b*) has two associated player credit accounts.

The gaming server (D2) operates under control of a stored program capable of enabling a predetermined maximum number, say 8, of players to participate in an instance of the game of poker. When the number of players reaches this predetermined maximum number, the stored program causes a further instance of the game to be initiated, the new instance also being capable of accommodating a further 8 players. In addition, the stored program initiates different instances of the game for each one of a number of different levels of play that are, in this embodiment, $1/$2, $2/$4, $5/$10, $10/$20, $20/$40, fixed limit games over $20/$40, and pot limit games. In this manner the gaming server is capable, under stored program control, of spawning as many separate instances of the game as required in order to accommodate the requirement of a pool of players who desire to play the game at different levels of play, in groups of a maximum of 8. Each instance of the game spawned in this manner is treated as totally independent of the other instances.

The online casino websites (D3*a*, D3*b*) enable a player desiring to join the game to request, by means of one of the computer workstations (D4), participation in the game and, once admitted to a particular instance of the game, to place a wager on a turn of that instance. Each participating player is presented with an identical graphical user interface (GUI) on the display (D5) of his respective computer workstation (D4) by the stored program in the gaming server (D2). The GUI presents to the player a suitable display of a poker game (not shown) with appropriate icons that enable the player to make his own desired game play decisions and to monitor the progress of the game by viewing the game play decisions of the other participating players in the same instance of the game.

Figure 9:
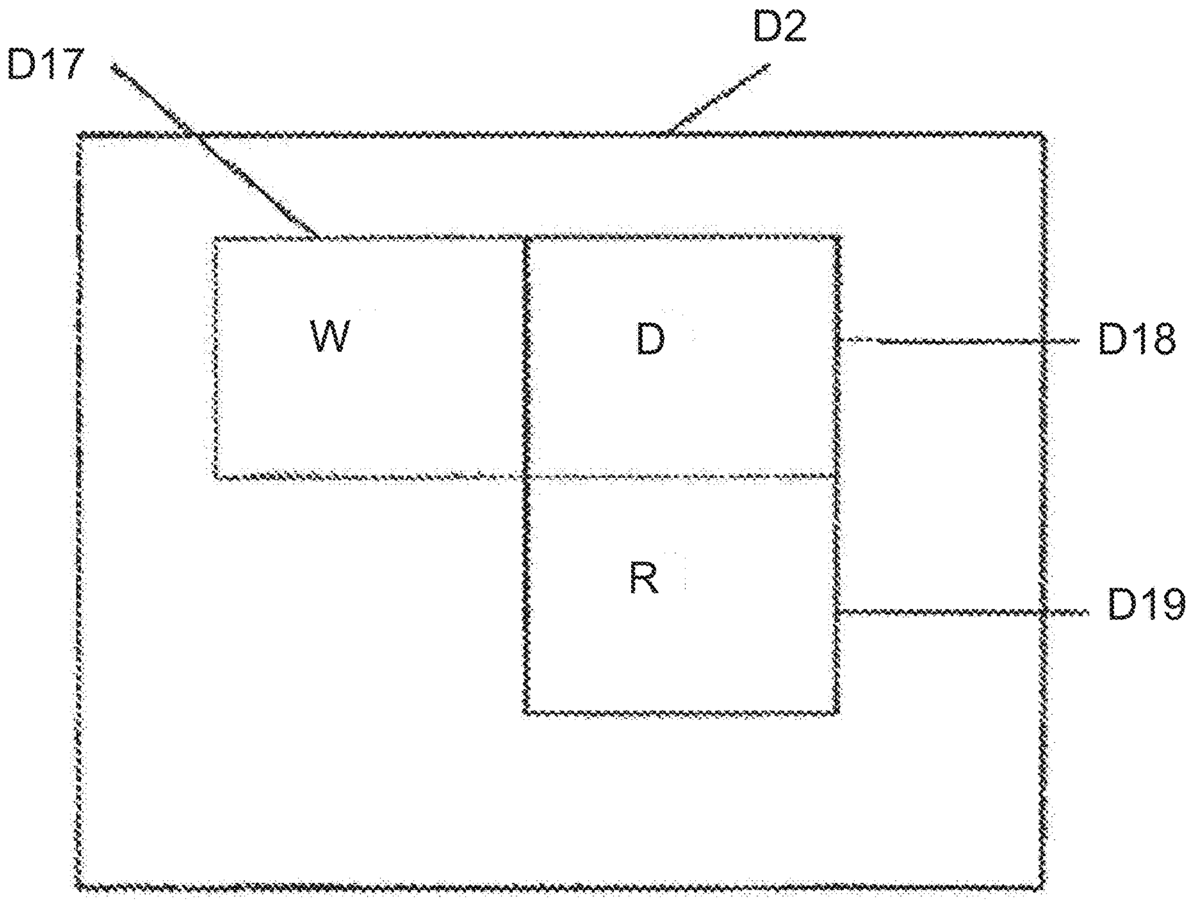
FIG. 9 is a functional representation of a stored software program of the application web server of FIG. 8, according to some embodiments.

As shown in FIG. 9, the stored program also provides a wagering means (D17) operable by any participating player to place a wager on a turn of the game, as well as a discrimination means (D18) capable of determining whether any wager placed by any one of the participating players on the turn of the instance of the game of poker is successful or unsuccessful. The stored program in the gaming server (D2) also maintains a dynamic register (D19) of all players admitted to, and actively participating in, all the spawned instances of the poker from time to time, together with data representative of a corresponding portal (D3*a*, D3*b*) through which each participating player accessed the game. The dynamic register (D19) also contains data representative of an instance of the game in which the player is participating. The application web server (D13) also settles the wagers of the participating players after completion of every turn of all instances of the game.

In use, a player wishing to participate in the game of poker uses a computer workstation (D4) to access an online casino website (D3*a*, D3*b*) of his choice. The player is presented with an icon (not shown) on the GUI on his computer workstation (D4), which the user can activate in order to request participation in the poker game at a desired level of play. The user's request for participation is passed by the online casino website (D3*a*, D3*b*) to the gaming server (D2), which may adjudicate and process the request in the following manner 1 if all existing instances of the poker game at the desired level of play are currently being played by 8 players, the existing instances of the game are all fully occupied and the would-be player cannot be admitted. The user is notified of the situation and is prompted to join a waiting list of would-be players; 2. if any one of the existing instances of the poker game at the desired level of play does have a vacancy, the would-be player is removed from the waiting list and admitted to that instance of the game and an appropriate GUI is presented to the newly-admitted player to allow him to play the game and to place wagers thereon; 3. the register of active participating players is updated to include the details of the newly-admitted player, together with data representative of the online casino website (D3*a* or D3*b*) from which the player was admitted to the game, as well as the particular instance of the game to which he has been admitted; 4. when the waiting list of would-be players at any particular level of play has grown sufficiently large, say 4 or 5, the gaming server spawns a new instance of the game at that level of play to accommodate the would-be players in the waiting list, and the list is flushed; and 5. the register of active participating players is updated to include the details of all the newly-admitted players in the newly-spawned instance of the game, together with data representative of an online casino website (D3*a* or D3*b*) from which the players were admitted to the game, as well as the particular instance of the game to which the players have been admitted.

Any player is able to leave the instance of the poker game in which he is participating at any time upon completion of a turn of that instance of the game. When a participating player leaves an instance of the poker game, the player's departure results in the following actions: 1. the GUI corresponding to the poker game on the computer workstation is replaced by one allowing the player to select another casino game to play; 2. the departing player's details are removed from the register of active participating players; and 3. the remaining instances of the game are analyzed in order to collapse any sparsely populated instances of the game and to consolidate the participating players in these instances into a single more densely-populated instance of the game.

The participating players in any instance of the game utilize the wagering means (D17) to place wagers from time to time on a turn of the poker game and to effect playing decisions required during the progress of the turn, as described above. Once the turn of the game has been completed, the discrimination means (D18) determines which of the players is the winner of the turn and the application web server (D13) settles the wagers placed by the participating players on that turn of the instance of the game, as follows: 1. the gaming server (D2) notifies an online casino website (D3*a*, D3*b*) associated with each player who has made a wager on the turn of the game. Each online casino website (D3*a*, D3*b*) then debits the individual credit account of its associated player by an amount equivalent to the magnitude of that player's wager; 2. the clearing account of an online casino website (D3*a*, D3*b*) associated with each player who has made a wager on the turn of the game is then debited by an amount equivalent to the magnitude of that player's corresponding wager; 3. the clearing account of an online casino website (D3*a*, D3*b*) associated with the player who has made the successful wager on the turn of the game is credited by an amount equivalent to the total of all the wagers inclusive of the successful wager; and 4. the gaming server (D2) also notifies the online casino website (D3*a*, D3*b*) associated with the successful player and that online casino website credits the individual credit account of the successful player by an amount equivalent to the total of all the wagers inclusive of the successful wager.

It is anticipated that the wagers placed by the participating players in the game will be made with credit purchased by such players prior to their participation in the game. For this purpose, each online casino (D3*a*, D3*b*) includes credit-dispensing means (not shown) capable of dispensing credit to any player who wishes to participate in the poker game. The player may purchase credit by means of conventional credit or debit card payment facilities that are well known in the art and that will not be described here in detail. Whenever a player purchases credit from the credit dispensing means, the corresponding online casino (D3*a*, D3*b*) credits that player's credit account with an amount equivalent to the quantity of credit purchased by the player.

In various embodiments, the application server (D13) withholds a portion of the total of all the wagers on each turn of the game as a rake for the benefit of the operator of the gaming server (D2) and the online casino websites (D3*a*, D3*b*). A portion of the rake is credited to the clearing account of each of the online casinos (D3*a*, D3*b*) as a function of the proportion of players participating in the turn of the instance of the game through that particular casino website. In this variation of the embodiment, the clearing account of the casino (D3*a* or D3*b*) associated with the player who has made a successful wager on the turn of the game is credited with an amount equivalent to the total of all the wagers inclusive of the successful wager, less the amount of the rake. Analogously, the credit account of the player who has made the successful wager is credited by an amount equivalent to the total of all the wagers, inclusive of the successful wager, less the rake.

The collusion detection server (D14) maintains a recording means in the form of a collusion detection database (D20), the function of which will be described in greater detail below. The collusion detection server (D14) operates under control of a stored program capable of logging the playing history of each player who participates in an instance of the game of poker at some time. The playing history includes an amount wagered on each turn of the game in which the player has participated, as well as a corresponding outcome of the wager. The outcome of the wager is taken to be a profit made on the wager, if successful, and an amount of the wager that is forfeited by the player if the wager is unsuccessful. In this particular embodiment, the outcome of the successful wager is thus the total of all the wagers by the participating players in the turn of the instance of the game of poker, less the amount wagered by the winning player, less the amount of the rake. The logged information is recorded in the collusion detection database (D20).

Figure 10:
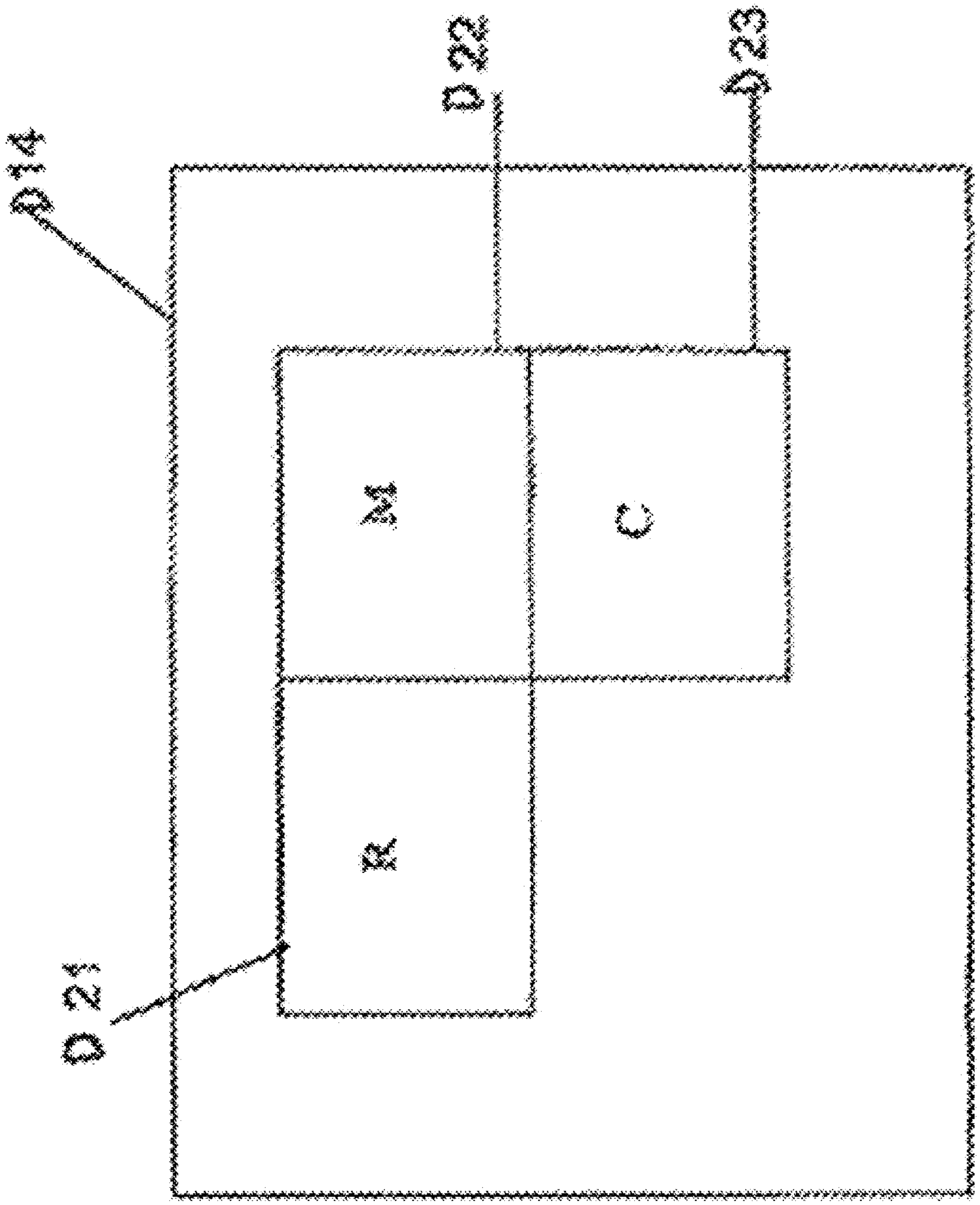
FIG. 10 is a functional representation of a stored software program of the collusion detection server of FIG. 8, according to some embodiments.

As shown in FIG. 10, the stored program in the collusion detection server (D14) provides a ranking facility (D21) that is operable to derive from the logged playing history of each player, a corresponding primary statistic. A player's primary statistic is re-calculated by the ranking facility (D21) each time the player's playing history is updated with the outcome of a further turn of the game in which the player has participated. The derived primary statistic is stored in the collusion detection database (D20). In some implementations, a statistic related to a player's win/loss ratio over a plurality of games played by the player may be calculated. Such information may be determined based on the number of games played, the number of games won, the amount of money won, and so on.

The stored program in the collusion detection server (D14) also provides a monitoring means (D22) for continuously monitoring the primary statistic of any player in the collusion detection database (D20). The monitoring means (D21) generates an output in the form of a flag when the primary statistic of any player changes by more than a predetermined threshold. Such a change indicates a change in that player's pattern of play, and this may serve as an indicator of possible collusion by that player that is worthy of further investigation. In order to minimize the possibility of generating spurious flags, the ranking facility (D21) derives the primary statistic for a player once a playing history exceeding 300 turns of the game has been logged in the collusion detection server (D14). It is anticipated that a particular player's win/loss ratio will differ according to a level at which the game is played, the player being more cautious when playing the game at a high level. For this reason, the ranking facility (D21) computes a primary statistic for each player for each level at which the game may be played. In this instance, the levels of play are: games up to $1/$2, games from $2/$4 to $5/$10, games from $10/$20 to $20/$40, fixed limit games over $20/$40, Pot Limit games, and No Limit games. Thus a primary statistic for a particular level of play will only be derived by the ranking facility (D21) when a playing history of 300 or some other desired threshold turns of the game has been logged for that particular level of play.

The stored program in the collusion detection server (D14) also provides a control facility (D23) that acts on the flag generated by the monitoring means (D21) by suspending the corresponding player from further participation in the game of poker.

The ranking facility (D21) also computes a number of secondary statistics relating to each player. When the primary statistic has a positive value, indicating a winning player, a first secondary statistic is a breakdown of that player's winnings from the other players in the instance of the game. If an inordinate percentage of that player's winnings is derived from one or more other players, the monitoring means (D22) generates a flag. Such a skewed pattern of winnings is a further indicator of possible collusion by the winning player.

A further secondary statistic, which is computed when the primary statistic for a player is negative, indicating a losing player, is a breakdown of that player's losses to the other players in the instance of the game. If an inordinate percentage of that player's losses are made to one or more other players, the monitoring means (D22) generates a flag.

A still further secondary statistic is computed as: raises with/without a Raising Hand=R/RH where: R=total number of raises; and RH=number of raising hands.

Each game play decision by a player to raise a prior wager is analyzed by an analysis facility (D24) connected to the gaming server (D2). The analysis facility (D24) evaluates whether the game play decision was optimal in the light of the cards in the players hand. A ratio close to 1 indicates that the player is raising correctly. A ratio significantly greater than 1 means that the player is raising too often with hands that are not adjudged to be raising hands. This indicates that the player is a poor player, or a colluder, and a flag is raised by the monitoring means (D22).

As a yet further statistic, a player's losses arising from all raises are broken down and analyzed. An inordinately high proportion of losses to one or more other participating players causes the monitoring means (D22) to raise a flag.

It is anticipated that the two previous secondary statistics can be advantageously employed to quickly analyze a new participating player. With a logged playing history of only 20 or 30 turns of the game, these secondary statistics will be accurate enough to enable the monitoring means (D22) to raise a flag, when required.

Sports Betting

Various embodiments provide a system and method for conducting sports and event betting. According to one aspect, the ease of using a network (e.g., the Internet, cellular, and/or other type of network) is combined with sports and event betting at a land-based casino. Thus, sport and other types of event betting are improved, as betting is more convenient to the bettor.

According to one embodiment, a bettor may sign onto a website (e.g., through the Internet and/or other type of network) to place a bet on any sports or other event including professional and college football, soccer, baseball, basketball, auto racing, and ice hockey, as well as cricket, rugby, and various sports tournaments including the NCAA Men's and Women's Basketball Championships and World Cup Soccer. Other events upon which a bet may be placed include any type of event, such as, for example, choosing the winner of a reality television show (e.g., the Survivor reality show), when the first person lands on Mars, or the winner of the next United States Presidential election.

According to one embodiment, a website (e.g., made available through the Internet or other type of network) includes a listing of all the possible bets that may be made. According to another embodiment, the bettor may then select the wagers to be made on-line and register the wagers to be made with the casino. One advantage of this is especially apparent for complicated or multiple selection events that may involve multiple selections of events to occur. For instance, a bet involving the entire NCAA Men's Basketball Championship Tournament which has 63 games, and 64 teams is a complicated bet that may require multiple event selections. In another example, choosing a fantasy league team (e.g. for the National Football League (NFL)) may have as many as 30 team members or positions and as many as 60 choices for each position, further complicating the wagering process. However, such traditional wagers were limited to being placed in the gaming establishment by the bettor. According to one aspect, the bettor is permitted to arrange the bet outside of the gaming establishment, and to make payment for the bet in a legal manner.

According to various embodiments, a bettor may propose a bet for the website operator to consider. According to various embodiments, a registration number is issued by the website operator if the bet is accepted. According to various embodiments, the bettor then proceeds to the land-based casino running the website and pays for the registered bet. According to various embodiments, by permitting the bettor to make the actual payment for the wager at the land-based casino, legal issues with Internet betting in the United States are reduced or eliminated. This method is believed to provide convenience to the bettor because the bettor can determine and place their bet(s) prior to going to the casino. Further, such a method may provide additional foot traffic for the casinos to enhance play of their other games, as bettors are required to travel to the casino to make payment.

Figure 17:
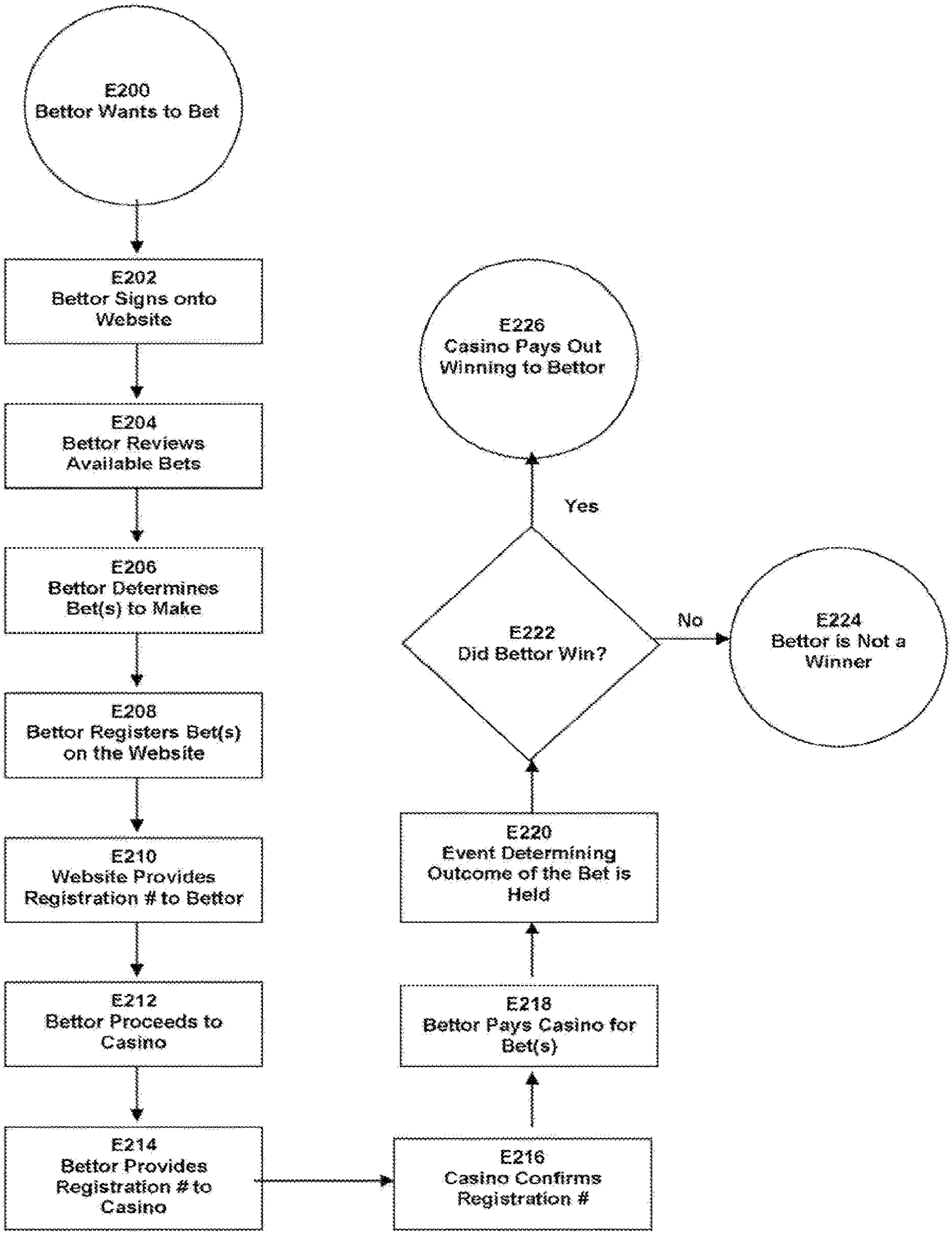
FIG. 17 is a diagram showing a flow chart of a process for placing a sports bet according to some embodiments.

FIG. 17 shows one example process for conducting sports and event betting according to various embodiments. At block E200, process E230 begins with a bettor determining that he or she wants to place a bet on a sports or other event. At block E202, the bettor signs onto a website or other resource accessible through a communication network. In one example system, the player accesses a website that includes an interface (e.g., a graphical user interface (GUI)) in which the player may log onto for security. Further, the player may be permitted to access account information and/or information specific to the bettor. This interface may be used to access the website or Internet, or maybe any other interface (e.g., an interface used to access a download website used for downloading betting software). The interface may be, for example, an HTML, Java, or other type interface.

At block E204, the bettor reviews the available bets on the website. According to some embodiments, the website may list all or some of the possible bets that may be made. The possible bets that may be shown may be determined according to the bettor's account or betting profile (e.g., possible football bets will not be shown to a bettor not interested in football). Available bets may also be shown based on the historical betting behavior of the bettor.

Odds shown for a possible bet may be set or may be variable depending upon when the bet is registered or when the bet is paid for. For example, a bet on the winner of the Major League Baseball World Series may have 6:1 odds after the regular season and before the baseball playoffs start, 1:1 odds just before the World Series starts, and 1:4 odds after the third game of the Series. For this example, the odds of the registered bet may be determined at the time the bet is registered or at the time the bet is paid for. If the odds for a registered bet are determined at the time the bet is registered, the land-based casino may require payment for the registered bet within a specified time period (e.g. one minute, one hour, one day, one week, one month, etc.) and this specified time period may shorten as the sports or other event approaches.

At block E206, the bettor determines the bet(s) to make and at block E208, the bettor registers the bet(s). For instance, the bets may be registered on a website (e.g., through a communication network including the Internet, cellular network, etc.). The bettor may make a bet listed on the website. Alternatively or in addition to the offered bets that are listed, the player may propose a bet not on the website. For instance, in the case where a bet is not listed on the website, the bettor may state the specific event that is being bet on and the bettor or the website operator may determine the odds to be given to the bettor for the bet.

When the website operator accepts the bet, the website may provide a registration, transaction, or confirmation number to the bettor for the bet(s) at block E210. The bettor then proceeds to the land-based casino at block E212 for payment. For instance, the bettor may proceed to a cashier, a kiosk, or other means available for paying for the bet(s) at the casino or other legal gambling jurisdiction. At block E214, the bettor provides the bet registration number to the casino, the casino confirms the registration number at block E216. At block E218, the bettor pays the casino for the bet(s), and the bettor may obtain a betting slip showing the bet(s) placed and the odds on the bet(s).

At block E220, the event is held that determines the outcome of the bet and the casino determines if the bettor is a winner at block E222. If the bettor is a winner, the casino then pays out the winnings to the bettor at block E226. To receive the winnings, a bettor may be required to return to the casino.

At block E220, it is possible that the bettor may need to make more picks on the same bet. For example, a bettor may need to make more picks for second and other additional rounds of a multiple round tournament based upon the previous round's results. Such a tournament may include, for example, the FIFA World Cup in soccer or the NCAA Men's Basketball Championship. In such a tournament, it is possible that a bettor may need to make all picks for all rounds before placing the bet.

When paying for a registered bet, a bettor may pay, for instance, using money, loyalty points, combination thereof, or any other payment method. In particular, a bettor may pay using money by debit card, credit card, check, cash or from an account credit either with the gaming operator or an affiliated organization. Alternatively or in addition to other payment methods, a bettor may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The bettor may pay in person (e.g., by using a cashier) or by other methods within the casino including telephone, handheld device, or kiosk. Payment may be in any form that is legal in the particular jurisdiction.

The computer system or game operator may automatically determine when a bettor is a winner. Such a result may be automatically authenticated and verified by the computer system. In this instance, the computer system may then notify the bettor that he or she has won and what the winnings are. Notification of winning to a bettor may occur by mail, e-mail, computer web or network, telephone, television, pager, fax, kiosk, or any other method.

After a winner is authenticated and verified, the computer system may then notify all bettors of the win. Additionally, the computer system may display the winning bet, the bettor's identity, or the payout.

A bettor may also be able to replay or review past bets using an audio-enabled or video-enabled device. For instance, a kiosk, telephone having a display, television, computer, or handheld device may be used to view past bets. By accessing a selected bet in the computer system, a game player may be able to see the event outcome, the bet odds, and the payout.

In one embodiment, a computer system may be used to operate most acts of the betting operation, including taking, registering, and paying out bets. For instance, computer system(s) used to perform betting functions according to one embodiment may include single or multiple computer systems, one or more of which may include a supercomputer, a minicomputer, a mainframe computer, or a personal computer. A computer system used to run-the betting operation may also include any combination of computer system types that cooperate to accomplish system-level tasks. Multiple computer systems may also be used to run one or more betting operations. The computer system also may include input or output devices, displays, or storage units to facilitate the betting operation. It should be appreciated that any computer system or systems may be used, and various embodiments are not limited to any number, type, or configuration of computer systems.

Figure 13:
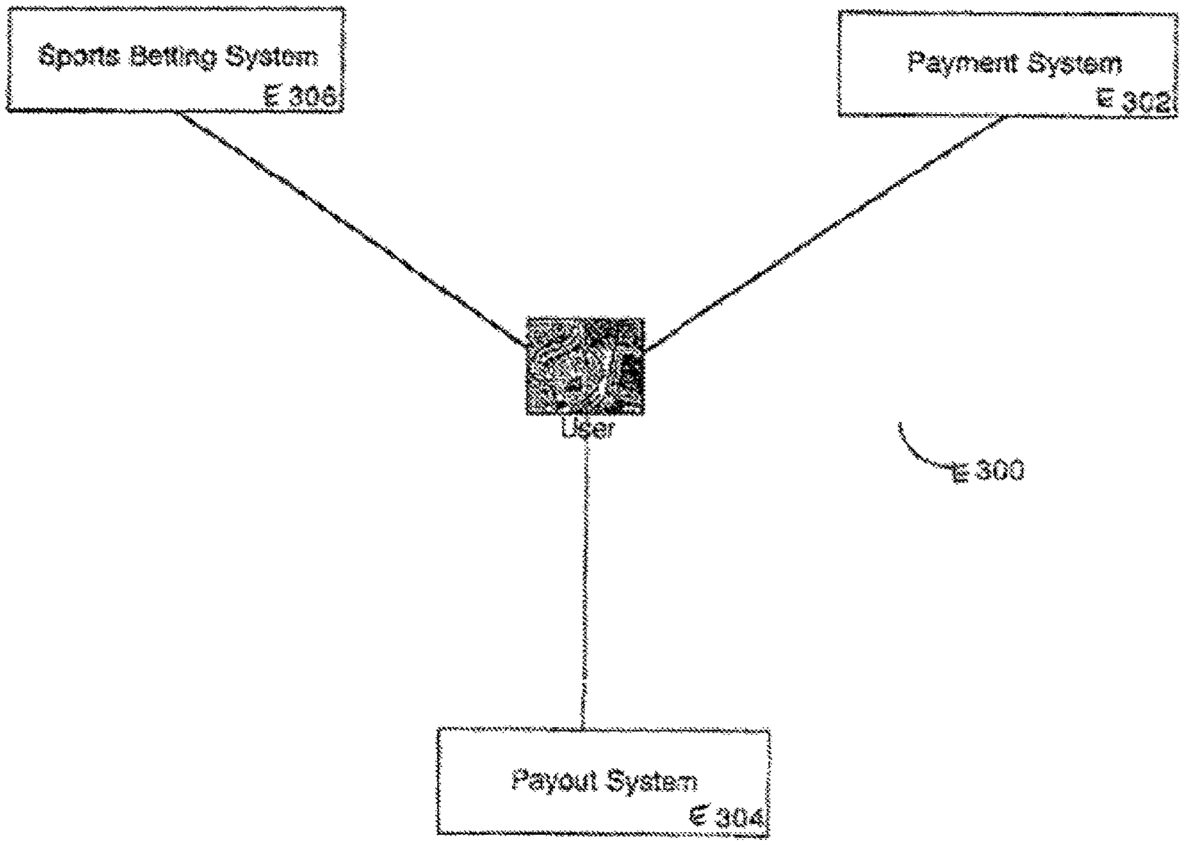
FIG. 13 is a diagram showing components of the sports betting computer according to some embodiments.
Figure 14:
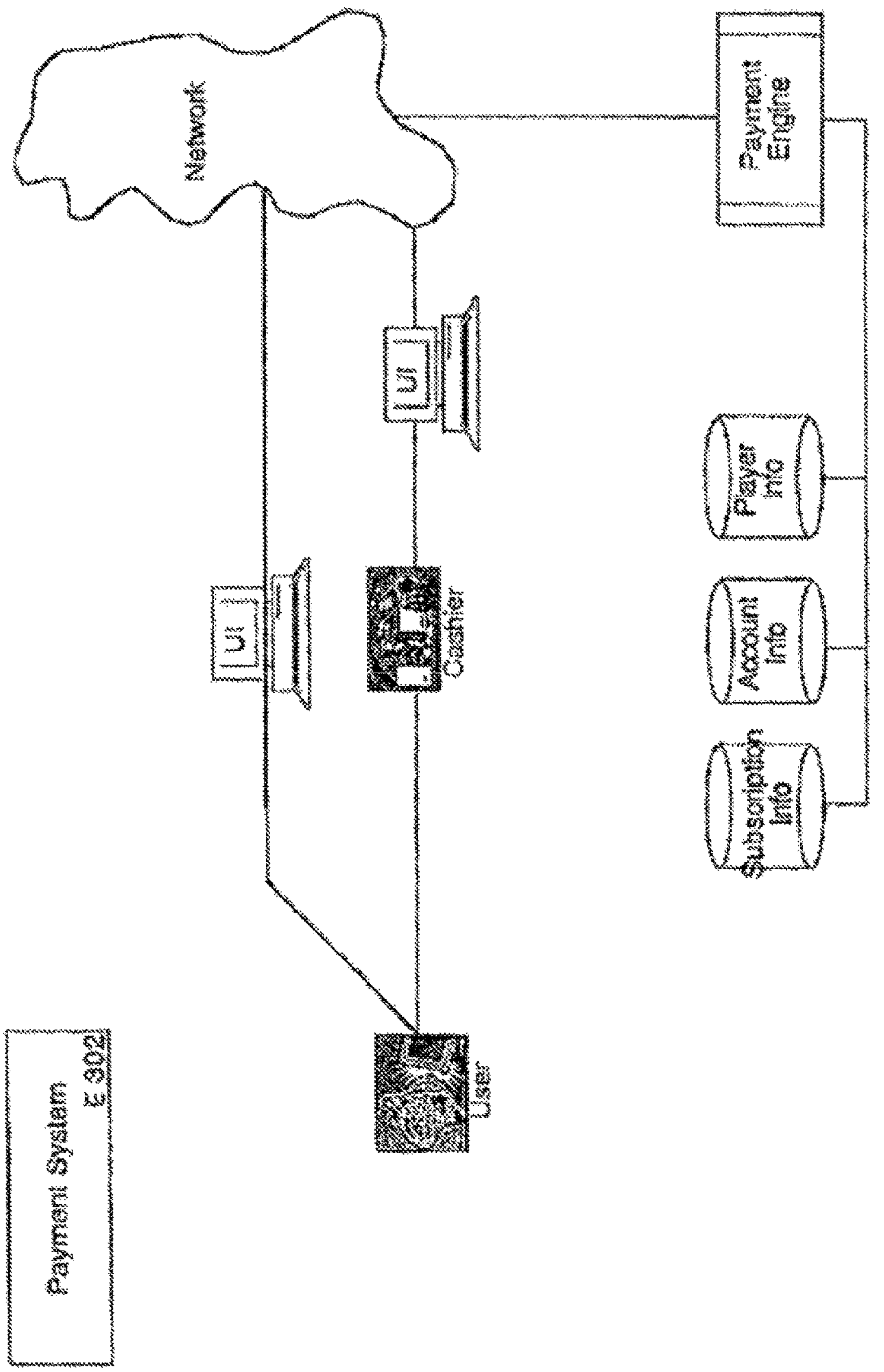
FIG. 14 is a diagram showing components of a payment subsystem according to some embodiments.

A computer system (e.g., system E300) that executes the betting operation according to various embodiments may include, for example, one or more component systems (e.g., systems E302, E304, and/or E306 as shown in FIG. 13). One system component (e.g., payment system E302) may handle payment by bettors. Another system component (e.g., sports betting system E306) may handle taking and registering bets for one or more events, including sporting event. Yet another system (e.g., payout system E304) may handle making payouts to players. Such a betting system may also be connected (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A payment component (e.g., system E302) may include one or more of a number of well-known systems. For example, a bettor may be able to pay for a bet through a casino cashier, kiosk or other means that is connected to the payment computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Examples of UIs that may be implemented with various embodiments include a graphical user interface (GUI), a display screen, a mouse, a keyboard, a keypad, a track ball, a microphone (e.g., to be used in conjunction with a voice recognition system), a speaker, a touch screen (e.g., the Microsoft surface), a game controller (e.g., a joystick) etc., and any combinations thereof. Input may include gestural input (e.g., movement of a mouse, a gesture on a touch screen, body movement, etc.), operation of controls (e.g., buttons, levers, etc.), audio input, etc.

Bettor information may also be entered into a payment system component. Bettor information that may be input includes name, address, telephone number and age, and payment information may include a credit or debit card number or loyalty account information. Based upon the payment information, the call center representative may verify that the payment information is valid and that enough credit or funds is available for the player's bet(s).

Various pay systems and one or more user interfaces may be located on computer systems coupled by a network with the computer system(s) storing data having bettor, account, and subscription information. As used herein, a "network" or a "communications network" is a group of two or more devices interconnected by one or more segments of transmission media or active communications equipment on which communications may be exchanged between the devices.

The above examples are merely illustrative embodiments of a payment system component. It should be appreciated that such an illustrative embodiment is not intended to be limiting in scope, as any of numerous other implementations of the pay system, for example, variations for on-site casino payment, are possible and are intended to fall within the scope of various embodiments. For example, the payment system may include using pay-per-view systems associated with interactive television in a casino hotel or the pay engine may additionally deliver a receipt to the player by either e-mail or mail. None of the claims set forth below are intended to be limited to any particular implementation of a pay system unless such claim includes a limitation explicitly reciting a particular implementation.

Figure 15:
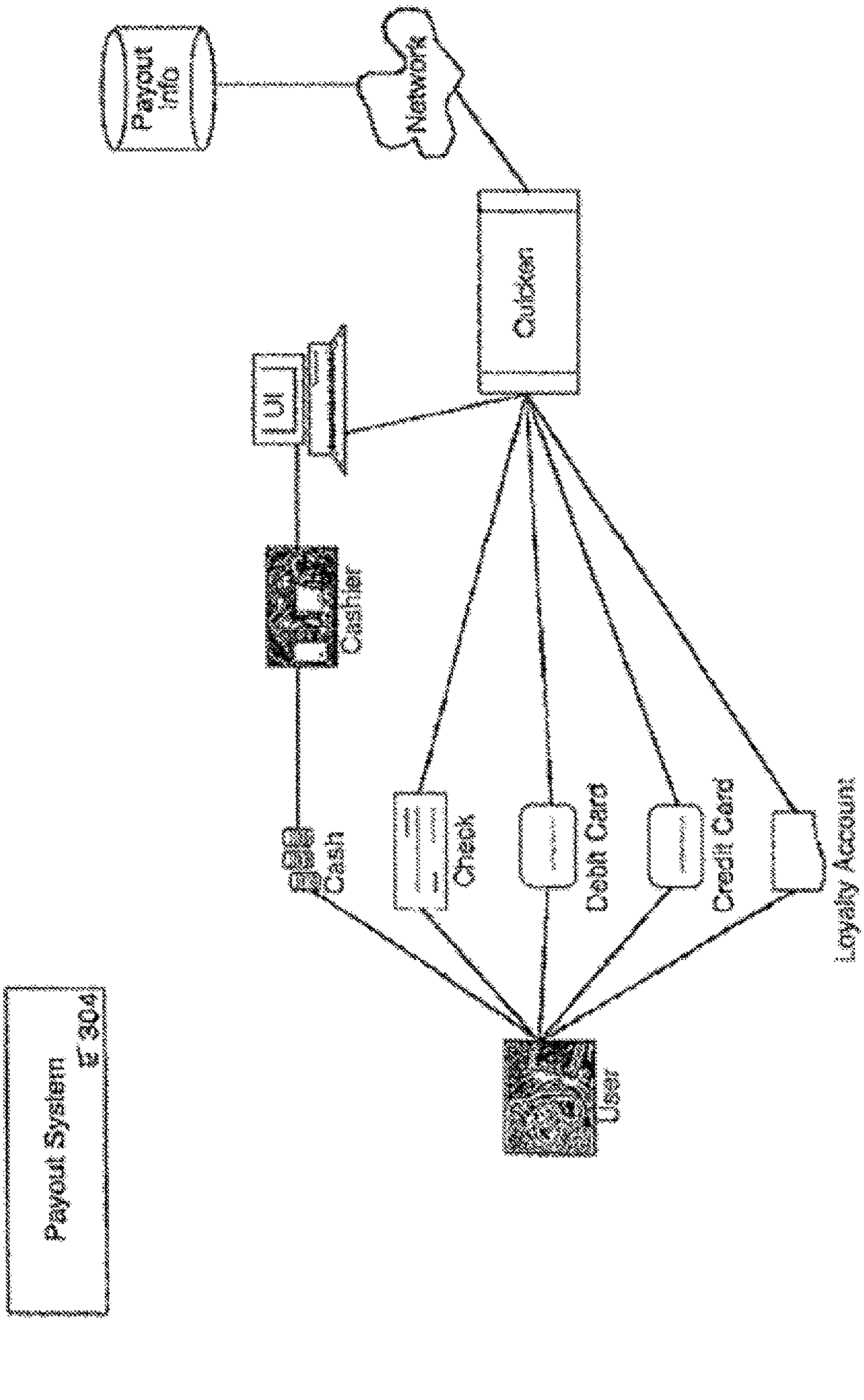
FIG. 15 is a diagram showing components of a payout subsystem according to some embodiments.

Payout systems (e.g., system E304) are also well known. Any of a number of standard systems or payout engines for making payouts for winning may be used according to various embodiments as shown in FIG. 15. For example, a standard application programming interface such as 'Quicken' (available commercially from Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to be limiting in scope, as any of numerous other implementations of the payout system, for example, variations of online payout, are possible and are intended to fall within the scope of various embodiments. Additionally, a cashier may also have access to payout information using a user interface to the payout data structure through a network; the cashier then makes a payment to the winning player based upon the accessed information.

Figure 16:
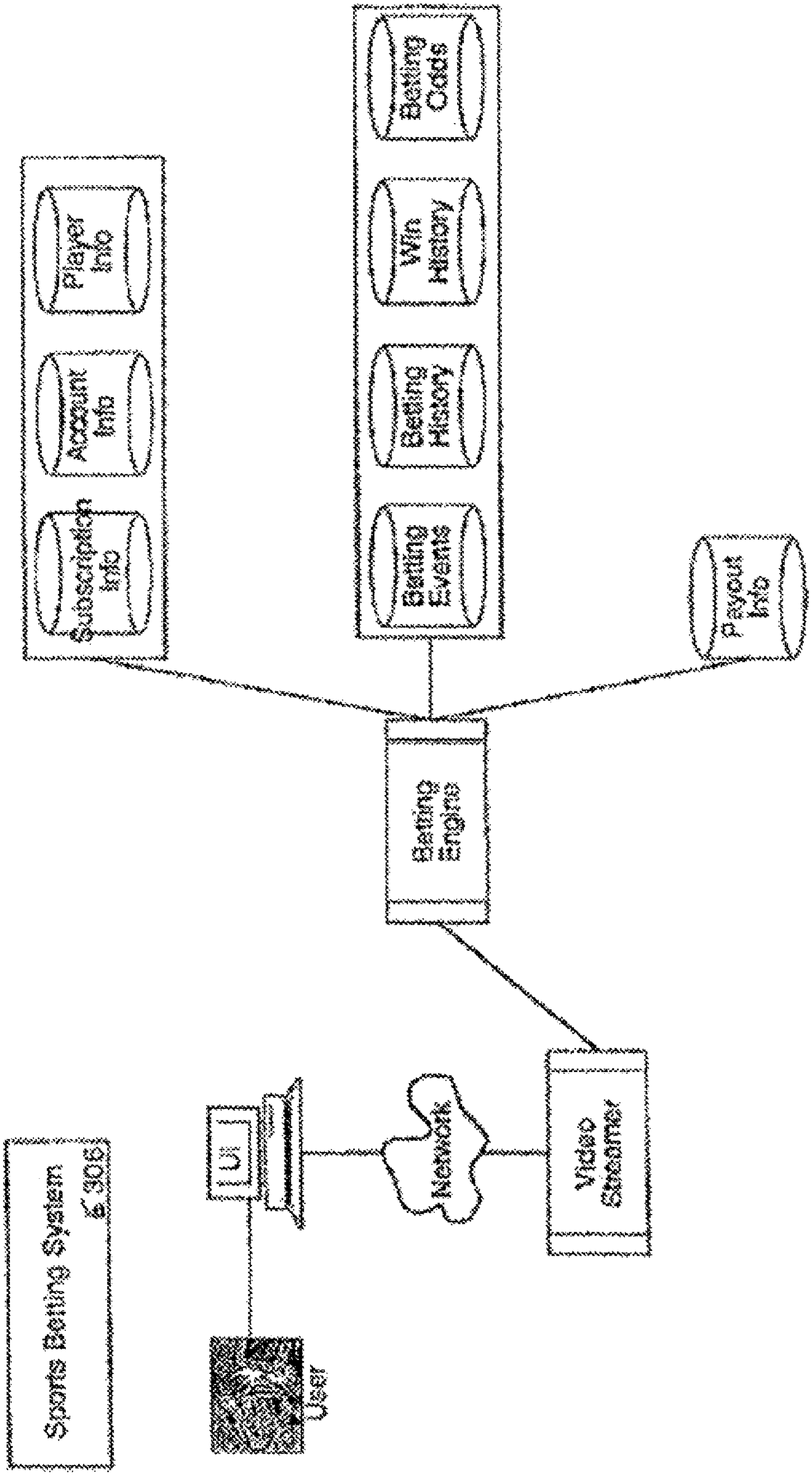
FIG. 16 is a diagram showing components of a sports betting subsystem according to some embodiments.

A sports and event betting system (e.g., system E306 as shown in FIG. 16) according to various embodiments may comprise of a number of components for performing specific functions. These components may include, for example, storage means that store data structures having information relating to betting events and odds. For example, such information may include event date, time, and location, bettor's betting and win history, and event odds and their dependence upon time of payment. A sports and event betting system may also include components to access payment and payout data structures.

The sports and event betting system may also include a betting engine. A betting engine may perform, for example, some functions according to process E230 shown in FIG. 17 and described above. It should be appreciated that the betting process E230 may include more or less acts as shown in FIG. 17, and that various embodiments are not limited to any particular number of order of acts (e.g., the order illustrated in FIG. 17) as the acts may be performed in other orders, may include additional acts and one or more of the acts of process E230 may be performed in series or in parallel to one or more other acts, or parts thereof. For example, blocks E214 and E218, or parts thereof, may be performed together, and act E216 may be performed at any point after block E214 (including after block E218) of process E230.

Process E230 is merely an illustrative embodiment of a method for performing sports or event betting. Such an illustrative embodiment is not intended to be limiting in scope, as any of numerous other implementations for performing sports or event betting may be employed. None of the claims set forth below are intended to be limited to any particular implementation of a method of sports or event betting, unless such claim includes a limitation explicitly reciting a particular implementation.

Process E230, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above and may be distributed across one or more of such components.

The computer-readable medium may be transportable such that the instructions stored thereon can be loaded onto any computer system resource to implement the various embodiments discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects.

It should be appreciated that any single component or collection of multiple components of a computer system, for example, the computer system described below in relation to FIG. 11, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the event betting system may include a software component (e.g., a driver) that streams video via a broadband, satellite, or wireless medium to a user interface. If the game is played completely automatically, the user interface may be merely a video terminal including television with no user input means. Viewing access may be controlled by standard methods for conditional access including using set top box addresses, telephone numbers or internet protocol (IP) addresses.

The above is merely an illustrative embodiment of a sports and event betting system. Such an illustrative embodiment is not intended to be limiting in scope, as any of numerous other implementations of a sports and event betting system, for example, variations of conditional access, are possible and are intended to fall within the scope of various embodiments. None of the claims set forth below are intended to be limited to any particular implementation of a sports and event betting system unless such claim includes a limitation explicitly reciting a particular implementation.

System E300, and components thereof such as the payment, payout, and betting engines, may be implemented using software (e.g., C, C#, C++, Java, or a combination thereof), hardware (e.g., one or more application-specific integrated circuits, processors, or other hardware), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of E300, each of the components may reside in one or more locations on the system. For example, different portions of the components of E300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System E300 may be implemented on a computer system described below in relation to FIGS. 11 and 12.

System E300 is merely an illustrative embodiment of the game system. Such an illustrative embodiment is not intended to be limiting in scope, as any of numerous other implementations of the sports and event betting system, for example, variations of system E300, are possible and are intended to fall within the scope of various embodiments. For example, interactive television may also be used to view the available bets. None of the claims set forth below are intended to be limited to any particular implementation of the betting system unless such claim includes a limitation explicitly reciting a particular implementation.

Various embodiments may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments. Further, the software design system may be located on a single computer or may be distributed among a plurality of computers attached by a communications network.

Figure 11:
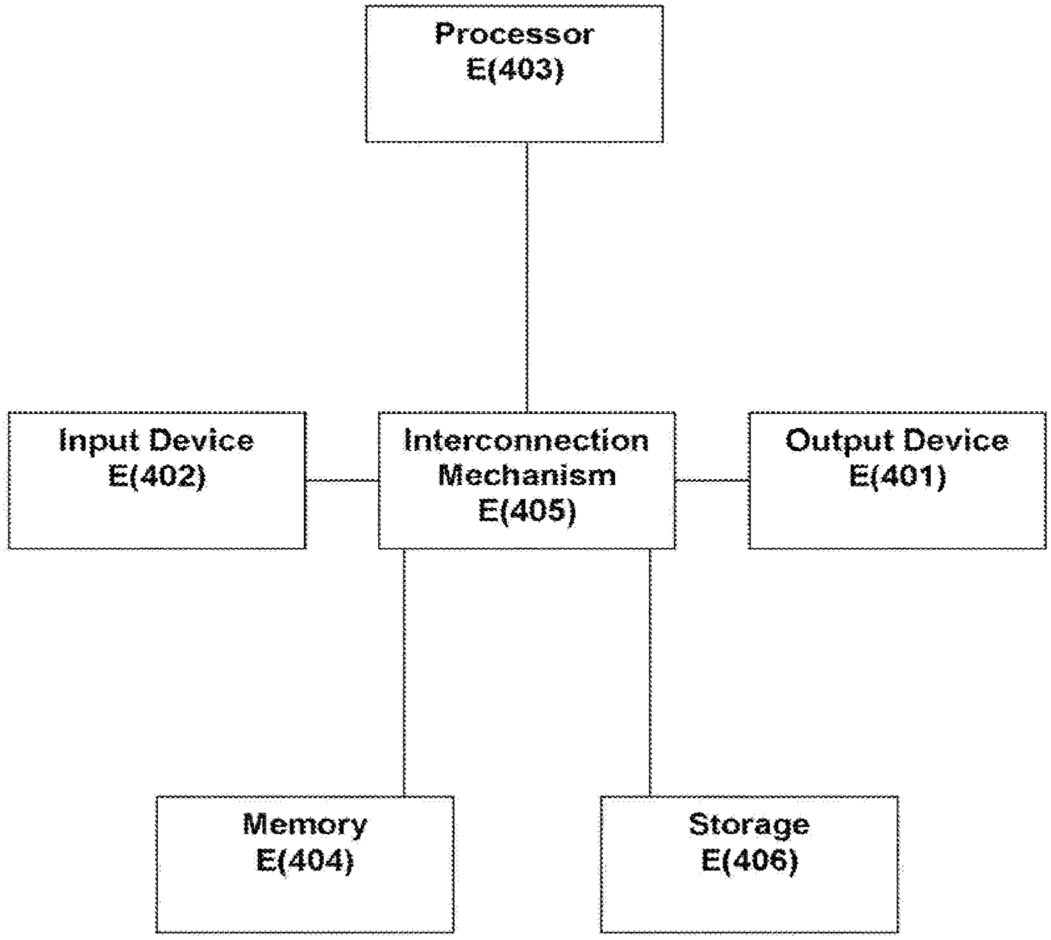
FIG. 11 is a block diagram of a general-purpose computer system upon which various embodiments may be implemented.

For example, various embodiments may be implemented as specialized software executing in a general-purpose computer system E400 such as that shown in FIG. 11. The computer system E400 may include a processor E403 connected to one or more memory devices E404, such as a disk drive, memory, or other device for storing data. Memory E404 is typically used for storing programs and data during operation of the computer system E400. Components of computer system E400 may be coupled by an interconnection mechanism E405, which may include one or more busses (e.g., between components that are integrated within a same machine) and/or a network (e.g., between components that reside on separate discrete machines). The interconnection mechanism E405 enables communications (e.g., data, instructions) to be exchanged between system components of system E400. Computer system E400 also includes one or more input devices E402, for example, a keyboard, mouse, trackball, microphone, touch screen, and one or more output devices E401, for example, a printing device, display screen, or speaker. In addition, computer system E400 may contain one or more interfaces (not shown) that connect computer system E400 to a communication network (in addition or as an alternative to the interconnection mechanism E405.

Figure 12:
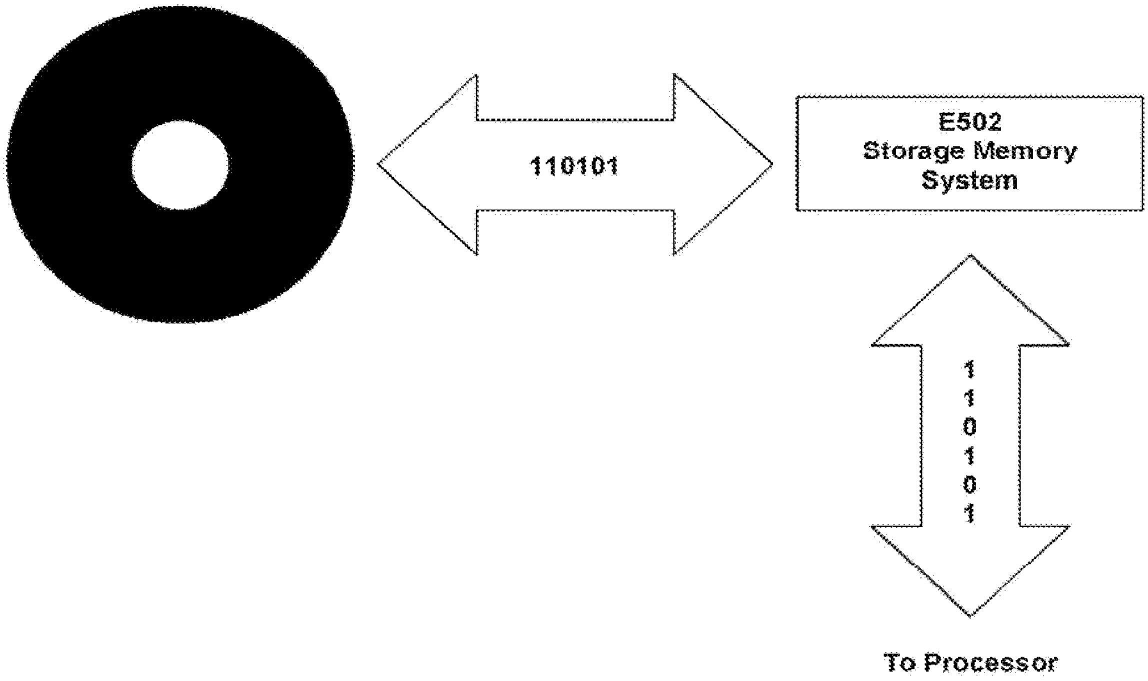
FIG. 12 is a block diagram of a computer data storage system with which various embodiments may be practiced.

The storage system E406, shown in greater detail in FIG. 12, typically includes a computer readable and writeable nonvolatile recording medium E501 in which signals are stored that define a program to be executed by the processor or information stored on or in the medium E501 to be processed by the program. The medium may, for example, be a disk or flash memory. Typically, in operation, the processor causes data to be read from the nonvolatile recording medium E501 into another memory E502 that allows for faster access to the information by the processor than does the medium E501. This memory E502 is typically a volatile, random access memory such as a dynamic random access memory (DRAM) or static memory (SRAM). It may be located in storage system 406, as shown, or in memory system E404, not shown. The processor E403 generally manipulates the data within the integrated circuit memory E404, E502 and then copies the data to the medium E501 after processing is completed. A variety of mechanisms are known for managing data movement between the medium E501 and the integrated circuit memory element E404, E502. Various embodiments are not limited to a particular memory system E404 or storage system E406.

The computer system may include specially-programmed, special-purpose hardware, for example, an application-specific integrated circuit (ASIC). Various features or aspects may be implemented in software, hardware or firmware, or any combination thereof. Further, such methods, acts, systems, system elements and components thereof may be implemented as part of the computer system described above or as an independent component.

Although computer system E400 is shown by way of example as one type of computer system upon which various embodiments may be practiced, it should be appreciated that embodiments are not limited to being implemented on the computer system as shown in FIG. 11. Various embodiments may be practiced on one or more computers having a different architecture or components that are shown in FIG. 11.

Computer system E400 may be a general-purpose computer system that is programmable using a high-level computer programming language. Computer system E400 may be also implemented using specially programmed, special purpose hardware. In computer system E400, processor E403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that various embodiments not limited to a particular computer system platform, processor, operating system, or network. Also, it should be apparent to those skilled in the art that various embodiments are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments may be distributed among one or more computer systems configured to provide a service (e.g., servers) to one or more client computers, or to perform an overall task as part of a distributed system. For example, various embodiments may be performed on a client-server system that includes components distributed among one or more server systems that perform various functions according to various embodiments. These components may be executable, intermediate (e.g., IL) or interpreted (e.g., Java) codes which communicate over a communication network (e.g., the Internet) using a communication protocol (e.g., TCP/IP).

It should be appreciated that various embodiments are not limited to executing on any particular system or group of systems. Also, it should be appreciated that various embodiments are not limited to any particular distributed architecture, network, or communication protocol. Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various embodiments may be implemented in a non-programmed environment (e.g., documents created in HTML, XML, or other format that, when viewed in a window of a browser program, render aspects of a graphical-user interface (GUI), or perform other functions). Various embodiments may be implemented as programmed or non-programmed elements, or any combination thereof.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the various embodiments. In particular, although many of the examples presented herein involve specific combinations of method acts or system elements, it should be understood that those acts and those elements may be combined in other ways to accomplish the same objectives.

Verifying to the Player that Events were Random

Various embodiments may provide a means for verifying the integrity and authenticity of a sequence of random events used in an online casino game.

Various embodiments may provide a method of using a pre-generated sequence of random events to play an online casino game.

Various embodiments may provide a method of sending a pre-generated sequence of random events to a user in an encrypted and/or digested form so that the user cannot forecast the sequence of random events in the online casino game.

Various embodiments may provide a method for providing the user with an encryption key and the original random events sequence at the end of a game session to decrypt and verify the pre-generated random events sequence by comparing the stored random events sequence with the original random events sequence and thereby authenticate the random events sequence used in the online casino game.

Various embodiments may provide a method of sending a pre-generated sequence of random events to a user so that the user may reassemble the random events after a game session is completed.

Various embodiments provide a method of authenticating a pre-generated random events sequence in an online casino game. In a preferred embodiment, a user establishes communication with an online casino to request a game session. The user requests a game to play on the online casino from a list of available games such as blackjack, roulette, craps, etc. Once the user completes the selection of the game, the online casino receives the request and initiates the game session. For each game, there is a certain number and type of estimated random events that will be required to play the game session to completion or end the game session at the discretion of the user. Each random event represents an action that would occur at a real casino, such as drawing a card or rolling dice. The online casino is equipped with a random number generator which pre-generates an estimated number of random events and places the random events into a random events sequence. The random events sequence is coded into an encrypted sequence and then transmitted to the user who stores the encrypted sequence until a game verification stage. For the step of encoding, the random events sequence may also be converted into a digital digest and transmitted to the user, or first encrypted and then converted into a digital digest and transmitted to the user.

At this stage in the game session, the user cannot interpret the pre-generated encrypted random events sequence the user receives from the online casino, and the online casino does not have to be concerned about the user being able to unfairly forecast the sequence of random events in the future. The user then commences playing the specified game by requesting random events from the online casino. The online casino receives these requests from the user and responds by sending the user the next number drawn sequentially from the pre-generated random events sequence. Events from the random sequence are consumed by the online casino during the game session. The user records all random events received from the online casino. Once the number of random events in the pre-generated sequence have been exhausted or the user indicates an intent to terminate the game session, the online casino communicates a “Game is Over” to the user and the game ends.

The online casino then sends the user an encryption key for game verification to prove the integrity of the game. The encryption key allows the user to decode the encrypted random events sequence that was previously transmitted to the user at the beginning of the game session. The user decodes the encrypted random events sequence, and the decoded random events sequence is compared to the record the user kept of the random events sequence sent by the online casino. If the sequences are identical, then the random events sequence was not altered or tampered with by the online casino during the game session. If the random event sequence recorded by the user and the random events sequence presented by the online casino are different, the verification fails. The user then communicates the failure to the online casino and an appropriate action is taken.

The game session may also be played with more than one user. The online casino may send the same encrypted sequence, which is pre-generated, to each participant allowing them to recompile their individual random events sequences into the original pre-generated random events sequences and compare it with the random events sequences sent by the online casino for verification purposes.

Various embodiments will now be described with reference to FIGS. 18 to 21, which in general disclose a method for ensuring the authenticity and integrity of online games, and more specifically a method of authenticating a pre-generated random events sequence in an online casino game.

Figure 18:
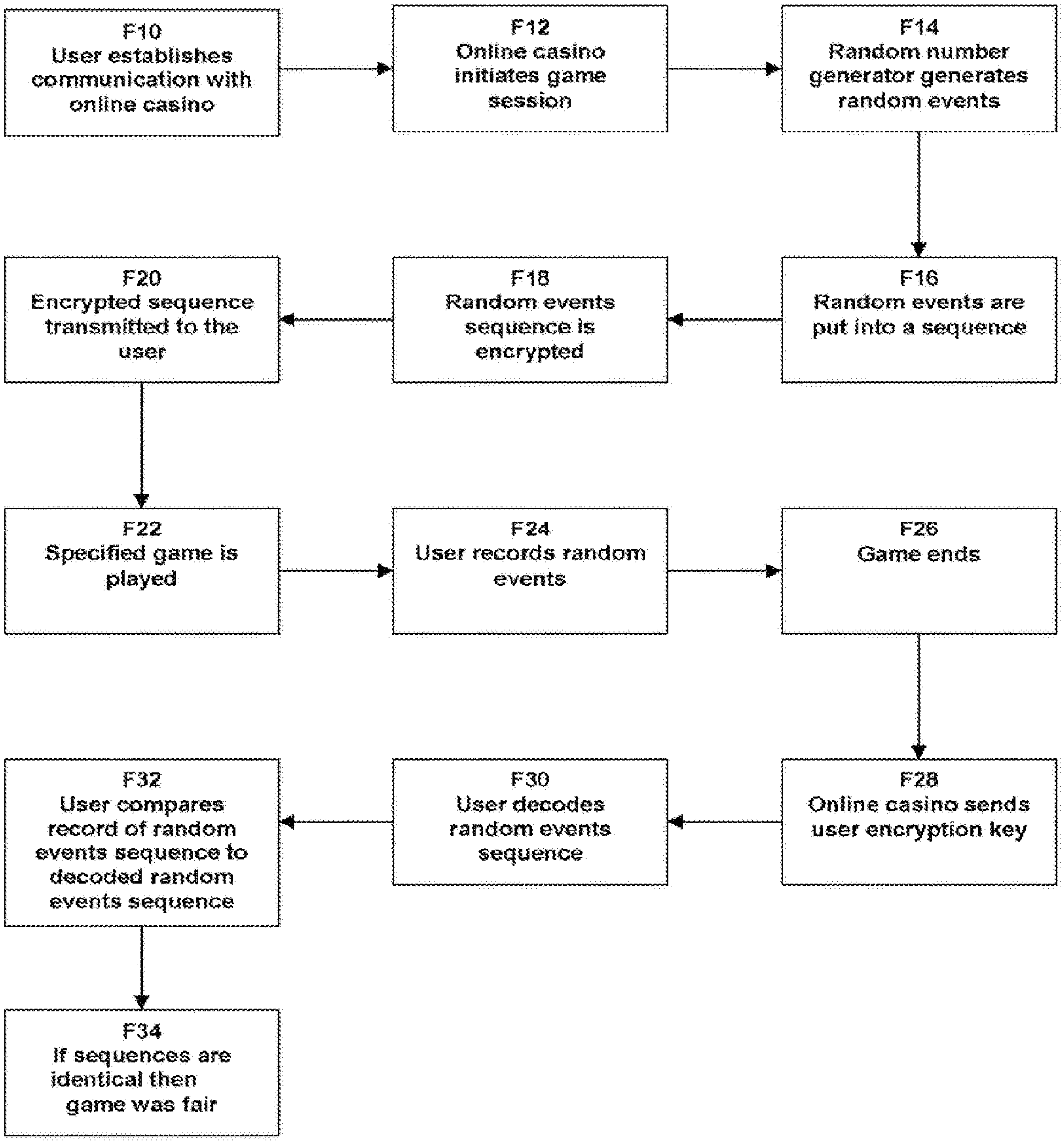
FIG. 18 is a schematic view of a method of authenticating a pre-generated random events sequence in an online casino game, according to various embodiments.

Referring to FIG. 18, in a preferred embodiment, a user establishes communication with an online casino F10 to request a game session which is the equivalent of one game in an actual casino. The user possesses the necessary computer, client game software and any other basic materials and hardware needed to establish communication with the online casino. The online casino may be a single computer acting as a game server or several computers where databases and processors are in different locations. The user requests a game to play on the online casino during the game session by selecting from a list of available games. A list of typical games to play during the game session may include one of the following games: blackjack, roulette, craps, baccarat, slot machine, lottery, sports betting, and poker. It is understood that various embodiments are not limited to these games and may include games not included in the above list.

Once the user completes the selection of the game and communicates the game selected to the online casino, the online casino receives the request and initiates the game session F12. For each game, there is a certain number and type of estimated random events that will be required to play the game session to completion or end the game session at the discretion of the user. Each random event represents an action that would occur at a real casino, such as drawing a card or rolling dice. For example, in the game of blackjack, the type of random events which occur during the game is the action of drawing cards. The number of random events in one game session will typically not exceed 10,000 events. Events from the random sequence are consumed by the online casino during the game session. The online casino is equipped with a random number generator which pre-generates the random events F14.

Figure 19:
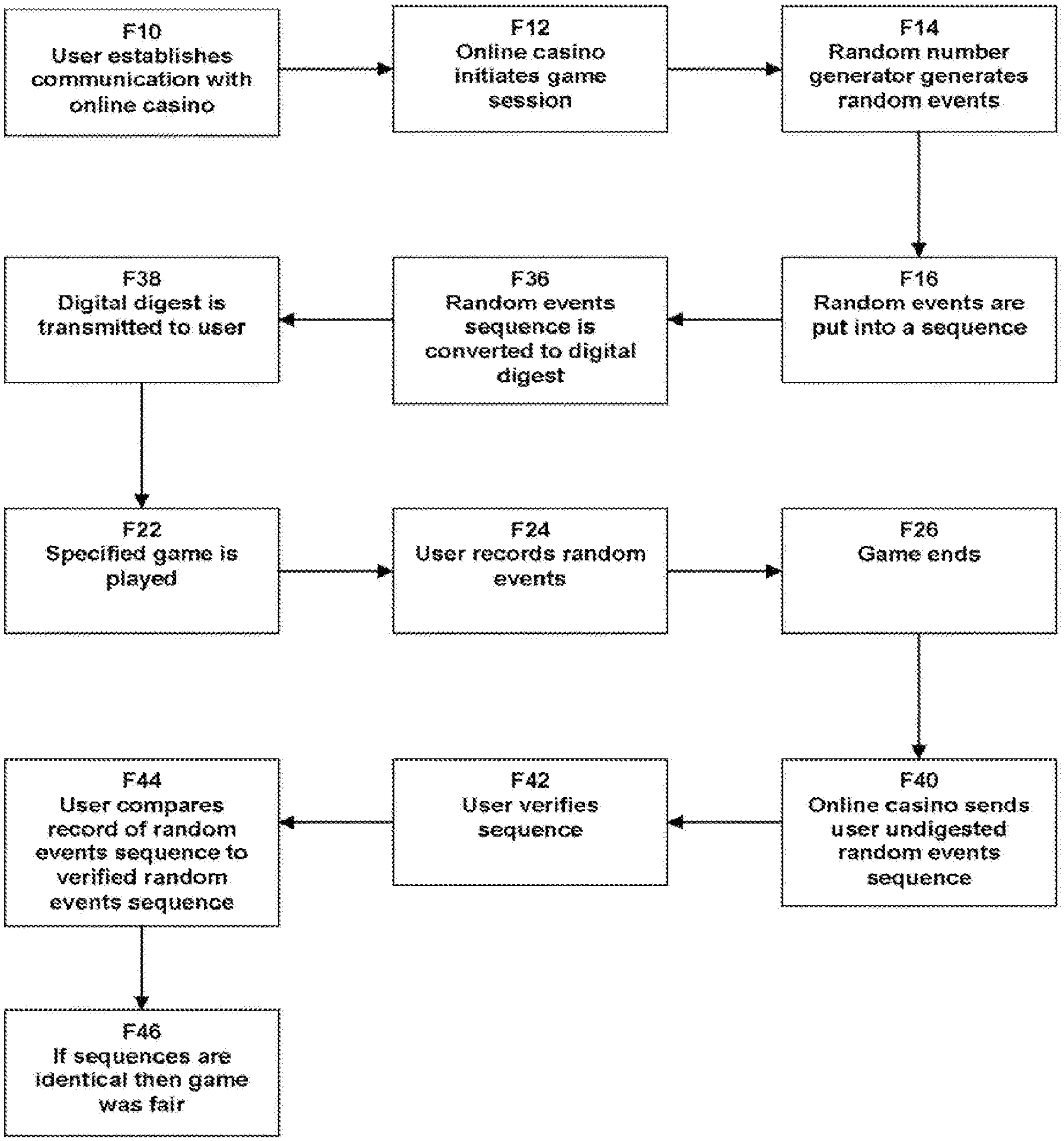
FIG. 19 is a schematic view of a method of authenticating a pre-generated random events sequence which is converted into a digital digest, according to various embodiments.
Figure 20:
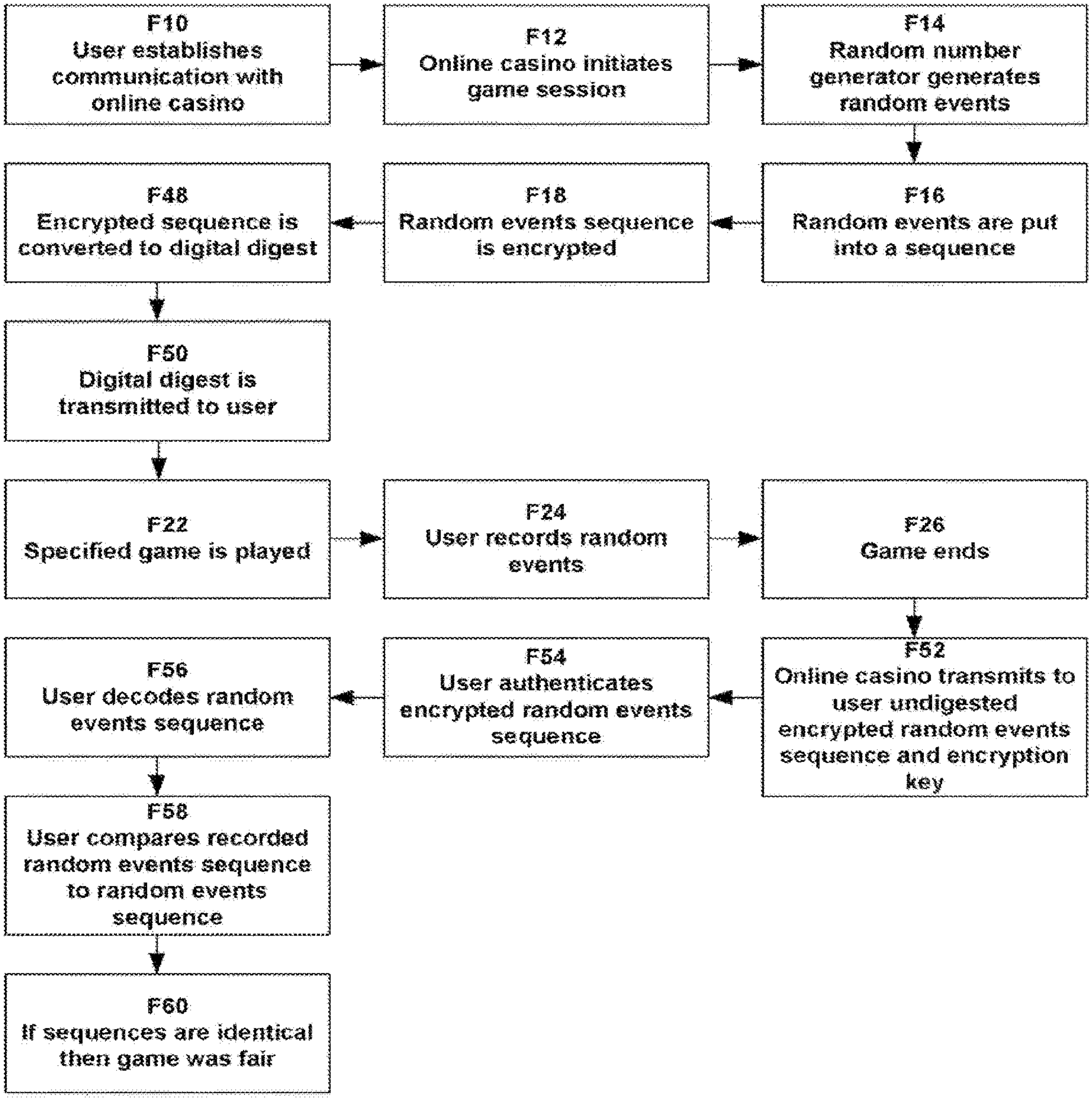
FIG. 20 is a schematic view of a method of authenticating a pre-generated random events sequence which is encrypted and converted into a digital digest, according to various embodiments.

The online casino generates an estimated number of random events and places the random events into a random events sequence F16 which is a set of random events generated for the game session. The random events sequence is coded into an encrypted sequence F18 and then transmitted to the user F20 who stores the encrypted sequence until a game verification stage. The method used to encrypt the random events sequence may be any well-known encryption method used in the art. As shown in FIGS. 19 and 20, respectively, for the step of encoding, the random events sequence may also be converted into a digital digest and transmitted to the user, or first encrypted and then converted into a digital digest and transmitted to the user, as described below.

Referring again to FIG. 18, at this stage in the game session, the user cannot interpret the pre-generated encrypted sequence and the online casino does not have to be concerned about the user unfairly predicting the sequence of random events in the future. The user then commences playing the specified game F22 by requesting random events from the online casino. The online casino receives these requests from the user and responds by sending the user the next number drawn sequentially from the pre-generated random events sequence. The user records all random events F24 received from the online casino. It is understood that the user may record the random events manually, as a function of the client game software or other well know methods for recording. Once the number of random events in the pre-generated sequence have been exhausted or the user indicates an intent to terminate the game session, the online casino communicates a "Game is Over" to the user and the game ends F26.

The online casino then sends the user an encryption key F28 for game verification to prove the integrity of the game. The encryption key allows the user to decode the encrypted random events sequence that was transmitted to the user at the beginning of the game session. The user decodes the encrypted random events sequence F30, and the decoded random events sequence is compared to the record F32 the user kept of the random events sequence sent by the online casino at the commencement of the game session. It is understood that the user may compare the record the random events manually, as a function of the client game software or other well know methods for recording. If the sequences are identical, then the game was fair F34, and the random events sequence was not altered or tampered with during the game session. If the verification fails, the user communicates the failure to the online casino and an appropriate action is taken.

As shown in FIG. 17, the online casino may also encode the pre-generated random events sequence using a digital digest at the encoding step. The online casino converts the random events sequence into the digital digest F36 before transmitting the digital digest to the user F38. The specified game is played F22. The user records the random events F24 during the game session. Once the game ends F26, the online casino sends the user an undigested random events sequence F40. The user then verifies the authenticity of the random events sequence F42 sent by the online casino by converting the undigested random events sequence into the digital digest and comparing this digital digest with the digital digest sent by the casino at the commencement of the game. For the verification to succeed, the two digital digests should be identical. Once the random events sequence sent by the online casino is thus verified, the user proceeds with verifying the random events sequence F44 sent by the online casino during the game session by comparing the verified undigested random events sequence sent by the casino at the end of the game with the random events sequences kept by the user. For the verification to succeed, the two random events sequences must be identical. Similarly, the comparison can be carried out by the user manually or by the client software. If the sequences are identical, then the game was fair F46, and the random events sequence was not altered or tampered with during the game session. If the verification fails, the user communicates the failure to the online casino and an appropriate action is taken.

Referring to FIG. 20, the online casino may also encode the pre-generated random events sequence by first encrypting and then converting the encoded sequence into a digital digest to complete the encoding step. The online casino encrypts the random events sequence and then converts it into the digital digest F48 before transmitting it to the user F50. The specified game is played F22. The user records the random events F24 during the game session. Once the game ends F26, the online casino transmits to the user an undigested random events sequence in its encrypted form. The online casino also transmits to the user an encryption key F52. The user first authenticates the encrypted random events sequence by converting it into a digital digest, and then comparing it to the digital digest F54 sent at the commencement of the game session. The random events sequence is then decoded F56 and compared to the record the user kept of the random events sequence sent by the online casino F58. The user may carry out the comparison manually or by the client game software. For the verification to succeed, the sequences must be identical. If the sequences are identical, then the game was fair F60, and the random events sequence was not altered or tampered with during the game session. If the verification fails, the user communicates the failure to the online casino and an appropriate action is taken.

Using the above method, the user may be confident that the random events sequence was generated without fraudulent action or knowledge of the online casino since the encrypted sequence was pre-generated and sent to the user prior to beginning of the game session, eliminating any chance for the online casino to modify the sequence of events, and thus the game, in response to the user's actions or steps during the game session.

Figure 21:
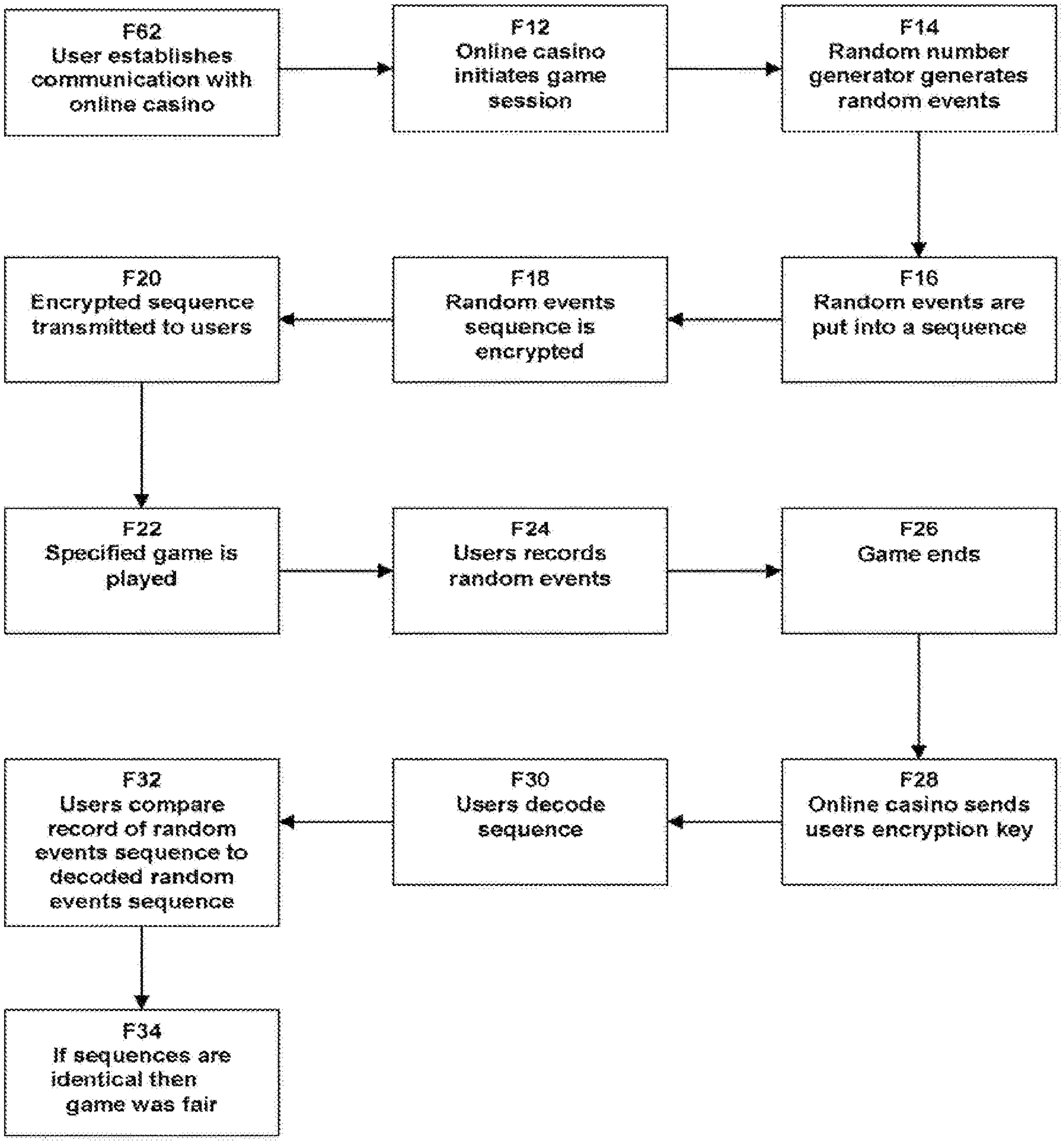
FIG. 21 is a schematic view of a method of authenticating a pre-generated random events sequence in a multiple-player game, according to various embodiments.

Referring to FIG. 21, the game session may be played with more than one user F62. The online casino may send the same encrypted sequence, which is pre-generated, to each participant (i.e. the encrypted sequence represents the same deck of cards). Each user must have access to the sequence of random events received by other users during the game session. At the end of the game session, the users then collectively compare the sequence of random events received to the sequence of random events that the online casino transmitted at the beginning of the game session to ensure that the sequence was not altered.

Although embodiments for ensuring the authenticity and integrity of online games are described above, it is to be understood that the features described may be used with any electronic game or technology requiring authentication of a random events sequence. Thus, the features and embodiments described above are not to be construed as limiting.

Teams

Various embodiments relate to a computerized system that facilitates team play of card gaming. The computerized system includes at least a first computer for use by a first participant associated with a first team; a second computer for use by a second participant associated with a second team; a third computer for use by a third participant associated with the first team; and a fourth computer for use by a fourth participant associated with the second team. A computer network links the first and second computers to each other for allowing the first and second participants to compete against each other for team points in a first set of card gaming. Likewise, the computer network also links the third and fourth computers to each other for allowing the third and fourth participants to compete against each other for team points in a second set of card gaming. A central server computer coupled to the computer network coordinates the first, second, third and fourth computers, and tallies together team points earned by participants of each team to compute an overall team score for each team. Preferably, the central server computer also computes the team points earned individually by each of the first, second, third, and fourth participants. The aforementioned computer network may be in the form of a local area network, assuming that the aforementioned computers are located relatively close to each other, as within a casino. Alternatively, the aforementioned computer network may be the internet in the case wherein one or more of such computers are located remotely from the others.

INCORPORATION BY REFERENCE

The following are hereby incorporated by reference herein:

U.S. Pat. No. 6,375,568;
U.S. Pat. No. 6,575,834;
U.S. Pat. No. 5,800,268;
US patent application publication 20070015587;
U.S. Pat. No. 6,319,125;
U.S. Pat. No. 5,655,961;
US Patent application publication 20060194633;
US patent application publication 20060189381;
US patent application publication 20060172803;
US patent application publication 20060094497; and
US patent application publication 20060089189.

Mobile Games

Reference numerals below, until otherwise specified, refer only to FIG. 22 through FIG. 34.

In various embodiments, a distributed gaming system enables participants to engage in gaming activities from remote and/or mobile locations. The possible gaming activities include gambling, such as that provided by casinos. Gambling activities may include any casino-type gambling activities including, but not limited to, slot machines, video poker, table games (e.g., craps, roulette, blackjack, pai gow poker, Caribbean stud poker, baccarat, etc.), the wheel of fortune game, keno, sports betting, horse racing, dog racing, jai alai, and other gambling activities. The gaming activities can also include wagering on any type of event. Events can include, for example, sporting events, such as horse or auto racing, and athletic competitions such as football, basketball, baseball, golf, etc. Events can also include such things that do not normally involve wagering. Such events may include, without limitation, political elections, entertainment industry awards, and box office performance of movies. Gaming can also include non-wagering games and events. Gaming can also include lotteries or lottery-type activities such as state and interstate lotteries. These can include all forms of number-selection lotteries, "scratch-off" lotteries, and other lottery contests. The gaming system may be implemented over a communications network such as a cellular network or a private wireless and/or wireline network. Examples of the latter include Wi-Fi and WiMAX networks. In some embodiments, the gaming system communications network is entirely independent of the Internet. In some embodiments, the gaming system operation makes minimal use of the Internet, such that only information for which there are no security issues is transmitted via the Internet and/or such that information may be encrypted. In various embodiments, the communications network enables players to participate in gaming from remote locations (e.g., outside of the gaming area of a casino). Also, the system may enable players to be mobile during participation in the gaming activities. In various embodiments, the system has a location verification or determination feature, which is operable to permit or disallow gaming from the remote location depending upon whether or not the location meets one or more criteria. The criterion may be, for example, whether the location is within a pre-defined area in which gaming is permitted by law.

Figure 22:
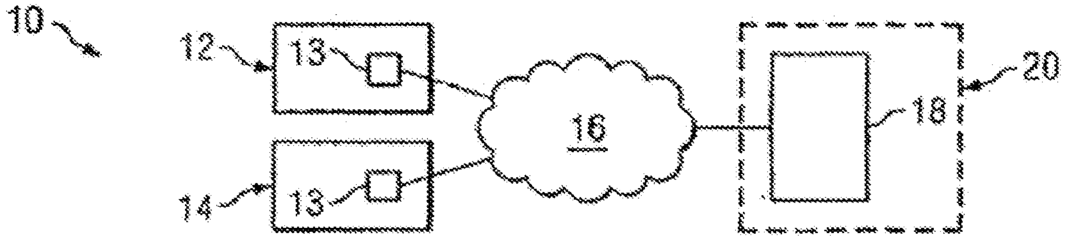
FIG. 22 shows a gaming system according to some embodiments.

As shown in FIG. 22, for example, gaming system 10 may include at least one user 12. The system may include additional users such that there is at least a first user 12 and a second user 14. Multiple users may access a first gaming system 10, while other multiple users access a second gaming system (not shown) in communication with first gaming system 10. Users 12 and 14 may access system 10 by way of a gaming communication device 13. Gaming communication device 13 may comprise any suitable device for transmitting and receiving electronic communications. Examples of such devices include, without limitation, mobile phones, personal data assistants (PDAs), computers, mini-computers, etc. Gaming communication devices 13 transmit and receive gaming information to and from communications network 16. Gaming information is also transmitted between network 16 and a computer 18, such as a server, which may reside within the domain of a gaming service provider 20. The location of computer 18 may be flexible, however, and computer 18 may reside adjacent to or remote from the domain of gaming service provider 20. Various embodiments may not include a gaming service provider. The computer 18 and/or gaming service provider 20 may reside within, adjacent to, or remote from a gaming provider (not shown in FIG. 22). The gaming service provider may be an actual controller of games, such as a casino. As an example, a gaming service provider may be located on the grounds of a casino and the computer 18 may be physically within the geographic boundaries of the gaming service provider. As discussed, however, other possibilities exist for remote location of the computer 18 and the gaming service provider 20. Computer 18 may function as a gaming server. Additional computers (not expressly shown) may function as database management computers and redundant servers, for example.

In various embodiments, software resides on both the gaming communication device 13 and the computer 18. Software resident on gaming communication device 13 may be operable to present information corresponding to gaming activities (including gambling and non-gambling activities discussed herein) to the user. The information may include, without limitation, graphical representations of objects associated with the activities, and presentation of options related to the activities and selectable by the user. The gaming communication device software may also be operable to receive data from the computer and data input by the user. Software resident on the computer may be able to exchange data with the gaming communication device, access additional computers and data storage devices, and perform all of the functions described herein as well as functions common to known electronic gaming systems.

Gaming information transmitted across network 16 may include any information, in any format, which is necessary or desirable in the operation of the gaming experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), Wi-Fi (802.11x), WiMAX (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are also contemplated. Further, it will be understood that additional components may be used in the communication of information between the users and the gaming server. Such additional components may include, without limitation, lines, trunks, antennas, switches, cables, transmitters, receivers, computers, routers, servers, fiber optical transmission equipment, repeaters, amplifiers, etc.

In some embodiments, the communication of gaming information takes place without involvement of the Internet. However, in some embodiments, a portion of the gaming information may be transmitted over the Internet. Also, some or all of the gaming information may be transmitted partially over an Internet communications path. In some embodiments, some information is transmitted entirely or partially over the Internet, but the information is either not gaming information or is gaming information that does not need to be maintained secretly. For instance, data that causes a graphical representation of a table game on the user's gaming communication device might be transmitted at least partially over the Internet, while wagering information transmitted by the user might be transmitted entirely over a non-Internet communications network.

Figure 23:
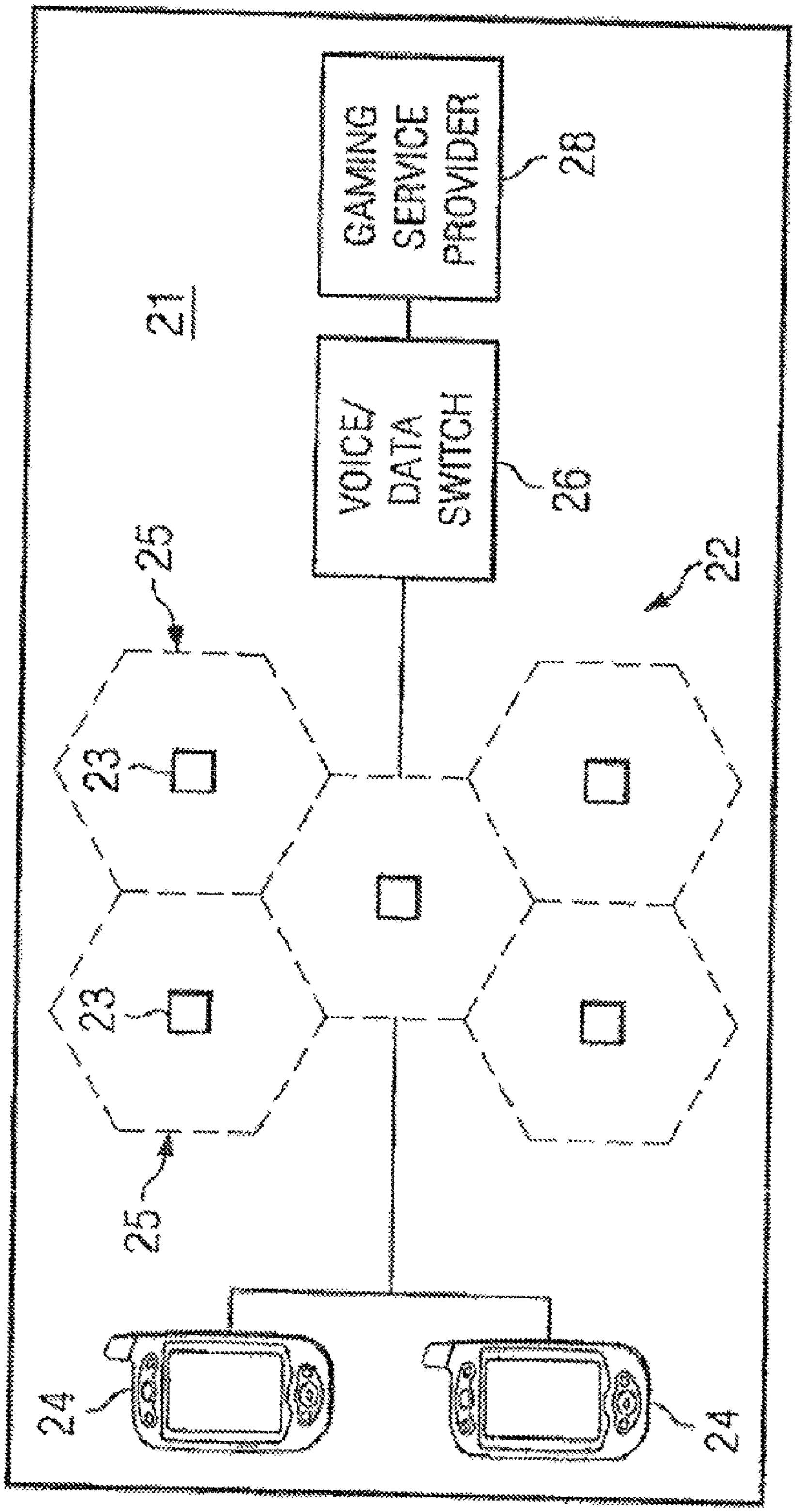
FIG. 23 shows a communications network according to some embodiments.

According to some embodiments, as shown in FIG. 23 for example, the communications network comprises a cellular network 22. Cellular network 22 comprises a plurality of base stations 23, each of which has a corresponding coverage area 25. Base station technology is generally known, and the base stations may be of any type found in a typical cellular network. The base stations may have coverage areas that overlap. Further, the coverage areas may be sectorized or non-sectorized. The network also includes mobile stations 24, which function as the gaming communication devices used by users to access the gaming system and participate in the activities available on the gaming system. Users are connected to the network of base stations via transmission and reception of radio signals. The communications network also includes at least one voice/data switch, which may be connected to the wireless portion of the network via a dedicated, secure landline. The communications network may also include a gaming service provider, which is likewise connected to the voice/data switch via a dedicated, secure landline. The voice/data switch may be connected to the wireless network of base stations via a mobile switching center (MSC), for example and the landline may be provided between the voice/data switch and the MSC.

Users access the gaming system by way of mobile stations which are in communication with, and thus part of, the communications network. The mobile station may be any electronic communication device that is operable in connection with the network as described. For example, in this particular embodiment, the mobile station may comprise a cellular telephone.

In various embodiments, in the case of a cellular network for example, the gaming system is enabled through the use of a private label carrier network. Each base station is programmed by the cellular carrier to send and receive private secure voice and/or data transmissions to and from mobile station handsets. The handsets may be pre-programmed with both gaming software and the carrier's authentication software. The base stations communicate via private T1 lines to a switch. A gaming service provider leases a private T1 or T3 line, which routes the calls back to gaming servers controlled by the gaming service provider. Encryption can be installed on the telephones if required by a gaming regulation authority, such as a gaming commission.

The cellular network may be a private, closed system. Mobile stations communicate with base stations and base stations are connected to a centralized switch located within a gaming jurisdiction. At the switch, voice calls are transported either locally or via long distance. Specific service provider gaming traffic is transported from the central switch to a gaming server at a host location, which can be a casino or other location.

As subscribers launch their specific gaming application, the handset will only talk to certain base stations with cells or sectors that have been engineered to be wholly within the gaming jurisdiction. For example, if a base station is close enough to pick up or send a signal across state lines, it will not be able to communicate with the device. When a customer uses the device for gaming, the system may prohibit, if desired, the making or receiving voice calls. Moreover, voice can be eliminated entirely if required. Further, the devices may not be allowed to "connect" to the Internet. This ensures a high level of certainty that bets/wagers originate and terminate within the boundaries of the gaming jurisdiction and the "private" wireless system cannot be circumvented or bypassed. Although in some embodiments some data and/or voice traffic may be communicated at least partially over the Internet, the communication path may not include the Internet in other embodiments. Alternatively, in some embodiments, certain non-gaming information may be transported over a path which includes the Internet, while other information relating to the gaming activities of the system is transported on a path that does not include the Internet.

Figure 24:
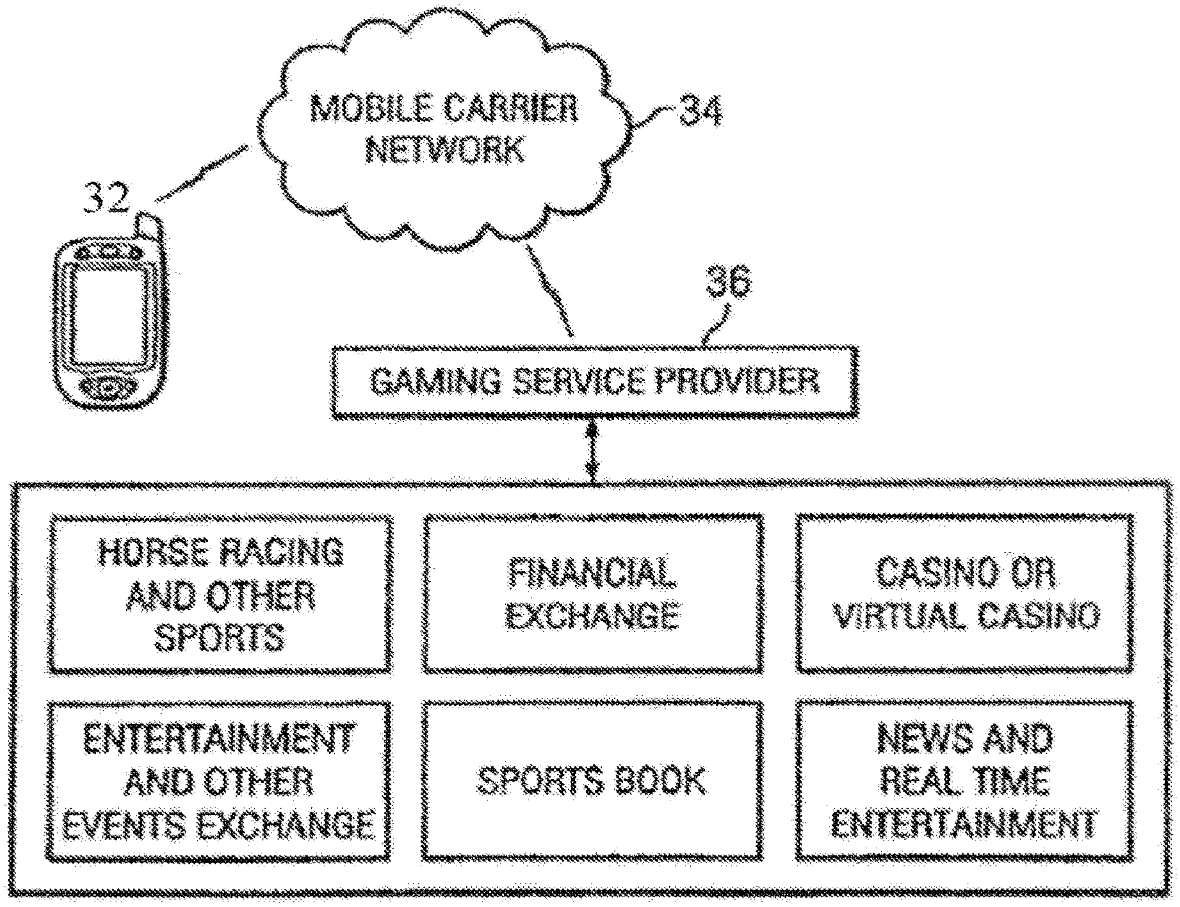
FIG. 24 shows a gaming service provider in communication with a gaming communication device according to some embodiments.

As shown in FIG. 24, a gaming communication device 32 is in communication with a gaming service provider over a network 34. The gaming service provider preferably has one or more servers, on which are resident various gaming and other applications. As shown in FIG. 24, some example gaming applications include horse racing and other sports, financial exchange, casino and/or virtual casino, entertainment and other events exchange, and news and real time entertainment. Each of these applications may be embodied in one or more software modules. The applications may be combined in any possible combination. Additionally, it should be understood that these applications are not exhaustive and that other applications may exist to provide an environment to the user that is associated with any of the described or potential activities.

Figure 25:
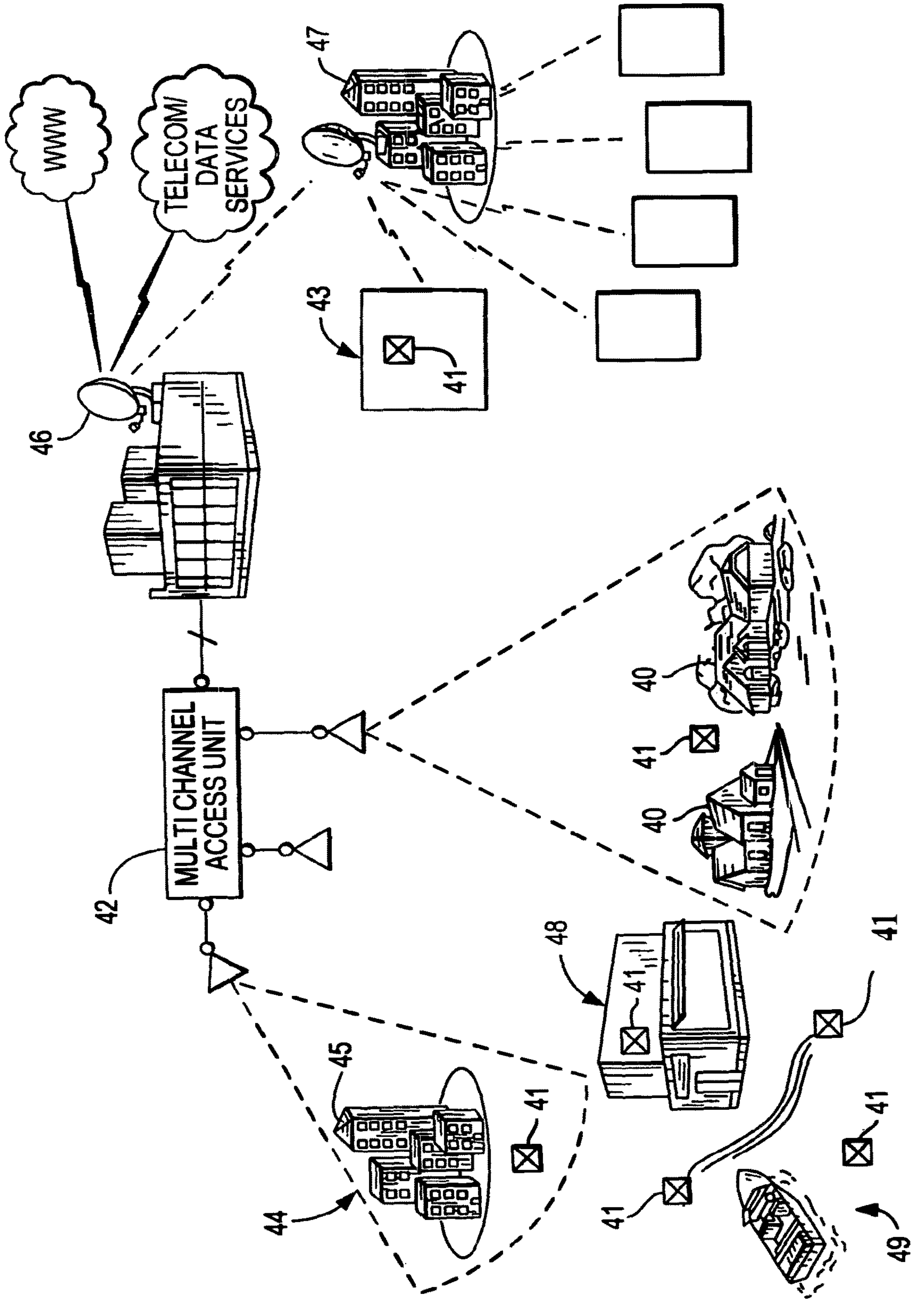
FIG. 25 shows a communications network according to some embodiments.

In another embodiment, as shown in FIG. 25, for example, the communications network comprises a private wireless network. The private wireless network may include, for example, an 802.11x (Wi-Fi) network technology to cover "Game Spots" or "Entertainment Spots." In FIG. 25, various Wi-Fi networks are indicated as networks 41. Networks 41 may use other communications protocols to provide a private wireless network including, but not limited to, 802.16x (WiMAX) technology. Further, networks 41 may be interconnected. Also, a gaming system may comprise a combination of networks as depicted in FIG. 25. For example, there is shown a combination of private wireless networks 16, a cellular network comprising a multi-channel access unit or sectorized base station 42, and a satellite network comprising one or more satellites 46.

With respect to the private wireless network, because the technology may cover small areas and provide very high-speed throughput, the private wireless network is particularly well-suited for gaming commission needs of location and identity verification for the gaming service provider products. The gaming spots enabled by networks 41 may include a current casino area 48, new areas such as swimming pools, lakes or other recreational areas 49, guest rooms and restaurants such as might be found in casino 48 or hotels 45 and 47, residential areas 40, and other remote gaming areas 43. The configuration of the overall gaming system depicted in FIG. 25 is intended only as an example and may be modified to suit various embodiments.

In some embodiments, the system architecture for the gaming system includes:

(1) a wireless LAN (Local Access Network) component, which consists of mostly 802.11x (Wi-Fi) and/or 802.16x WiMAX technologies; robust security and authentication software; gaming software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the gaming service provider);

(c) compulsory tunneling (static routing) to gaming servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multi-point technologies;

(3) private MAN (Metropolitan Access Network) T1 and T3 lines to provide connectivity where wireless services cannot reach; and (4) redundant private-line communications from the mobile switch back to the gaming server.

Each of the "Game Spots" or "Entertainment Spots" is preferably connected via the MWAN/MAN back to central and redundant game servers. For accessing the private wireless networks 41, the gaming communication devices may be Wi-Fi- or WiMAX-enabled PDAs or mini-laptops, and do not have to be managed by a third-party partner.

In various embodiments, the gaming system includes a location verification feature, which is operable to permit or disable gaming from a remote location depending upon whether or not the location meets one or more criteria. A criterion may be, for example, whether the location is within a pre-defined area in which gaming is permitted by law. As another example, a criterion may be whether the location is in a no-gaming zone, such as a school. The location verification technology used in the system may include, without limitation, "network-based" and/or "satellite-based" technology. Network-based technology may include such technologies as multilateration, triangulation and geo-fencing, for example. Satellite-based technologies may include global positioning satellite (GPS) technology, for example.

As previously discussed, the cellular approach preferably includes the use of at least one cellular, mobile, voice and data network. For gaming in certain jurisdictions, such as Nevada for example, the technology may involve triangulation, global positioning satellite (GPS) technology, and/or geo-fencing to avoid the potential for bets or wagers to be made outside Nevada state lines. In some embodiments, the network would not cover all of a particular jurisdiction, such as Nevada. For instance, the network would not cover areas in which cellular coverage for a particular base station straddled the state line or other boundary of the jurisdiction. This is done in order to permit the use of location verification to insure against the chance of bets originating or terminating outside of the state. Triangulation may be used as a method for preventing gaming from unapproved locations. Triangulation may be accomplished, for example, by comparing the signal strength from a single mobile station received at multiple base stations, each having GPS coordinates. This technology may be used to pinpoint the location of a mobile station. The location can then be compared to a map or other resource to determine whether the user of the mobile station is in an unapproved area, such as a school. Alternatively, GPS technology may be used for these purposes.

Figure 26:
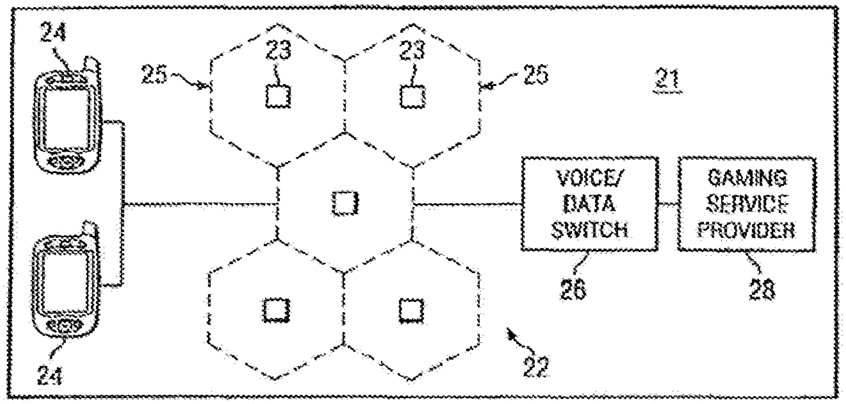
FIG. 26 shows a gaming system according to some embodiments.

As shown in FIG. 26, the gaming system includes a plurality of gaming communication devices 54, 55, and 56. Device 54 is located outside the gaming jurisdiction 58. Devices 55 and 56 are both located inside gaming jurisdiction 58. However only device 56 is located within geo-fence 57, which is established by the coverage areas of a plurality of base station 53. Thus, geo-fencing may be used to enable gaming via device 56 but disable gaming via devices 54 and 55. Even though some gaming communication devices that are within the gaming jurisdiction 58, such as device 55, are not permitted access to the gaming system, the geo-fence 57 ensures that no gaming communication devices outside jurisdiction 58, such as device 54, are permitted access.

Geo-fencing may not specify location. Rather, it may ensure that a mobile station is within certain boundaries. For instance, geo-fencing may be used to ensure that a mobile station beyond state lines does not access the gaming system. Triangulation on the other hand may specify a pinpoint, or near-pinpoint, location. For example, as shown in FIG. 26, device 56 is triangulated between three of the base stations 53 to determine the location of device 56. Triangulation may be used to identify whether a device, such as a mobile station, is located in a specific spot where gambling is unauthorized (such as, for example, a school). Preferably, the location determination technology utilized in conjunction with various embodiments meets the Federal Communication Commission's (FCC's) Phase 2 E911 requirements. Geological Institute Survey (GIS) mapping may also be utilized to compare identified coordinates of a gaming communication device with GIS map features or elements to determine whether a device is in an area not authorized for gaming. It should be noted that any type of location verification may be used such as triangulation, geo-fencing, global positioning satellite (GPS) technology, or any other type of location determining technology, which can be used to ensure, or provide an acceptable level of confidence, that the user is within an approved gaming area.

In various embodiments, location verification is accomplished using channel address checking or location verification using some other identifying number or piece of information indicative of which network or portion of a network is being accessed by the gaming communication device. Assuming the usage of an identifying number for this purpose, then according to one method of location checking, as an example, a participant accesses the gaming system via a mobile telephone. The identifying number of the mobile telephone, or of the network component being accessed by the mobile telephone, identifies the caller's connection to the mobile network. The number is indicative of the fact that the caller is in a defined area and is on a certain mobile network. A server application may be resident on the mobile telephone to communicate this information via the network to the gaming service provider. In some embodiments, the identifying number or information is passed from a first network provider to a second network provider. For example, a caller's home network may be that provided by the second provider, but the caller is roaming on a network (and in a jurisdiction) provided by the first provider. The first provider passes the identifying information through to the second provider to enable the second provider to determine whether the caller is in a defined area that does or does not allow the relevant gaming activity. In various embodiments, the gaming service provider either maintains, or has access to, a database that maps the various possible worldwide mobile network identifying numbers to geographic areas. Various embodiments contemplate using any number or proxy that indicates a network, portion of a network, or network component, which is being connected with a mobile telephone. The identifying number may indicate one or more of a base station or group of base stations, a line, a channel, a trunk, a switch, a router, a repeater, etc.

In various embodiments, when the user connects his mobile telephone to the gaming server, the gaming server draws the network identifying information and communicates that information to the gaming service provider. The software resident on the gaming communication device may incorporate functionality that will, upon login or access by the user, determine the user's location (based at least in part on the identifying information) and send a message to the gaming service provider. The identifying number or information used to determine location may be country-specific, state-specific, town-specific, or specific to some other definable boundaries.

In connection with any of the location determination methods, the gaming system may periodically update the location determination information. This may be done, for example, during a gaming session, at pre-defined time intervals to ensure that movement of the gaming communication device to an unauthorized area is detected during play, and not just upon login or initial access.

Thus, depending on the location determination technology being used, the decision whether to permit or prohibit a gaming activity may be made at the gaming communication device, at the gaming server, or at any of the components of the telecommunication network being used to transmit information between the gaming communication device and the gaming server (such as at a base station, for example).

An aspect of the private wireless network related to preventing gaming in unauthorized areas is the placement of sensors, such as Radio Frequency Identification (RFID) sensors on the gaming communication devices. The sensors trigger alarms if users take the devices outside the approved gaming areas. Further, the devices may be "tethered" to immovable objects. Users might simply log in to such devices using their ID and password.

Figure 27:
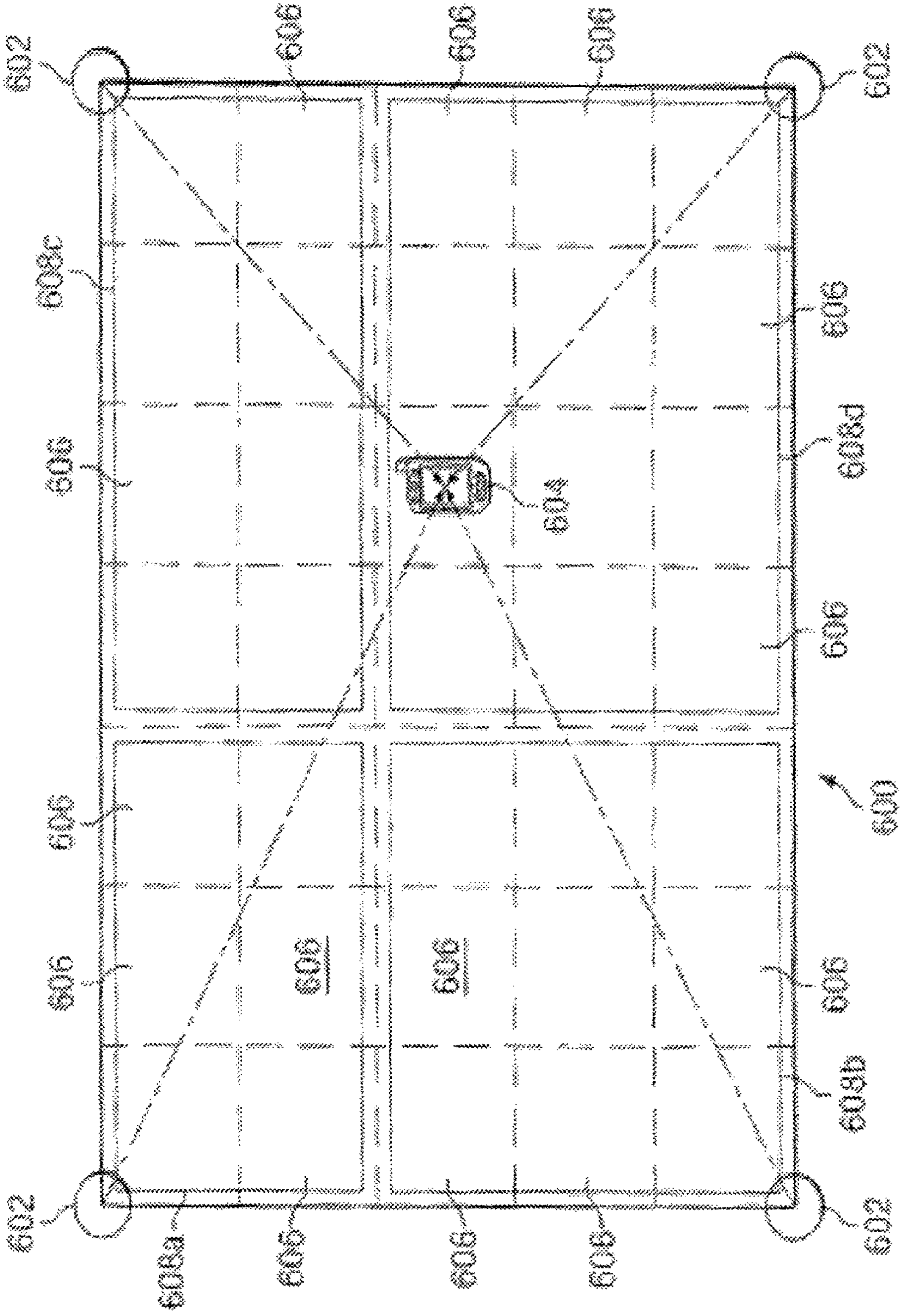
FIG. 27 shows a wireless gaming system according to some embodiments.
Figure 28:
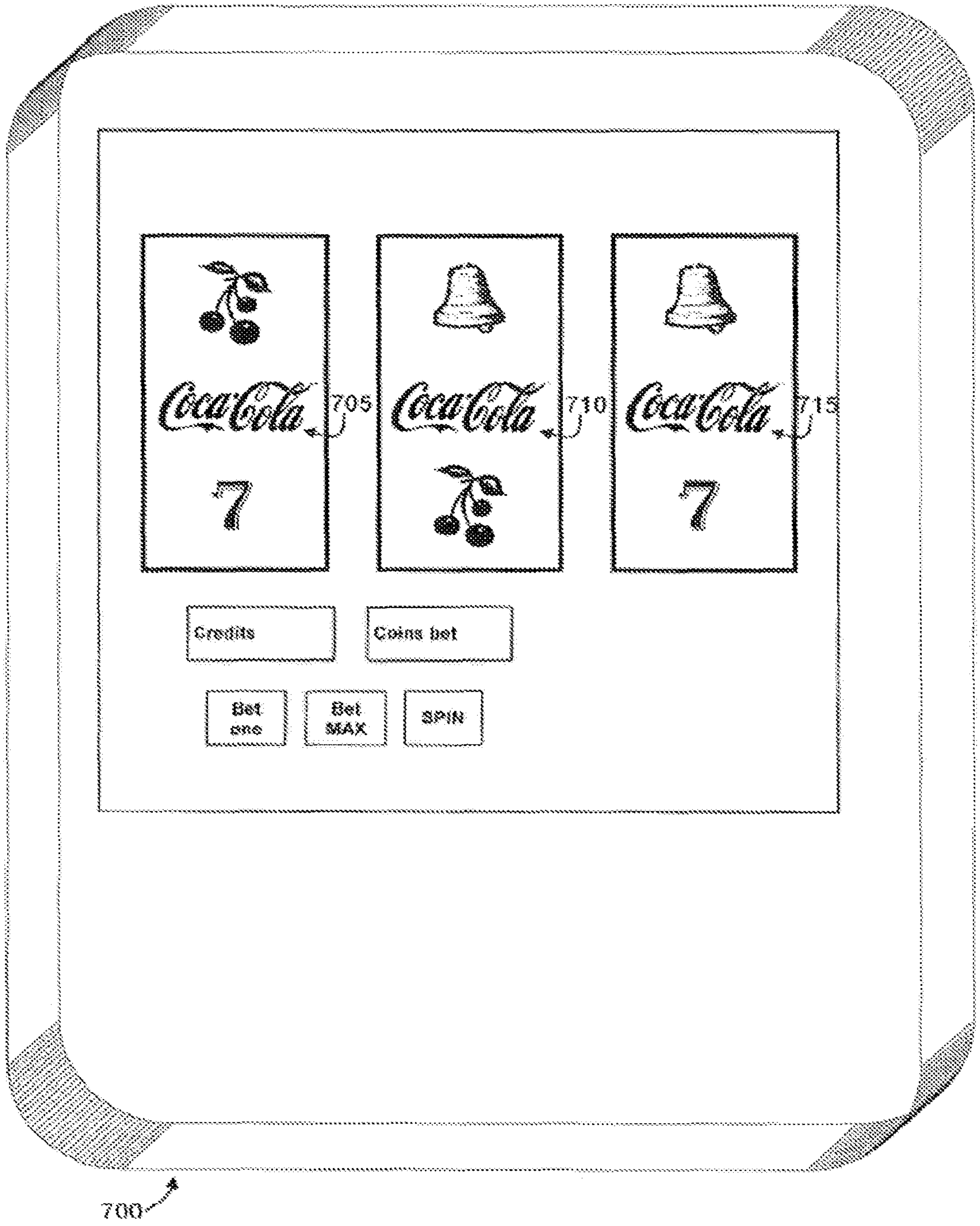
FIG. 28 shows a mobile gaming device with promotional content according to some embodiments.

In various embodiments, a gaming system may include the ability to determine the location of the gaming communication device within a larger property, such as a casino complex. This may allow certain functionalities of the device to be enabled or disabled based upon the location of the device within the property. For example, government regulations may prohibit using the device to gamble from the guest rooms of a casino complex. Therefore, particular embodiments may include the ability to determine the location of the device within the property and then disable the gambling functionality of the device from a guest room, or other area where gambling is prohibited. FIG. 27 illustrates an example of a wireless gaming system in which the location of a gaming communication device 604 may be determined in accordance various embodiments.

As shown in FIG. 27, a wireless gaming system comprises a wireless network that at least partially covers casino complex 600 in which one or more gaming communication devices 604 may be used to participate in a variety of gaming activities. The wireless network may comprise at least three signal detection devices 602, although various embodiments may include fewer or greater than three signal detection devices. As shown in FIG. 27, the wireless network comprises four signal detection devices 602, each located at one corner of casino complex 600. In various embodiments, these signal detection devices may comprise wireless access points, wireless routers, wireless base stations, satellites, or any other suitable signal detection device. Furthermore, although signal detection devices 602 are illustrated as being located on the boundaries of casino complex 600, signal detection devices may be located anywhere inside or outside of casino complex 600, provided the signal detection devices are operable to receive signals originating from a gaming communication device 604 inside casino complex 600. In various embodiments, signal detection devices 602 may also be used to transmit, as well as receive, signals to gaming communication device 604.

In various embodiments, casino complex 600 may be divided into one or more zones 608, which represent different areas of the casino complex, such as the lobby, guest rooms, restaurants, shops, entertainment venues, and pool areas. For example, as shown in FIG. 27, zone **608*a* may correspond to the casino lobby, zone 608*b* may correspond to guest rooms, zone 608*c* may correspond to restaurants, and zone 608*d* may correspond to the gaming floor of the casino. Each zone 608 may be further divided into one or more sub-zones 606, each specifying a particular location within zone 608. Sub-zones 606 may be arranged in a grid formation, each sub-zone 606** having a uniform size. In some embodiments, each sub-zone may comprise 9 square feet (i.e., 3 feet by 3 feet). In some embodiments, each sub-zone may comprise 100 square feet (i.e., 10 feet by 10 feet). The choice of the size of an area covered by a sub-zone may depend on administrator preferences, technical limitations of the wireless network, and governmental regulations, as well as other considerations.

Particular embodiments may use this mapping of casino complex 600 into a plurality of zones 608 and sub-zones 606 to determine the location of gaming communication device 604 within the complex. These embodiments may utilize the signal received by signal detection devices 602 from gaming communication device 604 to determine the location of the device.

In various embodiments, the location of gaming communication device 604 may be determined based upon the strength of the signal received by each signal detection device 602 from device 604. In various embodiments, this may be accomplished using a Received Signal Strength Indication (RSSI) value or any other suitable indication of signal strength. Generally, the closer a sub-zone is to a signal detection device, the stronger the signal the signal detection device will receive from a gaming communication device located in that sub-zone. Therefore, given a plurality of signal strength readings taken from different points in the casino complex (i.e., signal detection devices 602), these different signal strength readings may be used to determine the location of the device.

With this in mind, each sub-zone 606 of casino complex 600 may be associated with a reference set of signal strengths received by the signal detection devices from a device located in that particular sub-zone. Typically, these values are generated, and periodically recalibrated, by taking a reference reading from a gaming communication device located that sub-zone. After each sub-zone is associated with a reference set of signal strengths, these reference signal strengths may be compared with the signal strengths received by the signal detection devices from a gaming communication device. Since each sub-zone has a unique set of signal strengths, this comparison may be used to identify the particular zone in which the gaming communication device is located.

In various embodiments, the location of gaming communication device 604 may be determined based upon an elapsed time between the transmission of the signal from device 604 and the receipt of the signal by each signal detection device 602. In various embodiments, this elapsed time may be determined based on a Time Difference of Arrival (TDOA), or any other suitable technology. As before in the case of signal strengths, each sub-zone 606 may be associated with a predetermined, or reference, set of elapsed times from transmission to receipt of a signal from a gaming communication device. This set of elapsed times will be different for each sub-zone of the casino complex, as the time it takes a signal to reach each signal detection device will depend on the proximity of the sub-zone to each base station. By comparing the time from transmission to receipt of a signal received by the signal detection devices from a gaming communication device, the sub-zone in which the device is located may be determined.

Once the location of the gaming communication device has been determined, particular embodiments may then enable and/or disable particular functions of the device based on this determination. For example, as mentioned previously, particular embodiments may disable the gaming communication device's gambling functionality from a user's guest room, while still allowing the user to use other device functions, such as purchasing merchandise or services, or buying tickets to an entertainment event. Once the user leaves his or her guest room, the gambling functionality of the gaming communication device may be enabled. Similarly, particular embodiments may prevent the gaming communication device from being used to make financial transactions from the casino floor. Once the user leaves the casino floor, such functionality may be enabled. Similarly, other functionalities of the gaming communication device may be enabled or disabled based upon the location of the device within the property in accordance with various embodiments.

In various embodiments, the various functionalities of the gaming communication device may be enabled or disabled based upon the zone 608 in which the device is located. In such embodiments, each zone 608 of the casino complex may be associated with a set of allowed activities. For example, the "lobby" zone 608*a* of the casino complex may have all activities allowed, while the "guest room" zone 608*b* of the property may have all activities allowed except gambling. Based upon the gaming communication device's location, the functionality of the gaming communication device may be limited to the set of allowed activities for the zone in which the device is located. As the gaming communication device travels from zone to zone, the location of the device may be re-determined, and the functionality of the device may be updated to reflect the set of allowed activities for the zone in which the device is now located.

Various embodiments may also use the location determination to send location-specific information to the gaming communication device. For example, a reminder that an entertainment event to which the user has tickets is about to begin may be sent to the user's device if the device (and therefore the user) is located in a different part of the casino complex. In another embodiment, a user may be alerted that the user's favorite dealer is on the casino floor if the user is located in his or her guest room.

In various embodiments, the location of the gaming communication device may be used to deliver goods and services purchased or ordered by the user of the device. For example, in various embodiments, the user may purchase food and beverages using the device. The location of the device may then be used to deliver the food and beverages to the user, even if the user relocates to another sub-zone after placing his or her order.

The determination of the gaming communication device's location may also be used to provide the user with directions to another part of the casino complex. For example, a user that is located on the casino floor that wishes to go to a specific restaurant within the complex may be given direction based upon his or her location. These directions may then be updated as the user progresses towards his or her desired location. In the event the user gets off-course, the location determination, which may be updated during the user's travel, may be used to alert the user that he/she has gotten off-course and then plot a new course to the desired destination.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

User Profiles

According to various embodiments, the wireless gaming system can incorporate a user profile element. One or more user profiles may be created, maintained, and modified, for example, on one or more of the servers of the gaming system. Generally, the user profiles include information relating to respective users. The information may be maintained in one or more databases. The information may be accessible to the gaming server and/or to one or more mobile devices. The devices which may access the information may, according to certain embodiments, include gaming devices or gaming management devices. Gaming management devices may include wireless devices used by casino staff to provide gaming services or gaming management services.

Various embodiments include software and/or hardware to enable the provision, modification, and maintenance of one or more user profiles. Thus, one or more user profiles may each comprise a set of data maintained in a data storage device. The data set(s) for each respective user profile may reflect any of a number of parameters or pieces of information, which relate to the particular user(s) corresponding to the profile(s). Although not intended to be exhaustive, such information may include, for example, gaming activity preferences, such as preferred game and/or game configuration, preferred screen configuration, betting preferences, gaming location preferences, dining, and other service preferences, and so forth. The information may also include user identity information, such as name, home address, hotel name and room number, telephone numbers, social security numbers, user codes, and electronic files of fingerprint, voice, photograph, retina scan, or other biometric information. User profile information may also include information relating to the user, but not determined by the user or the user's activities. Such information may include any information associated with, or made part of, a profile. For example, an entity such as a casino may include as part of a profile certain rules governing the distribution of promotions or offers to the user. User profile information can include any codes, account numbers, credit information, approvals, interfaces, applications, or any other information which may be associated with a user. Thus, user profile information may include any information that is particular to a given user. For example, profile information may include the location(s) at which a particular user has played, skill levels, success levels, types of games played, and betting styles, and trends of information relating to the user's activities.

In various embodiments, user profile information may include concierge or other service information that is associated with a user. Concierge services may include restaurant services, entertainment services, hotel services, money management services, or other appropriate services that may be offered to the user of a gaming device. For example, restaurant services may include, without limitation, services that allow the user to order drinks, order food, make reservations, or perform other restaurant related activities. As another example, entertainment services may include, without limitation, services that allow the user to purchase show tickets, arrange appointments or services, virtually shop, arrange transportation, or perform other entertainment related activities. Hotel services may include, for example, services that allow the user to check in, check out, make spa appointments, check messages, leave messages, review a hotel bill, or perform other guest-related activities. Money management services may include, for example, services that allow the user to transfer funds, pay bills, or perform other money management activities.

The gaming system may be configured to establish a new profile for any user who is using a gaming device for the first time. Alternatively, a new profile may be established for a prior user who has not played for a predetermined time period. The gaming system may set up the profile, monitor user activities, adjust the profile, and adjust information (such as graphics) displayed to the user. The gaming system may be configured to use the profile information to alter the presentation of gaming information to the user. For example, if a prior user has returned to the gaming system, the system may consult the profile for the user and determine that in the prior session of gaming the user lost money on craps but won money on blackjack. Based on this information, the system may adjust the default gaming screen and present a blackjack table for the user. As a further example, the profile information may indicate that the majority of the user's prior blackjack time was spent on $25 minimum tables. The system may, accordingly, make a further adjustment to the gaming environment and make the blackjack table being presented a $25 table. In this sense, the gaming system enables personalized wireless gaming based on one or more criteria maintained in a user profile.

The user profiles may be established, maintained, and periodically updated as necessary to enable a gaming provider to provide an enhanced, current, and/or customized gaming experience. Updates may be undertaken based on any suitable trigger, such as the occurrence of an event, the occurrence of a user activity, or the passage of a certain predetermined time period. Any or all of the profile information may be updated.

Alerts

In some embodiments, the gaming system may be configured to initiate one or more alerts to one or more users based on any number of criteria. For instance, an alert may be based on the location of a user. The system may also be configured to keep track of other non-location dependent parameters. The initiation of an alert may depend on a time parameter. Gaming alerts can also be based on this and/or other information maintained in a user profile. Alerts can be prioritized for presentation and the content and display of the alerts may be customized by the user or another entity.

As a related concept, the system may be configured to provide directions and/or maps. Another related concept involves enabling a user to view a certain activity or area remotely. The alert may be generated in response to the existence of data within a user profile. Additionally, the content and presentation of the alert may be determined based on information in the user profile. Thus, when the alerts occur and what the alerts indicate may be customized or tailored according to user preferences (or any other information maintained about the user (e.g., in a user profile) .

In some embodiments, an alert may be presented or displayed to the user in a format determined, at least in part, by any of the parameters described or contemplated herein. For example, if the user is located outdoors, the display may be automatically brightened in order to allow the user to more easily view the alert. The alert may be presented in any one or a combination of textual, visual, oral, or other information exchange formats. Alerts presented to users on the screen of a gaming communication device, for example, may be configured in any desirable manner. Preferably, the information is displayed in a way as to most effectively utilize the screen real estate to convey the alert message. Thus, different alerts of differing types, or having differing priorities, can be displayed differently on the gaming device. For example, a more important alert can be displayed as a popup while secondary alerts scroll at the bottom of the screen. The player can register for alerts and determine his own particular alert configuration preferences.

According to some embodiments, directional information may be provided to one or more users. The directional information may be associated with an alert. The directional information may be based on any of the parameters described herein (e.g., profiles, alerts, locations, changes in play or other activities, etc.). Directions may be given to activities, locations, seats, tables, recreational spots, restaurants, change cages, information booths, casinos, hotels, sports venues, theaters, etc. For example directions may be given to a particular table or gaming area, a casino other than the one where the user is presently located or where another user is located, a restaurant that is specified in a user profile, a sports book area of a casino, a hotel room, etc.

The directions can be presented orally, textually, and/or graphically (e.g., as map with zoom capabilities). An example of how directions would be provided involves a user profile indicating that the user likes to play high-limit blackjack on Saturday nights, but that the user does not have a particular casino preference. If the user enters any casino for which the system is operable, the system provides the user with an alert inviting the player to the high-limit blackjack tables and directional information in the form of a visual route. Another example involves a user leaving a sports book in a casino and the user has indicated that he wants to play craps. The device gives walking directions to the craps tables. Another example involves a user that has a preferred list of dinner restaurants. At a predetermined time (e.g., 8:00 pm), the system presents the user with the list, lets the user make a selection and a reservation. The system then provides the user with verbal directions from the user's current location to the selected restaurant. The system may also be configured to provide ancillary information based, at least in part, on the alert, the profile, or the directional information being provided. For example, the system may notify a user that the user will need a cab, or will need to take the tram, or will need a jacket and tie, or will need an umbrella, etc. depending on where the user is going and the route he is taking.

According to various embodiments, the system enables a user to view a certain activity or area remotely. For example, cameras (or other viewing devices) may be disposed throughout a casino property (or other relevant area). At kiosks, or on the wireless gaming devices, users can "peek" into one or more selected areas to see the activity in the selected area(s). For example, from the pool, a user can tell if the craps tables have changed limits or are filling up with people. From the craps table, a user can see if the restaurant or bar is becoming crowded.

According to various embodiments, the operation of the alerts module and the alerts methods are integrated with various techniques for managing user profile information. An example of this aspect is that the system may be configured to recognize that a user has certain preferred dealers or stickmen when playing certain casino games. When those dealers or stickmen are on duty, and if the user is located in a certain area, or within a certain distance, an alert may be sent inviting the user to participate in the gaming activity at the particular table where the dealer or stickman is on duty.

Thus, when user profile information indicates that a one or more predetermined criteria are met, the system may send an alert to the corresponding user or to another user. For example, the system may "learn" that a player is a fan of certain sports teams. The system monitors information about upcoming events that involve those teams and, at a predetermined time, checks to see if the user has placed a bet on the event(s). If not, the system invites the user to visit a sports book to make a bet. As another example, the system knows a user prefers $10 minimum tables and alerts the user to the opening of a seat at such a table. As another example, the alerts can be triggered by information which is not directly related to or associated with the particular user (e.g., non-user specific information). For instance, an alert might be triggered by a certain time or the occurrence of a certain event (e.g., the odds given on a certain sports event changing by a certain predetermined amount).

Service Applications

According to various embodiments, gaming services may be provided as an application add-on to a pre-existing communication or data service. Thus, gaming service applications may be made available to customers of a pre-existing communication or data service. For example, customers of a particular wireless telephone or data service may be offered any one or combination of the various gaming service applications discussed herein as an additional feature that is bundled with the telephone or data service. Although this document may refer to the communication service bundled with offered gaming service applications as including pre-existing communication services, it is recognized that the gaming services applications may be offered and accepted as part of a package with newly-activated communications service plan. In still other embodiments, the gaming service may be established first and the communication service may be added later.

The gaming service applications bundled with, or otherwise offered in conjunction with communication services, may be customized to meet the needs of the customers, service providers, or both. For example, a service provider may elect to make certain gaming service applications available to only a subset of the service providers' customers. Accordingly, not all customers associated with a service provider may be offered gaming services. As another example of customized gaming service applications, a communication service may offer customers a number of gaming service plans which may provide different levels of service. For example, certain services such as advertisement services and/or promotional services may be free to customers of the communications service. Such levels of service may be customer-selected, service provider-selected, or both.

Customers may be billed separately for add-on gaming services, or in conjunction with the invoice the customer already receives for the pre-existing communications service. For instance, in certain embodiments, gaming services may be billed as an add-on in the same way that Caller ID services, call waiting services, and call messaging services result in fees that are in addition to the basic fees associated with communication services.

Peer-to-Peer Wireless Gaming

According to various embodiments, gaming services enable peer-to-peer wireless gaming. Specifically, the system may enable multiple players to participate in the same gaming activity at the same time from dispersed locations. This may be particularly desirable in the case of certain games such as, but without limitation, horse racing, poker, and blackjack. The system may also enable a single player to participate in multiple positions with respect to a particular game. For example, a user may be permitted to play multiple hands of blackjack. Particular aspects include such features as providing assistance to a user in finding a particular activity. For example, a first player may want to play poker at a six-person table. The gaming system may be used to identify such a poker table that has a position available for the first user's participation. Additionally or alternatively, a first player might want to play poker at the same table as a second player, and the system may be configured to assist the first player in finding a game in which the second player is already participating.

Location determination techniques may be incorporated to enable peer-to-peer gaming or related services. For example, a "buddy network" may be established to track members of a selected group. For example, a group of friends might all be in a gambling jurisdiction but be located at various dispersed places within that jurisdiction. The gaming system allows the establishment of a private buddy network of peers for this group of friends. The system enables one or more members of the group to track one or more other members of the group. In various embodiments, the system may also allow messages from and to one or more group members. For example, the system also allows members to invite other members to participate in certain wireless gaming activities. Additionally or alternatively, the system may allow members of the group to bet on the performance of another member of the group who is participating in a virtual or actual game.

Location determination techniques may also be incorporate to establish an "alert system." The alert system may be used to invite certain types of players to participate in a gaming activity. Criteria may then be used to identify users of gaming devices that meet the criteria. For example, a gaming participant may wish to initiate a gaming activity with other users of gaming devices that qualify as "high rollers" or "high stakes gamers." As other examples, a celebrity user may wish to initiate a gaming activity with other celebrities, or a senior citizen may wish to initiate a gaming activity with other senior citizens. In each instance, the user may identify criteria that may then be used to identify other gaming participants that meet these criteria for the initiation of a peer-to-peer gaming event.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Gaming and Wireless System

Various embodiments include a gaming system including hand-held personal gaming devices. The gaming system is adapted to present one or more games to a user of one of the hand-held gaming devices.

In various embodiments, the gaming system includes a portable gaming device or interface. The portable gaming device has a display for displaying game information to a player, at least one input device for receiving input from the player and is capable of receiving and sending information to a remote device/location. The gaming system also includes a game server for generating game data, transmitting game data to the portable gaming device, and receiving information, such as player input, from the portable gaming device. The gaming system further includes a payment transaction server for validating payment and establishing entitlement of a player to play a game via the portable gaming device as provided by the game server.

In various embodiments, the gaming system includes one or more stationary gaming machines or other devices capable of printing tickets having a value associated therewith. The portable gaming device includes a ticket reader for reading ticket information for use by the payment transaction server in verifying the associated value for permitting the player to play the game.

In one or more embodiments, the portable gaming devices communicate with other devices (such as the game server) via a wireless communication channel. Appropriate relays and transceivers are provided for permitting the wireless communication.

In one or more embodiments, the portable gaming device includes a plurality of interfaces for changing the configuration of the gaming device or interacting with one or more transaction servers. In some embodiments, a login interface is provided for receiving login information regarding a user of the device. In various embodiments, the number of interfaces or other functions or features displayed or permitted to be accessed are configured depending upon the user of the device. In the event a gaming representative identifies himself, interfaces permitting access to a variety of control functions may be provided. In the event a player identifies themselves, such control functions may not be accessible, but instead only consumer-related functions may be accessible such as game play.

In one or more embodiments the gaming system includes one or more transaction servers, such as a food transaction server. Using an interface of the portable gaming device a player or other user may request services from the food transaction server. For example, a player may request food, drink, a restaurant reservation, or other service.

One or more embodiments comprise a method of playing a game via a portable gaming device associated with a gaming network. In some embodiments, a player obtains a portable gaming device, such as by checking out the device from the hostess station of a restaurant or the front desk of a hotel/casino. The player provides value to the gaming operator, such as a credit card or cash deposit. This value is associated with the server and matched with a ticket number, player tracking number or other identifier.

The game device is configured for player play using the login interface. The act of logging in may be performed by the player or the gaming operator. The player next establishes entitlement to obtain services, such as the playing of a game, by showing the existence of value. In some embodiments, the player scans his ticket using the ticket reader of the device. The scanned information is transmitted to the payment transaction server for verifying entitlement of the player to play a game or obtain other services. In the event the entitlement is verified, then the player is permitted to engage in the play of a game or request service.

In the event a player wishes to play a game, the player indicates such by selecting a particular game using a game play interface. Upon receipt of such an instruction, the game server generates game data and transmits it to the personal gaming device. The transmitted data may comprise sound and video data for use by the personal gaming device in presenting the game. The player is allowed to participate in the game by providing input to the game server through the personal gaming device. The game server determines if the outcome of the game is a winning or losing outcome. If the outcome is a winning outcome, an award may be given. This award may be cash value which is associated with the player's account at the payment transaction server. If the outcome is a losing outcome, then a bet or wager placed by the player may be lost, and that amount deducted from the player's account at the transaction server.

Figure 29:
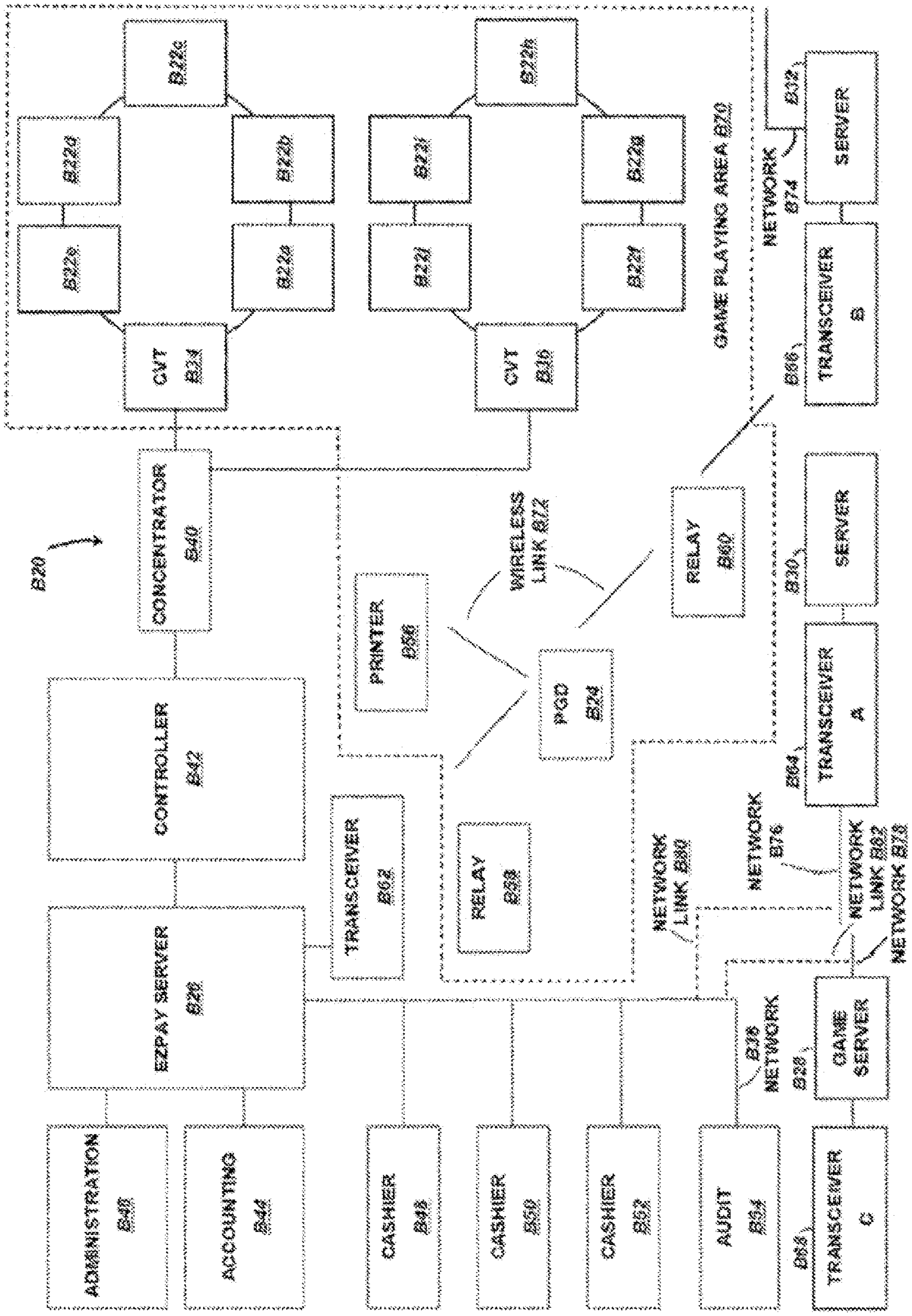
FIG. 29 is a block diagram of a gaming system in accordance with some embodiments.

FIG. 29 is a block diagram of a gaming system in accordance with various embodiments.

As illustrated, the gaming system B20 includes a plurality of gaming machines B22*a*, B22*b*, B22*c*, B22*d*, B22*e*, B22*f*, B22*g*, B22*h*, B22*i*, B22*j*. In some embodiments, these gaming machines B22*a*, B22*b*, B22*c*, B22*d*, B22*e*, B22*f*, B22*g*, B22*h*, B22*i*, B22*j* are of the stationary type. In general, the gaming machines B22*a*, B22*b*, B22*c*, B22*d*, B22*e*, B22*f*, B22*g*, B22*h*, B22*i*, B22*j* are arranged to present one or more games to a player. In various embodiments, the games are of the type requiring the placement of a wager or bet and are of the type by which a player receiving a winning outcome is provided an award, such as a monetary award. These devices may comprise, for example, video poker and slot machines. In addition, the gaming system B20 includes one or more hand-held, portable gaming devices (PGDs) B24. The PGD B24 is also arranged to present one or more games to a player, and as described below, may be used as an access point for a variety of other services. The device referred to herein as a "personal gaming device" may be referred to by other terminology, such as a portable gaming interface, personal game unit or the like, but regardless of the name of the device, such may have one or more of the characteristics herein.

In addition, in various embodiments, the PGD B24 is in communication with at least one gaming server B28. As described below, in various embodiments, the one or more games which are presented via the PGD B24 to the player are provided by the gaming server B28.

The gaming machines B22*a*, B22*b*, B22*c*, B22*d*, B22*e*, B22*f*, B22*g*, B22*h*, B22*i*, B22*j* and each PGD B24 is in communication with a payment system referred to herein as the "EZ-Pay" system. This system includes a server B26 for receiving and transmitting information. In general, the EZ-Pay system is utilized to accept payment from a player for the playing of games and obtaining of other goods and services, and for paying a player winnings or awards.

In the embodiments illustrated, the gaming system B20 includes other servers B30, B32 for transmitting and/or receiving other information. In some embodiments, one server B30 comprises a prize transaction server. Another server B32 comprises a food transaction server. In some embodiments, information may be transmitted between the PGD B24 and these servers B30, B32.

The EZ-Pay system, according to various embodiments, will now be described in more detail with reference to FIG. 30. The EZ-Pay system may constitute an award ticket system which allows award ticket vouchers to be dispensed in lieu of the traditional coin awards or reimbursements when a player wins a game or wishes to cash out. These tickets may also be used by gaming machines and other devices for providing value, such as for payment of goods or services including as a bet or ante for playing a game.

Figure 30:
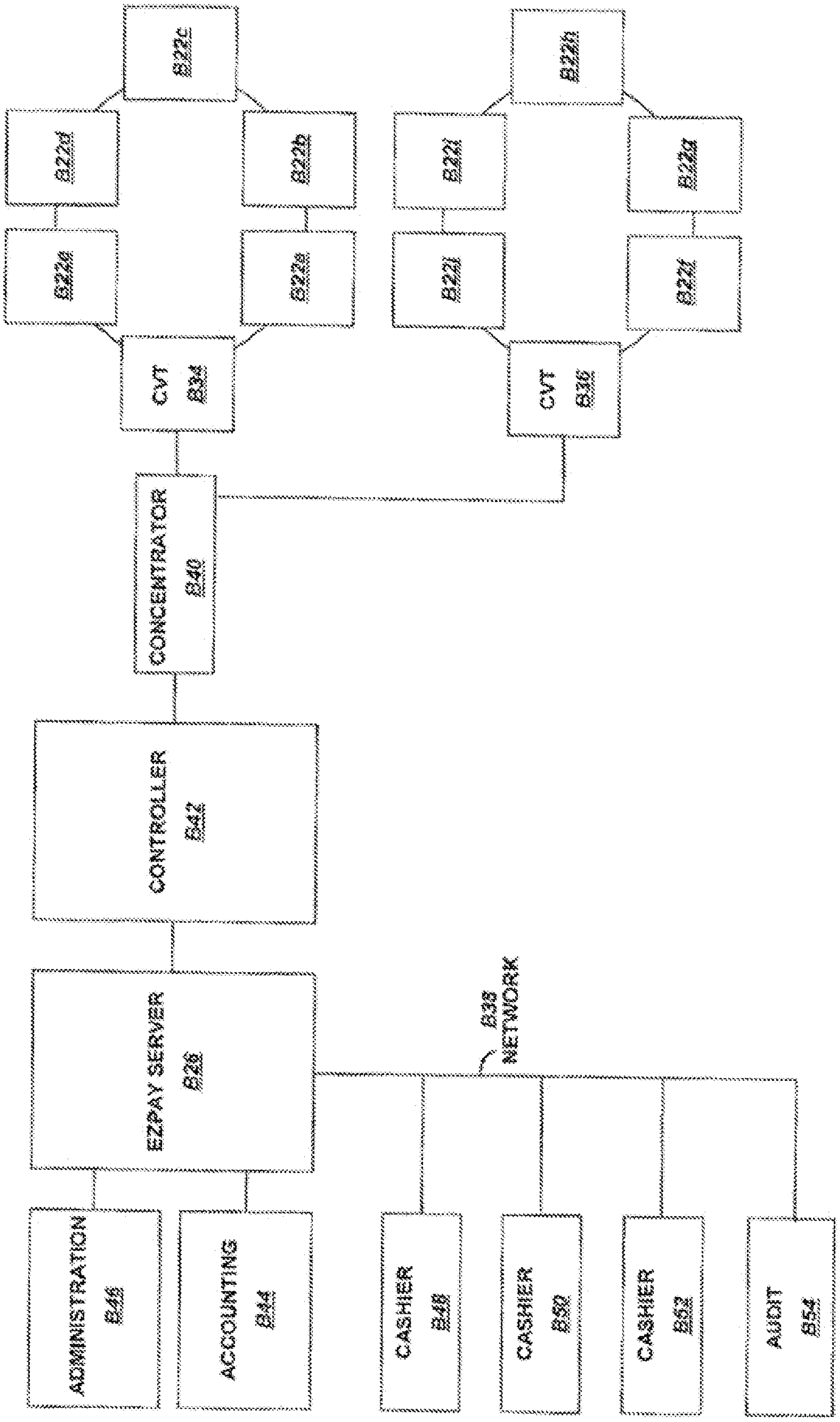
FIG. 30 is a block diagram of a payment system forming a part of the gaming system illustrated in FIG. 8, according to some embodiments.

FIG. 30 illustrates some embodiments of such a system in block diagram form. As illustrated, a first group of gaming machines B22*a*, B22*b*, B22*c*, B22*d*, and B22*e* is shown connected to a first clerk validation terminal (CVT) B34 and a second group of gaming machines B22*f*, B22*g*, B22*h*, B22*i*, and B22*j* is shown connected to a second CVT B36. All of the gaming machines print ticket vouchers which may be exchanged for cash or accepted as credit or indicia in other gaming machines. When the CVTs B34,B36 are not connected to one another, a ticket voucher printed from one gaming machine may only be used as indicia of credit in another gaming machine which is in a group of gaming machines connected to the same CVT. For example, an award ticket printed from gaming machine B22*a* might be used as credit of indicia in gaming machines B22*b*, B22*c*, B22*d*, and B22*e*, which are connected to the common CVT B34, but may not be used in gaming machines B22*f*, B22*g*, B22*h*, B22*i*, and B22*j* since they are each connected to the CVT B36.

The CVTs B34,B36 store ticket voucher information corresponding to the outstanding ticket vouchers that are waiting for redemption. This information is used when the tickets are validated and cashed out. The CVTs B34,B36 store the information for the ticket vouchers printed by the gaming machines connected to the CVT. For example, CVT B34 stores ticket voucher information for ticket vouchers printed by gaming machines B22*a*, B22*b*, B22*c*, B22*d*, and B22*e*. When a player wishes to cash out a ticket voucher and the CVTs B34,B36 are not connected to one another, the player may redeem a voucher printed from a particular gaming machine at the CVT associated with the gaming machine. To cash out the ticket voucher, the ticket voucher is validated by comparing information obtained from the ticket with information stored with the CVT. After a ticket voucher has been cashed out, the CVT marks the ticket as paid in a database to prevent a ticket voucher with similar information from being cashed multiple times.

Multiple groups of gaming machines connected to the CVTs B34,B36 may be connected together in a cross validation network B38. The cross validation network typically comprises one or more concentrators B40 which accept input from two or more CVTs and enables communications to and from the two or more CVTs using one communication line. The concentrator B40 is connected to a front end controller B42 which may poll the CVTs B34,B36 for ticket voucher information. The front end controller B42 is connected to an EZ pay server B26 which may provide a variety of information services for the award ticket system including accounting B44 and administration B46.

The cross validation network allows ticket vouchers generated by any gaming machine connected to the cross validation network to be accepted by other gaming machines in the cross validation network B38. Additionally, the cross validation network may allow a cashier at a cashier station B48, B50, B52 to validate any ticket voucher generated from a gaming machine within the cross validation network B38. To cash out a ticket voucher, a player may present a ticket voucher at one of the cashier stations B48, B50, B52. Information obtained from the ticket voucher is used to validate the ticket by comparing information on the ticket with information stored on one of the CVTs B34,B36 connected to the cross validation network B38. As tickets are validated, this information may be sent to another computer B54, providing audit services.

As described above, the gaming system B20 may also include one or more hand-held PGDs B24. In various embodiments, the PGD B24 is a portable device capable of transmitting and receiving information via a wireless communication link/network.

Referring again to FIG. 29, the gaming system B20 may include a printer B56, wireless communication relays B58 and B60, and wireless transceivers B62, B64, B66 and B68 connected to the remote transaction servers B26, B28, B30 and B32. In various embodiments, a player may obtain the PGD B24, and after being provided with the appropriate authority, may play one or more games and/or obtain other services including food services or accommodation services.

Figure 31:
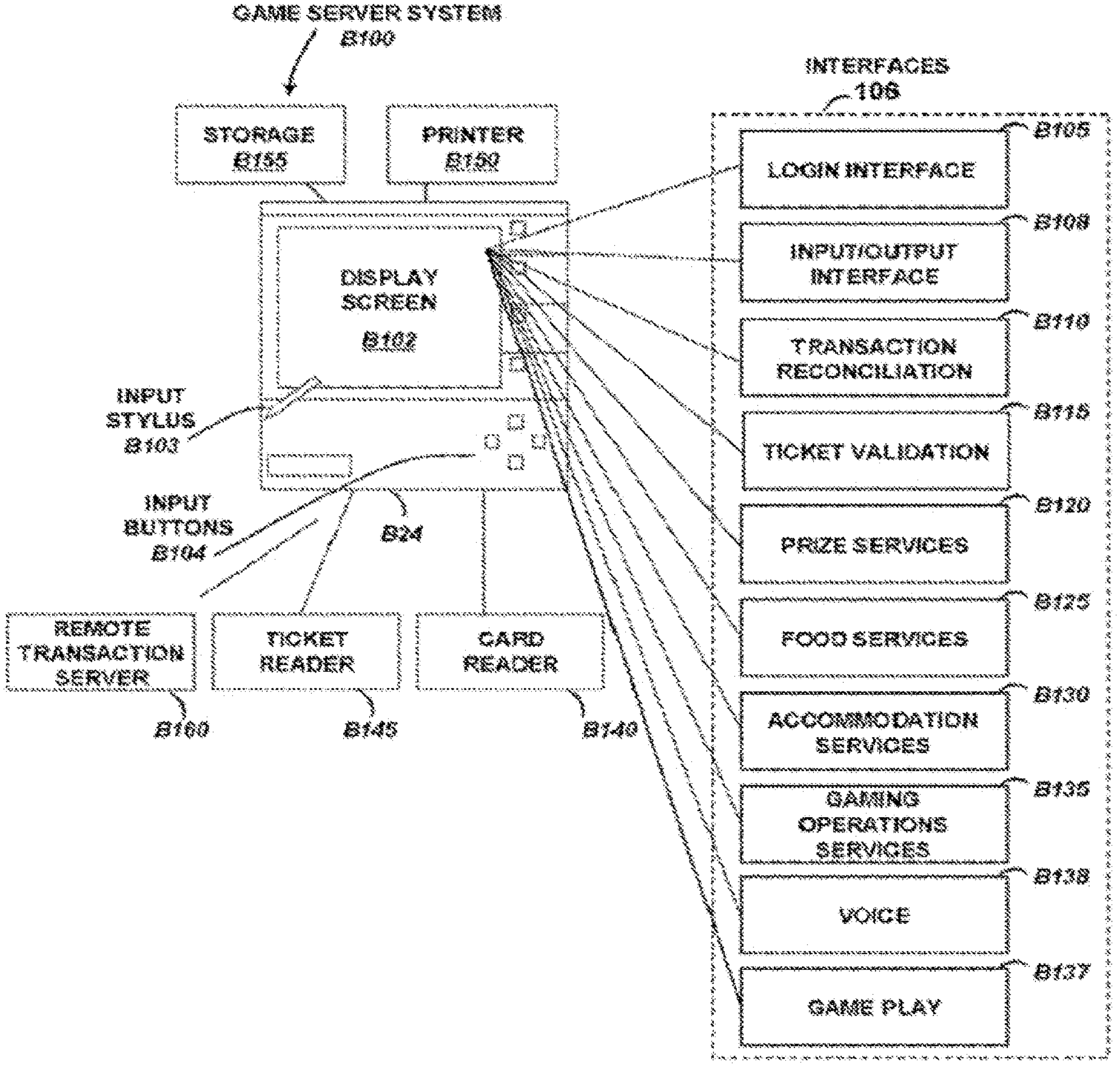
FIG. 31 is a schematic diagram of a portable gaming device of the gaming system illustrated in FIG. 8, according to some embodiments.

FIG. 31 illustrates the PGD B24 and a block diagram of a game and service system which may be implemented by the gaming system B20 illustrated in FIG. 29. In various embodiments, the game and service system B100 is comprised of at least one PGD B24 and a number of input and output devices. The PGD B24 is generally comprised of a display screen B102 which may display a number of game service interfaces B106. These game service interfaces B106 are generated on the display screen B102 by a microprocessor of some type (not shown) within the PGD B24. Examples of a hand-held PGD B24 which may accommodate the game service interfaces B106 shown in FIG. 31 are manufactured by Symbol Technologies, Incorporated of Holtsville, N.Y. The interface or menu data may be stored in a local memory, or the data may be transmitted to the PGD B24 from a remote location (such as a data server). This reduces the memory requirement of the device.

The game service interfaces B106 may be used to provide a variety of game service transactions and gaming operations services, including the presentation for play by a user of one or more games. The game service interfaces B106, including a login interface B105, an input/output interface B108, a transaction reconciliation interface B110, a ticket validation interface B115, a prize services interface B120, a food services interface B125, an accommodation services interface B130, a gaming operations interface B135, and a game play interface B137 may be accessed via a main menu with a number of sub-menus that allow a game service representative or player to access the different display screens relating to the particular interface.

In one or more embodiments, some or all of the interfaces may be available to a user of the PGD B24. For example, in one or more embodiments, the PGD B24 may have a dual purpose of both being usable by a player to play games and engage in other activities, and also be used by gaming operations personnel for use in providing services to players and performing administrative functions. In various embodiments, certain PGDs B24 may be specially configured for use only by players, and other PGDs B24 may be specially configured for use only by gaming or other personnel. In such event, the interfaces B106 may be custom programmed.

In one or more embodiments, only certain interfaces B106 may be displayed, depending on the status of the user of the PGD B24. In some embodiments, the particular interfaces B106 which are displayed and thus accessible for use are determined by the status of the user as indicated through a login function. In various embodiment, when the PGD B24 is operable (such as when a power button is activated) the default status for the PGD B24 is the display of the login interface B105. Once a user of the PGD B24 has logged in, then the status of the PGD display is changed.

In one or more embodiments, the login interface B105 may allow a game service representative to enter a user identification of some type and verify the user identification with a password. When the display screen B102 is a touch screen, the user may enter the user/operator identification information on a display screen comprising the login interface B105 using an input stylus B103 and/or using one or more input buttons B104. Using a menu on the display screen of the login interface, the user may select other display screens relating to the login and registration process. For example, another display screen obtained via a menu on a display screen in the login interface may allow the PGD B24 to scan a fingerprint of the game service representative for identification purposes or scan the fingerprint of a game player.

In the event a user identifies themselves as a gaming operator or representative, then the PGD B24 may be arranged to display one or more other interfaces such as those listed above and described in detail below. In one or more embodiments, the default status or login may be a "player" mode login.

In various embodiments, the login interface B105 may allow a player to identify themselves to configure the PGD B24 to permit the player to access a plurality of player services, such as playing games and the like. In various embodiments, the login interface B105 includes a request that the user identify themselves as a "player" or "authorized personnel." In the event "authorized personnel" is selected, then the above-referenced user identification (including password) may be requested. If "player" is selected, then in various embodiments the player is requested to provide an EZ pay ticket. As described in more detail below, in various embodiments, a player who wishes to play one or more games or obtain other goods or services uses an EZ pay ticket to provide the credit or payment, therefore. The ticket may be obtained from a cashier or by play of another gaming device (such as devices B22*a*, B22*b*, B22*c*, B22*d*, B22*e*, B22*f*, B22*g*, B22*h*, B22*i*, B22*j* in FIG. 29). The ticket may be verified through the EZ pay system described above.

In various embodiments, the PGD B24 includes a ticket reader B145 and a card reader B140. In some embodiments, the ticket reader B145 may be of a variety of types. In some embodiments, the reader comprises a bar-code reading optical scanner. In this arrangement, a user of the PGD B24 may simply pass the bar-coded ticket in front of the bar-code reader. In some embodiments, the card reader B140 comprises a magnetic-stripe card type reader for reading information associated with a magnetic stripe of a card, such as a player tracking card.

After having provided the appropriate authorization, access may be provided to the user of the PGD B24 of one or more of the following interfaces B106.

In one or more embodiments, an authorized user may be provided with access to the input/output interface B108. In a various embodiments, such access is only provided to a game service operator and not a player. In one or more embodiments, the input/output interface B108 permits a user to select from a list of devices stored in memory on the PGD B24, a device from which the PGD may input game service transaction information or output game service transaction information. For example, the PGD B24 may communicate with the ticket reader B145. As another example, the PGD B24 may input information from the card reader B140. Such input may be useful, for example, if a game service operator wishes to verify the authenticity of a player tracking card or the like.

The PGD B24 may output game and service transaction information to a number of devices. For example, to print a receipt, the PGD B24 may output information to a printer B150. In this game service transaction, the PGD B24 may send a print request to the printer B150 and receive a print reply from the printer B150. The printer B150 may be a large device at some fixed location, or a portable device carried by the game service representative. As another example, the output device may be the card reader B140 that is able to store information on a magnetic card or smart card. Other devices which may accept input or output from the PGD B24 are personal digital assistants, microphones, keyboard, storage devices, gaming machines and remote transaction servers.

The PGD B24 may communicate with the various input mechanisms and output mechanisms using both wire and wire-less communication interfaces. For example, the PGD B24 may be connected to the printer B150 by a wire connection of some type. However, the PGD B24 may communicate with a remote transaction server B160 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 Gigahertz. The information communicated using the wire-less communication interfaces may be encrypted to provide security for certain game service transactions such as validating a ticket for a cash payout. Some devices may accommodate multiple communication interfaces. Such a spread spectrum network is but one possible communication scheme.

Another type of interface that may be stored on the PGD B24 is the award ticket validation interface B115. In some embodiments, this interface is only available to an authorized game service representative, and not a player. Some embodiments of the award ticket interface B115 may accommodate the EZ pay ticket voucher system and validate EZ pay tickets as previously described. However, when other ticket voucher systems are utilized, the award ticket validation interface B115 may be designed to interface with the other ticket voucher systems. Using the award ticket validation interface B115, a game service representative may read information from a ticket presented to the game service representative by a game player using the ticket reader and then validate and pay out an award indicated on the ticket.

In various embodiments, the award ticket contains game service transaction information which may be verified against information stored on a remote transaction server B160. To validate the ticket may require a number of game service transactions. For example, after obtaining game service transaction information from the award ticket, the PGD B24 may send a ticket validation request to the remote transaction server B160 using the spread spectrum communication interface and receive a ticket validation reply from the remote server B160. In particular, the validation reply, and the validation request may be for an EZ pay ticket. After the award ticket has been validated, the PGD B24 may send a confirmation of the transaction to the remote server B160. Details of the game service transaction information validation process are described with the reference to FIG. 33. In various embodiments, the award ticket interface may be configured to validate award information from a smart card or some other portable information device or validate award information directly from a gaming machine.

As game and service transactions are completed, game and service transaction information may be stored on a storage device B155. The storage device B155 may be a remote storage device or a portable storage device. The storage device B155 may be used as a back-up for auditing purposes when the memory on the PGD B24 fails and may be removable from the PGD B24.

A type of game service interface that may be stored on the PGD B24 is the prize service interface B120. As an award on a gaming machine (i.e., machines B22*a*, B22*b*, B22*c*, B22*d*, B22*e*, B22*f*, B22*g*, B22*h*, B22*i*, B22*j* in FIG. 29) or while playing a game via the PGD B24, a game player may receive a ticket (such as issued by other machine) that is redeemable for merchandise including a bicycle, a computer or luggage or receive such an award directly (such as while playing the PGD B24 itself). Using the prize service interface B120, a game service representative or player may validate the prize service ticket and then check on the availability of certain prizes. For example, when the prize service ticket indicates the game player has won a bicycle, the game service representative may check whether the prize is available in a nearby prize distribution center. Alternatively, a player may be permitted to do the same thing. In some embodiments, a player may be awarded a prize of a particular level, there being one or more particular prizes on that level. In such events, the player may use the interface B120 to determine what prizes are currently available in the prize level just awarded. The PGD B24 may validate a prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, to check on the availability of prizes and to order or ship a prize may be implemented using various display screens located within the prize interface. The different prize screens in the prize service interface B120 may be accessed using a menu located on each screen of the prize service interface. In some embodiments, the prize service interface B120 may be configured to validate prize information from a smart card or some other portable information device or validate award information directly from a gaming machine.

A type of game service interface that may be stored on the PGD B24 is the food service interface B125. As an award on a gaming machine or as compensation for a particular amount of game play, a game player may receive a free food or drink. Using the food service interface B125, the player may redeem the food or drink award, or a game service representative may validate such an award (for example, the award may be provided to a player of a gaming device B22*a* in the form of a ticket) and check on the availability of the award. For example, when the game player has received an award ticket valid for a free meal, the food service interface may be used to check on the availability of a dinner reservation and make a dinner reservation. As another example, the PGD B24 may be used to take a drink or food order by the player thereof. Such an order may be processed via the remote food server B32 (see also FIG. 29). The transactions needed to validate a food ticket or award, to check on the availability of food services, request a food service and receive a reply to the food service request may be implemented using various display screens located within the food service interface B125. These display screens may be accessed using a menu located on each screen of the food service interface. In some embodiments, the food service interface may be configured to validate food service information from a smart card or some other portable information device.

Another type of game service interface that may be stored on the PGD B24 is an accommodation service interface B130. As an award for game play or as compensation for a particular amount of game play, a game player may receive an award in the form of an accommodation service such as a room upgrade, a free night's stay, or other accommodation prize. Using the accommodation service interface B130, the player may check on the availability of certain accommodation prizes. For example, when the game player has received an award for a room upgrade, the accommodation service interface may be used to check on the availability of a room and to make a room reservation. Regardless of whether the player has won an accommodation award, the player may utilize the accommodation service interface B130 to reserve a room (such as an additional night's stay) or an upgrade to a room. In some embodiments, a player of a game may be issued a ticket (such as from a free-standing game device B22*a*, B22*b*, B22*c*, B22*d*, B22*e*, B22*f*, B22*g*, B22*h*, B22*i*, B22*j* in FIG. 29), and a gaming representative may use the accommodation service interface B130 in order to validate the player's award ticket and check on the availability of the award and institute the award. As another example, the PGD B24 may be used to order a taxi or some other form of transportation for a player at a gaming machine preparing to leave the game playing area. The game playing area may be a casino, a hotel, a restaurant, a bar or a store.

The PGD B24 may validate the accommodation service award and check on the availability of certain accommodation awards by communicating with a remote accommodation server. The transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In some embodiments, the accommodation service interface may be configured to validate accommodation service information from a smart card or some other portable information device.

A type of game service interface that may be stored on the PGD B24 is a gaming operations service interface B135. Using the gaming service interface B135 on the PGD B24, a game service representative may perform a number of game service transactions relating to gaming operations. For example, when a game player has spilled a drink in the game playing area, a game service representative may send a request to maintenance to have someone clean up the accident and receive a reply from maintenance regarding his request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the PGD B24. In one or more embodiments, a player may be permitted various options through the gaming service interface B135. For example, a player may be permitted to request a gaming service representative or attendant using the interface B135.

A type of game service interface that may be stored on the PGD B24 is a transaction reconciliation interface B110. In various embodiments, the PGD B24 contains a memory storing game service transaction information. The memory may record the type and time when a particular game service transaction is performed. At certain times, the records of the game service transactions stored within the PGD B24 may be compared with records stored at an alternate location. For example, for an award ticket validation, each time an award ticket is validated and paid out, a confirmation is sent to a remote server B160. Thus, information regarding the award tickets, which were validated and paid out using the PGD B24, should agree with the information regarding transactions by the PGD stored in the remote server B160. The transaction reconciliation process involves using the transaction reconciliation interface B110 to compare this information. In various embodiments, only a gaming service representative (and not a player) is permitted access to the transaction reconciliation interface B110.

A type of game service interface that may be stored on the PGD B24 is a voice interface B138. Using the spread spectrum cellular or other communication network incorporated into the PGD, a player and/or game service representative may use the PGD B24 as a voice communication device. This voice interface B138 may be used to supplement some of the interfaces previously described. For example, when a game player spills a drink the game service representative may send maintenance request and receive a maintenance reply using the voice interface B138 on the PGD B24. As another example, when a game player requests to validate a food service such as free meal, such a request may be made by the player or a game service representative at a restaurant or other location using the voice interface B138 on the PGD B24. In some embodiments, a player may be permitted to contact a player of another PGD B24, such as by inputting a code number assigned to the PGD B24 through which communication is desired. Such would permit, for example, a husband and wife using two different PGDs B24 to communicate with one another. The voice interface B138 may also permit a player to contact the front desk of a hotel/casino, an operator of a switchboard at the gaming location or the like.

A type of game service interface that may be stored on the PGD B24 is a game play interface B137. In various embodiments, a player is permitted to access the game play interface B137 in order to select from one or more games for play. The gameplay interface B137 may include a menu listing one or more games which the player may play via the PGD B24. In various embodiments, game play is facilitated with the game server B28 (see FIG. 29).

In one or more embodiments, the gaming control code is not resident at the PGD B24, but instead at a secure, remote server. Referring to FIG. 29, game play data is transmitted from the game server B28 to the PGD B24, and from the PGD B24 to the game server B28. Preferably, the PGD B24 is adapted to receive and process data, such as by receiving video data and processing the data to present the information on the display B102. Likewise, the PGD B24 is arranged to accept input and transmit that input or instruction to the game server B28. This arrangement has the benefit that nearly all aspects of the play of a game can be monitored, as it requires the game play data to pass to or from a remote location. This avoids, for example, storage of the gaming software at the PGD B24 where it might be tampered with, copied or the like.

In one or more embodiments, each PGD B24 has a unique identifier which is utilized to identify which PGD B24 data is transmitted from and to which data is to be transmitted to. In some embodiments, the game server B28 may thus be used to present the same or different games to a plurality of players using different PGDs B24, with the game data regarding a particular game being played at a particular PGD B24 being directed to that PGD B24 using its particular identifier.

As will be appreciated by those of skill in the art, the PGD B24 may have a variety of configurations. As stated above, the PGD B24 may be used in the gaming system B20 in which gaming code is not stored directly at the PGD. In such an embodiment, the PGD B24 may have a much more limited amount of data memory. In some embodiments, the PGD B24 includes a processor for executing control code, such as that necessary to operate the display B102, accept input from the stylus B103 or input buttons B104 or the like. In addition, the PGD B24 preferably includes a buffer memory for accepting data transmitted from the game server B28. This data may comprise data for displaying game information, such as video and sound content.

Various aspects of the use of the PGD B24 described above will now be described. In one or more embodiments, the PGD B24 may be used directly by a player. In various embodiments, a player may use the PGD B24 to play one or more games, and obtain products and services, such as food.

Figure 32A:
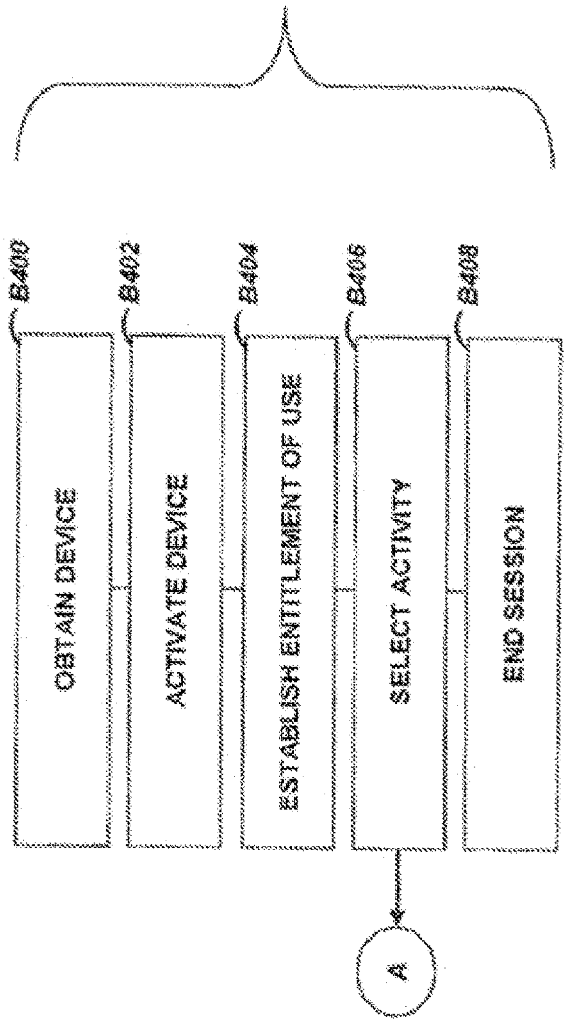
FIG. 32*a* is a flow diagram of a method of use of a portable gaming device by a player, according to some embodiments.
Figure 32B:
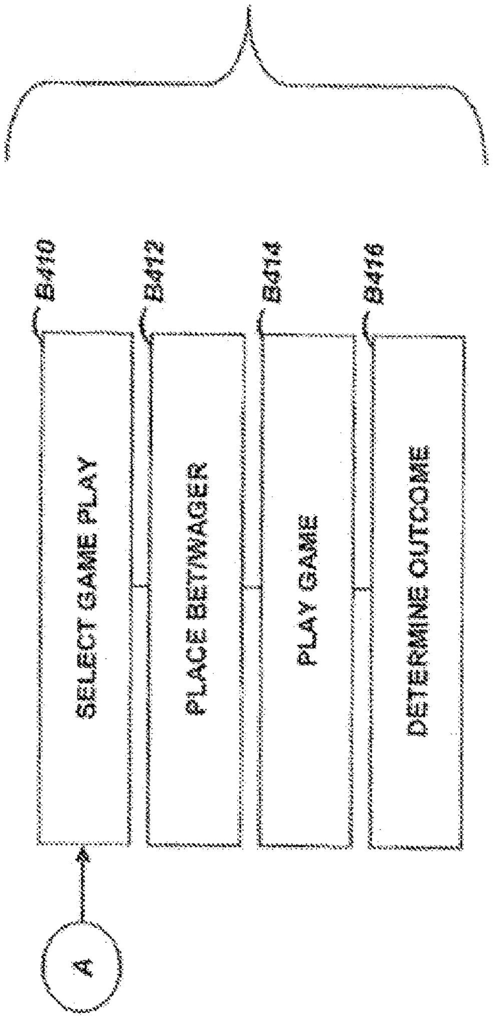
FIG. 32*b* is a flow diagram of a particular method of using the portable gaming device by a player, according to some embodiments.

A method of use of the PGD B24, according to some embodiments, is illustrated in FIGS. 32(*a*) and 32(*b*). In general, a player must first obtain a PGD B24. For example, a player may check out a PGD B24 from a gaming operator. The player then establishes entitlement to use the PGD B24. In some embodiments, the player must indicate player status at the login interface and obtain a valid ticket in order to activate the PGD B24. Once activated, the player is permitted to engage in a variety of transactions using the interfaces B106, such as playing a game, redeeming prizes and awards, placing food and drink orders, placing reservations, seeking gaming operator support, and seeking a variety of other goods and services as described in more detail below.

One example of a method of use of the PGD B24 by a player will be described with reference to FIG. 32(*a*). In a first step B400, the player first obtains the PGD B24. In some embodiments, a gaming operator may have certain locations at which a player may obtain the PGD B24, such as the front desk of a hotel/casino, the hostess stand at a restaurant, from a gaming attendant or other location as desired. In some embodiments, a gaming operator may actually permit a player to retain the PGD B24, such as by renting, selling or giving the PGD B24 away to a player.

In a step B402, the PGD B24 is activated. In some embodiments, this step includes turning on the PGD B24 (such as with a power switch) and logging in. In some embodiments, when the PGD B24 is turned on, the login interface B105 is automatically displayed. The login interface B105 may include "player" and "authorized personnel" buttons which may be activated using the stylus B103. The player may indicate "player" status by selecting the player button with the stylus B103.

In some embodiments, the gaming operator may log the player in. For example, when a player obtains the PGD B24 from a hostess at a restaurant, the hostess may log in the player in player mode. In some embodiments, the gaming operator may have certain PGDs B24 which are for use by players and certain others which are for use by gaming personnel. In such event, the PGDs B24 which are configured for player status may automatically be configured for player mode after being turned on.

In a step B404, a player establishes entitlement to use the PGD B24. In some embodiments, this step comprises the player providing a valid ticket which is verifiable using the EZ pay portion of the gaming system B20. In some embodiments, a player may have obtained a ticket through play of a gaming machine, such as gaming machines B22*a*, B22*b*, B22*c*, B22*d*, B22*e*, B22*f*, B22*g*, B22*h*, B22*i*, B22*j* of the gaming system B20. In some embodiments, a player may be issued a ticket by a game service representative. For example, a player may provide credit at a cashier cage (such as with a credit card or cash) and be issued a ticket. A player may also pay cash or the like to a restaurant hostess and be issued a ticket.

Once the player has a ticket, the ticket may be scanned using the ticket reader B145 of the PGD B24. For example, the player may pass the ticket in front of the ticket reader B145. Once the information is read by the PGD B24, the data may be transmitted to the EZ pay server B26 for validation. Preferably, this validation confirms that the particular ticket is authorized, including the fact that it is outstanding and has value associated therewith.

In one or more embodiments, entitlement may be established in other manners. For example, in some embodiments, entitlement may be established with a player tracking or identification card which may be read using the card reader B140 of the PGD B24.

Establishing entitlement to use the PGD B24 may ensure that the player has funds for paying to obtain services and products available by use of the PGD B24. In one or more embodiments, however, this step may be eliminated. For example, in some embodiments, a player may be permitted to use the PGD B24 and then pay for goods or services in other manners In some embodiments, a player may, for example, order food and then pay the server for the food using a room charge or cash at the time the food is delivered. In some embodiments, a player may use a credit card to pay to play games or to pay for food or the like. In such event, a credit card may be read by the card reader B140 at the time the services or products are to be provided or are ordered by the player.

In a step B406, the player is then permitted to select one or more selections from the interfaces B106. As stated above, a player may not be permitted access to all of the interfaces B106. In any event, a player may select, such as with the stylus B103, a service from the group of interfaces B106. An example of the engagement of a particular activity using the PGD B24 will be described below with reference to FIG. 32(*b*).

Once a player no longer desires to engage in any more activities using the PGD B24, the use session of the PGD B24 is ended in a step B408, and in one or more embodiments, the PGD B24 is returned to the gaming operator. In various embodiments, once a player no longer wishes to use the PGD B24, the player returns the PGD B24 to the gaming operator. At that time, the gaming operator may confirm that all transactions using the PGD B24 are closed or complete and pay the player any winnings. In some embodiments, a player B24 is issued a new ticket representing the player's credit (including any payments made in order to first use the PGD B24, plus any winnings, less any expenditures).

An example of a method of using the PGD B24 wherein the player has selected the option of game play using the game play interface B137 will be described in detail with reference to FIG. 32(*b*). In a step B410 (which step comprises a particular embodiment of step B406 of FIG. 32(*a*)), a player has selected the event or service of "game play" using the game play interface B137.

In some embodiments, when a player has selected the game play interface B137, a menu may be displayed to the player of the one or more games which the player may be permitted to play. In some embodiments, when the player selects the game play interface B137, a signal is transmitted from the PGD B24 to the remote game server B28 instructing the game server B28 that the player wishes to play a game. In response, the game server B28 may send the latest game menu to the PGD B24 for display. In this arrangement, the menu of games which is available may be continuously updated at one or more central locations (such as the server B28) instead of at each PGD B24.

If the system B20 permits the player to select a game from a menu of games, then the method includes the step of the player selecting a particular game to be played. Once a game is selected, or if only a single game option is provided, then game play begins. In some embodiments, the game server B28 transmits data to the PGD B24 for use by the PGD B24 in presenting the game, such as video and audio content.

In some embodiments, in a step B412 a player is required to place a bet or ante to participate in a game. In some embodiments, the player may place the bet or ante using the EZ pay system. As stated above, the player preferably establishes entitlement to use the PGD B24 with an EZ pay ticket or other entitlement, which ticket demonstrates that the player has monies or credits on account which may be used to pay for goods and services. These services include game play services.

In some embodiments, when the player establishes entitlement to use the PGD B24, the value of the player's credits or monies are displayed to the player so that the player is visually reminded of these amounts. When a player begins play of a game, the player may input a bet and ante which is no more than the value of the credits or monies which the player has on account. Once a player has placed a bet or ante, that information is transmitted to the EZ pay server B26 and is deducted from the player's account. A new credit value is then displayed at the PGD B24 to the player.

In various embodiments, a player may provide credit for a bet or ante in other manners. For example, a player may swipe a credit card through the card reader B140 in order to provide the necessary credit for the bet or ante.

In a step B414, the player is then permitted to engage in the game. In some embodiments, game play comprises the game server B28 executing game code and transmitting information to the PGD B24 for presenting certain aspects of the game to the player. When necessary, the player is permitted to provide input, and the input data is transmitted from the PGD B24 to the game server B28.

As one example of a game, the game may comprise video poker. In this embodiment, the game server B28 executes code for randomly generating or selecting five cards. Data representing video images of the cards is transmitted to the PGD B24, where the images of the five dealt cards are displayed on the display screen B102.

The instruction "draw" or "stay" may be displayed to the player. At that time, the player may select one or more of the cards to hold or replace. In the event the player elects to replace any card, that instruction is transmitted to the game server B28 which then randomly generates or selects replacement cards. The replacement card data is transmitted to the PGD B24 and images of the replacement cards are displayed.

In the event the hand of five cards (including any replacement cards) is determined by the game server B28 to comprise a predetermined winning hand, then the player may be paid a winning amount. If not, then the player loses his bet or ante. This step comprises step B416 of the method, that of determining the outcome of the game.

If the outcome is a winning outcome, then the player may be paid a winning by crediting the player's account through the EZ pay server B26. In that event, the player's credits value as displayed is updated to reflect the player's winnings.

A player may then elect to play the game again, play a different game, or select one or more other services offered. In some embodiments, a "return to main menu" button or the like may be displayed to the player at all times, permitting the player to return to a display including the various interfaces B106.

In some embodiments, when the player has completed use of the PGD B24, the player returns the PGD B24 to the gaming operator. For example, the player may return the PGD B24 to a cashier cage or a game service operator. In various embodiments, the game service operator or other party then issues the player a ticket for any credit or value which remains in the player's account. The PGD B24 may then be deactivated so that it readied for use by another player. In some embodiments, the PGD B24 may be deactivated by turning its power off In some embodiments, a "logout" interface or option may be provided which causes the PGD B24 to return to a default state seeking the login of a player or user.

The PGD B24 may be used by a game service operator. Several examples of a method of such use are detailed below in conjunction with FIGS. 29 and 30.

When a game service representative contacts a game player seeking a game service in the game playing area B70 (see FIG. 29), the game service representative uses an appropriate game service interface on the display screen of the PGD B24, as described with reference to FIG. 31, to provide the game service requested by the game player. For example, when a game player requests an EZ pay ticket validation, the game service representative brings the EZ pay ticket validation interface onto the display screen of the PGD B24 using menus available on the display screen B102. Then, the game service representative scans the EZ pay ticket using a ticket reader connected to the PGD B24 to obtain unique ticket information. Next, the PGD B24 sends an EZ pay ticket validation request using the wire-less communication interface to the EZ pay server B26.

In various embodiments, the ticket validation request is composed of one or more information packets compatible with the wire-less communication standard being employed. Using a wireless link B72, the one or more information packets containing the ticket validation request are sent to the transceiver B62 connected to the EZ pay server. The transceiver B62 is designed to receive and send messages from the one or more PGDs B24 in the game playing area B70 in a communication format used by the PGDs. Depending on the location of the PGD B24 in the game playing area B70, the communication path for the information packets to and from the PGD B24 may be through one or more wire-less communication relays including B58 and B60. For example, when the PGD B24 is located near gaming machine B22*a*, the communication path for a message from the PGD B24 to the EZ pay server B26 may be from the PGD B24 to the relay B60, from the relay B60 to the relay B58, from the relay B58 to the transceiver B62 and from the transceiver B62 to the EZ pay server B26. As the location of the PGD B24 changes in the game playing area B70, the communication path between the PGD B24 and the EZ pay server B26 may change.

After receiving an EZ pay ticket validation reply from the EZ pay server B26, the EZ pay ticket may be validated using an appropriate display screen on the PGD B24. After cashing out the ticket, the game service representative may send a confirmation of the transaction to the EZ pay server B26 using the PGD B24. The transaction history for the PGD B24 may be stored on the PGD B24 as well as the EZ pay server B26. Next, a receipt for the transaction may be printed out. The receipt may be generated from a portable printer carried by the game server representative that may be connected to the PGD B24 in some manner or the receipt may be generated from a printer B56 at a fixed location, etc.

After providing a number of game services comprising a number of game service transactions to different game players in the game playing area B70 using the PGD B24, a game service representative may log-off of the PGD B24 and return it to location for secure storage. For example, at the end of a shift, the game service representative may check the PGD B24 at some of the locations, the device is unassigned to the particular game service representative and then may be assigned to another game service representative. However, before the PGD B24 is assigned to another game service representative, the transaction history stored on the PGD B24 may be reconciled with a separate transaction history stored on a transaction server such as the EZ pay server B26.

The assigning and unassigning of the PGD B24 to a game service representative and the transaction reconciliation are performed for security and auditing purposes. Another security measure which may be used on the PGD B24 is a fixed connection time between the PGD B24 and a transaction server. For example, after the PGD B24 has been assigned to a game service representative and the game service representative has logged on the PGD B24, the PGD B24 may establish a connection with one or more transaction servers including the EZ pay server B26, a server B28, a server B30, or a server B32. The connection between a transaction server and the PGD B24 allows the PGD B24 to send information to the transaction server and receive information from the transaction server. The length of this connection may be fixed such that after a certain amount of time the connection between the PGD B24 and the transaction server is automatically terminated. To reconnect to the transaction server, the login and registration process must be repeated on the PGD B24.

A transaction server may provide one or more game service transactions. However, the PGD B24 may connect with multiple transaction servers to obtain different game service transactions. For example, server B30 may be a prize transaction server allowing prize service transactions and server B415 may be a food transaction server allowing food service transactions. When a game service representative receives a prize service request from a game player, the PGD B24 may be used to contact the prize transaction server B30 using a wire-less communication link between the PGD B24 and a transceiver B64 connected to the prize transaction server B30. Similarly, when a game service representative receives a food service request from a game player, the PGD B24 may be used to contact the food transaction server B32 using a wire-less communication link between the PGD B24 and a transceiver B66 connected to the food transaction server B32.

The different transaction servers including the servers B26, B28, B30, B32 may be on separate networks or linked in some manner. For example, server B32 is connected to network B74, server B26 is connected to network B38, server B30 is connected to network B76, and server B28 is connected to network B78. In this embodiment, a network link B80 exists between network B76 and network B38. Thus, server B26 may communicate with server B30 via the network link B80. A communication link between different servers may allow the servers to share game service transaction information and allow different communication paths between the PGDs and the transaction servers. Likewise, a network link B82 exists between network B78 and network B38, permitting the game server to communicate with the EZ pay server B26.

Figure 33:
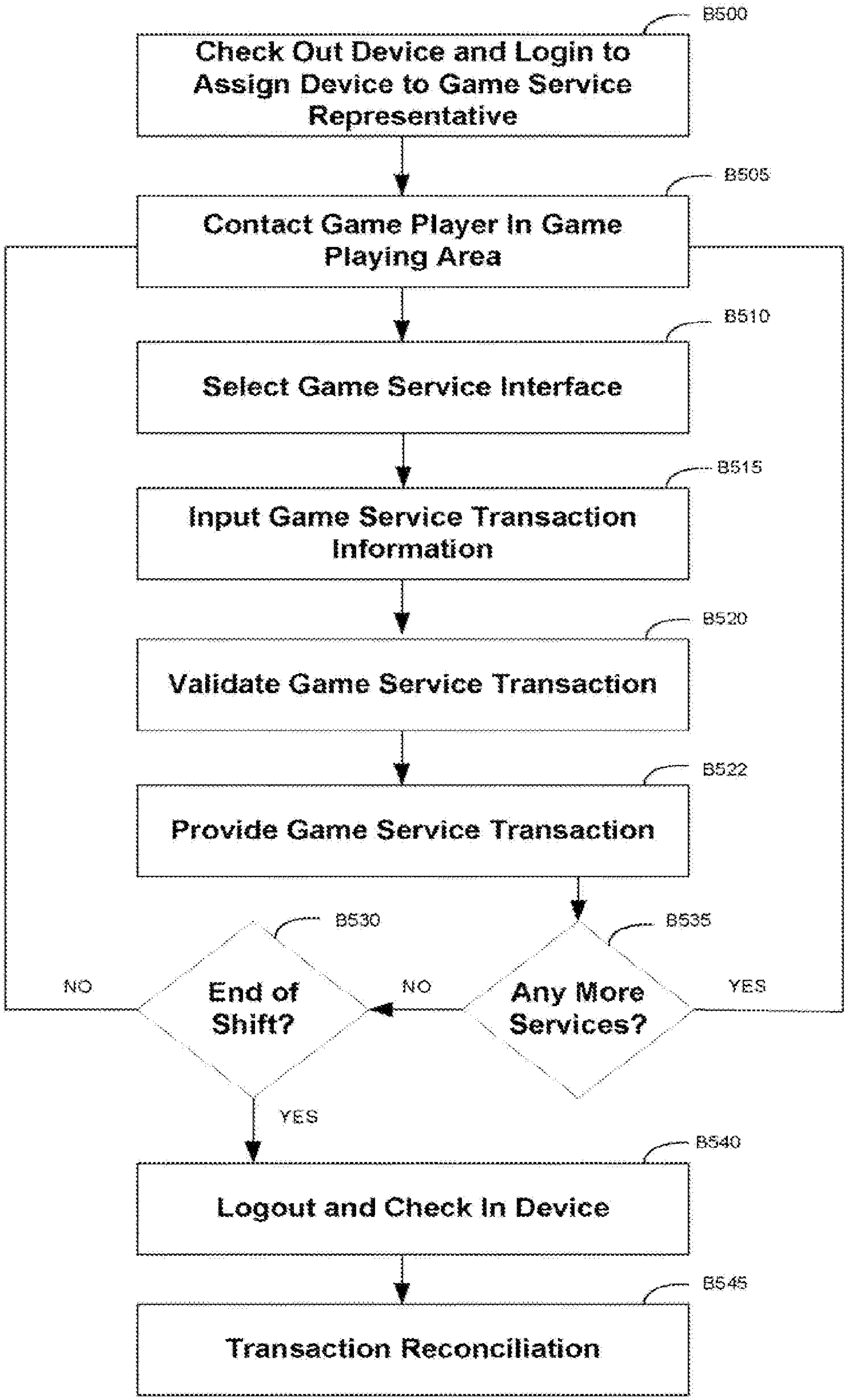
FIG. 33 is a flow diagram of a method of use of the portable gaming device by a gaming service operator, according to some embodiments.

FIG. 33 is a flow chart depicting a method for providing a game service using a hand-held device. In step B500, a game service representative receives the PGD B24 and logs in to the device to assign the device. The check out process and assign process are for security and auditing purposes. In a step B505, the game service representative contacts a game player in the game playing area requesting a game service of some type. In a step B510, the game service representative selects an appropriate interface on the PGD B24 using menus on the display screen B102 of the PGD that allow the game service representative to provide a requested game service. In a step B515, the game service representative inputs game service transaction information required to perform a game service transaction. For example, to validate an award ticket, the game service representative may read information from the ticket using a ticket reader. As another example, to provide a food service including dinner reservation, the game service representative may enter a game player's name to make the reservation.

In a step B520, the transaction information obtained in step B515 is validated as required. For example, when a player attempts to cash out an award ticket, the information from the award is validated to ensure the ticket is both genuine (e.g. the ticket may be counterfeit) and has not already been validated. The validation process may require a number of transfers of information packets between the PGD B24 and the transaction server. The details of the validation process for an award ticket validation are described with reference to FIG. 34. When the transaction information is valid, in a step B522, a game service transaction is provided. For example, a room reservation may be made for a player requesting an accommodation service. A confirmation of the game service transaction may be sent to the transaction server for transaction reconciliation in a step B545. In one or more embodiments, the method may include the step of generating a receipt regarding the game service transaction.

In a step B535, after providing the service, a game player may request another game service. When a game player requests an additional game service, the game service representative returns to step B510 and selects an appropriate interface for the game service. When a game player does not request an additional service and it is not the end of a shift, in a step B530, the game service representative returns to step B505 and contacts a new game player. In a step B540, when a shift has ended, the game service representative logs out of the PGD B24 and checks the device at a secure location so that the PGD may be assigned to a different game service representative. In step B545, before the PGD B24 is assigned to a different game service representative, a transaction history reconciliation is performed to ensure that the transaction history stored on the PGD is consistent with the transactions previously confirmed with a transaction server during the game service representative's shift. The transaction history on the PGD B24 may be stored on a removable memory storage device on the PGD. Thus, the memory may be removed from the device for transaction reconciliation and replaced with a new memory. Thus, the device with the new memory may be assigned to a new game service representative while the transaction history from the previous game service representative assigned to the device is reconciled.

Figure 34:
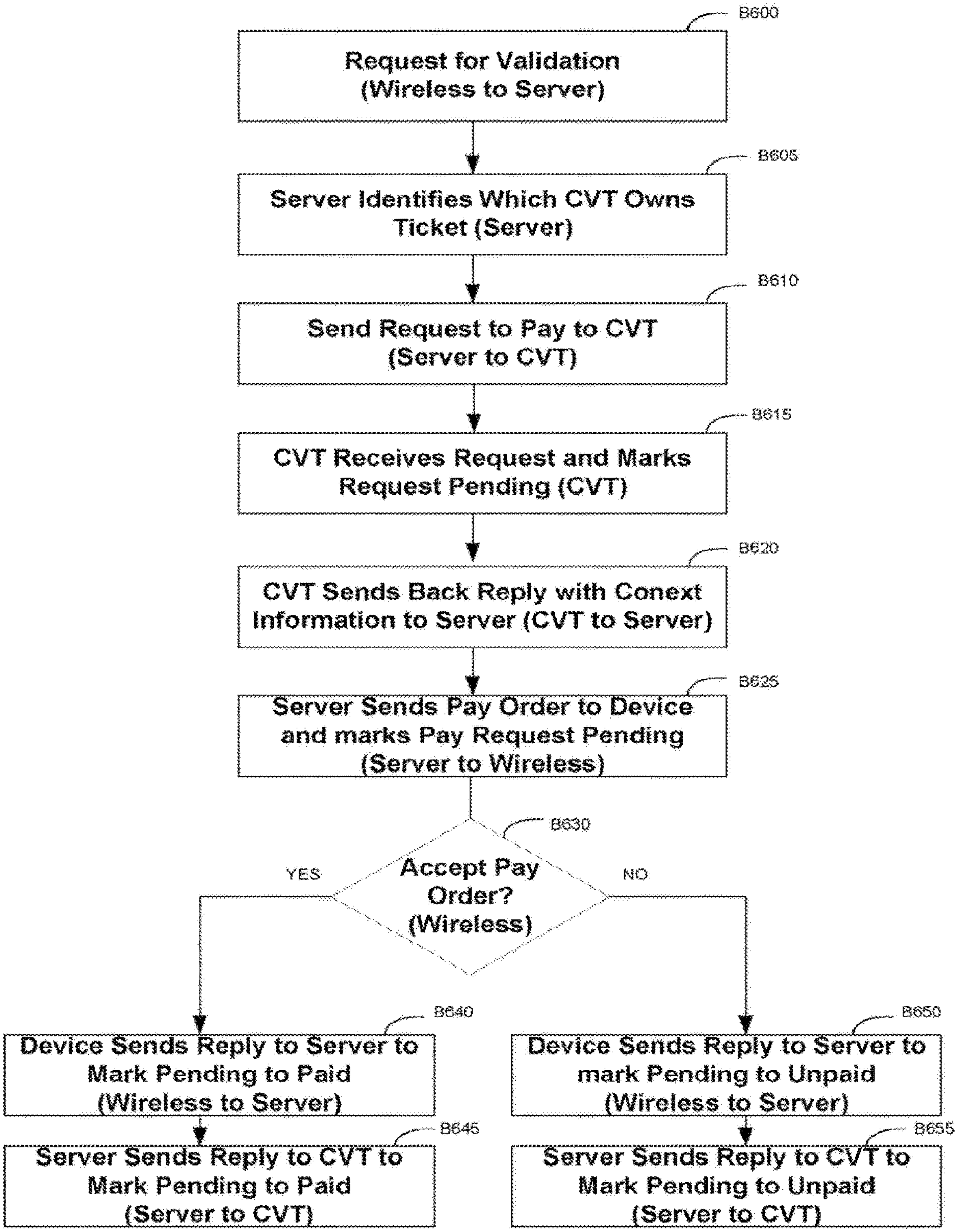
FIG. 34 is a flow diagram of a method of use of the portable gaming device according to some embodiments.

FIG. 34 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In a step B600, a request for game service transaction information read from a ticket is sent via a wire-less communication interface on the PGD B24 to the appropriate transaction server as described with reference to FIG. 29. In a step B605, the server identifies which clerk validation ticket (CVT) B34,B36 owns the ticket. When a CVT owns a ticket, the CVT has stored information regarding the status of a particular ticket issued from a gaming machine connected to the CVT B34,B36. In a step B610, the server sends a request to pay the ticket to the CVT identified as the owner of the ticket. Typically, the pay request indicated a service on the ticket has been requested. For a cash ticket, a pay request means a request to cash out the ticket has been made. For a free meal, a pay request means a request to obtain the meal has been made. In a step B615, the CVT receives the pay request for the ticket and marks the ticket pending. While the ticket is pending, any attempts to validate a ticket with similar information is blocked by the CVT.

In a step B620, the CVT B34,B36 sends back a reply with context information to the server. As an example, the context information may be the time and place when the ticket was issued. The information from the CVT to the server may be sent as one or more data packets according to a communication standard shared by the CVT and server. In a step B625, after receiving the validation reply from the CVT, the server marks the pay request pending and sends a pay order to the PGD B24. While the pay request is pending, the server will not allow another ticket with the same information as the ticket with the pay request pending to be validated.

In a step B630, the game service representative may choose to accept or reject the pay order from the server. When the game service representative accepts the pay order from the server, in a step B640, the PGD B24 sends a reply to the transaction server confirming that the transaction has been performed. The transaction server marks the request paid which prevents another ticket with identical information from being validated. In a step B645, the server sends a confirmation to the CVT which allows the CVT to mark the request from pending to paid. When the game service representative rejects the pay order from the server, in a step B650, the PGD B24 sends a reply to the server to mark the pay request from pending to unpaid. When the ticket is marked unpaid, it may be validated by another PGD B24 or other validation device. In a step B655, the server sends the reply to the CVT to mark the pay request from pending to unpaid which allows the ticket to be validated.

In one or more embodiments, a ticket may be used to provide credit/value for establishing entitlement to a service or a good, such as the right to play a game or obtain food. The PGD B24 may include a card reader B140. In such an arrangement, a user of the PGD B24 may use a credit card or other magnetic stripe type card for providing credit/value. In various embodiments, the PGD B24 may include one or more other types of devices for obtaining/receiving information, such as a smart card reader. In such arrangements, the PGD B24 device may read information from the credit card, smart card, or other device. These cards may comprise the well-known credit or debit cards. This information may be used to provide the credit/value. In the example of a credit card, the user's account information may be read from the card and transmitted from the PGD B24 to the controller B42. Credit card/credit validation information may be associated with a credit card server (not shown). This credit card server may be associated with a bank or other entity remote from the casino or place of use of the PGD B24 and the controller B42. A communication link may be provided between the controller B42 and remote server for sending credit card information there over.

In some embodiments, when a player utilizes a smart card or credit card the amount of associated credit or value may be transmitted to the EZ Pay server B26, and then the credited amount may be treated in exactly the same manner as if the credit/value had been provided by a ticket. When a player wishes to cash out, the EZ Pay server B26 has a record of the original amount credited and the amounts of any awards, losses, or payments, and may then issue the player a ticket representing the user's total credit.

In accordance with various embodiments, a gaming system is provided which includes one or more portable gaming devices. The portable gaming devices permit a player to play one or more games at a variety of locations, such as a hotel room, restaurant, or other location. These locations may be remote from traditional gaming areas where free-standing, generally stationary gaming machines are located.

In one or more embodiments, a player may use the portable gaming device to not only play games but obtain other products and services. In addition, in one or more embodiments, the portable gaming device may be used by game service representatives to perform a variety of functions and provide a variety of services to a player.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Wireless Interactive System

According to various embodiments, a wireless interactive gaming system includes one or more wireless gaming devices, a receiver, and a central processor. The wireless interactive gaming system may also include a terminal which is in communication with the central processor.

In a gaming environment that employs a wireless interactive gaming system, a player may receive a wireless gaming device from a game official who represents a gaming establishment or the "house". The wireless gaming device is capable of receiving wager information as commands entered by the player and transmitting the received wager information along with identification information to the receiver by wireless transmission.

The wireless interactive gaming system may support a number of wireless gaming devices within one gaming establishment. In some embodiments, the range for the wireless transmission from a wireless gaming device may be up to 100 feet. In other embodiments, the range may be any desired distance.

According to various embodiments, a player inputs information into a wireless gaming device, e.g., by pressing push buttons or keys on the device. The wireless gaming device may include any number, e.g. from 5 to 20, of buttons in a keypad-type arrangement. Buttons may be marked with the digits 0 through 9 and may also include a "$" (dollar sign) key and an "enter" key, so that the player may easily input wager information. In various embodiments, the wireless gaming device includes at least eight player selection buttons (e.g., digits) and at least five special function buttons, (e.g., to request the player's balance). In various embodiments, the player can input some or all of the wager information into the wireless gaming device by swiping a smart card, which contains a microprocessor chip or a magnetic stripe with encoded information, through a smart card reader on the wireless gaming device.

In various embodiments, the wireless gaming device may include an identifier. The identifier may be, e.g., a series of alphanumeric characters, a bar code, or a magnetic stripe affixed to the device. In various embodiments, the identifier may be a digital code stored in a secure memory, e.g., an electronically erasable programmable read only memory (EEPROM). The identifier may thus be readable directly by the game official if it is a series of alphanumeric characters, or it may be read automatically by a bar code reader or a magnetic stripe reader. In various embodiments, the identifier may be programmed in EEPROM or read from EEPROM through an RS-232 port, which may be directly connected to encoder and decoder circuitry in a terminal.

A wireless gaming device may store an encryption key. The encryption key may be used to encrypt information that is transmitted to the receiver from the device. Encryption of the information transmitted to the receiver may limit tampering with the wireless gaming device and may prevent unauthorized or counterfeit devices from being used with the system.

In various embodiments, the encryption key may be stored in the EEPROM. The EEPROM may have the advantage of being a memory device which is difficult to access if the appropriate encoding circuitry is not available. Thus, it is contemplated that the encoding circuitry that downloads the encryption key into the device may be securely held by the game official.

Alternately, the encryption key stored in the EEPROM may be updated and changed for each player who receives a wireless gaming device by directly connecting the device to encoding and decoding circuitry in the terminal through a port at the time the wireless gaming device is delivered to the player. Moreover, other digital information related to the game being played may be downloaded from the terminal to the EEPROM through a direct connection with the wireless gaming device.

In various embodiments, a microprocessor controls the operation of a wireless gaming device. The microprocessor receives digital wager information entered by the player using buttons or keys of the wireless gaming device. The microprocessor stores an identification code associated with the wireless gaming device that is a digital equivalent of the identifier of the wireless gaming device. The microprocessor also executes software applications for encrypting the identification code and the player's wager information for transmission to the receiver. The software contains an algorithm that encrypts a data packet including the identification code and wager information using the encryption key.

In various embodiments, a wireless gaming device has a unique address, i.e. identification code, for communications with the receiver and stores a player identification that is programmed into the device by the central processor. The wireless gaming device may include a wager amount register, which is maintained and updated using the keys on the device. The value stored in the wager amount register may be included in transmissions from the device to the central processor. The value of the wager amount register may default to a predetermined value, e.g. $1, when the device is initialized, and can be further adjusted by the player. The wireless gaming device may also include an account balance register, which is maintained in the device and is updated by the central processor periodically. The value of the account balance register should default to $0 when the device is initialized.

The wireless gaming device may include player function keys. The player function keys may be used to accomplish the following functions:

1. Transmit a message to the receiver;
2. Request account balance information;
3. Adjust the state of the device;
4. Affect the data to be sent in the next transmitted message;
5. Increment the wager amount register by a predetermined amount, e.g., $10, $5 or $1;
6. Reset the wager amount register to the default value, e.g., $1.

The firmware of the wireless gaming device may only allow for one press of buttons or keys every 100 ms. In various embodiments, key presses are not queued; thus, when a key press message is queued to be sent, no other player input is accepted until the queued message has been sent.

The wireless gaming device may include a transmitter. The transmitter may receive encrypted digital information from the microprocessor and convert it to a signal for wireless transmission to the receiver. The transmitter transmits signals wirelessly, e.g., using radio frequency signals or infrared signals. Communications between the receiver and the wireless gaming device may be asynchronous at 2400 bits per second.

The wireless gaming device may include an identifying circuit that drives the transmitter to periodically send an identification signal to the receiver. The use of the identifying circuit permits the receiver and the central processor to be assured that the wireless gaming device is still active, functioning, and present in the gaming establishment. Thus, if the wireless gaming device were removed from the gaming establishment, the receiver and central processor would no longer receive and detect the periodic identification signal sent by the identifying circuit and the transmitter, and the game official may be alerted that the wireless gaming device has been removed from the gaming establishment.

The wireless gaming device may contain a real-time clock that permits the microprocessor to monitor the current time and date. The clock may consist of a timing circuit. The microprocessor can use the time and date information obtained from clock to perform calculations and other functions based on the current time and date.

The wireless gaming device may also include a tag, such as an electronic or magnetic component, which activates an alarm when passed through a sensing apparatus located at the entrance and/or exit of the gaming establishment. Activation of the alarm by passing the wireless gaming device with the tag through the sensing apparatus notifies the game official of an attempted removal of the wireless gaming device from the gaming establishment.

The wireless gaming device may be powered by a battery source contained within the device. A portable power source such as battery source permits extended cordless operation of the wireless gaming device throughout a gaming environment. The battery source may be part of a removable, rechargeable battery pack that allows the device to be recharged when it is not in use.

In some embodiments, the wireless gaming device displays information such as game information on a device display, such as a liquid crystal display (LCD) with a back-light. The LCD can be used to display the values stored in the wager amount register and in the account balance register. The wireless gaming device may include a display receiver which receives digital information transmitted from the receiver or from the central processor.

The device may also include a bicolor light emitting diode (LED) and/or multiple differently colored LEDs. The bicolor LED is capable of displaying at least two colors, e.g., red and green. The green light may flash each time the wireless gaming device sends a transmission to the receiver, for a period of time to ensure that it is visible to the player. The red light may illuminate when a key is pressed on the wireless gaming device, and remain lit until the transmission is received by the receiver; no additional key entry will be enabled when the red light is lit. The wireless gaming device may also include additional light emitting diodes, for example to indicate when the account balance register is being updated and the balance information is being displayed on the LCD.

The receiver is capable of receiving signals transmitted from the transmitter in the wireless gaming device. The receiver contains a decoder, which converts the received signals, e.g., into digital information. This digital information contains at least the identification code of the wireless gaming device and the player's wager information. The receiver sends the digital information obtained by the decoder to the central processor. Communications between the central processor and the receiver may be by an RS-232 electrical interface data serial communications link, with communications being asynchronous at either 9600 or 19,200 bytes per second, in various embodiments.

The receiver may receive signals from many wireless devices either simultaneously or in rapid succession, e.g., using multiplexing techniques, so that many players can place wagers using their wireless gaming devices during a short time interval. The receiver differentiates signals received from the various devices by the identification codes which are present in the signals received by the receiver.

The central processor receives the identification code of a wireless gaming device and the player's wager information from the receiver. The central processor also decrypts this information using the encryption key. The central processor is capable of receiving data from multiple wireless gaming devices in an apparently simultaneous manner.

In various embodiments, an account for the player is stored in a database of the central processor. The database stores the monetary value of the balance of the account associated with the identifier of the wireless gaming device.

The central processor manages the player's account in the database based on signals received from the player's wireless gaming device as the player places wagers and when prizes are awarded during play of the game. The central processor subtracts money from the player's account balance when the player places a wager. The player's account balance may be automatically increased by the central processor when the player wins a game on which he has placed a wager.

The central processor also stores and is capable of executing software applications containing algorithms to calculate players' account balances, wagers, and winnings. The central processor should be able to execute all of the algorithms which define the actions performed on the players' accounts during the progress of the game, as wagers are entered, as winnings paid out, and when funds are added to the players' accounts.

Algorithms in the software in the central processor may also calculate odds and payouts for certain games, such as lottery-type games, during play of the game. The odds and payouts at a particular point in time may depend on the characteristics of the game being conducted by the central processor and may change as the game progresses. These algorithms may be executed by the central processor to provide exact calculations of the odds of specific game events occurring and the associated prizes for a player's correctly predicting the occurrence of one of those events. The algorithms may be executed continuously, so that real-time odds and payout can be calculated as the game progresses.

The central processor may perform various actions on players' accounts, resulting in various impacts on the accounts. For example, if the player wins a game, his account is credited for the payout based on his wager. If the player places a wager using the wireless gaming device, his account is debited by the amount of the wager. If the game official receives additional funds from the player, the balance of the player's account is credited by the amount of the funds. If the game official closes the player's account and disburses funds to him, the balance of the player's account is debited by the amount disbursed.

The central processor may be located in the gaming establishment that houses the receiver. In various embodiments, the central processor may be located remotely from the receiver, communicating with the receiver via electronic digital telephone communication or wireless transmission, such as a serial communication link. Additionally, the central processor may perform a multitude of functions for various receivers in a variety of gaming environments.

In some embodiments, communication among the central processor, the receiver, and the wireless gaming device involves a polling scheme. Polling enables many wireless gaming devices to communicate with a receiver without interference between them. Such a polling scheme may include the transmission of digital signals in the form of strings of hexadecimal characters. Preferably, all communications between the central processor, the receiver and the wireless gaming device are encrypted.

In such a polling scheme, hexadecimal characters may be reserved for specific control protocols. For example, an attention character is a header character used to begin all transmissions from the central processor to the receiver and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

In the polling scheme described above, there are three different modes of communication over the link between the central processor and the receiver. First, the central processor may send messages intended for the receiver. Second, the central processor may send messages intended for the wireless gaming device. Third, the wireless gaming device may send messages intended for the central processor. In various embodiments, messages sent by the central processor may be in the form of a character string formatted with a header character, followed by the identification code of the intended device, the command or message, an end of message character, and a checksum character. Messages received by the receiver, or the wireless gaming device may be acknowledged by transmission of an acknowledgement character, but the central processor need not acknowledge messages sent from the wireless gaming devices. Messages sent by the central processor to be received by the wireless gaming device may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by the central processor to the receiver and the wireless gaming device include the following:

1. Send a device address list to the receiver;
2. Send account balance information to the addressed device;
3. Send command to disable the addressed device;
4. Send command to enable the addressed device.

In various embodiments, messages sent between the receiver and the wireless gaming device may be in the form of a character string formatted with a header character, followed by the identification code of the intended device, the current wager amount, the request, command or data, an end of message character, and a checksum character. Command codes for requests, commands and data sent between the receiver and the wireless gaming device include the following:

1. Read user identification;
2. Read device address;
3. Read balance register;
4. Read wager amount register;
5. Provide device status;
6. Write user identification;
7. Write device address;
8. Write balance register;
9. Write wager amount;
10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte, and the most significant byte, allowing for the use a greater range of numbers for these values.

Various embodiments include methods by which the central processor communicates with a wireless gaming device. The central processor transmits a string of hexadecimal characters, including, e.g., a header character, followed by the device's identification code, followed by a request, command or data, followed by an end of message character, followed by a checksum character. After the central processor transmits the character string, the wireless gaming device receives the string, recognizes its identification code, and executes any instructions in the string. When the central processor sends an instruction to all wireless gaming devices simultaneously, all currently active devices receive and execute the instruction. The wireless gaming device does not send an acknowledgement message to the central processor, although the receiver may receive a transmission from the wireless gaming device that the instruction was received properly. The central processor also communicates with the receiver in a similar manner, except that the receiver may send an acknowledgement message to the central processor which includes the acknowledgement control protocol character.

Similarly, the wireless gaming device communicates with the receiver and the central processor using, e.g., hexadecimal character strings. The receiver regularly and periodically polls the active wireless gaming device for information requests or wagering requests. If the player has entered a request into the wireless gaming device since the last time the wireless gaming device was polled, then the player's request will be transmitted to the receiver.

Various embodiments include methods by which the wireless gaming device receives and relays player requests to the central processor. First, the player enters a request into the wireless gaming device using buttons or keys. The player then presses a button labeled, e.g., "enter" or "send," instructing the wireless gaming device to send the request the next time the receiver polls the wireless gaming device. When this button has been pressed, the red light of the bicolor LED is illuminated, thereby informing the player that the request is waiting to be sent. The request is converted into a hexadecimal character string, including, e.g., a header character, an identification code (or, alternatively, a separate identification string reserved for a specific player), the current wager amount, the player's request (e.g., to change the wager amount or to send a balance update), an end of message character, and a checksum character. The next time the receiver polls the device, the transmitter of the device transmits the character string to the receiver. When the wireless gaming device is polled by the receiver, the green light of the bicolor LED flashes, informing the player that the request has been transmitted. The receiver receives the request string and transmits the string to the central processor. The central processor then acts on the player's request.

Using the terminal, the game official may process wagering transactions and distribute wireless gaming devices. In various embodiments, the terminal may include a bar code reader and/or a magnetic stripe reader for rapid entry of the identifier of a wireless gaming device prior to delivering the wireless gaming device to the player. Reading devices provide information in the form of digital data to the terminal. The terminal includes a keyboard by which the game official can manually enter data to be sent to the central processor. Using either reading device, the keyboard, or a combination of these, the game official communicates with the central processor to establish a player's account, increase the balance of the account when the player tenders funds to the game official, and decrease the balance of the account when the player seeks to collect the cash value of his account balance.

The player establishes a balance of the account associated with his wireless gaming device, identified by an identifier, when he receives the wireless gaming device from the game official. The player may increase the monetary value of the balance of the account by paying additional funds, in the form of cash or credit, to the game official, who accesses the account stored in the central processor through the terminal to increase the balance of the account.

The wireless gaming device is returned to the game official after the player has played one or more games. The readers may be used to read the identifier for closing out the player's account stored in the database of the central processor. The terminal includes a terminal display which notifies the game official of the balance of the player's account, so that the player may be paid the cash value of the remaining balance of his account.

In some embodiments, an account status display device is located in the gaming establishment to display players' account information. In various embodiments, the display device may be, e.g., a liquid crystal display or a cathode ray tube display. The display device is controlled by the central processor, which sends information to the display device for display to the players.

A player may look at the display device to confirm that wagers transmitted from the wireless gaming device were received by the receiver and sent to the central processor, to determine the monetary balance of the player's account, and to verify that the player's winnings have been credited to his account. The display device displays key information necessary for a player to participate in a game. The information displayed for each player may include the account number, the player's account balance, the player's last wager, and the player's last prize award or win.

The display device is divided into specific areas, e.g., a display area, each area showing the account information for one player. The size of the display area may be determined by the size of the display device and the number of players who possess wireless display devices. It is contemplated that only active accounts will be displayed on the display device. If additional display devices are required to display the information concerning a large number of accounts, the central processor may be configured to drive multiple similar display devices.

The display device may also be used to display the odds and payouts for game wagers. Alternately, a separate display device driven by the central processor may be used to display the odds and payout information. Further, the odds and payouts may be displayed on the device display 21.

Procedures for using the wireless interactive gaming system, according to some embodiments, are now described. In some embodiments, a player tenders money in the form of cash or credit, e.g., $100, to a game official in the gaming establishment to establish an account. The game official chooses a wireless gaming device and uses, e.g., the bar code reader on the terminal to enter the identifier of the wireless gaming device into the terminal. The game official also inputs the amount of money tendered, i.e. $100, into the terminal via keyboard. The game official hands the wireless gaming device to the player and tells the player that his account is, e.g., Account No. 12. Alternately, the player may identify his account number directly from the identifier on the wireless gaming device. The information entered by the game official into the terminal is sent to the central processor, which establishes an account record for the player in the database.

For this example, the central processor may be conducting a racing game in which players choose a winning racing element on which to place a wager for the next racing game to be displayed in the gaming establishment. To place a wager, the player presses buttons on the wireless gaming device.

In some embodiments, the player first presses the button that corresponds to the number assigned to the racing element that he chooses, e.g., “3”, and then the wager amount, e.g., “$” and “5”, for a $5 wager. The player then presses the “enter” key to transmit his wager to the central processor.

In an alternate embodiment, the game may be simplified so that all wagers are placed for a fixed amount, e.g., $1, by pressing a single button on the wireless gaming device. By pressing the button that corresponds to the number assigned to the chosen racing element, e.g., “3”, the player places a $1 bet on racing element number 3. The player can then place a larger wager on racing element number 3, by pressing the “3” button the number of times corresponding to the number of $1 bets he desires to make, e.g., by pressing “3” five times to wager $5 on racing element number 3.

Each time the player enters a wager, the wireless gaming device forms a data packet containing the player’s wager information and the identification code of the wireless gaming device. The data packet is encrypted and transmitted by the transmitter via wireless communication.

The decoder in the receiver receives the encrypted data packet transmitted by the transmitter. The encrypted data packet is sent to the central processor, where it is decrypted. The central processor uses the information it has obtained to update the player’s account in the database by subtracting the wagered amount from the player’s account balance and registers the player’s wager on the game.

After the game has been played, the central processor awards prizes to winning players based on the wagers they have made, and the odds associated with the winning outcome of the game. If the player in possession of the wireless gaming device is a winner, the central computer updates the player’s account in the database by adding the monetary amount of the prize to the player’s account balance. Otherwise, the player’s account remains unchanged.

When the player has finished playing games in the gaming establishment, he returns the wireless gaming device to the game official. The game official again inputs the identifier of the wireless gaming device into the terminal, e.g., by using the bar code reader of the terminal. The terminal accesses the player’s account information stored in the database of the central processor to obtain the player’s remaining account balance. The terminal display displays the player’s remaining account balance to the game official, who then tenders the monetary value of that amount to the player. The account is closed, and the transaction is recorded in the central processor.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

Hand-Held Wireless Game Player

Various embodiments include a hand-held wireless game player for playing a game of chance. The hand-held wireless game player may be generally characterized as including: 1) a wire-less communication interface; 2) a display screen; 3) one or more input mechanisms; and 4) a microprocessor configured i) to present the game of chance on the display screen using operating instructions received via the wireless communication interface from a master gaming controller located on a gaming machine and ii) to send information from input signals generated from the one or more input mechanisms to the master gaming controller via the wireless communication interface. The wireless game player may be played in a plurality of venue locations physically separate from the location of the gaming machine where the plurality of venue locations are selected from the group consisting of a keno parlor, a bingo parlor, a restaurant, a sports book, a bar, a hotel, a pool area, and a casino floor area. The game of chance played on the wireless game player may be selected from the group comprising of slot games, poker, pachinko, multiple hand poker games, pai-gow poker, blackjack, keno, bingo, roulette, craps, and a card game. Other games are also contemplated, in various embodiments.

In various embodiments, the wireless communication interface may use a wireless communication protocol selected from the group consisting of IEEE 802.11a, IEEE 802.11b, IEEE 802.11x, hyperlan/2, Bluetooth, and HomeRF. The wireless game player may also comprise a wire network interface for connecting the wireless game player to a wire network access point. In addition, the wireless game player may also comprise a peripheral interface for connecting to a peripheral gaming device where the peripheral interface is a serial interface, a parallel interface, a USB interface, a FireWire interface, an IEEE 1394 interface. The peripheral gaming device may be a printer, a card reader, a hard drive, and a CD-DVD drive.

In various embodiments, the one or more inputs mechanisms on the wireless game player may be selected from the group consisting of a touch screen, an input switch, an input button, and biometric input device where the biometric input device may be a fingerprint reader. The wireless game player may also include a detachable memory interface designed to receive a detachable memory where the detachable memory unit stores graphical programs for one or more games of chance played on the wireless game player. The wireless game player may also comprise one or more of the following: 1) an audio output interface for receiving a head phone jack, 2) an antenna, 3) a sound projection device, 4) a battery, 5) a power interface for supplying power to the wireless game player from an external power source and for charging the battery from the external power source, 6) a memory unit where the memory unit may store graphical programs for one or more games of chance played on the wireless game player, 7) an electronic key interface designed to receive an electronic key, and 8) a video graphics card for rendering images on the display screen where the video graphics card may be used to render 2-D graphics and 3-D graphics.

It should be understood that the foregoing descriptions encompass but some of the implementation technologies that may be used, according to various embodiments. Other technologies may be used and are contemplated, according to various embodiments. Various embodiments may be performed using any suitable technology, either a technology currently existing or a technology which has yet to be developed.

INCORPORATION BY REFERENCE

The following are incorporated by reference herein:

U.S. Pat. No. 6,676,522;

U.S. Pat. No. 6,846,238;

U.S. Pat. No. 6,702,672.

Casino Electronic Games

Reference numerals below, until otherwise specified, refer only to FIG. 35 through FIG. 40.

Play of the Game

Figure 35:
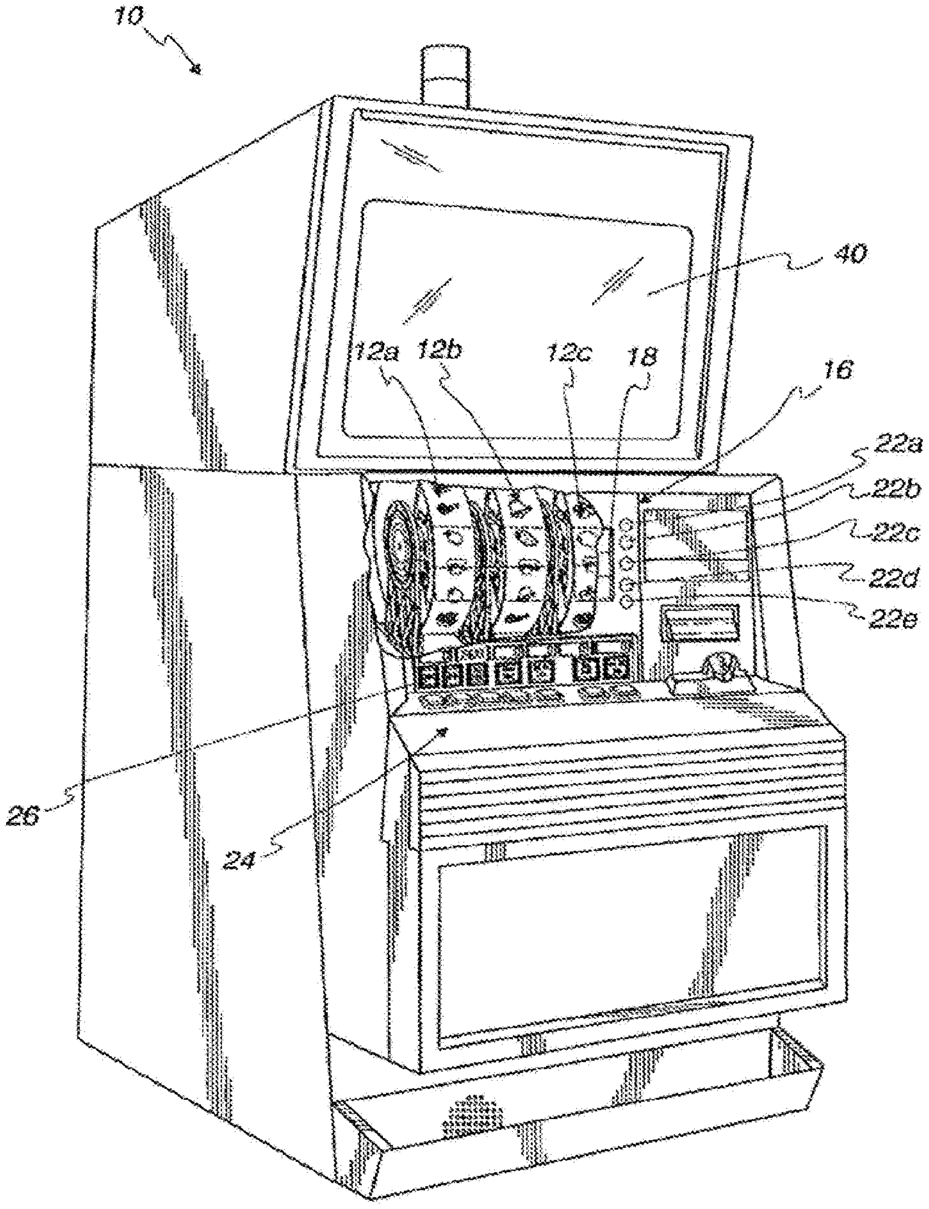
FIG. 35 shows an embodiment of a spinning reel slot machine.

FIG. 35 shows an embodiment of a spinning reel slot machine 10. The slot machine comprises a plurality of mechanical rotatable reels 12*a*, 12*b*, 12*c* and a video display (see FIGS. 36*a* and 36*b*). In response to a wager, the reels 12*a*, 12*b*, 12*c* are rotated and stopped to randomly place symbols on the reels in visual association with a display area 16. Payouts are awarded based on combinations and arrangements of the symbols appearing in the display area 16. The video display provides a video image 18 occupying the display area 16 and superimposed on the reels 12*a*, 12*b*, 12*c*. The video image 18 may be interactive with the reels 12*a*, 12*b*, 12*c*, may be static or dynamic, and may include such graphics as payout values, a pay table, pay lines, bonus game features, special effects, thematic scenery, and instructional information. In the illustrated embodiment, the slot machine 10 is an "upright" version in which the display area 16 is oriented vertically relative to the player. Alternatively, the slot machine 10 may be a "slant-top" version in which the display area 16 is slanted at about a thirty degree angle toward the player of the slot machine 10.

Figure 36A:
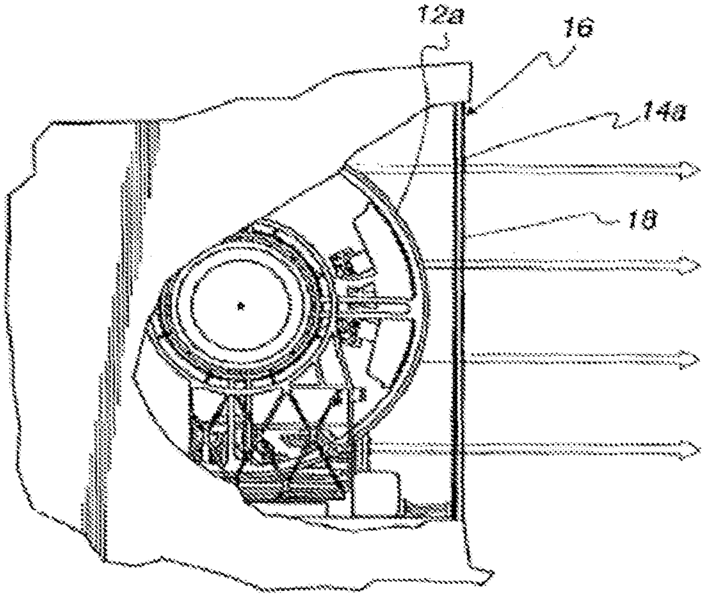
FIG. 36*a* shows a direct video image in a display area, according to some embodiments.
Figure 36B:
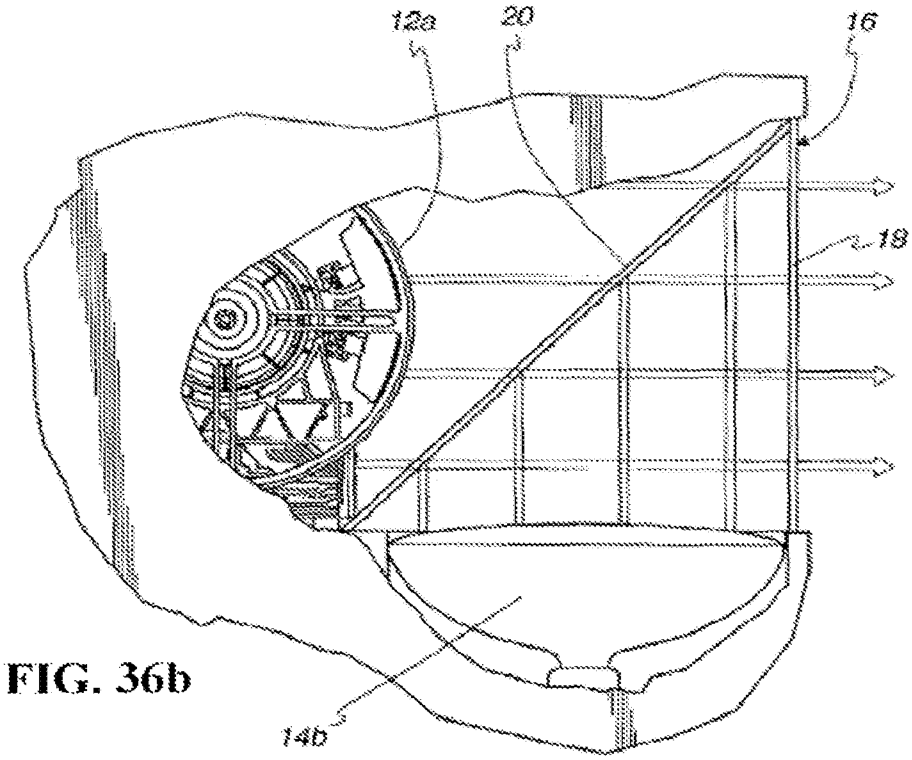
FIG. 36*b* shows a virtual video image in a display area, according to some embodiments.

Referring to FIGS. 36*a* and 36*b*, the video image 18 in the display area 16 may be either a direct image (FIG. 36*a*) or a virtual image (FIG. 36*b*), in various embodiments. If the video image 18 is a direct image, as in FIG. 36*a*, the direct image may be generated by a flat panel transmissive video display 14*a* positioned in front of the reels 12*a*, 12*b*, 12*c*. The transmissive display 14*a* may, for example, be a transmissive liquid crystal display (LCD) commercially available from LG Phillips LCD Co., Ltd., of Seoul, Korea. The transmissive display 14*a* may be outfitted with a touch screen mounted to a front surface of the display 14*a*. The touch screen contains soft touch keys denoted by the image on the underlying display 14*a* and used to operate the slot machine 10.

If the video image 18 is a virtual image, as in FIG. 36*b*, the virtual image is preferably generated by a projection arrangement including a video display 14*b* and a partially reflective mirror 20. The video display 14*b* and the partially reflective mirror 20 are relatively positioned to project the virtual image in front of the reels 12*a*, 12*b*, 12*c* between the reels and a player. The video display 14*b* may be mounted below the reels 12*a*, 12*b*, 12*c* and is generally perpendicular to the display area 16. The mirror 20 may be mounted in front of the reels 12*a*, 12*b*, 12*c* and is oriented at approximately a forty-five degree angle relative to both the video display 14*b* and the display area 16. The virtual image is generally parallel to the display area 16 and may, in fact, occupy the display area 16. Also, the virtual image may be three-dimensional. In the embodiment of FIG. 36*b*, the display area 16 includes a glass cover/window. This cover is optionally outfitted with a touch screen that contains soft touch keys denoted by the virtual image and used to operate the slot machine 10.

The video display 14*b* in FIG. 36*b* may be a CRT, LCD, dot matrix, LED, electro-luminescent, or other type of video display. Also, instead of mounting the video display 14*b* below the reels 12*a*, 12*b*, 12*c*, the display 14*b* may be mounted above the reels with the mirror 20 still oriented at approximately a forty-five degree angle relative to both the video display 14*b* and the display area 16.

Referring back to FIG. 35, the slot machine 10 is operable to play a basic slot game with the three mechanical spinning reels 12*a*, 12*b*, 12*c* and a bonus game triggered by a start-bonus outcome in the basic game. The number of mechanical reels may vary, for example, to include one or more additional reels. The mechanical reels may be mounted to a horizontal axis to spin vertically as shown or may, alternatively, be mounted to a vertical axis to spin horizontally. Also, instead of each column of symbols being associated with a single reel, each individual symbol may be associated with a single reel such that a symbol array of nine symbols is associated with nine distinct reels. Each of five pay lines 22*a*, 22*b*, 22*c*, 22*d*, 22*e* extends through one symbol on each of the three mechanical reels. The number of pay lines may be more or less than five and may have various configurations.

Figure 37:
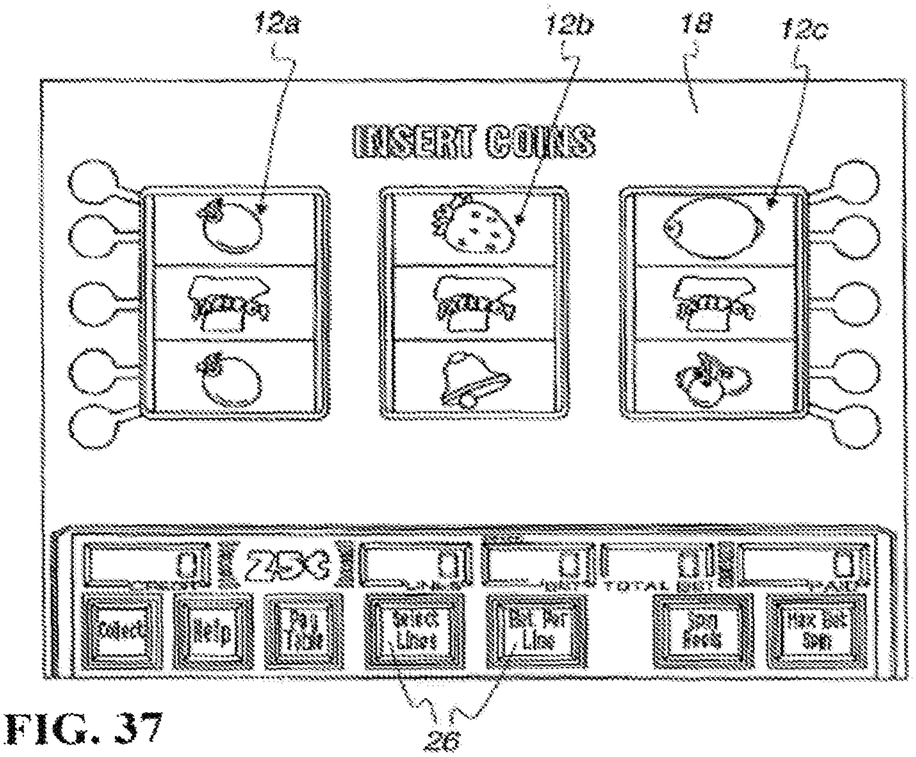
FIG. 37 shows a superimposed video image with instructional information prompting the player to insert coins or play credits, according to some embodiments.
Figure 38:
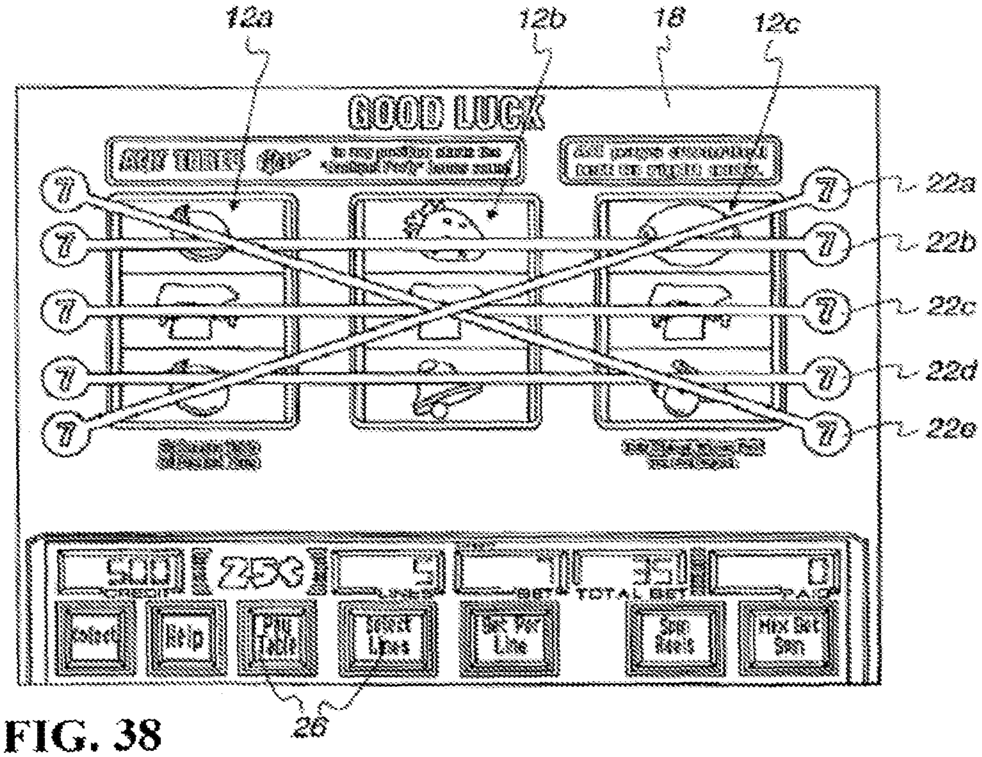
FIG. 38 shows a superimposed video image depicting the activated pay lines and the number of wagered credits per pay line, according to some embodiments.

Generally, game play is initiated by inserting a number of coins or playing a number of credits, causing a central processing unit to activate a number of pay lines corresponding to the number of coins or credits played. As shown in FIG. 37, the superimposed video image 18 may depict instructional information prompting the player to insert coins or play credits. The player selects the number of pay lines (e.g., between one and five) to play by pressing a "Select Lines" key on a button panel 24. The player then chooses the number of coins or credits to bet on the selected pay lines by pressing a "Bet Per Line" key on the button panel 24. As shown in FIG. 38, the superimposed video image 18 may depict the activated pay lines and the number of wagered credits per pay line.

After activation of the pay lines, the reels 12*a*, 12*b*, 12*c* may be set in motion by touching a "Spin Reels" key on the button panel 24 or, if the player wishes to bet the maximum amount per line, by using a "Max Bet Spin" key on the button panel 24. Alternatively, other mechanisms such as, for example, a lever may be used to set the reels in motion. The central processing unit uses a random number generator to select a game outcome (e.g., "basic" game outcome) corresponding to a particular set of reel "stop positions." The central processing unit then causes each of the mechanical reels to stop at the appropriate stop position. Symbols are printed on the reels to graphically illustrate the reel stop positions and indicate whether the stop positions of the reels represent a winning game outcome.

Figure 39:
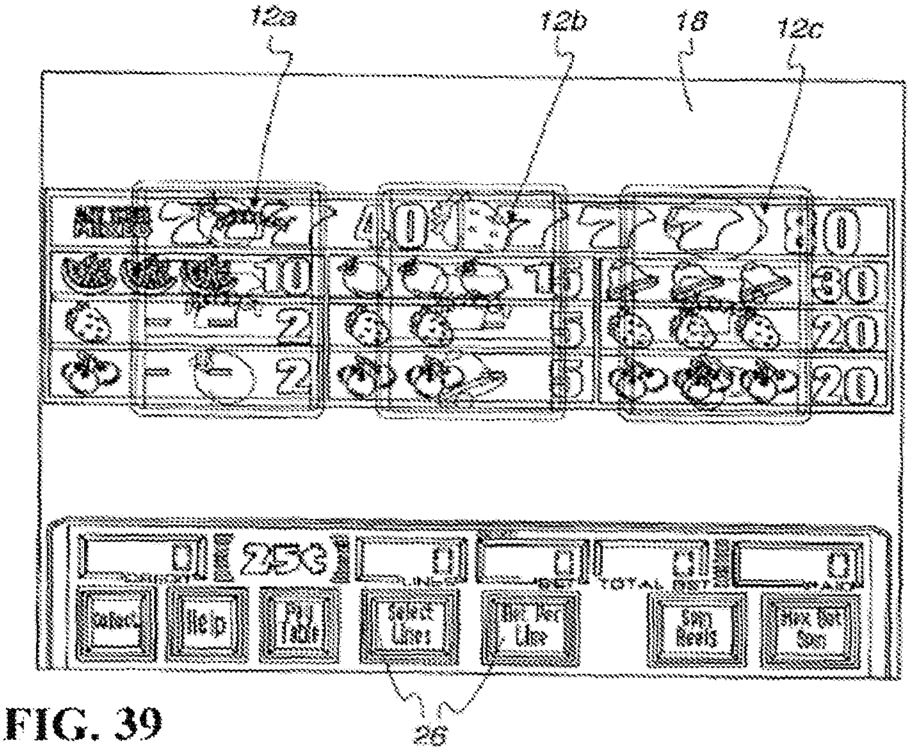
FIG. 39 shows a superimposed video image depicting the pay table in response to a command by the player (e.g., by pressing a "Pay Table" key on the button panel), according to some embodiments.
Figure 40:
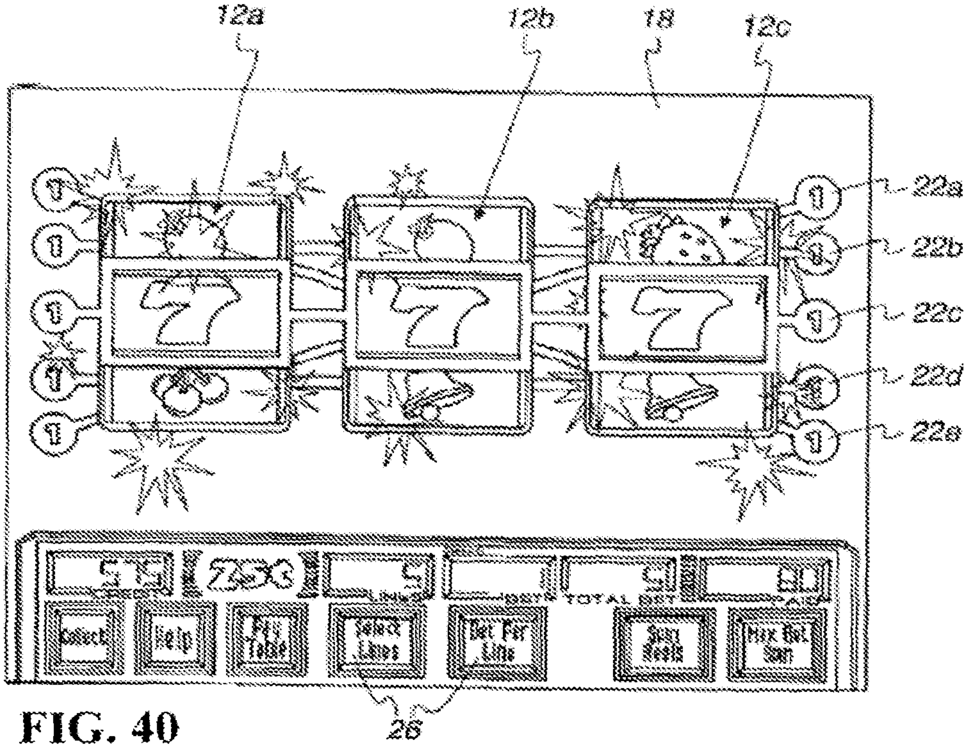
FIG. 40 shows a superimposed video image highlighting the winning combination(s) (e.g., "7," "7," "7") and its associated pay line and depicting the award for that winning combination, according to some embodiments.

Winning basic game outcomes (e.g., symbol combinations resulting in payment of coins or credits) are identifiable to the player by a pay table. As shown in FIG. 39, the superimposed video image 18 may depict the pay table in response to a command by the player (e.g., by pressing a "Pay Table" key on the button panel 24). A winning basic game outcome occurs when the symbols appearing on the reels 12*a*, 12*b*, 12*c* along an active pay line correspond to one of the winning combinations on the pay table. A winning combination, for example, could be three matching symbols along an active pay line. If the displayed symbols stop in a winning combination, the game credits the player an amount corresponding to the award in the pay table for that combination multiplied by the amount of credits bet on the winning pay line. As shown in FIG. 40, the superimposed video image 18 may highlight the winning combination(s) (e.g., "7," "7," "7") and its associated pay line (e.g., pay line 22*c*) and depict the award for that winning combination. The video image 18 may further include special effects such as flashing the winning pay line(s) and/or the award and providing explosions. The winning pay line(s) may flash, be accompanied by exploding flashes, and display a portion of the pay table. The player may collect the amount of accumulated credits by pressing a "Collect" key on the button panel 24. In one implementation, the winning combinations start from the first reel 12*a* (left to right) and span adjacent reels. In an alternative implementation, the winning combinations start from either the first reel 12*a* (left to right) or the third reel 12*c* (right to left) and span adjacent reels.

Pay Table

A game may have a pay table that defines all possible outcomes of one play of the game that can result in awarding a prize to a player.

In various embodiments, each line of the pay table defines the number of coins required to be played, the criteria that defines a win, the odds of the win criteria resulting from one play of the game and the number of coins returned by the gaming device to the player when a win is registered. In addition, a pay line may include the ability to accept a progressive prize value from the system. In various progressive gaming systems and methods this allows the game's pay line to be linked to a system controlled progressive prize.

A pay table may include a list of payouts on a slot machine or a video poker machine. The table may show for each combination of symbols and the number of coins bet, how main coins the bettor will win.

On older machines and some newer reel machines, the pay table may be listed on the face of the machine, usually above and below the area containing the wheels.

Each machine may have a table that lists the number of credits the player will receive if the symbols listed on the pay table line up on the pay line of the machine. The pay table details where the symbols must be for the bettor to be paid. In general, the symbols must be centered directly under the pay line on the machine. Video slot machines generally will only display the pay line for lines that are winners.

Some machines offer symbols that are 'wild' and will pay if they are visible in any position, even if they are not on the pay line. These wild symbols may also count for any other symbol on the pay table.

Most video machines display the pay table when the player presses a "pay table" button or touches "pay table" on the screen; some have the pay table listed on the cabinet as well.

Progressive

Games of chance may be described as either progressive or non-progressive. In non-progressive games, such as traditional pull-tab, participants play for a chance to win a predetermined prize, i.e., one of the winning cards. Progressive games, in contrast, involve a jackpot or prize that grows during the play of the game. Many state numbers lotteries, for instance, fall into the progressive category because the prize increases over time as more players participate. During the operation of a progressive game, a portion of each player's purchase is dedicated to the prize. Thus, the prize grows until the winning numbers are selected and the game ends. Some slot machines also offer a progressive jackpot.

In various progressive gaming systems and methods a portion of each wager is used to fund an increment to the current prize value, fund the starting value of the next prize after a win occurs, and other uses. Commonly the portion used, usually known as contributions, is determined by control data related to percentages and the coin denomination.

For example, assume a prize starts at $1,000,000 with a contribution rate of 3.5% to fund the next prize's starting value of $1,000,000 and a 2.5% contribution rate to the growth of the current prize's value. Also assume it is linked to gaming devices requiring a $2.00 wager. This means each wager contributes $0.07 (2.00*0.035=0.07) to the next prize's starting value and $0.05 (2.00*0.025=0.05) to the increment of the current prize value. With these contribution percentages there must be about 14,285,715 handle pulls, or games played, between wins for the prize's $1,000,000 starting amount to be funded. (1,000,000/0.07=14,285,714.29). In essence the total wager amount made over the theoretical life cycle of one prize award would be $28,571,430.00 (14,285,715*2.00=28,571,430.00).

During this theoretical time period the prize value would increase by $714,285 (0.05*14,285,714.29=714,285.7145) to make the average prize value worth $1,714,285 for each theoretical win. Also assume that a marketing study has determined that to sustain player interest the prize should be won on average about once every month. This means there should be about 14,285,715 handle pulls, or games played, over a thirty day time span. If each gaming device were able to average about 5 games played each minute for 10 hours a day it would produce 3000 games played per day. If the prize were to be won every thirty days and each gaming device generates 90,000 handle pulls a month (5 games*60 minute/hour*10 hours*30 days=90,000), there would have to be at least 159 gaming devices attached to the prize (14,285,715/90,000=158.73 . . . ).

Linked Machines

Often machines are linked together in a way that allows a group of machines to offer a particularly large prize, or "jackpot". Each slot machine in the group contributes a small amount to this progressive jackpot, which is awarded to a player who gets (for example) a royal flush on a video poker machine, or a specific combination of symbols on a regular or 9 line slot machine. The amount paid for the progressive jackpot is usually far higher than any single slot machine could pay on its own.

In some cases multiple machines are linked across multiple casinos. In these cases, the machines may be owned by the machine maker who is responsible for paying the jackpot. The casinos lease the machines rather than owning them outright. Megabucks, including Megabucks Nevada and penny Megabucks, is an example of linked machines across multiple casinos.

Central Computer, Network, and Accounting

Various embodiments include networked gaming devices. Interconnecting a plurality of gaming devices such as slot machines via a computer network to a central computer may provide advantages. Some advantages of networked gaming devices may include the ability to extract accounting data from the individual gaming devices as well as providing player tracking. Various network systems allow the central host computer to monitor the usage and payout, collectively known as audit data, of the individual gaming devices. This audit data includes data related to the number of coins or tokens inserted into the device, the number of times the device has been played, the amount paid in raises, the number and the type of jackpots paid by the machine, the number of door openings, etc. The host computer can then compile an accounting report based on the audit data from each of the individual gaming devices. This report can then be used by management, for example, to assess the profitability of the individual gaming devices.

In some areas, regulations may encourage or require a relatively detailed accounting of each video gaming machine's activity to assure that the machine operates within regulated standards. Meters are often provided to track money input into, and money dispensed from the machines. Because money may sometimes be inserted to a machine but not wagered, for example where a player inserts a certain amount of cash or credit but cashes out before betting the entire amount, the simple ratio of money into money out does not necessarily accurately reflect the machine's operational activities. Accordingly, it may be helpful to also track the amount of money wagered and the amount of money or credits won by the player.

In larger facilities such as casinos, a central computer may monitor such information for a plurality of embedded system single player gaming machines through a "location controller." Each video gaming machine serially communicates with the location controller to provide appropriate information to the central computer. If the central computer detects an irregularity regarding a particular game, it instructs the location controller to deactivate the game. An exemplary system including a location controller and embedded system circuitry at a video gaming machine for providing information to the location controller is disclosed in U.S. Pat. Nos. 5,429,361 and 5,470,079, the entire disclosure of each of these patents being hereby incorporated herein by reference for all purposes.

Reference numerals below, until otherwise specified, refer only to FIG. 41.

Figure 41:
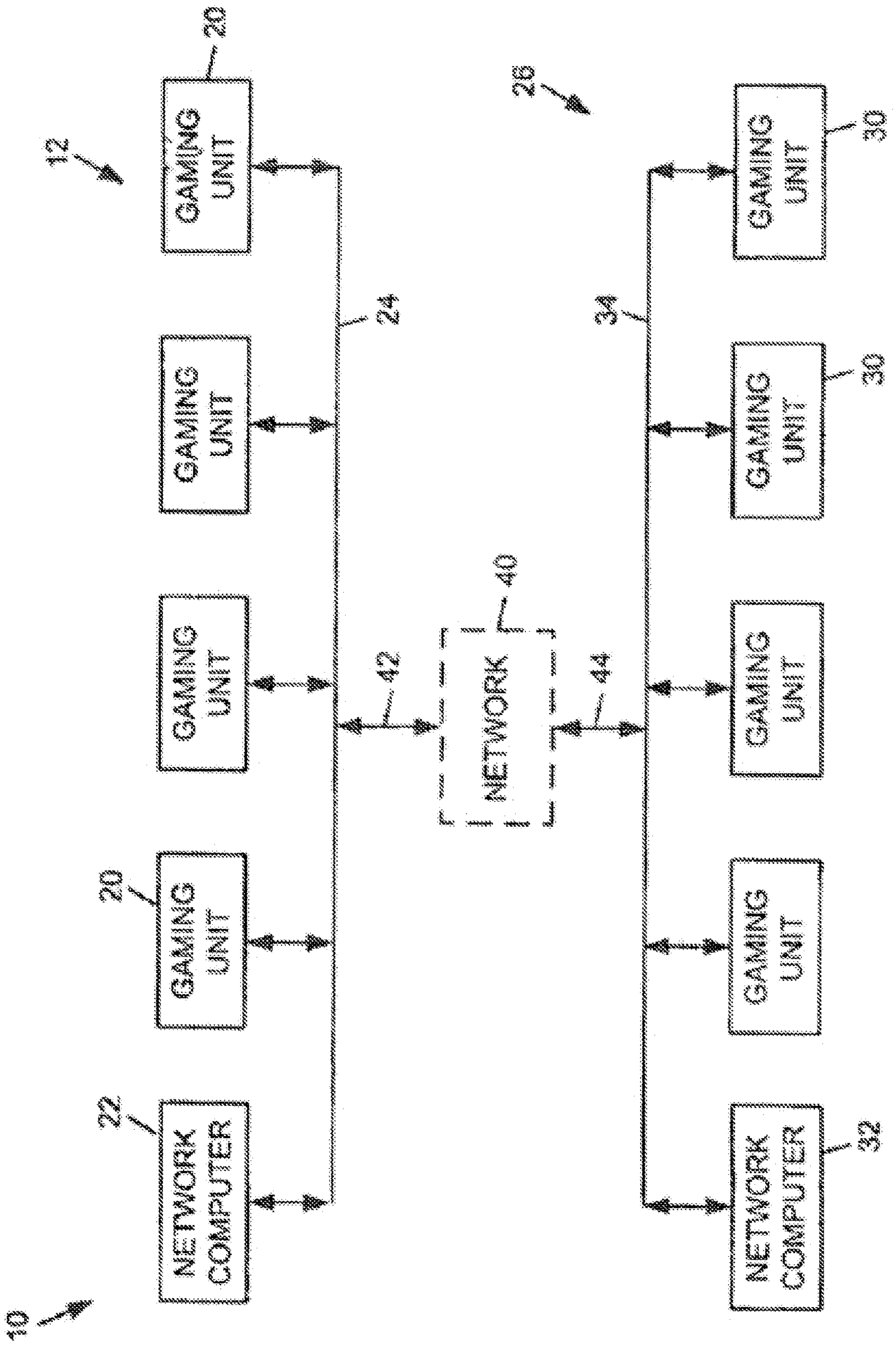
FIG. 41 illustrates an embodiment of a gaming system in accordance with some embodiments.

FIG. 41 illustrates an embodiment of a gaming system 10 in accordance with some embodiments. Referring to FIG. 41, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino or facility, and the second network 26 of gaming units 30 may be provided in a second casino or facility located in a separate geographic location than the first facility. For example, the two facilities may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Various embodiments include a system for operating networked gaming devices. The system according to various embodiments allows a casino in which the system is installed to run promotions or bonuses on any properly equipped gaming machines while simultaneously gathering player tracking and accounting data from all machines. The system provides the capability for the casino to select which of the plurality of machines are used in any given promotion. The system further allows any number of different promotions to operate simultaneously.

The system includes a plurality of gaming devices or machines connected to an associated floor controller over a network. The system includes one or more of said floor controllers. The floor controllers are interconnected by a high-speed network, such as an Ethernet network, to a database where accounting and player tracking data is stored. The system can also include pit terminals and/or fill and jackpot processing terminals. Each promotion involves sending a reconfiguration command from the floor controller to a gaming device that has been selected to be part of a given promotion over the associated network. Upon receipt of the reconfiguration command, the gaming device reconfigures its payout schedule in accordance with the received reconfiguration command In some embodiments, this reconfiguration includes activating a bonus payout schedule. A partial list of the promotions according may include, without limitation: a multiple jackpot wherein the gaming device reconfigures its payout to be a multiple of its default payout schedule; a bonus jackpot wherein the gaming device reconfigures its payout schedule to payout an additional bonus amount when certain conditions are met; and a progressive jackpot wherein two or more gaming devices are combined in a progressive jackpot having a progressive jackpot payout schedule. In addition to these, many other promotions are possible by the above-described system for controlling and monitoring a plurality of gaming devices.

The system may support player tracking, in some embodiments, by recording machine transactions including time of play, machine number, duration of play, coins in, coins out, hand paid jackpots and games played. The player tracking is conducted over the same network as the accounting data is extracted. This allows the provision of bonusing to certain individual players as well as during certain times. Various embodiments include a system which monitors and reports how many coins are played by each player. The system, according to various embodiments, includes the ability to record how long each player spends at each machine and the number of coins won, games played, and hand jackpots won by each player. All this information is stored on the database, which can be later analyzed for future targeted direct mailing campaigns. The player tracking according to various embodiments also allows the casino to schedule buses and other groups and measure their profitability. The system also allows for cashless play as well as advanced accounting and security features.

Bonus Game

Various embodiments include the concept of a "secondary" or "bonus" game that may be played in conjunction with a "basic" game. The bonus game may comprise any type of game, either similar to or completely different from the basic game, which is entered upon the occurrence of a selected event or outcome of the basic game.

Various embodiments comprise methods of playing games, gaming devices and table games utilizing a primary game, e.g., rotatable reels, and at least one discernible indicia of a secondary game, possibly comprising a payout indicator. The secondary game may be separate from the primary game either physically or temporally.

According to various embodiments, a bonus payout indicator is clearly visible to a player and is operable when primary reels of a primary game slot machine stop on certain predetermined indicia. According to some embodiments, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and when the wheel stops, a pointer indicates the payout to be awarded to the player.

Various embodiments further comprise a discernible multiplier which provides the ability to change either the payout from the primary gaming unit or the secondary payout indicator, or both. Various embodiments contemplate providing a payout from the primary gaming unit, a payout indicated by the secondary indicator only, a payout from the primary gaming unit or the secondary indicator as changed by the multiplier, or a separate, plurality of payouts from the primary gaming unit and the secondary indicator either with or without modification by a multiplier.

According to various embodiments, the mechanical bonus payout indicator is electronically operated and is linked to a random number generator which determines where the secondary indicator actually stops.

According to various embodiments, when the primary unit stops on one of a predetermined plurality of winning indicia sets, a second event actuator is placed in an active state. According to various embodiments, a person, such as the player, must actuate the actuator in order to operate the bonus indicator.

According to various embodiments, the bonus actuator requires operator intervention so that a player must involve a casino attendant who can activate the bonus indicator.

According to another various embodiments, the bonus indicator is connected to a drive mechanism which gradually reduces the rate of spin of the bonus wheel before the bonus wheel stops.

Various embodiments comprise gaming devices having electronic means for displaying indicia of rotatable reels such as a video screen and/or means for displaying indicia of a secondary payout indicator, such as a video screen. Various embodiments comprise methods for playing a game of chance. One method comprises the steps of displaying a first randomly selected combination of indicia, said displayed indicia selected from the group consisting of slot reels, indicia of at least one reel, indicia of at least one playing card, and combinations thereof; generating at least one signal corresponding to at least one select display of first indicia; providing at least one discernible indicia of a mechanical bonus indicator, said bonus indicator indicia indicating at least one of a plurality of possible payouts, wherein said bonus indicator indicia providing means is operatively connected to said first, standard gaming unit and actuatable in response to said signal. According to various embodiments, the discernable indicia of a mechanical bonus indicator gradually reduces the rate of movement of the mechanical bonus indicator for some period of time prior to actually providing the discernable indicia of a payout. According to another embodiment, a multiplier is provided to multiply at least one payout by a multiple which is most preferably indicated to a player. The multiple can preferably sequentially change as discernable indicia change. For example, a plurality of multiples can be synchronized with a plurality of discernable indicia on the mechanical bonus indicator such that the multiples changes as the payout indicated changes.

Various embodiments include a method of conducting a game of chance comprising the steps of providing a player with an opportunity to place a wager; displaying a randomly selected combination of indicia, said displayed indicia selected from the group consisting of reels, indicia of at least one and preferably a plurality of reels, indicia of at least one and preferably a plurality of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

A bonus game may include another gaming machine or a random selection device which is enabled by a bonus qualifying signal from an underlying or primary gaming machine. A wide variety of bonus games, features, and devices are known some of which are set forth next.

The WHEEL OF GOLD™ and WHEEL OF FORTUNE™ slot casino games incorporate a single play bonusing feature. A rotating wheel is activated by the player depressing a bonus spin button when certain indicia appears on the reels of the slot game and is used to award bonus payouts in a spin of the wheel. A separate multiplier may be used to multiply the bonus payouts. After the bonus spin, play resumes in the underlying gaming machine.

In various embodiments, a bonus game involving multiple plays is presented for an underlying gaming machine such as a slot machine. Here a Bernoulli trial procedure is used to allow a player to repeatedly play a high odds bonus game (such as another slot game) and receive awards until a losing combination occurs (i.e., winning until losing). The hit rate in the bonus game is greater than 50% (possibly higher than 70%) which may result in a much lower hit rate in the underlying game. This hit rate difference causes the player to endure the low hit rate of the underlying slot game in order to qualify for the high hit rate of the bonus game. The length of the bonus game is longer when the hit rate for the bonus game is higher. This bonus feature allows a player to win each bonus game and collect winnings until the player receives a losing combination (i.e., losing until winning).

One slot machine main game is interconnected with a slot machine secondary game. The player has the option of pushing a button which debits his credit meter by the appropriate amount to play the secondary game such as another slot game. Hence, the player gambles an amount in order to play the bonus game.

Various embodiments include an electronic gaming apparatus and method therefore wherein each play in the bonus is the result of successive underlying game play. Included are an electronic primary gaming device such as a poker or a slot machine and an electronic secondary gaming device based on bingo. When a winning combination such as three queens appears in the primary game, a space in the bingo matrix is turned over to reveal a bingo symbol. Play continues on the primary game until a winning sequence occurs in the bingo game. The right to play the bingo secondary game does not occur unless the player inserts three or more coins into the primary game. Play continues until the game achieves a bingo in which case the player receives a prize.

Various embodiments include a slot machine having a jackpot feature whereby the prize value is transferred between separate jackpot displays as successive games are played. Some of the reel symbols are overprinted with a number and when that number lands on the payline, it is used to climb a ladder. The ladder enables the player to obtain one or all of the prizes in the upper portion of the slot machine. For example, if the overlaid number lands the player on a first playing level, then the player receives all three prizes. If the overlaid number lands the player on a second level, then the player can select which one of the three prizes to receive. If the player lands on a third level, then it becomes a game of skill to select which of the three prizes he selects. Finally, if the player lands on a fourth level, then the prize is randomly selected. The prize may also be randomly doubled.

Various embodiments include a plurality of slot machines interconnected to an electronic controller which displays a separate race game. Each time a particular predetermined combination of indicia appears in the display of a particular slot machine, a signal is generated from the slot machine which advances the racing element through a particular predetermined distance. If the player's horse reaches the finish line before a timer display times out, then the slot player wins an additional prize. The players are not racing against each other, but against a clock.

Various embodiments include a gaming machine including a processor operable in a basic mode and a bonus mode for controlling game play. In the basic mode, the processor operates to select a basic game outcome from among a plurality of possible basic game outcomes. The possible basic game outcomes include a start-bonus outcome the occurrence of which causes the processor to shift operation from the basic mode to the bonus mode. The processor is operable to define a plurality of player-selectable bonus game outcomes. In the bonus mode, a player selects one or more of the bonus game outcomes and credits are awarded based upon which ones of the bonus game outcomes are selected.

Various embodiments include a gaming machine including a processor operable to select a game outcome from among a number of possible game outcomes. A number of the possible game outcomes are identifiable according to a pay table as winning combinations, whereas a remaining number of the possible game outcomes are identified as apparent losing combinations. The gaming machine includes means for awarding credits upon occurrences of the winning combinations and upon occurrence of at least one of the apparent losing combinations.

Various embodiments include a gaming machine including a processor operable in a basic mode and a bonus mode for controlling game play. In the basic mode, the processor operates to select a basic game outcome from among a plurality of possible basic game outcomes. The possible basic game outcomes include one or more bonus-resource outcomes the occurrence of which causes the processor to generate a bonus game resource exercisable in a bonus game. The gaming machine includes means for shifting operation of the processor from the basic mode to the bonus mode. The processor is operable to define a plurality of possible bonus game outcomes. In the bonus mode, upon selection of a bonus game outcome, the bonus game resource(s) generated in the basic game may be exercised to affect the bonus game outcome. In one embodiment, where the bonus game outcome would otherwise cause the processor to end the bonus game, an exercise of a bonus game resource in conjunction with the bonus game outcome causes the processor to continue operation in the bonus mode, thereby allowing the player to continue playing the bonus game.

Reference numerals below, until otherwise specified, refer only to FIG. 42.

Figure 42:
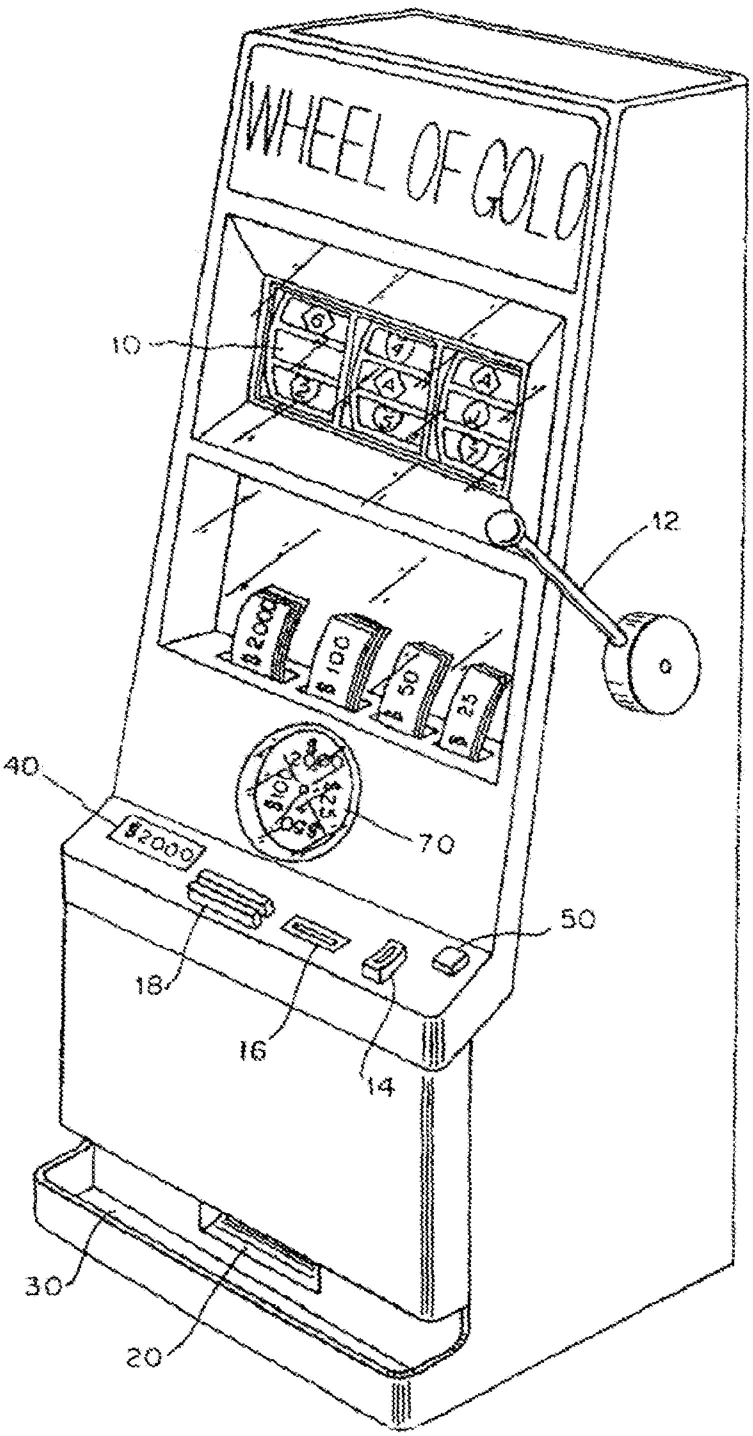
FIG. 42 is a perspective view of a slot machine 10.

FIG. 42 is a perspective view of a slot machine 10. A slot machine 10 may include rotatable reels 60, each having a plurality of symbols thereon that are randomly displayed when a mechanical lever 12 is pulled and the reels 60 are rotated. If the symbol displayed is a predefined symbol, or predefined combination of symbols, the player may receive a payout either through coin chute 20, which deposits winnings into coin trough 30, or by increasing the player's credits displayed in credit window 40. A slot machine 10 may also include a microprocessor, or other central processing unit as well as memory. In such a case, a display screen (not shown) (e.g., a cathode ray tube (CRT), plasma display, liquid crystal display (LCD), and/or a display based on light-emitting diodes (LED)) may be coupled to the computer to replace the reels 60 and provide a simulation of reels and their rotation, the output of a random number generator being used to direct the types and combinations of symbols displayed on the display screen.

A coin slot 14, currency validator 16 or card acceptor device 18 (to accept a credit card, gaming card, player card, smart card and the like) permits a player to activate a base game on the slot machine 10. A player may have a predefined chance, or odds, of winning a payout for the base game based on the mathematical odds that a winning symbol or combination of symbols will be randomly displayed on the indicia of the reels 60. The odds may be adjusted by changing the number of possible non-winning symbols or combination of non-winning symbols in relation to the number of possible winning symbols or combination of winning symbols. The odds of winning a payback and the amount to be awarded to a winning player in relation to the amount wagered may be defined in the form of a "pay table" or "par sheet."

Initiating a base game on a slot machine 10 may be done as simply as by inserting a coin, token, or other type of currency equivalent (debit card or credit card) into a gaming device such as slot machine 10. Another example of a player action which may be taken in initiating a base game includes inserting an identification card, such as a "smart card," having a programmed microchip or a magnetic strip coded with a player's identification, credit totals and other relevant information. Such smart cards or "player cards" may be used in player tracking systems. Various embodiments include a card that contains information about the player which is pertinent to the gaming activity such as points awarded based upon the player's gaming activity. The player may insert the card in a gaming device at the time of play. When the player indicates that he or she has finished play on that gaming device, the card is updated with player activity information. The player can then insert the card into a different gaming device, which makes the player activity information stored on the card available to the player tracking system. In various embodiments a gaming device may accept preprinted coupons, or cash out slips, to initiate a base game and to print the cash out slips directly from the gaming device. In various embodiments, money may be transferred to a game through an electronic funds transfer process.

Gaming device displays may include multiple images representing various aspects of a game such as a game portion, a credit total portion and a wager amount portion. Other displays may include an additional bonus award portion to indicate an amount of a bonus award which may be won, typically through multiple or secondary games.

Internet Gaming

In various embodiments, it is also possible to participate in a game of chance via the Internet. This may be accomplished through a casino or game host site offering displays similar to those found in conventional gaming devices. Generally, to play a game of chance via the Internet, a software file is downloaded to a player's computer or terminal, which may then be used to install the necessary software for the game and access the casino or game host Internet site. In some a player may play a game through a web page (e.g., an html page, a page using AJAX, etc.). As with a conventional gaming device, Internet games may be accessed using an identification code or name to identify the specific player and retrieve that player's credit total or play history.

Bonus gaming may include employing a secondary game that will execute if the player achieves a predefined outcome associated with the base game. In many cases, the bonus game is a singular event in that the play changes to the bonus game when a certain base game outcome is achieved, and the bonus game is then played to completion. For example, when the reels of a slot machine stop on certain predetermined indicia, a bonus game may be initiated by pressing a button and bonus indicator actuated to display a randomly determined bonus award. In various embodiments, the bonus game is a more sequential event in that progress through the bonus game is determined by continued play in the base game.

In some bonus game embodiments, the possible primary game outcomes include a special symbol combination that causes a computer processor to generate a bonus game resource exercisable in the bonus game. For example, one or more bonus game resources can be used to override the end-bonus outcome and thereby allow the play of the bonus game to continue.

Various embodiments allow the player to have further interaction in the bonus game by providing a touch screen where the player can select objects by touching the screen positions. Various values are then revealed to the player until an end-bonus outcome is encountered.

In various embodiments, bonus gaming may be conducted through a plurality of networked, or linked, gaming devices such that the secondary gaming activity might involve a plurality of players wagering on base games at separate gaming devices. Various bonus games may allow a player to compete with a plurality of other players for a secondary prize. In various embodiments, a bonus game may include one or more contestants in a race. In one embodiment, each player wagering at a primary gaming unit may be represented by a particular contestant in the race. The contestant representing a particular player advances in the race according to the represented player's gaming activity at the primary gaming unit. The race ends upon a contestant finishing or upon the expiration of a predetermined amount of time, whichever comes first.

Various embodiments include a system of linked gaming devices wherein the generation of certain symbols at each gaming device is used to build up a pooled bonus value. A bonus award is then awarded to the player that causes the accumulated bonus value to meet or exceed a predetermined value.

Various gaming systems may include progressive systems in which the bonus award amount increments as base games are played on individual or linked gaming devices. In various progressive systems, a game controller is connected to a plurality of machines. A win is generated approximately every one half minute (every eight handle pulls), adding to the progressive bonus pool. Accordingly, the value of the progressive bonus rapidly increments.

Various gaming systems and methods for providing a bonus game allow players to compete directly against another player or for the players to act in collaboration with one another to win a prize.

Virtual Reel

A game apparatus having a plurality of reels mounted for rotation about an axis and which can be set into motion by the pulling of a lever. Indicia are fixed to the outer peripheries of these reels to indicate reel positions and a brake is operable to stop the reels at any randomly pre-selected position.

A random number generator is provided with electronic circuitry which computes the random stop position at which the reel should be stopped by the physical brake. This is done with an electronically random number selected from a group of numbers which exceeds the number of physical reel positions such that one physical reel position is represented by one or several positions on the virtual or electronically generated reel, which is in effect, randomly stopped by the random number generator. In various embodiments, the physical reels are only used as a display of the random number generated result and are not the game itself as in standard slot machines. In this manner, a standard slot machine or gaming apparatus can be made to function at payout odds, independent of the limits set by the number of physical reels and their physical stop positions, by changing the random number generator.

Random Number Generators

In various embodiments, slot machines are computerized, so that the odds of various outcomes are whatever they are programmed to be. In various embodiments, the reels and lever may be present for historical and entertainment reasons. In various embodiments, the positions the reels will come to rest on are chosen by a random number generator (RNG) contained in the machine's software.

The RNG may be constantly generating random numbers, at a rate of thousands to millions per second. As soon as the lever is pulled or the "Play" button is pressed, the most recent random number may be used to determine the result. This means that the result may vary depending on exactly when the game is played. A fraction of a second earlier or later, and the result may be different. In various embodiments, the RNG may be a pseudorandom number generators.

Player Tracking

A gaming device apparatus may include a player tracking card that may be disposed in the card reader. The player tracking card may comprise a data storage device that stores data representing the identification of a player. Additionally, the player tracking card may comprise a first card surface, a second card surface, and a light transmissive body portion extending between the first card surface and the second card surface. The player tracking card may be positioned in a card illumination position wherein the first card surface is disposed in the card reader so that the first card surface is positioned adjacent the light generating source associated with the card reader, and the second card surface of the player tracking card remains visible outside the card reader. Also, when said player tracking card is in the card illumination position, light generated by the light generating source may be transmitted into the first card surface of the player tracking card and then transmitted through the light transmissive body portion of the player tracking card so that light may be visible to the user through the second card surface.

Player tracking, as the name indicates, may involve tracking individual player usage of gaming devices. In various embodiments, the player is issued a player identification card which has encoded thereon a player identification number that uniquely identifies the player. The individual gaming devices are fitted with a card reader, into which the player inserts a player tracking card prior to playing the associated gaming device. The card reader reads the player identification number off the card and informs a central computer connected thereto of the player's subsequent gaming activity. By tracking the individual players, individual player usage can be monitored by associating certain of the audit data with the player identification numbers. This allows gaming establishments to target individual players with direct marketing techniques according to the individual's usage.

Reference numerals below, until otherwise specified, refer only to FIG. 43-44A.

Figure 43:
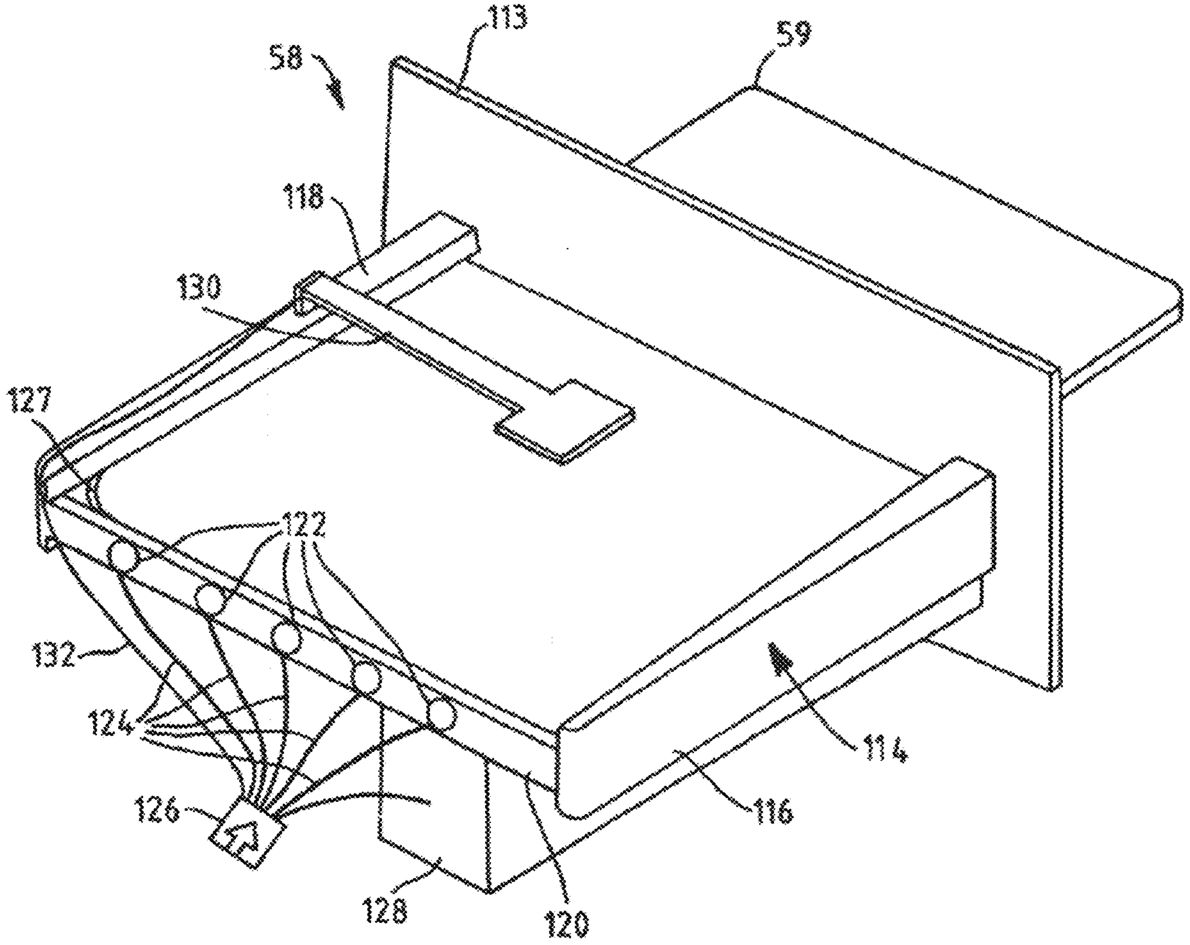
FIG. 43 illustrates schematically an embodiment of a player tracking card 59 disposed in a card reader 58.

FIG. 43 illustrates schematically an embodiment of a player tracking card 59 disposed in a card reader 58. The player tracking card 59 is positioned in a card illumination position. The card reader 58 may include a mounting plate 113 to assist in securing the card reader 58 to the housing 50 of the gaming apparatus 20. The card reader 58 may also include a chassis 114 which may comprise a first side rail 116, a second side rail 118, and a back structure 120.

The card reader 58 of FIG. 43 may also include a number of light generating sources 122. The light generating sources 122 shown in FIG. 43 are fixed to the back structure 122 of the chassis 114, however the light generating sources 122 may also be secured directly to the housing 50 of the gaming apparatus 20 or any other structure within the housing 50 that is separate from the card reader 58. The light generating sources 122 may comprise LEDs, OLEDs, incandescent lamps, fluorescent lights, or any other device capable of generating light. If a plurality of the light generating sources 122 are used, they may produce light that is uniform in color, or they may produce a plurality of different colors. The light generating sources 122 may be connected to the controller 100 through a plurality of corresponding conductors 124 to control the intensity and pattern of illumination of the light generating sources 122. The conductors 124 may be connected to a modular connector 126 for ease of installation into the gaming apparatus 20.

The player tracking card 59 may be positioned in the card illumination position when the card 59 is disposed in the card reader and a first card surface 127 is adjacent the light generating sources 122. In the embodiment shown in FIG. 43, the player tracking card 59 may rest on the side rails 116 and 118 and the first card surface 127 may abut the back structure 120 of the chassis 114 when the player tracking card 59 is in the card illumination position. Thus, when the player tracking card 59 is in the card illumination position, light generated by the light generating sources 122 is transmitted into the first card surface 127 of the player tracking card 59.

A data reading apparatus 128 may also be included in the gaming apparatus to read data from the player tracking card 59 that is disposed in the card reader 58. The data reading apparatus 128 may be attached to the chassis 114 so that it is in close proximity to the player tracking card 59 when the player tracking card 59 is disposed in the card reader 58 and in the card illumination position. The data reading apparatus 128 may read data from the player tracking card 59 in a variety of ways. For example, the data reading apparatus 128 may read data from a magnetic strip or from an optically readable material such as ink, both of which may be located on a surface of the player tracking card 59. Various embodiments may utilize multiple data reading apparatuses to read data from additional magnetic strips or optically readable materials located on the same surface or on different surfaces of the player tracking card 59. As another example, the data reading apparatus 128 may utilize an antenna to couple with a corresponding antenna in the player tracking card 59 so that data is thereby transmitted.

The data reading apparatus 128 may be interconnected to the controller 100 so that the data may be stored and possibly acted on, such as by energizing a light generating source 122. While not shown, a data writing apparatus may also be included to write new data to the player tracking card 59. This may be a separate component, or it may be combined with the data reading apparatus 128.

Types of Machines (Video, Mechanical)

A gaming apparatus, for example as may be located in a casino, may allow a customer of the casino to play one or more games, such as poker, blackjack, slots, keno, and bingo. A customer may approach a gaming apparatus and select a desired game from the games offered on the gaming apparatus. Upon selection of the desired game, that game may appear on the gaming apparatus, at which time the customer may be allowed to play.

During play, the customer may place a wager, and proceed with the selected game. For example, where the customer is playing slots, a lever may be pulled to spin the reels. The reels may then stop on various symbols, which may determine the customer's payout for that spin, after which the customer may place another wager and proceed as discussed above. Where the customer has selected to play blackjack or poker, the player may hit a "deal card" button to deal out the cards for the respective card game. The customer may alter his wager during the particular hand based on which cards are dealt, and in some card games, replace cards, or continue to request cards. After all replacements and/or requests are made, a payout may be determined, and the player may continue by placing another wager and playing a new hand.

An apparatus may comprise a gaming apparatus with a housing and a display unit that is associated with the housing and is capable of generating video images. The gaming apparatus may also include a value input device that is capable of allowing the player to deposit a medium of value. Additionally, the gaming apparatus may comprise a card reader having a light generating source that is associated with the card reader and a data reading apparatus that is also associated with the card reader. The gaming apparatus may also comprise a controller, wherein the controller is operatively coupled to the display unit, the value input device, and the card reader. The controller may have a processor and a memory operatively coupled to the processor. Additionally, the controller may be programmed to allow a person to make a wager and to cause a video image to be generated on the display unit after the value input device detects deposit of value by the person.

The video image may represent a game selected from the group of games consisting of video poker, video blackjack, video slots, video keno and video bingo, in which case the video image may comprise an image of at least five playing cards if the game comprises video poker. Likewise, the video image may comprise an image of a plurality of playing cards if the game comprises video blackjack. If the game selected by the player is video slots, the video image may comprise an image of a plurality of simulated slot machine reels. The video image may comprise an image of a plurality of keno numbers if the game comprises video keno, or the video image may comprise an image of a bingo grid if the game comprises video bingo. The controller may also be programmed to determine an outcome of the game represented by the video image and a value payout associated with the outcome of the game.

FIG. 44 is a perspective view of various possible embodiments of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 44, the gaming unit 20 may include a housing or cabinet 50 and one or more input devices, which may include a coin slot or acceptor 52, a paper currency acceptor 54, a ticket reader/printer 56 and a card reader 58, which may be used for several purposes, as will be described in detail below. A value input device may include any device that can accept value from a customer. As used herein, the term "value" may encompass gaming tokens, coins, paper currency, ticket vouchers, credit or debit cards, and any other object representative of value.

Ticket Readers

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items or gaming data printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader and may be used to read data from a card offered by a player, such as a credit card or a player tracking card 59. If provided for player tracking purposes, the card reader 58 may be used to read gaming data from, and/or write gaming data to, player tracking cards that are capable of storing data representing the identity of a player, the identity of a casino, the player's gaming habits, etc. The card reader 58 may also include additional components that are described in conjunction with FIG. 43.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements, or any other audio related to a casino game. The input control panel 66 may be provided with a plurality of pushbuttons or touch-sensitive areas that may be pressed by a player to select games, make wagers, make gaming decisions, etc.

Reel Slot Machine

A reel spinning slot machine may comprise a plurality of mechanical rotatable reels controlled by a processor. In response to a wager, the processor randomly selects an outcome from a plurality of possible outcomes and then causes the reels to be rotated and stopped to display the selected outcome. The selected outcome is represented by certain symbols on the reels being in visual association with a display area. If the selected outcome corresponds to a winning outcome identified on a pay table, the processor instructs a payoff mechanism to award a payoff for that winning outcome to the player in the form of coins or credits.

In one embodiment, a slot machine comprises a CPU and a reel mechanism. The CPU operates the slot machine in response to a wager. The reel mechanism includes a motor, a symbol-bearing reel, and a reel driver. The motor includes a rotatable shaft, and the reel is mounted to the shaft. The reel driver includes a local microcontroller distinct from and coupled to the CPU. The reel driver is coupled to the motor to cause the motor to rotate the reel.

The CPU issues high-level commands to the reel driver related to rotation of the reel. The high-level commands may, for example, include a start spin command for starting rotation of the reel and a stop command for stopping the reel at a specified position. However, to free up the CPU for other tasks, the local microcontroller performs low-level reel driver operations related to the rotation of the reel. The low-level reel driver operations may, for example, include sampling a state of the reel in real time, performing calculations, and responding with control changes.

Fixed Pool Games

A fixed pool game may include a game in which a specified amount of money or prizes (the prizes having calculable monetary equivalents) are distributed into a set of individually purchasable and winnable units, where each individual unit has a known cost, and where the set further includes purchasable units having no prize. Thus, the total amount of prizes, the prize distribution (i.e., the number of prizes at each level), and the total return if all individually purchasable units are sold are known at the game's outset.

The individually purchasable units may be generated and distributed as tickets. Two forms of tickets may include pull tab tickets, which may be called pulltabs, and scratch-off tickets, which may be called scratchers. Pull tab tickets may be constructed from paper of various thickness, having two layers. The first layer may have some type of indication of the purchasers' winnings, if any, and the second layer may cover the first. The second layer may be glued to the first layer around three edges, covering the results. The fourth edge may have a small tab, allowing the purchaser to grab hold of it. The tab, upon being pulled, pulls the layers apart and reveals the purchasers' winnings, if any. Scratchers may use an opaque material that covers portions of the ticket, where the covered portions have the predetermined results on them. The purchaser scrapes off the opaque material, revealing any winnings.

The distribution of the total winnings, coupled with the cost of each individually purchasable unit, is determined by those making up the game. The exact mechanics and mathematics of each game pool depends on the goals of the issuer, including the target play audience (how much to charge per purchasable unit or ticket or play), the desired return on investment, and size of the pool, as well as other considerations. The tickets (individually purchasable units) for the entire game are then printed and distributed and may be organized into decks with different decks sold to different locations. Players, by purchasing a ticket, are buying one individually purchasable unit from the overall ticket or game event pool.

This may be referred to as a fixed-pool lottery, meaning there is a fixed pool of tickets (or results) having a predetermined number of winners and losers, and a purchaser takes a chance on getting a winning result by entering the "lottery", meaning taking the chance they will buy a winning ticket from the pool.

Fixed-pool lottery based games may be displayed in many ways. For example, such games may be displayed as a poker hand, in order to mimic actual poker play.

The player may bet a certain amount to play the game. This corresponds to an individually purchasable unit (note that different betting amounts may participate in different fixed-pool lotteries) for the lottery being used. The game may then get the result of a random drawing from a central server or location having several operating pools. The result may be sent back to the game machine. The game machine may then represent the results as a game.

Video Wagering Games

Video wagering games may be set up to mimic a table game using adaptations of table games rules and cards.

Reference numerals below, until otherwise specified, refer only to FIG. 45-47.

Gaming Devices

Figure 45:
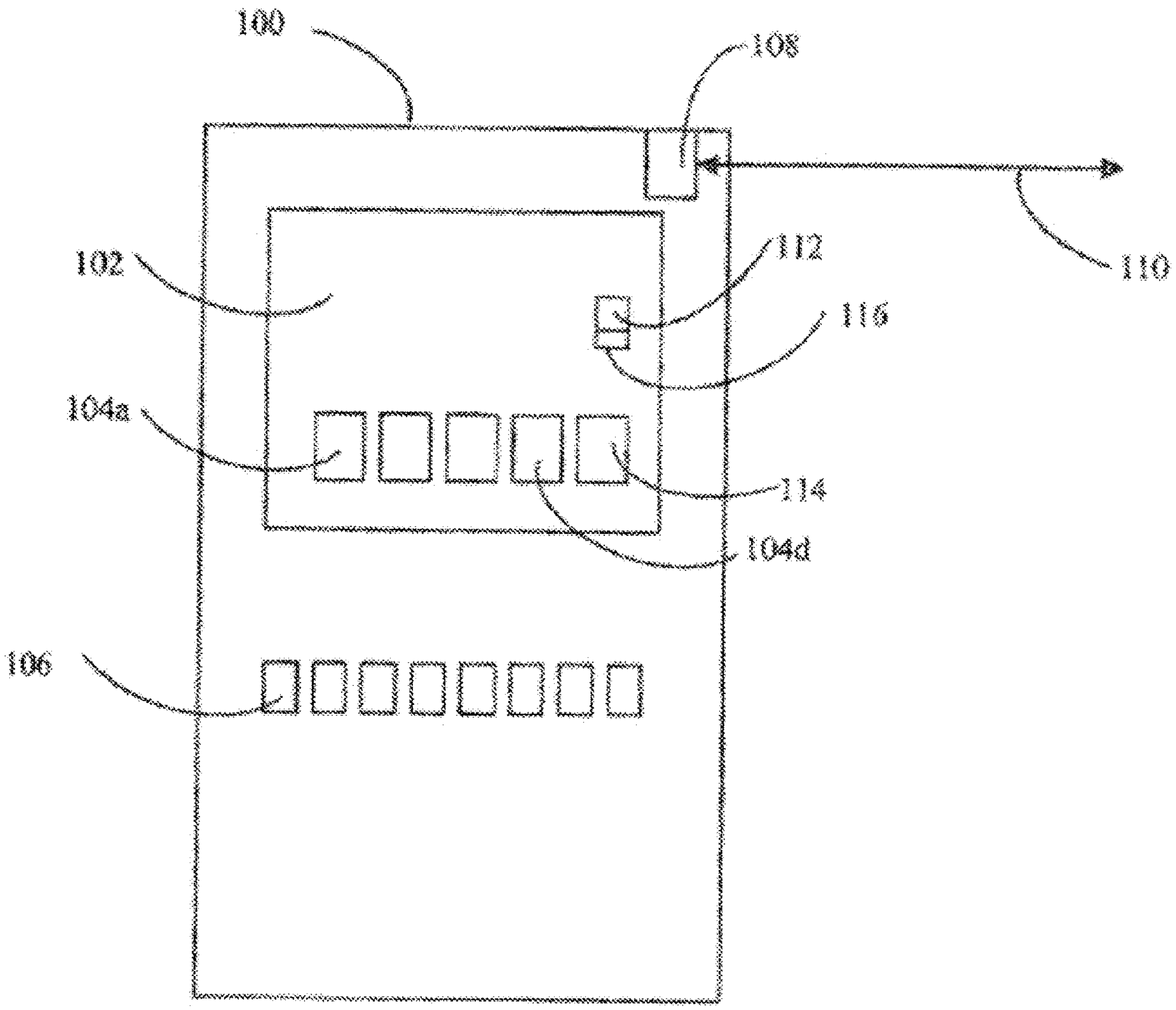
FIG. 45 shows a game device according to some embodiments.

FIG. 45 shows a game device according to some embodiments. The game device has a cabinet 100 enclosing a video display 102 and a set of standard game play buttons shown generally as buttons 106. The game device also comprises the internal hardware and software needed for gaming devices, including at least one processor, dynamic memory, non-volatile memory, system support circuitry such that the operating system of choice will run properly, and I/O connections including interfaces to the various player interfaces such as play buttons 106 and video 102 output, and an interface to an external network connection shown as SMIB (slot machine interface board) 108. Also included is the software needed to implement the specific game. The internals are not illustrated. SMIB 108 interfaces with a network connection 110, e.g., to an RGC (remote game controller, not shown). Alternatively, 108 may be an ethernet connection to an ethernet-based backbone network 110.

Apparatus for Playing Over a Communications System

Figure 46:
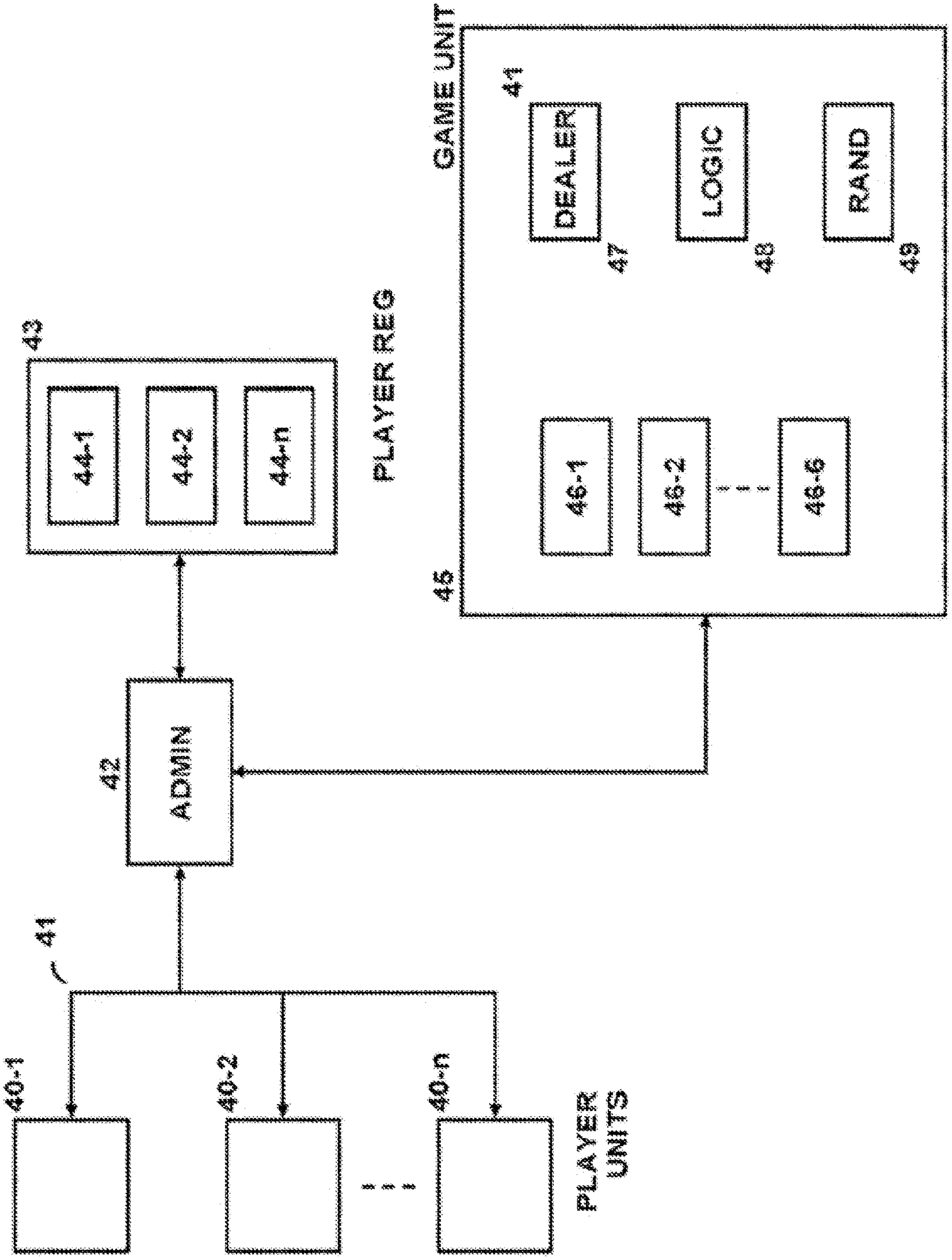
FIG. 46 shows an apparatus for playing a game, according to some embodiments.

FIG. 46 shows an apparatus for playing a game, according to some embodiments. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to **44-*n*** for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40 and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e. the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

Server Based Gaming

In various embodiments, gaming devices such as electronically controlled slot, video and similar machines may include a central controller including a processor and a memory. The central controller controls the gaming machine, including the presentation of one or more games to a player at the gaming machine.

The processor of the gaming controller may execute code to control the operation of the gaming machine. This code is stored at the memory of the gaming controller. The control code, including specific game code, may be loaded into the memory when the gaming machine is manufactured.

In various embodiments, it may be desirable to change the control and/or game code associated with the gaming machine controller. For example, the operator may wish to change the "paytable" so that the gaming machine returns a higher percentage of bets wagered. The operator may also wish to update an older game with a newer, more desirable one.

Various embodiments include a gaming machine code download system and a method of managing or controlling the download of code to a gaming machine.

Various embodiments comprise a method of downloading code, information, or data to a gaming machine from a remote device. In some embodiments, the method includes the step of storing gaming machine code at the remote device. A request for gaming machine code is generated, and the request is provided to the remote device. In accordance with some embodiments of the method, the gaming machine code is transmitted from the remote device to a first device of the gaming machine over a communication link in response to the request. The game code is processed, and all or a portion of the processed gaming code is provided to a gaming machine controller or other second device of the gaming machine for use.

In various embodiments, the method is implemented in an environment including a gaming machine, a communication network and at least one remote device. The gaming machine includes at least one gaming controller adapted to control the gaming machine, including for the purpose of presenting a game at the gaming machine. The gaming machine controller preferably includes a processor and a memory.

The gaming machine also includes a secondary device. The secondary device may comprise a player tracking controller. The player tracking controller includes a processor and a memory. One or more devices may be associated with the player tracking controller, such as a player tracking card reader and keypad.

In various embodiments, the player tracking controller includes a communication interface. The communication interface is associated with at least one network. In one embodiment, the network is a player tracking network including a player tracking host. The player tracking host includes a memory for storing player information, including information regarding a player's play at one or more gaming machines.

In various embodiments, a game code host is associated with the player tracking network. Game code is transferred from the game code host to the gaming machine via the player tracking network. Transmitted game code is preferably directed to the player tracking controller of a gaming machine, which processes the code and transmits it to the gaming machine controller.

A variety of systems or configurations of apparatus are contemplated for various embodiments. In some embodiments of a method, a request for gaming code is generated at the gaming machine and is transmitted to the game code host. The request may be generated by the gaming machine controller or player tracking controller/device. For example, in some embodiments, a request may be generated by the player tracking controller in response to the identification of a player by use of a player tracking card at a card reader of the player tracking device of the gaming machine.

Gaming code is transmitted from the game code host to the player tracking controller via the network or other communication link. In some embodiments, this link is part of a player tracking network which associates the player tracking device of the gaming machine with a player tracking host. In another embodiment, the link is a separate link from a link connecting the player tracking device of the gaming machine with the player tracking host, such as a wireless communication link to the game code host. The player tracking controller may process the gaming code in a variety of manners, including by storing all or a portion of the gaming code.

In various embodiments, a request for code is accompanied by information regarding the priority of the request. The method may include the step of queuing the code and transmitting it to the gaming machine at one or more particular times.

The gaming code may comprise a variety of information in a variety of forms. For example, the gaming code may comprise information used by the gaming machine controller for controlling or operating one or more peripheral devices of the gaming machine, such as a bill validator. The gaming code may also comprise a set of code permitting the gaming machine controller to present a particular game or games to a player.

INCORPORATION BY REFERENCE

The following are hereby incorporated by reference herein:

U.S. Pat. Nos. 7,160,187; 7,033,271; 7,077,746; RE38812; 4,283,709; 6,921,337; 5,429,361; 5,470,079; 6,890,260; 7,112,136; 5,848,932; 6,059,289; 6,190,255; 6,869,361; 4,448,419; 6,729,956; 7,137,885; 7,128,645; 7,137,630; 5,823,874; 5,848,932; 5,393,057; 5,560,603; 5,769,716; 6,048,269; 5,902,983; 5,851,148; 5,911,418; 5,848,932; 6,190,255; 6,089,976; 5,779,544; 5,664,998; 5,560,603; 6,168,523; 4,837,728; 6,729,956 and U.S. patent application publications 20070026938; 20060183529.

Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card and may be referred to as picture cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen, and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King, and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call, or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five as in five-card draw or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold'em and Omaha hold'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush and is the highest ranking standard poker hand (excluding five of a kind).

Examples

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank of varying suits. It ranks above three of a kind and below a flush. Two straights are ranked by comparing the high card of each. Two straights with the same high card are of equal value and split any winnings (straights are the most commonly tied hands in poker, especially in community card games). Straights are described by the highest card, as in "queen-high straight" or "straight to the queen".

Examples

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

A hand such as A♣ K♣ Q♦ J♠ 10♠ is an ace-high straight and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around" or play both high and low in the same hand: 3♣ 2♦ A♠ K♠ Q♣ is not a straight, but just ace-high no pair.

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

- K♥ K♦ 2♣ 2♦ J♥ ("kings up") defeats J♦ J♠ 10♠ 10♣ 9♣ ("jacks up")
- 9♣ 9♦ 7♦ 7♠ 6♥ ("nines and sevens") defeats 9♥ 9♠ 5♥ 5♦ K♣ ("nines and fives")
- 4♠ 4♣ 3♠ 3♥ K♦ ("fours and threes, king kicker") defeats 4♥ 4♦ 3♦ 3♦ 10♠ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

- 10♣ 10♠ 6♠ 4♥ 2♥ ("pair of tens") defeats 9♥ 9♣ A♥ Q♦ 10♦ ("pair of nines")
- 10♥ 10♦ J♦ 3♥ 2♣ ("tens with jack kicker") defeats 10♣ 10♠ 6♠ 4♥ 2♥ ("tens with six kicker")
- 2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

- A♦ 10♦ 9♠ 5♣ 4♣ ("ace high") defeats K♣ Q♦ J♣ 8♥ 7♥ ("king high")
- A♣ Q♣ 7♦ 5♥ 2♣ ("ace-queen") defeats A♦ 10♦ 9♠ 5♣ 4♣ ("ace-ten")
- 7♠ 6♣ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen, and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands,"

"busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender, and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

Tracking the Action at a Table

U.S. Pat. No. 6,579,181 which is hereby incorporated herein by reference, generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image and compares the change in contents of the chip tray to the outcome of game play to verify that the proper amounts have been paid out and collected."

"In a further aspect, the system can include a table monitor that automatically images the activity or events occurring at a gaming table. The system periodically compares images of the gaming table to identify wagering, as well as the appearance, removal, and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each players decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display is located at each game table and may display one or more jackpot awards for one or more winning combinations of cards. In various embodiments, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Furthermore, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include:

- a gaming table and a gaming tablecloth arranged on the gaming table, the gaming tablecloth provided with betting boxes and areas designated for placement of the gaming chips and other areas designated for placement of the playing cards;
- a card shoe for storage of one or more decks of playing cards, this card shoe including means for drawing individual ones of the playing cards face down so that a card value imprint on the drawn card is not visible to a player of the game of chance;
- card recognition means for recognizing this card value imprint on the drawn card from the card shoe, this card recognition means being located in the card shoe;
- an occupation detector unit including means for registering a count of gaming chips placed on the designated areas and another count of playing cards placed on the other designated areas on the tablecloth, this occupation detector unit being located under the tablecloth and consisting of multiple single detectors allocated to each betting box, each area for chips and each other area for playing cards respectively;
- a gaming bet detector for automatic recognition or manual input of gaming bets; and
- a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can include means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the tablecloth over the respective single detector. Each single detector can be an infrared sensitive photodiode, preferably a silicon photodiode. Advantageously the single detectors can be arranged in the occupation detector unit so that the chips or playing cards placed over them on the tablecloth are arranged over at least two single detectors.

The gaming apparatus may include automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

Following the Bets

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system may encompass, in various embodiments. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing but has more rigid rules as to when hits may be taken by the player and the dealer, and each position may take a maximum of one card as a hit. The hand identification system according to various embodiments may be able to address the needs of identifying hands in each of these types of games and especially must be able to identify hands in the most complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is hereby incorporated herein in its entirety by reference. Some delivery systems or shoes with reading capability include but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166, which are hereby incorporated herein by reference. In various embodiments, the cards are read in the smart card delivery shoe, such as one card at a time in sequence. Reading cards by edge markings and special codes (as in U.S. Pat. No. 6,460,848, which are hereby incorporated herein by reference) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known, and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is hereby incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed, and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer must play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73rd hand dealt). This date stamping of hands or even cards in memory can be used as an analytical search tool for security and to enhance hand identification.

Figure 47:
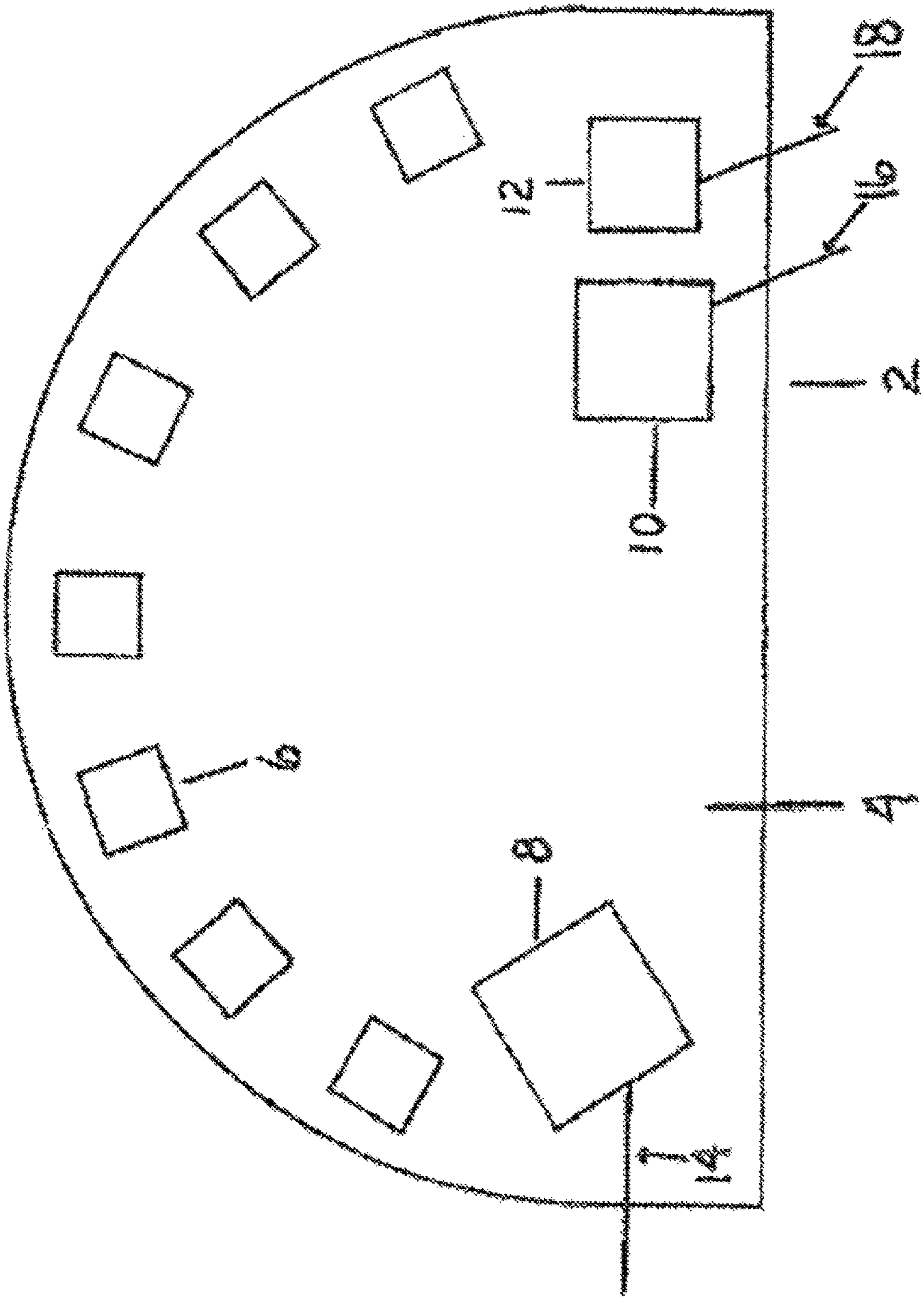
FIG. 47 shows a block diagram of components for a hand-reading system, according to some embodiments.

FIG. 47 shows a block diagram of components for the hand-reading system on a table 4, including a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur, and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or cardroom game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or cardroom game such as Draw Poker, Stud Poker, Lo-Ball Poker, or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

Card Shufflers

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment, and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the methods according to various embodiments.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearwardmost card in the stack of cards delivered to the dealing shoe. When shuffling and cutting operations are performed subsequent to the initial set-up, the paddle rests against the rearwardmost card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle, which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., "dither") means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system is controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoted to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

INCORPORATION BY REFERENCE

The following patents and patent applications are hereby incorporated by reference herein for all purposes:

U.S. Pat. No. 6,579,181
U.S. Pat. No. 6,299,536.
U.S. Pat. No. 6,093,103
U.S. Pat. No. 5,941,769
U.S. Pat. No. 7,114,718
US patent application publication 20050012269
U.S. Pat. No. 4,515,367
U.S. Pat. No. 5,000,453
U.S. Pat. No. 7,137,630
U.S. Pat. No. 7,137,629

Detailed Description

In various embodiments, a secondary player may include a person who places bets on the games of other people (primary players) but does not directly participate in the game himself. The secondary player may thus be remote from the place where a game is actually played. The secondary player may nevertheless view information about the game, such as from a video feed. A secondary player may also play in games of his own using the outcomes generated at the games of primary players.

Figure 61:
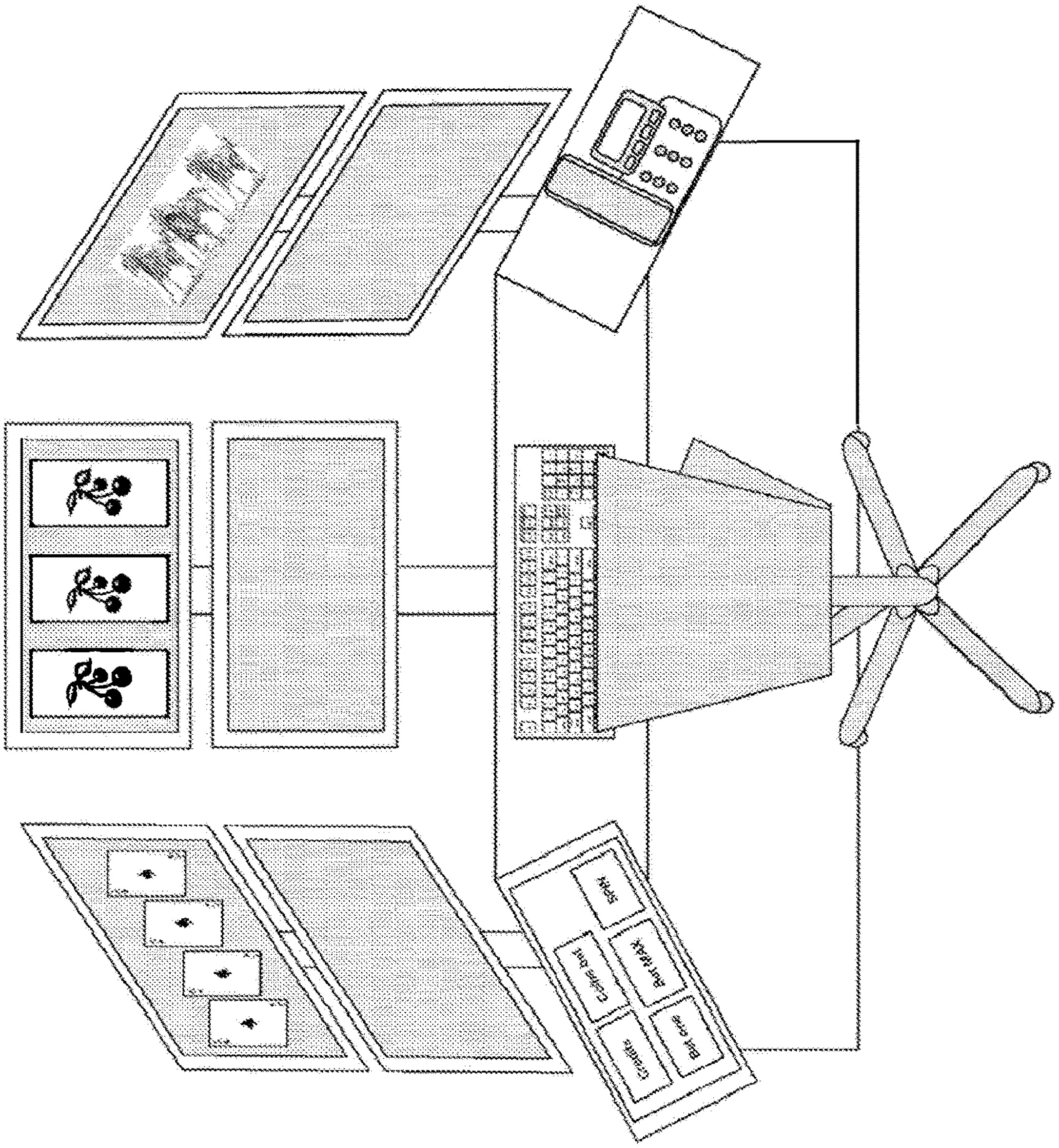
FIG. 61 shows a terminal according to some embodiments.
Figure 62:
FIGS. 62-66 show examples interfaces that may be used to play multi game games, comparison games, and so on in some embodiments.
Figure 63:
Figure 64:
Figure 65:
Figure 66:
Figure 67:
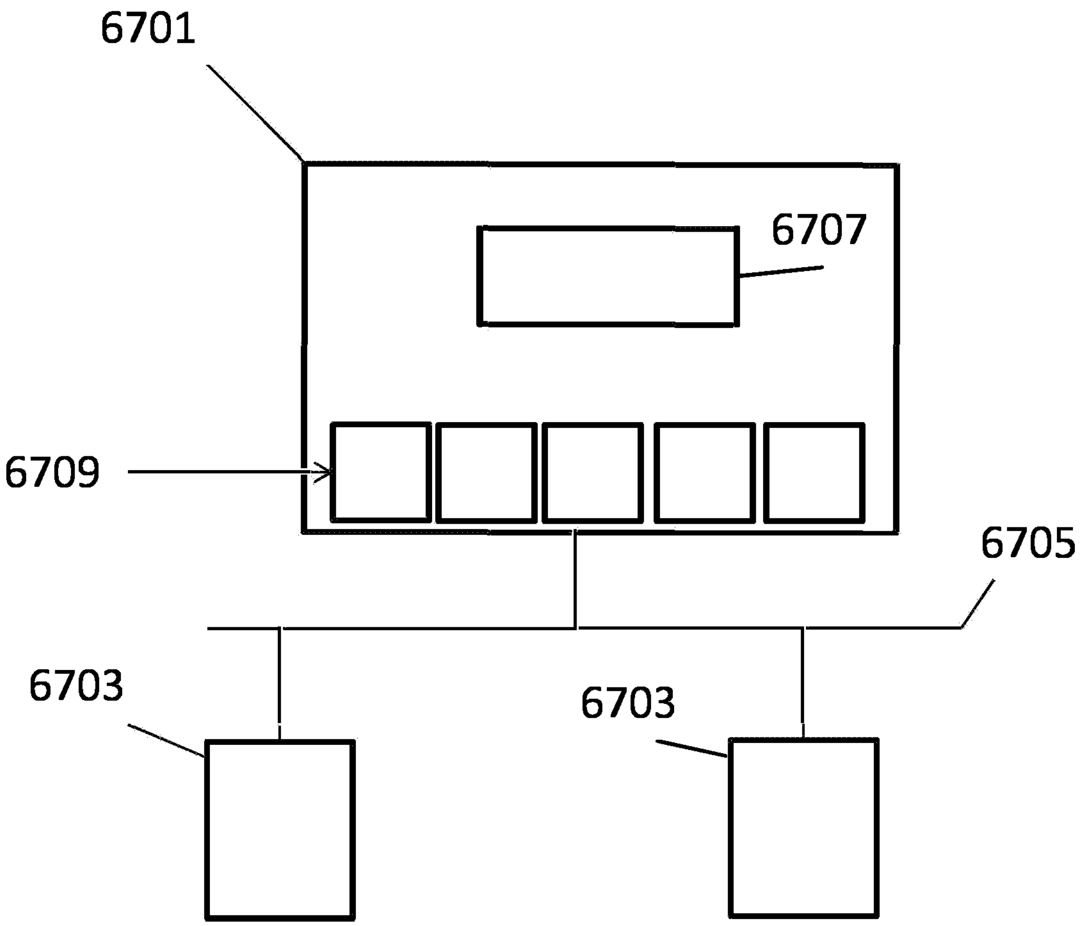
FIG. 67 shows an example apparatus that may be used in some embodiments.

In various embodiments, a player, such as a secondary player, may engage in gaming activities using a station, workstation, or terminal that has multiple displays. The displays may be monitors. The displays may include liquid crystal displays (LCDs), plasma screens, cathode ray tube displays, or any other displays. The terminal may include various other components. One or more keyboards may include buttons, touch pads, or other devices for receiving inputs from a secondary player. The keyboard may have dedicated keys with certain functions, such as shortcut functions. The terminal may include an audio communication channel, such as a telephone, an internet connection that supports voice, or any other communications channel. The terminal may include one or more touch screens. Touch screens may correspond to display screens. FIG. 61 shows a terminal, according to various embodiments.

1. Changing sizes of windows or feeds. In various embodiments, display screens of a terminal may display windows. A window may be a geometrical region of a display screen that shows related information within the region. For example, a window may show information about a particular game, such as a game from a particular primary player or from a particular slot machine. The window may be rectangular or some other shape. The window may be resized, such as to fill an entire display screen or to fill even more than one display screen. A window may also be resized to a relatively small size. Windows may be closed completely. New windows (e.g., windows showing information about a new type of game) may be opened. Windows may be stacked on top of one another. Windows may have various other relationships. Each window may have a different type of information. Each window, for example, may show information from the game of a different primary player. A window may feature games from a particular gaming device. A window may feature games from a particular game table. A window may feature statistics from around the casino (e.g., which are the top performing gaming devices; e.g., who is the fastest dealer; e.g., what is the longest winning streak in a game of roulette). A window may feature sports scores. A window may feature video feeds, such as video of a sporting event, video of a primary player, video of game table, or any other video. A window may feature game simulations, such as simulated reenactments of games.

1.1. Customized Window Arrangement. In various embodiments, a secondary player may have the opportunity to create or open new windows, to resize windows, and to move windows around. The secondary player may also have the opportunity to alter other properties of a window, such as its border color, background color, title bar, or any other properties. A secondary player may thus come to arrive at an arrangement of windows which he finds convenient, comfortable, or otherwise preferable. The secondary player's preferred arrangement of windows, including his preferred windows and/or preferred information to have in windows may be stored. The preferred arrangement may be stored with a terminal, with the casino server, or with the secondary player (e.g., in a portable flash drive or other medium in the possession of the secondary player). A given secondary player may thus leave a terminal and allow other secondary players to use the terminal, where each of the other secondary players has different preferences for window arrangements. The given secondary player may return to the terminal and have his preferred window arrangement automatically called up onto the display screens of the terminal.

A preferred window arrangement may include a specification of which windows a secondary player wants to view. For example, a secondary player may wish to view a window which shows a video feed from a particular craps table, another window which shows game outcomes form a particular bank of slot machines, another window which shows the secondary player's own credit balance and winnings history, another window which shows the top 50 primary players (in terms of net winnings over the last hour) who are currently playing in the casino, and another window which shows movies. A preferred window arrangement may include a specification of the position windows should take within one or more display screens of a terminal. For example, a first window and second window may go in a first display screen, a third window may take up an entire second display screen, a fourth window may occupy another two display screens, and a fifth, sixth and seventh windows may share another display screen. A preferred window arrangement may also include a specification of the position of windows within particular display screens. For example, a first window may be positioned in the top half of a display screen, a second window may be positioned in the lower left hand quadrant of the display screen, and a third window may be positioned in the lower right hand quadrant of the display screen.

In various embodiments, a terminal may include a button, key, or other input device which allows a secondary player to store his preferred window arrangement. The secondary player may press the button to store the arrangement. The secondary player may further provide a name for the arrangement. Thus, the secondary player may have the ability to store multiple arrangements, each under different names. When the secondary player first sits down at a terminal, the secondary player may present identifying information, such as by presenting a player tracking card (e.g., inserting the player tracking card into a card reader of the terminal). The terminal may then display a message for the secondary player asking if the secondary player would like to load a preferred window arrangement. The secondary player may be shown a list of saved window arrangements. The secondary player may then select one arrangement from the list, and the arrangement may be recreated for the secondary player.

In various embodiments, a secondary player may specify a preferred window arrangement using a device other than a terminal. For example, a secondary player may configure a preferred window arrangement on his home computer. The home computer may display, for example, a simulation of the terminal. The player may then create simulated windows and arrange the simulated windows in a preferred arrangement. The player may store such preferred arrangement with the casino server for example. When the secondary player subsequently visits a terminal (e.g., at a casino), the secondary player may load his preferred window arrangement into a terminal.

2. The hardware. A terminal may include one or more displays. Displays may be mounted on movable arms. For example, each display may be mounted on its own adjustable arm. Thus, the display may be repositioned by a secondary player to suit his viewing preferences. A secondary player may position multiple displays in order to arrive at his preferred arrangement. For example, a secondary player may arrange four displays so that they are stacked vertically, so that they form a horizontal row of displays, or so that they form a two by two grid, for example. In various embodiments, displays may be mounted in fixed relation to one another. For example, six displays may be fixed to a rigid, concave metal structure, so that together they form a "C" shape around a secondary player. A terminal may include one or more keyboards. A keyboard may include the "qwerty" arrangement of keys or may include some other key arrangement. A keyboard may have keys with specific functions related to gaming. A terminal may include other buttons or input devices. A terminal may include a computer processor, computer memory, a communications port for communicating with a network, an antenna or other transceiver for communicating wirelessly, a card reader (e.g., a magnetic stripe card reader; e.g., an RFID reader), audio output devices (e.g., speakers, e.g., headphones), audio input devices (e.g., microphones, e.g., telephone handsets), a chair or bench, a desk, a radio (e.g., a radio for listening to broadcast sports events), and any other pertinent devices. A terminal may further include components for gaming directly at the terminal. A terminal may include a built-in gaming device or may function as a gaming device. For example, a terminal may include coin and bill acceptors, a random number generator, buttons for placing bets, a coin dispenser, a coin tray, a printer, a ticket-in-ticket-out (TITO) printer, a TITO reader, mechanical reels, and/or hardware for conducting a bonus game (e.g., a terminal may include a physical wheel for conducting the bonus round of a Wheel-of-Fortune game). A terminal may include software with various functions. Game software may allow a person to play as a primary player, e.g., to play a game directly at the terminal. Some software may also provide an interface for a secondary player to place bets on games played elsewhere, e.g., games played by primary players. Software may further include software for displaying video feeds, such as feeds from sporting events or the games of primary players. Software may further include software for displaying outcomes generated in games played elsewhere. Software may further include software for allowing communication between the terminal and a network, such as the Internet, a cellular phone network, and/or a telephone network. Software may further include any other software for operating the terminal or associated devices in accordance with various embodiments.

2.1. Displays are stacked. Displays are movable with respect to one another. In some embodiments, displays are all attached to a single rigid body. The body may include a desk, a stand, or a housing which encloses computer hardware used to operate the terminal. The displays may be attached to the body via jointed or flexible arms. For example, a display may be attached to the body via a metal arm with a joint in it. A person may be able to adjust the position of a display by pulling or pushing on it, thereby flexing, or contracting the metal arm holding the display. A display may be mounted on a rotatable joint so that it may be oriented facing up or down, facing to one side or the other, or any combination of the above. In some embodiments, displays may be attached to one another. For example, two square displays may be connected at a side by a hinge. Thus, the displays may be folded to face more towards each other or more away from one another. In various embodiments, displays may be attached to a backboard or other rigid body. Their position may be relatively fixed, but their orientation may be adjustable. In various embodiments, displays may be flexible. Thus, a secondary player may bend a display. For example, a large flexible display may be bent to form a semicircle around a secondary player. In some embodiments, displays may be transparent or translucent. One display may be positioned in front of another display. Thus, the player may be able to see some of both displays in the same field of vision.

2.2. Position of displays can be saved. In various embodiments, a player at a terminal may save or record a particular arrangement of displays, keyboards, or other hardware. The arrangement may be stored with the terminal or with the casino server, for example. When a player returns to a terminal after an absence, or if the player comes to a new terminal, the player's stored settings may be recovered. The hardware of the terminal may then be brought into position automatically. For example, arms holding displays may be motorized and under computer control. The motors may thus be operated in such a manner as to bring the displays into the preferred arrangement of the player.

2.3. Displays functioning as one. In some embodiments, two or more displays may function as a single display. A graphic, window, or other image may begin on one display and continue on another display. A player may be able to move a window from one display screen onto another in a seamless motion. For example, a player may be able to use a mouse to drag a window from one display screen to an adjacent screen. In some embodiments, screens or the supporting structures for screens may include position sensors. For example, the joints on the arms supporting screens may include sensors for detecting the angles in the joints. Based on angles of the joints, software may be used to calculate the positions of the screens. Based on the positions of the displays, it may be determined which displays are near to each other or next to each other, and thus it may be determined how a single image should be displayed on multiple displays. For example, parts of the image that are adjacent to one another should be displayed on adjacent screens.

2.4. Special keyboards. A terminal may include one or more keyboards, keypads, buttons, or other input devices. Certain keys may have specific functions.

2.4.1. Functions of keys. A key may be used to open up a specific line of communication (e.g., to another player, e.g., to a casino representative), to call up a video feed for viewing, to call up information about a game for viewing (e.g., what is the current outcome, e.g., what were the last five outcomes), to call up a broadcast for viewing or listening, or for any other function. In various embodiments, a key may have a function as a preprogrammed or default function. In various embodiments, a key may be configured or programmed to perform a function. For example, a secondary player may configure a key to open up a line of communication with a specific friend of the secondary player.

2.4.2. Lines of communication. A key (e.g., a button) may open up a line of communication. The line of communication may be one-way, two-way, or multi-way. The line of communication may take the form of audio, text, video, or any combination of audio, text, and video. A key may open up a line of communication between the secondary player and another person, such as a friend of the secondary player or a casino representative. In some embodiments, a secondary player may configure a key to open a line of communication to a specific person. The secondary player may provide the name of the specific person, an identifier for the specific person (e.g., a player tracking card number) or any other information about the other person. The secondary player may visit a special window where a list of keys or buttons is provided, and the player is given the chance to enter names of people that he wishes to contact with the press of a button. A key or button may have a small display associated with it. On the display may appear the name of the person or the party with whom a line of communication is opened once the button is pressed. For example, once a secondary player has entered the name "Joe Smith" of his friend, the name "Joe Smith" may be displayed on or near a button. This may remind the secondary player that the particular button will open up a line of communication with Joe Smith.

In various embodiments, a key or button may open a line of communication with a casino representative. The secondary player may press such a button to order a drink, order food, request service to the terminal, request payment for jackpot, or for any other purpose. The secondary player may also initiate contact with a casino representative for information unrelated to a specific game. For example, the secondary player may wish to make a reservation a restaurant, may wish to find out when a restaurant closes, may wish to purchase show tickets, or may wish to seek out any other information or perform any other task.

In a one-way line of communication, for example, a secondary player may receive a video feed, audio feed, or may receive information in some other format. Information received may pertain to a game on which the secondary player is betting (e.g., to a slot machine game of a primary player playing in some other part of a casino), to a sports game, to a horse race, to general weather information, to general information about a casino (e.g., to when a swimming pool closes), to general news (e.g., to local news, e.g., to world news), or to any other activity or events. In various embodiments, a secondary player may be the one communicating in a one-way line of communication. The secondary player may, for example, open up a voice line to place an order for a drink. The player's request may be recorded at the other end of the line and may then be forwarded to a waiter or waitress in whose area the secondary player is located.

In a two-way line of communication, a player (e.g., a secondary player), may communicate with another person (e.g., a friend of the player, e.g., a casino representative). Video and/or voice from both parties may be transmitted back and forth via a network, such as via a casino intranet via the Internet or such.

In some embodiments, a player (e.g., a secondary player) may be able to open up multiple lines of communication at once. For example, a secondary player may be speaking to his friend Joe via one line of two-way voice communication, to his friend Sam via another line of two-way voice communication, and to his friend Bill via a two-way voice and video line of communication. The secondary player may be able to customize each line of communication on the fly. For example, the secondary player may be able to mute two lines of communication so he can speak to his friend Bill without the other friends on the line hearing him. The secondary player may also be able to change a line of communication from solely audio to audio and video, from video to audio, from two-way to multi-way, or to alter lines of communication in any other fashion. For example, a secondary player may be speaking to three friends, each over different lines of communication. The secondary player may be able to merge the lines of communication so that now the friends can hear and talk to each other rather than just hear and talk to the secondary player.

2.4.3. Keys to specific games. In various embodiments, feeds containing information about games may be available to a secondary player. A feed about a game may include a video feed of a particular game. For example, there may be a video feed of a high limit baccarat game available. A feed about game may include a feed with simulated reenactments of a game. For example, a feed may contain animated slot reels spinning to reveal an actual outcome that occurred at a slot machine. A feed about a game may include summary information. The information may be presented in the form of text, graphic, or video. The summary information may include, for example, an indication of an amount bet, an outcome achieved, an amount won, a number of pay lines played, which pay lines won, whether a bonus round was reached, what decisions were made in a bonus round, what decisions were made in the game at any decision juncture, and any other pertinent information. A feed may include video of a primary player. For example, the secondary player may be able to watch footage of a primary player as he plays a game. A feed may include footage for active games. For example, video footage may alternate originating from several different primary players, depending on who is currently involved in a game, depending on who currently has to make a decision in a game, depending on whether a game is near resolution, and so on.

A key may be configured or programmed to always call up a feed for a particular gaming device. A key may be configured or programmed to always call up a feed for a particular gaming table, to always call up a feed for a particular group of tables (e.g., the feed may show information about the outcomes of every game at the group of tables), to always call up a feed for a group of gaming devices (e.g., the feed may show information about the outcomes of every game occurring at the group of gaming devices), to always call up a feed for a particular area of a casino (e.g., the feed may show information about the outcomes of every game for the particular area of the casino), or to call up a feed for any other group of gaming devices or game tables.

In various embodiments, a secondary player may desire ready access to information about a certain preferred game or games. Thus, a single key or button may be configured to call up, when pressed, information about the preferred game or games.

In various embodiments, when information is called up, it may be displayed on one of the display screen of the terminal. Such information may occupy an entire screen, or it may occupy a portion of a screen, such as window within a screen.

2.4.4. Keys for latest updates. In various embodiments, a key or button may be pressed by a secondary player to call up an update about a game, primary player, gaming device, dealer, or other object, entity, or events in which the secondary player is interested. For example, a secondary player may press a key that will be caused to be displayed on a screen the most recent outcomes at a particular blackjack table. As another example, a secondary player may press a key that will cause to be displayed on a screen the most recent outcomes which have occurred across a casino, and which have paid more than $200. As another example, a player may press a key that will cause to be displayed the ten most recent rolls of the dice at a craps table. In various embodiments, a secondary player may press a key which causes an update to be provided. The update may appear in a window of one of the display screens of the terminal, for example. The update may disappear after some period of time, e.g., after 30 seconds. In some embodiments, the update may remain until the player again presses the key which brought the update in the first place. The window or screen showing the update may be continuously updated or may be static. Thus, in various embodiments, a secondary player may press a key to get updated information about a table, player, etc. However, the information may represent a small snapshot of the latest information and may not represent a continuous information feed of new information as it happens.

2.4.4.1. Keyboard has different channels. In various embodiments, a keyboard may have keys, buttons, or special key combinations which correspond to channels. A channel may be a broadcast or one-way line of communication. A channel may present information related to a particular topic, such as related to a particular type of game, to a particular type of player (e.g., high rollers), or to some other subject or topic. A channel may present video feeds, statistics, game commentary, strategy information, or any other information.

2.4.4.1.1. Video poker channel. In various embodiments, a video poker channel may exist. The channel may broadcast information about one or more video poker games. The channel may present lists of final outcomes as they occur throughout a casino. For example, the video poker channel may present a scrolling list with outcomes, "As 3d 4c Ac Js; 9h 9d 3s 3c Ks; As Ks Qh Jd 10c . . . ." Such outcomes may be outcomes that have occurred most recently at video poker games in a casino. A channel may include a scrolling list with cards dealt, with payouts won, with decisions made, or with any other items of information. A channel may include video footage. The video footage may switch from one game to another. For example, an announcer may say, "Let us now go to John's game where he has just been dealt three cards to a royal flush . . . ." Video footage may then be shown of John's game. At any given moment, there may be a number of games that could be featured on a channel. Some games might be shown in one form or another, such as in the form of a video feed, in the form of a text description, or in any other form, while some games may not be shown. Games that are shown may match one or more criteria. Such criteria may include: (a) a game had a high bet; (b) a game is being played by a skillful player (e.g., by a player who uses optimal strategy more than 80% of the time); (c) a game is being played by a primary player who has won more than a certain amount of money in the last hour; (d) a game has the potential to yield a high paying final outcome (e.g., an intermediate outcome has been dealt with four cards to a royal flush); (e) a game is played by a primary player that is popular (e.g., that has been rated highly in surveys of secondary players); (f) a game has been bet on by more than a predetermined number of secondary players; (g) a game has more than a certain amount of money bet on it by secondary players; and any other criteria.

More specific channels may exist. For example, there may be a channel dedicated to $1 video poker, to multi-hand video poker, to video poker games played in Las Vegas, to video poker games played in the last hour, or to Jacks-or-Better video poker.

A channel may show live information. A channel may also show historical information. For example, a video poker channel may show the best games from the last week, of games played last year.

2.4.4.1.2. Sports book channel. A sports book channel may show information about various sporting events, such as baseball games, basketball games, horse races, car races, golf tournaments, or any other sporting events or contests. The information may be presented as a text description of scores. For example, the most recent scores of various games may be scrolled across a screen. A sports book channel may show video feeds of various games, or highlights of various games. A sports book channel may selectively show footage from one game over another for various reasons. Footage of a particular game may be shown if: (a) there is a significant amount of money bet on the game by secondary players (e.g., more than a certain amount of money in aggregate, e.g., more money is bet on the game than on another game which is not shown); (b) there are more than a certain number of secondary players betting on the game; (c) the game is close (e.g., the scores of the opponents in the game are close; e.g., the horses in a race are neck and neck); (d) the game is nearing a resolution, or for any other reason.

2.4.4.1.3. Personalized channel. In various embodiments, a channel may be a one-way communication of information to a secondary player. The channel may be customized to the particular player, however. Thus, two different secondary players who are watching the Blackjack Channel, for example, may still receive different sets of information. A channel may be customized to show information about a game that a particular secondary player is betting on, to show information about a game that may be considered relevant to a secondary player based on information about the secondary player (e.g., a sports game may be shown to the secondary player if the secondary player's home team is playing), to show to the secondary player information about a game played by primary players with similar demographics to those of the secondary player, to show the secondary player information about a game played near his hometown (e.g., if the secondary player is from Mississippi, a game from a Mississippi casino may be shown), to show the secondary player information about a game in which the secondary player had previously expressed interest (e.g., if a secondary player previously has made bets on the games played at a particular gaming device, then games played at that same gaming device may be shown to the secondary player on his personalized channel.

In various embodiments, a secondary player may be asked what he would like to see or hear on a particular channel. The secondary player might then select particular types of games (e.g., video poker, e.g., Monopoly Slots), particular primary players, particular tables, particular dealers, particular areas in a casino, particular types of strategies (e.g., the secondary player wants a channel to show only primary players using a particular type of strategy, such as basic strategy), particular stages in games (e.g., the secondary player selects that a channel show only bonus rounds for games; e.g., the secondary player selects that a channel should only show games after an intermediate outcome has occurred, such as after the first two cards in blackjack have been dealt), games with certain types of outcomes (e.g., the secondary player selects that a channel should show only outcomes that have a payout of more than $100; e.g., the secondary player selects that a channel should show only outcomes where the ace of spades is present; e.g., the secondary player selects that a channel should only show games where a primary player has three cards to a royal flush), games played by certain teams (e.g., the secondary player may select that a channel only show baseball games from the National League; e.g., the secondary player may select that a channel only show college basketball games), or the secondary player may select or specify any other type of content to be in his personalized channel. The player may select content from a menu (e.g., the player may select a type of game from a menu containing different types of games), the player may specify desired content using text, or the player may specify desired content using any other format.

The secondary player may have the opportunity to name the channel. For example, the player might name a channel “Bonus Rounds,” “Top Winning Primary Players,” “Craps Games,” “High Payout Games,” or any other name.

2.4.4.2. Specific table (I like blackjack table X). In various embodiments, a channel may present games or information from a particular gaming table. For example, a channel may present games from a particular blackjack table. The channel may show video footage of the game. Video footage may be shown from overtop the table. Video footage may be shown which focuses on individual players at the table (e.g., video may focus on the face of one of the primary players). Video footage may be shown which focuses on the dealer. Footage may be shown which focuses on particular hands, particular cards, on chip stacks of various players, or on any other aspect of a table. A channel for a table may feature statistics about the table, including percentages of hands won by players in the last hour, including net winnings of the primary players, including the percentage of blackjacks achieved at the table in the last hour, or any other statistics. A channel for a table may feature statistics about rolls of dice (e.g., at a craps table), about outcomes at a roulette wheel (e.g., a statistic may indicate the percentage of “black” outcomes that occurred in the last 100 spins of a roulette wheel), or statistics about any other event or events at a gaming table.

2.4.5. Keys to specific players. In some embodiments, a secondary player may press a key or button to receive information about a specific primary player. Pressing such a key or button may allow the secondary player to see a video feed of the primary player’s game, to see a video feed of the primary player himself (e.g., a video feed of the primary player’s face), to see simulated renditions of the games of the primary player, to see statistics about the primary player (e.g., lifetime net winnings for the primary player), to see recent statistics for the primary player (e.g., net winnings for the primary player in the last hour), and to see any other information related to the primary player. In various embodiments, a key pressed by the secondary player may allow the secondary player to open up a line of communication with a primary player, such as an audio line of communication.

2.4.6. Keys to specific gaming devices. In some embodiments, a secondary player may press a key to receive information about a specific gaming device. Pressing such a key or button may allow the secondary player to see video of the gaming device, to see outcomes generated on the gaming device, to see reenactments of games played on the gaming device, or to see any other information about the gaming device. A key may be labeled with an identifier for a gaming device, such as “VideoPoker12345”. The key may also be given a custom name by the secondary player. In various embodiments, pressing a key or button may allow a secondary player to open up a communication channel with a gaming device. For example, the secondary player may be able to engage in audio communication with a primary player at the gaming device.

2.4.7. Keys to a specific game table. In various embodiments, pressing a key or button may allow a secondary player to receive information about a specific gaming table. For example, the secondary player may receive a video feed from the gaming table, an indication of who the dealer is, an indication of who the primary players are, statistics about what cards were dealt, statistics about what outcomes occurred, statistics about the percentage of time that primary players have won versus the percentage of time that the dealer has won, statistics about what strategy has been used at the table, or any other information about the table. The key may allow a secondary player to open up a line of communication with the table, such as a line of communication with one or more of the primary players at the table, or such as a line of communication with the dealer at the table.

2.4.8. Keys to specific sporting events. In various embodiments, a button or key may give a secondary player access to information about a particular sporting event. For example, a secondary player may press a key to watch a video feed of a baseball game between the Yankees and the Red Sox. When the sports game goes to commercial, the secondary player may press another button which calls up another sporting event. In various embodiments, a secondary player may select a viewing angle for a sporting event. For example, a sporting event may have multiple cameras capturing the action. The secondary player may be able to press a first button to see a feed from a first camera, a second button to see a feed from a second camera, and so on. For example, in a tennis match, one button may correspond to a view from mid-court, while another button may correspond to a view from the back of one side of the court. In some embodiments, a key may allow a secondary player to switch the commentator for a feed, broadcast, or channel. For example, a secondary player may be viewing a feed from a sporting event. The secondary player may press a key to change the audio from one sports commentator to another commentator. A secondary player may also change the commentator for another type of event. For example, a commentator may comment on the strategy of primary players from a table game of blackjack. A secondary player may decide he doesn’t like the commentator and may switch to a new commentator. The switch may occur at the press of a button or key, through a menu selection, or through some other means.

2.4.9. Functional Keys for Video feeds. In some embodiments, keys may have specialized functions for controlling video. Various keys may allow a secondary player to zoom in or zoom out. Various keys may allow a player to pan, to tilt, to increase or decrease the viewing angle, to filter out one or more objects in a video feed, to increase or decrease contrast, to increase or decrease brightness. If audio is present, a key may allow a secondary player to filter out certain audio sources (e.g., a secondary player may wish to filter out the voices of certain basketball players to hone in on the voice of his favorite basketball player). Various keys may allow the secondary player to freeze a video, to play the video in slow motion, to play the video backwards, or to play a video in fast forward. Various keys may allow for other manipulation of video or audio.

2.4.10. Programmable keys. Shortcut keys. A button or key may be programmable or configurable to call up any type of information, or to perform any other function. For example, a secondary player may program a button to bring up information about his preferred gaming table, about his preferred primary player, about his preferred outcomes, or about anything else. A secondary player may configure a button to open up a line of communication with a specific other person, with a specific gaming device, with a specific game table, or with any other specific counterparty. A secondary player may configure a button to put in a request. For example, a button may be configured such that if the button is pressed a martini will be ordered for the secondary player.

2.4.11. Keys that provide messages or alerts. In various embodiments, a button or key may change color, flash, or otherwise draw attention. A secondary player may then press the button or key to open up a line of communication, to call up particular information, to view a particular channel (e.g., a video poker channel) or to perform any other function. The button may flash or draw attention when some event of potential interest, importance, or significance has transpired which might warrant the attention of the secondary player. For example, the button may be configured to call up a bonus round channel on screen. The button may flash when a primary player somewhere in a casino has reached the final round of a bonus round. The secondary player may be motivated to press the button when it flashes so as to watch the final round of the bonus round which is occurring. The secondary player may be welcome to press the button at times when it is not flashing as well in order to see information about bonus rounds around the casino. However, the secondary player may be especially motivated to press the button when it is flashing.

2.4.12. Specialized keys dedicated to different games. A terminal may include specialized or dedicated buttons or keys, where such buttons or keys are specialized for particular games, for particular types of bets, or for any other specialized function. One set of keys may be for placing bets on games of video poker. One set of keys may be for placing bets on a game of blackjack. Other sets of keys may include keys for placing bets on games of roulette, keys for placing bets on games of poker (e.g., Texas Hold'em poker), keys for placing bets on craps, keys for placing bets on slot machine games, keys for placing bets on keno games, keys for placing bets on baccarat games, or keys for placing bets on any other types of games. Specialized keys may be used when a player at a terminal acts as a secondary player. Specialized keys may be used when a player at a terminal acts as a primary player.

A specialized set of keys for roulette may include a key for placing a bet on "red" a key for placing a bet on "black" a key for placing a bet on odd numbers, a key for placing a bet on even numbers, a key for each number on the roulette wheel, and a key for any other roulette related bet. A player at a terminal who desires to play or to participate in a game of roulette may thus conveniently use the dedicated keys at the terminal for making roulette bets. A complete roulette bet may be specified using two keys for example, a first key may specify a bet amount (e.g., 5 credits) and a second key may specify the bet type (e.g., "red"). A complete bet may also be specified using a single dedicated key. Pressing the key may be tantamount to instructions to bet 5 on red. In various embodiments, a bet amount may be understood, such as by default. For example, where a bet amount is unspecified, the same bet amount from the previous game may be used. Thus, for example, a player may press a dedicated "red" key to bet 5 credits on red if the player's prior bet had also been 5 credits.

Dedicated keys for a game of video poker may include five different "hold" keys, each key corresponding to a different hand position. A dedicated key, in any game, may also correspond to a strategy. For example, in video poker, there may be a key which directs the strategy with the highest expected winnings to be executed. By pressing such a key, the player allows software (e.g., software residing on the terminal or software residing with the casino server) to decide which cards to hold and which cards to discard based on a calculation of which leads to the highest expected winnings. In a game of blackjack, a dedicated key may be pressed to play basic strategy.

In a game of craps, dedicated keys may allow a player to make a "pass" or "don't pass" bet, or to make any other craps specific bet.

A key may be configured to perform one task. For example, a key may be configured to always place a certain type of bet, when pressed. However, in various embodiments, a key may be reprogrammed to perform another dedicated task. For example, a key that used to always place a bet of 5 on black may be used to now place a bet of 10 on red.

2.4.13. Keys dedicated to different types of bets. Keys customizable for different types of bets. E.g., customize a key for "bet 7 lines and 10 cents on each line". Or customize a key that says, "Bet that primary player Joe will fold." In various embodiments, keys may be customized for particular types of bets. A player may prefer a certain bet that is generally not easily selected or described. For example, a secondary player may wish to place a bet on 7 paylines in a slot machine game and to bet a quarter per payline on five of the paylines and to bet a dollar per payline on the other two lines. The secondary player may program a key to make just this desired bet, or to make any other desired bet. Thus, the player may save himself the trouble of entering intricate instructions each time he wishes to place a bet. In various embodiments, a player may at a first point in time enter detailed instructions for making a complicated bet. The player may then have the opportunity to save the bet. For example, the terminal may display a message for the player asking the player whether he would like to save the bet he just made or just entered. The player may indicate that he would. The terminal may give the secondary player the option of saving the bet to a particular button. For example, the terminal may give the player the option of associating a particular button on the terminal with the bet, so that the player may subsequently simply press the button once in order to make the bet. (In some embodiments, the bet does not take effect until the player confirms or actually initiates a game subsequent to making the bet). In some embodiments, a terminal may store a list of bets made recently by a player at the terminal. For example, the terminal may store the 10 or 50 most recent bets made by the player. The player may have the opportunity to see a list of recent bets and to select one from the list. For example, the player may use a mouse or arrow keys to navigate through a list of recent bets and to select one of them. The player may then make the bet again without having to reenter the bet.

2.4.14. Keys particular to display screens. In various embodiments, a key may correspond to a particular display screen. Pressing the key may somehow activate the corresponding display screen. For example, pressing the key may cause a mouse pointer to appear in the corresponding display screen, so that the player may now select or click on items shown in that display screen. In some embodiments, a player may be playing multiple games simultaneously, with different display screens showing different games. The player may wish to initiate a new game which is shown in a particular screen. Thus, the player may press a button which activates the screen. The player may then use a general set of betting keys to make a bet in that game and to initiate play of the game. The player may then press another key corresponding to another display screen. The new display screen may be activated. The player may then use the same general set of betting keys to activate to make a bet for the game shown in the new display screen.

2.5. Pictures. In various embodiments, a player may have his own photos loaded onto a terminal. For example, the six screens of a terminal may each show a picture of a different one of the secondary player's grandchildren. The secondary player may bring his photos to a terminal using a portable device, such as an MP3 player. The player may also download photos from a photo sharing web site, such as Flickr.

2.6. Other special input devices. Joystick. A terminal may have various input devices. These may include joysticks, touch pads, track balls, touch screens, microphones, cameras (e.g., a player may make hand signals to issue commands to the terminal, where such hand signals are picked up by the camera and interpreted by software), foot pedals, electronic pads for recognizing handwriting, or any other input devices. A terminal may include input devices of the same type found on some gaming devices. For example, a terminal may include a handle that can be pulled like the handle of a slot machine. Pulling such a handle may cause the secondary player to bet on the game of a primary player.

2.7. How do we make sure that people can't beat on these things and destroy them? In various embodiments, a terminal may contain expensive or fragile equipment. For example, the terminal may contain multiple buttons and display screens. In various embodiments, sensors may detect behavior which is dangerous to the equipment, such as hitting or banging. For example, vibration or pressure sensors may sense sudden shocks to the equipment. In various embodiments, a camera may monitor areas surrounding the terminal. For example, a camera may monitor the area where a secondary player normally sits or stands. The camera or various sensors may trigger an alert when dangerous behavior is detected or perceived. A casino employee may be alerted to visit the terminal upon detection of potentially dangerous or harmful behavior. The casino employee may be able to ask the secondary player what happened. If necessary, the casino employee may ask the secondary player to refrain from certain behavior. In some embodiments, if potentially harmful behavior is detected at a terminal, a communication line may be opened up between the terminal and a casino employee, such as a security guard. The casino employee may then have the opportunity to talk to the secondary player, ask him what is happening, and perhaps ask the secondary player to refrain from certain potentially damaging behaviors.

2.8. Ticker. Ticker of statistics of interest. Red/black casino wide. House versus player casino wide. Many other things displayed can be displayed in ticker form. In various embodiments, a display of a ticker may be shown on one or more display screens. The ticker may comprise a band on one or more display screens, with information moving across the band (e.g., from left to right). The band may have a particular color, such as green, or a particular pattern, or any other markings to distinguish it from surrounding graphics or to put on the appearance of a ticker tape. The ticker may contain various information. The ticker may include statistics about games at a casino or at multiple casinos. For example, a ticker may indicate the number of red outcomes that have occurred in roulette across the casino in the last five minutes, the number of black outcomes that have occurred in the last five minutes, the number of sevens that have been rolled in craps in the last hour, the number of times players have busted in blackjack in the last hour, the number of times the jackpot has paid out at any slot machine in the last twenty minutes, the names of the five players with the most winnings in the last hour, the size of a progressive jackpot, the scores in a sports game, or any other statistic. A ticker may vary or be customized in many ways. A ticker may span one display screen, or it may continue across two or more display screens. A ticker may even span less than one display screen. A ticker may be wide or narrow. A ticker may run horizontally, vertically, or along a diagonal. A ticker may proceed quickly (e.g., information may go from one side to the other quickly) or slowly. A ticker may appear as red, blue, or any other color. A ticker may have font in yellow, green, or any other color. There may be more than one ticker. For example, tickers may run in parallel across a display screen, or there may be two different tickers on two different displays screens.

A ticker may be customized in various ways. A secondary player may alter the sizes, background colors, font colors, font sizes or any other aspect of a ticker. A secondary player may specify which statistics or other information he wishes to be on the ticker. For example, the secondary player may indicate that he wants statistics only about slot machines and craps. Another secondary player may indicate that he wants statistics describing the winnings of the top 50 players of the most recent hour. Another player may indicate the he wishes to see the scores from sports games currently going on.

In some embodiments, certain ticker feeds may exist and may be available to one or more secondary players in a casino. There may be a blackjack ticker, a craps ticker, a sports ticker, a high rollers ticker, or any other particular ticker. A secondary player may then choose one or more tickers that he would like to see scrolling across on a display screen.

In various embodiments a ticker may be displayed using a matrix of light emitting diodes, such as a rectangular array of such diodes.

2.9. The setup adjustably configures to your body. For example, all the screens come in to be within arm's reach. The chair moves up or down to get you near the screens. The terminal may include sensors, such as range finders, lasers, sonar, or cameras to determine the body size of the player (e.g., tall, e.g., short). Portions of the terminal may automatically adjust to conform to the body size of the player. For example, the display screens may move in close to a player so he can reach them (e.g., if the display screens are touch screens). A chair of the terminal may move up or down to adjust to the height of the player.

2.10. Audio. A terminal may have various means of outputting audio. The audio that is output may include audio communication from a player's friends, audio communication from casino personnel, audio associated with a television broadcast, audio associated in with a radio broadcast, audio associated with a movie, TV show, or other form of media, audio associated with a game (e.g., audio outputs associated with winning a prize), or any other type of audio.

2.10.1. Give headphones to people. Headphones may be available for a player at a terminal. Using such headphones, a player may ensure that others around him do not hear his audio, or that he may focus on his audio without being distracted by ambient noises. A switch, button, or other input device may allow a player at a terminal to switch audio from one type of output to another. For example, audio may begin by emanating from speakers at a terminal. When a player puts on headphones, the player may flip a switch to cause audio to come through the headphones. In some embodiments, the headphones or the terminal may sense when the player has put on the headphones. Audio meant for the player may then be piped to the headphones rather than broadcast from speakers. In various embodiments, there may be two or more sets of headphones. Each set of headphones may broadcast separate audio feeds. For example, one set of headphones may correspond to a feed from a sporting event while a second set of headphones may provide an audio track for a slot machine game the player is participating in.

2.10.2. Display mounted speakers. In various embodiments, the terminal may include one or more speakers. The speakers may be mounted on the body of the terminal, or on some other structure associated with the terminal. The speakers may form part of the displays. The speakers may be mounted on the displays.

2.10.3. Mute buttons. In various embodiments, a terminal may include one or more mute buttons. Pressing a mute button once may silence an audio feed. Pressing the mute button again may cause the audio feed to return.

2.10.4. Squawk box. In various embodiments, an open line of communication may exist among a number of parties, such as three, four, five, six, or more parties. The communication may be audio based. A terminal may have a speaker which is attuned to broadcast voice or other audio messages from any person who is in on the communication. Further, a microphone or other audio input device may allow the player to communicate audio messages into the open line of communication. Any spoken message may be broadcast to all parties who are on the communication. If several people speak at once, all spoken communications may be communicated at once. Thus, an open line of communication may potentially result in a cacophonous melee of voices. A line of communication may be open among a group of friends, among a group of terminals, among all terminals, among all secondary players, among all secondary players who open the line of communication, among all players at gaming devices in a casino, among players and casino representatives, among players at multiple different casinos, or among any other group of people.

2.11. Phones. A terminal may include one or more phones and/or phone lines. A player may be able to place phone calls to another party.

2.11.1. Phone that only allows local calls. In some embodiments, a phone at a terminal may only allow local calls. In some embodiments, a phone at a terminal may only allow calls to certain areas, to certain people, to certain devices, or to certain other restricted destinations. In some embodiments, restrictions on phone calls may be put in place only when a player is placing bets on sports. For example, a player may be allowed to make only local phone calls when betting on a sporting event. This may help to restrict the player from finding out information about the result of the sporting event before counterparties to the bet. In various embodiments, a player may not place any bets on sports within a predetermined time of having placed a phone call which is not in accordance with various restrictions. For example, a player may be prohibited from placing a bet on a sporting event within 10 minutes of having completed a long distance phone call.

2.11.2. Calls to another node on a network. In various embodiments, phone calls may be restricted to certain parties. Phone calls may be restricted to other terminals. Phone calls may be restricted to people calling from within an internal casino network.

2.11.3. And calls are recorded. Because of sports book restrictions. In various embodiments, a phone call placed from a terminal may be recorded. Recorded calls may be checked to ensure that no sports related information is being communicated, or that no other information that may provide special knowledge about what bets to make are communicated. Recorded calls may be checked at random. Recorded calls may be checked after a player has won a bet. Recorded calls may be checked after a player has won statistically more bets than would be expected of a player. Recorded calls may be checked by a person or by a machine or computer (e.g., using voice recognition software). A recorded call may be analyzed based on the location of the counterparty in the call. For example, if the call was placed to a phone near a racetrack, the recorded call may be scrutinized.

2.11.4. Phone that allows you to speed dial into a radio show. In various embodiments, various speed dial functions may be associated with a phone or phones at a terminal. A player may be able to press a button to dial into a radio show. The player may then hear the radio show over the phone, or even to pose a question to the host of the radio show. In various embodiments, a speed dial function may allow a player to call up a feed of a radio sports broadcast. For example, the player may pick up a phone to listen to the radio broadcast of a game being played by a favored team. Various buttons may allow the player to dial into different sports broadcasts. In various embodiments, speed dials may allow the player to dial any other number or counterparty in an expedited fashion.

3. Different information on different displays. In various embodiments, different displays may show different information or different types of information. The display screens may complement each other. For example, some displays may show broad types of information, while others show specific types of information, or more detailed information about something shown in another display. Some displays may cover one game or one area of a casino while other displays cover other games or areas of the casino.

3.1. Different Views 3.1.1. One display shows reenactments of outcomes. One display may show reenactments of game outcomes. The display may show footage of the actual outcomes, e.g., as the actual outcomes occurred. Outcomes shown may be outcomes for games in which a player at a terminal is participating as either a primary player or as a secondary player.

3.1.2. One display shows just data about outcomes. In various embodiments, a display may show data about outcomes. The display may show what outcomes have occurred. The display may show statistics describing multiple outcomes. For example, the display may show statistics describing which outcomes were most frequently occurring in the casino in the last five minutes. The display may show statistics describing streaks of outcomes (e.g., 10 sevens in a row have been rolled at a craps game).

3.1.3. One display shows overhead views of regions of a game floor. In various embodiments, a display may show an overhead view of a region of a casino. The region may be the same region of a particular game that is more closely featured on another display screen of the terminal.

3.1.4. One display shows a whole game table. In various embodiments, one display screen of a terminal may show an entire gaming table. Another display screen, for example, may show more details about the table, such as focusing in on one player at the table, or showing statistics about the table.

3.1.5. Blow up the video to show an important event on many screens at once. In various embodiments, an important or significant event may be brought to prominence. The display area used for that event may be increased. The area may be increased from one display screen to two or more display screens. The area may be increased from a portion of a display screen to take up a whole display screen. Significant events may include the occurrence of a significant outcome in a game in which the secondary player participates, the occurrence of a jackpot, or the occurrence of any other rare, high paying or otherwise significant event.

3.1.6. Picture in picture. There is a speed dial switch to go from video to video. In various embodiments, a window, frame, or picture may be shown within a larger window, frame, or picture. The smaller window may contain one video feed while the larger window may contain another video feed. The smaller and larger windows may contain other types of feeds or images as well, such as animated reenactments of game outcomes. A player at the terminal may switch the windows so that the footage shown in the larger is now shown in the smaller, and so that the footage that was shown in the smaller is now shown in the larger. A special key or button may rapidly affect the switch. In various embodiments, there may be multiple smaller windows within one larger window. There may be a special key or button which corresponds to each of the smaller windows and/or which corresponds to the footage within the windows. A player may thus monitor a number of games, sporting events, or other activities at once. When the player becomes interested in one particular game (or sporting event or other activity), the player may press a button that corresponds to the game of interest (e.g., to the window with the game of interest). The footage of interest in the window of interest may then enlarge to take up the larger window, while the footage in the larger window may then shrink to occupy the smaller window. In various embodiments, particular events that occur in a game, sporting event, or other activity may cause the corresponding window (e.g., the window showing the game) to become the large window. For example, if a game shown in a smaller window results in a high-payout outcome, footage of the game may be enlarged and shown in the larger window.

3.1.7. Proprietary feeds from different services. For example, there is a feed from one casino. Or a feed from one type of game that is only played in one place. There may be financial arrangements with the casino to get this feed. Information shown at terminals may come from diverse places. Information may come from different casinos, from vendors that specialize in generating game outcomes for sale, from sports franchises, from racetracks, from media companies (e.g., movies shown on terminals may come from media companies) or from any other source. Different sources may charge for providing such information. For example, a sports franchise may charge for blanket use of sporting footage in a casino, or for use of sporting footage at a particular terminal. In various embodiments, different information sources may charge at different rates and according to different schemes. A source may charge according to one or more of the following: (a) the number of terminals using information from that source; (b) the number of viewers of information from that source; (c) the size of a window in which information from that source was displayed (e.g., the casino owning the terminal may pay more for footage shown in a large window than for footage shown in a small window); (d) the number of other information sources shown together with a given information source (e.g., a casino may pay less for showing footage or information from a given source if such information was displayed at the same terminal with a large number of other types of information than if the information was displayed on its own); (e) the length of time for which a feed from that source was viewed; (f) the celebrity status of people in a feed (e.g., footage showing a poker game being played by a celebrity may be more expensive than is footage showing a poker game played by an unknown person), or based on any other metric. A casino may pay for an information feed on periodic basis. For example, a casino may pay a subscription fee for an information source.

3.2. What is the standard default data that is always displayed? E.g., standard games, standard indices. In various embodiments, a terminal may have a default set of feeds or pieces of information that are displayed. For example, there may be video footage shown from a Wheel of Fortune slot machine game, from a video poker game, from a blackjack table, and from a craps game. In various embodiments, default footage is chosen based on what are the most popular games in a casino. For example, if the most played game by primary players was the Monopoly slot machine game, then it may be assumed secondary players at a terminal will wish to participate in such games. Thus, footage may be shown from a Monopoly slot machine game. In various embodiments, just as default footage may be shown, there may be default configurations for various keys, buttons, or switches at a terminal. For example, a set of keys may be configured by default to be used for placing bets on games of video poker.

3.3. Video feeds. Multiple full-motion video feeds. Hi definition video signal. In various embodiments, high bandwidth connections may be used to pipe multiple high-definition video feeds to a terminal. A player may thus enjoy a pleasurable gaming and entertainment experience while at the terminal.

3.4. Alerts. Something happens and shows in red, for example. A terminal may include several windows, several feeds, information about several games, or other diverse information. When a noteworthy event or occurrence happens in one feed, such feed may be emphasized or brought to prominence. For example, a window with a particular feed may be enlarged, or made brighter. Audio from a particular feed may be made louder, or audio from competing feeds made lower. Footage may flash, or other indicators may flash. A button which can call up a particular feed or information source may flash when a noteworthy event occurs for that feed.

3.4.1. Sounds for alerts. In various embodiments, alerts as to the occurrence of a noteworthy event may occur by means of audio. Special sounds may be broadcast for different events. For example, different types of events might have different corresponding sounds. In some embodiments, however, there is a generic sound for any noteworthy event. In some embodiments, the occurrence of a jackpot may be heralded with one type sound, the occurrence of a streak of a certain length may be heralded with another type of sound (e.g., the sounds of chimes play when a primary player wins ten games of blackjack in a row), the initiation of play by a favored primary player (e.g., by a primary player favored by the secondary player at a terminal) may be heralded with a third type of sound (e.g., the sound of a rooster crowing), and so on.

3.4.2. Customize your own alert sounds. In various embodiments, a player may customize which sounds will be used to provide alerts or announcements as to the occurrence of particular events. The player may select from a list of special events. The player may similarly select from a menu of sounds. The player may match events to sounds. The player may also provide his own sounds, e.g., via portable MP3 player.

3.5. Entertainment. A secondary player may use the terminal for entertainment purposes. The secondary player may watch movies, TV shows, casino related events, or other forms of entertainment. The secondary player may watch news programs, science programs, documentaries, or other video. The player may listen to music, books on tape, speeches, or other audio. The terminal may have available multiple display screens. Thus, a secondary player may watch entertainment on one screen while watching the progress of games on another screen.

3.5.1. Movies on demand. A secondary player may watch a movie at the terminal. The secondary player may request a particular movie, such as from a list of movies licensed by the casino for presentation. The secondary player may also select a movie channel, such as cable or satellite TV channel, on which movies are playing. The player may receive a feed from the channel at the terminal.

3.5.2. TV Shows. A secondary player may watch a TV show at the terminal. The secondary player may select from a list of pre-recorded TV shows. A secondary player may also watch a regular TV channel that may be fed to the terminal.

3.5.3. Casino Related Events. A secondary player may watch video feeds of casino related events. For example, the player may watch a video of a concert that played the previous night, of a comedy act, of an animal performance, or of any other casino related event.

3.5.4. Music. In various embodiments, a secondary player may listen to music at a terminal. The music may come from speakers built into the terminal. A headset with earphones may also be supplied to the player for listening to the music or for other audio communication. A secondary player may select from one or more channels. The channels may correspond to radio stations or to broadcasts made exclusively within a casino. For example, a casino may have its own disc jockey which selects songs or tunes to be broadcast to players in the casino. The player may select a music or audio channel to listen to using a menu. Certain buttons or keys may also be configured to correspond to certain audio or music channels. For example, there may be a "Rock and Roll" button, a "Jazz" button and a "Classical Music" button. In various embodiments, a secondary player may have the ability to select individual songs to play. The casino or a third party may offer a number of songs for selection by the secondary player. Thus, the terminal, in conjunction with the network, may function as a juke box, although payment may or may not be necessary, in various embodiments. In various embodiments, as a secondary player selects songs to play, the secondary player may develop a list of preferred songs. The secondary player may then have the option of having songs from his list (e.g., songs previously selected) to be played. The terminal may systematically proceed song by song through the secondary player's list of preferred song (e.g., playing one by one and then starting from the beginning) or the terminal may randomly select a song to play at any moment in time.

3.5.4.1. Songs chosen to correspond to gaming outcomes. In various embodiments, a terminal may play a song or tune which is chosen based on an outcome that occurred in a game in which the secondary player participated. For example, if the secondary player made a winning bet in a game, then a song with a happy theme may be played. If a player made a losing bet, a song with a sad theme may be played. Songs may be chosen based on the correspondence of their lyrics to the symbols, graphics, or events in a game. For example, if a "grape" symbol occurs in a game, then the song "I Heard It through the Grapevine" may be played.

3.5.4.2. Secondary player brings his own songs. In various embodiments, a secondary player may bring his own tunes or songs for listening at the casino. A player may bring an MP3 player to the casino, such as an iPod. The secondary player may dock the MP3 player into the terminal. The speakers of the terminal may then be used to play songs stored on the MP3 player. Further, information about the songs on the MP3 player may be downloaded to the terminal. Various buttons, dials, or other input devices on the terminal may then be used to navigate through the secondary player's list of songs and to select songs for playing. In various embodiments, a secondary player may also store songs on a network, such as on the Internet. A secondary player may store songs on his home computer, where such home computer is accessible via the Internet, e.g., via file sharing software. The terminal may access the secondary player's songs and may play them upon the request of the secondary player. In various embodiments, a secondary player may bring movies or other entertainment to the terminal. The movies may be brought on a portable movie player, on an MP3 player, on a storage medium (e.g., on a flash drive, e.g., on a DVD), or on any other object or device. The movies or other entertainment may be loaded onto the terminal and played.

3.5.5. Requirements to watch entertainment—must be gaming at a certain rate. In various embodiments, a secondary player may be permitted to watch entertainment or other video unrelated to gaming activities, so long as the secondary player engages in a certain amount of gaming activity. The secondary player may be required to bet a certain amount per unit time, to participate in a certain number of games per unit time, to have a pause between participation in games of no more than X minutes, or to satisfy any other metric of play. Thus, in various embodiments, the ability to watch entertainment may be a reward for the player for his business gaming.

3.5.6. Pausing entertainment for game outcomes. In various embodiments, video, or audio feeds, such as video feeds showing a movie or other entertainment, may be paused for various reasons. Feeds may be paused upon the occurrence of certain events in a game. A feed may be paused if a game in which the secondary player participates comes to a resolution or is about to come to a resolution. A feed may be paused if a game in which the secondary player participates results in an outcome that meets certain criteria. An outcome that meets such criteria may include an outcome that corresponds to a payout over a certain threshold, an outcome that corresponds to a jackpot outcome, an outcome that is a winning outcome, an outcome that had less than a predetermined probability of occurrence, or an outcome that meets any other particular set of criteria. The pausing of entertainment may allow a secondary player to focus on game outcomes or game events without missing a portion of a movie, TV show, or other portion of entertainment. A pause in entertainment may also give the player the opportunity to specify a new bet or set of bets.

3.6. Advertising. In various embodiments, one or more displays may include advertisements or other promotions. Advertisements may be for third party merchants' products, for casino shows, for casino restaurants, for products sold at casino shops, for casino hotel rooms, for other casino events, or for other products or services. In various embodiments, a screen of the terminal may be dedicated solely to advertisements. In various embodiments, advertisements may appear in windows within display screens. A secondary player may also have the ability to make purchases using the terminal. For example, a secondary player may respond to an advertisement and purchase a product that was shown in the advertisement. In various embodiments, various buttons or keys at a terminal may be temporarily or permanently associated with a product, service, or advertisement. For example, a message may be shown in associating with an advertisement. The message may say, "If you wish to learn more about this product, or to purchase this product, please press the flashing button." A button at the terminal may be flashing. The player at the terminal may then press the button to view additional screens of information about the product, to open up a line of communication (e.g., a phone call or video conference) with a salesman for the advertised product, to visit a purchase screen where the player can confirm that he wishes to pay a particular price and to receive an advertised product, and/or to purchase the product outright. For example, in some embodiments, a player may press a button to immediately purchase a product. The product's purchase price may be deducted from the player's gaming credits. In some embodiments, buttons or other input devices may be associated with a product or service even in the absence of a promotion or advertisement. A button or other input device may be permanently associated with a product or service. The player may press the button in order to purchase the product or service. After pressing the button, one or more acceptance or confirmation steps may be required. For example, the player may be required to sign, to supply a thumb print, to supply a credit card number, to supply a shipping address, or to otherwise confirm he wishes to make a purchase, or to otherwise supply necessary details for completing the purchase.

4. Play against multiple opponents. See one on each monitor. In various embodiments, a secondary player may participate in a game in which there are multiple primary players. For example, the secondary player may participate in a game of Texas Hold'em poker. The terminal may feature images or videos of two or more of the players participating in the game. The images or videos may be shown simultaneously. The images or video may be shown simultaneously on different screens. For example, there may be six primary players in a game of Texas Hold'em. There may be six display screens at the terminal. Each display screen may show video footage of a different one of the six players. In various embodiments, the displays may be arranged horizontally side by side, such as to simulate a visual field as if the secondary player were actually sitting at the live game of poker. In various embodiments, the display screens may be located near or far from the secondary player to simulate visual depth even more realistically. For example, suppose video footage is taken of all the players at a poker table from the vantage point of one seat at the poker table. Video of the primary player furthest from that seat may be shown on a display screen which is located furthest from the secondary player (e.g., furthest of any display screen at the terminal). Likewise, video of the primary player nearest the seat from which the video is taken may be shown on a display screen which is nearest to the secondary player (e.g., the nearest of any display screen at the terminal).

In various embodiments, a player at a terminal may play in a game as a primary player. For example, the player may play in a game of Texas Hold'em poker or in a game of Blackjack. Video or images of his opponents may appear on various screens of the terminal. In some embodiments, each screen may contain an image or video of a different one of the player's opponents.

In various embodiments, a player (e.g., a primary player) whose turn it is to act in a game may be prominently featured at a terminal. A player whose turn it is to act may have his image placed on a center screen on a terminal. If videos or images of multiple players are shown, the image of the player to act may be enlarged, highlighted, made more bright than images of the other players, or otherwise emphasized.

In various embodiments, avatars for players (e.g., for primary players) may be shown on the display screens of terminals. For example, a video or image of a primary player may not be available, or the primary player may wish that a video of him not be shown. Thus, an avatar or other representation of a primary player may be shown on the display screens of a terminal. Where a player acts as a primary player at a terminal, avatars for his opponents may be shown on display screens of the terminal.

5. Applications to server based gaming. No reason you can't now play multiple different gaming devices at once. In various embodiments, a terminal may function as a gaming device. A terminal may also function as two or more gaming devices. A terminal may, for instance, allow a player to play two or more games at once. In various embodiments, a first screen of a terminal may show a first game. A second screen of a terminal may show a second game. For example, the first screen may show a game of video poker. The second screen may show a slot machine game.

5.1. Gaming Device. The functions of conducting a game may be performed in several steps, in some embodiments. A random number may be generated. The random number may be translated into an outcome. A game scenario may be shown or displayed which ultimately leads to a display of the outcome. For example, reels may be shown to spin and then stop at the outcome. Further steps may include determining intermediate outcomes (e.g., based on the same or other random numbers), receiving decisions from a player, determining a payout based on an outcome, and crediting a player account with a payout. A terminal may perform one or more functions of conducting a game. A terminal may display the outcome of a game to a player. Functions of a game not performed by a terminal may be performed by another device, such as by a casino server or by a separate gaming device. For example, the casinos server may determine a random number and an outcome for a game. The terminal may then display the outcome of the game for a player. Where the terminal and another device together conduct a game, the terminal may be in communication with the other device, e.g., to request game related information from the other device and to receive such game related information from the other device. In various embodiments, a terminal may download software for conducting all or a portion of a game. The software may be downloaded, for example, from a casino server. The software may make the terminal operable to render graphics and to provide audio associated with the game. The terminal may be operable to download software for multiple different games, and therefore the terminal may be operable to conduct portions of multiple different games. For example, a terminal may be operable to conduct a portion of a slot machine game and to conduct a portion of a video poker game.

5.2. Two or more gaming devices. In some embodiments, a terminal may function as two or more gaming devices at once. For example, on one screen of the terminal may be displayed graphics and other information from a video poker game. On another screen of the terminal may be displayed graphics and other information from a slot machine game. In some embodiments, as the player at the terminal pleases, he may initiate a new game for one or the other or for both types of games. A terminal may include separate keys or controls for two types of games. For example, one set of keys may be operable to place bets in slot machine game, while another set of keys may be operable to place bets and make decisions in a video poker game. Both sets of keys may be part of the same terminal. Further, other sets of keys may be available, such as keys for craps, roulette, or other games. In some embodiments, a terminal may conduct two of the same type of game at once. For example, a first screen may show a first slot machine game and a second screen may show a second slot machine game. There may be separate sets of keys even for two of the same type of game.

5.3. A player plays as a primary player and as a secondary player. In various embodiments, a terminal may allow a player to play a first game as a primary player and to participate in a second game as a secondary player. For example, a player may place a bet on slot machine game, initiate the slot machine game, and receive a payout based on the outcome of the slot machine game. The player at the terminal may also place a bet on a slot machine game being initiated and played by a different player (e.g., by a primary player). A first display screen of the terminal may show information about a first game in which the player at the terminal is acting as a primary player. A second display screen of the terminal may show information about a second game in which the player at the terminal is participating as a secondary player. One set of keys or buttons or other input devices may allow the player at the terminal to play a first game as a primary player (e.g., to place bets; e.g., to make decisions; e.g., to initiate games). A second set of keys or buttons or other input devices may allow the player at the terminal to participate in a second game as a secondary player (e.g., to select primary players to bet on; e.g., to place bets).

6. Screen with control panel. In various embodiments, a terminal may include a screen with information about a player using the terminal Such information may include a credit balance, an amount bet or to be bet on a first game, an amount bet or to be bet on a second game, amounts bet or to be bet on any number of other games, a primary player on whom the secondary is betting, a game in which the secondary player is participating, a pay table for a game in which the player (e.g., the secondary player) is participating, and any other information about the activities of the secondary player. The information about a player at a terminal may generally give the player an idea of how he is doing (e.g., how much he has won or lost) how much money he has left, how much he has just won on a particular game, what are the games in which he is participating, and any other useful information or other information related to the secondary player. In some embodiments, a terminal may indicate to a player how many comp points he has in total, and/or how many comp points the player has earned over a particular gaming session (e.g., over the gaming session at the terminal). A screen of the terminal may further include interactive areas where the player can touch or otherwise interact with in order to receive further information. The screen may be a touch screen, for example. In various embodiments a player may touch a screen to reveal the rules of a game. For example, the player may touch a "rules" button on the screen. In some embodiments, a player may touch a screen to reveal the pay table of a game. In some embodiments, a player may touch a screen to show the pay lines on a game.

7. Various Screens Show Layers of Information. In various embodiments, a first display screen at a terminal may show a first set of information. A player at the terminal may wish to delve further into the information, however. Thus the player may provide some indication of where he wants to learn more information. Further information may then appear on another display screen of the terminal. Screens may thus have a hierarchical relationship. A first screen may generally show broad or top-level information. A second screen may generally show more detailed information on specific items from the first screen. The first screen may be located centrally in the field of vision of the player, while the second screen may be located to the side, high above the player, or somewhere else not quite as easily visible as is the first screen. In one example, the first screen may show video footage of a primary player. The secondary player at the terminal may click on an image of the primary player in the video in order to learn more about the primary player. Subsequently, on the second screen, more information about the primary player may appear. Such information may include the primary player's name, age, occupation, the type of strategy typically employed by the primary player, the results of the last ten games of the primary player, the net winnings of the primary player in the last 20 minutes, the number of jackpots won by the primary player in his life, or any other information about the primary player. In another example, a player at a terminal may be watching a sporting event. The player may click on a horse, at which point statistics about the horse may pop up on another screen. In another example, a player may be watching a feed of a game from a blackjack table. The player may click on the table in order to see the percentage of hands won by the dealer, the percentage of hands won by the primary players at the table, the number of blackjacks that have been dealt in the last 100 hands, and any other information about the table. In various embodiments, there may be several levels of hierarchy among display screens at a terminal. It may be possible to repeatedly request more and more specific information on a topic, with each layer of more specific information appearing on a new screen of the terminal.

The following are embodiments, not claims:

A. A method comprising:
receiving identifying information for a player at a casino;
associating the player with a button;
determining that the button has been pressed;
identifying footage pertaining to the player; and
presenting the footage.

B. The method of embodiment A further including displaying a name of the player on the button.

C. The method of embodiment A in which identifying footage includes:
transmitting to a casino server a request for footage pertaining to the player; and
receiving the footage from the casino server.

D. The method of embodiment A in which presenting the footage includes displaying the footage on a display screen.

E. The method of embodiment A in which identifying footage includes identifying a video showing the face of the player.

F. The method of embodiment A in which identifying footage includes identifying a video showing the player engaged in play of a game.

G. The method of embodiment A in which identifying footage includes identifying video showing an indication of game outcomes achieved by the player.

H. A method comprising:
receiving a request from a player at a gaming device to place a phone call;
determining a destination of the phone call;
determining a bet that is available at the gaming device;
determining a set of rules that are associated with the bet;
determining that the placement of the phone call to the destination is in compliance with the set of rules; and
connecting the player to his destination.

I. The method of embodiment H in which receiving a request from a player includes receiving from the player at the gaming device an indication of a set of digits dialed.

J. The method of embodiment H in which determining a bet that is available at the gaming device includes determining a bet on a sporting event that is available on the gaming device.

K. The method of embodiment J in which determining a set of rules includes determining that no phone calls are allowed outside the local area of the gaming device when the bet on the sporting event is placed.

L. The method of embodiment H further including recording the phone call.

M. The method of embodiment L further including:
determining that the player has made the bet;
determining whether the player has won the bet; and
replaying the recorded phone call if the player has won the bet.

N. A method comprising:
receiving an indication of a first bet from a first player;
deducting the amount of the first bet from a credit balance associated with the first player;
receiving a game initiation signal from the first player;
determining a first outcome of a first game;
displaying graphics associated with the first game on a first display screen;
determining a first payout of the first game based on the first outcome and based on the first bet;
increasing the credit balance associated with the first player by the amount of the first payout;
receiving an indication of a second bet from the first player;
deducting the amount of the second bet from the credit balance associated with the first player;
receiving from the first player an indication of a second game played by a second player;
determining a second outcome of the second game;
displaying graphics associated with the second game on a second display screen, in which graphics associated with the second game are displayed simultaneously to the display of the graphics associated with the first game;
determining a second outcome of the second game;
determining a second payout based on the second outcome and based on the second bet; and
increasing the credit balance associated with the first player by the amount of the second payout.

For example, the second player may be a primary player, and the first player may participate in the game of the primary player as a secondary player. At the same time, the first player may play the first game as a primary player. Thus, the first player may simultaneously act as both a primary player and a secondary player. It should be recognized that while various example embodiments are described in terms of a separate primary and secondary player, that in some embodiments, a secondary player and a primary player may be a same player. For example, a player may choose to play a copy of a hand dealt to the player (e.g., take a same original hand in multiple different directions).

O. The method of embodiment N in which the second game is played remotely from the location of the first player.

P. The method of embodiment N in which displaying graphics associated with the first game includes displaying a rendition of spinning slot machine reels.

Q. The method of embodiment N in which displaying graphics associated with the second game includes displaying video footage of the second player playing the second game.

Game Sorting

In some embodiments, a primary player may directly participate in a game of chance. The primary player may place a bet, make game decisions, roll dice (e.g., if the game is a game of craps), and receive winnings and losses based on his bet, his decisions, and events (e.g., random events) that occur during the game. In some embodiments, a secondary player may place bets on games played by a primary player. The secondary player may bet that certain outcomes will occur, that certain decisions will be made, that certain cards will be dealt, that certain numbers will be rolled in a game of dice, or that any other event will occur. The secondary player may be removed from the physical location of the game. The secondary player may be uninvolved with any decisions made during the game. A secondary player may participate in a game via a remote terminal, mobile gaming device, or other device. For example, a secondary player may use a terminal with buttons and a monitor to input bets and to watch the progress of a game.

In various embodiments, a secondary player may view data or information about games in which the secondary player may participate (e.g., about games on which the secondary player can bet). The secondary player may view different types of data, may view data in various ways or presentation formats, may sort the data in different ways, may search through the data in various ways, may filter the data in various ways, and may otherwise view and interact with data about games in various ways.

1. Data about a gaming activity. Various data may be associated with a game, a player, a game table, a gaming device, or with any entity or event related to gaming. Data may include: (a) a time of day (e.g., a time of day during which a game was played); (b) a game type (e.g., video poker; e.g., slots; e.g., craps; e.g., table game; e.g., "Double Diamond 2005 Video Slots"), (c) a game platform (e.g., Game King); (d) the maximum payout or prize of a game; (e) a payout of an outcome of a game; (f) a probability of an outcome of a game; (g) a result of the game (e.g., player win; e.g., player loss; e.g., player won the jackpot; e.g., player entered the bonus round; e.g., outcome of "cherry-cherry-cherry"); (h) a decision made in a game (e.g., hit; e.g., discard the first three cards of a video poker hand) (i) a bet made in a game (e.g., a bet of "red" in roulette; e.g., a bet of "don't pass" in craps); (j) a quality of a decision made in a game (e.g., was an optimal decision made; e.g., by how much did a strategy deviate from optimal strategy; e.g., was a strategy chosen that maximized expected player winnings; e.g., was a strategy chosen that maximized the chances of receiving the highest possible payout), (k) a player (e.g., a player who played a particular game), (l) a location (e.g., a city where a game was played; e.g., an area of a casino where a game was played; e.g., a shop where a game was played; e.g., a gaming table where a game was played); (m) a place in a streak (e.g., a game occurred after 3 wins; e.g., a game occurred after 5 losses; e.g., a game occurred after 3 wins and prior to 6 more wins), (n) a probability or odds associated with a particular outcome that occurred in a game (e.g., a probability associated with an outcome of "bell-bell-bell" that occurred in a game); (o) an amount won in a game; (p) an amount bet in a game; (q) one or more cards dealt in a game (e.g., the ace of spades was dealt in a game; e.g., three diamonds were dealt in a game); (r) one or more indicia that occurred in a game (e.g., "cherry"; e.g., "cherry" and "bell"; e.g., a wild symbol; e.g., "bell" or "bar"); (s) a demographic of a player who played a game (e.g., the primary player of a game is from Wisconsin; e.g., the player of a game is a nurse); (t) a player celebrity status (e.g., the player of a game is a state senator); (u) a popularity of a game (e.g., a game was the fifth most played game in a casino in the past week); (v) a popularity of a game from the vantage point of secondary players (e.g., a game was the most frequently bet on by secondary players of any type of game) (w) a similarity of one game to another (e.g., game A has similar rules to game B; e.g., players who played game A most often played game B); (x) a recommendation, such as of a game, player, dealer, table, etc. (e.g., Slot Mania got positive recommendations from 90% of players); (y) an index, such as an index of players, game results, dealers, game tables, etc. (e.g., an index may describe an average amount won by players at a particular game table; e.g., an index may describe an average amount won per game at a particular type of game in the last hour); (z) a game manufacturer (e.g., a game manufacturer associated with a particular game), (aa) a game rating or review (e.g., by other players); (bb) a number comps associated with the play of a game; or any other data about a game related device, entity; (cc) whether or not a game was a table game; (dd) whether or not a game was played without player input; (ee) a ratio of how much a player has won to how much a dealer has won; (ff) a ratio of how much a set of players has won to how much a dealer has won; or any other data.

1.1. Sort by any of the above attributes. In various embodiments, a secondary player may view data associated with a plurality of games, gaming devices, players (e.g., primary players), game tables, or other entities devices, or events. For example, a secondary player may view a listing of games together with, for each game, an indication of the time the game was played, the player who played the game, the amount bet, and the amount won. The secondary player may sort the listing of games by the time the game was played, the player who played the game by the amount of the bet, or by the amount won. Thus, for example, the secondary player may sort the listing of games into chronological order by when the games were played. Similarly, the secondary player may sort the games so that the game with the most won is at the top of the list, and the game with the least amount won is at the bottom of the list. In some embodiments, the secondary player may sort by more than one type of data. For example, the secondary player may sort first by amount won and then by amount bet.

1.2. Search for any of the above attributes. In some embodiments, a player may search for a game with a particular value or a particular instance of any associated type of data. For example, a player may search for a game played at a particular time, for a game played by a particular player, for a gaming table with a highly rated dealer, for a gaming device located in a particular area of a casino, and/or for any other particular characteristic. A secondary player may search for multiple characteristics simultaneously. For example, a secondary player may search for a gaming device that is located in a particular area of a casino and which has had 6 payouts of more than 100 coins in the last hour.

In various embodiments, data about games may be stored in a database, such as in a database located with the casino server. Various database searches techniques may be used to find games with particular attributes. For example, Structured Query Language (SQL) may be used for finding games with particular attributes.

1.3. Search for any of the above attributes with respect to a group of games, players, tables, dealers, or other objects or entities. In various embodiments, secondary player may search for data associated with a set of games, a set of table, a set of dealers, a set of gaming devices, a set of locations, or a set of any other objects or entities. For example, a secondary player may search for: (a) a set of tables at which players have won more than 60% of the games in the last 5 minutes; (b) a set of gaming devices that have together paid more than four payouts of more than $100 in the last 10 minutes; (c) a set of primary players each of whom uses basic strategy; (d) a set of dealers, each of whom deals more than 20 hands per hour; or for any other set satisfying some criterion or criteria. In various embodiments, there may be some constraint on a set of objects or entities searched for. For example, a constraint may say that all must be within the same region, such as a room of a casino. Otherwise, for example, a set of primary players who uses basic strategy might be readily found by picking individual primary players from all around the casino, although this may be permitted, in some embodiments. In some embodiments, sets of players, tables, dealers, gaming devices, or other objects or entities are defined or understood to exist in advance of a search. For example, gaming devices in a particular bank are understood to constitute a set of gaming devices. Thus, for example, a secondary player may search for banks of gaming devices that satisfy certain criteria, such as banks of gaming devices that are more than 70% occupied.

1.4. Searching for streaks. In various embodiments, a secondary player may search for a player, game, dealer, gaming device, game table, or other object or entity that is associated with a streak. A streak may include some pattern of wins, losses, or other outcomes. A streak may include a plurality of consecutive games that were all wins, a plurality of consecutive games that were all losses, a plurality of consecutive games in which a win always follows a loss, and a loss follows a win, or any other pattern. A streak may involve only one of something, such as only one game. For example, a winning streak for a primary player may be one game long. A streak may not cover consecutive games. For example, primary player may go on a streak in which he wins every other game over a period of twenty total games. A streak may also include overlapping games. For example, primary players at a gaming table may be on a streak in which primary players at the table win 15 games without loss. However, many of those games may have occurred simultaneously (e.g., many of those games may be against the same dealer cards).

In various embodiments, a secondary player may search for a player, game, dealer, gaming device, game table, or other object or entity that is associated with a streak of a certain length, such as a streak of seven games. In various embodiments, a secondary player may search for a primary player, game, dealer, etc., that is associated with a streak of at least a certain length, such as with a losing streak of at least 10 games. For example, a secondary player may wish to participate in the games of a primary player has lost at least ten games in a row because the secondary player may believe the primary player is due to win soon.

2. Types of displays 2.1. Tabular display. In various embodiments, a secondary player may view data related to a game, gaming device, primary player, game table, dealer, or other entity or device related to gaming using a tabular format. Each line in a table may contain related data, such as data all describing the same game or the same gaming device. For example, one line in a table may contain data related to a game. The line may include data describing the time the game was played, the gaming device at which the game was played, the amount bet on the game, the top jackpot in the game. The next line in the table may contain the same type of data, but about a different game. Thus, each column of the table may contain a similar type of data, such as a time during which a game was played. A secondary player may be able to sort the data using any of the columns. For example, the secondary player may be able to sort games by time played, so that all games will be in chronological order. The secondary player may be able to sort games by type of game, such as video poker or slot machines. After such a sort, all video poker games would be on adjacent lines in the table, for example. In various embodiments, a tabular display may be used to show a list of games, gaming devices, or other entities or devices to a secondary player only after the secondary player has used some filtering or sorting criteria to limit the universe of games (or entities or devices). Otherwise, the list may be so long as to be unwieldy or overwhelming for the secondary player. FIG. 57 shows some embodiments of a tabular display. Column 1020 may indicate the time a game was played, such as the start time of the game. Column 1030 may indicate the name of a game or gaming device. Column 1040 may indicate an amount bet on a game by a primary player. Column 1050 may indicate an outcome of a game. Column 1060 may indicate an amount won in a game by a primary player.

2.2. Geographic (floor plan). In some embodiments, a secondary player may view a display of a casino floor-plan or other model of a casino venue. The view may show the location of various rooms, game tables, gaming devices, people and so on. For example, the view may represent a scale model of the configuration of the casino and/or of the objects in a casino. In some embodiments, a floor plan may not be made according to scale. For example, the sizes of some rooms relative to others may be exaggerated. A secondary player may use the floor plan view to find players, gaming tables, dealers, etc., based on various search criteria, such as based on a specification of a range for certain data. Different visual cues on the floor plan, such as different colors, different shading patterns, different gray levels, and so on may be used to indicate different types of data or data within different ranges. For example, red colors may indicate game tables where players have beaten the dealers, on average. Green colors may indicate game tables where dealers have beaten players, on average.

2.2.1. Players pick colors and choose what those colors will represent. In various embodiments, a secondary player may pick colors, shading patterns, gray scales, or other visual cues to use on a geographic view of a casino floor or other gaming venue. For example, a player may choose to use red to represent gaming devices with jackpots over $2000, orange to represent gaming devices with jackpots between $1000 and $2000, and yellow to represent gaming devices with jackpots below $1000. However, the player may just as easily pick a different color scheme to represent data on the floor plan. An interface for the second player may present fixed data ranges, such as ranges of jackpot levels. The player may then select a color to correspond to the range, such as from a menu.

Figure 58:
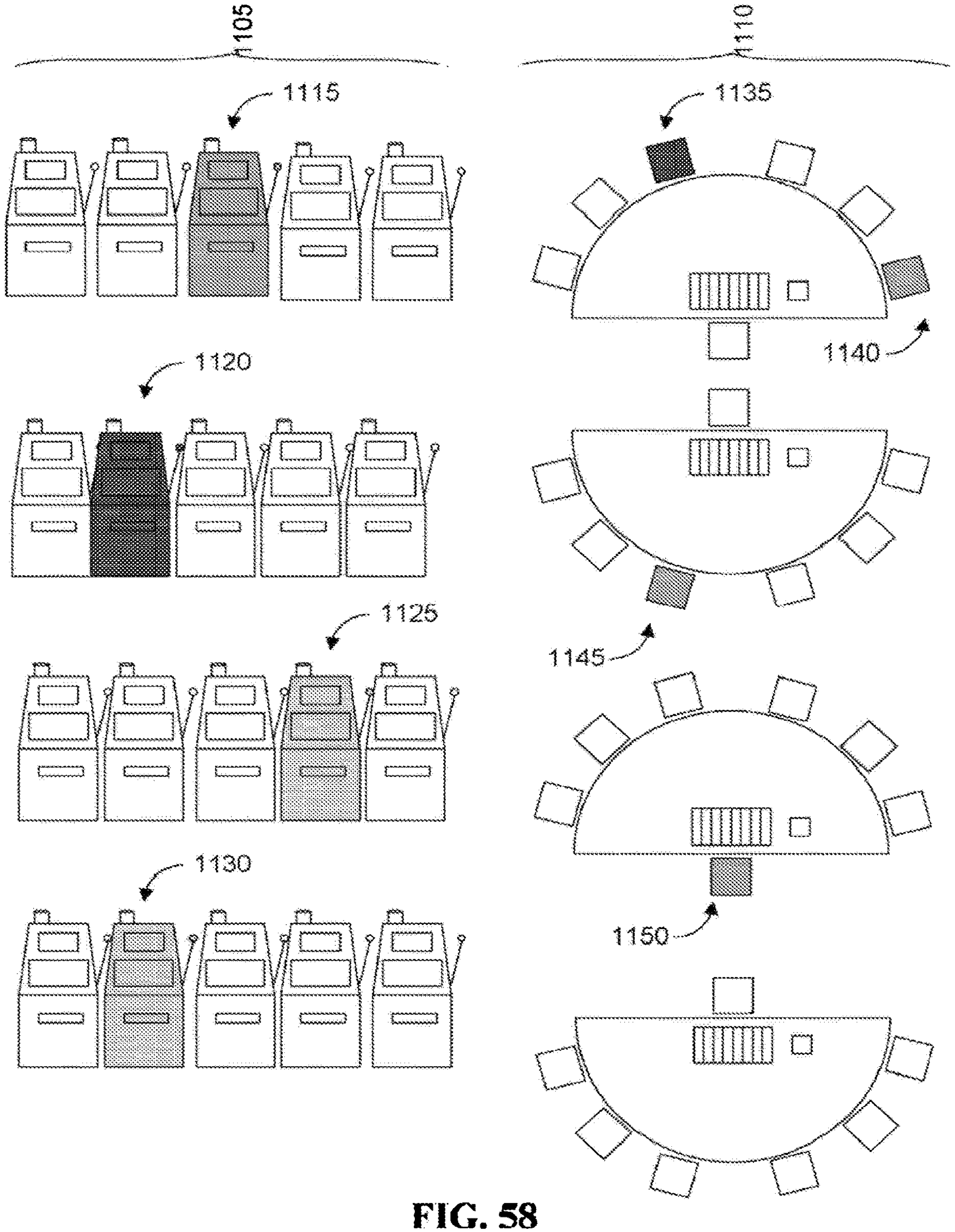
FIG. 58 shows a gaming environment, according to some embodiments.

2.2.2. Winning devices or players. In some embodiments, a floor plan view may show in different shades, colors, or other patterns primary players, gaming devices, game tables, or other objects or entities that have had distinctive results. For example, gaming devices which have paid out more than $100 in the last five minutes may be shown in a first shaded color. Gaming devices which have paid out more than $200 in the last five minutes may be shown in a second shaded color. As another example, positions at a gaming table where a player has won more than a certain amount in the last five minutes (or the last X minutes) may be shown with a color, shading, etc. FIG. 58 shows a floor plan view according to some embodiments. Reference numeral 1105 corresponds to gaming devices. Reference numeral 1110 corresponds to game tables, each game table including player positions and a dealer position. Gaming devices 1115, 1120, 1125, and 1130 are shown shaded. The shading may indicate that such gaming devices have paid out more than a threshold amount of money in the most recent time period, e.g., in the last 20 minutes. The different levels of shading (e.g., gaming device 1120 has a darker shading than does gaming device 1130) may indicate that the different gaming devices have crossed different thresholds. For example, gaming device 1120 may have paid out $500 in the last 10 minutes, whereas gaming device 1125 may have paid out only $250 in the last 10 minutes. Different levels of shading may have other meanings besides amounts paid out. For example, a level of shading may indicate a number of games played at a gaming device, a number of times a bonus round was reached, a size of a jackpot, a percentage of the time the gaming device was occupied, a number of consecutive losses, or any other information. Reference numerals 1135, 1140, and 1145 may indicate player positions at gaming tables. A display of shading or other color at a player position may convey various information. Such information may include an amount won in some period of time, an amount lost in some period of time, a number of consecutive hands won, a number of times a particular hand has been achieved (e.g., blackjack), a skill level, an age of a player, or any other information. The shading of a player position may indicate information about the player currently occupying the position (e.g., information about the player's amount won over the past day in any game) or may indicate information about the position itself (e.g., about how much money was won at this position in the last hour, regardless of the primary player). Reference numeral 1150 may indicate a dealer position. The shading of a dealer position may indicate various information about the dealer himself (e.g., how quickly this dealer deals), about the dealer position (e.g., how many blackjacks did the dealer receive in the past 2 hours, regardless of who was dealing), or about the table itself (e.g., what percentage of the games at this table have been won by primary players in the last hour). In various embodiments, other parts of a floor play may be shaded or otherwise patterned. For example, an entire game table may be shaded. The shading of a game table may indicate that players at the game table have won a higher percentage of games than have players at any other game table.

2.2.3. Hotspots. A floor plan view may show areas in a casino where a significant amount of activity is taking place, or where a significant amount of a certain type of activity is taking place. For example, a floor plan view may show areas of a casino where more than 80% of the gaming devices are occupied. As another example, a floor plan view may show areas of a casino where more than three jackpots have been won in the last hour. As another example, a floor plan view may show areas of a casino where players have net winnings of more than $10 per player, on average. Areas of significant activity may be indicated or conveyed with the use of certain colors, shades, with boundary lines (e.g., an area of significant activity is shown encircled with a boundary line) or with any other cues. Further, a player may select the colors, shades, or other visual cues to be used for conveying information about certain activity. In various embodiments, a "hotness meter" may appear in a view of a casino floor, game table, gaming device or other area. The "hotness meter" may consist of a color scheme or shading scheme used to convey information about how well a gaming device, player, or game is doing, for example. For example, a red color may indicate that a gaming device is in the top 5% of all gaming devices in terms of being profitable for players, while a blue color may indicate that a gaming device is in the bottom 5% in terms of being profitable for players. A hotness meter may indicate an amount won, a length of a streak, a profitability of a gaming device, a popularity of a gaming device, a number of times a bonus round has been reached or may indicate any other information.

2.2.4. Where most players are. A floor plan view may show the locations of players or other casino patrons. Areas with relatively high concentrations of players may be shown in one color, while areas with relatively lower concentrations of players may be shown in another color. In various embodiments, a secondary player may be able to specify a certain category of primary player. For example, a category might be: primary players who have won more than $100 in the last hour; primary players from Minnesota; primary players who play perfect strategy in video poker; primary player who are betting more than $10 per game; or any other category. The floor plan view may then show the locations of primary players falling into a specified category. For example, areas with a high concentration of primary players who have pets may be shown in one color, while areas with a low concentration of such players may be shown in another color. To find and display primary players or other casino patrons falling within a particular category, a secondary player may, for example, peruse a list of available categories. The secondary player may select one or more categories. The secondary player may then select a color or other visual cue to correspond to one or more selected categories. The secondary player may select a visual cue for each category (e.g., where each different category of primary player is to be shown using a different visual cue). The selected visual cue may then be used to show the secondary player the category (or group of categories, e.g., the logical intersection of several different categories) that the secondary player has chosen to view. In various embodiments, a floor plan view may show players (e.g., primary players) according to some individual identifying information, such as according to name or according to an alias. For example, a secondary player may see a dot moving on the floor plan view of a casino. A text box may hover over the dot as it moves, indicating the name of the player who the dot represents.

2.2.5. Interactive floor plan view. In various embodiments, a secondary player may select a region on a floor play, or may select on object, person, or other entity displayed on the floor plan. For example, the secondary player may drag a mouse pointer over a gaming table shown on a floor plan view of casino. Dragging the mouse pointer over the gaming table may bring up a bubble or text box which includes information about the gaming table. For example, the bubble may indicate the name of the dealer, the percentage of times that players have won in the last 10 games, the betting limits, the game, or any other information about the table. A secondary player may interact with a floor plan view in various other ways, such as by touching various parts of a touch screen display device with the floor plan view displayed on it.

2.2.6. Show the whole floor as a roulette game or other game. In various embodiments, a casino floor or other location within a casino may be shown as one large game. For example, different regions within the casino floor may be shown within distinct boundary lines. Each bounded region may have an identifier. For example, 30 different bounded regions may be numbered 1 to 30. The secondary player may choose a region. For example, the secondary player may place a bet on a particular region. A winning region may then be determined based on events that actually happen within that region. For example, the winning region may be the first region in which a jackpot is won. For example, the winning region may be the first region in which 10 primary players achieve a flush in video poker. A region may be chosen based on any other event or set of events to transpire within that region. In some embodiments, one or more regions in a casino may be used to determine a symbol or indicia. For example, a casino may be divided into five regions. The most frequently dealt card in each region may be determined. For example, out of ten games of video poker and four tables of blackjack, the two of hearts may have been the most frequently dealt card in a first region. Using five regions, a hand of video poker may then be determined. The hand of video poker may be used in a game played by a secondary player.

2.2.7. Some data for floor plan views. A floor plan view of casino may convey a number of different types of information. As applicable for any given game, gaming device, game table, player, dealer, or group thereof, a floor plan view may indicate: (a) a ratio of amounts won by a player to amounts won by the house; (b) a length of a streak or other pattern of outcomes; (c) a name (e.g., of a player; e.g., of a dealer); (d) a demographic (e.g., of a player; e.g., of a dealer); (e) a betting limit; (f) a card that was dealt; (g) a number of times a particular card was dealt; (h) a proportion of time that a particular card was dealt (e.g., over the last hour); (i) a speed of play; (j) a highest amount won (e.g., over the last 10 minutes); (k) a size of a jackpot; or any other information. Such information may be indicated using any pattern or color scheme, using text or video, or using any other mode of conveyance.

2.2.8. Pop up window. In various embodiments, a player may view a floor plan view or any other view of information about various games, players, dealers, game tables, gaming devices, or other objects or entities. The player may move a mouse pointer over a particular object or entity (e.g., over a gaming device) and may click on that device. There may be various other ways of selecting the device. A pop-up window or other separate window may then appear to allow the player to view more detailed information or further information about the object or entity which was selected. The window may include a video feed of play or action (e.g., at a gaming device). The window may include a simulation of the action. The window may include statistics, demographic information about players or dealers, pay table information, jackpot information, information about related games, information about historical games (e.g., for comparison purposes), or any other type of information. Thus, in various embodiments, a floor plan view may have one or more selectable elements. When selected, further information may be revealed, such as about the objects or entities represented by those elements. In various embodiments, a player viewing a floor plan may have the opportunity to zoom in on one or more portions of the floor plan view, or of the objects or entities represented. For example, a player may zoom in on a particular group of gaming devices, or on a particular set of gaming tables. The representation of such objects or entities may be expanded to fill a larger screen area and/or a larger field of view. A player may also zoom out to view a representation of a larger area of a casino or more game tables, for example. When a player zooms in, more information about the objects or entities in the field of view may be provided. There may be more room to provide such information since, for example, a representation of a gaming device may now appear larger and may therefore fit more text, graphics, or other information on it. Information may include statistics (e.g., about games which have occurred at a gaming device), jackpot sizes, payout amounts, player demographic information, or any other information.

2.2.9. Searching for data using filters. In various embodiments, a secondary player may search for games, dealers, game tables, or primary players, based on various types of data. A secondary player may specify a range of values for a particular type of data, and may find all games, dealers, game tables, or primary players with associated data falling in the specified range. For example, a secondary player may specify a range of gross winnings paid by a gaming device in the last hour, where the range is specified as from $500 to $2000. Thus, every gaming device which has paid $500 to $2000 in the last hour may be found. Such gaming devices may be highlighted on a floor-plan view of a casino. In some embodiments, all other gaming devices besides those with gross winnings falling in the specified range may be blacked out or grayed out in a floor-plan view of the casino. Thus, the specification of a range of data may serve as a filter that highlights or brings to prominence those devices (or games or players or game tables, etc.) falling within a specified range, while filtering out those that do not. In some embodiments, a secondary player may specify multiple filters. The filters may successively eliminate games, gaming devices, game tables, or other entities as ranges for more types of data are specified. For example, a secondary player may specify a particular game manufacturer (e.g., IGT), so that all gaming devices not manufactured by the game manufacturer are blacked out from a casino floor plan. The player may further specify a range for the top jackpot (e.g., $1000 to $2000). All remaining gaming devices with top jackpots outside this range may be blacked out. In this way, a secondary player may successively narrow down a list or a view of gaming devices (or players, entities, game table, etc.). This may help the secondary player to hone in on a gaming device that he wishes to bet on.

2.3. Virtual Tour Display (you can move virtually through the casino and see overlaid statistics). In some embodiments, a secondary player may view a casino as if he were walking through it. For example, the view of the casino may be as from a camera that was positioned somewhere within the casino. The view may evolve as if the camera was moving. In some embodiments, a secondary player may view a casino as if he were flying through it, going through walls, or performing other stunts. The player may view actual footage from the casino, or the player may view a simulated rendition of the casino. The player may navigate through the rendition of the casino by, for example, manipulating a joystick in the direction he wishes to proceed. As the secondary player takes the "virtual tour" of the casino, the secondary player may view things that a person would normally see while walking through the casino. Namely, the secondary player may see gaming devices, game tables, people, works of art, etc. In some embodiments, the secondary player may see additional information overlays that would not be visible to someone walking through the actual casino. The player may see information superimposed on a gaming device. The information may indicate the length of a streak of games where a primary player has won at the gaming device, the last outcome achieved at the gaming device, the time of the most recent jackpot payout, or any other information. Similarly, information may be superimposed over the image of a gaming table. The information may indicate current players at the gaming table, the ratio of the amount players have won to the amount dealers have won in the last hour, the popularity of the dealer, or any other information related to the gaming table. Thus, in various embodiments, a secondary player may take a virtual tour of a casino, or of any other location, with various features, objects, or people having informative tags that may not be present or visible in the real world. A secondary player taking a virtual tour may thus be able to readily find a game, a primary player, a dealer, a gaming table, or other game or entity that suits his preferences.

2.4. Ladder display—could be a bar graph, or just a graph with the cards. A ladder display may include a first axis representing some set of units. The units may be an amount won at a gaming device in the last hour, for example. As another example, the units may be games in the current winning streak. At various points along the axis may be a number, bar, picture, or other depiction representing a quantity of something that fits at that point on the axis. For example, a number "30" at the point 5 units above the origin on the axis may indicate that there are 30 gaming devices that have just made a payout of $5. A number 31 at a point 8 units above the origin on the axis may indicate that there are 31 gaming devices that have just made a payout of $8. In some embodiments, a ladder display may show a ratio of an amount players have won to an amount that the house has won. Locations on the axis may correspond to ratios such as 0.8 (players have won 80 cents for every dollar the house has won), 1.0 (players and the house have won equal amounts of money), and 1.2 (players have won $1.20 for every dollar the house has won). At various points on the axis there may be bars, with the length of such bars corresponding to the number of gaming tables that should fall at that point on the axis. For example, a bar that appears one inch long extending horizontally from the point on the vertical axis corresponding to a ratio of 0.9 may indicate that there are 3 gaming tables where players have won 90 cents for every dollar won by a dealer. A bar that appears two inches long extending horizontally from the point on the vertical axis corresponding to a ratio of 1.0 may indicate that there are 6 gaming tables where players have won $1 for every $1 that the house has won.

In various embodiments, a ladder display may indicate the average amount that players are ahead or behind at a table. For example, for each $25 dollar range (e.g., −$25 to 0, 0 to $25, $25 to $50, etc.) that ladder display may show the number of gaming tables such that players at those tables are ahead by an average number of dollars falling within the range. For example, the ladder display may show that there are 4 gaming tables where the average player is ahead anywhere from $25 to $50.

In some embodiments, a secondary player may drill down further into the data making up a ladder display. For example, a secondary player may see from a ladder display that there are four gaming devices where the player has won the last five games in a row. The secondary player may then wish to further inquire as to which four gaming devices those are. The player may indicate such a desire in various ways. For example, the player may click on the number "4" on the ladder display indicating the number of gaming devices where the last five games in a row have been won. A text window may then appear showing details about such gaming devices, such as the locations, the type of game, the name of the primary players at the gaming devices, and so on.

In various embodiments, a ladder display may show the number of times that a particular indicium appeared, or the number of gaming devices at which a particular indicium appeared, or the number of gaming tables at which a particular card appeared, or the number of games in which a particular combination of cards appeared. For example, each position on the axis may represent a different card. Thus, for example, there may be 52 positions on the axis. A first position may correspond to an ace of spades, a second position may correspond to a king of spades, and so on. At each position may be listed a number, such as "12". The "12" may indicate that there have been 12 gaming devices in the last 30 seconds at which the ace of spades has been dealt. It may be possible for a single gaming device to be counted twice in the ladder display, since more than one card may have been dealt at the gaming device.

In some embodiments, each position on the axis of a ladder display may correspond to a combination of indicia. For example, a position may correspond to "bell-bell-bell." A number listed at the position may indicate the number of gaming devices that have generated the outcome "bell-bell-bell" in the last 10 minutes of time (or in the last X period of time). As another example, a position on the axis of a ladder display may correspond to "As Ks Js 10h 10d". A corresponding number may indicate how many video poker games have generated the above card combination in the last hour.

Various embodiments contemplate a ladder display where an axis is oriented vertically, horizontally, or in any other orientation.

2.5. Time varying attribute (things evolving over time), e.g., winnings as a function of time. In various embodiments, a display may include an indication of changing data, changing games, changing circumstances, or other changes occurring over time. A floor plan view of a casino may indicate a time evolution in some circumstance. For example, a floor plan view of a casino may indicate a first gaming table where players were winning the most at a first point in time. The floor plan view of the casino may indicate a second gaming table where players were winning the most at a second point in time. An arrow may be drawn from the first gaming table to the second gaming table, showing how the state of meeting certain criteria (in this case being the table where players win the most) has changed over time. Multiple points in time may be shown, and a secondary player may thereby see how the "crown" of being the table where players win the most has shifted over time. A secondary player may attempt to discern a pattern as to which table will be the next table where primary players win the most. For example, the secondary player may say to himself, "These three most recent arrows seem to show a shift to the west of the casino. Therefore, I think the next table which will be the best for players will be this other table on the western side of the casino."

Figure 59:
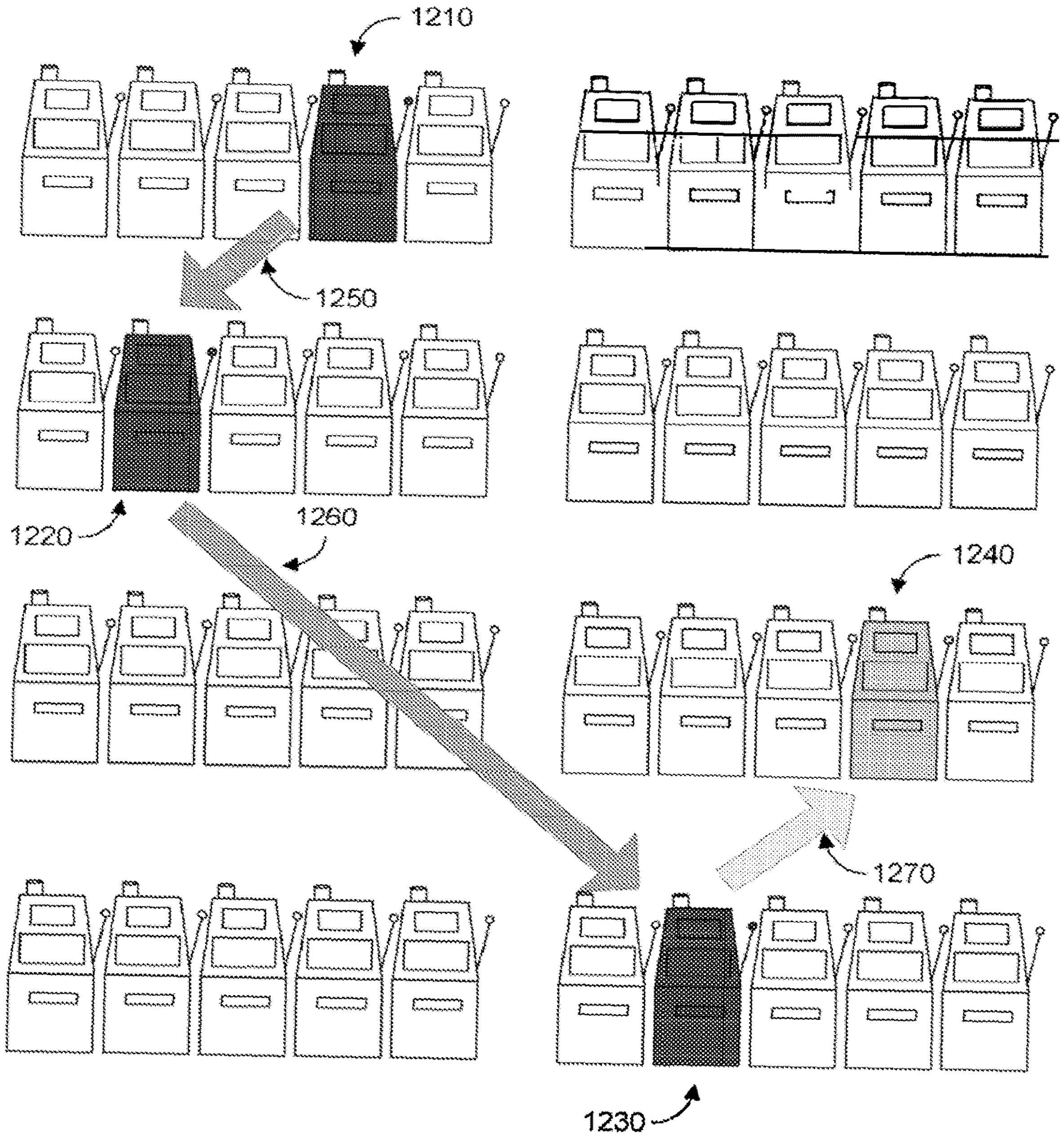
FIG. 59 shows a gaming environment, according to some embodiments.

FIG. 59 shows a floor plan view according to some embodiments. A number of gaming devices are shown. Some gaming devices are shaded, indicating that such gaming devices paid out the most in net winnings over a particular five-minute interval of any other gaming device. Gaming device 1210 paid out the most during a first five minute interval. Gaming device 1220 paid out the most during a second, later five minute interval. Gaming device 1230 paid out the most during a third, even later five minute interval. Arrows 1250, and 1260 show the progression of the highest paying gaming devices over time. Gaming device 1240 is shaded in a different tone to that of gaming devices 1210, 1220, and 1230, indicating that it is predicted to be the gaming device that will pay the most in the coming five-minute period. Gaming device 1240 may have been chosen, for example, to complete a somewhat rectangular pattern that would be formed among gaming devices 1210, 1220, 1230, and 1240.

In various embodiments, a time evolution of circumstances may be shown with respect to a single game, a single table, a single player, a single gaming device, a single dealer, or any other single object or entity. For example, a display may show the trend of a player's net winnings over time. The display may show a chart such that at each point in time, the player's cumulative net winnings since the start of the player's gaming session is shown. As another example, a display may show the time between the start of games at a particular gaming table as a function of time. For example, the display may show that it was an average of two minutes between the start of games at a table between 10:00 am and 10:30 am, but it was two minutes and thirty seconds on average between the start of games at the table between 10:30 am and 11:00 am.

In various embodiments, a time evolution of circumstances may be shown with respect to a group or set of games, tables, players, dealers, gaming devices, or any other set of objects or entities. For example, a display may show, for a bank of 10 gaming devices, how many times payouts over $20 have been paid in each five-minute interval over the last three hours.

In various embodiments, a time evolution of circumstances may be shown in tabular format. For example, each row in a table may correspond to a particular point in time. Data associated with each point in time may include a payout paid at that point in time, a decision made in a game at that point in time, an outcome that occurred at that point in time, and so on.

In various embodiments, the ability to see data or circumstances as they evolve over time may give a secondary player a chance to try to predict where a trend is leading. For example, if a group of gaming devices has been paying greater payouts, on average, during each five-minute interval over the last hour, a secondary player may assume this trend will continue and may thereby wish to participate in a game played at one of the gaming devices in the group.

In various embodiments, a secondary player may be given access to a prediction tool or tools. The prediction tools may allow the secondary player to use a set of known data and to extrapolate possible future occurrences based on the known data. For example, a prediction tool may be able to perform linear regressions, to perform predictions using neural networks, to perform predictions using a set of rules, or to perform predictions in any other fashion. The secondary player may use a prediction tool in conjunction with various data (e.g., with various data about games, gaming devices, etc.) and may thereby determine a game in which to participate. In various embodiments, a secondary player may allow a bet to be placed automatically on his behalf based on the outputs of a prediction tool. In various embodiments, a prediction tool may be a software program that resides on a casino server. In various embodiments, a person, such as a "resident expert" may make predictions as to which games are likely to be favorable for a secondary player to participate in. The resident expert may supply his predictions to one or more secondary players. A secondary player may pay to receive the services of a person making predictions and/or of a prediction tool. A resident expert may be a casino employee. In some embodiments, it may be determined which of a plurality of secondary players has had the greatest success (e.g., has won the most over a certain period of time). This secondary player may be chosen or selected to be a "resident expert." Other secondary player may then have the opportunity to use the predictions of the chosen secondary player. In various embodiments, data about the success of secondary players may be made available to other secondary players. For example, data about what percentage of bets have won for a first secondary player may be made available to a second secondary player. The secondary player, based on his own evaluation of the data, may then determine whether or not to participate in the same games as does the first secondary player.

2.6. Network diagram (one game related to another game, which is related to another game). A network with related things joined together) games played by the same player. In various embodiments, a display may represent gaming devices, players, dealers, gaming tables, or other objects or entities as nodes on a network. The nodes may be connected to each other based on some similarity between the players (or games, or game tables, etc.) represented by the nodes. For example, two gaming devices that are both video slot machines with five reels may be shown as near to one another in the network, perhaps with a direct connection between them. As another example, two games for which the jackpot size is the same may be shown as being near to one another in the network. In one example, a first gaming device featuring a particular game and accepting $1 chips is shown connected in the network diagram to a second gaming device featuring the same game and accepting quarters. The second gaming device is, in turn, shown connected to a third gaming device featuring the particular game but accepting nickels. The first and third gaming devices may not be shown as being directly connected.

In various embodiments, a network display may show primary players. Primary players may be shown connected or near to one another based on: strategies used by the primary players (e.g., primary player use of basic strategy); games played by primary players (e.g., primary players nearby on the diagram all like blackjack); times when the primary players are active (e.g., primary players near to one another on the diagram may play at similar times); demographic of the primary player (e.g., primary players near to one another on the diagram may be within similar age groups; e.g., primary players near to one another on the diagram may have occupations in similar industries).

In various embodiments, a network diagram may show dealers' relationships to one another. Dealers may be located close to one another based on how quickly the dealers deal, based on how full the tables are when the dealers deal, based on how many mistakes the dealers make, based on how much players usually win when the dealers deal, and/or based on any other factors.

A display which shows gaming devices, players, dealers, or other objects or entities as being connected does not necessarily imply that there is any physical connection between the objects or entities. Rather, the display may seek to illustrate similarities between objects or entities by showing such objects or entities as being proximate to one another or connected to one another in terms of the network display. A secondary player may find a network display useful if, for example, he finds that he likes participating in games of a certain type of gaming device and wishes to find other gaming devices with similar characteristics. To do so, he may find other gaming devices in the network display that are connected to the gaming device he already likes.

A network display may be developed or built in various ways. Objective data about gaming devices, players, dealers, or other objects or entities may be used. For example, the casino server may have data about a gaming device's jackpot, its manufacturer, whether it uses video reels or mechanical reels, or data about any other feature of the gaming device. Objective data may be used to place devices (or players, or dealers, etc.) near to other gaming devices with similar objective data (e.g., with a similar manufacturer; e.g., with a similar jackpot). A network display may be built based on the activities of secondary players. If the games of two different gaming devices tend to be participated in by many of the same secondary players, such gaming devices may be deemed similar, at least insofar as preferences of secondary players. Therefore, such gaming devices may be located near to one another on a network display. Thus, a network display may tend to place near to one another, or connected to one another, gaming devices, primary players, dealers, gaming tables, games, etc., that tend to be preferred by the same secondary players.

Figure 60:
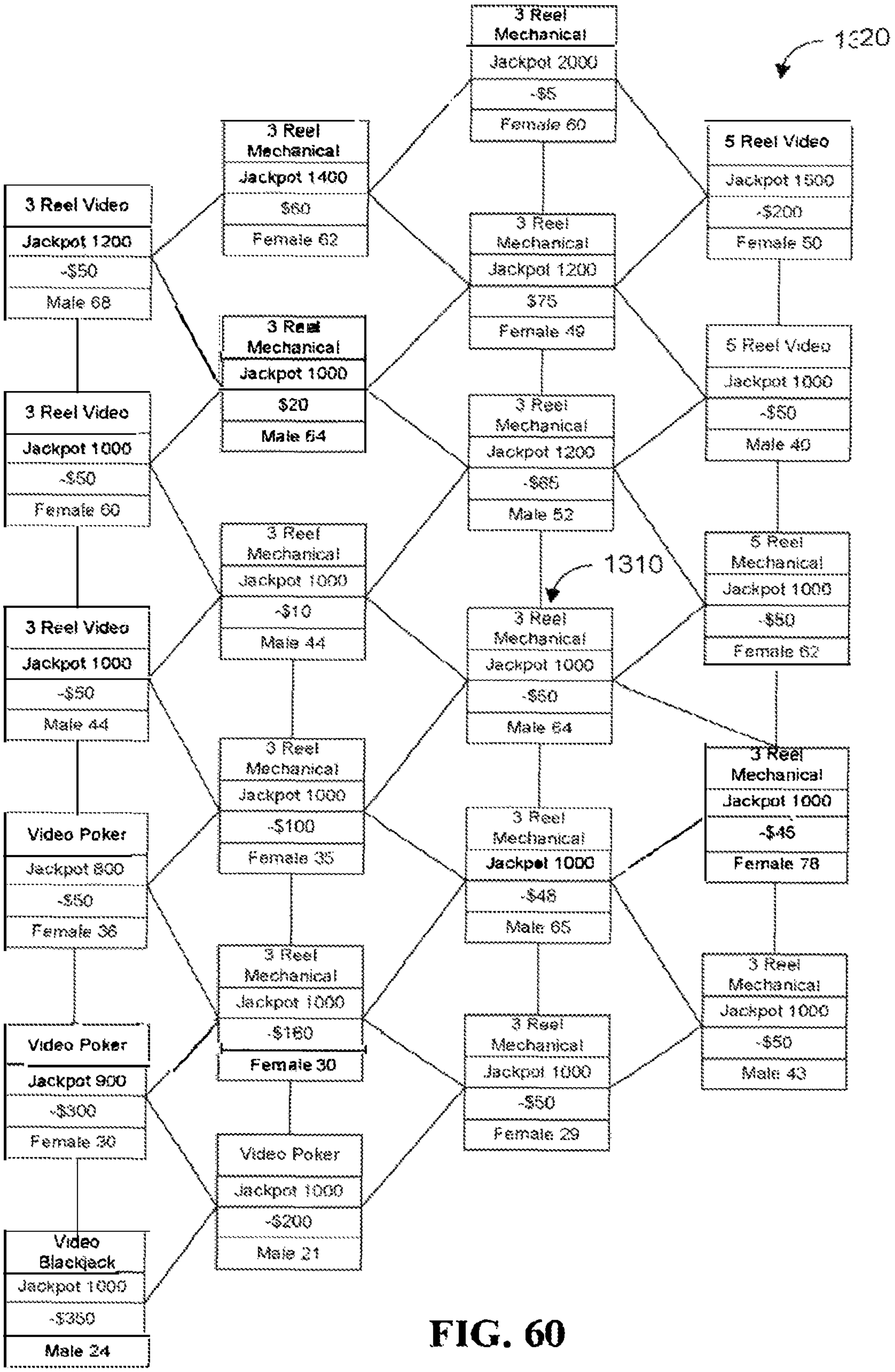
FIG. 60 shows information about gaming devices, according to some embodiments.

FIG. 60 shows a network display according to some embodiments. Each node, such as nodes 1310 and 1320 represents a gaming device. Some information about each gaming device is displayed on a node, including the type of game, the size of the jackpot, the amount won or lost at the gaming device in the last 20 minutes, and age and gender of the primary player at the gaming device. Gaming devices with one or more common or similar characteristics may tend to be connected to each other in the network display.

2.7. Combination display and betting interface. Drag chips to certain games on the display to make a bet. In various embodiments, a display may show a representation of a game, a player, a dealer, a game table, or a game. A secondary player may, in some embodiments, use the display to gather information. In some embodiments, a display may be used as a betting interface. A player may place bets on a gaming device, for instance, by selecting or designating the gaming device on the display. For example, a secondary player may drag a representation of a gaming chip onto a representation of a gaming device using a computer mouse. Doing so may indicate that the secondary player is placing a bet equal to the amount represented by the gaming chip on the next game to be played at the gaming device. A player may designate a gaming device in various other ways, such as by double clicking on the representation of the gaming device, such as by circling the gaming device with a mouse pointer, and so on. In various embodiments, a secondary player may designate a primary player using a display. For example, a display may show representations of various primary players. A secondary player may drag a representation of a gaming chip onto a representation of a selected primary player. The secondary player may thereby place a bet on the next game of the selected primary player. In various embodiments, a secondary player may drag representations of gaming chips onto a representation of a gaming table (e.g., in order to place a bet on the next game played at that gaming table), onto a representation of a dealer (e.g., in order to place a bet on the next game played by that dealer), onto a representation of a game (e.g., in order to place a bet on the next instance of that game that is played anywhere in the casino), and so on.

2.8. Different windows for different games out there. The one in progress comes to the foreground. Or there are different criteria for coming to the foreground. In some embodiments, a secondary player may participate in two or more different types of games. A secondary player may participate in games at two or more different gaming devices. A secondary player may participate in the games of two or more primary players. A secondary player may participate in the games of two or more dealers. A secondary player may participate in games at two or more tables. In various embodiments, a secondary player may participate in two or more separate games at approximately the same times. For example, the secondary player may place a first bet on a first game at a first gaming table. While the first game is still in progress, the secondary player may place a second bet on a second game at a second gaming table. The first game may resolve while the second game is still in progress. The secondary player may thereupon place a third bet on a third game at the first gaming table. While the third game is still in progress, the second game may finish. The secondary player may thereupon place a fourth bet on a fourth game at the second gaming table. Thus, for example, the secondary player may simultaneously participate in games at two or more gaming tables.

In various embodiments, where a secondary player participates in multiple different games at the same time, games falling into different categories may be shown in different windows. For example, games at different gaming tables may be shown in different windows. For example, games at different gaming devices may be shown in different windows. For example, the games of different primary players may be shown in different windows. In various embodiments, games with a common characteristic may be shown in the same window. For example, games from the same gaming table may be shown in the same window. A secondary player may, for example, place bets on the games of two different primary players, both of whom are sitting at the same gaming table.

In various embodiments, a display may alternately bring windows to the foreground based on events that happen in games featured in those windows. For example, when a game featured in a window comes to a resolution, the window featuring the game may come to the foreground. This may allow a secondary player to see what the result of the game was and how much he won. It may also give the secondary player the opportunity to bet on a new game that is to follow the game that just finished (e.g., a new game that is to be played at the same gaming device as was the game that just finished; e.g., a new game that is to be played by the same primary player as was the game that just finished; e.g., a new game that is to be played at the same gaming table as was the game that was just finished). In various embodiments, a window may come to the foreground when a featured game is about to come to a resolution. This may allow the secondary player a moment of anticipation before seeing the resolution. In various embodiments, a window may come to the foreground when there is a possibility of a large payout being won. For example, a window may feature a game of video poker. If an intermediate outcome of four cards to a royal flush is dealt, the window may come to the foreground, since there is a significant possibility that a royal flush payout may be won. In various embodiments, a window may come to the foreground if a decision is to be made in a game. For example, if a window features a game of blackjack, the window may be brought to the foreground if a decision is to be made or is about to be made in the game. The secondary player may thereby see the decision and may also have the opportunity to evaluate the skill of the primary player making the decision. In various embodiments, a window may come to the foreground if an unusual event happens in the featured game. An unusual event may include a decision that is contrary to basic strategy or optimal strategy, an occurrence of a high-payout outcome (e.g., a jackpot at a slot machine), a situation where every player at a table gets the same outcome; a situation where every player at a table wins; situation where every player at a table loses; or any other event that may be considered rare or unusual.

In various embodiments, a window may be removed from the foreground if gaming activity ceases in the game or games that were featured in the window. For example, if a gaming table is closed down, a window featuring games from the gaming table may be removed from the foreground or removed altogether.

A window may include a bounded region on a display screen, such as a rectangular region. The region may have a well-defined border. The region may show images, text, or other visual cues which are distinct from those in areas outside the window. When a window comes to the foreground, the complete area of the window may be visible. Parts of the areas of other windows may be obscured by the window in the foreground. When a new window comes to the foreground, parts of the window that was previously in the foreground may become obscured.

2.9. Displays of people's faces or avatars (sort by mood, or other facial features). In various embodiments, a display may show the faces of primary players. The faces may be real faces, or the faces may be animated faces that do not necessarily mirror the actual appearance of the primary player. Faces of primary players may be shown from photographs previously taken of the primary players. Faces of primary players may be shown live, e.g., based on footage taken by a camera of a primary player as he plays a gaming device. By viewing the faces of primary players, secondary players may have more information available to them in determining which games to participate in. For example, a secondary player may think to himself, "That guy looks like he knows what he is doing, so I'll bet on him." As another example, a secondary player may think, "She is looking very lucky today, I think I'll bet on her."

In various embodiments, to participate in a game of a primary player, a secondary player may click on the face of the primary player on the display viewed by the secondary player. The secondary player may select the face of the primary player in other ways as well. The secondary player may also view the face of a primary player but may actually select the primary player in a different manner, such as by typing in a name or identifier associated with the primary player.

In various embodiments, software tools may be available for discerning information about a primary player based on images of the primary player's face. For example, software may be used to determine (e.g., to determine with some probability) the mood of a primary player. In various embodiments, a secondary player may sort or search primary players based on the moods of the primary players. For example, a secondary player may search for a primary player that is "happy" because the secondary player may feel such a primary player is likely to be on a winning streak. Software that analyzes images of a primary player may also be used to infer other information, such as age, ethnicity, gender, or health. In various embodiments, a secondary player may search, or sort primary players based on any information that is discernable from images of the primary players.

In various embodiments, a display may feature images of dealers, such as images of dealers' faces. A display may also feature avatars of dealers' faces. A secondary player may choose a game to play based on the appearance of the dealer who is dealing that game. For example, a secondary player may wish to participate in a game of a dealer who appears to be in a bad mood, since the bad mood may signify to the secondary player that the house is losing. In various embodiments, software tools may be used to determine information about a dealer from images of the dealer. In various embodiments, software tools may be used to search or to sort dealers based on information that is discerned from images of the dealers.

2.10. A virtual world display. So games are organized into a virtual world. In various embodiments, a display may scenes from a virtual world. The virtual world may appear like a fantasy landscape, a desert, a pasture, or the inside of a building. Within the virtual world may be representations of gaming tables or gaming devices. Such representations may have a similar appearance to actual gaming tables or gaming devices. In some embodiments, representations of gaming tables or gaming devices may have completely different appearances. For example, a gaming table may be represented as a large mushroom, while a gaming device may be represented as a rose bush. A secondary player may select a mushroom in order to participate in games at the gaming table represented by the mushroom. In some embodiments, a virtual world may organize gaming devices and game tables in different ways than they are organized in a real casino. For example, rather than intermingling different types of games, a virtual world may present all gaming devices of a first type in one area, all gaming devices of a second type in another area, and so on. Thus, it may be easy for a secondary player to find a game he might be looking for within the virtual world. In various embodiments, a secondary player may navigate the virtual world as if from the vantage point of a person walking within it. For example, the secondary player may move a joystick forward so as to get closer to objects which appear distant on the screen. Similarly the secondary player may move the joystick backwards so as to get further away from objects which appear distant on the screen.

2.11. Ways to distribute information over multiple displays screens (e.g., different floor of the casino on each display). In various embodiments, a terminal, computer, or other device used by a secondary player may include multiple display screens. On the multiple display screens, a secondary player may view information about games in which he is participating, about games that are available for him to participate in, about his current credit balances, about options for betting on games, and/or about any other pertinent topic. There may be various ways to divide the information shown to the secondary player over the various screens.

2.11.1. Different games. In various embodiments, different screens may be used to display information about different games. For example, on a first screen, a secondary player may watch the progress of a video poker game, while on a second screen a secondary player may watch the progress of a slot machine game. As another example, a secondary player may watch the progress of a game at a first gaming device on one screen, while he watches the progress of a game at a second gaming device on another screen.

2.11.2. Different types of games. In various embodiments, information about games of a first type may be displayed on a first screen, while information about games of a second type may be displayed on a second screen. For example, information about table games may be displayed on a first screen, while information about games from gaming devices may be displayed on a second screen. As another example, roulette games may be displayed on one screen, while video poker games are displayed on another screen.

2.11.3. Different views of a game. (From the top, or as if you were playing). In various embodiments, different screens may be used to show views of the same game from different vantage points. For example, a secondary player may be participating in a table game of blackjack. One view may show the game unfolding as if the secondary player was sitting in the primary player's shoes. Thus, the secondary player may be able to see the cards dealt but may not be able to see the primary player. Another view may show the game unfolding as if the secondary player was hovering overhead. Thus, in the second view, the secondary player may see top of the primary player's head and the cards dealt. Other views may also be possible, such as a view from the vantage point of the dealer or such as a view from the underside of the table.

2.11.4. Control panel versus game information. In various embodiments, one screen may show the progress of a game in which a secondary player is participating. Another screen may show controls or interfaces that the secondary player may use. Controls or interfaces may include controls for selecting a game in which to participate, controls for selecting an amount to bet, controls for entering search criteria (e.g., search criteria for finding a game of interest to the secondary player), or controls for making any other gaming related decision, or other decision. The screen featuring the controls may be a touch screen, in some embodiments.

2.11.5. Game view versus view of statistics (e.g., about a player, gaming device, dealer, etc.). In various embodiments, a first screen may show the progress of a game in which the secondary player is participating. A second screen may show statistics or other information. The statistics or other information may be related in some way to the game being shown on the first screen. The statistics may indicate the probability that one or more outcomes will occur, the number of times similar cards have been dealt already in the last day, the place in a streak that a certain game occupies (e.g., this is the eighth game in a losing streak), or other information. Statistics may relate to the primary player of a game. For example, statistics may indicate the net winnings of the primary player over the last two hours, the typical strategy used by the primary player, the number of times the primary player has won a jackpot in his life, the city the primary player is from, or any other information about the primary player. The second screen may also show statistics about a dealer, game, or gaming table.

2.11.6. One screen is common to several secondary players. For example, all secondary players are participating in the games at one table. In various embodiments, two or more secondary players may be in proximity to one another. A screen may be visible to both of the secondary players. The screen may show information that is relevant to both secondary players. For example, both secondary players may be participating in games at the same gaming table. The screen visible to both secondary players may show the dealer's cards or may show a view of the gaming table from high up so that all games at the table are visible. Each of the secondary players may have his own personal screen as well. A personal screen may show information that is more pertinent to the individual secondary player. For example, a personal screen may show the cards of the primary player for the game in which the secondary player is participating. Another secondary player may be participating in the game of a different primary player, and so may be unconcerned about such cards.

2.12. You can have an actual physical machine recreate what's going on down there. E.g., a wheel of fortune on your machine spins. But it just says "reenactment." In various embodiments, a game played on a first gaming device may be reenacted on a second gaming device. For example, a primary player may play a first game at a first gaming device. A second gaming device located near a secondary player may receive information about the first game. The second gaming device may then reenact the first game by, e.g., displaying similar indicia as were displayed in the first game, by making similar sounds as were made in the first game, by flashing similar lights as were flashed in the first game, and/or by otherwise mimicking the first gaming device. Thus, the second gaming device may function as a three dimensional display and may be used to recreate or reenact games played at the first gaming device. In some embodiments, a gaming device near the secondary player may include a spinning wheel, as in a Wheel of Fortune game. The second gaming device may spin the wheel in the manner that the wheel was spun at the first gaming device. The secondary player may then feel the experience of watching a nearby wheel spin. In various embodiments, a device which is not a complete gaming device may nevertheless be used to reenact parts of a game that occurred on a first gaming device, e.g., in a game played by a primary player. For example, a device may include a spinning wheel as in the Wheel of Fortune game but may not include a video display or spinning reels. In various embodiments, when a device is used to reenact or recreate a game, the device may clearly indicate that the game is only a reenactment that the game is not original, that the game will not pay out real winnings, or may provide some other related indication. When a device provides an indication that a game is only a reenactment, problems such as a person claiming a jackpot shown by the device may be avoided.

3. Zooming in. In some embodiments, a secondary player may wish to watch the progress of a game. For example, the secondary player may wish to watch the progress of a game as it is played. As another example, the secondary player may wish to watch the progress of a game that had been played in the past, as if the game was currently being played (e.g., the player wishes to watch footage or a reenactment of the game). A secondary player may, for example, be perusing a floor plan view of a casino. The secondary player may find a gaming table where players have won 80% of the last 40 hands dealt. The secondary player may therefore wish to watch games at that table as the games unfold. A secondary player may indicate in various ways that he wishes to watch a game in progress. The secondary player may click on a gaming device or game table from a floor plan view of a casino. The secondary player may click on a line or record corresponding to a gaming device in a tabular view in order to watch games progressing at that gaming device. The secondary player may also key in the name of a game type, a location in a casino, or any other criteria that may narrow down the universe of gaming devices or players. Once the universe is narrowed down to one or a few games, such games may be watched as they are in progress. For example, the secondary player may be able to watch in real or in near time as bets are made, as cards are dealt.

In some embodiments, a player may watch the progress of a game together with other information. The other information may be information that was not present in the original footage. For example, the casino server may add to the game footage text indicating a probability of a certain final outcome occurring, text indicating the name of a player, text indicating what happened the last time a similar intermediate outcome occurred (e.g., text indicating what happened the last time a primary player drew to a royal flush), or any other text overlay.

3.1. Video. In some embodiments, a secondary player may watch the progress of a game via video. The video may represent actual footage, such as from a camera overlooking a gaming table or gaming device. The video may be live, delayed or it may represent footage that has been stored from a previously played game.

3.2. Simulation. In some embodiments, a secondary player may watch the progress of a game via a simulation. The simulation may be a simulated reenactment of the game. The reenactment may feature the dealing of animated cards and the placement of bets by animated hands holding animated chips. The simulation may show actual indicia which have occurred or are occurring in a game. The simulation may show an animated spinning of slot machine reels, the animated roll of dice, or the animated spinning of a roulette wheel, for example.

3.3. Battle Blackjack. In various embodiments, a game may be simulated or reenacted metaphorically. For example, rather than showing the cards dealt in a game of blackjack, a reenactment may show two people arm wrestling. As the advantage in the game shifts one way (e.g., the player has a favorable hand, such as a 20 in blackjack versus a 16 for the dealer), the arm wrestler representing the player with the advantage may be shown to be winning the arm wrestling battle (e.g., the arm wrestler representing the player may be shown having pressed the arm of his opponent to within one inch of the table). Similarly, if the player's opponent (e.g., the dealer or another game player) gains an advantage, the arm wrestler representing the opponent may be shown to gain the advantage in the arm wrestling battle. Many other metaphors for a reenacting a game may be used, including various sporting contests, battles, wars, or other confrontations or activities. The advantage of one player or another in a game may be determined probabilistically. For example, the advantage may be determined based on a player's chance of winning a game. A player's advantage may also be determined with the assumption of a particular strategy, such as basic strategy or optimal strategy.

3.4. Commentary—good or bad decision. In various embodiments, a game reenactment, or live game may be shown together with commentary on the game. The commentary may indicate whether decisions made in the game were good or bad. For example, a comment may indicate that a player made a good decision, e.g., a decision according to basic strategy. As another example, a comment may indicate that a player made a decision which gave up $2 in expected value. Comments may indicate other things. For example, a comment might indicate what a player might be thinking. For example, "John is considering between hitting or standing right here. Both would be reasonable decisions, though hitting is considered slightly better under normal conditions."

3.5. Simple text description of the game. In various embodiments, a reenactment of a game or a live display of the progress of a game may be text-based. For example, text may say, "Player Henry M. is dealt the A 7 . . . ." Thus, a secondary player may get enough information to reconstruct a game but may not necessarily see indicia or other game events in the form that they originally or actually happen. In various embodiments, a secondary player may hear audio descriptions of a game. The secondary player may hear audio commentary too.

4. Player wants to be in a game with certain criteria. As the criteria change, the player is automatically switched to the new table. E.g., I want to be on the table with the best winning streak. So it switches you. So currently you might pick a table. Then, you check a box that says keep me on the table that has the most winnings streak. In some embodiments, a secondary player may indicate criteria for participating in a game. The criteria may specify a primary player of the game, a game type, a bet amount, a location in a casino, or any other data related to the game. The casino server may find games matching criteria desired by the secondary player (e.g., criteria specified by the secondary player). The casino may then allow the secondary player to participate in one or more of such games. For example, the casino server may allow the player to place a bet on one or more of such games and to receive winnings based on the outcomes of one or more such games. In some embodiments, a secondary player may continue to participate in successive games played at a particular gaming device, a particular table, played by a particular primary player, or otherwise having something in common. For example, a secondary player may continue to participate in successive games played at a particular slot machine. The particular slot machine may be a slot machine that has matched criteria specified by the secondary player. For example, the slot machine may be a slot machine that has paid out the most of any slot machine in the casino in the past half hour. However, it may happen that, over time, a game, player, gaming table, gaming device, or other device or entity no longer satisfies the same criteria that it originally satisfied. For example, for a few minutes a particular slot machine may hold the distinction of having paid out more money in the most recent half hour than any other slot machine. However, during the course of those few minutes, other slot machines may make large payouts, so that the first slot machine is no longer the highest paying slot machine in the most recent half hour. Thus, in some embodiments, a secondary player may wish to switch gaming devices, to switch primary players, to switch game tables, or to make some other switch so that the secondary player can continue to participate in games that currently meet his desired criteria. Thus, for example, a secondary player may begin play at a first slot machine that has paid the most of any slot machine in the last half hour. When a new slot machine becomes the slot machine that has paid the most in the most recent half hour, the secondary player may cease participating in games at the first slot machine and may switch to participating in games of the new slot machine.

In some embodiments, a secondary player may specify criteria for a game in which he wishes to participate. The casino server may find a first game satisfying the criteria and allow the secondary player to participate in the game. The secondary player may then continue to participate in games having something in common with the first game, such as in games played by the same primary player as the first game, such as in games played at the same gaming device as the first game, such as in games played at the same gaming table as the first game, such as in games played by the same dealers as the first game, and so on. At some point, the casino server may determine that the games in which the secondary player will participate (e.g., if he keeps participating in the games of the same primary player; e.g., if he keeps participating in games at the same gaming table) will no longer meet the original criteria set forth by the secondary player. At this point, the secondary player may be switched so that he is now participating in games that do meet his original criteria. In various embodiments, a secondary player may specify whether he wishes to be switched from participating in a first set of games (e.g., from participating in a games of a first primary player) to participating in a second set of games (e.g., to participating in the games of a second primary player). The secondary player may indicate a desire to be switched when he originally specifies criteria for participating in games. For example, a secondary player may specify that he wishes to participate in the games of a first primary player who has the highest net winnings of any primary player over the last hour. The secondary player may further specify that the moment a different primary player overtakes the first primary player in terms of having the highest net winnings in the last hour, the secondary player would like stop participating in the games of the first primary player and begin participating in the games of the new, different primary player.

In various embodiments, when the games in which a secondary player is participating no longer satisfy the criteria specified by the secondary player for participating in games, the secondary player may be switched to new games automatically. For example, the secondary player may be automatically switched from participating in the games at a first table to participating in the games at a second table. In some embodiments, the secondary player is informed of this switch. For example, a message may pop up on the screen of the secondary player's display. The message may say, "You are now participating in games at Blackjack table 6, where player net winnings over the last hour are the highest of any table." In some embodiments, the secondary player may not even be informed of a switch. Rather, the secondary player may continue to see a reenactment of games without realizing the games are originating from a different gaming table. In some embodiments, though a secondary player may not be told explicitly of a switch (e.g., via a pop-up message), ways may be available for the secondary player to surmise that a switch has occurred. For example, a display screen on which the secondary player is watching a simulated reenactment of a blackjack game may include a table identifier in the lower right hand corner. When the secondary player is switched from participating in the games of a first table to participating in the games of a second table, the table number in the lower right hand corner may change.

In some embodiments, a secondary player may be asked for an input in relation to a potential switch. For example, a message may be displayed for the secondary player indicating that the secondary player is to be switched from participating in a first set of games to participating in a second set of games. The secondary player may be asked whether he would really like to be switched or whether he would like to remain a participant in the first set of games. The secondary player may be informed of the reason for the switch. For example, the secondary player may be informed that he is being switched because the second set of games better match his criteria for participating in games than do the first set of games.

In various embodiments, a secondary player may not provide an indication that he would want to switch from a first set of games to a second set of games. The secondary player may only specify criteria for selecting games in which to participate. The casino server may, in various embodiments, determine at some point that a second set of games better matches the secondary player's criteria for participating in games than does the set of games in which the secondary player is currently participating. Thus, the casino server may ask the secondary player whether he would like to switch and participate in the second set of games. The question may be asked though the secondary player never before indicated an interest in switching. The secondary player may then have an opportunity to accept or not.

In various embodiments, a secondary player may be rotated from game to game according to some algorithm. For example, after every 50 games of a first gaming device in which a secondary player participates, the secondary player may be automatically moved to a second gaming device of the same type (e.g., featuring the same game). In various embodiments, after a certain patterns of wins or losses, a secondary player may be rotated to another gaming device, game table, or primary player. For example, if a secondary player loses five games in a row while participating in the games of a first primary player, the secondary player may be automatically rotated to the games of another primary player. In some embodiments, a secondary player may be asked to confirm his approval before being rotated to a new game.

In various embodiments, a secondary player may wish to participate in a game with a certain characteristic. The secondary player may wish to participate in a game with a certain primary player, in a game at a certain gaming table, in a game at a certain gaming device, in a game with a certain betting limit, in a game with a certain jackpot, in a game made by a particular manufacturer, in a game that follows X consecutive wins, in a game that follows X consecutive losses, or in a game with any other characteristic. However, a game that conforms to the desires of the secondary player may not be immediately available for the secondary player to participate in. For example, there may be no primary player who is playing a particular gaming device whose games the secondary player wishes to participate in. Thus, in various embodiments, a secondary player may be alerted when a game that meets some criteria becomes available. The criteria may include criteria that secondary player has previously used to find a game in which to participate. For example, if no primary player is currently playing at a gaming device in whose games the secondary player wishes to participate, the secondary player may be alerted when a primary player does sit down at the gaming device.

Patterns of Betting

In various embodiments, a pattern of betting may be determined for a player, such as for a primary player or for a secondary player. A pattern of betting may entail any system of rules, tendencies, criteria, or other factors used by a player in placing a bet or series of bets.

A pattern of betting may describe or encapsulate a first player's tendency to: (a) bet on a particular second player; (b) bet on only the house (e.g., in a game of blackjack or roulette); (c) bet on only the player position (e.g., in a game where a house plays against the player); (d) double a bet after a loss; (e) change a bet size under particular circumstances; (f) bet only on a particular type of outcome (e.g., bet only on red in roulette; e.g., bet only on the pass line in craps); (g) employ a particular strategy in a game; (h) bet on a particular type of second player (e.g., a first player's betting pattern may be to always bet on a second player who has won more than $100 in the last 10 minutes); and/or any other tendency.

A first player's pattern of betting may include the tendency to always bet on another player (e.g., on a primary player) who is the top performing player in the last hour. A first player's pattern of betting may include the tendency to always use optimal strategy in a game of blackjack. A first player's pattern of betting may include the tendency to bet on a second player only when the second player plays a particular game, such as blackjack. A first player's pattern of betting may include the tendency to bet on a second player only when the second player is on a winning streak.

In various embodiments, a pattern of betting may be exhibited by either a primary player or by a secondary player. A secondary player may exhibit a pattern of betting, for example, in the way he chooses primary players on which to bet. The secondary player may tend to choose primary players of a particular age, occupation, or skill level, for example. A secondary player may tend to bet on a particular primary player (e.g., Bob Smith), or the secondary player may tend to bet on a primary player with a certain game history (e.g., a primary player with the most money won in the last hour). A secondary player may tend to bet on any primary player that happens to be seated in a particular spot at a gaming table (e.g., at the spot just to the left of the dealer). Any tendency used by a secondary player to choose primary players on which to bet may constitute a pattern of betting.

In various embodiments, any tendency used by a player in choosing which games to play or bet on may constitute a pattern of betting. For example, a tendency of a player to bet only on blackjack may constitute a pattern of betting. A tendency of a player to bet only on slot machine games may constitute a pattern of betting.

In various embodiments, a tendency of a player to play games at a particular time may constitute a pattern of betting. For example, the tendency of the player to always play games between 1:00 pm and 2:00 pm may constitute a pattern of betting.

In various embodiments, a pattern of betting may constitute an alternating or varying pattern. For example, a secondary player may have the tendency to alternate between betting on the dealer and betting on a primary player in a game of blackjack.

In various embodiments, a pattern of betting that has been determined or deduced need not necessarily fit every bet that has been made by a particular player. For example, out of 1000 bets made by a player, a set of rules made to describe such bets may explain 900 of those bets but may fail to explain the remaining 100.

Copying Someone Else's Pattern of Betting

In various embodiments, bets made by a player may be recorded, e.g., by a gaming device or a terminal where such bets are placed. Bets may also be recorded by an information capturing device, such as a scanner or camera.

Bets made by a player may be analyzed for patterns of betting. The central server may, for example, employ statistical algorithms to deduce rules or tendencies of the player in placing bets. A betting pattern may take the form of a set of rules. For example, each rule may specify one or more conditions and an action to be taken if the conditions are true. For example, a rule may state that if the last game of a first player was a win, then the first player should bet twice the amount of his previous bet on the next game he will play. As another example, a rule may state that a first player should place a bet on the player at a particular blackjack table who has won the most money in the last five hands (e.g., the first player should bet that such a player will win again).

Once patterns of betting have been determined, such patterns may be made available for use by other players. Other players may then have the opportunity to follow the same patterns in their own betting practices. For example, a first player may follow the same pattern of betting used by a second player.

A pattern of betting may be made available in a number of forms. A first player may be able to view a list of rules that would allow the first player to follow the pattern. A first player may be able to view a text description of the pattern. A first player may be able to view suggestions of what to do in a given situation (e.g., suggestions of how much to make or which strategy decision to make), where such suggestions are made in accordance with a pattern of betting.

In various embodiments, a first player may indicate a desire to automatically follow a pattern of betting used by a second player. Thus, the first player may authorize a gaming device, the central server, or some other device to automatically place bets on his behalf, or to automatically employ a particular game strategy on his behalf, in accordance with the betting patterns of a second player. The first player may then sit back, and watch games unfold without providing any further input.

In various embodiments, a first player may receive information about what bet he should make or what strategy he should use next if he wishes to follow a pattern of betting of a second player. However, the first player may be given the opportunity to manually confirm or enter (e.g., via the press of a button) his own bet, so that the first player has the opportunity but not the obligation to follow the betting pattern of the second player.

In various embodiments, a first player may copy some aspects of a second player's pattern of betting, but not all aspects. For example, a first player may copy the second player's strategy, but not his pattern of varying the bet sizes. As another example, a first player may copy the betting patterns of a second player, but only when the second player is playing blackjack. As another example, a first player may copy the betting patterns of the second player, but only between the hours of 2:00 pm and 3:00 pm. As another example, a first player may copy the betting pattern of a second player, but only when the first player is ahead by more than a certain amount of money. As another example, a first player may copy the betting pattern of a second player, but only when the second player is ahead by more than a certain amount of money.

In various embodiments, a first player may search for a second player with certain characteristics. For example, a first player may search for a second player who has won more than any other player playing blackjack. The first player may then choose to copy the betting patterns of the second player. In various embodiments, a first player may periodically alter the betting patterns which he follows, depending on some criteria. For example, the first player may always follow the betting pattern of the second player who is most ahead at the moment. Thus, as different players win money and become the player with the most winnings at a casino, a first player may change the betting pattern he follows.

In various embodiments, a first player may follow the betting pattern of a second player so long as that second player is still following the same betting pattern. If the second player starts using a different betting pattern or makes bets that are inconsistent with the first betting pattern, then the first player may cease following the betting pattern of the second player.

In various embodiments, following a betting pattern need not include making the exact same bets as another player. Rather, a first player may employ the same rules for making bets that a second player uses but may employ those rules on a different game.

Statistics on Patterns of Betting

In various embodiments, a player may wish to employ a pattern of betting. The pattern employed may be a pattern that had previously been used by a second player, or that had previously been used by a number of other players. The player may wish to know various statistics about the pattern. For example, the player may wish to know how successful the pattern has been or how many other players have used the same pattern in the past. Knowing statistics about a pattern of betting may allow a player to decide whether or not to use the pattern and/or whether or not to choose a first pattern of betting over a second pattern of betting.

In various embodiments, a casino server or other device or entity may track the games played, the amounts bet, the strategies used, and any other information about one or more players. The casino server may use the collected information to determine betting patterns and to determine statistics about the betting patterns. The casino may determine how many players are using a particular pattern. The casino may determine how many players are using a particular pattern over a particular time interval (e.g., over a ten-minute period). The casino server may also determine how many players have used a particular pattern at all, e.g., in the last day. The casino server may determine the percentage of time that a particular pattern of betting has been used as opposed to other patterns of betting. For example, a casino server may determine that 20% of the time when any player engages in play at the casino, the player employs a particular pattern of betting.

In various embodiments, a casino may determine statistics or metrics about the success of a pattern. For example, the casino may determine which patterns of betting have resulted in the most money won for players, which patterns have resulted in the most won games for players, which patterns have been profitable for the longest amounts of time, and/or any other metrics about a pattern. A casino may determine which pattern has been successful over the most recent time period, or during the current time period. For example, in some embodiments, a casino may determine all the patterns of betting that are currently being employed by players across the casino, or by a particular subset of players (e.g., by blackjack players). The casino may then determine which pattern is or has been the most successful according to some metric.

Upon request of a player, or without any particular request, a casino may display statistics about different patterns of betting. For example, the casino may periodically rank and re-rank patterns of betting according to which has been the most successful (e.g., which has generated the most winning per player using the pattern) over the most recent time period. A player may have the opportunity to view statistics about a pattern of betting and to use such statistics, for example, to aid in his decision of whether or not to copy the pattern of betting himself.

In various embodiments, a first player may wish to be alerted or informed about a pattern of betting that is being used by a second player. The second player may be a successful player, for example. The first player may, in particular, wish to be alerted when the second player switches his pattern of betting. For example, the first player may copy a first pattern of betting from the second player. However, if the second player switches to using a second pattern of betting, then the first player may decide to stop using the first pattern of betting, and perhaps to switch to the second pattern of betting.

The following are embodiments, not claims:

A. A method comprising:
- receiving an indication of a first plurality of decisions made by a first player under a first set of circumstances;
- determining a set of rules that, when followed under the first set of circumstances, generate the first plurality of decisions;
- receiving a request from a device of a second player for a description of the rules; and
- transmitting the description of the rules to the device of the second player.

B. The method of embodiment A in which receiving an indication of a first plurality of decisions made by a first player under a first set of circumstances includes receiving an indication of a first plurality of decisions made by a first player while playing a particular set of games.

C. The method of embodiment A in which transmitting the description of the rules includes transmitting computer executable instructions for following the rules. The computer executable instructions may be useable by a gaming device or mobile gaming device for making decisions in a game.

D. The method of embodiment A in which the set of rules includes rules for determining a size of a bet.

E. The method of embodiment A in which the set of rules includes rules for selecting a card to hold in a game of video poker.

F. The method of embodiment A in which the set of rules includes rules for determining whether to hit or stand in a game of blackjack.

G. A method comprising:
- receiving a set of rules that, when followed under a first set of circumstances, generate a first plurality of decisions previously made by a first player faced with the first set of circumstances (e.g., the first plurality of decisions may include decisions as to the size of a bet and/or decisions as to a game strategy);
- receiving a first instruction from a second player to follow the set of rules automatically;
- generating a second plurality of decisions in accordance with the set of rules;
- receiving a second instruction from the second player to cease following the set of rules; and
- receiving from the second player a third instruction detailing a third decision.

H. The method of embodiment G further including conducting a first plurality of games. Conducting a game may include, for example, receiving a bet, receiving or generating a random number, determining a first outcome based on the random number, receiving a game decision, determining a second outcome based on the first outcome and the game decision, presenting graphics depicting the first and/or second outcomes, presenting audio, determining a payout based on the first and/or second outcomes, providing the payout, and/or performing any other functions associated with a game. The game may be conducted, for example, by a stationary gaming device or by a mobile gaming device.

I. The method of embodiment H in which generating a second plurality of decisions includes generating a second plurality of decisions to be made in the first plurality of games.

J. The method of embodiment I further including conducting a second game that is not one of the first plurality of games.

K. The method of embodiment J further including applying the third decision to the second game.

L. The method of embodiment Gin which receiving a first instruction from a second player to follow the set of rules automatically includes receiving a first instruction from a second player to repeatedly conduct games and to use the set of rules for making decisions in the games, until further instructed by the second player.

M. The method of embodiment G in which the third decision does not conform to the set of rules. For example, the rules would not yield the third decision if the rules were used to make a decision.

N. The method of embodiment Gin which generating a second plurality of decisions in accordance with the set of rules includes:
- determining a bet size in accordance with the set of rules;
- determining a first outcome in a game;
- determining a course of action to take in the game in accordance with the set of rules; and
- determining a second outcome in the game based on the first outcome and based on the course of action.

O. A method comprising:
- determining a first set of rules for making decisions in a game;
- determining a second set of rules for making decisions in a game;
- determining a first performance metric for the first set of rules at a first time;
- determining a second performance metric for the second set of rules at the first time;
- determining a first ranking of the first set of rules and the second set of rules based on the first performance metric and based on the second performance metric;
- presenting the first ranking;
- determining a third performance metric for the first set of rules at a second time;
- determining a fourth performance metric for the second set of rules at the second time;
- determining a second ranking of the first set of rules and the second set of rules based on the third performance metric and based on the fourth performance metric, in which the second ranking is different from the first ranking; and
- presenting the second ranking.

P. The method of embodiment O in which determining a first set of rules includes:
- tracking decisions made in a set of games by a first set of players; and
- determining a first set of rules that explain the decisions made in the set of games.

Q. The method of embodiment O in which determining a first performance metric includes:
   tracking decisions made in a set of games by a first set of players;
   determining a second set of players who have followed the first set of rules, in which the second set of players is a subset of the first set of players (e.g., the first set of players may be filtered down to eliminate players who have not followed the first set of rules, thus yielding the second set of players); and
   determining an amount of money that the second set of players has won.

R. The method of embodiment O in which presenting the first ranking includes:
   assigning a first text identifier to the first set of rules (e.g., the first set of rules may be associated with a name, such as "The Crazy Money System");
   assigning a second text identifier to the second set of rules; and
   displaying a list that includes the first text identifier and the second text identifier, in which the list is ordered based on the ranking.

S. The method of embodiment O further including:
   receiving from a player instructions to place bets automatically in accordance with a set of rules that is ranked the highest among all sets of rules;
   placing, at the first time, a bet on behalf of the player that is made in accordance with the first set of rules; and
   placing, at the second time, a bet on behalf of the player that is made in accordance with the second set of rules.

T. The method of embodiment O in which determining a first performance metric includes determining, at a first time, a first performance metric describing the performance of the first set of rules with respect to games played in the hour preceding the first time.

The following are embodiments, not claims:

A. A method comprising:
   receiving from a secondary player at least one criterion for selecting a game;
   determining at a first point in time a first game that matches the at least one criterion, the first game to be played by a first primary player;
   receiving a first bet from the secondary player;
   determining a first outcome of the first game;
   determining a first payout based on the first bet and the first outcome;
   adding credits to an account associated with the secondary player based on the first payout;
   determining, at a second point in time after the first point in time, that a second game to be played by the first primary player does not match the at least one criterion; and
   transmitting to the secondary player an indication that the second game does not match the at least one criterion.

B. The method of embodiment A in which the at least one criterion is that the game is to be played by a primary player who has the highest net winnings of any primary player over a particular period of time.

C. The method of embodiment A in which the at least one criterion is that the game is to be played at a gaming table at which the most money has been won of any gaming table over a particular period of time.

D. The method of embodiment A in which the at least one criterion is that the game is to be played by a primary player who has won the last five games that he has played.

E. The method of embodiment A further including:
   receiving from the secondary player a second bet for a third game played by the first primary player, the third game played after the first game and before the second game;
   determining a second outcome of the third game;
   determining a second payout based on the second bet and the second outcome; and
   adding credits to the account associated with the secondary player based on the second payout.

F. The method of embodiment A further including:
   receiving, after transmitting the indication, instructions from the secondary player to find another game that matches the at least one criterion;
   determining a third game that matches the at least one criterion;
   receiving from the secondary player a second bet;
   determining a second outcome of the third game;
   determining a second payout based on the second bet and the second outcome; and
   adding credits to the account associated with the secondary player based on the second payout.

G. The method of embodiment F in which the third game is not played by the first primary player.

H. The method of embodiment A further including:
   determining a third game that matches the at least one criterion, in which the third game is not played by the first primary player;
   receiving from the secondary player a second bet;
   determining a second outcome of the third game;
   determining a second payout based on the second bet and the second outcome; and
   adding credits to the account associated with the secondary player based on the second payout.

I. A method comprising:
   receiving from a secondary player at least one criterion for selecting a game;
   determining at a first point in time a first game that matches the at least one criterion, the first game to be played at a first gaming table;
   receiving a first bet from the secondary player;
   determining a first outcome of the first game;
   determining a first payout based on the first bet and the first outcome;
   adding credits to an account associated with the secondary player based on the first payout;
   determining, at a second point in time after the first point in time, that a second game to be played at the first gaming table does not match the at least one criterion; and
   transmitting to the secondary player an indication that the second game does not match the at least one criterion.

J. A method comprising:
   determining at least one criterion for a gaming device;
   determining at a first point in time a first gaming device that meets the at least one criterion;
   determining at a second point in time after the first point in time a second gaming device that meets the at least one criterion;
   determining at a third point in time after the second point in time a third gaming device that meets the at least one criterion; and presenting an image which includes visual representations of the first, second, and third gaming devices, the image further including a first arrow pointing from the first gaming device to the second gaming device and a second arrow pointing from the second gaming device to the third gaming device.

K. The method of embodiment J in which the at least one criterion can be met by only a single gaming device at any one time.

L. The method of claim embodiment J further including receiving an indication of at least one of: (a) an outcome generated at the first gaming device; (b) an outcome generated at the second gaming device; (c) an outcome generated at the third gaming device; (d) a payout made at the first gaming device; (e) a payout made at the second gaming device; and (f) a payout made at the third gaming device.

M. The method of embodiment J in which determining at least one criterion for a gaming device includes determining that a gaming device must have made the highest payout of any gaming device in a casino in the last hour.

N. The method of embodiment J in which determining at least one criterion for a gaming device includes determining that a gaming device must have had the longest streak of consecutive outcomes that were winning for a player of any gaming device in a casino in the last hour.

O. The method of embodiment J in which presenting an image includes presenting a visual representation of a casino floor, the image including visual representations of the first, second, and third gaming devices, the image further including a first arrow pointing from the first gaming device to the second gaming device and a second arrow pointing from the second gaming device to the third gaming device.

P. The method of embodiment J further including generating, based on the first, second and third gaming devices, a prediction of a fourth gaming device that will meet the at least one criterion, in which an indication of the fourth gaming device is included in the image.

Q. The method of embodiment J further including generating, based on the locations of the first, second and third gaming devices, a prediction of a location of a fourth gaming device that will meet the at least one criterion, in which an indication of the fourth gaming device is included in the image.

Automatic Play of Games

In various embodiments, a gaming device may initiate and/or conduct a series of games for a player in an automatic fashion. During the series of games, no player input may be required. Prior to the series of games, the player may describe rules or parameters according to which the games will be played. The player may thereby configure the gaming device to use these rules or parameters. The parameters may include: (a) the number of games to be played; (b) the time to play each game; (c) the time to play the whole series of games; (d) the amount to wager on each game; (e) the strategy to be used in each game; (f) a criterion or criteria for when to stop playing automatically; (g) a criterion or criteria for when to seek player input; (h) the type or types of games to be played; (i) the gaming device or devices to be used for conducting the game (e.g., for generating game outcomes); (j) the manner in which outcomes will be communicated to the player (e.g., the outcomes may be displayed; e.g., the outcomes may be printed on a paper for the player); or any other parameters.

In various embodiments, a gaming device may be configured to use a particular strategy for a particular period of time. The particular strategy may be an optimal strategy. In various embodiments, a strategy may be optimal in the sense that it maximizes a player's expected winnings for a game once the game has been started. The particular strategy may be a strategy which allows for the highest possible payout. For example, in a game of video poker, one strategy may be to always pursue the royal flush. In various embodiments, a player may configure a gaming device to play optimal strategy for the next ten minutes. In various embodiments, a player may configure a gaming device to play blackjack using basic strategy for the next 20 minutes.

In various embodiments, a gaming device may be configured with a frequency of play. For example, the gaming device may be configured to play 10 games per minute. A gaming device may similarly be configured to have a particular period of time between games. For example, a gaming device may be configured to initiate each new game ten seconds after the last game was initiated. A gaming device may be configured to play a game of a certain length. For example, a slot machine may be configured so that the reels take 10 seconds before they stop spinning.

In various embodiments, a gaming device may be configured to play for some length of time. For example, the gaming device may be configured to conduct games for the next 45 minutes. In various embodiments, a gaming device may be configured to play games until some amount of money is won or lost. For example, a gaming device may start with a player bankroll of $50. The gaming device may be configured to keep playing until either the bankroll reaches $75 (and thereby $25 has been won) or until the bankroll reaches $25 (and thereby $25 has been lost). In various embodiments, the gaming device may cease playing even though an amount won or lost (or a bankroll) has not reached an exact threshold. For example, having started at $50, a bankroll may reach $25.50 at a dollar-denomination machine. The machine may stop playing because one further bet would risk leaving the bankroll at $24.50, which is below the lower limit for which the gaming device has been configured.

In various embodiments, a gaming device may be configured to play optimal strategy for some percentage of the games played. For example, a gaming device may be configured to play optimal strategy in 80% of games played. Thus, for example, the gaming device may randomly determine, for each game, whether it will use optimal strategy. If random determination may be made such that there is an 80% likelihood that optimal strategy will be used (e.g., there is a biased drawing made to determine whether optimal strategy will be used. In various embodiments, a gaming device may be configured to play optimal strategy for some percent of the time. For example, for the first 60% of a period of time during which a gaming device is playing automatically, optimal strategy may be used. For the remaining 40% of the time, some non-optimal strategy may be used. In various embodiments, using a strategy that is not optimal does not necessarily mean that a gaming device won't make the same decision that would have been made had it been using optimal strategy. In various embodiments, two different strategies may sometimes yield the same decision. For example, a strategy to maximize expected winnings may sometimes yield the same decision as a strategy to always shoot for the highest possible payout.

In various embodiments, a gaming device may be configured to pursue a first strategy (e.g., optimal strategy) for some percentage of time or for some percentage of games played. During the times or the games when optimal strategy is not used, some other strategy may be used. The other strategy may be a strategy which attempts to obtain the largest possible payout, whether or not obtaining such a payout is a remote possibility. The other strategy may be a strategy which always seeks to obtain a payout above a certain level. For example, one strategy in video poker may be to maximize the chances of receiving a flush or better.

In various embodiments, a gaming device is configured to play a sequence of games automatically. Playing games automatically may include making strategy decisions. However, in various embodiments, a gaming device may halt the automatic play of a game and wait to receive a player input to the game. The player may then provide an input. The input may indicate a strategy to pursue in a game. For example, the input may indicate which cards to hold in a game of video poker, or whether to hit or stand in blackjack. A gaming device may halt automatic play to allow for player input for various reasons. A gaming device may halt automatic play if: (a) two possible decisions are equally valid according to some strategy (e.g., if two possible decisions both lead to the same expected winnings for the player); (b) a possible payout for a game is larger than a predetermined threshold (e.g., if a possible payout for a game is more than 500 times the amount wagered); (c) a large payout has more than a predetermined probability of occurring (e.g., if a royal flush has more than a 1% chance of occurring); (d) a winning payout is certain to occur (e.g., if a player has received three cards of the same rank in the first five cards dealt in a game of video poker, the player may be allowed to complete the game manually to experience the pleasure of winning); (e) if the gaming device has been configured to stop for any particular outcome or intermediate outcome (e.g., if the gaming device has been configured to stop automatic play when there are two aces dealt to a player in a game of blackjack then the gaming device may actually stop automatic play when two aces are dealt to a player in a game of blackjack); or any other circumstances or criteria dictate that the gaming device should halt automatic play. In various embodiments, automatic play may stop so that a gaming device may accept a player decision. However, automatic play may resume once a player has made his decision, in various embodiments. In various embodiments, after automatic play has stopped, a player must explicitly indicate that he wishes for automatic play to resume. For example, the player may press a button that says, “resume automatic play.” Otherwise the player may continue to initiate games and make decisions manually.

In various embodiments, automatic play may be halted upon any event or sequence of events. A sequence of events may include a sequence of outcomes. Automatic play may be halted if, for example, the player wins on five games in a row, the player loses on five games in a row, the player wins more than a predetermined amount of money in a some number of games (e.g., if the player wins more than $50 in ten hands), a particular card occurs in a predetermined number of games in a row, a particular outcome occurs in a predetermined number of games in a row, or upon any other sequence events or pattern of events. Further patterns are described herein, and various embodiments contemplate that automatic play may be halted upon the occurrence of any particular or designated pattern or sequence of events.

In various embodiments, automatic play may be paused for some period of time to allow for player input. However, if the player has not provided input after some period of time, the gaming device may automatically determine an input. For example, the gaming device may determine an input according to optimal strategy. In various embodiments, a halt or a pause in automatic play may be emphasized with a beep, vibration, or other alert. For example, a beep may signify to the player that he must make some decision in a game and that he cannot sit back, and watch games proceed automatically. Similarly, a vibration on a mobile gaming device may alert a player to take the mobile gaming device out of his pocket because his input is required. In various embodiments, a player may set the preference as to the type of alert that will be provided to him. In various embodiments, when automatic play stops, the gaming device may display or otherwise communicate a message to the player. The message may say that input is requested from the player. The message may further indicate the amount of time that the player has to provide an input (e.g., before automatic play is resumed). In various embodiments, when a player is asked for a manual input, the player may have an option to tell the gaming device to make its own decision. For example, a button may read “Keep playing.” Pressing such a button may cause the gaming device to determine a decision. The decision may be made according to any particular strategy, such as according to optimal strategy.

In various embodiments, a gaming device may halt automatic play. However the gaming device may halt automatic play only to allow a player to view the state of the current game. The gaming device may, after some period of time, resume automatic play. In various embodiments, upon a halting or pausing of automatic play, a player may have the opportunity to interject and make his own decision. For example, a player may press buttons which are ordinarily indicative of a player strategy. For example, a player may press buttons underneath cards dealt in a game of video poker, indicating the player’s desire to hold the cards. By pressing such buttons, the player may override the decision process of the gaming device and cause his own decisions to be registered in the game. In various embodiments, a player may override the decisions of the gaming device at any point, not just when the gaming device has paused. For example, the player may at any point during automatic play press a button which says “stop.” The player may then have the opportunity to input his own decisions. The player may later press a button labeled “resume” or the like. Automatic play may thereupon resume.

In various embodiments, a gaming device may make decisions automatically. However, the gaming device may seek confirmation from the player. Upon learning of a decision (e.g., because an indication of the decision is displayed on the screen of the gaming device), a player may have the opportunity to press a button (or provide some other input) to stop the gaming device and instead to cause the gaming device to make a different decision. In various embodiments, a gaming device may make automatic decisions. The gaming device may allow some period of time (e.g., 3 seconds) for the player to override a decision. However, if there is no input from the player, the gaming device may proceed to generate the remaining part of the game stemming from the decision.

In various embodiments, when automatic play has been halted or paused, the player may have the opportunity to specify a new strategy to be used. When automatic play is subsequently resumed, the new strategy may be employed.

In various embodiments, when a player elects to bet on some number of games, such games may be generated and conducted for the first time for the player. In various embodiments, when a player elects to bet on some number of games, such games may include games that have already been played by other players (e.g., by primary players).

Thus, for example, a player may elect to bet on 100 games. A casino server may then select 100 games that have been previously played. The selection may be random. If such games were winning for the player who originally played them, the current player may win as well. If such games were losing for the player who originally played them, the current player may lose as well. In various embodiments, a player may elect to play some number of games. A casino server may then use games that are currently being played or about to be played. For example, the casino may use games that are played at video poker machines around the casino. The player may participate in such games and may win if those games result in a win for the player side and may lose if those games result in a loss for the player side. In various embodiments, a player may bet against a primary player, and may e.g., win when the primary player loses and lose when the primary player wins. Thus, it will be appreciated that when a player selects some number of games in which to participate, the games may be generated for the first time for that player, or the games may be games that have been or will be played by others.

In various embodiments, two or more players may wish to engage in automatic play. For example, both players may wish to have 50 games played automatically by the players' respective gaming devices. The players may, in various embodiments, participate in the same games. The common games played may, for example, come from other players around the casino. In various embodiments, the casino may have a data feed of game results from around the casino. The data feed may go to the gaming devices of players who wish to play automatically and may thereby allow such players to participate in games from around the casino. In various embodiments, when players participate in a common set of games, the players may participate in such games out of order. For example, player A may participate first in game X and then in game Y. Player B may participate first in game Y and then in game X.

In various embodiments, a number of interfaces may be associated with automatic play. Input buttons may allow a player to override a strategy, to tell a gaming device to halt automatic play, to tell a gaming device to resume automatic play, to indicate a particular strategy to be used, to indicate the parameters using which a gaming device should initiate a session of automatic play, and to perform any other function. In various embodiments, a player may be required to make two button presses to override a strategy suggested by the gaming device. The two button presses may include pressing each of two different buttons or may include pressing the same button twice (e.g., double clicking). In this fashion, there may be a reduced chance that a player automatically overrides a good decision of the gaming device. In various embodiments, a wheel, such as a thumb wheel, may allow a player to vary the speed of automatic play. For example, the player may move the wheel one way to increase the speed of play and may move the wheel the other way to decrease the speed of play. In various embodiments, a button may be used to indicate that a gaming device should proceed with automatic play, such as after the gaming device has paused.

In various embodiments, when automatic play has been paused to await the player's input, or for any other reason, the player may cause automatic play to resume in various ways. The player may double click on a button to cause automatic play to proceed. In some embodiments, the player may press any button to cause automatic play to proceed. In some embodiments, the player may touch any area of a touch screen to cause automatic play to proceed. In some embodiments, the player may make a noise or vocalization. For example, the player may clap twice in order to cause automatic play to proceed. In various embodiments, a player may scroll a thumb wheel to cause automatic play to proceed.

In various embodiments, when automatic play has been paused to await the player's input, the player may provide an input in various ways. Certain ways may be available for the player to quickly and/or conveniently provide a desired input with minimal effort. In a game of video poker, a list of strategies may be provided for a player. The list of strategies may include corresponding expected winnings for each strategy, and/or may include one or more other statistics for each strategy. The strategies may be sorted by expected value or by some other metric. The player may then select a strategy with one input based on his desired metric. For example, to execute the strategy with the highest expected winnings, the player may simply click on the strategy from the list. This may save the player the trouble of executing the strategy himself by, for example, selecting all cards to hold in order to follow the strategy. In some embodiments, a player may indicate that a random strategy should be followed. For example, in bonus round, a player may have the option of opening one of three envelopes. The player may press a button, touch an area of the screen, or otherwise provide an indication that a random strategy should be chosen on the player's behalf and carried out (e.g., that a random envelope should be chosen).

Game Play as Lottery Ticket/Entry into Drawing

In various embodiments, every game played could be an entry into a drawing. The faster games are played (e.g., in an automatic play mode), the more entries a player may receive. Drawings may be done at certain times, e.g., at 4:00 every day or at random times. Thus, players may be encouraged to play games at a more rapid pace (e.g., to have games played automatically at a more rapid pace) so as to accumulate plenty of entries by the time any random drawing occurs. In various embodiments, cards received in games may constitute entries into a drawing. A player may win if the cards he has received in a game match the cards drawn in a drawing. As will be appreciated, other game indicia may serve as entries into a drawing, where indicia drawn may be compared to indicia received from players entering the drawing. In various embodiments, games played, cards received, or other indicia received may serve as entries into a drawing. In various embodiments, a meter may indicate to a player how many hands he has played, how many cards he has received, and/or how many other types of indicia he has received. The meter may thereby indicate to the player how many entries he has in an upcoming drawing. The player may be encouraged to play more rapidly so as to watch the meter go higher.

In various embodiments, outcomes or indicia received by a player in a first game may serve as entries into a second game, e.g., into a drawing. In various embodiments, entry into the second game may be free of charge. For example, the player's outcomes or indicia may be entered automatically once the player has made his bet in the first game and played the first game. In various embodiments, the player may have to pay extra or otherwise provide extra consideration in order to be entered into the second game. In various embodiments, the player may make a bet on a first game, and then pay an additional amount equal to 10% of the bet in order to be entered into a second game. In various embodiments, the price of entry into the second game may be a proportion of the bet in the first game (e.g., 20%; e.g., 50%), or maybe a fixed price (e.g., $0.10; e.g., $1.00). In various embodiments, a player may stand to win in the second game an amount that is based on the bet made by the player for the second game. In various embodiments, the player may stand to win in the second game an amount that is based on the bet made by the player for the first game. In various embodiments, a player may make a single bet prior to starting the first game. The single bet may enter the player into both the first game and into the second game. In various embodiments, the player makes a first bet on the first game. The player later (e.g., after completing the first game) has the option of making the second bet in order to enter his outcome from the first game into the second game. In various embodiments, the player may configure his gaming device, mobile gaming device, personal computer, or other device to automatically (e.g., without the player's further input) enter the player into the second game. The automatic entry may entail deducting further credits from the player. In various embodiments, the player may manually confirm a desire to be entered in the second game after finishing the first game.

Interface

In various embodiments, an interface, such as a graphical user interface, may allow a player to enter or play in a second game based on an outcome, result, or indicium from a first game. The player may use the interface to specify an amount to bet in the second game. For example, the player may enter an absolute amount to bet (e.g., $0.25) or may enter a percentage. The percentage may represent a percentage of the player's bet for the first game. The player may use the interface to specify whether he will be entered automatically into the second game following the conclusion of the first game. For example, if the player checks a particular box on the interface, then at the conclusion of a first game, an additional number of credits will be deducted from the player's credit balance and the player will be automatically entered into the second game. In various embodiments, the player may check a box that says he never wishes to be entered into a second game following the conclusion of the first game. In this case, the player may proceed from game to game without ever being entered into the drawing (or other procedure) of the second game. In various embodiments, a player may check a box or otherwise indicate that he wishes to have the option of entering the second game following the conclusion of the first game. Subsequently, once the player has finished the first game, the player's device (e.g., gaming device, e.g., betting terminal, e.g., mobile gaming device, e.g., kiosk) may prompt the player with a question asking the player whether or not he would like to enter his outcome from the first game into the second game. The player may then press one of two buttons, such as "yes" button or "no" button, to indicate whether or not he would like the outcome from the first game to enter him into the second game. The prompt given to the player may indicate a number of credits that will be deducted from the player should he decide to be entered into the second game.

The interface may include a graphical display on a display screen. The display may include text boxes, check boxes, buttons, or other areas where a player may enter information. The player may enter information using a mouse, keyboard, joystick, track ball, or any other input device. The player may enter information using a touch screen interface, e.g., by touching the display which shows information that the player enters. In various embodiments, the player may use voice to enter information into the interface.

In various embodiments, the interface may show an indicator of whether the player will be automatically entered into the second game, whether the player will not be entered into the second game, or whether some other event will transpire. For example, a border of the graphical user interface may be a first color if the player will be automatically entered into the second game, and a second color if the player will not be automatically entered into the second game. In this way, a player may be easily aware of when he will automatically be entered into the second game and when he will not be. Many other indicators are also possible. For example, a flashing portion of the display screen, or a flashing light on the player's gaming device may indicate when the player will or will not be automatically entered into the second game. In various embodiments, a sound effect or tone may indicate when the player stands to be automatically entered into a second game, and when he doesn't.

In various embodiments, the player may readily enter into his GUI a preference as to whether or not to be automatically entered into a second game upon completing a first game. For example, the player may check a box that causes the outcomes of his first game (e.g., a slot machine game) to be automatically entered into a second game (e.g., a lottery-type drawing). However, after playing 10 games, the player may decide he no longer wishes to be entered automatically into the second game following the completion of the first game. As such, the player may uncheck the box. The player may indicate a desire to be entered automatically or not in many other ways. For example, a button or a switch on the player's device may toggle the device between a state where the player is entered automatically into the second game and a state where he is not.

In various embodiments, the player may configure his device (e.g., his gaming device), to automatically enter him into the second game conditional on the occurrence of some outcomes. For example, if the player is playing a game of video poker, the player may wish that only hands with the ranking of "flush" be entered into the second game. Thus, if the player achieves a flush in the first game, the hand may be automatically entered into the second game. However, if the player does not achieve a flush in the first game, then the player may receive no entry into the second game following the first game.

In various embodiments, when the player has been entered into a second game, a message or other text may appear on his display screen (e.g., on his GUI). The message may inform the player that he has been entered into the second game.

In various embodiments, when a player begins a first game, bets for both the first game and for the second game may be deducted from the player's credit balance. In this way, money is not later automatically deducted from the player. Rather, the player consciously chooses at the outset to bet in both the first and the second game. If the player wanted to, the player could bet only in the first game.

In various embodiments, a jackpot, such as a progressive jackpot, may receive as contributions portions of bets made from automatic play. Thus, automatic play may cause a jackpot to grow in size. Players who participate in automatic play may also have the opportunity to win the jackpot, such as the progressive jackpot. Thus, players may have additional incentive to engage in automatic play.

In various embodiments, a particular area of a casino includes facilities to allow secondary players to monitor primary players at one or more games throughout the casino, or at one or more games beyond the casino. The area of the casino may include one or more monitors. Such monitors may be small or large. Large monitors, for example, may be visible to multiple secondary players. Small monitors may be visible to individual secondary players. Further, the individual players may customize the small monitors so as to view the primary player of interest, a statistic of interest, a game of interest, or anything else of interest. The monitors may display various information. Monitors may display video feeds from games. For example, a monitor may show a video feed of a blackjack game which is in progress. Monitors may recreate game outcomes. For example, a monitor may show a rendition of a slot machine game that has been or is being played by a primary player. Monitors may also show statistics. For example, a monitor may show the total amount of money won by a primary player in the last hour, the number of times a particular dealer has busted in the past half hour, the number of consecutive times red has come up at the roulette wheel, and so on. In various embodiments, a monitor may show betting rules, odds, payout ratios, and other information which may apply to bets made by the secondary player. For example, a monitor may indicate that a secondary player can win a payout at odds of 1:1 by for betting that a primary player will get red in roulette, and that the secondary player can win a payout at odds of 16:1 for betting that a primary player will get red four times in a row at roulette.

In various embodiments, an area of the casino may include facilities for betting on one or more games being monitored. For example, terminals may allow secondary players to place bets on a game, e.g., on a game which is being monitored. The terminal may include keys, acceptors for charge cards (e.g., for credit cards or debit cards), acceptors for currency or gaming chips, acceptors for cashless gaming tickets, keys or buttons for entering betting information (e.g., for entering an amount to bet; e.g., for choosing a game on which to bet), and any other facilities or interfaces for allowing bets. A terminal may include a monitor. The monitor may be used to display betting information to a secondary player, to show the secondary player the game on which he is betting, to show the secondary player how much money he has won, and to show the secondary player any other information related to his bet or otherwise relevant to the player.

In various embodiments a betting area for secondary players to bet on and monitor the games of primary players may have the appearance of a sports book.

Various Embodiments

Terms

As used herein, the term "viewing window" includes an area of a gaming device at which symbols or outcomes are visible. The area may, for instance, include a pane of glass or other transparent material situated over reels of the gaming device. Thus, only the portion of the reels under the transparent material may be visible to the player. A viewing window may include a display screen, in some embodiments. The symbols or outcomes visible in the viewing window may include the symbols or outcomes that determine the player's winnings.

Encryption

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back into plaintext. An example of an asymmetric key algorithm is the RSA algorithm.

It will be appreciated that other methods besides encryption may be used to hide or obscure information, such as encoding or steganography. Such methods may also be used in conjunction with cryptography.

Encryption may be used to:

Send a message only specific recipients can read. For example, Alice and Bob may both be in possession of the same secret key. Alice may encrypt a plaintext message with the secret key. She may transmit the resultant ciphertext to Bob. Bob may then decrypt the cyphertext using the secret key so as to view the plaintext version of the message.

Allow messages to be encrypted by many and decrypted only one (e.g., PGP). For example, Alice may possess a public and a private key. Bob may wish to send Alice a message that only Alice will be able to read. Bob may create a message in plaintext and encrypt it using Alice's public key. Bob may send the resultant ciphertext to Alice. Alice may then decrypt the ciphertext using her private key and may thereby view the plaintext message. Should Cindy intercept the ciphertext message on its way from Bob to Alice, Cindy would not be able to decrypt the message since Cindy would not have access to Alice's private key. Alice's public key, although available to Cindy, would not be sufficient to decrypt the ciphertext message in a practicable amount of time.

Authenticate the sender of a message. This use of encryption may include having the sender create a digital signature. For example, Alice would like to send a message to Bob in such a way that Bob can be confident that the message has come from her. Alice may construct a plaintext message and encrypt the plaintext into ciphertext using her private key. Alice may then send the ciphertext message to Bob. Bob may then use Alice's public key to decrypt the ciphertext back into plaintext. Since Alice's public key only works to decrypt a ciphertext message created using Alice's private key, and since presumably only Alice has access to her own private key, Bob can be confident that the message originated from Alice.

Allow for non-repudiation. If a sender has applied a digital signature to a message, or portion of a message, then the sender will not later be able to claim he did not send the message.

Guarantee a time/data sent. See hashing below.

Guarantee receipt by recipient. See hashing below.

Verify that a message has not been altered after being sent by the sender. See hashing below.

Hashing is a process whereby input data, typically of arbitrary length, is transformed into output data, typically of shorter length and/or of fixed length. A hash function is a function that performs the transformation. Often, useful hash functions will be one-way functions. That is, for a given input, the output can be computed readily. However, for a given output, the input which produced the output will be difficult to calculate. Also, useful hash functions will often have the property that two differing inputs rarely produce the same output. Hashing can be used for the following purposes:

To perform data redundancy checks. For example, a database may contain a large number of names. The names may be of arbitrary length. To check for redundant names, hash values for the names may be created. The hash values may be of smaller size than the names and may all be of the same length. Thus, it may be easier to compare the hash values of the names than it will be to compare the names themselves.

To verify that a message has not been altered. For example, Alice can send a plaintext message to Bob along with a hash value of the message. Alice can apply a digital signature to the hash value so as to assure Bob that the hash value has been sent by Alice. When Bob receives the plaintext message from Alice, Bob can compute the hash value of the message. If the hash value that Bob computes is the same as the hash value that Alice has sent to Bob, then Bob can be fairly confident that the message has not been altered enroute from Alice to Bob.

To prove possession of a message without having to reveal the message. For example, Alice can send a message to Bob. Bob can take the hash of the message and send it back to Alice. Alice may thus be assured that Bob has the message without the risk of the message being intercepted enroute from Bob to Alice.

To prove possession of a message at a certain time without having to reveal the message. For example, Alice might have a great idea and wish to prove she came up with it at a certain time without having to reveal the idea. Thus, Alice might write out the idea in the form of text and take a hash value of the text. Alice can then publish the hash of the text in a newspaper. It will then be readily apparent that Alice had possession of the idea at least on the date of the newspaper's publication.

To timestamp a document. For example, a document may be sent to a time-stamping service. The service may then determine the hash value of the document. The service may append the then current date and time to the hash value of the document and apply a digital signature to the result. The digitally signed hash value plus date and time may then be published. So long as the time-stamping service can be trusted to provide accurate dates and times (e.g., not to use old dates and times) then the published timestamp may serve as proof that the document was in existence as of the date and time provided by the time-stamping service. Further precautions may ensure that it becomes very difficult for even the time-stamping service to provide fake times and dates. For example, the time-stamping service may add a sequence number, (e.g., 1, 2, 3, etc.) to each document it timestamps. If the service wishes to provide an old date, the service would have to find an older sequence number. The older sequence number would have to fit between two sequence numbers used immediately before and immediately after the desired fake date. However, no such sequence number would be available if, e.g., no numbers had been skipped in the first place.

Figure 48:
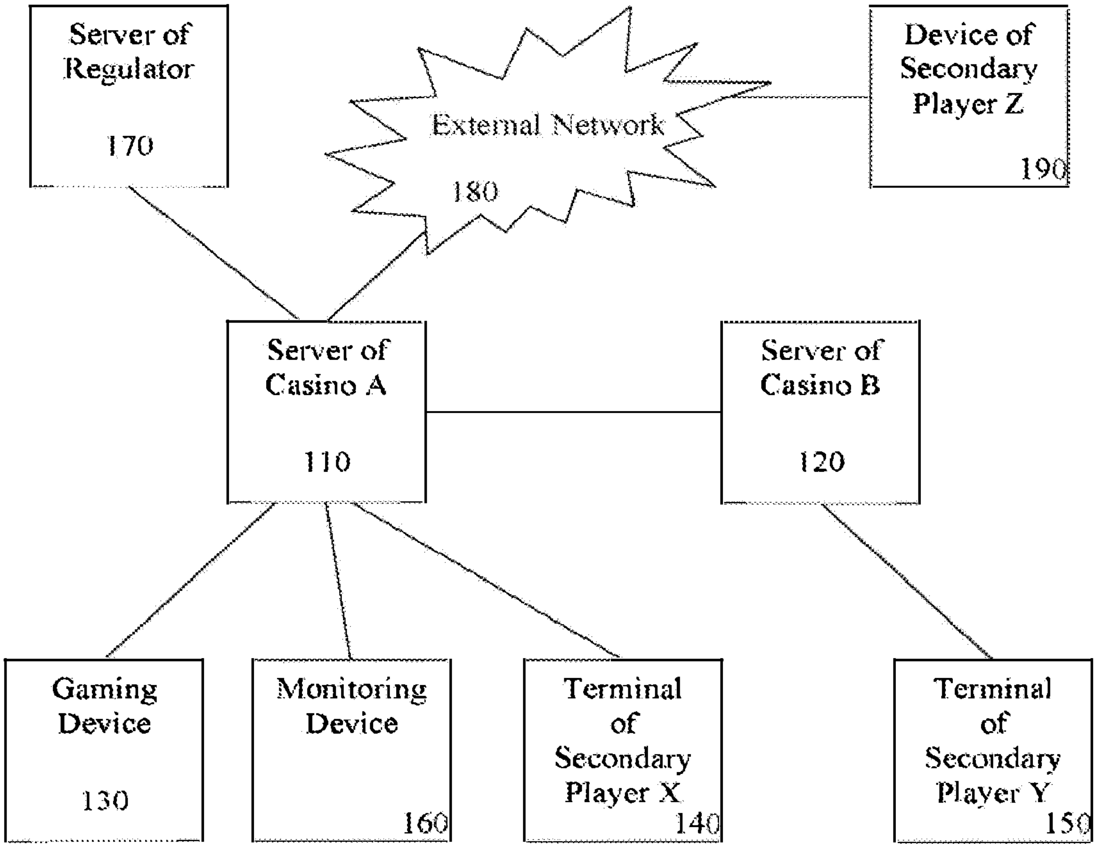
FIG. 48 shows a system according to some embodiments.

FIG. 48 shows a system according to some embodiments. According to some embodiments, Casino A and Casino B may represent facilities where participation in games of chance or in other contests is permitted. In various embodiments, in Casinos A and B, players may place bets on games or contests, and/or may win or lose money based on games or contests. The system of FIG. 48 may permit secondary players in Casino A and secondary players in Casino B to participate in the games of primary players who are at Casino A. Further, the system of FIG. 48 may permit a secondary player outside of Casinos A or B to participate in games of primary players at casino A. Further, the system of FIG. 48 may permit regulators to track various data related to the games of primary players played at Casino A, to the participation in games by secondary players who are at Casino A, to the participation in games by secondary players who are at Casino B, and to the participation in games by secondary players who are at neither Casino A nor Casino B. According to some embodiments, Casino A may include a server 110. The server may be in communication with a gaming device 130, a monitoring device 160, and a terminal of secondary player X 140, each of which may lie within the premises of Casino A. Server 110 may further be in communication with server 120 of Casino B, with a server of a regulator 170, and with a device of a secondary player Z 190, where the secondary player device 190 is not located on the premises of Casino A nor Casino B. Communication between server 110 and the device 190 may occur through an external network 180, e.g., through the Internet. Casino B may include a server 120 which is in communication with server 110, with the server of a regulator 170, and with a terminal of secondary player Y 150, which may lie within the premises of Casino B.

In some embodiments, the server of Casino A 110 may receive data about a game from gaming device 130 or from monitoring device 160. A monitoring device may include a device such as a camera or microphone which may monitor a game at Casino A and transmit data about the game to the server of Casino A. The server of Casino A may transmit data received from gaming device 130 or monitoring device 160 to the terminal of a secondary player X 140 so as to allow the terminal 140 to recreate the game, to accept bets from secondary player X on the game, and to pay winnings to secondary player X based on the game.

The server of Casino A 110 may further transmit received data about a game to the server of Casino B 120. The server of Casino B may, in turn, transmit such data to the terminal of a secondary player Y 150 so as to allow the terminal 150 to recreate the game, to accept bets from secondary player Y on the game, and to pay winnings to secondary player Y based on the game.

The server of Casino A 110 may further transmit received data about a game to the device of secondary player Z 190, e.g., through the Internet. The device of secondary player Z 190 may, in turn, recreate the game for secondary player Z, receive bets on the game from secondary player Z, and/or credit winnings to secondary player Z based on the game.

The server of Casino A 110 may further transmit received data about a game to the server of the regulator 170. Such data may allow the regulator to monitor the fairness of games, to watch for illegal gaming, to track taxable income of the casino, or to perform any other desired function.

In various embodiments, the terminal of secondary player X 140 may transmit to the server of Casino A 110 data about the activities of secondary player X at the terminal. Further, the terminal of secondary player Y 150 may transmit to the server of Casino B 120 data about the activities of secondary player Y at the terminal. The server of Casino B 120 may transmit such data to the server of Casino A 110. Further, the device of secondary player Z 150 may transmit to the server of Casino A 110 data about the activities of secondary player Z at the device. Data received by the server of Casino A 110 from terminals 140 and 150, and from device 190 may allow the server of Casino A to tracking winnings and losses of secondary players X, Y, and Z; to determine which data (e.g., data about which games) to transmit to the terminals or device; to determine an amount owed to Casino A by Casino B for use of data from Casino A; and so on. Further, data received by the server of Casino A 110 from terminals 140 and 150, and from device 190 may be forwarded to the server of the regulator 170. The regulator may use such data to track the bets of secondary players, to check for illegal gambling, to monitor the fairness of games, etc.

It should be appreciated that the system of FIG. 48 represents a system according to some embodiments, and that other servers, devices, terminals, networks, and communication links may be present in various embodiments.

Figure 49:
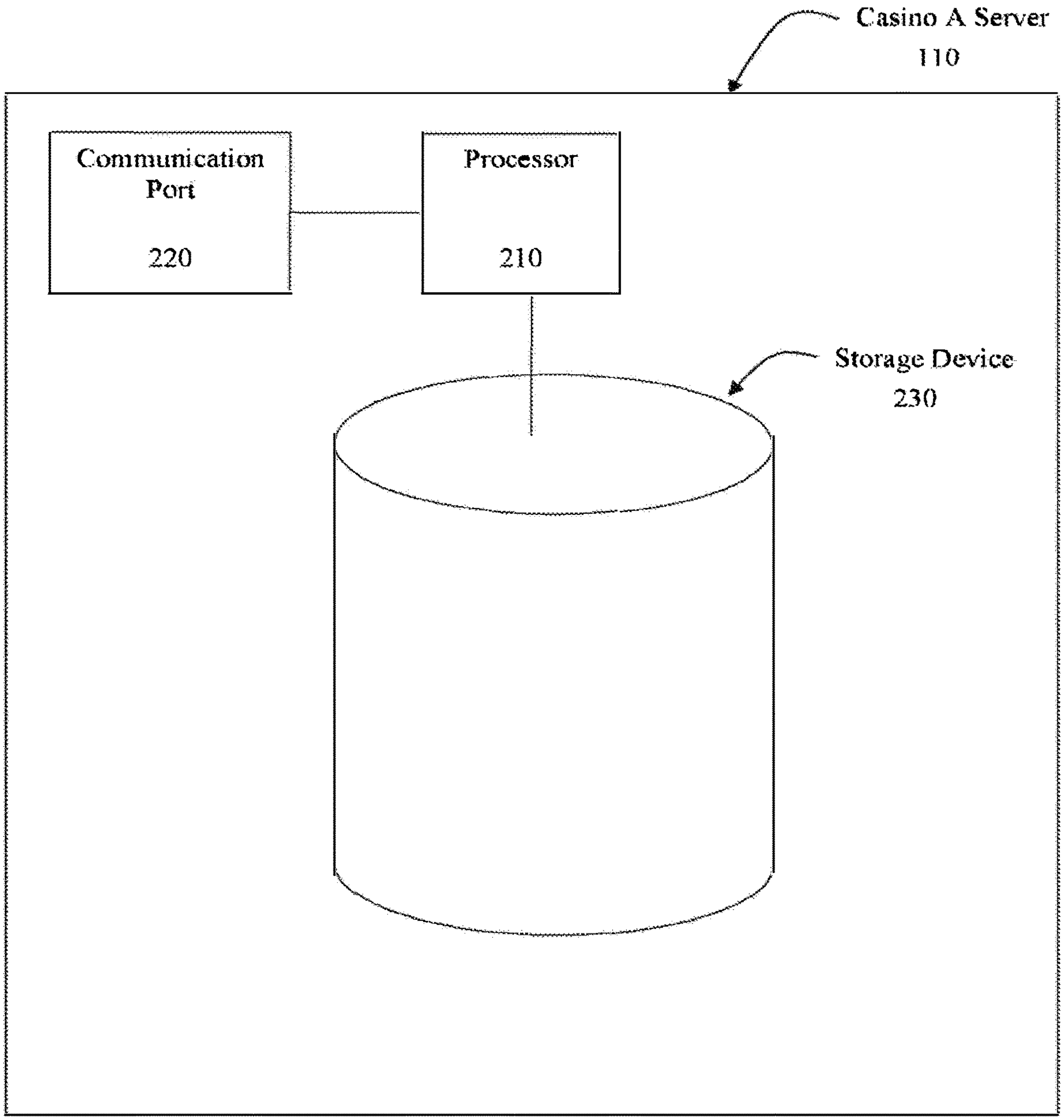
FIG. 49 shows a casino server according to some embodiments.

FIG. 49 shows the Casino A server according to some embodiments. In various embodiments a similar server may constitute the Casino B server, or the server of any other casino. The storage device 230 may store program data. The program data may be used to direct the processor 210 to execute algorithms in accordance with various embodiments. The storage device 230 may store other types of data. Such data may include data received from the play of games; data that can be used to recreate games; data describing bets, wins, and loss of primary and secondary players; data describing the current locations or activities of primary or secondary players; data describing amounts owed to a casino; and so on. Communication port 220 may be used to transmit and/or to receive data. Communication port 220 may include an antenna, a wireless transmitter, a signal generator, a router, or any other communication device. Any data transmitted or received may be stored, at least at some point, in storage device 230.

Figure 50:
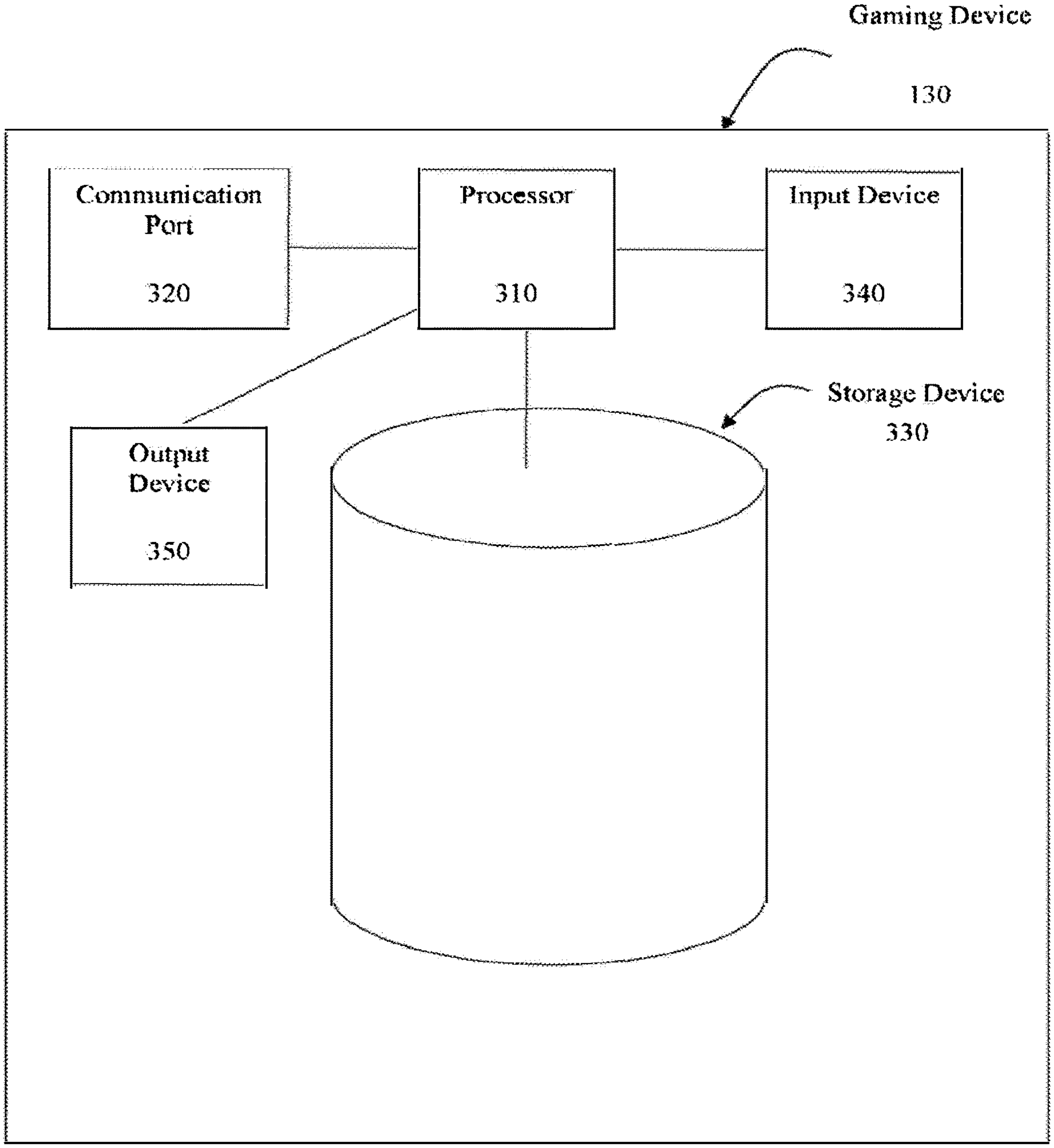
FIG. 50 shows a terminal for use by a secondary player, according to some embodiments.

FIG. 50 shows a gaming device 130 according to some embodiments. The storage device 330 may store program data. The program data may be used to direct the processor 310 to execute algorithms in accordance with various embodiments. Program data may include data used to generate graphics, to determine game outcomes, to compute winnings, and so on. The storage device 330 may store other types of data. Such data may include data describing bets, wins, and losses by a primary player at gaming device 130. Input device 340 may include sensors, buttons, touch screens, microphones, bill validators, coin acceptors, card readers, and any other means by which a primary player or other party may interact with gaming device 130. For example, the input device 340 may include a "bet" button.

The output device 350 may include display screens, microphones, lights, coin dispensers, buzzers, and any other means by which a gaming device may provide a signal to the secondary player. The communication port 320 may be used to transmit and/or to receive data.

Figure 51:
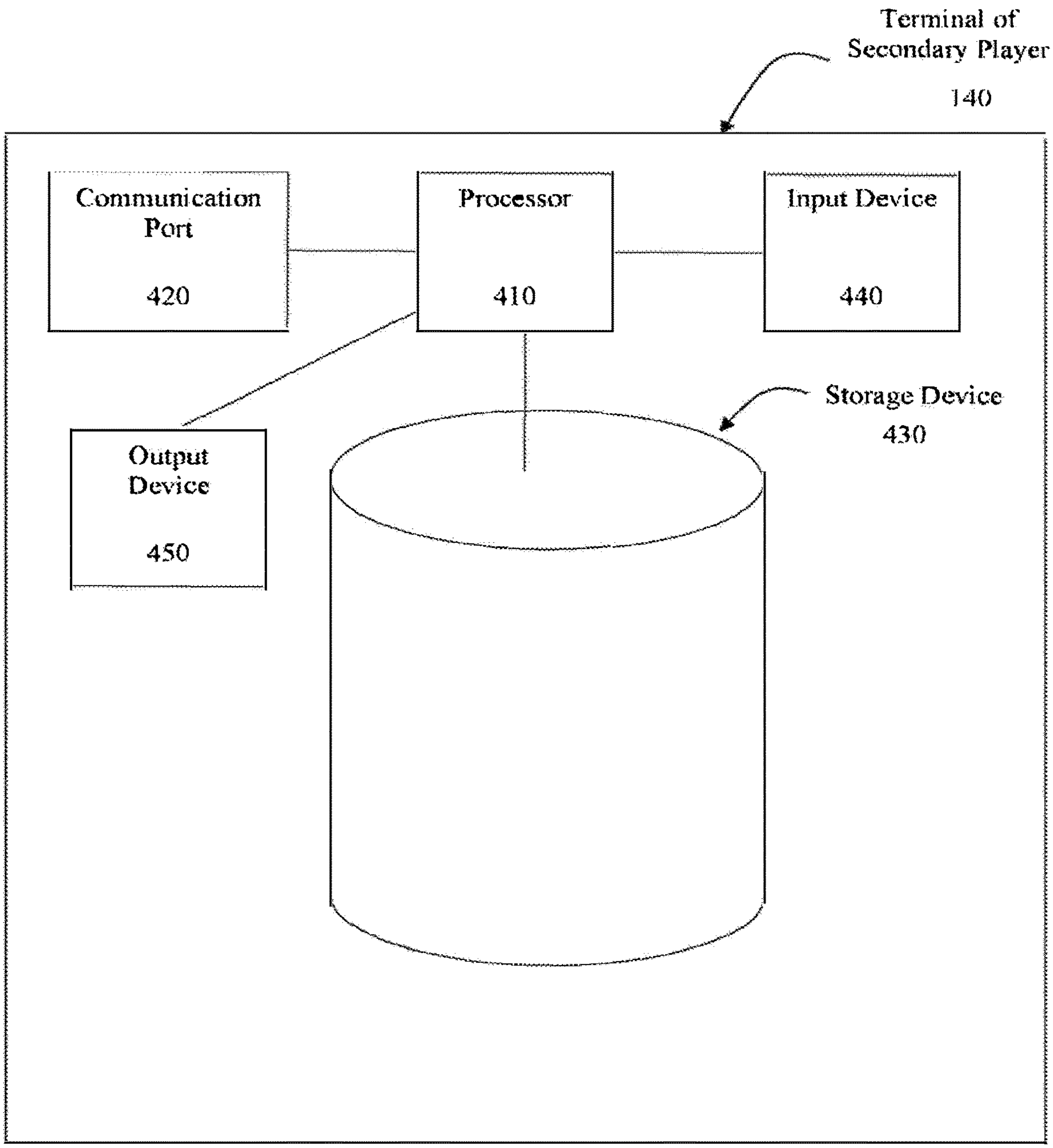
FIG. 51 shows a gaming device according to some embodiments.

FIG. 51 shows a terminal 140 for use by a secondary player, according to some embodiments. The storage device 430 may store program data. The program data may be used to direct the processor 410 to execute algorithms in accordance with various embodiments. Program data may include data used to a recreate games or depictions of games based on data received about original games. Program data may include data used to generate graphics, to display game outcomes, to compute winnings, and so on. The storage device 430 may store other types of data. Such data may include data describing bets, wins, and losses by a secondary player at terminal 140. Input device 340 may include sensors, buttons, touch screens, microphones, bill validators, coin acceptors, card readers, and any other means by which a secondary player or other party may interact with terminal 130. For example, the input device 340 may include a "bet" button.

The output device 350 may include display screens, microphones, lights, coin dispensers, buzzers, and any other means by which terminal 140 may provide a signal to the secondary player. The communication port 320 may be used to transmit and/or to receive data.

Figure 52:
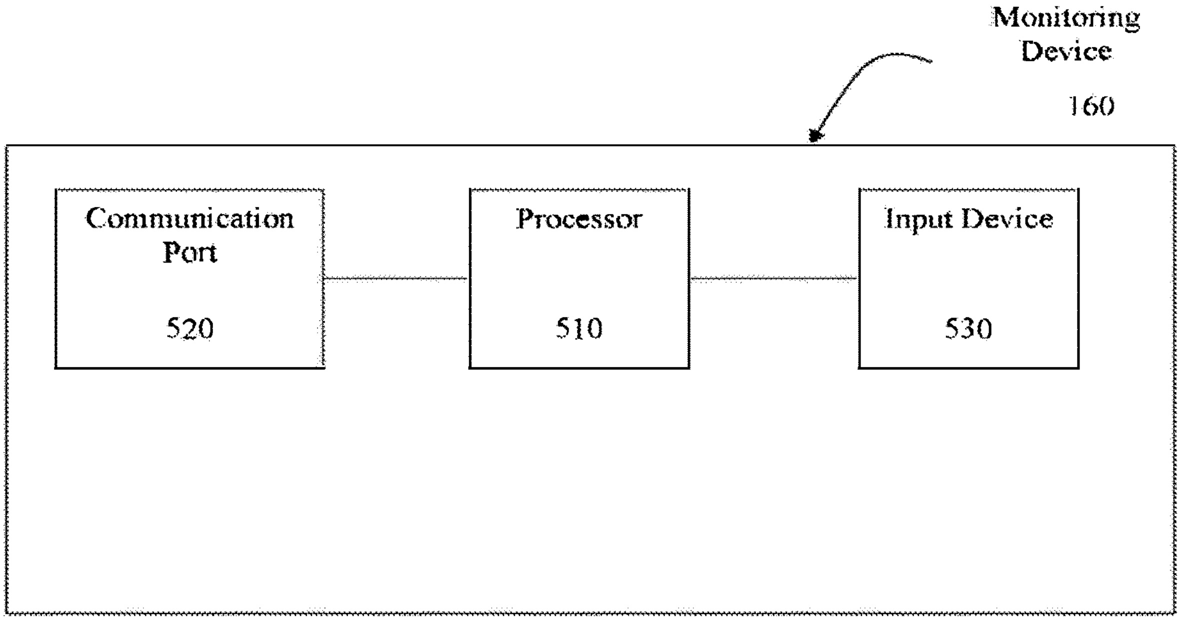
FIG. 52 shows a monitoring device (e.g., camera, card reader) according to some embodiments.

FIG. 52 shows a monitoring device 160 according to some embodiments. The monitoring device may receive data about a game via input device 530. The input device 530 may include a camera, microphone, pressure sensor, bar code scanner, sensor, button, and so on. For example, an input device may include a camera that is pointed at a table where a game of blackjack is being played. For example, an input device may include a camera that is pointed at the viewing window of a slot machine. Communication port 520 may be used to transmit data received by the input device to e.g., a casino server. In various embodiments, the monitoring device may serve multiple purposes, some of which may not involve receiving data about a game. For example, a monitoring device may include a camera which also serves security purposes at casinos.

Figure 53:
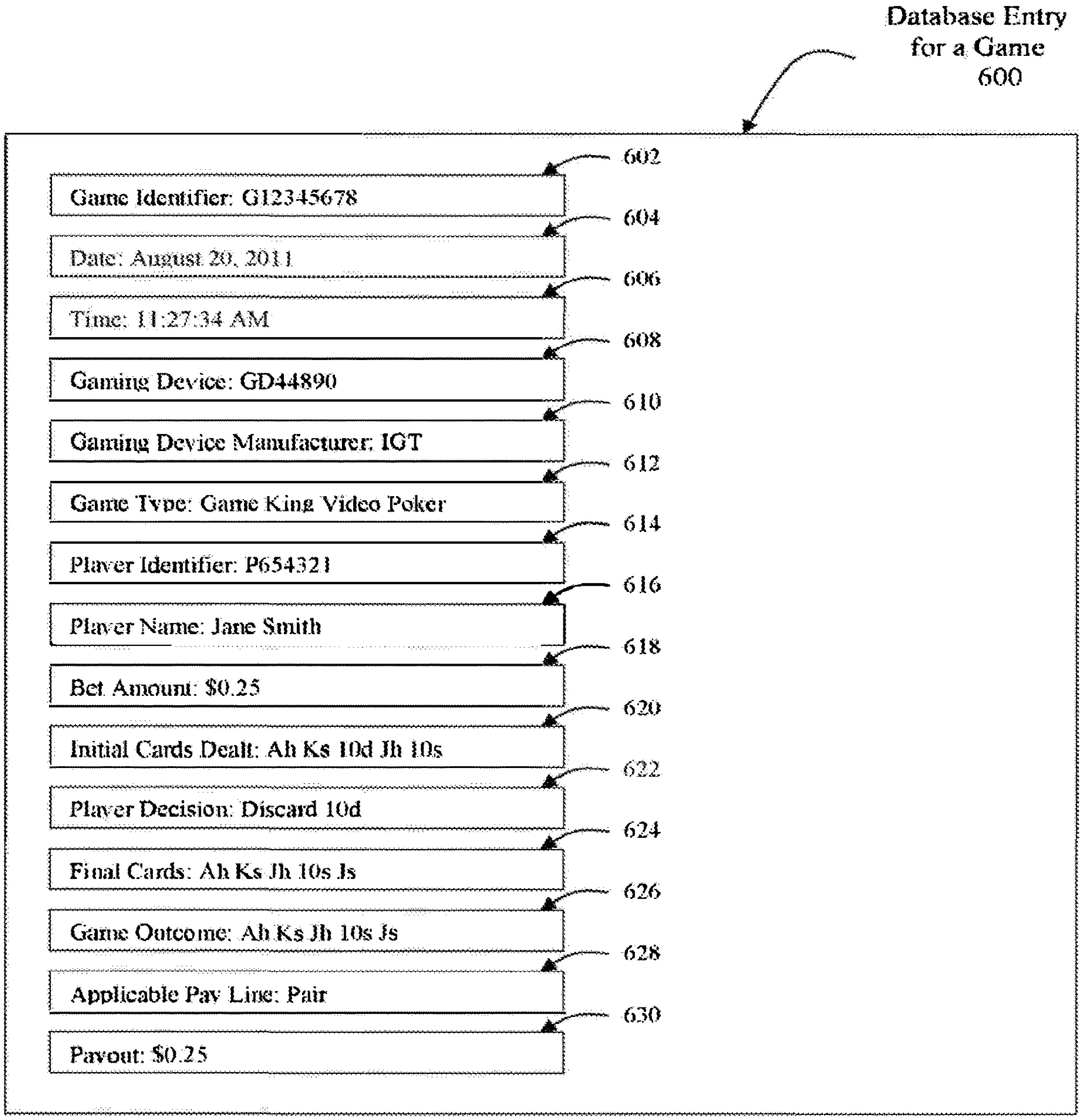
FIG. 53 shows a database entry including various information about a game (e.g., date, time, outcome, player, bet amount)

FIG. 53 shows a database entry 600 including various information about a game. The database entry may store various aspects of a game played by primary player (e.g., by Jane Smith). Such data may later be used to allow a secondary player to participate in the game.

FIG. 54 shows a database entry 700 including various games played by a player. The player may be a primary player. The data in database entry 700 may allow a secondary player to examine historical data about the games of a primary player (e.g., about the games of Sam Hunter), including statistics about the games (e.g., the profits made in the last 100 games).

Figure 55:
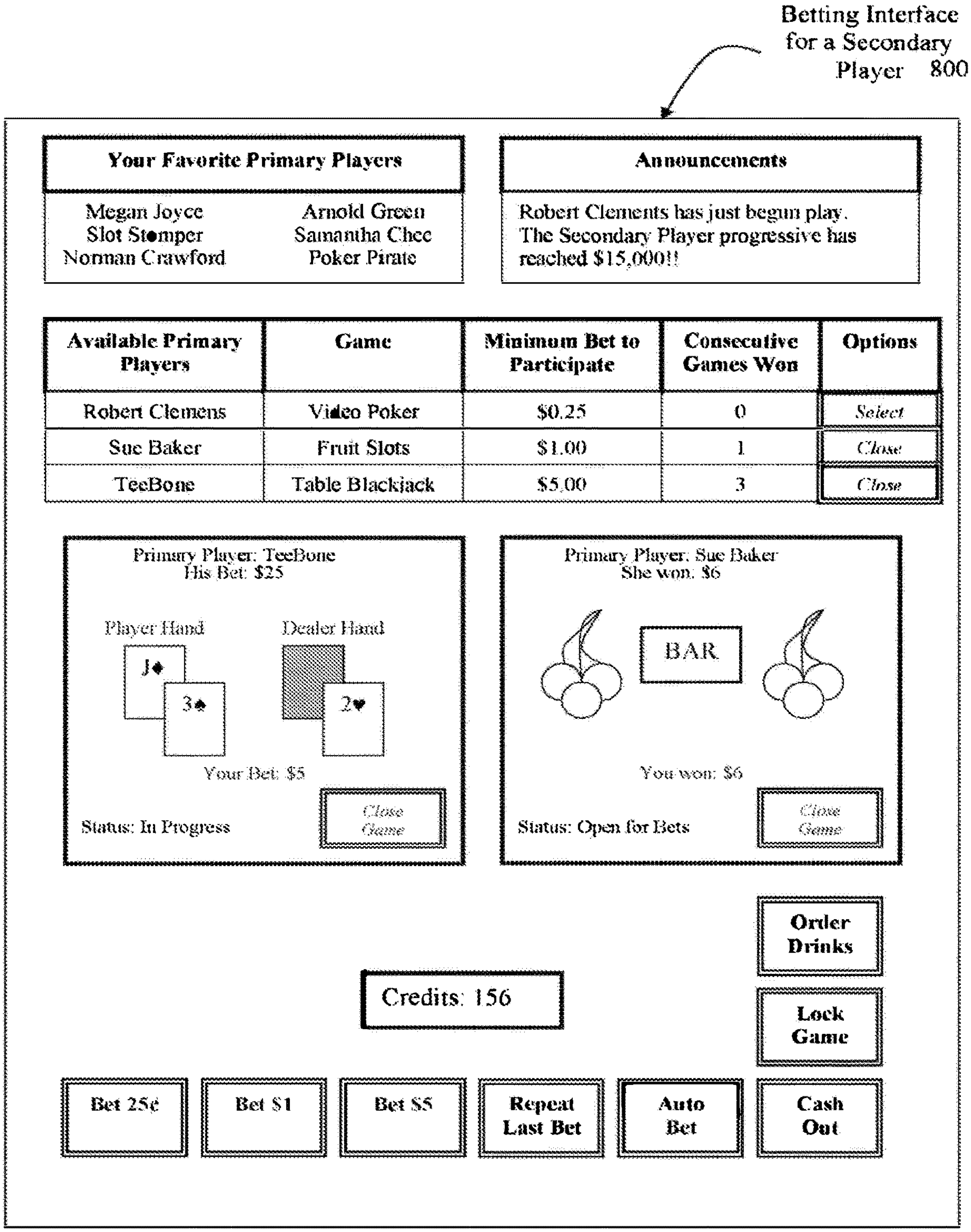
FIG. 55 shows a touch screen display for entering betting information and tracking the progress of a game, according to some embodiments.

FIG. 55 shows a display screen for entering betting information and tracking the progress of a game, according to some embodiments. The display screen may be sensitive and/or responsive to touch and may thereby function as a touch screen, in some embodiments. One area of the display screen lists the favored primary players of the secondary player currently viewing the display. Presumably, the secondary player has logged in or otherwise identified himself to the terminal or device to which the display belongs. The secondary player may have previously indicated his favored primary players. The casino may thus track the whereabouts of the favored primary players and alert the secondary player when a favored primary player begins play.

Another area of the display screen includes an announcements area. The casino may make announcements to the secondary player. Such announcements may include promotional announcements. For example, such announcements may include announcements of discounts at casino or other restaurants, announcements of discounts on shows, announcements about upcoming concerts or boxing matches, announcements about discounts on hotel rooms, and so on. Announcements may include promotions for other products, such as automobiles, toothpaste, or plane flights to the Caribbean. Announcements may further include announcements about primary players in which the secondary player may be interested. For example, an announcement may indicate that a favored primary player of the secondary player has just begun play.

Another area of the display screen includes a list of primary players that are available in the sense that the secondary player may participate in the games of these primary players. This display area may identify the primary player, either by real name or by an alias, such as "Tee-Bone." The alias may allow a primary player to maintain some anonymity or privacy. This display area may further indicate a game which the primary player is playing (and thus the game the secondary player would be participating in), a minimum bet required of the secondary player to participate in the game, and one or more statistics related to the primary players. For example, statistics may indicate a number of consecutive games won by the primary players. This display area may further include areas where a secondary player can touch in order to begin participating in the games of a primary player. For example, by touching an area labeled "select" next to primary player Robert Clements, the secondary player may begin participating in the games of Robert Clemens.

Another area of the display screen includes windows where a secondary player may track the progress of games in which he is participating. FIG. 55 depicts a first window where the secondary player can follow the game of primary player "TeeBone", in whose game the secondary player is participating. The game is blackjack, and the secondary player has a bet of $5 riding on the game. The game is currently in progress. FIG. 55 depicts a second window where the secondary player can follow the game of primary player Sue Baker. The game is a slot machine game. The game has just finished with an outcome of "cherry-bar-cherry." The secondary player has just won $6 on the game. Now, the secondary player has the opportunity to place bets on the next game, as indicated by the status "open for bets".

Another area of the display screen includes a display of the credit balance of the secondary player. These credits may be used to bet on games in which the secondary player is participating. Each credit may correspond, for example, to $0.25 in value. The secondary player may place bets using the betting areas of the display screen, including a "Bet 250" area, a "Bet $1" area, a "Bet $5" area, a "Repeat Last Bet" area, and an "Auto Bet" area. When touched, such areas may apply to only the game which has a status of "Open for Bets." For example, touching the "Bet 1" may cause a bet of $1 to be placed on the game of Sue Baker, since it is that game which has the status of "Open for Bets". In this way, there need not be a separate set of betting buttons for every game in which the secondary player is participating. The "Repeat Last Bet" area may allow the secondary player to easily repeat a prior bet that may take extra effort to enter using the other betting areas. For example, rather than touching the "Bet $1" area 4 times to enter a $4 bet, the secondary player might simply touch the "Repeat Last Bet" area to repeat a prior bet of $4. The "Auto Bet" area may allow the secondary player to continue making the same bet on each new game, for example, without having to always enter a bet. In some embodiments, the secondary player may program in a particular betting strategy and then touch the "Auto Bet" area to have the strategy executed automatically by the terminal of the secondary player. The "Lock Game" area may allow the secondary player to prevent access to the terminal by other secondary players while he steps away for a break. The "Order Drinks" area may allow the secondary player to order drinks or other items and have them delivered to his terminal without ever leaving.

As will be appreciated, the various areas of the touch screen that allow touch interaction may also be implemented using ordinary buttons or any other interactive technology.

It should be appreciated that the figures do not necessarily show everything that might be included in a system, object, machine, device, etc. For example, although not shown in FIG. 50, gaming device 130 may include a coin hopper.

1. One player bets on the outcome of a game of another player. For example, one player bets on whether a winning outcome will be achieved in the game of another player. For example, one player bets on whether another player will win. In various embodiments, one player may place a bet and either win or lose money based on the results of a game played by another player. As used herein, "primary player," "primary players," and the like, may refer to a player or players who most directly participate in a game, such as a casino game. A primary player may, for example, be physically located at a slot machine and may participate in a game at the slot machine by inserting a coin, indicating a bet amount, and pulling a handle of the slot machine. A primary player may also be physically located at a table game, such as a game of blackjack with a live dealer. In various embodiments, a primary player directly initiates a game in which he participates, e.g., by pulling the handle of slot machine or physically placing a bet at a table game and motioning to a dealer that he is interested in playing. In various embodiments, a particular game would not occur but for the actions of the primary player.

As used herein, "secondary player," "secondary players," and the like, may refer to a player or players who participate or may come to participate in games played by primary players or by other secondary players. For example, a secondary player places a bet on a game in which a primary player is involved. The secondary player wins if the primary player wins, and the secondary player loses if the primary player loses. In another example, a secondary player places a bet for a game that has already occurred. When placing the bet, the secondary player does not know the outcome of the game. Once the secondary player has placed the bet, the outcome of the game may be revealed to the secondary player, and the secondary player may be paid if the outcome is a winning outcome. In another embodiment, secondary player A places a $10 bet on secondary player B, betting that secondary player B will win a game on which secondary player B has placed a $20 bet. If secondary player B wins the $20 bet, then secondary player A will win the $10 bet. In various embodiments, the secondary player does not initiate the game in which he participates. In various embodiments, a game in which the secondary player participates would occur whether or not the secondary player chose to bet on the game. The game in which a secondary player participates may be initiated by a primary player or may be initiated automatically, e.g., by a computer program.

Wherever data is used herein, it should be understood that such data may be stored, such as in a database or in any other suitable medium, format, or data structure. Data may be stored in either a fixed location or throughout distributed locations. Data may be stored either in a single location or in multiple locations (e.g., in multiple redundant locations). The data may be retrieved as needed from its storage location. When data is generated but not immediately needed, such data may be stored for later retrieval. Data may be accessible by reference to any part of the data, including any tag or label associated with the data. For example, if some data elements of a set of data elements are known, the remaining data elements from the set of data elements may be retrieved based on the known data elements. For example, the known data elements may serve as a search key for finding the remaining data elements in the set of data elements.

In all applicable embodiments described herein, any data generated, transmitted, stored, retrieved, or used may also be stored for auditing purposes. Such data may be made available to regulators to casinos (e.g., to casinos generating the data; e.g., to casinos using the data), or to any other relevant party. Data that may be stored may include data describing the size of a bet made by a primary player on a game, the type of bet made by a primary player on a game, intermediate events that occurred during a game (e.g., rolls prior to the final roll in a game of craps), the date of a game, the decision options that were available in a game (e.g., hit, stand in blackjack), the decisions that were made in a game, the outcome of a game, the amount paid to the winner of a game, and so on.

In various embodiments, data may be collected and stored relating to any searches of game related data. For example, suppose a secondary player searches for all games in which a payout of more than 100 coins was won. Accordingly, data indicating the search criteria may be stored so that it may be possible to determine in the future that a secondary player searched for all games in which a payout of more than 100 coins was won. Further data describing the results of a search may be stored. For example, if the search by the secondary player yielded 1218 games, then this fact may be stored. Further identifiers for each game identified by the search may be stored.

1.1. One player places bets on a game in which another player participates. In various embodiments, a secondary player may place a bet on the outcome of a game itself. For example, a secondary player may place a bet on the outcome of a slot machine game. If the outcome "bar-bar-bar" occurs in the game, then the secondary player may receive ten times his bet. The secondary player need not, in various embodiments, place the same type of bet as does the primary player. For example, the primary player may initiate a craps game with a "pass" bet. The secondary player may bet on the same craps game but may place a "don't pass" bet. Thus, though the secondary player and the primary player have placed bets on the same game, the primary player may lose, and the secondary player may win.

1.2. One player places bets on how another player will do. In various embodiments, a secondary player may place a bet on what will happen to a primary player in a game. The secondary player does not, in various embodiments, bet on the outcome of the game itself, but only on how the outcome of the game affects the primary player given the primary player's bet on the game. For example, the secondary player may bet that the primary player will win the game. If the primary player wins, then the secondary player's bet may be a winning bet and the secondary player may receive a payment. If, however, the primary player loses, then the secondary player may lose.

In various embodiments, the secondary player may bet that the primary player will lose. The secondary player may thus receive a payment for a winning bet if the primary player loses, but the secondary player may lose his bet if the primary player wins.

It should be noted that often, a bet placed by a primary player will provide the house or casino with an advantage. This is how the house may make money, on average. Thus, if a secondary player is permitted to place a bet against a primary player, then the secondary player may enjoy the same advantage as the house. In various embodiments, the secondary player may be charged a fee for betting against the primary player. The fee may provide the house with an advantage in a bet that might otherwise favor the secondary player. The fee may be a flat fee. The fee may be a percentage of the secondary player's bet. The fee may be taken only from payments of winnings received by the secondary player. For example, if the secondary player wins a payment of $10 based on a $10 bet placed, 50 cents may be deducted from the payment and kept by the house.

In various embodiments a fee charged to the secondary player may be set at an amount which provides to the house the same advantage as the house had against the primary player. As used herein, a "house advantage" or "house edge" may be defined as a ratio of the expected amount won by a casino to the initial amount bet by a player. Suppose that a house advantage on a game is 1.41%. Thus, a primary player who bets $1 could expect to receive $0.98.59 back, on average. Further, suppose that a primary player initially bets $1 and may receive back $0 (for a net loss of $1) or may receive back $2 (for a net gain of $1). An exemplary such bet would be a $1 pass bet in the game of craps. The secondary player, in this example, may bet $1 against the primary player. The secondary player would then expect to receive back $1.01.41, on average. In order to give the house the same advantage against the secondary player that it had against the primary player, the secondary player may be charged a fee of $0.02.82. This fee may be rounded to $0.03 or may be varied over a large number of secondary player bets so as to average out to $0.02.82. With the fee taken into account, the secondary player might expect to receive $0.98.59 back per dollar bet, providing the house with the same advantage against the secondary player as it had against the primary player.

In various embodiments, the secondary player may not be allowed to take exactly the opposite position as does the primary (e.g., where all wins for the primary player are losses for the secondary player, and vice versa). In various embodiments, an outcome that causes the primary player to lose may not result in a win for the secondary player, even though the secondary player has bet against the primary player. For example, an outcome of "plum-orange-cherry" may cause the primary player to lose but may also cause the secondary player to lose. In various embodiments, an outcome that caused the primary player to lose may result in a push or tie for the secondary player. In this way, the house may maintain an edge against the secondary player even if the house also had an edge against the primary player. In various embodiments, the outcomes which are losing for the primary player and not winning for the secondary player may be chosen in such a way that the house is given the same advantage over the secondary player that it had over the primary player. For example, suppose that a particular game provides the primary player with the potential to either win $1 net, or lose $1 net. Suppose further that the game has a 2% house edge. Suppose further that outcomes X and Y in the game are both losing outcomes for the primary player. Outcome X occurs with probability 0.03, and outcome Y occurs with probability 0.01. With a bet of $1 against the primary player, the secondary player would ordinarily expect to win $1.02, for an average net profit of $0.02. However, in various embodiments, outcomes X and Y may also be counted as ties for the secondary player. The secondary player's expected payment is then reduced by the probability of X times the amount that would have been won (beyond the bet amount) upon the occurrence of X, plus the probability of Y times the amount that would have been won (beyond the bet amount) upon the occurrence of Y. This reduction is equal to 0.03×$1+0.01×$1=$0.04. The secondary player's expected winnings have thus been brought down from $1.02 to $0.98. This reduction provides the house with the same 2% edge against the secondary player as it had in the original game against the primary player.

In various embodiments, the secondary player may bet against an outcome that would ordinarily be winning in a game. For example, in a game of blackjack, the secondary player may bet that the dealer will win. In various embodiments, the house may then alter the probabilities of various outcomes in the game so as to return an edge to the house. For example, if a secondary player bets on the dealer in a game of blackjack, the house may remove cards with low point values from the deck. This may reduce the probability of a dealer win, and thus may reduce the probability that the secondary player may win when betting on the dealer. In various embodiments, a game where the secondary player bets on the house may not be a game that was actually played by a primary player. Rather, the game may be a game that is or was simulated by the house with probabilities of various outcomes altered from the standard probabilities of the game.

In various embodiments, a secondary player may take the house's position, or approximately the house's position, and bet against a primary player. The secondary player may thereby lose whatever the primary player wins and win whatever the primary player loses. For example, if the primary player loses his bet of $1, then the secondary player may win $1. However, if the primary player wins $10, the secondary loses $10. In order that the house may be sure of collecting $10 from the secondary player in the event that the primary player wins $10, the house may require the secondary player to place a sufficient deposit with the house to cover possible losses of the secondary player. The deposit might come in the form of a credit balance that the secondary player has accumulated (e.g., as a result of inserting bills, or as a result of winning bets), in the form of a financial account that the house is free to charge in order to collect on the secondary player's obligations (e.g., the secondary player may provide a credit card number), in the form of a check that the secondary player has provided to the house, or in any other suitable form. In various embodiments, the house may require a deposit or other commitment from the secondary player equal to the maximum possible payout that may be received by the primary player. For example, suppose the primary player participates in a game in which the primary player may win up to $100. If the secondary player bets against the primary player, then the secondary player may risk losing up to $100 in a game. The house may thus require the secondary player to have a credit balance of as much as $100 in order to bet against the primary player. In various embodiments, the house may require the secondary player to confirm (e.g., by pressing a button) that the secondary player is aware he has the potential to lose up to X amount, where X is the maximum the secondary player might lose from participating in a game.

In various embodiments, a secondary player may bet against a primary player while not mirroring the payouts of the primary player. For example, the secondary player may bet $1 on a game in which the secondary player bets that the primary player will lose. If the primary player does lose the game, the secondary player may receive $1.25, for a net profit of $0.25. If the primary player wins, the secondary player may lose his bet of $1, for a net loss of $1. The secondary player may lose $1 regardless of the amount that the primary player wins. For example, the secondary player may lose $1 whether the primary player wins $1 or whether the primary player wins $100.

In various embodiments, the secondary player may bet that a primary player will win a certain multiple of the primary player's bet in a given game. For example, the secondary player may bet $5 that the primary player will win at least triple the primary player's bet of $2 in a game. The secondary player may win $20 if the primary player wins at least $6. Otherwise, the secondary player may lose his bet of $5.

In various embodiments, the secondary player may be paid according to a table or function that maps every possible result of a primary player to a payment for the secondary player. For example, the secondary player may receive $3 if the primary player wins $0, $5 if the primary player wins $1, $0 if the primary player wins $2, $0 if the primary player wins $3, $1 if the primary player wins $4, and so on. As will be understood, the function need not perform a linear or continuous mapping.

In various embodiments, a secondary player may be forbidden and/or prevented from placing a bet that would provide the secondary player with an edge. For example, a secondary player may be prevented from betting against a primary player, where the house had an edge versus the primary player.

1.3. A player places bets for games from the past. In various embodiments, a secondary player may place a bet on a game that has occurred in the past. With respect to the game, at least one of the following may have occurred in the past (e.g., before the secondary player placed a bet on the game): (a) the game's start; (b) the game's conclusion; (c) collection of a bet from the primary player who played the game; and (d) payment of winnings to the primary player who played the game.

When a game is originally played, a record of the game may be created. The record may include data sufficient to recreate all or part of the game. Such data may include: (a) one or more seeds or random numbers used to generate outcomes for the game; (b) one or more outcomes of the game (e.g., "cherry-bell-lemon"; e.g., a sequence of five cards, such as cards constituting a poker hand; e.g., a set of hands of cards, such as a player hand and dealer hand, or such as a player hand and hands of the player's opponent; e.g., the number or numbers showing on one or more dice, such as in a game of craps; e.g., a sequence of numbers showing on a sequence of dice rolls; e.g., a set of numbers in a game of keno; e.g., the payouts achieved in a bonus round; e.g., the level achieved in a bonus round); (c) one or more symbols comprising an outcome of the game; (d) one or more cards; (e) reel positions for one or more reels of a slot machine; (f) a number of decks used; (g) a decision made by a primary player of the game; (h) one or more algorithms used to generate an outcome of the game; (i) an identifier for the gaming device used in the game; (j) a pay table used for the game; (k) a make, model, or year for the gaming device used in the game; (l) a date or time when the game was played; (m) a location where the game was played; (n) a dealer involved in the game; (o) a position of the primary player at a table used in playing the game; (p) an identifier (e.g., a name) for the primary player who played the game; (q) an identifier of another player in the game (e.g., another player at a blackjack table where the game was played); (r) a bet made by a primary player of the game; (s) winnings received by the primary player in the game; (t) video footage of the game; (u) audio footage of the game;

and (v) an order of cards dealt from a deck of cards. Video footage of the game may include video footage from various perspectives. In some embodiments, video footage may show or focus on cards, dice, or reels, or other items which determine and/or reveal the outcome of a game. Video footage may include footage of actions in a game, such as footage of a player making bets, making decision, and/or collecting winnings. Such video footage may focus on a player's hands, for example. In some embodiments, video footage may show or focus on a dealer or other casino representative in charge of a game. In some embodiments, video footage may show or focus on a player's face or body. For example, video footage may show a player's facial expressions or body language during a game. In some embodiments, video footage may focus on spectators. In some embodiments, video footage is recorded from a live game. In some embodiments, video footage is generated. Video footage may be generated based on stored data about a game.

Video footage may be generated in a number of ways. In some embodiments, video footage may be generated by assembling stock video clips. For example, one stock video clip may show a primary player (e.g., an actor acting as a primary player) making a bet. Another stock video clip may show a primary player rolling the dice. There may be stock video clips of every possible outcome in a game. For example, there may be a stock video clip showing every possible roll of two dice. To assemble video footage of a complete game, the casino may e.g., put together a video clip of a bet being made, a video clip of an outcome being rolled corresponding to the outcome that actually occurred in the original game the secondary player is betting on, and a video clip of a player collecting his winnings. In some embodiments, stock video footage may include video footage of entire games. Should a similar game later occur, the same video footage may be used for the similar game when the secondary player is participating in the similar game.

In some embodiments, video footage is generated using computer algorithms. For example, computer algorithms may generate footage showing a simulated primary player placing a bet and rolling dice, the dice bouncing and landing, a simulated croupier paying winnings, and so on. In various embodiments, video may be generated so as to be true, as much as practicable, to the data of the game. For example, video may be generated to show a video or animated depiction of an outcome that actually occurred in a game of a primary player.

In various embodiments, video may be generated based on data about a game. Data indicating the bet amount of a primary player may be used to generate video of a primary player (e.g., a simulated primary player) making a bet of the same bet amount. Data indicating an outcome of a game may be used to generate video showing the same outcome being generated. Data indicating intermediate symbols or indicia that appear during a game may be used to generate video showing those same intermediate symbols or indicia. For example, data indicating that a particular position at a blackjack table was dealt the seven of hearts may be used to generate video showing the simulated dealing of the seven of hearts on a simulated blackjack table. Data indicating the identity of a primary player may be used to generate video. For example, based on a stored photo of a primary player, the casino may generate cartoon caricatures of the primary player playing a game. Data indicating the age or other demographic of a primary player may be used to generate video. For example, if the primary player is a 60 year-old female, the casino may generate a cartoon caricature of a 60 year-old female playing a game. In some embodiments, demographic data about a player may be used to retrieve stock footage of a player with similar characteristics. For example, stock footage of a 60 year-old female player may be retrieved.

The record of the game may be stored by a gaming device, casino server, third party server, or other device. Subsequently, a secondary player may place a bet on the game, or on some aspect of the game. Once the secondary player has placed a bet, data stored in the record may be used to recreate the game, or to recreate some aspect of the game. For example, video footage of the game may be shown to the secondary player. In some embodiments, the outcome of the game may simply be displayed for the secondary player.

Based on the outcome of the game and based on the bet placed by the secondary player, the secondary player may lose his bet, lose a portion of his bet, break even, or be paid winnings. For example, if the outcome of the game is a winning outcome, then the secondary player may be paid based on the standard rules of the game. For example, if the secondary player bets $10 on a game of blackjack, and the primary player in the game received 20 points to the dealer's 19, then the secondary player may win $10 in addition to keeping his bet.

If the secondary player has placed a bet on what would happen to the primary player, then the winnings and/or losses of the primary player may be revealed to the secondary player. For example, if the secondary player bet against the primary player, and the primary player lost, the secondary player may win. If the secondary player made a bet whereby the secondary player receives twice the winnings of the primary player, and the primary player wins $20, then the secondary player may receive $40.

1.4. A primary player on which a secondary player was betting is no longer available. In various embodiments, a secondary player may participate in one or more games played by a primary player. For example, the secondary player may place bets on the games played by the primary player. The primary player may, at some point, terminate his playing session. The secondary player may, on the other hand, wish to continue his participation in the games of the primary player, and may thus find himself deprived of opportunities to make bets on the games of the primary player.

1.4.1. A primary player is asked to stay. In various embodiments, the primary player may signal his intention to terminate a playing session. For example, the primary player may stand up, cash out, refrain from placing a bet even though he is at a table game, and so on. The secondary player may signal his desire to continue participating. For example, the secondary player may press a button labeled "continue session" on a betting interface. The secondary player may communicate his desire verbally (e.g., to a casino representative), via text (e.g., via a text message sent to a casino representative) or in any other manner. Regardless of whether the secondary player actually signals his desire to continue participating, the primary player may be contacted. For example, a representative of the casino may contact the primary player. Such a representative may include a waitress, pit boss, dealer, etc. The primary player may be asked to stay and to continue playing. The primary player may be offered a benefit for staying, such as cash, goods or services, a free meal, show tickets, improved odds, comp points, and so on. The primary player may be informed that there is a secondary player who appreciates the results of the primary player and wishes for the primary player to remain.

In some embodiments, a primary player who has signaled an intent to leave may be asked to stay only if one or more criteria are satisfied. For example, the primary player may be asked to stay only if at least three secondary players have been participating in the games of the primary player. Other criteria may include: (a) there are at least X secondary players watching the games of the primary player; (b) there are at least X secondary players who are interested in participating in the games of the primary player; (c) there has been at least X dollar amount of bets placed by secondary players on each game of the primary player; (d) there has been a total of at least X dollar amount of bets placed by secondary players on games of the primary player during a particular period of time, number of games, particular playing session, etc.; (e) the casino has made at least X dollars of profit from secondary players having participated in the games of the primary player; (f) the casino has made at least X dollars of theoretical win or profits from secondary players having participated in the games of the primary player; and so on. It will be appreciated that a casino may require any combination of the above criteria to be met in order for a primary player to be asked to stay. There may be multiple ways of meeting the above criteria, including by partially satisfying two or more of the criteria. It will further be appreciated that there may be other criteria that a casino may use based on whose satisfaction the casino may ask a primary player to continue with a playing session.

In various embodiments, a casino may offer a primary player an opportunity to play a fair game (i.e., where the primary player's expected winnings accounting for the cost of betting are exactly 0), if the primary player will continue to play.

1.4.2. The casino plays automatically. In some embodiments, when a primary player terminates a playing session, the casino or house may play in place of the primary player. For example, a dealer at a blackjack table may continue to deal a hand to the position where the primary player had been. The dealer may make decisions for the hand, such as hit or stand decisions. The decisions may be made according to optimum strategy. The decisions may also be made based on inputs from the secondary player. Another representative of the casino may also stand in for the primary player. For example, the other representative may sit at the table or slot machine where the primary player had been and may resume play.

In some embodiments, game outcomes may be generated automatically once the primary player leaves. For example, a slot machine that the primary player has left may continue to generate outcomes. The secondary player may thus continue to place bets on the outcomes.

In some embodiments, a computer algorithm may make decisions in a game. The computer algorithm may substitute in for a primary player in a game so that a secondary player may participate in the game without the presence of a human primary player. In some embodiments a computer algorithm may act as a primary player even when a secondary player had not been participating in games of a prior human primary player. In other words, a computer algorithm need not necessarily substitute in for a primary player but may serve as a simulated or artificial primary player from the get-go. A computer algorithm may make decisions in a game. The computer algorithm may make decisions of how much to bet; decisions of what types of bets to make (e.g., the computer algorithm may decide whether or not to make an insurance get in a game of blackjack); decisions of whether to check, bet, raise, call, or fold (e.g., in a game of poker); decisions about whether or not to receive additional cards (e.g., in games of blackjack or video poker); and any other decisions that may be made in a game. The computer algorithm may refer to a stored set of rules for making decisions in a game. For example, the computer algorithm may refer to a table which lists one or more possible situations which might arise in a game, and which lists a corresponding decision that should be made should that situation arise. The computer algorithm may also include procedures, logic, or other computational methods for computing a decision given a game state. For example, in a game of video poker, a computer algorithm may compute expected winnings given each of several possible decisions. The computer may determine which of the decisions leads to the highest expected winnings and make that decision.

In various embodiments, a computer algorithm may be programmed to make decisions which yield the highest expected winnings, payouts, and/or profits in a game. In various embodiments, a computer algorithm may be programmed to approximate the play of a human player. The computer algorithm may be programmed to, at least occasionally, favor strategies with emotional or intuitive appeal over those that are optimal. For example, a computer algorithm may be programmed to pursue a high paying hand in a game of video poker even when expected winnings would be optimized by pursuing a lower paying but more certain hand. In various embodiments, computer algorithms may be programmed with different personalities. Some might be programmed to take big risks in the strategies they use. Some might be programmed to play conservatively. Some computer algorithms may be programmed to bet frequently (e.g., in games of poker). Some computer algorithms may be programmed to bet infrequently, and only with very good hands (e.g., in games of poker).

1.4.3. An interrupted session of the primary player is resumed when primary player returns. In some embodiments, when a primary player leaves, the session of the secondary player may be put on hold. That is, for the time being, the secondary player may not have the opportunity of placing bets and participating in games played by the primary player. However, the secondary player may have the opportunity to resume playing when the primary player returns and initiates new games.

1.4.3.1. An alert is given to the secondary player when primary player returns. In some embodiments, the secondary player may be sent an alert when the primary player has returned, or when the primary player is soon to return, or when the primary player is likely to return. The alert may take the form of a phone call, email, text message, verbal alert by a casino representative, and so on.

1.4.4. In some embodiments, a secondary player may indicate a primary player in whose games the secondary player may be interested in participating. The secondary player may thereby "tag" or "bookmark" the primary player as a player in whose games the secondary player may wish to participate. In various embodiments, the casino may allow the secondary player to easily determine when a bookmarked primary player is playing (e.g., is seated at a gaming device or gaming table; e.g., has inserted a player tracking card at a gaming device or gaming table; e.g., has played one or more games in the recent past). For example, a secondary player may peruse a list of bookmarked primary player. The secondary player may select one of the primary players from the list and may then be shown whether or not the primary player is currently playing, what game the primary player is playing, where the primary player is playing, or any other information of interest. In some embodiments, the casino may alert the secondary player anytime a bookmarked primary player has begun playing. In some embodiments, the casino may keep track of various statistics related to primary players that the secondary player has bookmarked. The casino may report such statistics to the secondary player when the secondary player makes contact with the casino (e.g., sits at terminal from which the secondary player may participate in games of the primary player), or at any other time. Statistics may include statistics about recent games played, recent wins, recent losses, recent large payouts, recent profits, and so on. Statistics need not necessarily be recent but may be recent if the secondary player has previously learned of older statistics about the primary player. In various embodiments, if a secondary player is ready to begin participating in the games of a primary player, the secondary player may be offered (e.g., by default) the opportunity to participate in games of a bookmarked primary player. The secondary player may be offered the opportunity to participate in the games of a first bookmarked primary player (e.g., a primary player that is first on the secondary player's list of favorite primary players). If the secondary player declines, the secondary player may be offered the opportunity to participate in games of a second bookmarked primary player (e.g., a primary player that is second on the secondary player's list of favorite primary players), and so on. In various embodiments, secondary players may share tags or bookmarks of primary players amongst themselves. For example, a secondary player may publish a list of whom he thinks are "lucky" primary players. Other secondary players may view the list and decide to participate in the games of the listed primary players.

1.4.5. An expected value is paid to the secondary player. In various embodiments, a secondary player may have placed a bet on results of a primary player spanning more than one game. For example, the secondary player may have bet that a primary player would be ahead monetarily after one hour of play. If, however, the primary player leaves prior to completing one hour of play, there is the potential that the secondary player's bet remains unresolved. In various embodiments, the secondary player's bet is settled for the expected value (EV) of the secondary player's winnings. For example, if, based on the current time, the current winnings of the primary player, and the odds of the game that the primary player has been playing, the expected winnings of the secondary player are $8, then the secondary player may be paid $8 when the primary player terminates his session. The bet may also be settled for various functions of the EV, such as for the EV less a processing fee, 50% of the EV, and so on.

1.4.6. Bets are returned to the secondary player. In some embodiments, when the primary player terminates a session, a bet made be the secondary player that was dependent on the primary player finishing the session may be returned to the secondary player.

1.4.7. Options to participate in the games of other primary players are shown to the secondary player. In some embodiments, when the primary player terminates a session, the secondary player may be presented with other primary players on whom or on whose games the secondary player might bet. By selecting one or more of the new primary players, the secondary player may continue participating in games. For the purposes of a bet that required the completion of the session by the original primary player, the new primary player may be treated as if he was continuing where the original primary player left off. For example, the new primary player may be treated as if he has lost $6 during the past half hour, as the original primary player actually did. If the new primary player subsequently wins $10 in the next half hour, a bet made by the secondary player that the original primary player would be ahead after an hour of play would be a winning bet.

When a selection of new primary players is presented to the secondary player, primary players presented may be chosen by the casino based on similarities to the original primary player. For example, suppose the original primary player was from Texas. When the original primary player terminates his session, new primary players may be presented wherein each is also from Texas. Other characteristics that the original and new primary players may share include: (a) both may play the same type game (e.g., both may play IGT's Wheel of Fortune® slot machines); (b) both may be of the same gender; (c) both may be the same age; (d) both may have the same occupation; (e) both may have the same geographic location of residence or origin; (f) both may have common interests (e.g., in music, food, sports, etc.); and (g) both may share common birthdays.

1.4.8. The secondary player is given the opportunity to become a primary player. He's told where he can sit down and start playing. In some embodiments, when a primary player terminates his session, the secondary player is offered the chance to become a primary player. For example, the secondary player is shown the location of the slot machine or table game where the primary player had been playing. The secondary player may be offered the opportunity to take the seat and/or take the place of the primary player.

1.4.9. Historical games of the primary player are found. In some embodiments, when the primary player terminates a session of play, the secondary player may be offered the opportunity to participate in historical games of the primary player. In various embodiments, the historical games may include games in which the secondary player has not already participated. The secondary player may thereby have the opportunity to continue benefiting from the skill, luck, or other value he associates with the primary player.

1.5. Maintenance of player privacy. In various embodiments, the identity of a primary player may be shielded from the secondary player. This may prevent a secondary player from finding out sensitive financial information about the primary player, from scolding the primary player for unfavorable outcomes, or for otherwise causing harm or discomfort to the primary player.

1.5.1. The secondary player doesn't see who he is betting on. In various embodiments, facial features or any other potentially identifying features of a primary player are hidden from the secondary player. For example, in video footage of the game of the primary player, the face is blurred, covered, or completely omitted from the field of view. Voices may be edited out or masked.

1.5.2. The secondary player does not know the location of the person he is betting on. In various embodiments, the location of the primary player is disguised or kept hidden. Otherwise, especially for a live game, it would be conceivable that the secondary player could find the primary player by simply going to the location of the primary player. Thus, in various embodiments, video footage of the game of the primary player may omit distinguishing characteristics of the primary player's location. Such characteristics may include identifiable features of a casino, such as pictures, sculptures, fountains, names of restaurants, signs for a bathroom, signs for a poker room or other casino sector, and so on. Distinguishing features of a table game may also be disguised or omitted. For example, a unique design or color of a table may be omitted. In various embodiments, games, or locations with readily identifiable and/or unique characteristics may be ineligible for participation by secondary players.

1.5.3. Limits to how many times a secondary player can bet on one particular person. In various embodiments, there may be a limit as to the number of games of a primary player in which a secondary player may participate. This may lessen the likelihood of the secondary player developing any strong feelings towards the primary player one way or the other. In various embodiments, there is a limit to the amount of time that the secondary player is allowed to spend participating in the games of a given primary player.

In various embodiments, a secondary player may be switched from participating in the games of a first primary player to participating in the games of a second primary player. The secondary player may be switched without the secondary player knowing that he has been switched. For example, the secondary player may receive data about a game that includes the symbols, indicia, and/or outcomes generated during the game. However, the secondary player may not necessarily receive identifying information about a primary player of the game. Thus, when the secondary player is switched from participating in the games of a first primary player to participating in the games of a second primary player, the secondary player may not be aware of the switch since the secondary player may have no access to identifying information for either the first or second primary players. In various embodiments, the secondary player may be switched from participating in the games of a first primary player to participating in the games of a second primary player after a predetermined number of games. For example, after participating in 25 games of a first primary player, the secondary player may be switched to participating in the games of a second primary player. In various embodiments, a switch may occur at random. For example, after every game played by a first primary player, the casino may randomly generate a number between 1 and 100. If the number is greater than 80, the casino may switch the secondary player from participating in the games of the first primary player to participating in the games of a second primary player. In some embodiments, the switch may occur after a random number of games with an upper boundary. For example, if the secondary player has not been switched after 20 games with a first primary player, the secondary player may be switched automatically. In some embodiments, a secondary player may be switched upon his own request. In various embodiments, when a secondary player is switched between the games of different primary players with reasonable frequency, the chances with which a primary player's privacy becomes compromised may be reduced. In some embodiments, a secondary player may be informed when he has been switched from the games of a first primary player to the games of a second primary player. In some embodiments, the secondary player is not informed of the switch.

1.5.4. Introduction of a time delay so that the primary player is no longer located where he had been by the time the secondary player begins participation in the games of the primary player. In various embodiments, a secondary player is restricted to betting on games that have occurred a predetermined amount of time in the past, e.g., one day or more in the past. In this way, the secondary player is unlikely to be able to contact the primary player, as the primary player may no longer be in the vicinity. In various embodiments, the secondary player is restricted to betting on games that have been played by a primary player who has already left the location in which the games were originally played.

1.6. A secondary player or spectator is provided with knowledge about what the next cards will be, or what the primary player's opponent holds. The secondary player may watch the primary player struggle with a decision while the secondary player already knows the correct decision. In various embodiments, a secondary player may be informed of some information about a game that the primary player does not know, or at least did not know at the time the primary player was participating in the game. For example, a primary player may be engaged in a game of video poker. The secondary player may watch the progress of the game from a remote terminal. The secondary player may be informed that the next four cards in the deck are all aces. However, this information is not known to the primary player. Thus, the secondary player may experience the excitement of hoping the primary player will draw four cards.

1.6.1. The secondary player knows the next cards, the symbols that will occur on reels, the proper door to open in a bonus game, etc. In various embodiments, a secondary player may be informed of one or more of the following at a point in a game prior to when a primary player finds out (or found out): (a) an outcome of a game (e.g., "cherry-cherry-cherry"); (b) a payment that the primary player will receive based on the game; (c) a game result (e.g., win, lose); (d) a reel position; (e) a symbol that will appear on a reel (e.g., the secondary player may know that the third reel of a slot machine will show a symbol "bar" that will complete a winning outcome of "bar-bar-bar" prior to when the primary player finds out); (f) a card that will be received by the primary player; (g) a card that will be received by a dealer; (h) a card that is at or near the top of the deck being used in a game of cards; (i) a hand of cards that will be achieved by a primary player should the primary player make a particular decision (e.g., a hit decision in blackjack); (j) an order of cards in a deck of cards (k) a payment, result, or outcome that would result from a particular choice in a bonus game of a gaming device (e.g., the primary player would win 200 coins by choosing door number 3 in a bonus game); (l) a card that will be received by the primary player's opponent; (m) a card held by the primary player's opponent (e.g., in a poker hand); (n) a number that will appear on a die in a game (e.g., in craps); (o) a number that will come up in the game of roulette; and so on.

1.6.2. The secondary player may make a new bet at apparently good odds if the primary player is not likely to make a decision that would win for the secondary player. In various embodiments, a secondary player may be allowed to place a bet on a game being played by the primary player after finding out information about the game. The bet may be made at odds apparently favorable to the primary player. For example, suppose that a primary player holds an initial hand of video poker comprising the Ks, Kc, 10h, 3c and 7d. Unbeknownst to the primary player, but known to the secondary player, the next four cards in the deck are the Ah, Kh, Qh, and Jh. Thus, were the primary player to discard the Ks, Kc, 3c, and 7d, the primary player would achieve a royal flush, the highest paying outcome, in various embodiments. The secondary player may be allowed to bet four coins on the game. The secondary player may win 1 coin for a pair, jacks or better, 2 coins for two-pair, 3 coins for three-of-a-kind, and 800 for a royal flush. Thus, the secondary player may bet 4 coins with an apparent potential to win 800 coins. Indeed, it is possible that the second player will win 800 coins. However, it would be very unlikely for the primary player to discard a pair of kings in order to draw four cards to the 10h. Thus, it is more likely the primary player will keep his pair of kings, draw three cards, and end up with three kings, providing the secondary player with a payout of 3 coins. Thus, in various embodiments, the strategy of a primary player may be predicted, e.g., by the casino server. The predicted strategy may be, e.g., an optimal strategy given lack of any knowledge about future results or outcomes (e.g., future cards in a deck). Based on predictions of the primary player's strategy, the casino server may provide betting opportunities for the secondary player such that the house will maintain an advantage given the predicted strategies. The same betting opportunities provided to the secondary player may have provided the house with a disadvantage if the primary player were to be able to utilize knowledge of future results or outcomes (e.g., future cards in a deck). Accordingly, a secondary player may make certain bets on a game in the hopes that the primary player will deviate from optimal or conventional strategy.

1.6.3. The secondary player may provide hints. In various embodiments, a secondary player may have the opportunity to convey a hint to the primary player. A hint may take the form of a suggested decision. For example, a hint may indicate that the primary player should discard the first and third cards in his hand of video poker. A hint may take the form of a veto. For example, the primary player may first indicate a particular choice of strategy, such as a particular combination of cards to discard in a game of video poker. The secondary player may provide an indication that such a strategy should not be followed. The secondary player may be allowed only one veto or may be allowed up to a predetermined number of vetoes. A hint may take the form of information about a symbol, result, or outcome of a game. For example, in the bonus round of a slot machine game, the secondary player may inform the primary player of the number of coins behind door 2. It may happen that there are more coins behind door 3, but the secondary player may only be allowed to give a hint about door 2, in some embodiments.

1.6.4. The secondary player may watch the primary player for entertainment purposes. The secondary player may watch facial expressions during good outcomes or during near-misses. In various embodiments, the secondary player may derive entertainment or other gratification from watching the experiences of the primary player. The secondary player may, for instance, watch a primary player play a game in which the primary player will win a large payout. The secondary player can watch the expression on the face of the primary player (e.g., from video footage) and see the expression change from neutral to an expression of surprise and elation. The secondary player may choose to participate in games that are likely to have or to have had an emotional impact on the primary player. The secondary player may thus choose games in which a payment above a predetermined amount was won, in which a certain outcome (e.g., a winning outcome) was achieved, in which a jackpot was achieved, in which a bonus round was played, and so on. A secondary player may also choose a game in which the primary player comes close, or apparently comes close to achieving a large payment. For example, the secondary player may choose a game in which the primary player has four cards to a royal flush in video poker and will draw a fifth card. The secondary player may also choose a game in which two out of three reels of a slot machine line up on jackpot symbols.

1.6.5. A search is performed to find games that include near misses of high paying outcomes, or any other characteristic. In various embodiments, a secondary player may receive information about various games that will happen, are in progress, or have happened already. Based on the information, the secondary player may choose a game in which to participate, or which to watch. The secondary player may have a preferred game he likes to play, a preferred primary player he likes to bet with (or on), a preferred dealer in whose game he wishes to participate, and so on. The secondary player may also wish to participate in games where he knows something about the outcome, results, or other information about the game. For example, the secondary player may wish to participate in games where the first two reels of a slot machine show the jackpot symbols.

In various embodiments, the secondary player may indicate a desired criterion, or desired criteria about the game. Various games satisfying the criterion or criteria may then be made available for the secondary player to participate in. The secondary player may then choose one or more of the games to participate in. In various embodiments, once the secondary player has indicated a criterion or criteria, the secondary player may automatically begin participating in a game matching the criterion or criteria. Criteria indicated for a game by a secondary player may include one or more of the following: (a) the game has a particular dealer; (b) the game has a particular number of players; (c) the game is played at a particular gaming device; (d) the game is played at a particular type of gaming device; (e) the game is played by a particular primary player; (f) the game is played by a primary player with a particular characteristic (e.g., age, race, marital status, nationality, area of residence, occupation, etc.); (g) the game has a potential payout above a particular level (e.g., the game has a payout of more than 1000 times the bet); (h) the game has an expected payout above a certain level (e.g., an expected payout of more than 95% of the original bet); (i) the game has a bonus round; (j) the game is played in a certain location; (k) the game is played at a certain time or date; (l) the game is, or will be a winning game (e.g., the game will pay at least three times an initial bet of the primary player); (m) the game will feature an outcome that has almost all the required symbols necessary for a large payout (e.g., a game of video poker has four cards to a royal flush); and so on.

- 1.6.6. Preventing collaboration. In various embodiments, measures may be taken to prevent collaboration between the primary player and the secondary player. Particularly if the secondary player knows information about the game, such as hidden cards in a deck, the secondary player would be able to confer an advantage to the primary player and to himself by communicating with the primary player. As discussed previously, the identity of the primary player may be shielded from the secondary player. Similarly, the identity of the secondary player may be shielded from the primary player. One or both of the primary and secondary players may be kept in an enclosure, such as a sound-proof room or Faraday cage, that reduces the possibility of communication. Signal detectors, such as antennas, may be placed near the primary or secondary players to detect possible communications between the two. Cell phones, pagers, Blackberries™ and other communication devices may be temporarily confiscated from either or both of the primary and secondary players. The secondary player may participate in the game only after one or more, including all game decisions have been made in the game.
- 1.7. What happens if a machine needs servicing in the middle of a roll? What happens if the primary player is taking too long to finish a game? In various embodiments, the completion of a game may be delayed or prevented. For example, a gaming device may break down in the middle of a game. A primary player may get into a discussion with a friend in the middle of a video poker game and may thus delay a decision in the game for several minutes. A secondary player participating in a delayed game may find the delay frustrating and may wish to complete the game in some other manner.
- 1.7.1. A game is completed automatically. In various embodiments, the game may be completed automatically, e.g., by the casino. The game that is completed automatically may, in fact, be a copy of the original game, so that the primary player can complete the original game on his own. However, the secondary player may receive a payment based on the automatically completed game. The game may be completed using a predetermined strategy, such as optimal strategy. The game may be completed using a random strategy where, for example, one of several possible strategies is selected at random.
- 1.7.2. The secondary player makes the decisions in a game. In some embodiments, the secondary player may have the opportunity to complete the game by making his own decisions. For example, if the game is blackjack, the secondary player may indicate decisions such as "hit" or "stand" so as to complete the game. The secondary player may, in various embodiments, complete a copy of the original game, so that the primary player may complete the original game on his own. A copy of the original game may include a second game with one or more similar parameters or aspects to the first game. For example, in the copied version of the game, one or more of the player hand, the dealer's hand, the order of cards in a deck, the prizes available behind certain doors in a bonus game, etc., may be the same as in the original game.
- 1.7.3. A bet is returned to the secondary player. In various embodiments, when a game is delayed, the bet placed by the secondary player on the game may be returned to the secondary player.
- 1.7.4. The secondary player is provided with an expected value of his winnings at that point in the game. In various embodiments, when a game is delayed, the expected payment or the expected winnings to be paid the secondary player may be provided to the secondary player. In some embodiments, a function of the expected payment is provided, such as the expected payment less a fee.
- 1.8. Communication between the secondary player and the primary player. In some embodiments, the primary player and the secondary player may be given the opportunity to communicate. Communication may occur via text, voice, or any other means. Communication may occur through the casino server. Communication may be monitored by the casino, such as by a computer program or a casino representative. Communication may be edited or prevented if there is inappropriate or threatening language and/or if communication somehow provides either the primary player or secondary player with an unfair advantage.
- 1.8.1. The secondary player sends help to the primary player. For example, "you should hit here." In some embodiments, the secondary player may send help to the primary player. The secondary player may help the primary player with strategy in a game such as blackjack, video poker, or live poker. In video poker, the secondary player may suggest which cards the primary player should discard. In blackjack, the secondary player may suggest whether to hit, stand, double down, split, etc. In a live game of poker, the secondary player may advise the primary player whether to check, bet, raise, fold, or call. The secondary player may also suggest an amount of a bet or raise. The secondary player may provide other suggestions or opinions, such as suggesting that another player is probably bluffing. The secondary player may provide additional information, such as the probabilities of various events occurring given a particular strategy. For example, the secondary player may indicate that the primary player would have roughly 2 to 1 odds against making a flush should he continue in a game of poker.
- 1.8.2. The secondary player takes over the game. In various embodiments, a secondary player may take the place of a primary player in making decisions in a game. For example, the secondary player may transmit signals that cause game decisions to be made without additional input by the primary player. For example, the primary player may press a button on a gaming device labeled "defer to secondary player." The secondary player may then select, e.g., cards to discard from a remote terminal. The remote terminal may, in turn, transmit to the gaming device indications of which cards the secondary player has chosen to discard. The chosen cards may then be removed from the primary player's hand and replaced with new cards. The primary player may win or lose and may receive payments based on the decisions made by the secondary player.
- 1.8.3. Sending a tip to the primary player. In various embodiments, the secondary player may send a tip, other consideration, or other token of gratitude to the primary player. For example, if the primary player has just won a large payment, thereby causing the secondary player also to win a large payment, the secondary player may be grateful and wish to tip the primary player. The secondary player may provide an indication that he wishes to tip the primary player, e.g., by pressing a button on a remote terminal. The casino server may then deduct the amount of the tip from an account associated with the secondary player and add such amount to an account associated with the primary player. The casino server may also cause the amount of the tip to be paid out at the primary player's gaming device or table, e.g., in the form of a coin or cashless gaming receipt. In some embodiments, the primary player may pay to have something delivered to the primary player. For example, the secondary player may pay for a bottle of wine. A casino representative, such as a waitress, may then deliver the bottle of wine to the primary player at the location of the primary player.

1.9. Betting interfaces. A secondary player may participate in the game of a primary player using various interfaces. The interfaces may allow the secondary player to select a game in which to participate, including selecting various aspects of a game, such as the machine on which the game is played, the primary player playing the game, the time, and so on. The interface may allow the secondary player to select a bet type. For example, the secondary player can bet for a primary player to win, or for a primary player to lose. The interface may allow the secondary player to select a bet amount. The interface may allow the secondary player to insert cash or other consideration, to identify himself (e.g., for the purposes of receiving comp points), and to cash out winnings or remaining balances.

1.9.1. Internet. A secondary player may participate using a network, such as the internet or a casino intranet. The secondary player may employ a computer, such as a personal computer, for this purpose. The secondary player may view a selection of games to participate in, progress of a current game, credit balances, etc., using a computer monitor. The secondary player may input decisions using a mouse, computer keyboard, or any other computer input device. For example, the secondary player may key in a bet amount using a numeric keypad on a computer keyboard. The secondary player may also use a device such as a phone, a cell phone, personal digital assistant, or Blackberry™. The contents of the following United States patent applications, listed with serial numbers, titles, and matter numbers in parenthesis, are incorporated by reference herein for all purposes: (a) Ser. No. 10/835,995 System and Method for Convenience Gaming (075234.0121); (b) Ser. No. 11/063,311 System and Method for Convenience Gaming (075234.0136); (c) Ser. No. 11/199,835 System and Method for Wireless Gaming System with User Profiles (075234.0173); (d) Ser. No. 11/199,831 System for Wireless Gaming System with Alerts (075234.0174); (e) Ser. No. 11/201,812 System and Method for Wireless Gaming with Location Determination (075234.0176); (f) Ser. No. 11/199,964 System and Method for Providing Wireless Gaming as a Service Application (075234.0177); (g) Ser. No. 11/256,568 System and Method for Wireless Lottery (075234.0178); (h) Ser. No. 11/210,482 System and Method for Peer-to-Peer Wireless Gaming (075234.0179); (i) 60/697,861 Enhanced Wireless Gaming System (075234.0183). The device used by the secondary player for participating in games may communicate with a casino server via the network, as is commonly known in the art. Messages may be exchanged back and forth between a device used by the secondary player and the casino, the messages taking the form of streams of bits represented by electronic pulses, optical pulses, or any other practical representation.

1.9.2. Felt table with live dealer. In various embodiments a secondary player may participate in a game by sitting at a table and interacting with a casino representative. The table at which the secondary player sits may be different from the table the primary player sits at. Thus the game activities of the primary player may occur elsewhere from the location of the secondary player. However, the secondary player may store cash or chips at his table and may indicate bets by placing chips at certain parts of the table. From this table, the secondary player may watch the action in the game of the primary player, e.g., using closed circuit television. Based on the outcome of the game played by the primary player, the secondary player may receive payments at his table. Thus, for example, the casino representative at the table of the secondary player may collect bets from the secondary player and may pay winnings to the secondary player if the outcome of the game of the primary player is winning for the primary player. The table of the secondary player may appear similar to that of the primary player. For example, the table may have the same shape and surface markings. The secondary player may even sit at the same position with respect to his table as the primary player sits with respect to the primary player's table. The secondary player may enjoy a similar experience to that of the primary player, only, perhaps, without the cards, dice, or other game apparatus used at the table of the primary player. In various embodiments, the table of the secondary player may serve as a means for the secondary player to make bets, receive winnings, and possibly to view the game of the primary player.

In some embodiments, the secondary player uses the same table or gaming device as does the primary player. For example, the secondary player may place a bet beside the hand of the primary player. The secondary player may then receive payments based on the outcome of the game of the primary player.

1.9.3. Machine at the casino. In some embodiments, a secondary player may participate in a game using a machine or terminal configured to allow participation in a separate game. The terminal may include a coin slot, bill validator, credit card reader, and/or other means for accepting consideration. The terminal may include buttons, keys, roller balls, and/or other input devices that may be used by the secondary player for selecting a game in which to participate, for selecting bet amounts, for selecting bet types, and so on. The terminal may be in communication with the device that conducts the actual game. For example, the terminal of the secondary player may be in communication with a gaming device at which the primary player is playing. The terminal may thus receive from the device of the primary player an indication of games played by the primary player, amounts bet, outcomes received, and other pertinent information. The terminal of the secondary player may be in direct communication with the device of the primary player or may be in communication with the casino server which, in turn, communicates with the device of the primary player. The terminal of the secondary player may also be in communication with sensors, detectors, and/or other monitoring devices at a game played by the primary player, such as at a blackjack game. For example, the terminal of the secondary player may receive feeds from cameras located at a blackjack game being played by the primary player. In various embodiments, a dealer or other casino representative may report information about a game of the primary player. For example, a dealer may input into keypad connected to the casino server that a primary player has been dealt an ace and a ten in a game of blackjack. Such information may subsequently be received at the terminal of the secondary player and may be used in determining a payment for the secondary player. The terminal of the secondary player may be a mobile device, e.g., a mobile device as set forth in Nevada bill AB471.

In some embodiments, the terminal of the secondary player may be constructed or configured to look like a gaming device. Betting interfaces at the terminal may be designed to mimic or appear similar to those at the gaming device. Graphics shown on the housing, or the screen may also be similar. However, the terminal may simply recreate and redisplay games and outcomes generated by the gaming device. The terminal may not, in various embodiments, generate games or outcomes of its own, e.g., using its own processor or locally stored algorithms. In various embodiments, the terminal may comprise a kiosk.

1.9.4. Casino desk. In various embodiments, a secondary player may visit a casino desk, casino cage, or other casino venue where bets may be placed in person. The secondary player may there select a game in which to participate. The secondary player may place a bet. The secondary player may receive some record of his bet. The record may be a paper receipt, for example. The record may include the name of the secondary player, the name of the primary player, the type of game, the time of the game, the machine or location at which the game was played, the amount of the bet, the terms of the bet (e.g., what outcomes constitute winning outcomes), and any other pertinent information. Upon resolution of the game, the secondary player may return to the desk and receive payment of any winnings.

1.9.5. How bets are entered. In various embodiments bet amounts and bet selections may be entered using buttons, keyboards, microphones, computer mice, joysticks, or any other input devices. A secondary player may also place bets and indicate bet amounts according to rules. Rules may include instructions that may be followed by a computer algorithm, the instructions indicating rules or conditions specifying when and how much to bet. By betting according to rules, the secondary player may save himself the effort of repeatedly indicating a desire to place a bet. Rules may include the following: (a) continue betting $1 on each new game until the secondary player provides an indication to stop; (b) continue betting $1 on each new game for the next 20 games; (c) bet $1 on the game following every win, and double the prior bet following every loss; (d) continue betting until a credit balance reaches either 0 or $100; and so on. In some embodiments, rules may be entered explicitly by the secondary player. In some embodiments, different sets of rules may be predefined. A secondary player need then only select one of the predefined sets of rules to have betting done automatically on his behalf according to the selected set of rules. In some embodiments, a set of rules indicates that the prior bet should be repeated. A secondary player may simply need to confirm each new bet before it is made. For example, for a first game, a secondary player may bet 5 coins on each of 7 pay lines of a slot machine game. For a second game, the secondary player may simply press a "repeat prior bet" button in order to once again bet 5 coins on each of 7 pay lines. Without pressing such a button, the process of entering the bet again might be time consuming. Further, the primary player may have continued on with the next game before the secondary player had time to enter the bet a second time. In various embodiments, a secondary player may specify a bet with reference to a prior bet. For example, the secondary player may indicate a desire to bet twice his prior bet, or to make the same bet he made two games ago.

1.9.5.1. Layout of the betting screen and the graphical user interface. In various embodiments a secondary player may choose a bet type; choose a bet amount; follow the progress of a game; follow the progress of a primary player; view statistics related to a gaming device, table, dealer, primary player, casino, etc.; all using a betting interface on a display screen. The display screen may also function as a touch screen so that the secondary player may interact with the screen by touching it in certain locations. A first location of the screen may include a selection area. Shown in the selection area may be any number of attributes pertaining to a game. For example, a selection area may list a number of primary players. The secondary player may select one of the primary players to indicate that the secondary player would like to participate in the game of the selected primary player. The selection area may present a selection of: (a) primary players; (b) gaming devices; (c) times; (d) dates; (e) casinos; (f) game types (e.g., video poker, slot, etc.); (g) dealers; (h) opponents; (i) game results (e.g., ranges of payouts provided by the game, such as games which paid 0-2 coins, games which paid 3-4 coins, games which paid 5-6 coins, etc.); and so on. Possible selections may be presented as a menu, a list, a scroll bar, or any other presentation. The secondary player may go through various layers of selection until he has completely specified a game in which to participate. For example, the secondary player may first select a primary player, then a gaming device, then a time of a game. Each set of choices may be presented as a new menu.

A second location of the screen may include a betting area. In the betting area, the secondary player may indicate an amount to bet on a game. The secondary player may specify a number of outcomes to bet on, such as a number of pay lines to bet on, or a number of hands of video poker on which to bet. The secondary player may also specify an amount to bet on each pay line or each outcome. If different types of bets may be made (e.g., a main bet and an insurance bet in blackjack, or pass line and hard eight in craps), then the secondary player may specify which of such bets he wishes to make. A secondary player may specify bets to be made on the primary player. For example, the secondary player may specify a bet that the primary player will lose or will win or may specify a bet that the primary player will win more than a certain amount.

A third location of the screen may include an area where information about a game is displayed. The area may allow the secondary player to follow the progress of the game. In this area, the secondary may watch as new symbols (e.g., cards in a card game or symbols on slot reels) arise, as new bets are made by the primary player and/or his opponent(s), as decisions are made by the primary player, as decisions are made by the dealer, as hidden symbols are revealed (e.g., as a dealer's down card is turned face up in the game of blackjack), as bets are collected (e.g., from the primary player), and as winnings are paid out (e.g., to the primary player). The third location of the screen may include live video, animations depicting a reenactment of the game, pre-recorded video of the game, pre-recorded video depicting a game similar to the game in which the secondary player is participating, or any other video depiction. The third location may include text descriptions of events in the game. For example, a text description may read, "Joe Smith has just been dealt a pair of kings."

A fourth location of the screen may allow a secondary player to view statistics related to a gaming device, table, dealer, primary player, casino, etc. For example, the fourth location may show the number of times a primary player has won or lost in his last 100 games, a graph depicting the bankroll of the primary player over the last two hours, the number of times a particular gaming device has paid more than 20 coins in the last day, and so on. Statistics may be presented in any conceivable form, such as using tables, graphs, bar graphs, line graphs, pie charts, and so on.

A fifth location of the screen may allow a secondary player to communicate with the primary player, with a casino representative, with other secondary players, or with others. The fifth location may comprise a chat area, for example, where text conversations are tracked, and where different statements are labeled with the name of the originator of the statement.

A sixth location of the screen may allow the secondary player to follow his own progress. For example, the secondary player may see his account balance and statistics about his own wins or losses.

A seventh location of the screen may allow the secondary player to cash out a portion of his winnings and/or account balances.

An eighth location of the screen may allow the secondary player to summon a casino representative, e.g., to order food.

As will be appreciated, the locations described above may be overlapping. All locations need not have the same function at once but may alternate. For example, at a first point in time, the screen may be occupied completely with video footage of a game. When the game finishes, the video footage may be replaced with statistics about the player. It will be further appreciated that there may be additional locations on the screen.

1.9.6. In order to participate in the games of a primary player, a secondary player may provide identifying information about himself Identifying information may include a name, age, state of residence, nationality, driver's license number, social security number, and/or any other identifying information. The casino may use such identifying information in order to verify that the secondary player is authorized to place bets and/or to participate in games as a secondary player. For example, the casino may use identifying information to verify that a secondary player is over 21 years of age. The casino may only permit the secondary player to participate in games of the primary player if the secondary player is over 21 years of age.

In various embodiments, a secondary player may be identified automatically by the casino. For example, the secondary player may seek to participate in a game while situated at a remote terminal or device. The remote terminal or device may be configured to check the identity of the secondary player prior to communicating with the casino. The terminal or device may only communicate with the casino, in some embodiments, if the secondary player is a particular player. Thus, the casino may automatically identify a secondary player by virtue of the terminal or device at which the secondary player is situated. If a terminal or device is configured only to communicate with the casino when a particular secondary player has identified himself to the terminal or device, then the casino can be assured that a particular secondary player is desirous of participating in games. The particular secondary player may be, for example, a particular secondary player that is authorized to participate in games. In some embodiments, a remote device or terminal may constitute a mobile device (e.g., a mobile device as set forth in Nevada bill AB471). The mobile device may be programmed to be used only by a particular secondary player. Therefore, if the secondary player is authorized to make bets, and the mobile device is configured to communicate with the casino only when the particular secondary player is using it, then the casino may assume that it is an authorized secondary player that is placing bets through the mobile device.

1.10. The secondary player bets on outcomes on which the primary player did not. In various embodiments, a secondary player may place bets on results or outcomes that were not bet on by the primary player. As will be appreciated, for a given game, there can be many possible outcomes, and many types of bets placed on the various outcomes. For example, in craps, many different bets can be placed in the same game, among them pass and don't pass.

1.10.1. The secondary player bets on a pay-line that the primary player did not. In various embodiments, the secondary player may bet on a pay-line of a slot machine that was not bet on by the primary player. For example, a slot machine may include three pay-lines, e.g., lines 1, 2, and 3. The primary player may bet on pay-line 1. The secondary player may bet on pay-line 2 and/or pay-line 3. The secondary player may, in various embodiments, bet on pay-line 1 as well. In some embodiments, the secondary player is only allowed to bet on pay-lines that the primary player has not already bet on. Such embodiments may help prevent a secondary player from determining a game in which the primary player has achieved a winning pay-line, and then betting on the same pay-line. In some embodiments, a secondary player may bet on pay-lines that were not available to the primary player when he played. For example, the secondary player may bet on a custom pay-line consisting of the top two symbols on a first reel, and the bottom symbol on a second reel of a slot machine. In some embodiments, the secondary player may bet on a pay-line that was not even visible to the primary player during his play of the game. For example, a slot machine may only show one symbol on each reel in a viewing window. The symbol on each reel that is one position above the viewing window may not be visible. Nevertheless, the secondary player may have the opportunity to bet on a pay-line comprising the row of symbols one position above the viewing window. Similarly, the secondary player may bet on a pay-line comprising the row of symbols one position below the viewing window. In various embodiments, any other pay-line or outcome may be constructed using visible and non-visible symbols. For example, a pay-line may be constructed using some symbols that were visible, and some symbols that were not visible to the primary player.

1.10.2. In various embodiments, the secondary player may place bets on symbols that were never even shown to the primary player. Such symbols may have occurred, for example, well above the viewing window. In some embodiments, such symbols may be shown to the secondary player.

1.10.3. Play a card game with unused cards. For example, in video poker, only the top 10 cards may be used during a game. The secondary player could play another game using cards from the bottom of the deck. In various embodiments, a secondary player may play a game using cards, symbols, or other indicia that were not revealed to the primary player. For example, a primary player may participate in a game of video poker. The primary player may use the top nine cards from a shuffled deck during the game (e.g., the primary player receives an initial deal of five cards, and subsequently draws four additional cards). However, in a standard 52-card deck, 43 cards would remain in the deck. The secondary player may play a new game using the 43 remaining cards. The secondary player may thus engage in a game for which no person yet knows the outcome. This may help to avoid situations where a secondary player can choose to participate in a game where he knows the outcome will be favorable to him. In various embodiments, a secondary player may participate in a new game using cards remaining after a game of blackjack, after a game of poker, after a game of casino war, or after any other game. In various embodiments, the secondary player may make his own decisions in the game, e.g., rather than relying upon decisions of the primary player. In various embodiments, a secondary player may use cards remaining in a deck for a game other than the game for which the deck was first used. For example, after a deck is used for a video poker game of the primary player, the secondary player may use the remaining cards in the deck for a game of blackjack.

1.10.4. The secondary player bets on some function of the data from a game. In some embodiments, a secondary player may bet on some function or transformation of the outcomes, results, or other data used in a game played by a primary player. As used herein, the term "function" may refer to a process or procedure for relating any acceptable input to an output, such that there is only one output per unique input. The output and input may be numerical or non-numerical. As used herein, a "function of" an input may refer to the resultant output when the function is used to relate the input to the output. As used herein, the term "transformation" may refer to a process or procedure for relating any acceptable input to an output.

1.10.4.1. An outcome is generated using a function of a random number used in generating an outcome in the primary game. Suppose a random number 10232 was used to generate an outcome in a game of a primary player. The random number+1 could be used, such that the number 10233 is used. This could yield a completely different outcome. Various games played at a casino utilize random number generators. For example, a slot machine may utilize a random number generator to choose a random number for each reel of the slot machine. Each random number is then used to determine the symbol that should be revealed by the corresponding reel. In various embodiments, a game played by a secondary player may use a new set of random numbers generated based on some function of the random numbers used in a game played by the primary player. For example, the random numbers used in the game played by the secondary player may consist of the random numbers used in the game played by the primary player with one added to each. Thus, {10245, 31189, 19320} may be transformed to {10246, 31190, 19321}. The new set of random numbers may be used as inputs to an algorithm (e.g., the same algorithm used in the game played by the primary player), to generate the symbols or outcomes of the game played by the secondary player. As will be appreciated, any function of the random numbers in the primary player's game may be used to come up with random numbers in the secondary player's game. For example, one may be subtracted from each random number, the order of the random numbers may be changed (e.g., so each random number now corresponds to different one of the reels), each random number may be multiplied by a factor, and so on.

In various embodiments, seed numbers may be used in the generation of random numbers. Thus, in some embodiments, a seed number used in a game played by a primary player may be transformed according to some function (e.g., one may be added) in order to generate a seed to be used in the game played by the secondary player.

In various embodiments, a game played by a primary player may result in a first outcome with a first associated payout. The game may be disguised by changing the first outcome to a second outcome with the same payout. Thus, the primary player may view the first outcome while he plays the game, but the secondary player may view the second outcome when he participates in the game. Monetarily, the primary player and the secondary player may have had the same experiences. In other words, given identical bets, both the primary player and the secondary player will have had the same payouts, in various embodiments. However, the primary player and the secondary player will have seen different representations of the game. For example, suppose a slot machine game includes several possible outcomes. Among the possible outcomes are "bar-bar-bar" with an associated payout of 10 coins, and "cherry-cherry-cherry", also with an associated payout of 10 coins. The primary player may play the game and achieve the outcome "bar-bar-bar." The secondary player may also participate in the game. When the game is presented to the secondary player, the secondary player may be shown an outcome of "cherry-cherry-cherry."

Thus, in various embodiments, a first outcome of a game may be generated for a primary player. The casino may determine what other outcomes have the same payout as the first outcome. From among the other outcomes, the casino may select one to present to a secondary player who has participated in the game.

In various embodiments the outcome presented to a secondary player may differ both in terms of the constituent symbols and in terms of the payout from the outcome that was seen by the primary player. However, over the course of two or more games, a secondary player may be presented with outcomes whose associated payouts sum to the same total as do the payouts associated with the outcomes presented to the primary player over the course of the same two or more games. For example, both a primary player and a secondary player may participate in the same two games. In the first game, the primary player may be presented with outcome A and receive an associated payout of 4 coins. For the first game, the secondary player may be presented with outcome C and receive an associated payout of 3 coins. In the second game, the primary player may be presented with outcome B and receive an associated payout of 6 coins. For the second game, the secondary player may be presented with outcome D and receive an associated payout of 7 coins. Thus, neither the primary and secondary players have been presented with different outcomes over the course of the two games. However, after two games, both have received the same total payouts, each having received 10 coins in total.

In various embodiments, a secondary player may view what is essentially the same game that the primary player is playing. However, the game may be disguised by replacing symbols from the presentation to the primary player with new symbols for presentation to the secondary player. For example, a "cherry" when viewed by the primary player becomes a "dog" when viewed by the secondary player. In terms of underlying logic, however, the games may remain the same. For example, "cherry" may always map to "dog," and likewise there may be a consistent function which maps the symbols shown to the primary player to the symbols shown to the secondary player. The pay tables on display for the primary and secondary players may exhibit a similar functional relationship. For example, suppose the primary player's pay table includes a line showing a payout of 15 for "cherry-cherry-cherry". A corresponding line on the pay table for the secondary player may include a line showing a payout of 15 for "dog-dog-dog". In various embodiments, other graphics may be altered. For example, a background coloration of the game viewed by the primary player may be blue, whereas the background coloration of the same game viewed by the secondary player may be green.

In various embodiments, a second game presented to the secondary player may be a different type of game from that presented to the primary player. However, an outcome may be chosen for presentation to the secondary player that has the same payout as an outcome that occurred in a game played by the primary player. For example, a primary player may be involved in a game of Casino War. The secondary player may view the outcomes of the games of the primary player but disguised as the game of craps. For example, if the primary player wins a game of Casino War (e.g., by being dealt a card with a higher rank than the card dealt to the dealer), then the secondary player may be shown an animated sequence of dice rolling a seven during the first roll of the game (i.e., a winning outcome in craps). If, however, the primary player loses the game of Casino War, then the secondary player may be shown an animated sequence of dice rolling a two on the first roll of the game (i.e., a losing outcome in craps).

The various methods of disguising a game described herein may provide an advantage, in certain embodiments, of making it difficult for the secondary player to determine details about the original game in which he is participating. For example, this may make it difficult for the secondary player to vary his bets based on advanced knowledge about the outcome of the original game.

1.10.4.2. The same random number may be used, but a different reel configuration. In various embodiments, a gaming device may store an internal table or function which maps random numbers to symbols or outcomes. For example, the random number 1293 may map to the symbol of "cherry" on reel 1 of a slot machine. In various embodiments, a game played by a secondary player may utilize the same random numbers used in a game played by a primary player. However, the game of the secondary player may include a different table or matching function between random numbers and symbols. Thus, for example, in the game played by the secondary player, the number 1293 may map to the symbol "bell" instead of "cherry". Accordingly, using the same random numbers, the game of the secondary player may arrive at different symbols or outcomes than those that occurred in the game of the primary player.

In various embodiments, a gaming device may store an internal table or function which maps random numbers to reel positions. For example, the random number 2451 may instruct a gaming device to stop reel 1 with position 12 visible in the viewing window of the gaming device. Each position on a reel may feature a symbol. For example, a reel may have ten positions, each position corresponding roughly to 36 degrees of arc of the circular reel. Thus, by instructing a gaming device to stop a reel at a certain position, a random number will also instruct the reel to display the symbol featured at the certain position. In various embodiments, the game played by the secondary player may utilize the same random numbers utilized by the game played by the primary player. However, the positions and/or ordering of one or more symbols may be changed. Thus, the same reel position in the game of the secondary player may corresponding to a different symbol than it did in the game of the primary player. Thus, using the same set of random numbers, the game of the secondary player may nevertheless result in different symbols or outcomes than does the game of the primary player.

1.10.4.3. What if all cherries were transformed into bars? A secondary player may bet on real outcomes, but with one aspect altered into another. In some embodiments, one or more symbols obtained in a game played by a primary player may be mapped to other symbols in a game played by a secondary player. For example, any "cherry" symbol in a game of a primary player may be transformed into a "bar" symbol in a game of a secondary player. Thus, if the primary player receives the outcome of "cherry-bell-cherry," the secondary player will receive the outcome of "bar-bell-bar." The pay table, between the two games, may remain the same. In embodiments where the pay table remains the same, it is possible for a winning outcome to be mapped to a losing outcome, and for a losing outcome to be mapped to a winning outcome. In some embodiments, a first card in one game is transformed into a second card in another game. For example, the two of hearts becomes the king of diamonds. In some embodiments, an entire outcome in a game of the primary player may be mapped to a different outcome in a game of the secondary player. For example, the outcome of "bell-lemon-plum" may map to "cherry-cherry-cherry." In various embodiments, when one symbol in a game played by a primary player is mapped to another symbol in a game presented to a secondary player, the same mapping may also occur in the pay table. For example, suppose the symbol "lemon" in a game played by the primary player is mapped to the symbol "tree" in a game presented to the secondary player. If there is a line in the pay table of the primary player indicating a payout of 100 associated with the outcome "lemon-lemon-lemon", then there may be a corresponding line in the pay table of the secondary player indicating a payout of 100 associated with the outcome "tree-tree-tree".

1.10.4.4. A secondary player may bet on original deals of cards, but with 7s now wild. In some embodiments, symbols in a game played by the primary player can take new meaning in the game of the secondary player. For example, in a game of cards, any seven dealt in the game of the primary player may count as a wild card in the game of the secondary player. Thus, for example, the primary player may receive a final poker hand of Qs Qh Jd 3h 7s. The primary player may then be paid based on having a hand with a pair, jacks or better. The secondary player may be paid based on having a hand with three of a kind, since the 7s, as a wild card, may count as a queen.

1.10.4.5. A secondary player may bet on a blackjack hand occurring with poker, or vice versa. In various embodiments, the secondary player may use the same symbols or outcomes obtained by the primary player, but to play a different game. For example, the primary player may be engaged in a game of blackjack. The secondary player may use the cards received by the primary player to form a poker hand. Thus, if the primary player receives the 2s 7s 3s As and 6s, yielding 19 points in the game of blackjack, the secondary player may receive a flush (all spades) in a game of poker.

1.10.4.6. A secondary player may bet on shifted data. For instance, an outcome consists of the last two reels from one slot pull, and then the first reel of the next slot pull. Or a hand of poker consists of the last three cards from one hand and the first two cards from the next hand. In various embodiments, data, symbols, or outcomes from two or more games of a primary player may be combined to create a single game for the primary player. For example, three cards used in a first game of the primary player, and two cards used in a second game of the primary player may be combined to form a single hand of cards for a single game of the secondary player. Data used in consecutive games of the primary player may be treated as a stream of data frames, each frame including all the data from one game. For example, each frame may include the three symbols appearing on the pay-line of a slot machine. A new stream of data frames may be created by shifting the frame limits over (e.g., left, or right) by some number of data points, e.g., by some number of symbols. Thus, for example, each frame in the new stream of data frames may include symbols from reels two and three followed by a symbol from reel one. In other words, new games have been created by using the last two symbols in a first game of the primary player and the first symbol in a second game of the primary player. Thus, by shifting data frames used in a sequence of games of a primary player, a new sequence of games may be generated for a secondary player.

1.10.4.7. A secondary player may bet on the same outcome, but with a different pay structure. For example, a secondary player may lose on a royal flush. In some embodiments, a secondary player may receive the same outcomes as does a primary player. However, the pay table that applies to the secondary player may differ from that which applies to the primary player. For example, in a game of video poker, the primary player may win 5 coins with a flush, but the secondary player may only win 2 coins.

1.11. A secondary player may bet on an aggregate outcome of a primary player. For example, a secondary player may bet that a primary player will be ahead or behind after an hour. In some embodiments, a secondary player may place a bet that depends on multiple games or outcomes of a primary player. For example, the secondary player may bet that the primary player will win the next three games in a row, or that the primary player will win the next game but lose the following game. The secondary player may bet that the winnings or losses of the primary player will satisfy one or more conditions after a designated period of time. The secondary player may bet that the winnings of the primary player will total more than a given amount in the next hour. The secondary player may bet that the losses of the primary player will exceed more than $1000 in the next 6 hours. The secondary player may bet that primary player will either lose more than $100 or will win more than $200 in the next 15 minutes. Winnings and losses may be net of each other (e.g., a $20 win and $10 loss may net to a $10 win) or may count separately (e.g., a winnings total is the sum of all amounts won regardless of bets lost). The secondary player may bet on any statistic pertaining to outcomes received by the primary player. For example, the secondary player may bet that the primary player will receive more than 10 payouts of more than 20 coins each in the next 25 minutes. The secondary player may bet that the primary player will achieve 4 full-houses in the next 50 games. In various embodiments, the secondary player may track the net winnings or net losses of the primary player. Thus, for example, if the primary player has lost $200 after an hour, the secondary player will also have lost $200. If the primary player has won $734, the secondary player will also have won $734.

1.11.1. A secondary player may take the upside of a primary player, but not his downside. In some embodiments, the secondary player may make a payment or place a bet that entitles the secondary player to an amount equal to the primary player's winnings, if any, over a period of time, but does not obligate the secondary player for anything if the primary player has net losses. For example, if the primary player achieves winnings over the next hour of $50, the secondary player may also receive $50. However, if the primary player loses in the next hour, the secondary player does not owe anything beyond his initial bet or payment. In various embodiments, the secondary player may receive, or owe monies based on more complicated functions of the primary player's winnings and losses. For example, the secondary player may receive three times the primary player's winnings (if there are any) for the next hour but may owe 1.5 times the primary player's losses if the there are losses.

1.11.2. In some embodiments, a secondary player may bet that a primary player will receive five payouts of over 20 coins.

1.12. A secondary player may bet the difference between what a primary player bet and what the primary player could have bet. A secondary player may complete a partial bet and thereby win only the extra payouts that resulted from the extra amount bet. In some embodiments, a secondary player may place a bet that a primary player could have made but did not. This includes completing a bet that the primary player made. The secondary player may, in this fashion, win any payments that a primary player would have won, beyond those the primary player actually did win, had the primary player made the bet.

1.12.1. For example, many machines require three coins bets to win the jackpot. If a primary player bets only two coins, then a secondary player may bet the 3rd and then win the difference of what someone would win with three coins versus two coins bet. Various gaming devices include pay tables that are based on the number of coins bet. For example, if a player bets one coin and receives the outcome "bell-bell-bell," then the player wins 100 coins. If, however, the player bets two coins and receives the same outcome, then the player wins 200 coins. Many gaming devices provide better payout odds for each incremental coin bet. Thus, in the prior example, if the player bets three coins and receives the outcome "bell-bell-bell," then the player wins 400 coins. Thus, the incremental payout odds for the third coin bet are better than those for the second coin bet, at least with respect to "bell-bell-bell." Accordingly, for example, if a primary player bets only two coins in a game, a secondary player may take advantage of the better incremental payout odds offered for the third coin bet by betting the third coin himself. If the outcome of "bell-bell-bell" occurs, the secondary player may thus receive the difference between the payout for three coins bet and the payout for two coins bet, i.e., the difference between 400 coins and 200 coins, equal to 200 coins.

In various embodiments, a secondary player may add to or complete a bet on a game made by a primary player so that the total bet of both the primary and secondary player would result in a higher set of payouts. The secondary player may receive any extra payouts associated with his bet. Thus, if the payout associated with the primary player's bet alone is X, and the payout associated with the primary player's bet plus the secondary player's bet is Y, then the primary player may receive X, and the secondary player may receive Y−X.

1.12.2. In craps, placing bets behind the bets of other people. In various embodiments, a primary player in a game of craps is given additional opportunities to bet during the course of a game. For example, when the primary player establishes a point for a pass line bet, he has the opportunity to place bets behind his pass line bet, called "odds bets". The odds bets often have no house edge, and therefore are typically more advantageous to a player than almost any other bet in a casino. However, a player at a craps table often does not make an odds bet or does not make the full amount of an odds bet that he is allowed. In various embodiments, a secondary player is allowed to make an odds bet that a primary player could have made. The secondary player may then be paid for the odds bet if the odds bet wins. Accordingly, the secondary player may enjoy the opportunity to make a bet at true odds, without the requirement of first making a disadvantageous pass line bet.

1.12.3. In various embodiments, a secondary player may make odds bets or may make partial bets such as betting the third coin at a slot machine, even if the primary player has already made such bets. The secondary player may nevertheless receive the incremental payouts associated with such bets. For example, the secondary player may bet a single coin which counts as the third coin bet at a slot machine. The secondary player may thus be eligible to win the difference in payouts between the payout for three coins bet and the payout for two coins bet.

1.13. Primary players might see who or how many people are betting on them. In various embodiments, a primary player may be made aware of a secondary player who is participating in the game of the primary player, or who subsequently participates in the game of the primary player. The primary player may receive a name, an image, and description of various attributes (e.g., age, occupation, area of residence, etc.) of the secondary player. The primary player may also receive an indication of the performance of the secondary player while participating in the games of the primary player. For example, the primary player may see how much the secondary has won or lost, what types of bets he has made, how many games he has participated in, for how long he has been participating in the games of the primary player, and so on. The primary player may derive a measure of satisfaction or gratification from the participation of secondary players. For example, a primary player may feel proud that a large number of secondary players have participated in his games. He may feel proud to have won money for them. In various embodiments, the primary player may have the opportunity to communicate with a secondary player. For example, the casino server may provide the primary player with contact information for a secondary player.

In various embodiments, a primary player may be compensated based on participation by secondary players in the games of the primary players. The primary player may be compensated per secondary player and per game. For example, the primary player may receive 0.5 cents per secondary player per game. Thus, if three secondary players each participate in two games of the primary player, the primary player may receive 0.5 cents×3 secondary players×2 games=3 cents. Thus, the primary player benefits by having more secondary players and by increasing the number of games in which each secondary player participates. The primary player may be compensated with a percentage of the bets made by secondary players participating in his games. The primary player may be compensated with some percentage of expected winnings to be derived from the bets of secondary players participating in the games of the primary player.

A primary player may thus be encouraged to convey some value to secondary player so as to attract secondary players to participating in his games. The primary player may convey value by employing good strategy, for example. The primary player may also attempt to provide entertainment, e.g., by telling jokes or by making commentary about his games.

In various embodiments, the games of a primary player, and/or data from the games of a primary player may be made available for participation and/or for viewing by interested secondary players. Data from the games of a primary player may be made available on an ongoing, continuous, and/or real-time basis. Secondary players may, at their leisure or pleasure, view or participate in the games. As such, data from the games of the primary player may be broadcast or transmitted in an analogous fashion to programs on a television or radio show, or analogously to periodically updated Web pages. Secondary players may tune in or out as desired. Each primary player may constitute a "channel" or "station." A secondary player may, for example, view a list of primary players just as he would a list of television stations. The secondary player may then decide which primary player or "station" he wants to participate with. When selecting a primary player, the secondary player may also have the opportunity to review data about historical games played by the primary player. For example, the secondary player may be able to review the primary player's wins and losses over the prior 20 games.

In various embodiments, a casino may select from a subset of available primary players to choose primary players for whose games data will be made available to secondary players. In some embodiments, a casino may serve as a "disc jockey" by choosing which primary players will have their data made available to others. The disc jockeys may be humans (e.g., casino employees), or maybe computer algorithms which automatically select certain primary players based, for example, upon a defined set of rules. The disc jockey or jockeys may select primary players based on any number of factors. A primary player may be selected based on: (a) recent results (e.g., recent wins or high payouts); (b) based on long term results (e.g., long term profits); (c) based on skill at playing a game (e.g., based on his use of basic strategy in blackjack); (d) based on his celebrity status (e.g., based on whether his name has been published in any newspaper in the past year); (e) based on a history of being favored by secondary players; and so on. At any given time, a disc jockey may decide to stop making data available from certain primary players, and/or to commence making data available from other primary players. For example, a disc jockey may decide that a primary player has hit a string of losses and therefore would not be of interest to any secondary player. The disc jockey may accordingly stop making data from the primary player available. For example, a disc jockey may decide that a given primary player has just won a large payout and therefore would be of interest to secondary players. Accordingly, the disc jockey may commence making data from the primary player available.

In various embodiments, the data about the games of a primary player may be made available across one or more casinos. A first casino may broadcast or transmit data from the games of one or more primary players to a second casino. The broadcast may occur via the radio or television spectrums, via mobile wireless frequencies, via microwave frequencies, via metal or optical cables, or via any other means. Secondary players in one or more of the casinos may view the data (e.g., may view games that are reconstructed based on the data). The data may be made available on the Internet, on one or more radio stations, on television, on interactive television, and so on. For example, a secondary player may visit a web page on which are listed names or identifiers for one or more primary players. The secondary player may click on an identifier in order to view data about games of the corresponding primary player. In some embodiments, a secondary player may set the channel on his television to a particular channel whereby identifiers for various primary players are listed on a menu. The secondary player may select an identifier from the menu (e.g., using a remote control) and may thereby call up on the television screen further data pertaining to the games of the primary player.

In various embodiments, data about the game of a primary player may originate in a first casino. For example, the primary player may play the game in the first casino. Data about the game may be transmitted to a second casino. From the second casino (e.g., from a terminal located in the second casino), a secondary player may participate in the game. The second casino may thereby derive revenue from the secondary player by using data originating from the first casino. In various embodiments, the first casino and the second casino may split revenue, win, profits, theoretical win, or any other financial gain that has been derived from the use of the data at the secondary casino. For example, 50% of the theoretical win from a bet by the secondary player (i.e., the casino advantage on the bet multiplied by the amount bet by the secondary player) may be given to the first casino by the second casino. The financial gain may be split with one percentage going to the first casino and another percentage going to the second casino. In some embodiments, the second casino pays a flat fee to the first casino for the use of the data. The flat fee may cover all possible uses of the data (i.e., uses of the data in as many games as the second casino desires) or may cover a single use of the data (i.e., in one game). In some embodiments, the second casino keeps a fixed financial gain from the use of the data and pays any remaining financial gain to the first casino. For example, the second casino may keep 2 cents of theoretical win per game in which the data is used and give the remaining portion of the theoretical win to the first casino. As will be appreciated, financial gain may be split between the first and second casinos in many other ways.

1.14. A secondary player watches games in progress. The secondary player may have various ways of watching or following the game or games in which he is participating. Following a game may include receiving information about the outcome or result of the game, receiving information about symbols or indicia that have arisen in the game (e.g., cards that have been dealt), receiving information about outcomes or results received by a dealer or opposing players, receiving information about decisions that are available or have been made in a game (e.g., decisions by a primary player to hit or stand), receiving information about player mannerisms in a game (e.g., facial expressions of a primary player or his opponents), information about amounts bet on a game (e.g., amounts bet by the primary player or the secondary player), information about amounts won on a game (e.g., amounts won by the primary player or the secondary player); and so on.

1.14.1. A split screen allows the secondary player to see multiple roulette wheels in the casino at once. In various embodiments, the secondary player may follow the progress of one or more games in which he participates using one or more display screens. Display screens may include cathode ray tubes, flat panel displays, plasma displays, liquid crystal displays, diode displays, light-emitting diode displays, organic light-emitting diode displays, projection displays, rear projection displays, front projection displays, digital light processing (DLP) displays, surface-conduction electron-emitter (SED) displays, electronic ink displays (e.g., E-Ink Corp's display technology), holographic displays, and so on. A secondary player may follow the progress of a game using a device such as a Blackberry®, iPod®, personal digital assistant, mobile phone, laptop computer, camera, personal computer, television, electronic book (eBook) and so on. A single screen may contain information about a single game in which the secondary player participates. A single screen may also contain information about multiple games in which the secondary player participates. The display screen may display information about one game on one part of the screen, and about another game on another part of the screen. For example, the screen may be divided into four quadrants, each quadrant showing information about a different game that the secondary player is participating in. A secondary player participating in two games may view a first of the two games on one display screen, and a second of the two games on another display screen. A secondary player may thus watch or follow the progress of games using multiple displays screens.

1.14.2. Views come from overhead cameras. In various embodiments, a secondary player may follow the progress of a game in which he participates using video and/or audio feeds from the proximity of the game. For example, a camera may capture the progress of a blackjack game played by a primary player. By watching a video feed, the secondary player may see the cards dealt in the game, the decisions made by the primary player, the decisions made by the dealer, and the result of the game (e.g., win for the primary player, win for the dealer, blackjack for the primary player, tie). In various embodiments, video or audio feeds may be live, delayed, or may be stored and played back at a later time for the secondary player.

1.14.3. Data is piped electronically from the slot machines. In various embodiments, data may be captured from a gaming device or live table game, encoded into electronic form, and transmitted to a display device, speaker, or other output device used to present the data to the secondary player. The output devices may decode the electronic data and present it in a sensible form for human viewing. The presentation may include a text description of occurrences in the game. For example, text may read, "At 9:02 pm, slot machine number 1423 achieved the outcome of bar-bar-bar. Congratulations, you have won 20 coins." The presentation may include a reconstruction of the game. For example, the game may be reconstructed using animated renditions of the game. For example, an animated slot machine may show animated reels spinning and stopping to show the outcome achieved by the actual slot machine which generated the game the secondary player participated in. In another example, an animated dealer using animated cards may be used to reconstruct a live table game of blackjack. In various embodiments, a computer synthesized voice may report to the secondary player occurrences in a game in which the secondary player participates.

1.14.4. Only active machines are shown to the secondary player. For example, the machine currently resolving into an outcome is shown. In various embodiments, a secondary player may participate in several games at once. The games may not necessarily all proceed at the same pace. For example, one game may finish while another is still in progress. In some embodiments, games or aspects of games may be presented to the secondary player only as important or relevant events occur in the game. For example, when a first game finishes, all or part of the game may be presented to the secondary player. For example, when the first game finishes, a depiction, or an image of the final outcome (e.g., the final cards in the primary player's hand) may be flashed onto a display screen viewed by the secondary player. The image pertaining to the first game may be removed when a second game finishes. When the second game finishes, a depiction or image of the final outcome in the second game may be flashed onto the display screen. In this way, the secondary player need only view aspects of a game that are most relevant, most important, or most interesting to him. When a game is in an uninteresting stage (e.g., when the reels of a slot machine are spinning), the secondary player may view information about other games. Information that may be deemed worthy of showing to a secondary player may include: information about a decision that is to be made in a game (e.g., the primary player has received an initial hand of blackjack and must now decide to hit or stand); information about a decision that has been made in a game (e.g., the primary player has decided to hit); information about a new card, symbol, or other indicium obtained in a game (e.g., a new reel of the slot machine has stopped, showing a new symbol for the pay-line); information about a final outcome of a game; information about entry into a bonus round or bonus game (e.g., the primary player has just won the opportunity to play a bonus round); information about a symbol, card, or other indicium obtained by a dealer or by an opponent of the primary player; information about an amount bet (e.g., by the primary player or by the secondary player); and information about an amount won (e.g., by the primary player or by the secondary player).

1.15. The secondary player is alerted when his favorite primary player sits down. In various embodiments, a secondary player may prefer to participate in the games of particular primary players, in the games of particular gaming devices, in games played at particular gaming tables, in games played with particular dealers, and so on. A secondary player may explicitly record his preferences, e.g., by informing the casino. In some embodiments, the secondary player may be assumed to have certain preferences, based, for example, on a history of participating in the games of a particular primary player. For example, if a secondary player has participated in 300 games of a particular primary player, the secondary player may be assumed to prefer or to enjoy participating in the games of the primary player. In some embodiments, the casino may inform a secondary player when a game in which the secondary player may be interested in participating is or will be in progress. For example, suppose that the secondary player has indicated that he likes to participate in games played by primary player Joe Smith. When Joe Smith sits down at a gaming device and begins playing, the casino may detect the presence of Joe Smith (e.g., by means of a player tracking card inserted by Joe Smith) and may then alert the secondary player that Joe Smith has begun playing. The secondary player may then place bets on the games of Joe Smith. The casino may alert the secondary player using any number of communication means. A casino representative may call the secondary player, may send a text or email message to the secondary player, may page the secondary player, may find the secondary player in person, and so on.

1.15.1. A secondary player is alerted as to the presence of a primary player who has done well for him. A secondary player may be alerted when a primary player commences play if the secondary player has had favorable results in the past when participating in the games of the primary player. Favorable past results may mean that: the secondary player is ahead in terms of winnings based on all prior participation in the games of the primary player; the secondary player was ahead in the most recent time period during which he participated in the games of the primary player; the secondary player won more than a predetermined amount of money (e.g., more than $500) in a single session while participating in the games of the primary player; the secondary player won a jackpot or other high-paying outcome while participating in the games of the primary player; the secondary player was ahead in the most recent X number of games when participating in the games of the primary player; or any other measure of performance while participating in the games of the primary player.

1.15.2. A secondary player is alerted as to the presence of a primary player with good statistics. A secondary player may be alerted when a primary player commences play if the primary player has a certain historical record or certain statistics that may be of interest to the secondary player. The historical record may include a record of: having won one or more jackpots or other high-paying outcomes; having won money for other secondary players; having achieved profitable sessions in the most recent gaming session or in any prior gaming session; having achieved a profit during some prior time period (e.g., during the past six months); and so on. A secondary player may also be alerted if a primary player that has some measure of popularity commences play. For example, primary players may be rated, e.g., by one or more secondary players, based on the secondary players' degree of satisfaction with, or other feelings towards the primary player. A primary player may, for example, be rated highly if he has won money for many secondary players in the past. Thus, for example, if a highly rated primary player commences play, a secondary player may be alerted and may be given the opportunity to participate in the games of the primary player.

1.15.3. A secondary player is alerted when good machine is taken. In various embodiments, a secondary player may be alerted if play commences at a gaming device or table that is or may be of interest to the secondary player. The gaming device may be of interest due to a number of factors, among them: the secondary player has won a jackpot or other high-paying outcome while participating in games of the gaming device; the secondary player has had profitable sessions at the gaming device; the secondary player has had recent profitable sessions at the gaming device; the secondary player has had profitable sessions at another gaming device similar to the gaming device (e.g., at a gaming device of the same type or from the same manufacturer); one or more recent games at the gaming device have resulted in jackpots or high-paying outcomes; recent games at the gaming device have resulted in profits for the player or players at the gaming device; the gaming device is highly rated (e.g., by secondary players); and so on.

1.16. A secondary player pays a fee to participate in games. In various embodiments, a secondary player may be required to pay in order to participate in the game of a primary player. The amount paid may be based on the status, rating, historical results, or requests of the primary player. For example, if the primary player is a well-known celebrity, the fees required of a secondary player may be higher than if the primary player were a lesser-known celebrity. If the primary player has had highly favorable historical results (e.g., has made large profits in the past), then the fees required of the secondary player may be higher than if the primary player did not have such favorable historical results. In various embodiments, the primary player may also declare a fee required for secondary players to participate in his games. A portion of such fee paid by a secondary player may be paid to the primary player.

1.17. Rules for using old data in a game with real money on the line. There is opportunity of misconduct since the player and/or the casino may know the data already. The use of historical games, outcomes, and other data related to a game presents an opportunity for an advantage by any party with knowledge of a data. For example, a casino might provide secondary players with the opportunity to participate only in games whose results the casino knows are losing for the player (and therefore winning for the casino). In another example, a secondary player may have already participated in a particular game (e.g., as a primary player) and may therefore know the outcome of the game in advance. The secondary player may thus make a large bet on the game if he knows the game will result in a winning outcome for him and will make a small bet or no bet on the game if he knows the game will result in a losing outcome for him.

1.17.1. Before the original data is generated, it may be tagged for reuse at a particular date and time in the future. That way, the casino may be afforded no discretion as to whether or not to use the data. In various embodiments, before a particular game is played for the first time, a casino designates a time, date, location, and/or any other situation or circumstance under which the game will be made available for participation by others. The situation under which the game will be made available may be chosen randomly, according to some algorithm, or in any other fashion. Once the situation or circumstances for future participation in the game have been established, the game may commence for the first time. In this way, the casino has established future circumstances under which the game may be made available for participation by others (e.g., by secondary players) before the casino is aware of the outcome of the game. The casino cannot, therefore, decide not to allow participation in the game if the game turns out to result in a jackpot for the player. In various embodiments, the establishment of future circumstances under which a game will be available for participation by others is binding upon the casino. Regulators may keep track of when games must be made available for future participation and may verify that the games have in fact been made available. In various embodiments, players or other parties may not necessarily know the circumstances under which a game must be made available in the future. In this way, players will not be able to selectively choose games to participate in based on advanced knowledge of the outcomes. In various embodiments, a record is stored, the record including information about a game and information about circumstances under which the game is to be made available in the future for participation by others.

1.17.2. Data may be put in a queue. When it reaches the front of the queue, it must be used. In various embodiments, when a game is played or generated for the first time, data or information about the game is placed in a queue. Games from the queue are then made available for participation by secondary players based on a first-in-first-out model. Thus, a game becomes available for participation based on a relatively straightforward scheduling algorithm, and there is little discretion on the part of the casino as to when the game will become available for participation. In various embodiments, other scheduling algorithms may be used. For example, games are made available according to a last-in-first-out scheduling algorithm. Any other scheduling algorithm may be used, particularly if the casino has little control over the schedule once the outcome of a game is known.

1.17.3. One set of data may be used after and only after another set of data. In various embodiments, data about a second game may be associated with data about a first game. The association may dictate that the data about the second game may be used to allow participation in the second game by a secondary player when, and only when, the data about the first game has been used.

Similarly, data about a third game may be associated with the data about the second game, such that the data about the third game may be used when, and only when, the data about the second game has been used. In this way, through a chain of association, data about different games can be made available in sequence, allowing the secondary player to participate in a sequence of games. Data about different games may be associated in many ways. For example, data about a first game and a second game can be stored in locations with sequential addresses in a semiconductor memory. The casino may access the locations in the memory sequentially by address, and thereby make available data about the first game and data about the second game in sequence. In some embodiments, data about a given game may be associated with an index. The index may be a numerical index using integer numbers, for example. With such an indexing scheme, data about a game associated with index 235, for example, would be made available once data about a game associated with index 234 had already been made available. In some embodiments, the index may be a time. The time may represent a time during which the associated data was originally generated, or a time when the data should be made available again, for example. For instance, when the time associated with a particular set of data actually comes to match the current time, the particular set of data may be made available so that a secondary player might participate in a game generated using the data.

1.17.4. The time, date, and/or the machine that generated the data may be chosen at random. In various embodiments, a game that is made available for participation by a secondary player is selected at random using one or more randomly chosen variables or parameters. For example, a time and/or date may be chosen at random. Once a time and date have been chosen, for example, a game played at that time and date may be made available for participation by the secondary player. A gaming device, player, dealer, casino, location, and type of game may also constitute parameters that are chosen at random. In various embodiments, several parameters must be chosen at once in order to narrow down the universe of games to one particular game. For example, to determine a unique game, a time, date, and machine number may be required. In various embodiments, the parameters may be chosen by the secondary player, by the casino, or by third parties, such as regulators. Parameters may, in various embodiments, be chosen after the game has been played for the first time.

1.17.5. The secondary player may choose the time and/or machine. In various embodiments, a secondary player may choose the time, date, machine, or other parameter used to select a game. The choice may not necessarily by random.

1.17.6. Regulators may choose the time and/or machine. In various embodiments, a third party, such as a gaming regulator, may select a game that will be made available for participation by a secondary player. The third party may, in particular, have no stake in the outcome of the game. Therefore the third party may not be biased towards selecting a game that is winning for the secondary player or winning for the casino. The regulator or other third party may not necessarily select the game directly. Rather the third party may select one or more parameters (e.g., a time, date, machine number) that may be used to select a game that meets the selected parameters.

1.17.7. A player who had his player tacking card in a gaming device when the data was originally generated may be prevented from playing a game based on that data. In various embodiments, the casino may verify that the secondary player was not present for a game when it was originally played and/or had no knowledge of the result of the game. The casino may verify that the player was not staying at the casino's hotel during the day or time when the game was played. For example, the casino may check records of who had checked into its hotel on the day of the game. The casino may check to see whether the player made any bets at the casino on the day of the game. For example, the casino may check to see whether the player had a player tracking card inserted into a gaming device, or otherwise on record, for the day of the game. It will be understood that the casino may verify the presence of the player not just during a particular day, but during longer or shorter time periods as well. For example, the casino may verify that there is no record of a player's presence during an entire 5 day period surrounding the day of the game. A casino may verify that a player was not in the same city where the game was played at the time the game was played. For example, the casino may verify that there is no record of the player at any other casino affiliated with the casino (e.g., under the same ownership as the casino) during the day of the game. The casino may use any practicable means to verify that the player had no knowledge of the game or the outcome of the game.

1.17.8. Disallowing variation of bet size. In various embodiments, a secondary player may be prevented from varying the sizes of his bets over the course of a gaming session. In particular, the secondary player may be prevented from varying his bet sizes if he is participating in games that were first played in the past. The secondary player may thereby be prevented from varying his bet sizes based on advanced knowledge of the outcomes of the game. For example, the secondary player may be prevented from making larger bets when he knows the outcome of a game will be favorable, and a small bet when he knows the outcome of a game will be unfavorable.

1.17.9. Bet limits on game. In various embodiments, limits may be placed on the size of bets placed on games that have already been generated or played. For example, a secondary player may be permitted to bet no more than $1 on a game that has been played in the past. In this way, the casino's losses will be limited even if the secondary player has knowledge of the outcome of the game. In some embodiments, the total amount of bets placed on a game may be limited. For example, bets placed by all secondary players participating in a particular game may be limited to totaling less than $5.

1.17.10. Limits on winnings. In various embodiments, potential winnings or payouts for a game may be capped. For example, if the payout for an outcome of "bell-bell-bell" in an original game was 2000 coins, the potential payout for the same game may be reduced to 500 coins when a secondary player is participating in the game. This may limit the potential losses to a casino for a secondary player that has knowledge of the outcome of a game.

1.17.11. Disguising a game. In various embodiments, one or more aspects of a game may be disguised before a secondary player is allowed to participate in the game. Thus a secondary player who had previously participated in the game may still fail to recognize the game and to bet accordingly. A game may be disguised in a number of ways. One or more graphics of the game may be changed to appear differently. For example, a "cherry" symbol may appear in a different shade of red or with three cherries on a stem rather than two. In some embodiments, new symbols are substituted in for old symbols. For example, rather than "cherry" symbols, a game may use "blueberry" symbols. However, outcomes containing blueberries may result in the same winnings as did outcomes with cherry symbols in the original game. In some embodiments, sound effects are changed or disguised. For example, the background music in the disguised game may be different from that in the original game. In some embodiments, the animation or video sequences may be altered. For example, reels of a gaming device may appear to spin faster or slower, to appear jerkier or less jerky, etc., than they did in the original game. For live games, features of one or more players may be hidden or disguised. For example, the face of a dealer at a live game may be blurred out in footage of the game. In some embodiments, a new face may be super-imposed over the old face of a dealer or player so as to heighten the effect of the disguising. As will be appreciated, there are many other possible ways of disguising a game so that its outcome is not predictable to even a player who has knowledge of the original game. As described elsewhere in this document, a game may be disguised by using a different game skin while maintaining the same underlying events, outcomes, logic, etc. In some embodiments, a game may be generated and presented using at least two steps. In a first step, the results of one or more random events are determined, leading to the determination of a final outcome and a final payout for the game. In the second step, data about the results of the random event(s), the final outcome, and the final payout are used to create a graphical presentation for the player. For example, once it is determined that a player will receive an outcome consisting of three like symbols, with an associated payout of 20 coins, such data may be fed into the second step. In the second step, a graphical rendering of slot machine reels may be created, with such rendering showing the reels spinning and finally landing on an outcome with three like symbols. Further the graphical rendering may include a flashing message that says, "Congratulations, you won 20 coins!" It will be appreciated that the first step may be performed by a first device, processor, algorithm or set of algorithms, and that the second step may be performed by a second device, processor, algorithm, or set of algorithms. Accordingly, the second device, processor, algorithm, or set of algorithms may be removed and replaced with a third device, processor, algorithm, or set of algorithms. This third device, processor, algorithm, or set of algorithms may receive the same set of data from the first step as did the second device, processor, algorithm, or set of algorithms. However, the third device, processor, algorithm, or set of algorithms may perform the second step in a different fashion. The third device, processor, algorithm, or set of algorithms may thereby generate a different set of graphics, graphical renderings, or other presentation formats than did the second device, processor, algorithm, or set of algorithms. Thus, the underlying structure of the game has remained the same, but it has been presented using a different skin.

1.18. Choosing aspects of a game. In various embodiments, a secondary player may choose a game in which to participate based on one or more attributes of the game or associated with the game. The secondary player may indirectly choose the game by first choosing an attribute, and then having the opportunity to participate in one or more games having the chosen attribute. Various attributes may be especially meaningful to a secondary player and thus a secondary player may prefer to play games having those attributes. In various embodiments, the casino may select for the secondary player a game with an attribute that is anticipated to be meaningful for the secondary player. In various embodiments, the casino may provide the secondary player with the ability to search for a game based on one or more attributes of the game.

1.18.1. Choose a special date. In various embodiments, a secondary player may find a particular date to be meaningful. Thus, the secondary player may select a game that was played on the date. If the casino knows a date to be meaningful for the secondary player, then the casino may select for the player a game played on that date.

1.18.1.1. Choose the secondary player's birthday. A meaningful date for a secondary player may be a birthday. The birthday may be the birthday of the secondary player, of a relative of the secondary player's, of a pet of the secondary player's, of a friend of the secondary player's and so on. The secondary player may indicate to the casino that such a date is meaningful to the secondary player. The casino may accordingly select a game for the secondary player that was played on the date. The casino may also have a record of the secondary player's birthday based on information already provided to the casino by the secondary player. For example, the secondary player may have provided the casino with his date of birth when signing up for a player tracking card, or when taking a loan from the casino. The casino may then select, without request from the secondary player, a game that was first played on the birthday of the secondary player.

1.18.1.2. Choose a date on which a big jackpot was won. In various embodiments, a secondary player may wish to play a game that was first played on the date that a large payout, such as a jackpot, was won. This may give the secondary player the opportunity to participate in the game in which the jackpot was won. The secondary player may indicate to the casino a desire to play a game that was first played on the day of a big jackpot. The casino may then allow the secondary player to participate in one or more games played on the day of the jackpot. The secondary player may not himself know the date when a big jackpot was won. Thus, the secondary player may request that he be allowed to participate in games from the same date as the date that the last big jackpot was won.

1.18.1.3. Choose a date when the progressive was still big. The secondary player may have a shot at the large progressive. In various embodiments, a secondary player may wish to have the opportunity to win a large progressive jackpot. As is well known, the size of a progressive jackpot may vary over time. In general, as time passes without a progressive jackpot being won, the progressive jackpot becomes larger. The current size of a progressive jackpot may not be large enough to satisfy the desires of a secondary player. Therefore, the secondary player may wish to participate in a historical game from a time that the progressive jackpot was larger. Accordingly, the secondary player may request to participate in a game that was first played at a time the progressive jackpot was in excess of a certain threshold. The casino may, accordingly, allow the secondary player to participate in such a game.

1.18.2. Choose a gaming device. In various embodiments, a secondary player may search for a gaming device having desired attributes or characteristics. Upon finding a gaming device with desired attributes or characteristics, the secondary player may choose to participate in games played at the gaming device. The secondary player may search for a gamine device using a search form. In the search form, the player may select from among various characteristics of a gaming device, some of which are described below.

1.18.2.1. A secondary player may search for a gaming device based on the historical results of the gaming device. For example, a secondary player may search for a gaming device with one or more of the following characteristics: (a) the gaming device has paid more than X amount of money in the last Y amount of time; (b) the gaming device has paid more than X amount of money in general; (c) the gaming device has paid X amount of in excess of what it has taken in, in the last Y amount of time; (d) the gaming device has made X amount in excess of what it has taken in, in general; (e) the gaming device has generated winning games for players in X % of its games in the last Y period of time; (f) the gaming device has generated winning games for players in X % of its games out of the last Y games; (g) the gaming device generated winning games for players in X of its most recent games; (h) the gaming device has paid X payouts greater than Y in the last Z games; (i) the gaming device has paid X payouts greater than Y; (j) the gaming device has paid a jackpot in the last X days (or other time period); (k) the gaming device has paid X jackpots in general; (l) the gaming device has entered X number of bonus rounds in his last Y games; (m) the gaming device has entered X number of bonus rounds ever.

1.18.2.2. A secondary player may search for a gaming device based on the type of game or based on a characteristic of a game played at the gaming device. A secondary player may search for a gaming device with one or more of the following attributes: (a) the gaming device uses mechanical reels; (b) the gaming device uses video reels; (c) the gaming device has three reels; (d) the gaming device has five reels; (e) the gaming device has X number of reels; (f) the gaming device accepts a particular denomination of bets (e.g., penny, nickel, quarter, dollar); (g) the gaming device has X number of pay-lines; (h) the gaming device has 1 pay-line; (i) the gaming device has 3 pay-lines; (j) the gaming device has more than 1 pay-line; (k) the gaming device allows multiple bets per pay-line; (l) the gaming device is made by a particular manufacturer; (m) the gaming device or a game at the gaming device was introduced in the last X years (e.g., the game is a new game); (n) the gaming device has a particular theme (e.g., I Love Lucy, Regis Philbin); (o) the gaming device features a slot game; (p) the gaming device features a video poker game; (q) the gaming device features video blackjack; (r) the gaming device is part of a particular cluster of gaming devices (e.g., a cluster of gaming devices where an outcome at one gaming device may influence an outcome at another gaming device in the cluster); and so on.

1.18.2.3. A secondary player may search for a gaming device based on one or more payouts that may be provided by the gaming device. Such payouts may be contingent on a primary player of the gaming device obtaining a particular outcome at the gaming device. A secondary player may search for a gaming device that has a top payout of over X times a bet, that has a payout of over X amount, and/or that has at least X payouts over Y amount. A secondary player may search for a gaming device that has more than X outcomes that are winning and/or a gaming device that has more than X outcomes that pay more than Y. A secondary player may search for a gaming device that has a particular or a particular range of payout frequency. For example, a secondary player may search for a gaming device that pays, on average, between once every five games and once every seven games.

1.18.3. A simulated game matches search criteria. In various embodiments, a secondary player may specify search criteria in order to find a game in which to participate. The casino may then provide the secondary player with the opportunity to participate in a simulated game which matches the search criteria. For example, a secondary player may search for a game of blackjack in which the dealer up-card is a six. The casino may then offer the secondary player an opportunity to participate in a simulated game of blackjack in which the dealer has an up-card of six. The simulated game may have been simulated in the past. For example, the casino may have simulated numerous games in the past and stored data about the games. The casino may then find one of the games from the stored set of games such that the found game matches the secondary player's search criteria. The casino server may then offer the secondary player the opportunity to participate in the found game. In the aforementioned example, the casino server may offer the secondary player the chance to participate in a simulated game in which the dealer had an up-card of six. In various embodiments, a simulated game may include a game where player decisions were made by a computer routine. In various embodiments, a simulated game may include a game in which random events were generated using a computer routine. In various embodiments, a secondary player may perform a search for a game of a primary player matching certain criteria. The casino may, once the search criteria have been specified by the secondary player, generate one or more simulated games matching the search criteria. For example, the secondary player may search for a series of games in which a primary player has won 10 consecutive games in a row. The casino may thereupon simulate a series of games. The casino may continue simulating games until the simulated primary player has won 10 games in a row. The casino may then, for example, provide the secondary player with the opportunity to participate in the next simulated game. In various embodiments, the casino may construct one or more games that match search criteria of the secondary player. For example, if the secondary player is interested in participating in a game of craps in which the first roll of the dice is an eight, then the casino may begin a simulated game and force the first roll to be an eight. Subsequent rolls in the game may be generated at random. In embodiments described herein, any searches performed by a secondary player for a particular type of game may be satisfied by simulated games and/or by games constructed by the casino server. In various embodiments the odds, the payouts, the rules, and/or the required bet amount for a game may be changed when a secondary player has specified a criterion that the game must meet. For example, if the secondary player specifies a game of blackjack in which the primary player has a good starting hand (e.g., an 11 point total) then the payout for a winning hand may be reduced.

1.18.4. Search for a trend. In various embodiments, a secondary player may search for a particular trend or pattern among one or more games. For example, a secondary player may search for any string of 10 consecutive games played by the same primary player in which the primary player won all 10 games. Once finding the trend, the secondary player may participate in the game immediately following the trend. For example, a secondary player may find a trend of spins at a roulette wheel in which three consecutive spins resulted in the number 13. The secondary player may then participate in the spin of the roulette wheel that immediately followed the three spins in which the number 13 came up. The secondary player may not know the result of the spin which immediately followed the three spins where a 13 came up. A secondary player may search for various trends, including: (a) a series of consecutive games played by the same primary player in which the primary player has lost all the games; (b) a series of consecutive games played by the same primary player in which the primary player has won all the games; (c) a series of consecutive games played by the same primary player in which the primary player has tied in all the games; (d) a series of consecutive games played by the same primary player in which the primary player has generated at least a predetermined amount of net winnings; (e) a series of consecutive games played by the same primary player in which the primary player has generated at least a predetermined amount of gross winnings; (f) a series of consecutive games played by the same primary player for which a particular symbol (e.g., "bell") has occurred in every game; (g) a series of consecutive games played by the same primary player in which the primary player has alternated every game between winning and losing; (h) a series of consecutive spins at of a roulette wheel that have resulted in the same outcome (e.g., the number 4); (i) a series of consecutive spins at of a roulette wheel that have resulted in the same type of outcome (e.g., a red outcome); (j) a time period (e.g., a five-minute time period) during which 80% of blackjack games played by any primary player were won; (k) a time period (e.g., a one-hour period) during which three jackpot outcomes were won at slot machines in a particular casino; (l) a series of games (e.g., games played at a particular table at a casino) in which a particular starting hand occurred at least 20% of the time (e.g., in which primary players received a blackjack at least 20% of the time); and so on. In various embodiments, a secondary player may search for a primary player who is the biggest loser within a given population during a given period of time. For example, a secondary player may search for a primary player who has lost the most during a one-hour period of time at the reel slot machines. In various embodiments, a secondary player may search for a primary player who is the biggest winner within a given population during a given period of time. In various embodiments, a secondary player may search for a primary player who has had the most outcomes paying more than $50 within a given population during a given period of time. In various embodiments, a secondary player may search for a primary player who is the biggest loser over his entire playing session when compared to any other primary player. In various embodiments, a secondary player may search for a primary player who is the biggest loser over his entire playing career, at least at a particular casino. In various embodiments, a secondary player may search for a trend that is based on an area of a casino. For example, a secondary player may search for an area of a casino such that games played in that area over the last hour have resulted in net winnings for all players of $3000. In various embodiments, a secondary player may search for a trend that is based on a type of game. For example, the secondary player may search for a type of game such that, in the last X minutes, games of that type have resulted in average winnings for primary players of more than $20. In various embodiments, a secondary player may search for a trend that is based on primary players with a certain characteristic. For example, the secondary player may search for a trend in which primary players from Arkansas have won, on average, more than $50 per player over the last hour.

1.18.5. Choose a primary player. In various embodiments, a secondary player may search for a primary player having desired attributes or characteristics. Upon finding a primary player with desired attributes or characteristics, the secondary player may choose to participate in games of the primary player. The secondary player may search for a primary player using a search form. In the search form, the player may select from among various characteristics of the primary player, some of which are described below. For example, the secondary player may enter an age or age range desired in a primary player. The secondary player may also select a characteristic of a primary player from a menu. For example, the secondary player may select one of fifty states from a menu, the state indicating a desired residence location for a primary player. As will be appreciated, a secondary player may search for a primary player in many other ways. For example, a secondary player may communicate to a casino representative (e.g., via text message) a description of a primary player. The casino representative may then check records of people currently checked into its hotel or currently playing at gaming devices (e.g., with tracking cards inserted), and may attempt to locate a person matching the description provided by the secondary player. In some embodiments, a secondary player may seek a particular and unique individual, i.e., the secondary player may submit a description that can only be satisfied by one person in the world. For example, the secondary player may submit a name. In some embodiments, the secondary player may submit a description that may be satisfied by anyone or a plurality of primary players. The secondary player need not have a particular individual in mind.

1.18.5.1. A secondary player may search for a primary player based on the historical results of the primary player. For example, a secondary player may search for a primary player with one or more of the following characteristics: (a) the primary player has won more than X amount of money in the last Y amount of time; (b) the primary player has won more than X amount of money in general; (c) the primary player has made X amount of profits in the last Y amount of time; (d) the primary player has made X amount of profits in general; (e) the primary player has won X % of his games in the last Y period of time; (f) the primary player has won X % of his games out of the last Y games; (g) the primary player won X of his most recent games; (h) the primary player has won X payouts greater than Yin the last Z games; (i) the primary player has won X payouts greater than Y; (j) the primary player has won a jackpot in the last X days (or other time period); (k) the primary player has won x jackpots in general; (l) the primary player has used optimal strategy in his last X games; (m) the primary player has used good or expert level strategy in his last X games; (n) the primary player has entered X number of bonus rounds in his last Y games; (o) the primary player has entered X number of bonus rounds ever.

1.18.5.2. A secondary player may search for a primary player based on a historical relationship between the primary player and the secondary player. The secondary player may search for a primary player in whose game or games the secondary player has previously participated. The secondary player may search for a primary player, where, participating in the games of the primary player: (a) the secondary player has won a jackpot; (b) the secondary player has made a profit; (c) the secondary player has entered X number of bonus rounds; (d) the secondary player has won in X of the last Y games; (e) the secondary player has won X % of the last Y games; (f) the secondary player has won X payouts more than Y amount; and so on. The secondary player may also search for a primary player where the secondary player has participated in more than X number of games with the primary player.

1.18.5.3. A secondary player may search for a primary player based on demographic characteristics of the primary player. For example, the secondary player may search for a primary player based on one or more of the primary player's: (a) age; (b) race; (c) marital status; (d) number of children; (e) number of grandchildren; (f) religion; (g) place of birth; (h) place of residence; (i) gender; (j) occupation; (k) income; (1) disability status; (m) education level; (n) high school attended; (o) college attended; and so on. For example, the secondary player may wish to participate in games of a primary player who shares one or more demographic characteristics with the secondary player.

1.18.5.4. A secondary player may search for a primary player based on hobbies enjoyed by the primary player. For example, the secondary player may search for a primary player that enjoys a particular game or sport, or for a primary player that is a fan of a particular sports team.

1.18.5.5. A secondary player may search for a primary player with whom the secondary player has some prior connection or relationship. The secondary player may search for a primary player in whose games the secondary player has previously participated. The secondary player may search for primary players in whose game the secondary player has previously won money, won a jackpot, won a large payout, or had some other result of interest to the secondary player.

1.18.6. In various embodiments, a secondary player may search for a particular game based on attributes of the game. The search may be particular to an individual game. For example, a search may distinguish between two games played by the same primary player at the same gaming device. In some embodiments, a secondary player may search for a game in which a certain amount has been bet. For example, a secondary player may search for a game in which three coins have been bet. The bet of three coins may make the primary player of the game eligible to win the jackpot. The secondary player may search for a game in which X number of pay-lines are activated, or a game in which X number of hands of video poker are being played simultaneously. A secondary player may search for a game based on the time or date on which the game was played.

1.18.6.1. In some embodiments, a secondary player may search for a game based on events that transpire within the game. For example, the game may have already occurred, or the game may be in process at the time of the secondary player's search. A secondary player may search for a game in which: (a) a particular set of cards have been dealt (e.g., a video poker game where a pair has been dealt in an initial hand, or a blackjack hand where cards totaling 11 have been dealt as a starting hand); (b) a particular symbol or symbols of an outcome have been determined (e.g., two bar symbols have appeared on the reels of a gaming device out of an outcome consisting of three symbols); (c) a bonus round has been reached; and/or (d) a certain level of a bonus round has been reached.

1.18.7. Providing a game for the secondary player to participate in. At some point, the secondary player may be ready to participate in a game with certain attributes. The attributes may be attributes specified by the secondary player. For example, the secondary player may have searched for a game with the certain attributes, or otherwise provided an indication of a desire to participate in a game with the certain attributes. In some embodiments, the casino may, for other reasons, wish to have the secondary player participate in a game with the certain attributes.

1.18.7.1. An actual historical game is provided. Given a set of attributes or characteristics, a casino may retrieve data about a historical game with the given set of attributes or characteristics. The historical game may be a game that was actually played by a real human player. For example, when a secondary player has indicated a desire to play in a game of video poker that was played by a primary player aged 60 years old, the casino may retrieve data about a game that was actually played in the past by a 60 year-old primary player and that was played at a video poker machine. The data retrieved may be used to display information about the game to the secondary player (e.g., to show screen shots of the cards being dealt in the game), to determine what the outcome of the game was, to determine whether the secondary player is a winner based on bets placed on the game by the secondary player, and to determine an amount to pay the secondary player. Data about historical games may be stored in a database or in any other storage means. Data about historical games may be indexed by different attributes, such as the age of the player or the type of game. Games may thus be searched by attributes, and data about games with attributes desired by a secondary player may be retrieved.

1.18.7.2. A historical simulated game is provided. Given a set of attributes or characteristics, a casino may retrieve data about a historical game that was simulated. The game may not ever have been played by a real human being. In some embodiments, the outcome of the game may have been determined prior to play by a real human being. However, subsequent to the outcome being generated, a person (e.g., a secondary player) may have participated in the game. As with a historical game originally played by a live player, data about a historical game that was simulated may be stored in a database and indexed by attributes. Subsequently, data about historical games may be searched according to desired attributes. The data may then be used to recreate the game for a secondary player, and to determine an outcome and an amount to be paid to a secondary player.

1.18.7.3. A current actual game is provided. Given a set of attributes or characteristics, a casino may determine a current game in progress with the given set of attributes or characteristics. For example, a 60 year-old primary player from Wisconsin may currently be involved in a game at a video poker machine in which an initial hand with a pair has been dealt. The secondary player may be allowed to participate in the game in progress. For example, the secondary player may be allowed to place a bet on what the final outcome of the game will be. In various embodiments, the secondary player need not have the benefit of the same pay table as does the primary player, since the secondary player is placing a bet in the middle of the game and has more information than the primary player did at the start of the game.

1.18.7.4. A current simulated game is provided. Given a set of attributes or characteristics, a casino may simulate a game having the given attributes or characteristics. The casino may, for example, use a computer algorithm to determine cards to deal in a card game (e.g., video poker) or to determine symbols to show in a simulated reel slot machine. For example, if a secondary player desires to participate in a game of video poker, the casino may simulate a game of video poker. If the secondary player desires to participate in a video slot machine game, the casino may simulate a video slot machine game. In various embodiments, the casino may use algorithms to simulate table games as well as games typically played on a gaming device. For example, the casino server may simulate craps, blackjack, or poker. If other players would normally be present in a game, the casino may use computer algorithms to simulate the decisions that would have been made by humans. For example, in order to simulate a game of poker, the casino may use algorithms designed to bet, call, fold, raise, or check, according to certain pre-programmed rules. In some embodiments, a secondary player may wish to participate in a game in which certain symbols or outcomes occur. The casino may, in some embodiments, simulate multiple games until the desired symbols or outcomes occur. The secondary player may have the opportunity to participate only in the game, of the multiple games, in which the desired symbols or outcomes occurred. For example, the secondary player may indicate a desire to participate in a game in which three-of-a-kind was dealt on the initial hand in a game of video poker. The casino may deal a number of simulated hands of video poker. Only when the casino finally deals an initial hand with three-of-a-kind, e.g., due to random chance, does the casino allow the secondary player to then place a bet and to receive winnings for the final outcome of the game. In some embodiments, the casino may accept a bet from the secondary player first, simulate multiple games until a game with desired characteristics is simulated, and then pay the player based upon the outcome of the game with the desired characteristics. In some embodiments, the simulation may begin with a game of the desired attributes. For example, if a secondary player desires to play in a game of video poker with three-of-a-kind dealt on the starting hand, then the simulation may begin by immediately dealing three-of-a-kind. The simulation may randomize the remaining cards (e.g., shuffle the cards remaining after the three cards of the same rank have been dealt, the remaining cards completing a standard deck of 52 cards). The game may continue with two additional cards dealt from the randomized deck to complete the initial hand, followed by the discarding of one or two cards, followed by the replacing of the discarded cards with new cards from the randomized deck. In various embodiments, the secondary player may or may not have the opportunity to make decisions in a simulated game. For example, in some embodiments, the secondary player may choose which cards to discard in a game of video poker. In some embodiments, the cards that are discarded may be chosen automatically, e.g., by a computer algorithm employing optimal poker strategy.

1.18.7.5. An alert is provided for when a game with desired characteristics will be played. Given a set of attributes or characteristics, a casino may determine when such a game will be played or will be likely to be played. For example, a secondary player may wish to participate in a game played by a primary player at a 3-reel slot machine, the primary player having three kids and a birthday in April. The casino may determine that a primary player with three kids and a birthday in April is indeed seated at a 3-reel slot machine. The primary player may have been playing for 20 minutes already, and presumably will continue to play. Therefore, a secondary player may be permitted to participate in games of the primary player from that point forward. The casino may alert the secondary player that a primary player with desired characteristics has been found and that the secondary player may begin placing bets in the games of the primary player. Further, the casino may begin transmitting information about the games of the primary player to the secondary player.

1.19. A secondary player participates in a game where a progressive jackpot is won. In various embodiments, a secondary player may participate in a game for which the primary player is eligible to win a progressive jackpot. However, in various embodiments, a progressive jackpot constitutes a single pool of money, and therefore cannot be paid in its entirety to multiple different players.

1.19.1. The secondary player gets a fixed substitute. In various embodiments, when a primary player wins a progressive jackpot, a secondary player participating in the same game receives a fixed payment. The fixed payment may be some predetermined amount, such as $10,000.

1.19.2. The secondary player gets a fixed percentage. In various embodiments, when a primary player wins a progressive jackpot, a secondary player participating in the same game may receive a percentage of the progressive jackpot.

1.19.2.1. The primary player gets the full amount, or less so the secondary player can be paid. In various embodiments, when a secondary player receives a percentage of a progressive jackpot won by a primary player, the amount received by the primary player from the jackpot may be correspondingly reduced. For example, if the secondary player receives X % of a progressive jackpot, the primary player may receive 100%–X % of the progressive jackpot. In various embodiments, for each bet placed on a game with a progressive jackpot, a portion of the bet is contributed towards increasing the size of the progressive jackpot. Thus, when a primary player and a secondary player each place a separate bet on a game, a portion of the primary player's bet may add to the size of the progressive jackpot, and a portion of the secondary player's bet may contribute to the size of the progressive jackpot. For each game, a fixed contribution to the progressive jackpot may be required. Thus, if both a primary player and a secondary player participate in a game, the contribution from the primary player towards the progressive jackpot may be less for that game than if only the primary player were participating in the game. In various embodiments, the primary player may receive the full amount of the progressive jackpot. The amount received by the secondary player may be over and above the amount paid out to the primary player. Even so, the secondary player may receive an amount equal to a predetermined percentage of the progressive jackpot, such as 10% of the progressive jackpot.

1.19.3. Part of progressive amount is set aside for secondary players before it is paid out. In various embodiments, a progressive jackpot is divided into two or more portions. A first portion is available to be won by primary players. A second portion is available to be won by secondary players. If a progressive jackpot is won in a game, a primary player participating in the game would win the portion of the progressive jackpot available to primary players, and a secondary player participating in the game would win the portion of the progressive jackpot available to secondary players. If there is no secondary player for the game, then the portion of the progressive jackpot available for secondary players may remain unclaimed.

1.19.4. There is a progressive just for secondary players. In various embodiments, a progressive jackpot (other similar terms used herein may include "progressive prize," "progressive prize pool," "progressive pool," "progressive payout") may grow from the contributions of only secondary players. The progressive jackpot may be available to be won only by secondary players. For example, for each bet a secondary player puts on a particular type of game, a portion of the bet may be set aside and added to a progressive jackpot. If a secondary player participating in the particular type of game later wins the progressive jackpot, the jackpot may go to the secondary player. The size of the progressive prize pool may then go down to zero. In some embodiments, once a progressive prize pool has been claimed, the next pool may be seeded with some money by a casino, e.g., with $10,000, so as to garner interest from secondary players. In various embodiments, a display visible by a secondary player may track the size of a progressive. For example, a secondary player may participate in games using a mobile device (e.g., a mobile device as set forth in Nevada bill AB471). The mobile device may maintain on its display screen a running tally of the size of the progressive pool.

In various embodiments, two or more separate progressive jackpots may be available for secondary players. In various embodiments, a secondary player may be eligible to win a progressive prize based on the location or geographic region from which the secondary player participates in games. For example, a secondary player participating while seated in Casino A may be eligible for a first progressive prize pool of $10,000. Another secondary player participating while seated in Casino B may be eligible for a second progressive prize pool of $20,000. A progressive prize pool may be available to be won by a particular secondary player based on one or more characteristics or circumstances of the secondary player, such characteristics or circumstances including: (a) a demographic of the secondary player, such as an age, birthday, birthplace, marital status, educational status, and so on (e.g., there may be a first progressive pool for secondary players aged 60 or over and a second progressive pool for secondary players aged 59 or under); (b) the particular type of game the secondary player is participating in (e.g., there may be separate progressive prizes for slot machine games and video poker games); (c) the location or geographic region from which the secondary player is participating (e.g., there may be different progressive pools for different casinos, different cities, different states, etc.); (d) the time or date during which the secondary player is participating (e.g., there may be a different progressive prize offered during each six-hour period in a day); (e) the identity of the primary player (e.g., there may be a first progressive prize pool associated with the games of a first set of primary players, and a second progressive prize pool associated with a second set of primary players); (f) a characteristic or circumstance of the primary player (e.g., demographic, location, etc. of the primary player); (g) a bet being made by the secondary player (e.g., a secondary player may be eligible for a first progressive prize if his bet is more than $3, and a second progressive prize if his bet is less than $4); and so on. In various embodiments, a progressive prize pool may be associated with a given period of time. For example, a progressive prize pool may be associated with a particular day. The progressive prize pool may be associated with a guarantee that it will be won on its associated day (or its associated period of time). According to the guarantee, the progressive prize may be claimed by the first secondary player to achieve outcome A, the first secondary player to achieve outcome B if no secondary player achieves outcome A, the first secondary player to achieve outcome C if no secondary player achieves outcomes A or B, and so on. In various embodiments, a progressive prize pool may have its probability of occurrence set so that it is likely the pool will be won during an associated time period. For example, if it is anticipated that secondary players will play 10,000 games during a given time period in which they have a chance of winning a progressive, the probability of winning for each game may be set at 1/5000. The probability that the progressive will be won during the time period may then be approximately 86%. In some embodiments, as the casino may be aware in advance of the outcomes of games to be played by a secondary player, the casino may intentionally offer for play at least one game that will result in a progressive prize being won. One such game may be offered during every period in which a progressive prize is guaranteed to be won. In various embodiments, two or more progressive prize pools may be simultaneously available to be won by a secondary player. One progressive pool may be associated with a relatively shorter period of time, while another progressive pool may be associated with a relatively longer period of time. For example, a first progressive prize pool may be won, on average, once a year. In fact, the first progressive prize pool may be guaranteed to have a winner every year. A second progressive prize pool may be won, on average, once a day. A secondary player may be eligible to win either of the progressive prize pools in the same game. In some embodiments, a secondary player may win only the first progressive prize pool while participating in a first game. In some embodiments, a secondary player may be eligible to win only the second progressive prize pool while participating in a second game.

1.19.5. A secondary player cannot play games with progressives. In various embodiments, secondary players may not be allowed to participate in games with progressive payouts.

1.19.6. A secondary player wins the full amount of the progressive. In various embodiments, when a progressive payout is won in a game, the secondary player may receive the full amount of the progressive. For example, suppose a primary player wins a progressive jackpot in a game for which the progressive jackpot is $100,000. The primary player may receive $100,000. The secondary player may also receive $100,000.

1.19.7. Making up extra funds to pay secondary players. In various embodiments, a progressive payout (e.g., a progressive jackpot) may consist of funds held in reserve for a time when the jackpot must be paid out. If a progressive jackpot is won in a game where a secondary player is participating, the progressive jackpot may go to the primary player and additional funds must be obtained by the casino to pay the secondary player. In various embodiments, the casino may pay the secondary player out of a separate pool of funds, such as an account used by the casino for general business expenses. In some embodiments, the secondary player may receive a promise of payment. The secondary player may receive a portion of contributions towards future progressive payouts. For example, the secondary player may receive 50% of all portions of bets withheld for a subsequent progressive jackpot until such time as the subsequent progressive jackpot is won.

1.20. Anti-vulture provisions. A secondary player may be prevented from playing in games with a positive expected value. Various situations may arise with respect to a gaming device or with respect to a live table game where betting circumstances are favorable to a player. Favorable circumstances may include circumstances where a player might expect to receive, on average, more than 100% of his bet from winnings in a game. For example, if a progressive jackpot or other payout at a slot machine reaches a certain level, the slot machine may return, on average, more than 100% of an amount bet. In some slot machines, certain symbols, tokens, or other objects may be accumulated from game to game. For example, Double Diamond Mine® slots, made by IGT, allow a player to accumulate diamond symbols from game to game. Once 10 diamond symbols from a particular reel have been accumulated, the player wins a payout. A slot machine in which a number of such objects have been accumulated may return, on average, more than 100% of an amount bet. In games of blackjack, such as in live table games of blackjack, a game may return more than 100% of an amount bet if the cards remaining in a deck have a predominance of one type of card (e.g., of high cards).

In various embodiments, a secondary player may be allowed to search for historical games in which the expected payout is more than 100% of the bet. For example, the secondary player may search for games at a Double Diamond Mine® slot machine where nine diamond symbols for each reel have already been accumulated. In another example, the secondary player may be allowed to search for gaming devices in which a progressive jackpot has exceeded a certain threshold. The secondary player may be allowed to participate in such games. However, in some embodiments, the secondary player may be prevented from participating in games in which an expected payout is more than 100% of the bet. In some embodiments, a secondary player may only be allowed to participate in games returning more than 100% of an amount bet if such games arise during a longer sequence or session of play. For example, a secondary player may be allowed to participate in a Double Diamond Mine® slot game for which nine diamond symbols have accumulated for each reel only if the secondary player has already participated in immediately prior games that had occurred at the same slot machine.

Tracking of game data usage. In some embodiments, a game that was originally played at a first casino or other establishment may subsequently be recreated at a second casino or establishment. For example, a secondary player at a second casino may participate in a game that was originally played at a first casino. The second casino may derive revenue, profit, or other financial gain from the recreation of the game at the second casino. For example, when a secondary player places a bet on the game at the secondary casino, the secondary casino may expect to win some portion of the bet, on average. In some embodiments, the second casino may compensate the first casino for the privilege of using or recreating the game that was first generated or played at the first casino. In various embodiments, the use of games for participation by secondary players may be tracked. The tracking of such use may allow a first casino (e.g., the casino that originally generated a game) to track how much it is owed, and a second establishment (e.g., the casino that recreated the game for play by the secondary player) to track how much it owes. The use of a game at a casino may be tracked in a number of ways. Data related to the game, e.g., a game identifier, may be stored in a database. A time during which the game was recreated may be stored. Other items stored may include: (a) an identity of a secondary player who played the game; (b) an amount bet on the game; (c) an amount won or lost by the casino recreating the game; (d) a type of bet placed on the game; (e) a number of secondary players who participated in the game; (f) a location of a secondary player who bet on the game; (g) an amount owed to the casino that originally generated the games; and so on. Data about individual games may not be stored, in some embodiments. Rather, data about blocks or groups of games may be stored. For example, a casino may store a record indicating that a group of 1000 games was recreated during the afternoon of Aug. 17, 2010, and that a total of $40,000 was bet on the games.

In various embodiments, a casino that used or recreated one or more games may send a report about the use of the games to the casino that originally generated the games. For example, the casino that recreated the games may send a printed report with each line on the report detailing, e.g., a particular game, a particular time the game was recreated, an amount bet, and an amount owed to the casino that originally generated the games. The report may be a paper or electronic report. The report may be sent by postal mail, email, fax, via download from the Internet, or via any other means. A report may cover a single game or a group of games. A report may be sent in real time (e.g., a report about the use of a game may be sent to the casino that originated the game as the game is used or immediately after the game has been used), periodically (e.g., every hour), or once (e.g., at the end of a period for which the casino using the games is authorized to use the games by the casino that first generated the games).

Data stored by a casino relating to the use or re-creation of games within the casino may be obtained from devices used for play by secondary players. For example, a terminal at which a secondary player participates in a game may store and/or transmit various data to the casino server, such as amounts bet by the secondary player, which games the secondary player played, and so on.

In various embodiments, a casino that uses data about games originally generated at another casino may track or record the use of various images associated with the game. Based on the use of images, royalties may be paid to copyright holders of the image. Also, the casino that originally generated the game may track the use of images from the game.

1.21. Bucket shop paradigm. Under this paradigm an establishment hopes to invest the least amount possible in casino infrastructure, including games, and even licenses to be a casino operator. Instead, the establishment plans to just reuse data from a real casino, set up a nice façade, and open up for business. In various embodiments, an operator may set up a gaming facility which uses solely or predominantly games or outcomes that have already been generated. The operator may thereby save various costs, possibly including the costs of purchasing gaming equipment, costs of obtaining accounting software and other infrastructure, and costs associated with meeting various regulations. For example, by reusing outcomes that have already been generated, an operator need not buy expensive gaming machines to generate original outcomes. Further, the operator need not submit such gaming machines for regulatory approval or inspection. In some embodiments, an operator of a facility that only reuses games and outcomes already generated may not be required to obtain the same types of regulatory approval as does a facility that generates original games and outcomes. The operator of the facility that reuses games and outcomes need not, in some embodiments, submit devices used by secondary players to the same process of regulatory approval that ordinary gaming devices (e.g., slot machines) are subject to. Rather the regulatory approval process may be simpler for the devices used solely by secondary players. In some embodiments, an entire facility that only reuses games or outcomes may not be subject to the same regulatory processes as is a facility that generates original outcomes. Rather, the regulatory processes may be simpler for facilities that solely reuse games or outcomes.

In some embodiments, by using outcomes already generated, an operator may use accounting data that has already been generated to account for amounts received, won, and lost based on the outcomes. Thus, the operator may save on accounting software and other accounting infrastructure, such as networks or intranets for conveying accounting related information.

1.21.1. Use of shell machines that simply display outcomes from other machines. In various embodiments, an operator may install machines or devices with simplified functionality. The machines may include currency acceptors, credit card acceptors, or other acceptors for consideration to be used for betting purposes. The machines may include output devices, such as microphones for audio output and display screens for video or graphical output. The machines may further include dispensers for cash, coins, currency, tokens, chips, cashless gaming receipts, or other consideration. Consideration may be paid to a player based on amounts won while participating in games or based on amounts remaining from an initial deposit made by a player. The machines may further include media players and/or media storage devices. For example, the machines may include DVD players or VHS players. The machines may include VHS tapes, DVDs, CDs, flash memory, or other media storage devices. The machines may further include buttons, handles, and touch screens for use by a player to input information, such as amounts to bet. The machines may further include network interfaces for sending and receiving information via a network, such as an intranet or internet. Network interfaces may include wireless network interfaces, such as antennae. Operationally machines according to various embodiments may receive a record of historical games, stored on a media device, such as a DVD. The machines may receive currency from a player. The machines may then receive an indication of an amount to bet. The machines may then receive an initiation signal for a game from the player. The player may convey the initiation signal, for example, by pressing a button labeled "spin" on the machine. The machine may then play for the player a video or other depiction of a stored game from the DVD. For example, the machine may play a 10-second video clip from the DVD, the video clip depicting a historical game that occurred at an actual slot machine. The machine may determine an outcome of the game. For example, the DVD may store, in association with each game, information about a payout or payout ratio associated with the game. Based on the information about the payout, the machine may pay the player. The player may be paid by, e.g., dispensing currency through a dispenser of the machine, or by adding to a balance of player credits stored on the machine. In various embodiments, the machine does not itself generate any outcomes or games. The machine merely replays games that have been previously generated. In various embodiments, the machine may recreate games based on a limited amount of information about the games. For example, the machine may receive information about the outcome of a game. The machine may then display an animated sequence depicting slot reels spinning and stopping to show the outcome. In some embodiments, the machine need not store information about prior games locally on the machine. Rather, the machine may receive information about historical games via the network. As information about historical games is received, the machine may recreate the historical games for the benefit of a secondary player at the machine.

1.21.2. Simplified regulatory license. An operator is just reusing data that's already been certified. There is no need to recertify data. In various embodiments, an operator using historical outcomes may operate without one or more licenses required of a typical gaming operator. A special license may be granted for operators who use only historical outcomes. A special license may be granted for operators who use only historical outcomes which have come from licensed gaming establishments.

1.21.3. Reuse of accounting data. There is no need for an operator to generate his own accounting data. In various embodiments, a casino operator may generate a number of original games or outcomes. Based on the outcomes, the casino may generate a record of amounts won, amounts lost, amounts collected, amounts owed in taxes, and so on. Such data may constitute accounting data. The casino operator may subsequently share such accounting data with a second operator who reuses the outcomes generated by the first casino operator. Since the outcomes used are the same, the accounting data required may be the same or similar. Therefore, in some embodiments, the second operator may receive the accounting data from the first casino operator and reuse the accounting data for its own records.

1.21.4. Pre-inspection of the data is not allowed, as then the bucket shop could be accused of knowing the outcomes in advance. In various embodiments, an operator using historical games or outcomes is forbidden by law, regulation, convention, or other policy from obtaining knowledge about the games or outcomes prior to the participation in the games by a secondary player. In this way, the operator may be discouraged from selectively making available games or outcomes that are unfavorable to the operator.

1.22. Multi-Tiered Poker Game. In various embodiments, a poker game occurs. The poker game may include a number of live players at a table at a casino. The poker game itself may be referred to as a first tier game. Based upon the first tier game, a second tier game may be played. The second tier game may involve a different set of players. In some embodiments, the second tier game includes one player for each player in the first tier game. Each person in the second tier game may be associated or matched with a person in the first tier game. In various embodiments, a person in the second tier game may bet on what his associated player will do in the first tier game. For example, the player in the second tier game may bet that his associated player in the first tier game will check, bet, raise, call or fold. Further, the person in the second tier game may place a bet on the amount that the associated person in the first tier game will bet. For example, if Joe in the second tier game is associated with Sue in the first tier game, then Joe may bet that Sue will raise by at least 30 chips. In various embodiments, a person in the second tier game cannot communicate with his associated person in the first tier game. In various embodiments, no one in the second tier game can communicate with anyone in the first tier game, and vice versa. In various embodiments, a person in the second tier game knows the cards of the associated person in the first tier game but does not know the cards of any other player in the first tier game.

In various embodiments, a person in the second tier game may also check, bet, raise, fold, or call against other people in the second tier game. He may bluff and hope other people in the second tier game will fold. Should two or more players remain in a second tier game once the first tier game has reached its conclusion, a pot in the second tier game may be awarded to a person in the second tier based on the results of the first tier game. Namely, if a person in a second tier game is associated with the person in the first tier game who won the first tier game, then the person in the second tier game will also win in the second tier game. In some embodiments, the result or outcome of the second tier game is decided as if each person in the second tier game held the cards of his associated person in the first tier game. In various embodiments, if a player in the first tier game folds, the associated player in the second tier game folds automatically, and thus loses in the second tier game.

In various embodiments, there may be higher tiers. For example, a third tier may include the same number of players as are in the second tier (or, equivalently, the first tier). Each player in the third tier may be associated with a player in the second tier. Thus, the player in the third tier may automatically be associated with the person in the first tier to whom is associated the player in the second tier that is associated with the player in the third tier. In other words, one player in each tier may be associated with a particular hand of cards, and all such players may be associated with one another. Players in the third tier may place bets on what bets will be made by associated players in the second or first tiers, and on how much will be bet by such players. Further players in the third tier may make bets against one another to be decided by results of lower tiers. A player in the third tier may win a pot if he has not folded, his associated player in the second tier has not folded, his associated player in the first tier has not folded, and his associated player in the first tier has the best poker hand at the conclusion of the first tier game. However, if an associated player in the first or second tier folds, a player in the third tier is automatically folded. Note, however, that a player in the second tier is not automatically folded if an associated player in the third tier has folded. It will be appreciated that there may be any number of tiers, with fourth, fifth, sixth, etc., tiers operating in an analogous fashion to what has been described with respect to the first three tiers. In some embodiments, a person in a tier greater than the first tier may see the cards of all players in the first tier.

1.22.1. There may be time limits on people in higher tiers so they can't stall to see what happens in the actual game. In some embodiments, a player in tier two or above may have a time limit for making bets or other game decisions. The time limit may force a player in tier two or higher to take action before the game proceeds in tier one, and thus before the player in tier two or above discovers important information from watching the first tier players that might aid him in his game decision.

1.22.2. A higher tier game may not occur in a live environment. Thus higher tier players may bet after the fact. In various embodiments, tier two, tier three, and higher tier games may occur after the tier one game has occurred. Accordingly, a playback of the action in the tier one game may be halted until all appropriate actions have been taken in the higher tier games.

1.22.3. Tiers could form among people at the pool, using handheld devices. In various embodiments, a second tier, third tier, or higher tier game may form amongst players that are remote from a poker table. For example, players located poolside at a casino may engage in a second tier game using handheld devices, such as personal digital assistants. Thus, the second tier players may benefit from the work of a dealer and from the use of physical cards, but without having to be physically present at a poker table.

1.23. In various embodiments, a first secondary player may receive an alert regarding the activities of a primary player and/or of a second secondary player. An activity that may trigger an alert may include: (a) the primary player inserts a tracking card into a gaming device; (b) the primary player inserts currency or other consideration into a gaming device; (c) the primary player presents a tracking card or other identification at a table game (e.g., at a blackjack game); (d) the primary player buys chips at a table game; (e) the primary player places a bet in a slot machine game; (f) the primary player places a bet in a game; (g) the primary player participates in a game; (h) the primary player receives a payout in a game; (i) the primary player checks into a hotel; (j) the primary player pays for a meal at a restaurant (thereby identifying himself with a credit card, for example); and so on. Similar activities by the second secondary player may trigger an alert for the first secondary player. An alert may be sent to the secondary player if the primary player was or is flagged for any reason, such as being of interest to the first secondary player. For example, the first secondary player may have indicated that the primary player is the favorite player of the secondary player. Thus, the first secondary player may wish to be alerted any time the primary player is playing or will begin playing so that the first secondary player may have the opportunity to participate in the games of the first primary player. An alert may be transmitted to a device of the second secondary player, including a cell phone, personal digital assistant, Blackberry®, laptop, personal computer, television, and so on.

An alert may also be transmitted to the first second secondary player under other triggering conditions. An alert may be sent to the first secondary player if a primary player of interest: (a) is playing a particular game (e.g., a favored game of the second secondary player); (b) has had a streak, such as a winning streak or losing streak (e.g., the primary player has won 10 games in a row; e.g., the primary player has lost games in a row); (c) the primary player has won a certain amount (e.g., the primary player has won more than $100); and so on. An alert may be sent to the first secondary player based on similar triggering conditions involving the second secondary player.

1.24. Embodiments disclosed herein need not apply only to casino gaming. Rather, where applicable, disclosed embodiments may apply to a wide variety of games, contests, sporting events, random events, unknowns, and so on. Where applicable, disclosed embodiments may apply to anything that may be the subject of a bet. Disclosed embodiments may apply to table games, video games, boxing matches, sporting events, the price movements of equities, the price movement of bonds, the movements of other market securities, the results of elections, the weather, the temperature, the average test scores of a body of students, and so on. For example, a secondary player may place a bet on whether a stock price will go up or down in the next ten minutes. Note that, in various embodiments, a primary player need not be explicitly present. For example, a secondary player may bet on the temperature a day in the future even though there is no primary player per se who affects the temperature.

1.25. Embodiments described herein need not apply only to complete games. Where applicable, embodiments described herein may apply to events within games. For example, a secondary player may bet on the next card that a primary player will receive in a game. A secondary player may bet on the next roll of the dice, on how many times a player will hit in a game of blackjack, on the point total of the dealer's hand in a game of blackjack, on the contents of a flop in a poker game of Texas Hold'em, and so on. A secondary player may be alerted when certain sequences of events have occurred. For example, a secondary player may be alerted when the last ten cards dealt in a game were red cards (i.e., hearts or diamonds). A secondary player may view historical data about events within a game or games. For example, the secondary player may examine historical data about the number of times the number 12 has been rolled in craps in the last 10 minutes.

1.26. A secondary player just watches a primary player. In various embodiments, a secondary player may wish to watch the play of a primary player, watch the games of a primary player, watch the facial expressions of the primary player, follow the strategies of the primary player, examine the historical results of the primary player, or otherwise track the primary player. The secondary player may wish to track the primary player without betting or risking any money on the games of the primary player. For example, a secondary player may wish to watch the games of a primary player who is a celebrity. Simply watching the celebrity player may provide entertainment for the secondary player.

A secondary player may search for a primary player based on any number of criteria, such as those mentioned above. A secondary player may search for a primary player based on a name (e.g., Ben Affleck); based on a demographic; based on a celebrity status (e.g., a name that generates more than 1000 hits in a Google search); based on a typical amount bet (e.g., a secondary player may search for any player who bets more than $100 per game); based on a history of wins or losses; based on strategies employed; based on facial expressions (e.g., a computer algorithm may score the expressiveness of a primary player's face and allow the secondary player to search for the most expressive faces); and/or based on any other criteria.

In various embodiments, a secondary player may pay a fee for watching the games of primary players. A fee paid by the secondary player may allow the casino to profit from the secondary player even if the secondary player does not place any bets. The secondary player may pay a fee per game watched, per time period during which he watches, or based on any other metrics. In various embodiments, the primary player may receive a portion of the fee paid by the secondary player.

In various embodiments, the primary player's permission must be obtained before a secondary player may track the play of the primary player.

2. Bet on a smaller aspect of someone else's game. For example, bet on what the next card will be, what the next roll of the dice will be, etc. In various embodiments, a person who does not directly participate in a game at a casino may nevertheless place bets on various events in the game. An event may include the rolling of a die, the drawing of a card, the spinning of a roulette wheel, the spinning of a reel of a slot machine, and so on. An event may come to a resolution in the form of a number revealed on the top face of a die, in the form of a rank or suit of a card drawn, in the form of a number achieved at a roulette wheel, in the form of a symbol appearing on a reel at a pay-line, and so on. An event may also include a decision or action made by a player who is directly involved in the game. For example, an event may include a player making a decision to hit or stand in blackjack, a player making a decision to bet or fold in poker, a player making a decision of which prize door to choose in a bonus round of a slot machine game, and so on. Such an event may come to a resolution in the form of an actual decision made. For example, a resolution may include an actual decision made by a player, such as "hit," "draw," or "fold." An event may include a dealer making a decision in a game. For example, in a game of Pai Gow poker an event may include an arranging of the dealer's seven cards into a two-card hand and a five-card hand. The resolution of the event may take the form of an actual five-card hand and an actual two-card hand that the dealer has arranged.

As used herein, the term "payout odds" may refer to a statement of an amount a player will receive, in the event of a win, per amount bet. For example, 3:2 payout odds means that a player will receive 3 units per 2 units bet (in addition to keeping his original bet), provided the player wins the bet. It will be understood that a payout ratio may be readily determined from payout odds and vice versa via mathematical operations. Therefore, it will be understood that embodiments described herein using payout ratios could readily be performed with payout odds, and vice versa.

For a given event, an appropriate set of payout ratios may be determined. For example, if a secondary player is betting on a two as the resolution of a roll of a six-sided die, the secondary player may stand to win five times his initial wager (a payout ratio of 5) if the two is in fact rolled. Note that the player is assumed to give up his bet initially, so his net profit would be 4 times his initial wager if a two occurs. A set of payout ratios may be determined based on the inherent probabilities of various possible resolutions of the event. In the above example, the inherent probability of a two being rolled is 1/6. Thus, a payout ratio of five seeks to provide the player with a payout commensurate with the inverse of the probability of the resolution that would be winning for the player, while still allowing for a casino profit, on average.

Once the event has resolved, it may be determined whether the secondary player has won. For example, suppose a secondary player has bet that the next card dealt in a game of poker will be the ace of spades. Once the next card has been dealt, it may be determined whether the card is in fact the ace of spades, and therefore whether the secondary player has won. If the secondary player has won, the secondary player may be paid according to the payout odds.

In various embodiments, an event on which a secondary player bets does not constitute a complete game for the primary player of the game. For example, a secondary player may bet on what the next card will be in a game of video poker. However, the outcome of the game of video poker is not solely based on the next card, but rather is based on at least four other cards making up a complete hand of poker. Thus, a primary player may place a bet and may be paid based on his bet and based on the resolutions of a first and a second event in a game. A secondary player may place a bet on the same game and may be paid based on his bet and based on only the resolution of the second event in the game.

In various embodiments, the secondary player may be remote from the game. For example, the primary player may participate in the game while physically present at a slot machine, video poker machine, table game, or other game location. However, the secondary player may be remote from the primary player, such as 50 feet away, such as in a different room, such as in a different building, such as in different city, and so on.

In various embodiments, the secondary player may bet on an event in a game after the game has been completed. For example, the secondary player may bet on an event in a game completed the prior week. The events of the game may be unknown to the secondary player since the secondary player may not have been observing or participating in the game when it was originally played.

Figure 56:
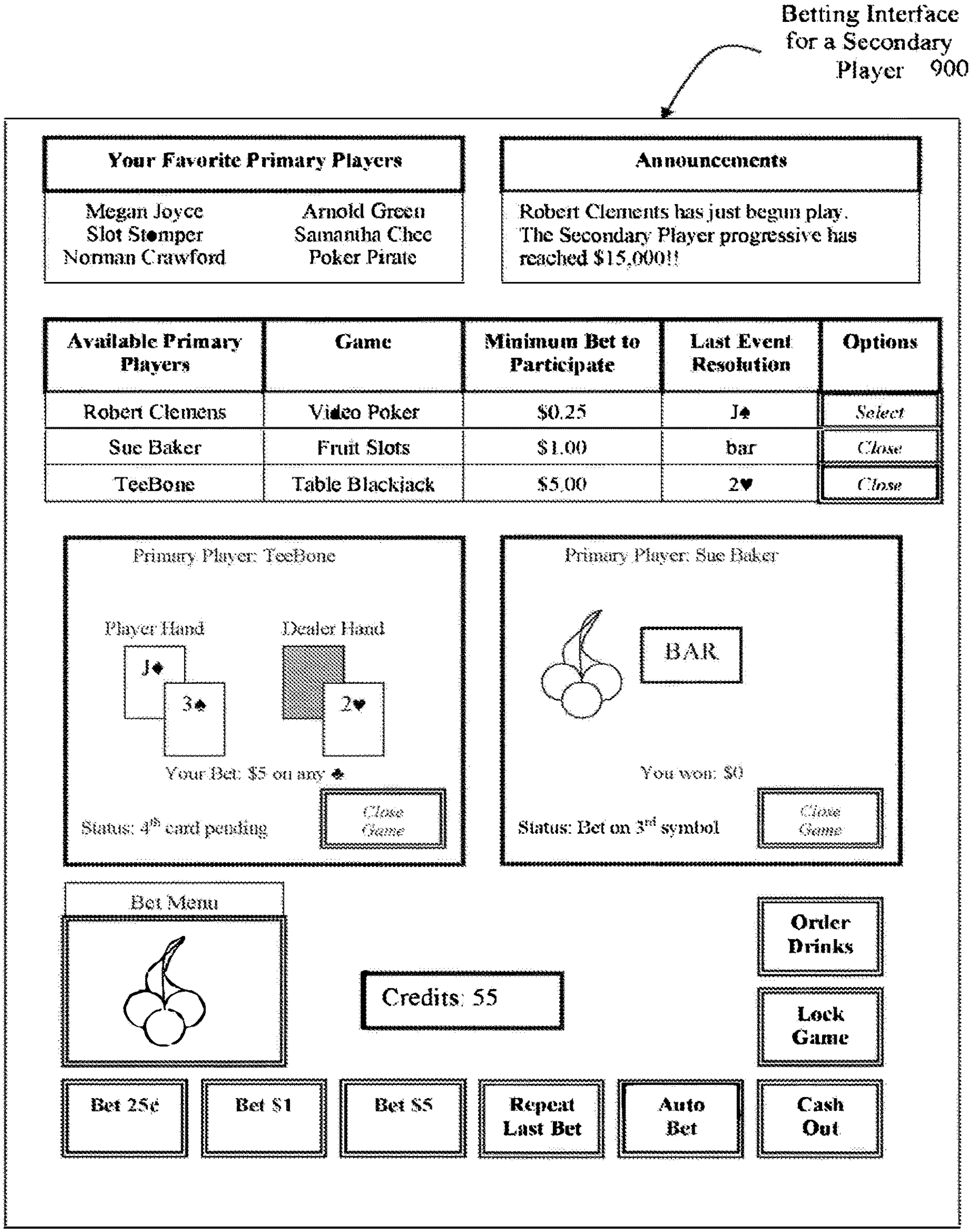
FIG. 56 shows a touch screen display for entering betting information and tracking the progress of a game, according to some embodiments.

2.1. Betting interface. In various embodiments, a secondary player may use a betting interface to make bets on events within a game. The betting interface may be a graphical user interface, and may include interactive features such as buttons, microphones, touch areas, mice, keyboards, and any other features for receiving designations of a secondary player's bet. An exemplary betting interface is shown in FIG. 56. The betting interface depicted in FIG. 56 includes an area where the names of available primary players are listed. The secondary player may elect to bet on events for the games played by these primary players. Next to each primary player is listed an indication of the last event resolution. For example, next to primary player Robert Clemens is listed the J4, or the jack of spades. This indicates that in the most recent event of Robert Clemens' game, the event being the dealing of a card, the resolution to the event was that a jack of spades was dealt. Next to Sue Baker is listed a "bar." This indicates that in the most recent event of Sue Baker's game, the event being the random determination of a symbol to show in a viewing window of a slot machine game, the resolution to the event was that a bar occurred. In the case of TeeBone, the most recent card dealt was the two of hearts. The betting interface depicted in FIG. 56 includes two game windows in which a secondary player may bet on events within a game. In the game of TeeBone, the secondary player has just bet $5 that the next card dealt in the game will be a club. In the game of Sue Baker, two symbols have already appeared in the viewing window of the slot machine game in which Sue Baker is involved. The status of the game is such that the secondary player may bet on the third symbol that is yet to come in the same game of Sue Baker. The secondary player may use the "Bet Menu" area of the screen to select a symbol to bet on. At present, a "cherry" symbol appears in the Bet Menu area. The secondary player may, however, scroll through additional symbols in the menu and select (e.g., by touching three times in rapid succession) a symbol on which to bet.

2.2. Determining pay tables. In various embodiments, payout ratios may be determined for an event within a game. Payout ratios may be based on the probability that a bet on the event becomes a winning bet. Payout ratios may also be determined based on a number of other factors. Payout ratios may be displayed or otherwise presented for a secondary player. In some embodiments, payout ratios are displayed in the form of a pay table. The pay table may include a first column depicting various possible resolutions of an event, and a second column depicting the amount to be paid per amount wagered on each of the possible resolutions.

2.2.1. Determining appropriate odds. In various embodiments, payout ratios may be determined based on a desired average amount to be won by a casino per bet received by the casino (e.g., based on a desired house advantage), on a house advantage of the game within which the event is occurring, and/or based on jurisdictional rules pertaining to allowable house advantages.

2.2.1.1. A desired house advantage. In various embodiments, a casino may determine a desired house advantage for a bet on an event in a game. It will be appreciated that the casino may determine any number of equivalent desired metrics, where such equivalent metrics may be determined through deterministic mathematical transformations of a house advantage. For example, a casino may equivalently determine a desired average amount that a player will win per unit wagered. Exemplary house advantages may be 15%, 10%, and 5%. The desired house advantage may be determined based on any number of factors, including perceptions as to what house advantages would be attractive to players while still providing the casino with adequate profits.

2.2.1.2. Same as the gaming device. In various embodiments, a house advantage for an event within a game is determined based on the house advantage for the game itself. For example, the house advantage for a bet on an event in a game may be the same as for the house advantage for a bet on the game. In various embodiments, the house advantage for an event within a game may be close, but not identical to the house advantage of the game. For example, the house advantage of the event may differ by 2 percentage points from the house advantage of the game. Achieving identical house advantages may not be practical due, for example, to a requirement for integer payouts or to a limited number of possible resolutions of an event (e.g., there are only 6 resolutions to the roll of a die).

2.2.1.3. Amount wagered. In various embodiments, the house advantage for an event within a game may be determined based on the amount bet on the event. In some embodiment, the greater the amount bet, the less the house advantage. This provides the player with an incentive to bet more.

2.2.1.4. Jurisdiction minimum. In various embodiments, laws, rules, policies, or other conventions may dictate a maximum allowable house advantage for a gaming device. Accordingly, a house advantage for an event may be determined which is less than or equal to the maximum allowable house advantage.

2.2.2. Player preferences affecting the pay table. In various embodiments, an event in a game may have more than two possible resolutions. For example, the rolling of a die may have six possible resolutions, while the drawing of a card from a deck may have 52 possible resolutions. Payout ratios may be associated with each of the possible resolutions. Thus, a pay table may be formed for the event, where the pay table details payout ratios for one or more of the possible resolutions. In various embodiments, it may be possible to form many different pay tables for the same event. Further, many different pay tables may result in the same or similar house advantages. For example, a first pay table for a roll of a die may provide a payout ratio of 5 for a roll of a 6, and a payout ratio of 0 for any other roll. A second pay table for a roll of a die may provide a payout ratio of 3 for a roll of 6, a payout ratio of 2 for a roll of 5, and a payout ratio of 0 for any other roll. With the first pay table, the player may expect to win 5 times his wager with probability 1/6, yielding an expected payout of 5/6 times his wager, which yields a house advantage of (1−5/6)/1=16.67%. With the second pay table, the player may expect to win 3 times his wager with probability 1/6, or two times his wager with probability 1/6, yielding an expected payout of 3/6+2/6=5/6. Thus, the second pay table has the same house advantage of 16.67%.

2.2.2.1. Player selects pay tables from range of pay tables. In various embodiments, a secondary player may select among various possible pay tables to use for an event. For example, when betting on the draw of a card, a secondary player may choose a pay table which pays 48 times an initial wager only if an ace of spades is drawn, or the secondary player may choose a pay table which pays 12 times an initial wager if any ace is drawn. In one embodiment, a secondary player may choose between a pay table which provides a relatively high payout with a relatively low probability and a pay table which pays a lower payout or payouts, but with greater probability. Over a set of repeated games, the former pay table would tend to provide less frequent but greater rewards, while the latter pay table would tend to provide more frequent but smaller rewards. A secondary player might therefore decide on his preferred method of receiving rewards. A secondary player may be given the opportunity to select among a range or continuum of possible pay tables, each with approximately the same house advantage, but each having different maximum payouts and/or different frequencies for providing payouts. A player may select a pay table by selecting a maximum payout. Typically, though not necessarily always, a pay table with a relatively higher maximum payout ratio will tend to pay less frequently than does a pay table with a relatively lower maximum payout ratio. A player may also select a pay table based explicitly on a payout frequency associated with a pay table. In some embodiments, the player may adjust a dial, where one limit on the dial is associated with a pay table with one or more relatively high payouts and a relatively low frequency of payout, and an opposite limit of the dial is associated with a pay table with one or more relatively low payouts and a relatively higher frequency of payout.

2.2.3. Determining odds of a particular symbol in a slot machine on a reel. In some embodiments, a player may bet on the occurrence of a particular symbol or indicium during a game. In some embodiments, the probability of occurrence of a symbol may be determined. In some embodiments, the probability of occurrence of a symbol at a particular position may be determined. For example, the probability of occurrence of a particular symbol in the first position across a pay-line of a slot machine may be determined. The determination of a probability of occurrence of a symbol or of a symbol at a particular location may allow the determination of a payout ratio that is commensurate with the probability. For instance, if the probability is determined to be lower, then the payout ratio may be set relatively higher, and vice versa.

2.2.3.1. Monte Carlo. In some embodiments, the probability of occurrence of a particular symbol may be determined through a large number of trials, where each trial may include the playing of a game, or a simulated game. The game may be played at an actual gaming device, at a table game, or on a computer executing game software. The game may be played or run with actual money at risk (e.g., in the form of bets) or with no money at risk. For example, a game at a slot machine may be played ten thousand times. A program may track statistics of interest from the game, such as how often a "cherry" symbol occurred in the first position of the pay-line, how often a "bar" symbol occurred in general, and so on. The probability that a symbol occurs at a particular location on a pay-line may then be determined as the number of trials in which the symbol occurred at the particular location divided by the number of trials. Analogously, the probability of any an event coming to a particular resolution can be determined or estimated through a large number of trials in which the event occurs and measuring the proportion of the trials in which the particular resolution occurred.

2.2.3.2. Going through virtual pay table. In some embodiments, the probability of occurrence of a particular symbol at a particular location on a pay-line may be deduced with reference to an internal algorithm used by a gaming device for generating game outcomes. In some embodiments, the algorithm used may employ one or more "virtual reels." A virtual reel may comprise a table with one column of outcomes (e.g., a set of symbols), and with one column of ranges of numbers, each range of numbers corresponding to an outcome. A random number generator may generate a random number. The random number may then be matched to an outcome from the virtual reels based on the range of numbers in which the random number falls. Each outcome may thus be assumed to have a probability of occurrence that is proportional to the size of the corresponding range of numbers. For example, an outcome with a corresponding range of numbers of 100-299 is twice as likely to occur as an outcome with a corresponding range of numbers of 300-399, since the first range includes 200 numbers that may be generated by the random number generator, and the second range includes only 100 numbers that may be generated by the random number generator. With reference to the virtual reel, the probability of occurrence of each possible outcome may be determined. Then, the probabilities of all outcomes which include a particular symbol may be added up, thus yielding the probability of the occurrence of that symbol in a game. The probabilities of all outcomes which include a symbol in a particular location may similarly be added to determine the probability of occurrence of that symbol at that particular location. For example, to determine the probability that a "bell" symbol occurs at position 3 in an outcome, the probabilities of occurrence of all outcomes containing the "bell" symbol at position 3 may be added.

2.2.4. Odds of a particular card. In various embodiments, the probability that a particular card will constitute the resolution of a particular event may be determined as follows. First, the number of unknown or unrevealed cards may be determined. Unknown cards may include cards that have not already been shown face-up in a game. Provided the card of interest has not already been shown, the probability may be determined to be equal to one divided by the number of unknown cards.

2.3. Distinguishing between two dice. In various embodiments, a secondary player may wish to place a bet that would have an ambiguous resolution during conventional play of a game. For example, a secondary player may wish to bet that a particular die in a game of craps will show a six. However, the way craps is often played conventionally, it may be difficult or impossible to distinguish between the two dice used in a game. Thus, once the two dice land following a roll, it might conventionally be ambiguous as to which was the die that the player bet on.

2.3.1. Distinguishing two otherwise similar objects. In various embodiments, two or more similar objects used in the play of a game may be made to appear distinct. In a game of craps, two dice may be colored differently. For example, one die may be colored green, while the other is colored red. In this way, a secondary player would be able to bet on either the red die or the green die without worry of an ambiguous result. In a game with three dice, such as in Sic Bo, there may be three dice of different colors. In a game of roulette involving the use of two balls at once, the two balls may include different patterned markings. A player may thereby bet on, e.g., the striped ball or the spotted ball. In some embodiments, two or more similar objects may be made detectably distinct, even if the distinction cannot be made visually. For instance, radio frequency identification (RFID) tags may be placed in or on objects. Two dice with different RFID tags inside them would be distinguishable by an RFID tag reader from the differing signals coming from the tags.

2.3.2. Bet that the lower die will be above two. In some embodiments, a secondary player may place a bet on a resolution of one of several events, in which the one event becomes distinguishable only after all of the events have been resolved. For example, a secondary player bets that the higher of two dice rolled in a game of craps will show a 6. In this example, two events may be deemed to occur, each event constituting the rolling of a die. However, the actual die a player is betting on becomes clear only after both events have resolved. In other words, only after both dice have been rolled and have come to rest can it be determined which is the higher die. A secondary player may, in some embodiments, bet on the lower of two dice, on the middle die (e.g., in a game with three dice), on the roulette ball showing the highest number, and so on. In various embodiments, a secondary player's bet may comprise at least two parts. The first part may be a method to distinguish between two or more events to determine which of the two or more events the secondary player is betting on. The second part may be an indication of what will constitute a winning or losing resolution for the secondary player. For example, suppose that a secondary player bets that the higher of two dice will show a five. The first part of the bet is a way to distinguish the rolling of one die from the rolling of the other die, and indicating which of the now distinct events the secondary player has bet on. The second part of the bet indicates that a winning resolution will be for the die that the player has bet on to show a five.

2.3.3. Specify a position of a card. For example, the third card drawn is the Ace of spades. In some embodiments, in order to clarify the specific event that a secondary player is betting on, a position, location, sequence number, or other clarification may be specified. For example, rather than betting that "a" card will be an ace of spades, a secondary player may bet that "the third card dealt" will be an ace of spades. In a game of video poker, a secondary player may bet that a card in a specified position in a video poker hand (e.g., the fourth card in the final hand), will be of a certain rank and suit. In a game of a blackjack, a secondary player may bet, for example, on the first card dealt to a player, the second card dealt to a player, the third card dealt to a player, etc. The secondary player may also bet, for example, on the first card dealt to the dealer, the second card dealt to the dealer, etc. The player may also specify an event by means of an orientation. For example, in a game of blackjack, the secondary player may bet on the dealer card that is face down, or on the dealer card that is face up.

2.4. Receive aids in your prediction. In various embodiments, a secondary player may be provided with data, hints, or other aids in making bets on an event in a game. Data may include historical data relevant to the game at hand. For example, if a secondary player is to bet on the decision that will be made by a primary player, data about the decision of the primary player in prior games might aid the secondary player in his bet.

2.4.1. The sequence of what occurred in the past. In various embodiments, a secondary player may be shown or otherwise provided with data from games or events within games that were played prior to the game that includes the event on which the secondary player is betting. The data may help the secondary player to choose a resolution of the event which will constitute a winning resolution. A secondary player who is to bet on a particular event in a particular game played by a particular primary player may be shown data about other events that have occurred. Other events may include events that have occurred: (a) in games played by the same particular primary player; (b) in games under similar circumstances to those which are present in the particular game (e.g., the same initial two cards occurred in a prior game of blackjack as have in the particular game, and the particular event of interest is the dealing of the third card in the particular game); (c) in games played at the same gaming device that the particular game is or was played at; (d) in the recent past (e.g., events that have occurred in the five minutes prior to the time that the secondary player bets on the particular event); (e) just prior to when the particular event originally occurred (e.g., events occurring in games that had been played in the five minutes prior to the particular game); (f) in games played at the same gaming device that the particular game is or was played at, where such games constitute a sequence of games that immediately preceded the particular game (e.g., such games were the five games played before the particular game); and (g) in games played by the same particular primary player, where such games constitute a sequence of games that the primary player played immediately preceding the particular game.

2.4.2. What would perfect strategy be here? In various embodiments, a secondary player may be provided with an indication of a decision that would be made according to some strategy. For example, if a secondary player is betting on the decision that will be made by a primary player in a game of blackjack, the secondary player may be shown what decision would be made using Basic Strategy (i.e., the strategy used to maximize expected winnings without any special knowledge of what cards have already been dealt). For example, the secondary player may be told that the proper decision according to Basic Strategy is for the primary player to hit. As another example, if a secondary player is betting on what cards will be discarded by a primary player in a game of video poker, the secondary player may be told which combination of discards would maximize the expected winnings for the primary player. In various embodiments, the secondary player may be told what decision would be made according to a strategy that is not a perfect or optimal strategy. For example, a secondary player might be told which decision would be made according to a strategy that aims for the highest payout in a game.

2.4.3. What has this player done in similar situations? In various embodiments, a secondary player may be provided with an indication of what decisions a primary player has made in situations which are similar to the situation of the game in which the secondary player is participating. Games in which a primary player was in a similar situation may include games in which the primary player: (a) had the same cards; (b) had the same point total (e.g., in a game of blackjack); (c) had the same hand ranking (e.g., in a game of poker); (d) had the same sequence of initial events (e.g., in a game of craps, the primary player had the same three initial rolls as he does in the game situation under consideration); (e) was in the same seat position (e.g., the primary player was just to the left of the dealer); (f) faced the same opponent or opponents; (g) was at the same gaming device; (h) faced the same bet or bets from opponents (e.g., in a game of poker, the primary player may have faced the same bets that he does at present); and so on. Games in which the primary player was in a similar situation may include games in which the dealer had a similar hand (e.g., in a game of blackjack, the dealer had the same card showing), or games in which an opponent of the primary player had a similar card to what the primary player's opponent has in the game under consideration. In some embodiments, the secondary player may be provided with an indication of what the primary player did in games with similar external contexts, such as games played at the same time of day, games played at the same table, games played at the same casino, games played just after a big loss for the primary player, and so on.

2.4.4. What cards have been dealt already? In various embodiments, a secondary player may be provided with an indication of what cards have already been dealt in a game. For example, in a game of blackjack, the secondary player may be told what cards have been dealt from a deck in prior games where the deck was used. If, for example, the secondary player thinks the primary player has been counting cards, the secondary player may use information about prior cards dealt in order to predict the reaction by the primary player to the card count. In a game of poker, the secondary player may have the opportunity to view cards that have been dealt, e.g., as part of an initial hand. Looking at the cards of the initial hand may then help the secondary player to better predict a primary player's decision.

2.4.5. The secondary player is provided with a probability. In various embodiments, a secondary player may be provided with the probability of a particular resolution to an event. For example, if the secondary player is betting on the roll of a die, the secondary player may be told that the probability of a six being rolled is 1/6.

2.4.6. Regulatory requirements for hints. In various embodiments, regulations may dictate whether or not a hint must be provided. In some embodiments, regulations may dictate that the probability of a resolution be provided. In some embodiment, regulations may require that a secondary player be given a probability that an event comes to a particular resolution if there would be no way for the secondary player to know such a probability. For example, while it is possible for a secondary player to know the probability that a 6-sided die will land in a certain way, a secondary player may have no way of knowing that a reel of a slot machine will display a certain symbol since the reel may be controlled by a secret algorithm. In some embodiments, regulations may dictate that a hint not mislead a secondary player. For example, in a game of video poker, a hint may inform a secondary player of a decision that would be made by a primary player using a particular strategy. However, the strategy may not be a strategy that would typically be employed by any player, and thus the hint would not likely give the secondary player the proper direction. In some embodiments, regulations may dictate the form in which a hint must be provided. Regulations may require that a hint be given in multiple languages. Regulations might require that a player have the option of which language will be used to view the hint.

2.4.7. Form of hints (for example, secondary players are simply not allowed to make certain bets). In some embodiments, a hint may take the form of preventing a secondary player from making certain bets. Such bets may be disadvantageous for the secondary player or for the casino. For example, a graphical user interface may display options for what resolutions the secondary player can bet on. In a game of blackjack, such options may include a "hit" option for betting that a primary player will hit, a "stand" option for betting that a primary player will stand, and a "double down" option for betting that a primary player will double down. If the primary player has been dealt an initial hand with a point total of 10, then the "stand" option may be grayed out such that the secondary player cannot bet that the primary player will stand. This is because it would make no sense for the primary player to stand when the primary player can hit, increase his point total, and have no risk of busting.

2.5. Setting the odds on an event. In some embodiments, the casino may set the payout odds on an event by reference to historical data. Historical data may be used to arrive at a probability of a resolution of an event. For example, historical data may be used to determine the probability with which a primary player will make a particular decision in a game. This probability may be used, in turn, to provide payout odds to a secondary player who wants to bet that the primary player will make the particular decision.

2.5.1. Data not including the current game. In some embodiments, the casino may use data from historical games of primary players in order to determine a probability that a primary player will make a particular decision. For example, the casino may examine a set of historical games in which various primary players had hands with 16 points against a dealer's 10 points showing. The casino may determine the number of primary players who hit and the number of primary players who stood in order to arrive an estimated probability for what a primary player will do in a particular game under consideration. For example, the casino may look at 100 historical games and may find that 45 times the primary player hit, and 55 times the primary player stood. Thus, the casino may determine that there is a 45% chance that a primary player will hit and a 55% chance that a primary player will stand under a similar situation. Once the casino has an estimate of the probabilities of various outcomes, the casino may set payout odds in order to create a positive house advantage. For example, in the aforementioned example, the casino may set payout odds of 1:1 if the secondary player bets on "hit", and 3:4 odds if the secondary player bets on stand. In various embodiments, historical data may include data about historical games of the primary player who is involved in the particular game in question. For example, to determine the probability that a particular primary player will make a decision, the casino may look at historical data for that primary player.

2.5.2. Data including the current game. In some embodiments, payout odds may be set for a game based on a set of games which include that game. For example, the casino may use a set of games that include X (e.g., 1000) games in which a player had a pair of nines, and the dealer showed an 8 in a game of blackjack. The casino may determine how many times the player with the nines split, and how many times the player just stood. The casino may thus know, with certainty, the probability that the nines would be split and the probability that the primary player would stand for a game randomly selected from the set of X games. Accordingly, the casino could then set payout odds for a bet on standing and a bet on splitting. The casino could set such payout odds in order to create a positive house advantage. The casino may then allow a secondary player to bet on a decision of a primary player in a game from the set of 1000 games, such as from a randomly selected game of the set of 1000 games.

2.6. Bet on a random action in the game. In various embodiments, a secondary player may bet on the resolution of any desired event. For example, in a table game of craps, the secondary player may bet that one die will bounce off the table. In a game of poker, the secondary player may bet that one of the primary players will throw his cards, that a primary player will get ejected from the game, that a primary player will bet out of order, or that any other resolution to an event will occur. In some embodiments, a secondary player may bet on any resolution that is external to the normal play of a game. For example, the secondary player may bet that a player will spill a drink at a gaming table.

2.7. Bet on a particular sub-outcome. There are many events on which a secondary player may bet. For each event, there may be one or more resolutions on which the secondary player may bet.

2.7.1. blackjack. In a game of blackjack a secondary player may bet on: (a) the rank or suit of a particular card, such as the first, second, third, etc. player card or the first, second, third, etc. dealer card; (b) a decision that will be made by a primary player (e.g., hit, stand); (c) a decision that will be made by a dealer; (d) whether a primary player will bust; (e) whether a dealer will bust; (f) whether the primary player will receive two identical cards; (g) whether the primary player will receive two or more cards of the same suit; (h) whether two primary players in a game receive the same cards; (i) a starting point total for a primary player; (j) a starting point total for a dealer; (k) whether a primary player's ending point total will fall within a particular range; and so on.

2.7.2. Roulette. In a game of roulette, a secondary player may bet on (a) red; (b) black; (c) a particular number; (d) a particular range of numbers; (e) the occurrence of a number in a particular sector of a wheel; (f) an amount that a primary player will bet; (g) a number that a primary player will bet on; (h) green; and so on.

2.7.3. Slot machines. In a slot machine game a secondary player may bet on: (a) the occurrence of a symbol on a reel; (b) the occurrence of a set of symbols on a set of reels (e.g., the secondary player bets that the first reel will show a "bar" and the second reel will show a "lemon"); (c) whether a bonus round will be reached; (d) the level of a bonus round that will be reached; (d) a decision that a primary player will make in a bonus round; (e) a resolution of a bonus round (e.g., how much money the primary player will win from the bonus round); (f) the amount that the primary player will bet; (g) the number of pay-lines that the primary player will bet; (h) the number of pay-lines that will win, and so on.

2.7.4. Card Games. In a card game, such as a game of poker, a secondary player may bet on: (a) the occurrence of a particular card in a hand of cards; (b) the occurrence of a particular combination of cards in a hand of cards (e.g., the occurrence of a pair); (c) an order in which cards are dealt (e.g., the secondary player may bet that each card dealt will have a higher rank than the last card dealt); (d) a position in which a card will be dealt (e.g., an ace will be dealt as the first card in a player's hand; and so on.

2.7.4.1. Poker. In a game of poker, a secondary player may bet on what bets will be made by primary players in the game. A secondary player may bet on whether a bet will be a check, call, bet, raise, or fold; on how much a primary player will bet; on how many callers there will be for a bet or raise; on how many times a pot will be raised; on how many rounds of betting there will be; on how many players will be all-in; and so on. In some embodiments, a secondary player may bet on the total size of a pot. In some embodiments, a secondary player may bet on whether there will be a tie. In some embodiments, a secondary player may bet on the size of a side-pot.

2.7.5. Dice Games. In a game of dice, a secondary player may bet on one roll of the dice. For example, the secondary player may bet that two dice rolled will total to 12. In a game of Sic Bo, a player may bet that one of the three dice rolled will show a 4.

2.8. Bet on length of the game. In various embodiments, a secondary player may bet on the length of a game.

2.8.1. Time. A secondary player may bet on the time that a game will last. A game may be counted to start when a primary player makes a bet, when a first random event occurs in a game, when a first card is dealt, when a first roll of the dice is made, when a first player decision is made, and so on. A game may be counted to end when a payout is made, when a player's bet is collected, when a last random outcome is generated, when objects used in a game are collected (e.g., when cards are collected), when a payout is announced), or when a subsequent game starts.

2.8.2. Number of cards required. In some embodiments, a secondary player may bet on the number of cards that will be dealt in a game. A secondary player may bet on the number of cards that will be dealt to a particular hand (e.g., to a player hand in blackjack; e.g., to a dealer hand in blackjack); or to a particular combination of hands (e.g., to the hands of both the player and the dealer; e.g., to three players in a game of blackjack). A secondary player may bet on the number of cards that will be dealt as common cards. For example, regarding a game of Texas Hold'em, the secondary player may bet that all five common cards will be dealt. In other words the secondary player may bet that at least two people will remain in the game until the fifth common card is dealt.

2.8.3. Number of rolls of dice required. In various embodiments, a secondary player may bet on the number of rolls of dice that will occur in a game. For example, a secondary player may bet that there will be seven rolls of dice in a game of craps. In other words, the secondary player may bet that the primary player will set a point and then take six additional rolls to either roll the point number again or achieve a seven.

2.8.4. Number of bonus round levels reached. In various embodiments, a secondary player may bet on the number of levels that a primary player will reach in a bonus round, e.g., in a bonus round of a slot machine game. A bonus round may have a plurality of separate levels. If a primary player does well in earlier levels, e.g., by correctly choosing the location of hidden treasures, the primary player may make it to later levels. However, if the primary player does poorly in earlier levels, the primary player may not reach later levels. Thus, the number of levels reached in a bonus round may be effectively random. In some embodiments, a secondary player may bet on the number of spaces a character will advance on a game board in a bonus round. For example, regarding a bonus round in a game of Monopoly®, a secondary player may bet on the number of spaces that a game character will traverse on the game board. In some embodiments, a secondary player may bet on the space or spaces on which a game character will land in a game. For example, a secondary player may bet that a game character will land on Boardwalk in a game of Monopoly®.

2.9. Bet on a different game within the game. E.g., bet on poker within blackjack. In some embodiments, a secondary player may bet on the occurrence of an outcome from a first game, but in the context of a second game. For example, a secondary player may bet that a primary player who is involved in a game of blackjack will receive cards that create a poker hand which is three-of-a-kind. In a game of Sic-bo, a secondary player may bet that two of three dice used will form a winning roll in a game of craps.

2.10. Bet on the order in which people will remain in the game. Various games include multiple primary players. In some multi-player games, players may be eliminated or may drop out of the games. For example, in a game of poker, players may drop out of the game as they fold. In various embodiments, a secondary player may bet on the manner in which primary players are eliminated.

2.10.1. Who will be the first one out? In various embodiments, a secondary player may bet on which primary player will be the first primary player eliminated. A secondary player may bet on who will be the second primary player eliminated, the third primary player eliminated, or who will be the primary player eliminated in any other spot.

2.10.2. Who will be the last two standing? In various embodiments, the secondary player may bet on which primary player will be the last one remaining. The secondary player may bet on who will be the second to last primary player remaining, who will be the third to last remaining, and so on. The secondary player may bet on who will be the last two primary players remaining. In various embodiments, the secondary player may bet on any combination of primary players and on any combination of places (e.g., last, second to last) in which primary players are eliminated. The secondary player may win the bet if the designated combination of primary players was eliminated in the designated combination of places. A secondary player may bet that a particular three primary players will be the last three remaining, regardless of the order in which they are eliminated after the final three. In some embodiments, the secondary player may bet not only that a particular group of primary players will be the last three remaining, but also on the order in which the last three will be eliminated (e.g., players A, B, and C will be the last three, player A will be the last, and player B will be the second to last remaining).

2.10.3. Who will be the three in after the flop? In various embodiments, a secondary player may bet on the number of primary players that will be remaining in a game at a certain point in the game. For example, a secondary player may bet on the number of primary players that will be remaining by the flop in a game of Texas Hold'em poker, or by fifth street in a game of seven-card stud poker. A secondary player may bet on how many primary players will be remaining in a game after X number of cards have been dealt in the game, regardless of whom the cards have been dealt to. A secondary player may bet that a particular primary player will remain in a game at a certain point in the game. For example, a secondary player may bet that primary player Joe Smith will be remaining in the game after the flop.

2.10.4. Which three people won't bust? In various embodiments, a secondary player may bet on a combination of people who will bust in a game of blackjack. For example, a secondary player may bet that, of a particular group of three primary players in a game of blackjack, all will bust. A secondary player may bet that one player will not bust. A secondary player may bet that of a group of primary players, none will bust during a game.

2.11. Bet on what the primary player himself will do. In some embodiments, a secondary player may bet on a decision that will be made by a primary player in a game.

2.11.1. The primary player will hit here. In some embodiments, a secondary player may bet on a decision that a primary player will make in a game of blackjack. A secondary player may bet that a primary player will do one or more of the following: (a) hit; (b) stand; (c) surrender; (d) split; (e) double down; (f) take insurance.

2.11.2. The primary player will draw to the flush. In some embodiments, a secondary player may bet on a strategy that a primary player will employ in a game of video poker. The strategy may be specified with a specification of which cards a primary player will discard. For example, the secondary player may specify that the primary player will discard the first, third, and fourth cards from a starting hand. In some embodiments, the secondary player may specify one or more cards that will be discarded while not excluding the possibility that additional cards might be discarded. For example, the secondary player may specify that the primary player will discard the second card in his hand. The secondary player may then win his bet if the primary player discards the second card, regardless of other cards that the primary player might discard. A secondary player may specify the strategy of a primary player in terms of a goal attributable to the strategy. For example, the secondary player might specify that the primary player will "draw to a flush" or "draw to a straight."

2.11.3. How much will the primary player bet? In some embodiments, a secondary player may bet on the amount that a primary player will bet. For example, the secondary player may bet that a primary player will bet $5 in a slot machine game. For example, the secondary player may bet that the primary player will raise by $25 in a game of poker.

2.11.4. What bet will the primary player make? In various embodiments, a secondary player may bet on a particular bet that a primary player will make in a game. For example, in a game of craps, there are many possible bets that a primary player can make, including a pass bet, a don't pass bet, an "any seven" bet, an "any eleven" bet, a "horn bet", and so on. The secondary player may bet on which of these, or other possible bets, the primary player will make.

2.11.5. Which pay-lines will the primary player activate? In various embodiments, a secondary player may bet on whether or not a primary player will bet on a particular pay-line at a gaming device. For example, a gaming device may have three pay-lines. A secondary player may bet that the primary player will bet on the third pay line.

2.11.6. Bet on primary players' heart rate, breathing, and other bio signatures. In various embodiments, a secondary player may bet on a vital sign of a primary player. The secondary player may bet on the heart rate, breathing rate, blood pressure, skin conductivity, body temperature, pupil dilation, muscle tension, or any other indicator tied to the primary player. For example, the secondary player may bet that the peak heart rate of a primary player will be 120 during a game of poker. For example, a secondary player may bet that a primary player will take 5 breaths in the next minute. The secondary player, by betting on the vital signs of a primary player, may indirectly bet on the stress level of a game and/or the primary player's response to stressful stimuli.

2.11.7. When will the primary player stop playing? Now? After five games? In various embodiments, a secondary player may bet on the length of a playing session of a primary player. The length may be measured in terms of time, the number of games played, the number of bets made, the number of cards dealt during a session, the number of times dice are rolled, or in terms of any other metric. For example, a secondary player may bet that a primary player will play five more games before quitting. For example, a secondary player may bet that a primary player will play for 40 more minutes before quitting. A session may be defined as having ended after: (a) a primary player has stopped playing for X amount of time; (b) a primary player has left the location of a game; (c) a primary player has cashed out; (d) a primary player has exchanged chips for money; (e) a primary player has run out of money; and so on.

2.11.8. What drink will the primary player order? In various embodiments, a secondary player may bet on a service that the primary player will receive. A secondary player may bet on a drink a primary player will order, on the type of food the primary player will order, on the price of a primary player's food or drink, on the amount that a primary player will tip a casino representative, and so on.

2.11.9. How many pulls will the primary player complete in an hour? In various embodiments, a secondary player may bet on the speed with which a primary player plays. A secondary player may bet on: (a) the number of handle pulls that a primary player makes in an hour or in any period of time; (b) the time between two handle pulls; (c) the time between the start of two games of blackjack; (d) the time between the placing of a bet in a game and the time of the provision of a payout; and so on.

2.11.10. Any combination of what primary players will do. For example, five primary players split. In various embodiments, a secondary player may bet on any combination of decisions that will be made by primary players in a game. For example, a secondary player may bet that at least 3 primary players will split in a game of blackjack; a secondary player may bet that a particular group of three primary players will split in a game of blackjack; a secondary player may bet that exactly three primary players in a game of blackjack will hit and that exactly one will split; and so on. Regarding a game of poker, a secondary player may bet that exactly two primary player will call a particular bet. In various embodiments, a secondary player may bet that certain decisions will or will not be made without regard to who makes the decisions. For example, regarding a game of poker, a secondary player may bet that one primary player will bet and that three primary players will call, without specifying which primary players will be the ones to bet and call. The secondary player may win his bet if any primary player bets and if any three primary players call.

2.12. Bet only on the third pay-line. Unlike the primary player, the secondary player does not have to bet on pay-lines 1 and 2 before betting on pay-line 3. In various embodiments, a secondary player may bet on an event in isolation on which the primary player was not allowed to bet in isolation. For example, the secondary player may bet on only the third pay-line of a slot machine. However, the primary player may have been required to bet on the first and second pay-lines at the slot machine before he could bet on the third pay-line. In a game of craps, a secondary player may be allowed to make an odds bet even without making a pass-line bet. Often, a primary player must first make a pass-line bet before making an odds bet.

2.13. Bet on what ad shows on the gaming device. In various embodiments, a secondary player may bet on an advertisement that will be displayed on a gaming device. In various embodiments, a gaming device may display an advertisement. In various embodiments, a gaming device may display an advertisement occasionally or periodically. An advertisement may be displayed at random or according to a schedule that is unknown to the secondary player. Accordingly, the secondary player may bet on what advertisement will be shown at a gaming device. For example, a secondary player may bet that an advertisement for vitamin water will be displayed on a gaming device. An advertisement may take the form of text, a still image, a video, or any other output that serves to promote a product or service, either directly or indirectly. A secondary player may specify a bet on an advertisement by specifying the product that will be promoted. For example, a secondary player may specify that Triscuit crackers will be advertised. A secondary player may specify a bet in terms of a general product category, such as crackers or snack foods. A secondary player may specify a bet on an advertisement by specifying a brand for a product or a name of a manufacturer for a product. In some embodiments, a secondary player may specify a bet on an advertisement through a multiple choice selection, where the secondary player may specify from among multiple possible different products to bet on. In some embodiments, a secondary player may bet on the time until the next advertisement. In some embodiments, a secondary player may bet on when the next advertisement for a particular product will be.

2.14. Combine sub-outcomes from several games to form larger outcomes. In some embodiments, a secondary player may bet on the outcome of a game which is created synthetically using events from more than one game. For example, synthetic game may be created for the secondary player using a first set of cards that was dealt in a first game for a primary player, and a second set of cards that was dealt in a second game for the primary player. As another example, a synthetic game may be created using a first roll of two dice from a first craps game, and a second roll of two dice from a second craps game. As another example, a synthetic slot machine game may be created using the symbol appearing on reel 1 in a first game, the symbol appearing on reel 2 in a second game, and the symbol appearing on reel 3 in a third game. If, for example, all three symbols are "cherry," then the secondary player may be paid as if all three cherries had occurred on the same spin on adjacent reels.

2.15. Bet on a machine malfunction, or coin refill. In various embodiments, a secondary player may bet on the occurrence of a machine malfunction. For example, a secondary player may bet that a machine will malfunction within the next hour. In various embodiments, a secondary player may bet that a gaming device will need a coin refill. For example, the secondary player may bet that a gaming device will need a coin refill within the next 10 minutes.

Embodiments described herein with respect to complete games or outcomes may similarly apply to events within a game. For example, just as a secondary player may search for games having particular characteristics, a secondary player may search for events within a game having particular characteristics, or a secondary player may search for games with particular characteristics so as to bet on events within such games. A secondary player may search for particular primary players and bet on events within the games of such primary players.

In some embodiments, a secondary player may seek to view historical or current games. The secondary player may desire to participate in the games. The secondary player may, in some embodiments, perform a search for games which satisfy a first set of criteria. For example, a secondary player may search for games which were played by a particular primary player. The search may yield a plurality of games. The games may then be sorted using a second set of criteria. The plurality of games may be sorted according to: (a) the time at which the games were played (e.g., the games may be sorted from the most recently played to the one played the furthest in the past); (b) the amounts won in the games (e.g., the games may be sorted from the game with the highest payout to the game with the lowest payout); (c) the amounts bet on the games; (d) the rankings of hands dealt in the games (e.g., games of poker may be sorted according to the poker ranking of the initial hand; e.g., games of blackjack may be sorted according to the point total of the final hand); (e) the results of the games (e.g., the primary player won; e.g., the dealer won); (f) the initial number rolled on a die in each game of the games; (g) the location in which the games were played (e.g., games may be sorted according to the floor in the casino where the games were played); (h) the name of the gaming devices on which the games were played (e.g., games may be sorted such that the gaming devices on which the games were played are in alphabetical order); (i) the name of the primary players who initially played the games; (j) the number of secondary players who participated in each of the games; and so on.

Any physical game described herein may be implemented electronically in various embodiments. For example, embodiments pertaining to the play of blackjack at a physical card table may pertain as well to a game of blackjack played over an electronic network. For example, a primary player may play blackjack using a video blackjack device. As another example, a primary player may play blackjack over the Internet. A secondary player may bet on the outcomes of the game of the primary player and/or on events within the game of the primary player.

In various embodiments, a secondary player may participate in the game of a primary player but take the game in a different direction from the direction in which the primary player took the game. For example, the primary player may be involved in a game which requires a decision on the part of the primary player. The primary player may make a first decision in the game. The secondary player, meanwhile, may be participating in the game, but may prefer a different decision from the decision made by the primary player. Thus, the secondary player may have the opportunity to complete the game in a different fashion than does the primary player. For example, the outcome based on which the secondary player is paid may be different from the outcome based on which the primary player is paid. Note that the secondary player may participate in a game after the primary player has participated in the game. Thus, the secondary player may participate in a historical game. The secondary player may, nevertheless, seek to take a different direction in the game than what happened in the original game.

The following is an example of some embodiments. A primary player begins play of a game of blackjack. The primary player is dealt a nine and a three as his initial hand. The dealer shows a two face up. The primary player decides to hit. The primary player is dealt a ten and therefore busts because his point total is now 22. The secondary player, prior to seeing the ten which was dealt to the primary player, decides he would rather stand than hit. At this point, the casino server determines what would have happened had the primary player stood. The casino server may then play the dealer's hand, or at least a simulated version of the dealer's hand. The casino server may reveal the dealer's down card to be a 10, providing the dealer with an initial point total of 12. The casino server may then make a hit decision on behalf of the dealer. The casino server may then deal a 10 to the dealer (the same 10 that had gone to the primary player before). The dealer then busts, and the secondary player wins. Thus, both the primary player and the secondary player have started from the same game. However, the primary player and the secondary player have taken the game in different directions by making different decisions at a juncture in the game. As a result, the primary player has lost but the secondary player has won.

It should be recognized that a secondary player may make any choice in any game at any time during the game as desired in some embodiments. For example, such a secondary player may make a choice in a game that may be same or different from a choice made by a primary player at a start of a game (e.g., before a primary player makes a choice, after a primary player makes a choice), in a middle of a game (e.g., after some number of actions have been taken in a game), at an end of a game (e.g., for a final action in a game), after some amount of time has passed, after some number of actions have been taken, and so on 3. In various embodiments, a secondary player may replay and/or redo some aspect of a game of a primary player.

3.1. A secondary player may redo a game knowing different information from what the primary player knew. When facing a decision in a game, a primary player may have a given amount of information available to him. For example, in a game of blackjack, a primary player facing a decision to "hit," "stand," "double down," "split" or "surrender," may know his own two cards and one of the dealer cards. However, the primary player may not know other potentially valuable information, such as the dealer's face-down card, or the next card to be dealt at the top of the deck. In various embodiments, a secondary player participating in the game of a primary player may have access to additional information that the primary player does not or did not have at the time the primary player originally plays or played the game.

3.1.1. Know the cards yet to come. In various embodiments, a secondary player participating in the game of a primary player may be presented with information about a card that was unknown to the primary player at the same juncture in the game. For example, a secondary player participating in a game of video poker may be presented with information about the next card to be dealt in the deck. In various embodiments, a secondary player may be presented with information about a card: (a) in the dealer's hand; (b) in an opponent's hand (e.g., in the hand of an opponent in a game of Texas Hold'em); (c) in another primary player's hand (e.g., in the hand of another primary player in a game of blackjack in embodiments where primary player hands are not dealt completely face up); (d) that was burned; (e) that will not be dealt (e.g., a card at the bottom of a deck of cards may have no chance of being dealt in a game); (f) that is unlikely to be dealt (e.g., a card that is in the middle of a deck may be unlikely to be dealt in a game); and so on. Information about a card may include information about a suit of the card, and information about a rank of a card. For example, a secondary player may be told that a card is a heart, or that a card is not a spade. For example, a secondary player may be told that a card is a 10-point value card (e.g., in a game of blackjack). For example, a secondary player may be told that a card's rank is between two and six, or that a card is not a seven. In various embodiments, a secondary player may be told the exact rank and suit of a card, such as a queen of diamonds.

3.1.2. Know the primary player made a losing decision. In various embodiments, a secondary player may be given information about the consequences of a primary player's decision in a game. For example, the secondary player may be told that the primary player's decision resulted in the primary player losing a game. For example, if a primary player in a game of blackjack decided to hit and busted, a secondary player may be told that the primary player's decision led to the primary player busting. A secondary player may be told that a primary player's decision did not achieve the best possible outcome of a game. Even if a primary player's decision led to a winning outcome, the secondary player may still be told that the primary player's decision did not lead to the best possible outcome. For example, in a game of video poker, if a primary player drew three cards and made a three-of-a-kind, the primary player may have had the potential to draw three cards in a different way and to make a straight-flush. Thus, the primary player may not have obtained the best outcome that he could of. Of course, the primary player may have made the correct decision from his point of view since he did not know that he would have been able to successfully draw to the straight-flush. In various embodiments, a secondary player may be informed of the relative merits of the primary player's decision or strategy in relation to other possible decisions or strategies. For example, regarding a game of video poker, a secondary player may be told that the primary player made the second best possible decision in terms of what outcomes the primary player could have achieved. In various embodiments, the secondary player may be told the merits of a primary player's decision or strategy assuming the primary player had perfect information about what the results of the various decisions or strategies would be. In some embodiments, the primary player will not have or have had perfect information about the consequences of his decisions, so that pronouncements on the merits of the primary player's decisions would not necessarily indicate that the primary player made a bad or wrong decision. In some embodiments, a secondary player may be provided with an indication of the merits of a strategy or decision, whether or not the primary player chose such a decision or strategy. For example, in some embodiments, a secondary player may be told that a particular strategy is a good strategy but not the best possible strategy. For example, a secondary player may be told that a particular strategy is a losing strategy. In various embodiments, the casino may have knowledge about cards that would be unknown to the secondary player in a game. Thus, the casino may be able to inform the secondary player based on such knowledge and thereby provide useful strategy recommendations to the secondary player without explicitly sharing the knowledge.

3.2. A secondary player may redo a game with the same ordering of a deck of cards, or with a different ordering. In various embodiments, the consequences of all possible primary player decisions are determined in advance, e.g., at the beginning of a game or prior to a decision of a primary player. For example, in a game of video poker, the shuffling and ordering of a deck of cards before a game serves to determine the consequences of any decision the primary player may make in a game. For example, the shuffling leads to a particular order of the deck such that any new cards that the primary player may decide to draw can be determined deterministically by dealing cards from the top of the deck. In various embodiments, the consequences of all combinations of primary player decisions in a game may be determined in advance. For example, in a game of blackjack, the shuffling of a deck before a game may place the cards to be dealt to primary players in a deterministic order. Thus, for a given set of primary player decisions (and given rules dictating what decisions must be made by the dealer), an outcome of the game for each set of primary player decisions may be determined deterministically from the ordering of cards in the deck. In various embodiments, the symbols that will be revealed on each reel of slot machine are determined in advance and prior to the revelation of even a single symbol. For example, the symbol that will be revealed on the third reel of a slot machine may be determined even before the symbol on the first reel of the slot machine is revealed. In various embodiments, the advanced determination of all possible consequences of a primary player's decision may or may not also apply to a possible alternate decision by a secondary player. In various embodiments, the advanced determination of one or more symbols in a game may or may not apply to the secondary player prior to the revelation of the symbols to the primary player or to the secondary player.

3.2.1. Same ordering. In various embodiments, the advanced determination of all possible consequences of a primary player's decision may apply in the same way to the possible consequences of a secondary player's decision. In other words, suppose the primary player is or has played a game, and the secondary player is participating in the game. At a given juncture in the game, a particular decision by the secondary player (e.g., "hit") will have the same consequences for the secondary player as the same particular decision made by the primary player would have for the primary player. For example, a decision by the secondary player to "hit" would result in the secondary player being dealt a four of diamonds. Likewise, a decision by the primary player to hit would result in the primary player being dealt the four of diamonds. It should be noted that for the primary player and the secondary player to experience the same consequence given the same decision may mean that the primary and secondary players will experience the same outcomes or will receive the same symbols or indicia. The actual payouts received by the primary player and the secondary player may differ, in some embodiments, due to differing bets by the primary and secondary players.

In various embodiments, a secondary player may decide to continue a game that has already been started. The secondary player may decide to join a game, for example, after an event within the game has been resolved. For example, a secondary player may decide to join a game after a first symbol on reel of a slot machine has been revealed, but before symbols on a second reel or on a third reel have been revealed. Once the secondary player decides to join the game, the game may proceed exactly as it had for the primary player who originally played the game (or exactly as it will for the primary player currently involved in the game). In other words, once the secondary player joins the game, the secondary player may receive the same outcome of the game that the primary player does or has. This may occur by virtue of the outcome of the game having been determined in advance, even before the revelation of the first symbol, for example.

3.2.2. Different ordering. In some embodiments a secondary player may participate in the game of a primary player, make all the same decisions as does the primary player, yet achieve a different result. The consequences of secondary player decisions may not be the same as the consequences of primary player decisions. In some embodiments, the consequences of a secondary player's decisions are determined after the start of a game. For example, the consequences of a secondary player's decisions are determined at the juncture in a game where a secondary player makes a decision, just prior to when a secondary player makes a decision, or even after a secondary player makes a decision. The consequences of possible decisions to be made by a secondary player may be determined by shuffling a remaining portion of a deck of cards from which cards will be dealt in the game in which the secondary player is participating. For example, suppose a primary player has been involved in a game of blackjack and has received an initial two-card hand. The primary player may decide to hit and may thereby receive a king of clubs dealt from the top of the deck. A secondary player may participate in the same game. The secondary player may also decide to hit after the initial two-card hand has been dealt. However, prior to the second player receiving a new card in his hand, the remaining portion of the deck of cards may be reshuffled. Thus, the secondary player may receive a different card than did the primary player, e.g., the secondary player may receive the five of hearts. Thus, the consequences of the secondary player's decision to hit will have been determined only after the secondary player has made his decision, the determination being made through the reshuffling of the deck of cards.

In embodiments where the secondary player does not make the same decision as does the primary player, the consequences of the secondary player's decision may not necessarily be determined at the beginning of the game. For example, in a game of video poker, a primary player may decide to discard the fourth and fifth cards from a starting hand. The secondary player, who is participating in the same game as the primary player and therefore has the same starting hand, may instead decide to discard the first and second cards from the starting hand. The primary player may be dealt a ten of diamonds and a queen of clubs. The secondary player may be dealt a jack of hearts and a nine of hearts. The secondary player may receive different cards than does the primary player because the cards to be dealt to the secondary player after the initial hand may be determined using a separate randomization process from that used to determine the cards dealt to the primary player after the initial hand. For example, after the initial cards in a game of video poker have been dealt, the remaining cards in the deck may be reshuffled from the order they had in the deck used in the game of the primary player. In some embodiments, the remaining cards in the deck may be reshuffled in both the game of the primary player and in the game of the secondary player. The two reshufflings may be different from one another, however, so that the order of the remaining cards in the deck for the primary player is different from the order of the remaining cards in the deck for the secondary player.

In various embodiments, a copy of a game, a deck, or of other game elements may be used in completing a game of a secondary player. For example, when a primary player begins a game, the deck of cards used in the game of the primary player may be copied. The deck may be copied so that the order of the cards within the deck is copied as well. The primary and the secondary player may then play out the remainder of the game from the two separate copies of the deck, without interfering with one another. In one embodiment, both the primary player and the secondary player start out using the same deck to generate, e.g., an initial hand. Thereafter, the remaining portion of the deck (e.g., the part of the deck that hasn't been dealt yet), is copied. This part of the deck may then be reshuffled, or it may not be reshuffled. The secondary player may then play out the remainder of the game using the copied portion of the deck. Thus, the secondary player may play out the remaining portion of the game separately from the primary player without interfering with the game of the primary player.

In various embodiments, a secondary player may participate in slot machine game. A first symbol from the slot machine game may be revealed. The secondary player may wish to continue the game from the point after the first symbol has been revealed. However, the secondary player may wish to continue the game in a different fashion from that in which the primary player has continued the game. In other words, the secondary player may want the remaining symbols of his outcome to be generated randomly using a different random process than that used to generate the remaining symbols for the primary player. Thus, in some embodiments, the casino (or the gaming device working on behalf of the casino) may randomly determine additional symbols to generate and display for the secondary player, where such symbols need not necessarily be the same as those generated and displayed for the primary player. In various embodiments, a casino may randomly determine a way to generate additional symbols as follows. A casino may determine all outcomes containing the one or more symbols that have already been generated. Such outcomes may be probability weighted so that, for example, it is understood that some are more likely to occur than others. The casino may then select from among the probability weighted outcomes randomly and in proportion to their weightings. Thus, for example, an outcome with twice the probability weighting of another outcome would be twice as likely to be selected.

3.3. A secondary player may redo the game after the fact. In various embodiments, a secondary player may replay a game from a certain juncture after the game has already been completed. For example, one hour after a game of video poker has been completed, a secondary player may replay the game starting after the initial hand has been dealt but before any decision has been made as to which cards to discard. As described above, a secondary player may replay a game with different outcomes or consequences than those experienced by the primary player, even if the secondary player and the primary player made the same decisions in the game. This is because the replayed game may be replayed with a different randomization process used than was used for the original game.

3.3.1. Replay a live game. In various embodiments, a secondary player may replay a game that was originally played with multiple primary players. For example, the secondary player may replay a game of Texas Hold'em poker in which there were originally 9 primary players. The secondary player may wish to play the hand of one of the 9 players.

3.3.1.1. The casino uses AI. In various embodiments, in order for the secondary player to have the opportunity to replay a multi-player game, other entities may take the positions of primary players other than the player who the secondary player has replaced. Thus, in some embodiments, the casino may use computer algorithms to take the place of the other primary players. The computer algorithms may be programmed to make decisions in a game, such as in a game of poker. For example, the computer algorithms may include a set of rules detailing what actions to take for any given game situation. When replaying the game, the secondary player may thus play against one or more computer algorithms. In some embodiments, the casino may disclose to the secondary player one or more attributes of a computer algorithm used in a multi-player game. The casino may disclose the rules used by the computer algorithm. The casino may disclose a personality of the algorithm, such as "aggressive" or "tight." In various embodiments, the casino may be required to disclose one or more attributes of a computer algorithm. The requirements may come from casino regulators, for example.

3.3.1.2. Secondary player plays against other secondary players. In various embodiments, if a first secondary player replays a game involving multiple primary players, the positions of other primary player may be filled with other secondary players. Thus, in some embodiments, the first secondary player may replay a game against other secondary players. In some embodiments, a first secondary player may replay a game against one or more other secondary players and against one or more computer algorithms.

3.3.1.3. Other players are not opponents. In some embodiments, a secondary player may replay a game that included multiple primary players. However, the primary players may not have been opponents of one another. For example, a secondary player may replay a game of blackjack from a live table game which originally included 6 primary players. The primary players were not opponents, but rather were competing against the casino. When the secondary player replays the game, the secondary player may wish for positions of the other primary players at the game to be filled as well. Thus, in some embodiments, computer algorithms may fill the places of other primary players. In some embodiments, other secondary players may fill the places of other primary players.

3.4. A secondary player may make a different decision in real time and diverge into a different game. In various embodiments, a secondary player may participate in a game that is currently being played by a primary player. Thus, the secondary player may participate in a game of a primary player in real time. However, at a particular point in a game, the secondary player may wish to diverge from the course of the primary player. For example, the secondary player may wish to make a different decision in the game than does the primary player. In some embodiments, the secondary player may not know which decision the primary player will make. However, the secondary player may wish to make his own decision anyway, even if it turns out that the decision of the secondary player will be the same as the decision of the primary player. Once the games of both the primary player and the secondary player have finished, the secondary player may rejoin the primary player for the next game. In other words, the secondary player and the primary player in the next game may receive the same symbols, indicia, or other event resolutions. If the primary player finishes his game before the secondary player does, the primary player may be delayed by the casino until the secondary player has an opportunity to bet on the next game.

3.5. Searching for games with certain characteristics. In various embodiments, a secondary player may search for games with particular characteristics. As described elsewhere herein, a secondary player may search for the games of a particular primary player, for games played at a particular gaming device, for games played at a particular time of day, for games played at a particular casino, for games played right before a big win, and so on. However, the secondary player may also search for games which would give the secondary player an opportunity to proceed from a certain starting point in a beneficial fashion. Once the secondary player finds a game in a search, the secondary player may have the opportunity to play out the game from a certain point in the game, such as from a decision point in the game.

3.5.1. The wrong decision was made. In some embodiments, a secondary player may search for a game in which a primary player made a decision that met or failed to meet one or more criteria. A secondary player may search for a game in which the primary player: (a) did not make a decision which generated the highest expected winnings for the primary player; (b) did not make a decision which made the primary player eligible for the highest paying outcome that the primary player could have been eligible for; (c) did not make a decision that followed a generally recommended strategy (e.g., the primary player did not make a decision in blackjack that followed basic strategy); (d) did not make a decision that followed a strategy of interest to the secondary player; and so on. For example, a secondary player may search for a game of blackjack in which the primary player has a point total of 13 with no aces, in which the dealer shows a 3 up-card, and in which the primary player chose to stand. The secondary player may choose to search for such games because, under various rules, the basic strategy recommendation would be to hit. Thus the secondary player will have searched for a game in which the primary player has not made the correct decision according to the recommendations of basic strategy.

3.5.2. There is a certain starting hand. In various embodiments, a secondary player may search for a game of a primary player in which there was a particular starting hand or in which there was a particular category of starting hand. For example, a secondary player may search for a game of a primary player which was a game of video poker, and which included an initial hand with exactly four hearts in it. A secondary player may search for a video poker game in which the primary player has an initial hand with a pair of jacks. A secondary player may search for a video poker game in which the primary player has an initial hand which includes the ace of spades, king of spades, queen of spades, jack of spades, and the four of hearts. A secondary player may search for a game of blackjack in which the primary player had a particular point total, such as 11. A secondary player may search for a game of blackjack in which the primary player had a first point total or a first combination of cards, and in which the dealer showed a second card. For example, the primary player had a point total of 14 and the dealer showed a 4. A secondary player may search for a game of blackjack in which the primary player had already hit twice and still had a point total of less than 14. In various embodiments, a secondary player may search for a game in which one or more symbols occurred at a slot machine. In replaying the game, the secondary player may have the opportunity to obtain additional symbols where such symbols differ from the ones obtained by the primary player in the same game.

3.5.3. A primary player had a near miss. In various embodiments, the secondary player may search for games in which the primary player had a near miss. The secondary player may search for games in which: (a) an outcome obtained by the primary player differed by X or fewer symbols from a high-paying outcome (e.g., there was only one symbol different between the outcome achieved by the primary player and a jackpot outcome); (b) a primary player had four cards to a royal flush in video poker but did not obtain the fifth card; (c) an outcome obtained by a primary player differed by one symbol from a jackpot outcome, and the symbol necessary for the jackpot outcome was just one position removed on a reel from the pay-line; and so on. A secondary player may keep the symbols of an outcome from a game of a primary player that would contribute to a high-paying outcome and may have any additional symbols regenerated in an attempt to obtain all the symbols necessary for obtaining the high-paying outcome.

3.6. Adjust the odds of a game based on what situation the secondary player is starting from. In various embodiments, a secondary player who begins play from the middle of a game, or who begins play in a game after finding out any information about a possible final outcome of the game, may have different probabilities of achieving a given final outcome from what any player would have had at the start of a game. For example, if a secondary player starts a game of video poker at the midpoint after an initial hand with four cards to the royal flush has been dealt, the secondary player will have a greater chance of achieving the royal flush than if the secondary player were starting the game from the beginning. As described herein, a house advantage may be derived from the products of payout ratios and probabilities corresponding to outcomes. Thus, in some embodiments, if the probabilities of paying outcomes go up, then the payout ratios associated with such outcomes must go down in order to maintain a constant house advantage, or in order to maintain any house advantage at all. Thus, in some embodiments, the payout ratios associated with an outcome may change when a secondary player begins a game after some information has been revealed in the game. For example, a payout ratio for a royal flush may be 500 for a game of video poker in which a player starts from the beginning. However, if a player starts the game with an initial hand that contains the ace of spades, king of spades, queen of spades, jack of spades, and 3 of hearts, then the payout ratio for the royal flush may be set to 25 rather than 500. In various embodiments, payout ratios for outcomes may be adjusted for a game started in the middle so that the house advantage for the game started in the middle is the same (or nearly the same) as for the same game started from the beginning. For example, suppose the house edge on a game of video poker is 2% with perfect play. If a secondary player is allowed to start in the middle of a game (e.g., after an initial hand of poker is dealt), then payout ratios for one or more outcomes may be adjusted so that the house advantage over the secondary player is still approximately 2% (e.g., between 1% and 3%). As will be appreciated, the payout ratio for a game may be adjusted in several ways, any of which are contemplated in various embodiments. In various embodiments, a payout ratio may be changed by changing a required bet from a secondary player while maintaining constant payouts on outcomes. In various embodiments, a payout ratio may be changed by changing the payouts for one or more outcomes while maintaining the same required bet amount. In various embodiments, a payout ratio may be changed by changing both the payouts for one or more outcomes, and the amount of a required bet.

3.6.1. Odds adjustments in a game of Hold'em. In various embodiments, a secondary player may wish to participate in a game that involves multiple primary players. The secondary player may wish to take the place of a first primary player in the game and to make one or more decisions in the game going forward from a particular point. However, probabilities for possible outcomes of a multi-player game may not be readily quantifiable since the outcomes may depend on the actions of human beings, each with their own independent wills. As such, it may be difficult for the casino to set a payout ratio for a secondary player who is joining in the middle of a multi-player game. Further, the secondary player will not necessarily be interacting with the other primary players in the game (e.g., the primary players in the game other than the primary player whose place the secondary player has taken), since the game may have been played in the past, or since the primary player whose place the secondary player will be filling may still be in the real game. Thus, the secondary player may complete the remainder of the game against computer algorithms which fill in for other primary players. The secondary player may complete the remainder of the game against other secondary players who fill in for other primary players.

3.6.1.1. Assume all players will stay in and then decide? In some embodiments, a probability that a secondary player wins a game may be derived or estimated based on an assumption that all other players in a game (e.g., all algorithms filling in for primary players; e.g., all secondary players filling in for primary players) remain in the game. In other words, there may be an assumption that no player folds after the point at which the secondary player has joined the game. Based on an assumption that no further player will fold in a game, the probability that a secondary player will win can be derived in a straightforward fashion. In one embodiment, all possible combinations of additional cards to be dealt can be tested. For example, in a game of Texas Hold'em in which the flop has been dealt already, all possible combinations of turn and river cards may be tested. The proportion of the combinations that lead to a win for the secondary player may then be used to determine the probability that the secondary player will win. In some embodiments, a large number of deals of additional cards in the game may be simulated in order to determine the proportion of such simulations which the secondary player wins. Such a proportion may be used to estimate the probability that the secondary player will win. It will be appreciated that a probability that the secondary player will tie may be determined in a similar fashion to the way a probability of winning may be determined. For example, all possible combinations of additional cards to be dealt may be tested, and the proportion of such combinations which lead to a tie may be used to estimate the probability that the secondary player will tie.

3.6.1.2. Do a simulation with good AI players? In some embodiments, a probability that a secondary player will win in a multi-player game may be determined using a simulation in which computer algorithms fill in for each of the primary players in the original game. For example, 1000 simulated games may be run using computer algorithms filling in for each of the primary players. The proportion of the time that the computer algorithm wins while filling in at the position desired to be played by the secondary player may be used to determine the probability that the secondary player will win. In some embodiments, the average amount won or lost by the computer algorithm filling in at the position desired to be played by the secondary player may be used to estimate an expected amount that will be won or lost by the secondary player in the game. In various embodiments, once a probability that a secondary player will win and/or tie in a game is determined, a payout ratio for the game may be determined. In various embodiments, once an expected amount that a secondary player will win or lose is determined, a required bet amount for the secondary player may be determined. A payout ratio or required bet amount may be determined for any manner in which a secondary player completes a game from the point or juncture at which the secondary player joins. For example, a payout ratio or required bet amount may be determined whether a secondary player completes a game against other secondary players, whether a secondary player completes a game against computer algorithms, or whether the secondary player completes a game against any combination of the two.

3.7. If a secondary player does diverge in time, then there may be some catch-up, or the secondary player may skip to the current outcome. For example, the secondary player may be busy on a bonus round while the primary player goes off playing more games. In various embodiments, a secondary player may complete a game in a different manner from the way in which a primary player completes the game. For example, a secondary player may be participating in real time in a game of a primary player. At some point in the game, the primary player may make a first decision and the secondary player may make a second decision. As a result of the different decisions, or for any other reason, the game of the secondary player may last longer than does the game of the primary player. For example, in a game of blackjack, a decision to "hit" by a primary player may lead to the primary player busting, and thereby to an immediate end to the game of the primary player. On the other hand, a decision to "stand" by the secondary player may cause the dealer in the game of the secondary player to make one or more decisions, thereby prolonging the game of the secondary player. If the game of a secondary player lasts longer than the game of a primary player in whose games the secondary player has been participating, then the primary player may on occasion begin a new game before the secondary player has completed an old game.

3.7.1. The secondary player sits out the next game and joins a future game. In some embodiments, if a primary player begins a new game before a secondary player has completed a prior game he started with the primary player, then the secondary player may sit out the new game. The secondary player may sit out any number of new games until the old game of the secondary player has finished. The secondary player may then join in the next game to be started by the primary player.

3.7.2. The secondary player gets involved in two games simultaneously. In some embodiments, even if a secondary player has not completed a prior game, the secondary player may still participate in a new game of a primary player. For example, the secondary player may follow the progress of his old and new games using a split-screen view on his terminal. As will be appreciated, the secondary player may be involved in more than one old game even as a new game is started. The secondary player may potentially view the progress of one or more old games along with the new game.

3.7.3. The old game is finished quickly. In various embodiments, once when a primary player finishes a first game and/or begins a second game, the older game of the secondary player (e.g., the offshoot from the first game of the primary player) may be sped up. For example, the casino may cause outcomes to be generated or displayed more rapidly or instantaneously. For example, rather than showing renditions of cards being dealt, the house may show cards appearing instantly in the hand of the secondary player. In various embodiments, the house may make decisions for the secondary player automatically. For example, the house may make decisions for the secondary player according to one or more strategies, such as according to optimal strategy or according to basic strategy.

3.7.4. The games of the primary player are stored, and the secondary player can participate in the games later on. In various embodiments, a secondary player who is still involved in an older game may not immediately participate in a new game of a primary player. However, data about the new game may be stored by the casino. The secondary player may then, at a later time, choose to participate in the game. The casino may store a record of which games of the primary player the secondary player missed and may then give the secondary player the option of participating in such games.

3.7.5. The secondary player gets the EV of a game. In various embodiments, a secondary player may not complete a game in the standard fashion but may rather receive a settlement payment. The settlement payment may be based on an average amount that the secondary player might have expected to win had he completed the game. In various embodiments, a secondary player may be involved in a bonus round (e.g., the bonus round of a slot machine game). The secondary player, rather than playing out the bonus round, may receive a settlement amount for the bonus round. The secondary player may thereby save the time of playing through the entire bonus round and may therefore be able to participate in a new game that the primary player would otherwise have started without the secondary player's participation.

3.8. The secondary player may bet different pay-lines. In various embodiments, a secondary player may choose to bet on different pay-lines from those on which the primary player bet or bets. For example, the primary player may bet a first pay-line and a second pay-line at a slot machine while a secondary player bets only the first pay-line. For example, a primary player may bet a first pay-line at a slot machine while a secondary player bets a first pay-line and a second pay-line. For example, a primary player may bet a first and second pay-line while a secondary player bets a second and third pay-line. For example, a primary player may bet a first pay-line while a secondary player bets a second pay-line at a slot machine.

3.9. The secondary player may bet different amounts than did the primary player. For example, the secondary player may bet the full three coins rather than just one. In various embodiments, a secondary player may bet a different amount than does a primary player. For example, in a game of poker, such as in a multiplayer game of Texas Hold'em, a secondary player may decide he would rather raise by $20 instead of the $10 raise made by a primary player. Accordingly, the secondary player may play out the remainder of the game, taking the position of the primary player, and playing against computer algorithms taking the place of other primary players. In various embodiments, a primary player may bet a first amount at the start of the game, while the secondary player may bet a second amount on the same game.

Embodiments described herein, where applicable may be performed based on games played electronically as well as based on games played using physical tokens, devices, instruments, tables, etc. In various embodiments, a primary player may play a game using physical tokens (e.g., physical cards and chips), while a secondary player may participate in the game and view an electronic version of the game. In some embodiments, a primary player may play an electronic version of a game and a secondary player may participate in the game via an electronic version of the game. In some embodiments, primary player may play a physical version of a game and a secondary player may participate in the game using physical tokens. For example, when a secondary player makes a decision in a game that is different from the decision made by the primary player, the a deck of cards used in the primary player's game may be duplicated by taking another physical deck of cards and putting the cards in the same order as are the cards in the deck used in the game of the primary player.

4. Aggregate and display all data from across the casino. Allow people to make bets accordingly. For example, show all the reds and the blacks across all the roulette games. This might then influence how people bet in the future on red and black. Cumulative wins and losses in blackjack can be displayed. For instance, players have won 500 hands and lost 510. In various embodiments, data about two or more games at a casino may be gathered. The data about two or more games may be combined or aggregated. In some embodiments, a single statistic may be used to describe data about two or more games. In some embodiments, more than one statistic may be used to describe data about two or more games. In some embodiments, statistics used to describe data about two or more games may represent a compression or condensation of the data. Statistics may represent a way to allow a human being, such as a secondary player, to gain an understanding about large amounts of data about games. Exemplary statistics may indicate an average amount won in a set of games, a prevalence of a particular outcome in a set of games, an excess occurrence of a first outcome over a second outcome in a set of games, and so on. Statistics may be presented to players. For example, a prominent display screen at a casino may indicate the total number of occurrences of "red" in roulette in the entire casino during the last 10 minutes. Data about games may be presented to a player in many different forms. Data may also be presented to a casino representative, such as a casino employee. Data may also be presented to a regulator, such as a gaming regulator. Data may be presented in graphical form. For example, a bar graph may show the number of "red" outcomes, the number of "black" outcomes and the number of "green" outcomes in roulette as three separate bars on a graph. Data may be presented in the form of highlights or fast action replays. For example, video footage of outcomes may be shown sped up to 10 times the original speed. Data about games may aid players in deciding which bets to make in the future. For example, a player may believe that a "red" outcome is likely to follow a long string of "black" outcomes. Accordingly, the player may be interested in viewing data or summary statistics about games of roulette.

4.1. Types of data. In various embodiments, many types of data may be gathered, generated, recorded, displayed, presented and/or stored. Data about different games may be gathered. Data about different players may be gathered. Data about gaming devices may be gathered. Data about casinos may be gathered.

4.1.1. Number of times primary players have won/lost. For an individual game, win, loss, or tie data may be gathered. A game may be considered a win for a primary player if the primary player receives any positive payout and/or if the primary player receives a payout that is greater than the amount he bet on the game. A game may be considered a win if a primary player receives more than an average amount that would typically be paid in a game. Other criteria may be used in considering whether a game is a win or not. For example, if the particular rules of a game indicate that a primary player is a winner, the game may be considered a win for the primary player. For example, in a game of blackjack, a primary player may be considered the winner if the point total of his hand is 21 or less, and if the dealer has busted or has a point total less than that of the primary player. A game may be considered a tie if a primary player receives a payout that is equal to the amount he bet on the game. A game may be considered a tie if a primary player neither wins nor loses money in a game. A game may be considered a tie if the rules of the game indicate that the game is a tie. A game may be considered a loss if a primary player receives no payout for the game. A game may be considered a loss if a primary player receives a payout that is less than the amount he bet on the game. A game may be considered a loss if a primary player receives less than an average amount that is typically paid in a game. A game may be considered a loss if it is not considered a win or a tie.

In some embodiments, each pay line within a game may be considered separately. For example, a primary player may bet 1 coin and win 3 coins on a first pay line. The primary player may bet 1 coin and win 0 coins on a second pay line. In this example, the results of the bet on the first pay line may be considered a winning game, while the results of the bet on the second pay line may be considered a losing game. Thus, in some embodiments, the placing of a bet, the generation of an outcome, and the collecting of winnings for a given pay line may be considered a complete and separate game, even if multiple pay lines were enabled for a given spin of a slot machine. In some embodiments, each hand of video poker played may be considered a separate game. For example, if a primary player plays 3 hands of video poker at a time, the three hands of video poker may be considered separate games. In some embodiments, even if 3 hands of video poker each include the same starting hand (e.g., the initial five cards are the same for each hand), the hands may still be considered to be separate games. In some embodiments, each bet made is considered to define a separate game. For example, a bet on a first pay-line of a slot machine may define a different game from a bet on a second pay-line for the slot machine. In some embodiments, two bets are considered to constitute separate games if the payouts from the bets are not perfectly correlated. For example, if the payout stemming from a second bet cannot be determined with certainty even knowing the payout stemming from a first bet, then the two bets may be considered to define separate games. In some embodiments, two bets made at a craps table may be considered to define separate games even if payouts for both bets are dependent on the same roll or rolls of the dice. For example, a pass bet may be considered to define a different game from a hard way bet.

Win, loss, and tie data may be aggregated over two or more games. The aggregated data may be stored and/or presented as a statistic, as a graph, or in any other fashion. In some embodiments, a statistic may indicate the number of games won by one or more primary players over the last X games (e.g., over the last 100 games). In some embodiments a statistic may indicate the number of games lost by one or more primary players over the last X games (e.g., over the last 100 games). In some embodiments, a statistic may indicate the number of games tied. In some embodiments, a statistic may indicate the difference between the number of games won and the number of game lost by one or more players over the last X games. For example, a value of a statistic at −7 may indicate that over the last 100 games, a set of primary players has lost seven more games than they have won. As will be appreciated, data may be aggregated over any number of games, such as the last 100, the last 1000, all the games of the day, all the games of a year, etc. As used herein, the term "last" need not necessarily reference the present time. For example, a statistic that describes the number of primary player wins over the "last" 100 games may describe the number of primary player wins out of 100 games leading up to some point in the past. Thus, the term "last" may be used with reference to the point in the past. The point in the past may be, for example, the time during which a statistic was created. In various embodiments, data may be aggregated for a single primary player. For example, a statistic may indicate the number of games won by a particular primary player during the past three days. In some embodiments, data may be aggregated over multiple primary players. For example, a statistic may indicate the number of games won in the last hour by all primary players at a particular blackjack table. In various embodiments, data may be aggregated for games meeting one or more criteria. For example, win/loss/tie data may be aggregated for games meeting one or more criteria. Such criteria may include: (a) the games were played during a particular period of time; (b) the games were played most recently; (c) the games were played by a particular primary player; (d) the games were played by one of a set of primary players; (e) the games were played by any primary player having a particular characteristic (e.g., the games were played by any primary player who is a small business owner); (f) the games were played at a particular gaming device; (g) the games were played in a particular area of a casino; (h) the games were played in a particular casino; (i) the games were of a particular type (e.g., slot machine; e.g., video poker; e.g., Addam's Family slot machine); (j) the games had a certain minimum bet required (e.g., the games required a $1 minimum bet); (k) the games each had a bet of a particular amount placed on them (e.g., the games all had bets of $0.25 placed on them); and so on.

4.1.2. Amounts of money won/lost. For an individual game, data may be gathered for the amount of money won or lost by a player. For an individual game, data may be gathered for the amount of money won or lost by the house. For example, in a game with multiple primary players against the house, the winnings of a given player are not necessarily the inverse of the winnings for the house. Data may be gathered in relation to gross winnings. In other words, data may be gathered for winnings without regard to any amounts paid by the player, e.g., in the form of a bet. For example, if a primary player inserts $1 into a slot machine as a bet and receives a payout of $5, the primary player has gross winnings of $5. Data may be gathered in relation to net winnings. In other words, data may be gathered for winnings after accounting for amounts paid by the primary player. In the prior example, after having bet $1 and receiving a payout of $5, the primary player may have net winnings of $4. In a similar fashion, data may be gathered for gross and net winnings of a casino. Data related to winnings and losses may be aggregated over multiple games. A statistic may describe the gross winnings of one or more primary players over multiple games. For example, a statistic may take the value of $83, indicating that a primary player has received payouts totaling $83 during the last 100 games. A statistic may describe the net winnings of one or more primary players over multiple games. For example, a statistic may take the value of −$17, indicating that a primary player has paid $17 more in bets than he has received in winnings over the last 100 games. A statistic may describe the winnings and losses of multiple primary players. For example, a statistic may take the value of $25, indicating that a group of 20 primary players who have played blackjack have average net winnings of $25 over the last hour. In some embodiments, data about winnings and losses may be displayed graphically. For example, the size of a primary player's bankroll may be graphed over time. As the primary player wins, the graph may move upwards. As the primary player loses, the graph may move downwards. The primary player's bankroll may start at an arbitrary value, such as zero, or at a value equal to the amount for which the primary player has bought in to a game.

4.1.3. Number of hands/games played. In some embodiments, data may be gathered describing the number of games played. For each game played, a statistic may be incremented. The statistic may be a simple counter of the number of games played. In some embodiments, a statistic may keep track of the number of games played over a particular period of time. Thus, for every game played, an associated time may be stored, e.g., in a database of the casino server. Once a game has been played more than X hours in the past, the statistic may be decremented by one to reflect that the game was no longer played in the last X hours, which are the hours covered by the statistic. Data about the number of games played may be aggregated over multiple players. For example, a statistic may describe the number of games played by all roulette players in a casino over the last 20 minutes. In some embodiments, data about the number of hands played may be kept. In some embodiments, data about the number of pay-lines may be kept. In some embodiments, data about the number of outcomes generated or received may be kept. For example, a statistic may track the number of outcomes generated for a player at a slot machine, with each pay-line enabled counting as a separate outcome.

4.1.4. Number of a particular outcome obtained. For example, number of jackpots, number of payouts over X, etc., number of cherry-cherry-cherry outcomes, etc. For an individual game, outcome data may be recorded. Outcome data may include data describing what symbols were generated for a game. Outcome data may include data describing what symbols were used in determining a payout for a player. An outcome may include a set of symbols, such as “cherry-cherry-cherry” or “bar-bell-lemon.” Outcome data may include a payout amount. For example, a payout of $1 may be an outcome. Outcome data may include a point total. For example, in a game of blackjack, an outcome may be that the player received 21 points. Outcome data may include a point total for a dealer and/or for an opposing primary player. In a game of blackjack, outcome data may include data describing the point total of the dealer. In a game of poker, outcome data may include data describing the hands of other primary players against whom a primary player of interest is competing. Outcome data may further include data describing one or more common symbols. For example, in a game of Texas Hold’em, outcome data may include data about what cards were dealt on the flop, turn and/or the river. Outcome data may include the results of rolls of the dice. For example, outcome data may describe the numerical total of rolls of the dice in a game of craps. In a game of roulette, outcome data may include data describing the number that came up when the wheel was spun. In various embodiments, outcome data may be aggregated over a plurality of games. The games may include the games of one or more primary players. In some embodiments, a statistic may describe the number of times a particular outcome has occurred. For example, a statistic may describe the number of times the outcome “cherry-cherry-cherry” has occurred. For example, a statistic may describe the number of times “black” has occurred at a roulette wheel. A statistic may also describe the number of times an outcome has occurred per unit time or per game. For example, a statistic may take the value of 48, indicating that a roulette wheel has generated a “red” outcome 48 times in the last 100 spins. In some embodiments, a statistic may express the occurrence of an outcome per spin in terms of a percentage. For example, a statistic may indicate that an outcome of “flush” or better has occurred in 4% of the last 1000 games in a game of video poker. In various embodiments, data about outcomes may be aggregated over multiple primary players. For example, a statistic may describe that a group of primary players has obtained 100 blackjacks during the last hour, or out of the last 2000 hands played by primary players in the group. In various embodiments, data about outcomes may be aggregated over multiple tables, gaming devices, or other outcome generators. For example, a statistic may indicate that, at a group of gaming devices, 3 jackpot outcomes have occurred in the last month. For example, regarding a group of 5 roulette tables in a casino, a statistic may indicate that the number 12 has come up 5 times in the last hour. In various embodiments, a statistic may indicate a comparison between the number of occurrences of a first outcome and the number of occurrences of a second outcome. For example, a statistic may indicate a difference in the number of occurrences of straights versus flushes in a game of video poker over a given period of time. For instance, a value of a statistic of 10 may indicate that 10 more straights than flushes have occurred in the past hour at a group of video poker machines.

4.1.5. Number of a particular symbol obtained. For an individual game, data may be obtained regarding what symbols occurred during the game. For example data may be obtained that an ace of spades, jack of hearts, king of diamonds, queen of clubs, and seven of hearts was obtained as an initial hand in a game of video poker. For example, data may be obtained that a “cherry” symbol was obtained in a reel slot machine game. In various embodiments, such data may be aggregated, such as over multiple games, over multiple primary players, and/or over multiple gaming devices. For example, a statistic may describe the number of times an ace of spades has been dealt at a video poker machine in the past hour. For example, a statistic may describe the number of times any player from California in a casino has obtained a red card in any game of cards in the past 20 minutes. For example, a statistic may describe the number of times a bell symbol has been generated at any slot machine in a bank of slot machines in the last day. For example, a statistic may describe the number of times a six has been rolled in a game of craps. In various embodiments, a statistic may indicate a comparison between the number of times a first symbol has occurred and the number of times a second symbol has occurred. For example, a statistic may indicate that a “lemon” symbol has occurred X more times than has a “plum” symbol in a given period of time. In various embodiments, positional data may be obtained. Positional data may include data describing the position of a symbol within an outcome, within a display area, or within any other area. In various embodiments, positional data may include data about whether a symbol was the leftmost symbol in an outcome, the middle symbol in an outcome, or the rightmost symbol in an outcome, e.g., as displayed in the viewing window of a gaming device. For example, in the outcome “lemon-bell-bar,” the “lemon” symbol may be considered to be in the first position, the “bell” symbol in the second position, and the “bar” symbol in the third position. In various embodiments, data about a symbol may be recorded even if the symbol does not form part of an outcome. For example, data about a symbol may be recorded even if the symbol does not contribute to the determination of a payout for a player. For example, a viewing window of a slot machine may show a grid of 3 by 5 symbols, whereby each of 5 reels has 3 symbols visible. The player of the slot machine may have enabled only one pay-line so that only the symbol visible in the middle of each reel is applicable to the payout determined for the player. Nevertheless, data indicative of the other symbols may still be recorded. For example, the fact that a “dog” symbol was visible at the top of the first reel may be recorded even if the “dog” symbol did not contribute to the payout determined for the primary player. In various embodiments, data about symbols that were not visible may also be obtained and/or recorded. For example, data about symbols that occurred one position above a viewing window on a reel may be recorded. Such symbols may not have been visible to a primary player at the conclusion of a game. However, such symbols may still have been present on a reel, e.g., in the form of a printed graphic or in the form of data in the memory of a gaming device describing the composition of a virtual or electronic reel. For example, a gaming device may maintain a data structure describing all the symbols on a reel, even if there is no physical embodiment of the reel. Thus, although not all of the symbols on the reel are displayed at one time (e.g., on the display screen of the gaming device), the positions of all symbols relative to the displays screen (e.g., the viewing window) of the gaming device may be known to the gaming device. In various embodiments, data about positional information may be aggregated. Data may be aggregated, for example, over multiple games, over multiple primary players, over multiple gaming devices, over multiple locations, over multiple time periods, and so on. For example, a statistic may indicate the number of times that a cherry symbol has occurred in the second position of an outcome at a particular gaming device in the last hour. For example, a statistic may indicate the number of times that the third card in an initial hand of video poker has been a jack for a group of primary players in the last hour. In various embodiments, a statistic may indicate the number of times that a "Yosemite Sam" symbol has occurred in the upper right hand corner of a viewing window of a gaming device in the last hour. In various embodiments, data about a chronological order in which symbols occur may be obtained and/or stored. In a game of cards, data about which card was dealt first, which card was dealt second, and so on, may be kept. A statistic may describe the number of times a particular symbol appeared in a particular chronological order. For example, a statistic may describe the number of times that an ace was the tenth card dealt in a table game of blackjack over the last two hours.

4.1.6. Data about the ordering of a deck, order of symbols on a reel. In various embodiments, data may be obtained about the order of cards in a deck. For each card in a deck, a position may be recorded. For example, a position of the two of clubs may be recorded as "10", indicating that the tenth card from the top of a deck was the two of clubs. Data about the position of a card in a deck may be obtained or stored even if such card never appeared in a game. For example, regarding a game of video poker, the rank and suit of the card at the bottom of the deck may be recorded, even though the card may have no chance of being dealt in the game of video poker. In various embodiments, data may be obtained or recorded about the order of symbols on a reel of a gaming device. For example, from an arbitrary location on a reel, each symbol on the reel may be attributed to a different position. For example, a "lemon" symbol is in the first position. An adjacent "cherry" symbol is in the second position. An adjacent "plum" symbol is in the third position, and so on. In various embodiments, data about the order of symbols may be aggregated. For example, a statistic may indicate the number of times that the jack of hearts has been in the fifth position of a deck of cards in that last 200 game of video poker.

4.1.7. Top performing players. E.g., players who have won the most in the last 100 outcomes, the last hour, etc. For an individual game, data about a primary player's performance may be gathered. Data about performance may include data indicating a gross amount won, a net amount won, an outcome obtained, a strategy used, and so on. Data about performance may be aggregated over multiple games, over multiple players, over multiple gaming devices, and so on. In some embodiments, a numerical score may be assigned to the strategy used by a primary player in a game. For example, a primary player who uses an optimal or a recommended strategy may receive a high score. A primary player who uses a strategy that is not recommended or not optimal may receive a lower score. For example, in a game of video poker, a primary player may receive an integer score from 1 to 32, each score corresponding to a possible strategy that could be used by the primary player in the game of video poker. It should be noted that in a game of video poker where primary players can discard any combination of cards from an initial five-card hand, there are two to the fifth power, or 32 possible ways in which the primary player may choose cards to discard. Thus, each way in which the primary player may select discards may be considered a separate strategy and may therefore correspond to a different score. The strategies may be ranked according to which provide the highest expected winnings for the player. The strategy which provides the highest expected winnings may correspond to a score of 32. The strategy which provides the next highest expected winnings may correspond to a score of 31, and so on. As will be appreciated, scores need not be integers or any other particular numbers. In various embodiments, data about the strategies used by a player over multiple games may be aggregated. In various embodiments, scores assigned to a player based on his choice of strategy in a game may be aggregated. For example, the scores obtained by a primary player during individual games may be added up to describe an aggregate score over multiple games. In some embodiments, scores obtained by a primary player during individual games may be averaged. As will be appreciated, in various embodiments, low scores might correspond to good strategies while high scores might correspond to poor strategies. In various embodiments, a data may be recorded about a primary player's choice of strategy during a game of blackjack. Such a primary player may be given a relatively high score, for example, if he follows the recommendations of basic strategy, and relatively low score, for example, if he does not.

Data about other performance metrics may be aggregated, in various embodiments. In various embodiments, data about amounts won may be aggregated over multiple games. A statistic may indicate the total amount won by a primary player, for example. A statistic may indicate the total number of times a primary player has won.

In various embodiments, data about the performance of multiple primary players may be aggregated. A statistic may indicate which primary player or players has had a distinguishing performance from among a group of primary players. For example, a statistic may indicate which primary player from a group of primary player has had the best performance, according to some metric. For example, a statistic may indicate which primary player has had the highest gross winnings over the last hour, or which primary player has used the best strategy over the last hour. In various embodiments, the top X primary players may be listed according to some performance metric. In some embodiments, the bottom Y primary players may be listed according to some performance metric.

In various embodiments, the top performing primary player may be periodically determined. The top performing primary player may be determined using any metric, such as gross winnings, net winnings, best strategy, or any other metric or combination of metrics. The top performing primary player may be determined, for example, every minute, every ten minutes, every hour, etc. In various embodiments, the top performing primary player may be determined after each game played by any primary player. For example, after a primary player completes a game, the casino server may determine whether that primary player has just accumulated enough gross winnings to become the top performing primary player. In various embodiments, the top performing primary player is determined at irregular intervals. For example, a first top performing primary player may be determined. Five minutes later, a second top performing primary player may be determined. Nine minutes later, a third top performing primary player may be determined. It will be appreciated that as primary players continue to gamble, their relative performance may change, and thus a primary player who used to be an average performing primary player may become the top performing primary player. For example, a primary player may win a large jackpot and thereby become the top performing primary player.

In various embodiments, a secondary player may participate in the games of the current top performing player. A secondary player may be continuously or periodically informed of who is the top performing primary player. For example, a name or other identifier of the top performing primary player may be displayed on the display screen of the secondary player's terminal or mobile gaming device. The name of the primary player may remain displayed on the display screen of the secondary player until a new top performing primary player is determined. The secondary player may elect or decide to participate in the games only of the current top performing primary player. In various embodiments, the secondary player may elect to automatically participate in the games of the current top performing primary player. For example, the secondary player may make a bet. It will then be understood by the casino server that the bet is to be applied to a game of the currently top performing primary player. Thus, for example, if the currently top performing primary player wins, the secondary player may win as well. If the currently top performing primary player loses, the secondary player may lose as well. In various embodiments, the casino server may make it easiest or most convenient for the secondary player to participate in the games of the currently top performing primary player. For example, the casino server may allow the secondary player to press only a single button in order to place a bet and participate in the game of the currently top performing primary player. The secondary player may be able to participate in the games of other primary players as well but may be required to perform extra steps in order to do so. Thus, in various embodiments, participation in games of the top performing primary player may be the default option for a secondary player.

In various embodiments, an identifier (e.g., a name; e.g., a handle) of the top performing primary player who is currently active may be displayed. The casino server may allow a secondary player to readily participate in the games of such a primary player, (e.g., by making participation the default option for the secondary player). A primary player who is currently active may include a primary player who has recently played a game. For example, a primary player who is active may include a primary player who has played a game in the last 10 seconds, the last minute, or within the most recent predetermined time interval. In various embodiments, a primary player who is currently active may include a primary player who has a credit balance in a gaming device. In various embodiments, a primary player who is currently active may include a primary player who has been playing at a certain rate (e.g., at 30 or more games per minute). It will be appreciated that the top performing primary player who is currently active may include vary from moment to moment. For example, a first primary player may initiate a game and may thereby be the top performing currently active primary player. That primary player may then pause for a few moments after his game. Another primary player may, in the meantime, initiate play of a game. That other primary player may, as it happens, then be the top performing currently active player.

In various embodiments, a secondary player may place a bet. The bet may then count for the first game to be initiated from among a group of primary players. For example, a secondary player may place a bet of $1. The casino server may determine which are currently the top five performing primary players. The bet of the secondary player may count towards the game of the first of the five primary players to initiate a game. In this way, the secondary player may enjoy a fast paced gaming experience. Rather that following the pace of a single player, the secondary player may participate in the first game to start from any of a group of players. The group of primary players may be defined by other characteristics than just performance. For example, a group of primary players may include a five players from Mississippi. The secondary player may make a bet which counts towards the first game to be initiated by any of the five primary players. After the first game has come to a conclusion, the secondary player may place a second bet. The second bet may again count towards the first game to be initiated by one of the five primary players from Mississippi following the placement of the second bet. However, the second bet may count towards a game of a primary player other than the primary player for whose game the first bet counted.

In various embodiments, a secondary player may participate in the games of the second highest performing primary player. For example, the secondary player may participate in the games of the primary player who has won the second most amount of money in the last hour. In various embodiments, a secondary player may participate in the games of the third highest performing primary player. It will be appreciated that a secondary player may participate in games of a primary player who falls anywhere in the rankings according to some metric, such as winnings, etc. In various embodiments, a secondary player may automatically participate in a game of a primary player who is second in the rankings (e.g., second in terms of net winnings). For example, the secondary player may place a bet and then participate in the game of whatever primary player happens to be second in terms of gross amounts won in the last ten minutes. As another example, the secondary player may have a bet placed for him automatically (e.g., by the casino server) for a game of a primary player who is third among all primary players in terms of consecutive games won.

In various embodiments, a secondary player may participate in a game of a primary player who is the best performer among a subset of all primary players. The subset of primary players may include primary players of a particular demographic, primary players playing a certain type of game (e.g., video poker), primary players located in a certain area of the casino (e.g., on the first floor), primary player located in a particular casino, primary players located in a particular geographic region (e.g., in a particular city; e.g., in a particular neighborhood), and so on. The best performing primary player among the subset may be identified and displayed to the secondary player. The secondary player may automatically participate in the games of such a primary player.

In various embodiments, the secondary player may automatically participate in a game of a primary player who is the top performing primary player among primary players playing a particular game of interest. For example, the secondary player may wish to participate in a game of blackjack. Accordingly, the secondary player may place a bet which automatically counts towards a blackjack game of a primary player who uses the best strategy (e.g., as compared to optimal basic strategy) in blackjack. In various embodiments, a top performing primary player who is playing a particular game may be identified and/or displayed to the secondary player. The secondary player may then decide whether to participate in the game of the primary player. In various embodiments, the secondary player may participate in the games of a top performing primary player among primary players playing a particular denomination of game. For example, the secondary player may wish to participate in games being played at dollar denomination gaming devices. The secondary player may thus participate in the top performing primary player of all primary players at dollar denomination gaming devices.

In various embodiments, a secondary player may participate in the games of a top performing primary player not just of the present, but of times in the past as well. For example, a secondary player may participate in the games of a primary player who played the prior day. The primary player may have had the best performance during a one-hour period of any primary player during the past week. Accordingly, the secondary player may participate in the games of the primary player. The secondary player may participate in the games of the primary player which occurred subsequent to the one hour of top performance. For example, the secondary player may participate in the game played by the primary player immediately after the one-hour period in which the primary player recorded the best performance of any primary player during the past week.

In various embodiments, a secondary player may participate in the games of a primary player who is currently playing and who had the top performance during some time in the past. For example, the secondary player may participate in the games of a primary player who was the best performing primary player over a day-long period of any primary player within the past week. The primary player may not necessarily be the best performing player during the current day or during the most recent day. Nevertheless, the secondary player may participate in the current games of the primary player.

In various embodiments, a secondary player may automatically participate in the current games of primary players who were the top performers during some moving window of time in the past. For example, suppose the current time is 4:00 pm. The secondary player may participate in a game of the currently active primary player who was the best performer the prior day in the hour from 3:00 pm to 4:00 pm. At 4:01 pm, the secondary player may participate in a game of the currently active primary player who was the best performer the prior day in the hour from 3:01 pm to 4:01 pm, and so on.

In various embodiments, the secondary player may participate in games of the worst performing primary player. The secondary player may, for example, expect that the luck of the worst performing primary player will change. The secondary player may, for example, bet against the worst performing primary player. In various embodiments, a secondary player may automatically bet against the currently worst performing primary player. In various embodiments, the casino server may make it easy for the secondary player to bet against the currently worst performing primary player. For example, the casino server may allow the secondary player to bet against the currently worst performing primary player with only a single button press.

In various embodiments, a secondary player may automatically bet on a primary player who meets certain criteria. The secondary player may bet without the necessity of taking any action prior to the game. For example, at the beginning of an hour, the secondary player may indicate that he wishes to place one bet every ten seconds for the next hour. The bet is to be placed on a game of a primary player who is the top performing primary player as of the time the bet is placed. Thus, for the next hour, bets may be made for the secondary player automatically without any further input from the secondary player. As will be appreciated, the secondary player may bet automatically on the best performing player from a subset of players, on the second best performing player, on the worst performing player, against the worst performing player, and so on.

In various embodiments, a secondary player may bet on best performing game, the best performing gaming device, the best performing dealer, the best performing table, the best performing sector of the casino, and so on. For example, a secondary player may place a bet on the gaming device that has paid the most in the last hour. The secondary player may thus bet on different gaming devices at different times. The secondary player may automatically bet on the best performing gaming device. For example, at the beginning of an hour, the secondary player may indicate that he wishes his bets to be placed automatically in games of the best performing gaming devices. The secondary player may thus not be required to make any further inputs for the next hour. As another example, the casino server may make it especially easy to place a bet on the best performing gaming device at any given time. However, the secondary player may be required to take some action, even a minimal action, such as pressing a button.

In various embodiments, primary players meeting one or more criteria may be listed. For example, the top ten performing primary players may be listed. The primary players may be listed, for example, on a prominent display screen in a casino, or on a display screen of a terminal used by a secondary player. A listing of a primary player may reveal various information about the primary player. For example, the listing may reveal the first name of the primary player, the last name of the primary player, the full name of the primary player, an alias for the primary player, an amount won by the primary player, and any other information about the primary player.

In various embodiments, a primary player may indicate how much information he is willing to reveal about himself Information that may be displayed or otherwise revealed about a primary player may include: (a) a name; (b) a first name; (c) a nickname; (d) a maiden name; (e) a last name; (f) a middle name; (g) a full name; (h) an initial; (i) an age; (j) a place of residence; (k) a picture (e.g., a picture of the primary player); (l) a performance metric of the primary player (e.g., gross winnings; e.g., net winnings; e.g., number of consecutive wins; e.g., largest amount won; e.g., current credit balance); (m) a handle that that the primary player has chosen (e.g., “Topdog”; e.g., “Sportsnut”); (n) an alias for the primary player; (o) a player tracking number; (p) a date of birth; (q) a social security number; (r) a handle that the casino server has generated for the primary player (e.g., “player 1032”); (s) a handle that the gaming device of the primary player has generated for him (e.g., “slot player 125”); (t) a gaming device identifier (e.g., an identifier for the gaming device at which the primary player is playing or has played); (u) an amount of profits that the primary player has made; and any other information.

In various embodiments, the primary player may indicate information he is willing to reveal in various ways. For example, the primary player may check off boxes next to information he is willing to reveal. In various embodiments, the primary player may fill out a profile, such as a form with blank spots for receiving information about the primary player. In various embodiments, the primary player may inform a casino representative about which information he is willing to reveal.

Either before, during, or after a primary player indicates information he is willing to reveal, the casino may verify that the primary player truly wishes to reveal such information. The casino may verify that the primary player is competent to reveal such information. In various embodiments, the casino may verify that the primary player is of a certain minimum age before presenting information about the primary player to others (e.g., to secondary players). For example, a representative of the casino may ask to see a driver's license in order to verify the age of the primary player. In various embodiments, the casino may verify that the primary player is sober. For example, the casino may give the primary player a sobriety test. In various embodiments, the casino may reveal information indicated by the primary player only if the primary player is sober. In various embodiments, the casino may reveal information indicated by the primary player only if alcohol levels of the primary player fall within certain limits (e.g., are less than a certain level). In various embodiments, the casino may verify that the primary player is not sick. For example, the casino may have a doctor examine the primary players or may ask the primary player basic health questions. In various embodiments, the casino may verify that the primary player is in a sane or competent state of mind. For example, the casino may administer a cognitive test to the primary player. The casino may only present information about the primary player if the primary player passes the cognitive test, for example. In various embodiments, the casino may use other criteria for determining whether to present information that a primary player has indicated he is willing to reveal. In various embodiments, the casino may use various criteria, such as those described above, to determine whether or not to ask the primary player to reveal information in the first place.

In various embodiments, once a primary player has indicated which information he is willing to reveal, the primary player may be asked to confirm one or more times. For example, the primary player may be presented with a list of information about himself that will be revealed. The primary player may then be asked to press a button, sign an area of a touch screen, apply a thumb print, or to provide any other indication that he agrees to reveal the information. In various embodiments, the primary player may be presented with a display that shows how his information will appear to others (e.g., when displayed on a public display screen; e.g., when displayed on the terminal of a secondary player). The primary player may be asked to confirm whether he really would like his information displayed, and/or whether he would like his information displayed in such a manner. The primary player may then have the opportunity to confirm or not.

In various embodiments, when a primary player gives permission for information about himself to be revealed, the permission may remain valid for a limited period of time. For example, permission may remain valid for a day. After the permission has expired, any information for which the permission applies and which is currently being displayed (e.g., on the terminal of a secondary player) may be taken down. In various embodiments, there may be a default period of validity for permission to reveal information about a primary player. For example, the default period may be 1 hour.

In various embodiments, a primary player may indicate limitations on how his information will be revealed. For example, the primary player may allow information to be displayed on individual terminals or mobile gaming devices, but not on more prominent public display screens. The primary player may allow his information to be displayed in certain areas of a casino but not in others. For example, the primary player may only give permission for his information to be revealed in high-limit areas of the casino.

In various embodiments, the primary player may indicate people to whom information may or may not be revealed. For example, a primary player may only wish information to be revealed to secondary players of a certain gender. For example, a primary player may only wish information to be revealed to people from a particular state. For example, a primary player may wish that no person from his home state be able to see certain information about him.

In various embodiments, a primary player may be paid based on the information he reveals. A primary player may be paid for each piece of information he allows to be revealed. A primary player may be paid based on the length of time that he allows information about himself to be presented. A primary player may be paid based on the forum in which he allows information to be presented. For example, the primary player may be paid extra for allowing information to be displayed on a prominent public display screen.

In various embodiments, a primary player may reveal information gradually, and/or over time. For example, a primary player may reveal a nickname. The primary player may later decide to reveal his first name. Later, the primary player may allow the revelation of his first and last name. For example, as the primary player achieves better performance, the primary player may take pride in revealing his identity as a top performer. In various embodiments, the primary player may be prompted to reveal more information. For example, if a primary player breaks into the top ten in terms of performance, the casino may ask him whether he would like to reveal more information. In various embodiments, the casino may prompt the primary player to reveal performance metrics, such as an amount won.

4.1.8. Top performing machines or dealers. E.g., the dealer that is dealing the best hands for the player. For an individual game, data about the performance of a gaming device may be gathered. Performance data about a gaming device may describe whether an outcome was a winning outcome or a losing outcome, the amount paid for an outcome, the amount paid for a game, the number of winning outcomes that occurred during a game (e.g., the number of pay-lines that included winning outcomes), whether or not a gaming device was played, and so on. Performance data about individual games at a gaming may be aggregated over multiple games at a gaming device. A statistic may indicate a total amount paid out by a gaming device over a period of time or over some number of games. A statistic may indicate a gross amount of winnings paid out or a net amount of winnings paid out over a period of time or over some number of games. A statistic may indicate how many games were played at a gaming device over some period of time. A statistic may indicate a total number of winning outcomes or a total proportion of winning outcomes over some number of games or over some period of time. In some embodiments, data about a player may be recorded for an individual game. An aggregate statistic may indicate the number of different players who have played a gaming device over some period of time. A statistic may indicate the average number of games played by a player at the gaming device over some period of time. For example, in the last day, the average number of games played by a player at a gaming device may be 60. In various embodiments, data about the performance of multiple gaming devices may be aggregated. Top performing gaming devices may be listed. For example, the 10 gaming devices which have paid the most in the last hour may be listed. For example, the 10 gaming devices which have paid the most as a multiple of the average amounts bet may be listed. For example, the 10 gaming devices which have paid out the least in the last 3 hours may be listed. For example, all the gaming devices which have made payouts of more than X amount in the last hour may be listed.

In various embodiments, performance data about a game with a particular dealer may be gathered. Performance data may include data describing the payouts provided for a game with the dealer, the net winnings for one or more primary players in the game with the dealer, the speed of the game with the dealer, the presence of high-paying outcomes in the game of the dealer, the amount of a tip or tips given to the dealer, and so on. Performance data about a dealer may be aggregated over multiple games. For example, a statistic may indicate the average number of games dealt per unit time for the dealer. A statistic may indicate the total payouts received by primary players who have been in the games of the dealer during the last hour. A statistic may indicate the total amount of tips given to the dealer in the last half hour.

4.1.9. Top performing sectors of a casino. E.g., the slot machines in this bank have done the best. In various embodiments, data about games which have occurred in a sector or region of a casino may be aggregated. Data may be aggregated for games played at a group of slot machines, such as for a group of slot machines at a bank of slot machines. Data may be aggregated for a set of gaming tables, such as for a set of tables overseen by a single pit boss or other casino employee. Data may be aggregated for a floor of a casino or for a room of a casino. For example, data related to the games played in a high-limit slot machine room may be aggregated. In some embodiments, data may be aggregated for slot machines of a given betting denomination. For example, data may be aggregated for all nickel slots. Data may be aggregated for all slot machines with particular types of payouts. For example, data may be aggregated for slot machines with progressive payouts. For example, data may be aggregated for slot machines with top payout ratios of 800 or more. In some embodiments, data may be aggregated for slot machines of a particular type. For example, data about games at mechanical slot machines may be aggregated. For example, data about games at video slot machines may be aggregated. Data may be aggregated for slot machines which feature a particular game. For example, data may be aggregated for all slot machines with a Scrabble™ theme. Thus, for example, the five video poker machines which have paid the most in the last hour may be listed. The five nickel slot machines which have provided primary players with the highest winnings in the last hour may be listed.

4.1.10. A list of current progressive amounts. In some embodiments, data related to a current amount of a progressive prize may be gathered. The size of one or more progressive prizes at a given moment in time may be listed. Progressive prizes may be listed in order of size. For example, the Jumbo Bucko's progressive prize may be listed as $50,149.75. The Super Gold Vein progressive prize may be listed as $40,984.05, and so on.

4.1.11. Number of people at a casino or in particular areas of a casino. In various embodiments, data about the number of people at a casino or within a given area of a casino may be gathered. Data may be gathered about: (a) the number of people at a particular bank of slot machines; (b) the number of people at a table game; (c) the number of people in a restaurant; (d) the number of people on a particular floor of the casino; (e) the number of people in the lobby of the casino hotel; (f) the number of people at the casino swimming pool; (g) the number of people in the room of the high limit slot machines; (h) the number of people in the poker room of the casino; (i) the number of people attending a show; (j) the number of people at a boxing match at a casino; and so on. In various embodiments, data may be gathered in relation to the number of people with a certain characteristic. For example, data may be gathered describing the number of people from New Mexico, or the number of people between the ages of 40 and 50 at a casino.

4.1.12. Slot machines that are most popular—e.g., most heavily occupied. In various embodiments, data may be gathered describing the use of a gaming device, such as a slot machine or video poker machine. The number of games played at a gaming device may be tracked. The number of games played at a gaming device in a particular period of time may be tracked. The amount wagered at a gaming device may be tracked. Other items that may be tracked may include: (a) the number of pay lines played; (b) the average number of coins bet per pay-line; (c) the number of primary players who play a gaming device in a particular period of time; (d) the duration of a waiting period between when one player gets up from a gaming device and when the next player sits down; (e) the number of people in the vicinity of a gaming device; and so on. In various embodiments, data about the use or popularity of a gaming device may be aggregated over multiple gaming devices. The aggregation may occur over gaming devices that feature the same game; over gaming devices that feature the same betting denomination; over gaming devices from the same manufacturer; over gaming devices with the same broad theme (e.g., over gaming devices featuring any Monopoly® related game); over gaming devices falling within the same broad category (e.g., over video poker machines; e.g., over mechanical slot machines; e.g., over video slot machines; e.g., over video bingo machines); over gaming devices in the same area of a casino; and so on. In some embodiments, a statistic may describe the percentage of time that a particular type of slot machine was occupied during the last day. For example, a statistic may indicate that video poker machines were occupied 40% of the time, on average, over the last hour. In some embodiments, a statistic may describe the average amount won at all dollar denominated gaming devices in a casino in the last three hours. In some embodiments, a statistic may describe the average amount of money won by the casino per machine for all machines based on the Wheel of Fortune® theme. In some embodiments, a statistic may indicate the average amount of time that elapsed between when one player got up and when the next player sat down at a particular group of progressive slot machines. In various embodiments, information about slot machine utilization may be transmitted to one or more financial markets for use in evaluating the performance of a slot machine manufacturer.

4.1.13. All manners in which the player interacted with the machine. In some embodiments, data may be gathered describing how a primary player interacted with a gaming device. Such data may provide insight into the mood of a player. For example, a player who is slamming the button of a gaming device may be frustrated or impatient.

4.1.13.1. He pressed the button hard. In various embodiments, data may be gathered about how much physical pressure a primary applied to a gaming device. A primary player may apply pressure to a "spin" button, to another button, to a handle, or to a touch screen, for example. Pressure sensors or other sensors in the gaming device may sense the pressure applied by a player. Pressure may be detected as applied to any other surface of a gaming device. For example, the pressure of a drink or the pressure of a primary player leaning on the surface of a gaming device may be detected with pressure sensors. Sensors may detect strikes or blows to the gaming device as well. For example, pressure sensors or vibration sensors may detect kicks to the base of the gaming device. Data about pressure may be aggregated over multiple games, gaming devices, players, etc. For example, a statistic may indicate that the average pressure applied to a button was X pounds per square inch for all gaming devices across the casino in the last hour.

4.1.13.2. What is the precise time at which he presses the button? In various embodiments, the time may be recorded as to when a button was pressed at a gaming device. For example, data may indicate that a button was pressed at 11:45:02 AM. Data about the times when buttons were pressed may be aggregated over multiple games. For example, data about the times buttons were pressed may allow the derivation of a statistic describing the average length of time between games at a gaming device. In some embodiments, a graph may show the number of button presses across a casino as a function of time. For example, each bar on the graph may represent the number of button presses at a casino over a period of time. The graph may indicate times of heavy activity and times of light activity at a casino. For example, activity may die down near the end of an hour as gamers stop to make an appointment or find an activity starting on the hour.

4.1.13.3. Does he press the button or pull the handle? In some embodiments, data for a game may be gathered describing how a primary player initiated play of the game. Data may indicate whether a primary player pressed a button, pulled a handle, had a game initiated automatically on his behalf, or otherwise initiated a game. Data about the way in which a game may be initiated may be aggregated over multiple games. Such data in aggregated form may be described by a statistic. For example, a statistic may describe the number of times a particular primary player pressed the button to initiate a game during a particular period of time. For example, a statistic may describe the number of times any primary player in a casino pulled a handle to initiate play at a gaming device during the day of Jan. 14, 2003.

4.1.14. How quickly does he pull the handle? In various embodiments, data for a game may be gathered describing how quickly a primary player initiated a series of games at a gaming device. Data may include the time at which a primary player initiated play of a game. Data may include a time difference between the initiation of a first game and the initiation of a second game. Data may be aggregated over multiple game intervals. For example, a statistic may describe the average time between when a primary player initiates a first game and when the primary player initiates a second game. Data may be aggregated over multiple primary players. For example, a statistic may describe the average time between game initiations for a group of primary players. In various embodiments, data may be gathered for the time at which a payout is made, the time when an outcome appears on the screen or in the viewing window, or for any other event during a game. A time between games and/or actions in a game may thereby be derived.

4.1.15. Data used in creating an outcome. In various embodiments, data and/or any other information about the derivation of an outcome of a game may be gathered. Such information may relate to player actions, dealer actions, computer-related actions, game designs, current game states, etc. This data may be gathered over multiple game devices, game areas, game plays, and so on.

4.1.15.1. The random seeds that were used in the random number generator. In some embodiments, various games may use one or more random number generators to aid in determining outcomes (e.g., winners, losers, cards dealt, etc.). Some random number generators accept an input known as a "seed." The seed may be used as a variable of a function, or otherwise help determine a random output value from the random number generator. In some embodiments, information about seeds used for random number generators may be gathered.

4.1.15.2. Algorithms used to generate outcomes. In some embodiments, a gaming device may use one or more algorithms to determine an outcome (e.g., one or more random number generating algorithms one or more algorithms for mapping a random number to an outcome, one or more algorithms for otherwise determining an outcome). Information about which algorithm is being used (e.g., by a game device, by a group of game devices, by the casino at large, etc.) may be gathered. For example, in some embodiments, a casino may use one or more of a CryptGenRandom algorithm, a hashing algorithm, an algorithm using a lookup table, a pseudorandom number generating algorithm, a linear congruential generator algorithm, a Mersenne twister algorithm, a cryptographically secure pseudorandom number generating algorithm, and/or any other desired algorithm. Algorithms used may be different from device to device, area to area, etc. Algorithms used may change from time to time.

4.1.15.3. Ordering of the deck. In various embodiments, data may be obtained about the order of cards in a deck. For each card in a deck, a position may be recorded. For example, a position of the two of clubs may be recorded as "10", indicating that the tenth card from the top of a deck was the two of clubs. Data about the position of a card in a deck may be obtained or stored even if such card never appeared in a game. For example, regarding a game of video poker, the rank and suit of the card at the bottom of the deck may be recorded, even though the card may have no chance of being dealt in the game of video poker. In some embodiments, the order of cards in a multi-deck shoe may be obtained. Such ordering may be obtained for portions of the shoe that were dealt and/or portions of the shoe that have not yet been dealt and/or will not be dealt (e.g., without being reshuffled with or without some or all of previously dealt cards).

4.1.15.4. Reel configuration. In various embodiments, data may be obtained or recorded about the configuration of symbols on a reel of a gaming device. For example, from an arbitrary location on a reel, each symbol on the reel may be attributed to a different position. For example, a "lemon" symbol is in the first position. An adjacent "cherry" symbol is in the second position. An adjacent "plum" symbol is in the third position, and so on. In various embodiments, data about the order of symbols may be aggregated. For example, a statistic may indicate the number of times that the cherry has been in the fifth position, etc. The aggregation may take place over a number of games, devices, areas, casinos, etc. It should be understood that a reel may include non-slot type reels in some embodiments. For example, one or more roulette reels may be used in some embodiments. In such embodiments, numbers and/or color information may be gathered. In various implementations, the reel configuration may be changed from time to time, and/or a reference point of a reel configuration may be changed from time to time.

4.1.15.5. Jackpot level at the time. In various embodiments, information about one or more jackpots may be gathered. The jackpots, for example, may be associated with one or more slot machines, one or more video gaming machines, and/or any other desired progressive or other type of jackpot game. The jackpots may include game specific jackpots, game bank specific jackpots, area specific jackpots, casino wide jackpots, etc. The jackpots may change at a constant rate, a changing rate, a rate related to the amount of the jackpot, an amount related to the level of play, and so on. The jackpot information gathered may include a current amount, a direction of change, an amount of change, a speed of change, and so on. The jackpot information may include information about several different jackpots, such as running totals of jackpots in two different areas of two different machines of two different games, at two different casinos, etc.

4.1.15.6. For machines with states, the state of the machine. Some games (e.g., games on handheld device, games on slot machines, games on video poker machines, games at tables, etc.) may have current states. A current state, for example, may describe the progression of a game. A state, for example, may indicate that cards have been dealt, that a game has not begun, that a game is in progress, that a game has just finished, that a roulette wheel is spinning, that bets are being accepted, that a slot reel is spinning, that a slot reel is not spinning, and so on. In some embodiments, a state may relate carry over from one game to a next game. For example, in some games, one or more events may lead to a bonus round (e.g., if four diamonds are collected in normal play over a series of slot pulls, a bonus round may begin for a slot game). Such information that describes inter-game states may be gathered in addition to or as an alternative to intra-game state information. Game states between one or more games, one or more areas, one or more casinos, etc. may be compared. Statistics about game states may be gathered and/or otherwise determined (e.g., what percentage of roulette reels are currently spinning, what percentage of slot machines are currently being played, how close is the average slot machine to entering a bonus round, etc.).

4.1.15.7. A number of coins bet. Some embodiments may gather information regarding bets made by players of games. Such information may include amounts bet in a particular game, a particular gaming session (e.g., a series of games played by a player in a period of time, during a single visit to a casino, during play at a single machine, etc.). The information about amounts may include, for example, total values, changes in values over time, components of bets (e.g., number of dimes, number of quarters, etc.). The information may include information about individuals, information about individual games, information about gaming areas, information about one or more casinos, and so on.

4.1.15.8. The type, model, year of the machine. Some embodiments may gather information regarding types of games/gaming devices, models of gaming devices, years of manufacture of gaming devices, and similar information. A type of gaming device may include, for example, a version of poker played in a video poker machine, a video display vs. physical reel slot machine, a device manufactured by a particular company, a device having a particular client-server interaction type, and so on. A model of a gaming device may include a particular version of a device (e.g., a manufacturer model number), a software version, and so on. A year of manufacture may include, for example, a year when any physical portion of a device was made in a factory and/or released for sale, a date at which a machine was purchased, a date on which software was purchased, released, written, installed, etc., and so on.

4.1.16. Games Some embodiments may gather information that is particular to one or more games or game types.

4.1.16.1. Roulette Some implementations may gather information related to a roulette game. For example, such information may include speed of a roulette wheel, time a roulette wheel spins, speed of a ball drop, speed of ball movement, ball location, beginning wheel position, results of a spin, position of a wheel after a spin, position of a ball after a spin, velocity of a ball at a particular time after a spin begins, number and/or types of wagers, number of players, amount of time between spins, and/or any other information.

4.1.16.2. Craps Some implementations may gather information related to a craps game. For example, such information may include speed of a die role, force of a throw, number of changes of dice, beginning orientation of a die, ending orientation of a die, orientation of a die at a time between a throw and an end of a roll, a number of rolls to end a round, a number of players, number and/or types of wagers, and/or any other information.

4.1.16.3. Baccarat Blackjack Poker Some implementations may gather information related to a card game. For example, such information may include information about wagers, types of wagers, numbers of wagers, speed of card draws, number of card draws, identity of cards, and/or any other information.

4.2. Different ways to slice data. Different subsets of data one can examine or aggregate. Data may be obtained or divided by various criteria. For example, data may be divided by time, game, and so on and displayed in such divided ways (e.g., display data for Mondays separately from Tuesdays). Data may be obtained from different sources according to different criteria. Data may be used for different things based on the criteria associated with the data.

4.2.1. A particular slice of time. E.g., a one-hour period, a 1-week period, or one-year period. In some embodiments data may relate to a period of time. For example, data may include data from one or more days, one or more years, one or more hours, one or more weeks, and/or any other period or periods of time.

4.2.1.1. Data may be taken over non-consecutive time periods. In some embodiments, such time periods may or may not be consecutive. For example, data may relate to data from one or more Mondays, noon to 1 pm each day, and/or other periods.

4.2.1.2. Data may be taken over overlapping time periods. Data may relate to multiple periods. Such periods may overlap. For example, data may relate to weekends and holidays. Some holidays may happen on weekends, so the two periods of time may overlap.

4.2.1.2.1. Some data counted twice. In some implementations, if periods overlap, data may or may not be counted twice. For example, holiday data may be counted once and weekend data may be counted once, so holidays that appear on weekends may be double counted. In other embodiments, such double counted may not occur.

4.2.2. A particular slice of machines. E.g., all machines along a window of the casino, all Wheel of Fortune machines. All IGT machines. In some embodiments, data may relate to machines, tables, and/or games with particular characteristics. For example, data may relate to a particular table and/or a particular slot machine, data may relate to a particular type of game (e.g., slots, poker, a particular slot type game such as Wheel of Fortune machines, craps, and so on), data may relate to a machine and/or game manufactured and/or operated by a particular entity (e.g., IGT, and so on), and/or data may relate to any other game, table, and/or machine with a particular characteristic.

4.2.3. Slice data by location. In some embodiments, data may relate to one or more particular locations. For example, data may be limited to data that relates to activity in a desired location or outside of a particular location.

4.2.3.1. Take an individual floor of a casino. In some implementations, the data may be related to a particular floor or location in a casino. For example, data may relate to a gaming area of a casino, a gaming floor of a casino, a shopping floor of a casino, a shopping area of a casino, and so on.

4.2.3.2. Casinos In some implementations, data may relate to one or more particular casinos. For example, data may relate to activity in the Venetian casino in Las Vegas. Data may relate to a plurality of casinos, for example, data may relate to activity in the family of Venetian Casinos in Las Vegas and Macao. Data may be taken from any number of casinos.

4.2.3.3. A city: e.g., all of Las Vegas. In some implementations, data may relate to a particular city, block, address range, and so on. For example, data may relate to activity on the Strip in Las Vegas, to activity in Las Vegas, and so on.

4.2.4. By type of person who generated the data. E.g., Virginians. In some implementations, data may be limited to data about a people with a particular characteristic. For example, data may be limited to activity of a person in a desired demographic.

4.2.5. By result. In some embodiments, data may be limited to activity related to a particular result. Other data may be ignored and/or not included in an aggregation of data.

4.2.5.1. Only data that was winning data. In some implementations, for example, data may be related to only winning outcomes. The data may be related to all winning outcomes and/or particular winning outcomes. In other implementations, the information may be related to losing outcomes.

4.2.5.2. Only data that reached bonus round. In some implementations, games may include bonus rounds. Some implementations may include data about games in which the bonus round is reached. The information may include information about activity before the bonus round is reached and/or information about the bonus round itself.

4.2.5.3. Only red outcomes in roulette. Data may relate to particular outcome characteristics. For example, data my relate to a roulette game with red outcomes, black outcomes, and so on, a craps game with a particular dice roll, and so on, a card game with a particular card player, and/or any other game having any other particular result characteristic.

4.2.5.4. Give me only the outcomes that occurred after 10 consecutive blacks. In some implementations, data may be associated with outcomes over a period of play. For example, data may relate to game play that occurs after a plurality of rounds that meet a characteristic. For example, in a roulette game, data may include data from some number of games after 10 consecutive black outcomes, and so on.

4.2.5.5. Outcomes with no jackpots. This could prevent players from having advanced knowledge of the payouts. In some embodiments, data may include data from games in which a jackpot was not won. A winning jackpot may be a noticeable event and so players may remember a time and/or game related to such a jackpot winning so may desire to use such data to attempt to win the jackpot too.

4.2.6. Preventing a player from taking a slice that they might have advanced knowledge of. E.g., can't take a time slice for a time when you were at the casino. In some implementations, players may be prevented from taking action related to data with characteristics. For example, a player may be prevented from using/obtaining data related to activity that may relate to knowledge of the data. For example, data may not be data from when a player was in a casino, from when a player was in a city, from when a player was gaming, from a game machine used by a player, and so on.

4.2.6.1. Player can customize what slice of data he would like. In some embodiments, a player may be able to customize data displayed in an interface. For example, a player may be able to choose sources of information, identify characteristics that the data should have, choose a number of data feeds to display, and so on. In some implementations, a graphical user interface may be presented to a player through a mobile device. The graphical user interface may include a plurality of windows through which data may be presented. The interface may include options for wagering related to the data, games related to the data, and so on.

4.2.6.2. Privileged players, e.g., gold card holders, get more different ways to slice the data, access to better slices, etc. In some embodiments, different classes of players may be able to select different types of data. For example, players that pay a premium fee, players that are sign up for a mailing list, players that are regular customer, players that gamble a threshold amount, players that are high rollers, players that are part of a rewards program, and/or players with any other characteristics may have more options for what data is displayed than other players. In some implementations, players may be asked to identify the characteristic through a user interface, a card reader, and so on.

4.2.7. Slice data by intermediate outcome. For example, all intermediate video poker hands where the player holds 3 cards to a flush. In some embodiments, information may be determined and/or obtained about intermediate points in a game. For example, data about games in which a particular intermediate outcome happens may be collected. For example, data may be collected about poker games in which 3 cards for a flush are dealt at an intermediate point (e.g., before a draw phase). Such information may be used for wagering like other information (e.g., to recreate games, to replay games, to wager on the aggregate data, such as number of times a flush will be drawn in a period of time, and so on).

4.2.7.1. Good for what-if games on this data. In some implementations, such data may be used to replay games with a different strategy. For example, a player may select one of the games to play from the intermediate point and select a strategy of going for the flush or not going for the flush. The strategy may be the same or different from the strategy played by an original player of the game.

4.2.8. Several different slices can be presented to the player, and he can choose. For example, data from the last hour, day, or month may be presented. In some embodiments, a player may be presented with a plurality of different data collections. The player may choose to play a game that relates to any one or more of the plurality of data collections.

4.2.9. Grouping and Classifying the Data for the player. In some embodiments, data may be displayed to a player in a user interface. Data may be grouped in a menu, in a GUI, or in any other fashion to allow a player to view the data more efficiently. Data may be grouped according to game, time, location, and so on so that a user may navigate through a plurality of data options effectively.

4.3. Data structure. How is an outcome encoded? In various embodiments, data may be transmitted to an interface, and/or collected from various sources in a desired format. In some implementations, data may be transmitted in data packets, as a stream of data, in an XML format, and/or in any other way or format.

4.3.1. Machine identifier. Year. Model number. In one example implementation, data related to a slot machine game may be transmitted in an XML string that identifies a year of manufacture of the machine, a model of the machine and an outcome of the machine (e.g., <Year>1999 </Year> <Model> IGT 12395 </Model> <Outcome> bar bar bar </Outcome>

4.3.2. Graphics to show. In some implementations, data transmission may include an identification of a graphic that corresponds to the data. For example, if data identifying a jackpot has happened is transmitted, the data may include an identification of a jackpot video that may be played on a players device. The transmission may include transmitting the video and/or identifying a video that is accessible by the player device.

4.3.3. One integer for each reel? One integer total? An integer indicating reel position. In some implementations, a data structure that identifies data may include a plurality of integers or other identifiers. Each integer or identifier may indicate a characteristic of the data. For example, a first identifier may identify a number of a roulette reel outcome, one integer may identify a color of the roulette reel outcome, one integer may identify a location of the roulette reel, one integer may identify a total of a plurality of roulette reel spins, one integer may identify an orientation of a roulette reel, and so on. Such integers may be based on a prearranged set of identifiers so that a recipient may decode the integer data to determine the identified data.

4.4. Pattern matching and searching. In some embodiments, data may be used to determine patterns and/or trends. For example, trends may indicate that more wins happen on weekends, and so on. For example, data may be searched to determine long term betting trends, patterns of betting throughout a day, week, month, year, etc. Data may be searched for a specified pattern. Such searching may be used to determine collusion in some implementations. Such searching may be used to determine patterns of wins and losses that may then be reported to players to incentivize wagering in accordance with the patterns.

4.4.1. Find historical data that matches a current pattern. For example, last time the number 7 came up followed by 38, what was the next number? In some implementations, a search for a pattern of outcomes may be made to determine what a common next occurrence has been. For example, if a roulette spin results in a 7 and then a next spin results in a 38, a player may search for that pattern to determine historically what the next roll has in such situations has been.

4.4.1.1. Find only strong patterns. For example, based on historical data, there is a strong indicator that black will come up next. In some implementations, data may be searched to discover strong patterns. For example, a strong pattern may be a pattern that happens more often than any other pattern, a pattern that happens 50% of the time, a pattern that happens 25% of the time and so on. In limiting a search, pattern search results may provide more useful data that eliminates noise from minor patterns.

4.4.1.2. Find most recent pattern. In some implementations, a search may be made to find a number of most recent patterns, or patterns with other characteristics (e.g., patterns related to a particular game, a particular machine, a particular casino, a particular player type, and so on).

4.4.2. Find historical data that is in some way meaningful or unusual. In some implementations, a search of data may be made to locate data that is unusual and/or meaningful (e.g., jackpots, long patterns of unexpected outcomes, and so on). In some embodiments, such data may relate to an important or desired time or day or event.

4.4.2.1. The numbers that came up which made my birthday. In some implementations, a pattern that happened on a person's birthday may be determined. In some implementations, a pattern of outcomes that is indicative of a person's birthday may be determined (e.g., a series of roulette roles that corresponds to the numbers of a birthday).

4.4.2.2. Numbers which made a famous date: e.g., day man landed on moon. In some implementations, patterns of data that occurred on historically significant dates may be searched. For example, data that occurred on the day of the moon landing and/or anniversaries thereof may be determined and/or searched for patterns or trends.

4.4.3. Search for trends that games have now. In some embodiments, data from ongoing games and/or recently completed games may be searched for patterns and/or trends. For example, a trend that winnings are increasing for ten minutes may be determined. A player may be alerted when a trend they are interested in is occurring or a pattern they are interested in has occurred.

4.4.3.1. Currently there are 10 blacks in a row at game x. In one example implementation, a series of outcomes in a game that match a pattern may be determined to occur. For example, a player may desire to be notified if 10 blacks in a row happen in a roulette table. If that pattern of outcomes occurs, the player may be notified before the next play at that game. The player may be offered an opportunity to wager on the game that matches the pattern.

4.4.3.2. Search for trends that games are close to having. In the future. In some embodiments, developing trends and/or patterns may be determined. For example, if a roulette table has 9 consecutive black roles and a pattern of 10 consecutive black rolls is a searched for pattern by a player, the player, it may be determined that the desired pattern may be developing. The player may be notified that the desired pattern may be about to occur. As another example, if a player desired to find a pattern of five losses by a dealer in a blackjack or other card game, when four consecutive losses occur, the pattern may be identified as possibly developing.

4.4.3.3. Translate outcomes to letters. Then spell words. For example, each number on a roulette wheel becomes a letter and then words are being spelled. You can bet on two-letter words, three-letter words, etc. A 7-letter word pays big time. In some embodiments, outcomes of a one or more plays of a game may be translated into letters. For example, a number of a spin of a roulette wheel may be translated into one or more letters, cards dealt in a poker game or other card game may be translated into letters, results of a slot machine may be translated into letters, and so on. In some implementations, there may be a one to one correspondence with possible outcomes and letters. In other implementations, there may be any correspondence, such as multiple outcomes corresponding to the same letter (e.g., popular letters have more outcomes that correspond to them). In some implementations, players may place bets that various words may be spelled by the outcomes of one or more games. In some implementations, the payouts associated with such wagers may be greater as the length of a word increases.

4.4.4. Your mobile can call up any data that matches the pattern of the slot machine you are near. For instance. The slot has just lost 10 in a row. So the mobile calls up the last time the slot had lost 10 in a row. In some implementations, a player device may be used to access patterns of desired devices and/or tables. For example, a player may desire to know the historic outcomes that have happened after the latest pattern of outcomes on a particular machine. The player may be presented with historic data about one or more next outcomes that have historically happened on the machine after the latest pattern of outcomes on the machine.

4.4.5. Send an alert when a trend has happened or is about to happen. In some implementations, a user may be sent an alert when a pattern that the player is interested in occurs or is determined to be developing. For example, a player may establish a desire to be alerted when 10 consecutive black roulette rolls occur (e.g., through a user interface, to a person, and so on). In some implementations, when the pattern occurs or is developing, the player may be notified (e.g., that it is happening, that it happened, etc.). The player may be given an option to bet on the occurrence of the pattern, on an event after the pattern, and so on. The player may be shown historic information about a machine or table at which the pattern has happened or is developing. Such information may identify historic information about the occurrence of the pattern at that table or machine. In some implementations, a player may set up an automatic bet to take place if an alert is received.

4.4.6. Find historically good outcomes. For example, jackpot outcomes. Then examine the patterns that led up to those outcomes. In some implementations, a search regarding patterns that have lead up to a particular outcome occurring may be determined. For example, a player may search for patterns that have led up to a royal flush occurring in a poker game, a jackpot being won on a slot machine, and so on. The player may then desire to set up an alert for a similar pattern occurring on ongoing games.

4.5. Betting when data meets certain criteria (e.g., trends) In some embodiments, players may bet on games when data about the games meet certain criteria. Such criteria may include, for example, patterns and/or trends of outcomes. Players may be alerted to such criteria, presented with opportunities to bet when such criteria are met, be given the opportunity to establish such desired criteria (e.g., through a user interface), may establish automatic bets to be made when criteria are met, and so on.

4.5.1. Types of trends. In various embodiments, trends and/or patterns may relate to various events and/or types of events. Trends and/or patterns may be limited by location, player, table, game, time, and so on. In some implementations, trends and patterns may relate to outcomes of one or more games or game types. In some implementations, patterns or trends may relate to betting, wins and/or losses. In some implementations, patterns or trends may relate to intermediate occurrences in one or more games. In other implementations, trends and/or patterns may relate to any other gaming or non-gaming activity.

4.5.1.1. Trend of the room. In some implementations, patterns or trends may relate to a particular room and/or location (e.g., a high roller room, a casino gaming floor, a table game area, and so on).

4.5.1.2. Trend of the dealer or dealers. In some implementations, trends or patterns may relate to one or more dealers. For example, a trend may relate to a particular dealer, all dealers in a casino, dealers at a particular table, and so on.

4.5.1.2.1. Trend of all Blackjack dealers. In one example implementation, trends may relate to all dealers of a particular game or game type. For example, a trend may relate to hands of all Blackjack dealers in a casino.

4.5.1.3. Trend of a player or players in the room. In some implementations, a trend or pattern may relate to one or more players. For example, a trend may relate to a particular player (e.g., whether the player is on a winning or losing streak, etc.). a trend may relate to a plurality of players in a location and/or that have a particular characteristic (e.g., your friends, gender, other demographic characteristic, players of a type of game, players that wager a certain amount, winning players, losing players, and so on).

4.5.1.4. Trends of a particular outcome (bar-bar-bar). In some implementations, trends or patterns may relate to one or more particular outcomes. For example, a trend may relate to the frequency that a bar-bar-bar outcome occurs on one or more slot machines.

4.5.1.5. Non-continuous trend. In some embodiments, a trend may not include all times or all games in a continuous period and/or a trend may not hold true for all times or games in a time period. For example, a trend may relate to every other game played in a location, at a machine, etc. A trend may relate to games played at even numbered minutes, etc.

4.5.1.5.1. A player being more ahead at the end of every 15-minute period, even if a player sometimes dips behind during the 15 minutes. In some implementations, a trend may relate to a characteristic at a periodic time. For example, a trend may relate to a characteristic every 15 minutes. A characteristic may include, for example, whether more wins or loses have happened, whether more of one outcome than another occurred, a number of an outcome, an amount of money won or lost, and so on.

4.5.1.5.2. Trend that blacks will stay ahead of reds by 20 for the next hour. In some implementations, a trend may be measured at the end of time period, and or during a time period. For example, a trend that more blacks are rolled than reds in a roulette game may be measured at the end of an hour and/or during the hour. In one implementation, the trend may be determined at the end of the hour to have occurred if at least 20 more blacks than reds were rolled in roulette during the hour. In another implementation, the trend may be determined to happen if in the course of the hour, blacks had always outnumbered reds by at least 20.

4.5.2. Betting done automatically. In some implementations, when a trend and/or pattern occurs, a bet may be placed automatically. The bet for example, may bet for or against a continuation of the pattern and/or trend. The bet for example, may bet that a particular outcome or event happens in a next or within a number of games and/or in a time period.

4.5.2.1. Player sets preconditions. In some implementations, a player may establish one or more situations that may result in an automatic bet. For example, a player may enter information into a user interface that identifies a trend and/or pattern that the player desires to cause a bet to be placed. The player may also identify the type of bet and amount of bet to be placed and/or any other information about the bet to be placed.

4.5.2.1.1. Bet when the player himself or someone else is on a losing streak. In some implementations, a player may identify that a bet should be placed when the player or someone else is in a losing streak. The losing streak may be a streak with a certain time, a certain amount of losses, a certain amount of games, and so on. The player may for example be that the losing streak will continue. The player may similarly identify that a bet should be placed when the player or someone else is in a winning streak.

4.5.2.1.2. Bet as any other function of the trend of the player or others. In some implementations, a player may identify that a bet should be placed based on any function related to any pattern or trend of events.

4.5.2.1.2.1. If there have been five blacks in a row, bet on black. In some implementations, for example, a player may identify that if a certain sequence of outcomes occur, that a bet should be placed that the sequence will continue. For example, if five black outcomes in a roulette game happen in a row, a bet may be automatically placed that a sixth black will occur. Similarly, a player may be that a sequence will not continue. For example, the player may bet that a sixth black will not occur and/or that a red will occur.

4.5.2.1.3. Bet on a player based on his skill level. E.g., Blackjack player who plays perfect strategy. In some implementations, a pattern may include a pattern of play of a player. For example, a pattern may include a player playing according to an optimal strategy or some other strategy. In some implementations, a player may set up an automatic bet when another player has played a game according to a desired strategy for a period of time, and/or a number of games. In some implementations, the bet may be for or against the player and/or for or against the player continuing to play according to the strategy.

4.5.2.1.4. Player has a dial to select a streak length. For example, the player wants to bet when the streak length occurs. Dial could be set to a streak of 5, 6, 7, 8, etc. In some implementations, a user interface may include an option to select a length of time that an occurring streak may continue. The interface may include a dial or other component. A player may use the interface to bet on a length of a streak or other pattern length.

4.5.2.2. Vary bet size based on trend. In some embodiments, an automatic bet may be setup to be altered based on a trend and/or pattern as the trend and/or pattern develop. For example, as a streak continues, bet sizes may increase and/or decrease. The trends and/or patterns that affect the size of the bets may be the same or different to the trends and/or patterns that cause the bet to be placed in the first place. For example, a trend of 5 roulette wins may cause a bet to be placed on roulette, and the size of the bet may be increased and or decreased based on the number of black spins that happen after the bet is placed or leading up to the bet being placed. In some implementations, each time a bet is won a bet may be increased and/or decreased. In other implementations, each time a bet is lost, a bet may be increased and/or decreased.

4.5.3. Bet on when a trend will end. For example, bet that there will be five more dealer losses in a row. In some implementations, a player may bet on when a trend or pattern will end and/or on how long a trend or pattern will continue.

4.5.3.1. Bet on length of trend as a function of how good a player is. For example, bet that a trend will be longer if someone is playing perfect strategy. In some implementations, a player's bet on the length of a trend or pattern may be based on a strategy used by a player. For example, if a player bets on a player after a winning streak of 3 games, the player may bet that the streak will continue if the player is using an optimal play strategy but may be that the streak will end if the player is using a non-optimal strategy, and so on.

4.5.3.2. Bet on how long someone will continue to play optimum strategy. E.g., he'll be able to use optimum strategy for another five hands. In some implementations, if a player is betting on a player that is using a particular strategy, the player may bet on how long a player may continue to use the strategy (e.g., number of games, period of time, number of drinks, etc.).

4.5.4. Betting done based on spirit. The "room" is moving to red, or to black. In some implementations, a player may place a bet based on a trend that a room is moving from one type of results to another type of results. For example, if a series of black outcomes has happened in roulette games over time, and then several black outcomes occur, a player may bet that the trend towards black will continue.

4.5.5. Betting when a jackpot (e.g., progressive) reaches certain level. In some embodiments, a player may bet when jackpot level reaches a threshold. The player may not bet if the threshold is not met even if a pattern occurs.

4.5.5.1. Player alerted to good betting candidate and then bets. In some implementations, a player may select to bet on historical patterns that have led to particular outcomes in the past. For example, a player may select to bet on a jackpot happening if a pattern that has led to a jackpot happening in the past occurs again.

4.6. Compensating parties for the data. In some embodiments, a provider of data related gaming or other services may compensate providers of data for the data. For example, a slot machine operator may be compensated for information related to events related to the slot machine, a casino may be compensated for information related to table game activity, and so on. Compensation may take any form, for example a fee, a portion of winnings, a fee when the data is used to gamble, and so on.

4.6.1. Data is purchased outright and can be used as the purchaser sees fit. In some implementations, the data may be purchased from the provider of data and may be usable as the purchaser sees fit. For example, a fee may be paid at the time of providing the data that allows the data to be used for one or more specified activities.

4.6.2. Data provider is paid based on use of the data. In some implementations, a provider of data may be paid based on the use of the data. For example, each time the data is used for gaming, provided to players, and or any other activity takes place, a provider of the data may be paid a fee.

4.6.2.1. Data provider receives a percentage of winnings. In some implementations, a provider of data may be paid a percentage of winnings of players that wager based on the data.

4.6.2.2. Data provider receives a percentage of bets using its data. In some implementations, a provider of data may be paid a percentage of wagers of players that wager based on the data.

4.6.2.3. Data provider receives a fee per outcome provided. In some implementations, a provider of data may be paid a different amount based on the type of data provided. For example, jackpot related data may be worth more than losing data, winning data may be worth more than losing data, final outcome data may be worth more than intermediate outcome data, and so on.

4.6.3. For revenues received for data from multiple providers, there may be a division of compensation among the multiple providers. An accounting system. In some implementations, a gaming provider may monitor data received from a plurality of data providers and/or the uses of the data by players. The gaming provider may use this information to determine fees to be paid to the various data providers.

4.6.3.1. Process of tagging data as to the casino it came from. In some implementations, to facilitate monitoring of data for accounting purposes, data may be tagged to include an identifier of the source of the data. For example, a data structure that is used to store the data may include a portion that identifies the source. When the data structure is accessed or the data is otherwise used, a check may be made to see who the provider was, and an accounting of the use may be made accordingly.

4.6.3.2. Revenue split based on quantity of data provided, regardless of the actual data. E.g., the casino that provided 60% of the data gets 60% of the revenue. In some implementations, compensation for data may be based on the percentage of the total data received form each provider. In such implementations, a casino that provides 60% of data may be paid 60% of the fees for the data.

4.6.3.3. Revenue split based on profitability of the data. E.g., if a jackpot came from one casino, that casino gets nothing. In some implementations, compensation for data may be based on how profitable data may be. For example, if the data includes more wins than losses, the price paid for the data may be less, and so on.

4.7. Aggregate demographic information. E.g., how many people from Tennessee are here? In some embodiments, data may include information about an aggregate of demographic information for people. For example, data may include information about demographics of people in a casino (e.g., number of people in an age bracket, number of people in an income bracket, etc.). Such information may be obtained as players sign up for a data related service, for example.

4.8. Player picks desired game configuration/desired odds, then plays from there. In some embodiments, a player may be able to select to play a game that has a set of desired characteristics. For example, a player may be able to select, through a user interface, to play a game that has a desired set of odds for winning. In some implementations, a game with those odds may be found from data provided about previously played games (e.g., a blackjack game with first cards dealt, a craps game in which a marker has been placed, etc.). In some implementations, a completely new game may be provided that has those odds.

4.8.1. The user can choose from a dial that scrolls from one end (High win occurrences, low payoff) to the opposite end (low win occurrences, high payoff). In some implementations, a user interface may allow a user to select form a plurality of odds for a game. The different odds may correspond to different payouts for winning (e.g., as odds increase, payout may decrease). In some implementations, a user may select a set of odds and payouts to play a game that corresponds to such criteria. The game may be any type of game based on historic data and/or created new for the player (e.g., a blackjack game with non-standard odds, etc.).

4.8.2. An engine calculates what data and from what machines we need data in order to create the odds desired by the player. In some implementations, to provide a game to a player with the selected odds, a set of data from a plurality of sources may be searched to find a source of data that provides a game with such odds, and or a subset of data may be selected from one or more games that provides such odds. The player may then be presented with a game that is based on the selected data that has such odds. For example, a slot game may be given a set of odds by selecting historic data that also has such odds and recreating the games from that set of data.

4.8.3. Dynamic creation of the pay tables based on the outcomes the player wants to be winning outcomes. For example, set the pay table to be 95% In some implementations, a player may select any set of odds. In response to a selection of odds, a pay table for a game may be developed. The pay table may be created dynamically. The pay table may be created to maintain a house edge. As the odds increase, the payout for the table may be decreased. The pay table may be based on the pay table of an original game from which data is received adjusted based on the selected odds.

4.8.4. Make the payout percent dependent on: In various embodiments, payouts related to a game may be based on any number of things, including but not limited to odds of the game.

4.8.4.1. Duration of game. E.g., the longer games have lower payout percentages. In some implementations, for example, payouts may be based on a duration of a round of a game. For example, if an average round of a game takes a long time, the payout may be lower than if the average round of the game takes a shorter time.

4.8.4.2. Amounts being wagered. In some implementations, for example, payouts may be based on an amount wagered. For example, if an amount wagered is large, then payouts may be greater. If an amount wagered is small, then payouts may be smaller. A plurality of wager thresholds may correspond to a plurality of pay out levels that increase as the wager level increases.

4.8.4.3. Status of player. In some implementations, for example, pay outs may be based on a status of a player. For example, frequent gamblers may have better pay outs than infrequent gamblers, and so on.

4.8.4.4. Number of games being played in parallel. In some implementations, a number of games being played in parallel may influence the payout for one or more of the games. For example, if more games are being played in parallel, the pay outs may be larger than if fewer games are being played in parallel.

4.8.5. Player can go back and say, "I want all hands that had a shot at the royal flush." The machine then searches for all games that gave the player at least three cards to the royal. Price or odds may adjust accordingly. In some implementations, a player may be able to select a state of a game or other characteristic of a game that may or may not be related to odds of the game. For example, a player may select that he or she wants to play a game in which a particular outcome is possible based on an intermediate state of the game. For example, a player may select to play a poker game in which a royal flush is a possible outcome after a first number of cards dealt. Data may be searched for a game that meets that criteria, and a player may be provided with a game to play that meets that criteria. Payouts may be adjusted based on the odds of the game with the criteria selected.

4.9. Assemble a complete game from pieces of other games. In some embodiments, a player may be provided with a game that is based on historic data from a plurality of previously played games. For example, one portion of an outcome may be determined form one game, and another portion of an outcome may be determined form another game.

4.9.1. Rolls of dice from two separate tables are joined together to make a craps game. For example, in some implementations, a game that involves a roll of a plurality of dice may use data from a plurality of games to determine the outcome of the roll of the dice. For example, the roll of one die may be determined from a die rolled in a first game, and a die roll of a second die may be determined from a die roll in a second game.

4.9.2. Cards from two separate machines are used together in a poker hand. In some implementations, cards for a game may be determined based on cards dealt in a plurality of historic games. For example, a first card may be determined from a first game, and a second card may be determined from a second card, and so on.

4.9.3. Total Virtual Game. Aggregate into one game many different roulette wheels. For example, adding up the numbers to create a virtual wheel with many more numbers. In some implementations, a data about a plurality of games may be combined to create a game that is played differently from any or some of the original games. For example, a plurality of roulette games may be combined to create a larger roulette wheel with numbers that add up to the numbers of the combined roulette reels from a plurality of roulette games, a card game may be played with cards that add up to the value of cards from a plurality of card games, and so on.

4.9.4. Betting on spreads. The excess of reds over blacks, for example. In some implementations, a player may be able to bet on a spread between outcomes in a plurality of games. For example, a player may bet on how much a number of reds may exceed a number of blacks in a plurality of games of roulette. The games of roulette may be the same or different games (e.g., number of reds exceed the number of blacks in a single set of games, or number of reds in a first set of games exceeds the number of blacks in a second set of games, etc.).

4.9.5. Bet based on 3 out of the 6 numbers on 6 spins being identical. This could be like playing poker with roulette wheels. Get straights, flushes, etc. In some implementations, a player may be able to bet on a pattern of outcomes of one or more games. For example, a player may bet that a pattern of outcomes of a plurality of games has one or more characteristics (e.g., are the same, are different, have a number of red cards, have a number of face cards, have a sequence of cards or numbers of a certain length, etc.).

4.10. Replay old games with no money on the line. In some embodiments, a player may be able to replay historic games that are represented by collected data. The player may replay those games, in some embodiments, without betting on the outcome.

4.10.1. Provides players with good intro to a game. Such play may allow players to learn how to play a game or a portion of a game (e.g., a bonus round). Players may select, for example, to play only parts of a game that have multiple parts (e.g., play a second stage of a multistage game, play a bonus round, etc.).

4.10.2. Test out strategies. Let's see if my prediction for this next outcome is a good one. Playing such games may allow a player to test a plurality of different strategies to develop a strategy of their own and/or to determine which strategy they want to adopt.

4.10.2.1. Program or select different betting strategies and let the machine backtest them for you. In some implementations, a player may be able to submit a strategy through a user interface and have a computer automatically play a plurality of games according to the strategy. Accordingly, the player may be able to determine how a particular strategy would have performed on a plurality of actual games that were played.

4.10.3. Go back and let the machine play the perfect game. In some implementations, a player may be able to have a computer play a game according to an optimal strategy. Accordingly a player may be able to see how a used strategy resulted in a different outcome than an optimal strategy.

4.11. Bet on what sector of the casino will be hot (e.g., this room will do well). In some embodiments, a player may be able to bet on whether one area or set of games will be winners or losers over a period of time or before another area or set of games has that characteristic. For example, a player may bet that an area of a casino becomes a winning area over the next hour, maybe that a first type of game has more winnings than a second type of game and so on. A game provider may collect data about the areas and/or games and determine whether the bet is a winning bet or not.

4.11.1. Bet on individual player/machines. Player stats. Player batting 400. Hot streak. Beating dealer. Patent player stats! Either exactly what they've done, or scroll through their history. In some implementations, a player may bet on another players outcomes. For example, a player may bet that a player receives a particular set, pattern, trend, and so on of outcomes over a period of time. A player may, for example, bet that another player wins a jackpot, wins more than he loses over an hour, goes on a winning streak of X length and so on. A game provider may determine whether the bet is a winning bet based on collected data from games played by the player.

4.12. Define some stock ticker or other symbol that represents some aggregation. It could be the S&P for the casino. In some implementations, various collections of data may be represented by a stock like ticker symbol. For example, a symbol such as RBS may represent a number of roulette Black rolls that have happened in the casino for the day. Any set of aggregated data may be assigned a symbol that represents the data. Such data may be displayed, for example in a stock ticker like fashion on a user interface, kiosk, ticker around a casino, and so on.

4.13. Play along with people. For example, you are walking by someone who is lucky. So you stand behind them and play along. You can sync up with them over the short range and play along. In various embodiments, a secondary player may participate in the game of a primary player. The primary player may be at a live table game, such at a blackjack table or at a Caribbean Stud Poker table. The secondary player may participate in the game using another device. For example, the secondary player may have a mobile gaming device that receives a data feed of outcomes received by the primary player (and possibly the dealer and/or opponents of the primary player) and redisplays the outcomes on the mobile gaming device. The secondary player may also participate using a slot machine, kiosk, betting terminal, or other device. The secondary player may passively bet on the primary player. Thus, for example, the secondary player may automatically win whenever the primary player wins or lose when the primary player loses. The secondary player may also automatically follow the strategy used by the primary player, such as in a game of Blackjack.

The secondary player may find the primary player, or synchronize with the primary player, in various ways. In some embodiments, the secondary player may walk by the table at which the primary player is sitting. The secondary player may point his mobile gaming device at the primary player. The mobile gaming device may detect a signal being emitted by an antenna built into the table at the location that the primary player is sitting. At the same time, the primary player may have a tracking card or other device inserted into a card reader at the table. As such, the table may communicate to the secondary player's mobile gaming device a name or other identifier of the primary player. Cards received by the primary player may be determined automatically by an overhead camera or by an imaging device built into the card shoe, for example.

In various embodiments, a secondary player may connect or link to a primary player at a slot machine or other gaming device. The secondary player may receive the benefit of the same outcomes as are received by the primary player. Thus, the secondary player may win when the primary player wins and lose when the primary player loses. In some embodiments, the secondary player may bet on whether or not the primary player will win, rather than betting on the outcome of the game, per se.

In some embodiments, a secondary player may bet on a primary player. The secondary player may agree or may configure his device to automatically follow the primary player's play exactly. Thus, the secondary player will automatically use the same strategy as does the primary player. In some embodiments, the secondary player may deviate from the strategy of the primary player. The primary player may employ a first strategy stemming from an initial outcome, while the secondary player may employ a second strategy stemming from the same initial outcome. For example, in a game of blackjack, the primary player and the secondary player may both receive the same starting hand. However, the primary player may decide to hit, while the secondary player may decide to stand. In another example, the primary player (and thus the secondary player) may be engaged in a game of craps. The primary player may make a first roll of the dice. The primary player may then make a first set of follow-on bets, while the secondary player may make a second set of follow-on bets.

In various embodiments, the secondary player may configure his device to exactly mirror all decisions or strategies of the primary player. Alternatively, the secondary player may configure his device to allow the secondary player to diverge from the decisions or strategies of the primary player. For example, for five games, the secondary player may have his mobile gaming device configured to exactly follow the decisions and strategies of the primary player. Thus, the secondary player may always make the same decisions as the primary player and may thus experience the identical pattern of winning and losing as does the primary player. Then, the secondary player may flip a switch, press a button, or provide some other indication that he no longer wishes to automatically follow the strategies of the primary player. Thus, the secondary player may configure his device to allow him to make decision that are independent from those made by the primary player. The secondary player may proceed to play with this configuration for another eight games. Then, the secondary player may decide to reconfigure his device to again follow exactly the decisions and the strategies of the primary player. In some embodiments, a secondary player may reconfigure his device in the middle of a game. For example, the secondary player may all-of-the-sudden wish to make an independent decision in a game when his mobile gaming device was configured to make a decision automatically. The secondary player may thereupon switch the configuration of his mobile gaming device so that it does not automatically follow the decision of the primary player, but rather allows the secondary player to make his own decision in the game.

In various embodiments, a display or other indicator on a player device (e.g., on a standalone gaming device or on a mobile gaming device of the secondary player) may show whether the device is configured to automatically follow every strategy of the primary player, or whether the device is configured to allow the secondary player leeway in making decisions. The indicator may take the form of a background display which can be either one color or the other, depending on the current configuration. The indicator may take the form of a light emitting diode or other light which can be either on or off. The indicator may take the form of two light emitting diodes, one of which is one color and the other of which is another color. One or the other of the two diodes may depend on the configuration of the gaming device. Indicators may include audio indicators, indicators that use vibrations, indicators that use heat, or any other types of indicators.

The presence of the indicator may make the secondary player readily aware of whether he is following the decisions of the primary player, or whether he will have to make his own decision. For example, if the background color of the display screen on the mobile gaming device of the secondary player is green, the player may be forewarned that he is no longer tracking the decisions of a primary player and will have to make his own. Thus, the secondary player should be more attentive towards inputting decisions and should not be surprised when his game result differs from that of the primary player.

4.14. API. In various embodiments, APIs may be used to facilitate data exchange and system interaction in accordance with various embodiments. Sensors used to gather data may communicate data gathered via APIs. For example, a software application may use an API associated with a camera to retrieve image data from the camera. A software application may use an API associated with a pressure sensor to retrieve data from the sensor, e.g., data about the weight of chips placed over the sensor. A software application may use an API associated with a card reader to retrieve data about the cards that have passed over the reader. For example, the reader may be attached to a card shoe and may thereby gather data about the cards dealt from the card shoe. In various embodiments, a display may include an API. A software application may interact with the display's API in order to cause the display to display text, graphics, or animations.

4.14.1. Drivers. In various embodiments, there may be a driver for a reader. For example, there may be a generic card reader. Using the driver, the card reader may be adapted to read different cards or adapted to other networks.

4.15. Betting on aggregates of data. E.g., more than 200 reds on roulette in a day, or 100 blackjacks. In various embodiments, a secondary player may place a bet that a statistic will take a certain value or range of values. The statistic may represent an aggregate of data from two or more games. For example, a secondary player may bet that a statistic describing the number of "red" outcomes at any roulette wheel across a casino in the next hour will have a value in the range of 200 to 250. In other words, the secondary player may bet that there will be between 200 and 250 "red" outcomes at any roulette wheel in the casino over the next hour. If, in the next hour, there are in fact between 200 and 250 "red" outcomes, the player may receive his bet back plus an additional payout. The additional payout may be some function of the bet size, such as one times the bet size, two times the bet size, or any other multiple of the bet size.

Embodiments described herein may apply to statistics about the future or to historical statistics. For example, a secondary player may bet that in the next hour, there will be two payouts won at a casino exceeding $1000. Such a bet may constitute a bet on a statistic about the future. As another example, a secondary player may bet that between the hours of 3:00 pm and 6:00 pm on Oct. 12, 2003, at a particular machine at a particular casino, there were 200 losing outcomes generated. Such a bet may constitute a bet on a statistic about the past. Although a secondary player may make a bet about the past, the bet may still be based upon a random or uncertain set of events, since the secondary player may not be aware of what happened in the past which was relevant to the statistic. Embodiments described herein may apply to statistics about the present. For example, a secondary player may bet that, for all video poker games currently in progress, there are twenty games in which the initial five-card hand dealt contains three-of-a-kind or better. Embodiments described herein may apply to statistics that encompass the past and the present, to statistics that encompass the present and the future, to statistics that encompass the past and the future, and to statistics that encompass the past, present and future. For example, a secondary player may bet that at a point in time 30 minutes into the future, there will have been twenty bonus rounds achieved at a bank of slot machines in the past 50 minutes (i.e., in the period beginning 20 minutes before the present and stretching to 30 minutes into the future).

4.15.1. Times and statistic initiations. In various embodiments, a bet may be based on the value of a statistic at certain times. In some embodiment, the bet is based on an initialization value for a statistic. A statistic may take an initial value of 0, for example. A statistic may take a certain initial value at a designated time. The designated time may be, for example, the time at which the bet is placed, one minute after the bet is placed, the start of the next hour (e.g., 8:00; e.g., 2:00), the start of the next day, the start of the next month, and so on. For example, a statistic may represent the number of times a royal flush has been dealt at any video poker machine in a bank of machines. The statistic may be initialized to zero at a designated time and date, such as at 12:00 am on Oct. 1, 2010. The statistic may then increment by one for each royal flush dealt at the bank of machines. In various embodiments, a bet may be based on a second value of a statistic. The second value of the statistic may be the value of the statistic at a designated time. For example, the second value of the statistic may be the value the statistic takes one hour after the time of the initialization value of the statistic. The second value of the statistic may be the value the statistic takes three hours, two days, or any designated time after the initialization value of the statistic. To continue with a prior example, the statistic, which was initialized to 0 on Oct. 1, 2010 may take its second value at 12:00 am on Nov. 1, 2010. Thus, a secondary player may bet that a statistic which is initialized to the value of 0 at 12:00 am on Oct. 1, 2010 will take a value of between 30 and 40 at 12:00 am on Nov. 1, 2010.

In various embodiments, a secondary player may bet on the value that a statistic will take at a certain period of time, without any initialization time or value being specified. The statistic may represent an ongoing statistic, for example, that is updated generally whether or not any bets are placed on the value of the statistic. For example, a statistic may describe the value of a particular progressive jackpot. A secondary player may bet that the value of the statistic (and thus, the value of the progressive jackpot) will be over $1.2 million at 3:00 pm on Oct. 4, 2010. In some embodiments, a casino may keep track of the number of "red" outcomes and the number of "black" outcomes that occur at all roulette wheels at a casino. For example, at a particular point in time, a statistic describing the number of "red" outcomes (e.g., since the beginning of the week) may read "1204", and a statistic describing the number of "black" outcomes may read "1154". A secondary player may place a bet which wins if the statistic describing the number of "red" outcomes reaches 1300 in the next hour. A secondary player may place a bet which wins if the difference between the value of the "red" statistic and the value of the "black" statistic is more than 100 one hour after the bet is placed. In some embodiments, an ongoing statistic may be transformed into a statistic with a desired initialization value, e.g., through a simple mathematical transformation. For example, a second statistic may be defined as the value of a first statistic less 1204. Thus, the aforementioned statistic indicating that 1204 "red" outcomes had occurred at a casino in some prior period may be converted into a second statistic which will describe the number of "red" outcomes to occur at a casino going forward from the time the second statistic has been defined.

In various embodiments, a secondary player may bet that the value of a statistic will fall into a non-continuous range. For example, a secondary player may place a bet on the value of a statistic describing the number of times a dealer busts at any blackjack game in a casino during the next hour. The secondary player may bet that the dealers will bust a total of between 50 and 75 times, or between 100 and 125 times. Thus, the secondary player may win if the dealers bust 60 times or 110 times, but not if the dealers bust 90 times, for example.

4.15.2. Bets on statistical values at multiple times. In various embodiments, a secondary player may bet that a statistic will take on different values at different times. In various embodiments, a secondary player may bet that a statistic will fall into different ranges of values at different times. In various embodiments, a secondary player may bet on a path that a statistic will take. For example, if the value of a statistic is plotted as a function of time, the secondary player may bet that the plot will follow a certain path and/or take a certain shape. In various embodiments, a secondary player may bet that the value of a statistic will fall within a first range at a first time and within a second range at a second time. In various embodiments, a secondary player may bet that the value of a statistic will fall within a first range at a first time, within a second range at a second time, and within a third range at a third time. For example, a secondary player may bet that a statistic describing the number of sevens rolled at a craps table starting from 8:00 am will fall between 15 and 20 at 9:00 am, and between 40 and 50 at 10:00 am. Thus, the secondary player will win his bet if there have been 18 sevens rolled at 9:00 am and 44 sevens rolled at 10:00 am. However, the secondary player will not win his bet if there have not been between 15 and 20 sevens by 9:00 am or if there have not been between 40 and 50 sevens by 10:00 am.

In some embodiments, a secondary player may win a bet if the value of a statistic satisfies a first condition at a first time or a second condition at a second time. For example, suppose that a statistic describes the number of times any primary player has received a blackjack at a particular blackjack table since 4:00 pm. The secondary player may place a bet which wins if the statistic has a value between 10 and 20 at 4:30, or which wins if the statistic has a value between 30 and 40 at 5:00.

In various embodiments, a secondary player may place a bet which wins based on the value of the statistic meeting any defined condition or combination of conditions. For example, a secondary player may win a bet if a statistic satisfies any 3 of 4 defined conditions.

In various embodiments, a secondary player may bet that a statistic will take on a particular value during a particular period of time. For example, a secondary player may bet that the total number of "bell" symbols to appear at a particular slot machine since 7:00 pm will reach 40 between 8:00 pm and 8:10 pm. If the value of the statistic reaches 40 at 8:01 pm, for example, then the secondary player will win. However, if the value of the statistic reaches 40 at 8:13 pm, then the secondary player will lose. In various embodiments, a secondary player may bet that the value of a statistic will fall within a certain range of values during a certain time period. For example, a particular statistic may describe the number of outcomes with payouts of more than 30 coins that have occurred at a particular slot machine since 9:00 am. The secondary player may bet that the value of the statistic will be in the range of 5 to 10 sometime between 9:30 am and 9:35 am. The secondary player would win his bet, for example, if the value of the statistic was at 5 at 9:35 am or was at 10 at 9:30 am. However, the secondary player would lose his bet, for example, if the value of the statistic had already reached 11 by 9:30 am or hadn't yet reached 5 by 9:35 am.

4.15.3. Bets on combinations of statistics. A first statistic will take a first range of values and a second statistic will take a second range of values. In some embodiments, a secondary player may bet on the values of two or more statistics. For example, a secondary player may bet that a first statistic will reach a first value and that a second statistic will reach a second value at a designated time. For example, a secondary player may bet that the ace of spades will be dealt 200 times in the next hour at a bank of video poker machines, and that the ace of hearts will be dealt 210 times in the next hour at the same bank of machines. The secondary player may win his bet if both the ace of spades is dealt 200 times in the next hour and the ace of hearts is dealt 210 times in the next hour. If the ace of spades is not dealt exactly 200 times, or the ace of hearts is not dealt exactly 210 times, then the secondary player may not win the bet. In some embodiments, a secondary player may bet that either a first statistic will reach a first value, or a second statistic will reach a second value. For example, a secondary player may bet that either the number 3 will occur 20 times at a roulette wheel in the next day, or that the number 7 will occur 20 times at a roulette wheel in the next day. In various embodiments, a secondary player may bet that any combination of conditions will be met by a set of one or more statistics. For example, a secondary player may place a bet involving four statistics in which a separate condition applies to each statistic. The secondary player may win the bet if at least two of the conditions are met. For example, the secondary player may win a bet if at least two of the following are true: (a) there are at least 20 outcomes that occur at a gaming device between 3:00 pm and 4:00 pm that pay more than 20 coins; (b) there are at least 3 bonus rounds that occur at the gaming device between 3:00 pm and 4:00 pm; (c) the net winnings of a primary player at the gaming device between 3:00 pm and 4:00 pm are less than 5 coins; and (d) there are between 20 and 30 payouts at the gaming device between 3:00 pm and 4:00 pm that consist of an odd number of coins.

4.15.4. Conditional bets. The player bets there will be between 95 and 105 reds if there are 200 spins. In some embodiments, a secondary player may make a bet that pays based on a statistic having a particular range of values, but which is conditional on some other circumstance. For example, a secondary player may bet that there will be between 200 and 250 losing outcomes at a gaming device during the period between 4:00 pm and 5:00 pm on Nov. 12, 2001, but only if there are at least 300 games played at the gaming device. If the condition is not met, then the bet may be considered void or a tie. If the condition is not met, then a different condition may apply. For example, a secondary player may bet that there will be between 200 and 250 losing outcomes if there are at least 300 games played, and that that there will be between 100 and 125 losing outcomes if there are less than 300 games played.

4.15.5. The statistic may pay differently for different values. In various embodiments, a secondary player may make a bet which pays a first amount if a statistic has a first value, a second amount if a statistic has a second value, and a third amount if a statistic has a third value. For example, a secondary player may bet on a statistic describing the number of times the banker wins in a game of baccarat during a particular one-hour period. If the banker wins between 15 and 20 times, the secondary player may receive his bet back plus an additional amount equal to his bet. If the banker wins more than 20 times, the secondary player may receive his bet back plus an additional amount equal to twice his bet. If the banker wins less than 15 times, the secondary player may lose his bet. In some embodiments, a secondary player may win an amount that is a linear or affine function of a statistic over a certain range of possible values of the statistic. For example, a secondary player may bet on the number of times that a particular primary player's two-card hand in a game of pai gow poker will beat the banker's two-card hand, in a particular one-hour period. The secondary player may win an amount equal to $B\times0.1\times(N-15)$, for any $N>15$, where N represents the number of times that the particular primary player's two-card hand wins, and B represents the bet amount made by the secondary player. For example, if N is equal to 25, then the secondary player will win $B\times0.1\times(25-15)$, or B. If $N<=15$, then the secondary player may win nothing and, e.g., lose his bet. It will be appreciated that a statistic could simply be defined to equal $B\times0.1\times(N-15)$, or any other function of a simpler statistic. In the former case, the secondary player's payout might be defined by the statistic.

In various embodiments, a secondary player may make a bet. The bet may designate a particular value of a statistic. For example, a statistic may represent the number of times that the banker wins during a particular hour at a particular table of pai gow power. The designated value of the statistic may be 20. The payout to the secondary player may increase by a certain amount for each unit by which the statistic exceeds the designated amount. For example, for each number of times above 20 that the banker wins, the secondary player's payout may go up by $1. In some embodiments, the payout to a secondary player may increase for each unit below a designated value that a statistic falls. For example, a statistic may represent the number of times that a war is initiated in the game of casino war at a particular table during a particular three-hour period. The designated value may be 10. A payout to a secondary player may increase by $5 for each unit below 10 that the statistic falls. For example, if the value of the statistic is 9, then the secondary player may win $5. If the value of the statistic is 8, the secondary player may win $10, and so on. If the value of the statistic is 10 or above, then the secondary player may win nothing. The secondary player may lose his bet.

In various embodiments, a secondary player may lose more than the amount of his bet depending on the value of a statistic. For example, if a statistic reaches a certain value, the secondary player may lose twice the amount of his bet. Thus, the secondary player may lose the original amount of his bet and may be further obligated to supply an additional amount equal to the original amount of his bet. In various embodiments, a secondary player may lose more money the further the value of a statistic departs from a designated value. For example, a designated value for a statistic may be 20. The secondary player may lose $1 if the actual value of the statistic is 19, $2 if the actual value of the statistic is 18, $3 if the actual value of the statistic is 17, and so on.

In various embodiments the secondary player may make a spread bet based on the value of a statistic. A spread bet may include a designated value of the statistic. If actual value of the statistic is greater than the designated value, then the secondary player may be paid in proportion to the amount by which the actual statistic is greater. If the actual value of the statistic is less than the designated value, the secondary player may lose an amount that is proportional to the amount by which the actual statistic is less. A secondary player may also lose if the actual value of a statistic is greater than a designated value and win if the actual value of the statistic is less than the designated value. For example, a secondary player may win an amount that is proportional to the amount by which the actual value of the statistic is less than the designated value of the statistic. The secondary player may lose an amount that is proportional to the amount by which the actual value of the statistic is greater than the designated value of the statistic.

In various embodiments, a spread bet may include a constant that is added to a payout or to an amount owed by a secondary player. For example, a secondary player may be paid an amount which is proportional to the difference between an actual value of a statistic and a designated value of a statistic plus a constant. The constant may be positive or negative. For example, a secondary player may be paid an amount equal to $1×(A−D)+c, where A is the actual value of a statistic, D is the designated value of the statistic, and c is a constant. In various embodiments, the secondary player may be paid an amount equal to $1*k*(A−D)+c, where k is a constant. In various embodiments, the secondary player may be paid $1*k*(A−D)+c1 if A>D, and $1*k*(A−D)+c2 if A≤D, where c1 and c2 are two different constants. In various embodiments, the secondary player may be paid $1*k*(A−D)+c1 if A>D, $1*k*(A−D)+c2 if A<D, and c3 if A=D, where c1, c2, and c3 are three different constants.

4.15.6. Betting on the aggregation of craps rolls. In various embodiments, a statistic may describe a summation of numbers that arise from two or more games or from two or more events. For example, a statistic may represent the sum of the point totals a player has achieved in three games of blackjack. For example, if a player achieves a hand with a point total of 16 in a first game of blackjack, a hand with a point total of 21 in a second game of blackjack, and a hand with a point total of 14 in a third game of blackjack, then the value of the statistic may be 51. A statistic may represent the sum of point totals from two or more primary players in a single game of blackjack. For example, a statistic may represent the sum of point totals from the hands of Bob, Joe, and Sam, all of whom participate in the same game at a particular gaming table in a casino. In some embodiments, a statistic may represent the sum of point totals for both player and dealer hands. In some embodiments, a statistic may represent the sum of dealer point totals from multiple games. In some embodiments, a statistic may represent a sum of card point totals. For example, a statistic may represent the sum of points from every card dealt during a game, or for every card dealt during a plurality of games.

In some embodiments, a statistic may represent the sum of numbers revealed on tiles or dominoes in a game. For example, a statistic may represent the sum of numbers revealed on dominoes in the game of pai gow.

In some embodiments, a statistic may represent the sum of numbers achieved during two or more rolls of dice. Such dice rolls may occur in craps, in sic bo, or in any other game. In a game of craps, a statistic may represent the sum of two or more dice rolls during a game. For example, a statistic may represent the sum of all dice rolls made between when a pass-line bet is made and when the pass-line bet is resolved (e.g., in the player's favor, e.g., in the dealer's favor). As another example, a statistic may represent the sum of a fixed number of rolls made during a game. For example, a statistic may represent the sum of the first three rolls made during a game of craps. In some embodiments, a statistic may represent the sum of rolls made in two or more separate games. For example, a statistic may represent the sum of the rolls made in five consecutive games of craps.

In various embodiments, a secondary player may place a bet with a payout that depends on the value of statistic representing the sum of points, dice rolls, or any other numbers. For example, a secondary player may place a bet that a statistic representing the sum of three dice rolls in craps will have a value in excess of 21. The secondary player may win the amount of his bet if the value of the statistic exceeds 21 and lose the value of his bet otherwise. Suppose to continue the above example, that the three dice rolls are 10, 6, and 8. The value of the statistic would then be 24, which is the sum of 10, 6, and 8. The secondary player would therefore win the amount of his bet.

In another example, a secondary player may place a bet on the value of a statistic that represents the sum of the first roll of the dice from each of the next five craps games. The player may win if the value of the statistic is less than 32 but lose otherwise. Suppose for the next five games, the first rolls occur as follows: 4, 7, 9, 5, 9. Accordingly, the value of the statistic would be 34. Thus, in this example, the secondary player would lose.

In various embodiments, a statistic may represent the sum of rolls from multiple different craps tables. For example, a statistic may represent the sum of all rolls at every craps table at a casino during a given five-minute period. For example, a statistic may represent the sum of the next roll at each of five craps tables.

In various embodiments, a statistic may represent the sum of numbers rolled on individual dice. For example, a statistic may represent the sum of the lowest die in each of the next three rolls. For example, let the ordered pair (x, y) represent a single roll with x representing the number on one die in the roll and y representing the number on the other die in the roll. Suppose the next three rolls occur as follows: (3, 5); (6, 4); (1, 3). The value of the statistic would be equal to the sum of 3, 4, and 1, which is equal to 8.

In various embodiments, a statistic may represent any function of points, rolls of the dice, or other numbers. For example, a statistic may represent the product of dice rolls. For example, if three dice rolls are 4, 3, and 10, the statistic may take the value of 120, which is equal to the product of 4, 3, and 10.

In various embodiments, a secondary player may make a bet whose payout depends on the actual value of a statistic relative to a designated value. In some embodiments, a secondary player may make a bet whose payout is proportional to a difference between the actual value of a statistic and a designated value of the statistic. Such a bet may be referred to as a spread bet, in some embodiments. For example, a secondary player may place a bet on the value of a statistic representing the sum of three rolls of dice in a game of craps. The designated value may be 21. The player may receive $1 for every unit that the actual value of the statistic exceeds the designated value of 21. For example, if the actual value of the statistic turns out to be 24, then the player may receive $3. In some embodiments, a secondary player may owe an amount that is proportional to the amount by which the actual value of the statistic is less than the designated value. For example, if the actual value of the statistic turns out to be 14, then the player may owe an amount equal to $10. Any amount previously provided by the secondary player may count towards the amount owed. For example, the amount of a bet previously placed by the secondary player may count towards the amount owed.

Mobile Device Interacts with a Proximate Game

In various embodiments, a player (e.g., a primary player; e.g., a secondary player) may carry a mobile device. The mobile device may provide an interface via which the player may participate in a game. The mobile device may receive data from a casino server, from a gaming device, from a gaming table, or from any other source. The data may include game data. Based on the data, the mobile device may create or recreate a depiction of a game. For example, the data received by the mobile device may include data indicating cards that have been dealt in a game, numbers that have been rolled on dice, numbers which have been determined in a roulette game, and so on. Based on the data, the mobile device may create or recreate a depiction of a slot machine game, a video poker game, a roulette game, or any other game. In some embodiments, the mobile device may indicate, e.g., via text on a display screen, the events that occurred in a game without graphically depicting the game. The mobile device may include input devices such as buttons, touch pads, track balls, keys, touch screens, microphones, and so on. The mobile device may accept commands and other inputs from the player via the input devices. The mobile device may receive from the player inputs indicating an amount to bet on a game, a strategy to be used in a game, a decision to be made in a game, a bet to be made in a game, and so on. The mobile device may transmit any inputs received from the player to the casino server, to a gaming device (e.g., to a slot machine), to a gaming table, to a dealer, to a croupier, or to any other entity that is conducting a game. The mobile device may communicate via an intermediary with an entity conducting a game. For example, the mobile device may transmit data to and receive data from a casino server. The casino server may, in turn, transmit data to and receive data from a table game. In this way, the table game and the mobile device may communicate through the casino server.

Using the mobile device, the player may participate in a live game. If the player is acting as a primary player, then the player may initiate the play of the game and make decisions in the game. If the player is acting as a secondary player, then the player may place a bet on a game of a primary player.

In various embodiments, the mobile device may be configured to select an entity conducting a game based on the location of the entity and/or based on the location of the game. For example, a mobile device may be configured to select a table game of blackjack that is located within 100 feet of the mobile gaming device. Accordingly, the mobile device may begin receiving data from the table game and transmitting data to the table game. The mobile device may transmit to the table game an indication that the player wishes to make a bet and start a new game. A dealer at the table game may receive instructions from the mobile device. For example, a wireless receiver at the table game may receive instructions from the mobile device and cause them to be displayed on a monitor at the table game. The dealer may follow the instructions. For example, the dealer may deal cards at a new position at the table. The position may remain physically unoccupied. Nevertheless, the cards may represent the cards of the player who is playing via the mobile device. As events occur in the table game, data about such events may be transmitted to the mobile device. For example, the cards dealt to the hand of the player may be read by a reader on the card shoe as they are dealt. Data indicative of the cards may be transmitted to the mobile device via a wireless transmitter at the table. The mobile device may receive the data and display game information to the player based on the received data. The player may input game decisions, such as hit or stand decisions, after which such decisions may be transmitted back to the game table by the mobile device. The process may continue through one game or through a whole series of games.

In various embodiments, a mobile device may initiate communication with a table game, gaming device, or other entity that is most proximate to the mobile device. For example, the mobile device may determine that a particular slot machine is the closest slot machine to the mobile device. Accordingly, the mobile device may initiate communication with the slot machine. The player with the mobile device may then participate in the games of the slot machine. The player may participate as a primary player or as a secondary player, in various embodiments. If the player participates as a primary player, the mobile gaming device may receive an amount of a bet from the player and then transmit a signal to the gaming device, thereby triggering the gaming device to generate an outcome. Thus, the gaming device may be triggered to spin and generate an outcome without the physical presence of a player directly in front of the gaming device. For example, the player may be located ten feet away from the gaming device, yet the gaming device may initiate a game and generate an outcome in response to a signal from the mobile device.

In various embodiments, the mobile device may initiate communication with a table, gaming device, game, or other computing device that relays information to and from a game, based on the proximity of the game and based on the type of game. For example, the mobile device may initiate communication with the closest game that is a video poker game. For example, the mobile device may initiate communication with the closest game that is a blackjack game. For example, the mobile device may initiate communication with the closest game that is a craps game.

In various embodiments, the mobile device may initiate communication with a game based on the presence of a primary player at the game. For example, the player with the mobile device may wish to act as a secondary player in a game of blackjack. Accordingly, the player may wish to find the nearest game of blackjack in which there is already a primary player participating. The player with the mobile device may then act as a secondary player and participate in the game of the existing primary player. In various embodiments, if the player with the mobile device wishes to act as a primary player, the mobile device may initiate communication with a game where there is a spot available for a primary player. For example, a player with a mobile device may wish to participate in a game of blackjack as a primary player. The mobile device may initiate communication with a blackjack table at which at least one seat is unfilled. The player with the mobile device may play in the game of blackjack as a primary player. However, in various embodiments, the player with the mobile device need not actually sit down at the table. The dealer may simply deal cards to a particular spot which is understood to belong to the player with the mobile device. The player with the mobile device may make game decisions and key them into the mobile device. The mobile device may communicate the decisions to the blackjack table (e.g., to a computing device with transmitting/receiving antenna situated on the blackjack table). The decisions of the player may then be communicated to a dealer who may then act based on the decisions, e.g., by dealing or not dealing cards.

In various embodiments, a mobile device may initiate communication with a game, a gaming device, a device which is associated with a game, etc., based on a number of factors. A mobile device may communicate with a game based on: (a) the type of game (e.g., poker; e.g., blackjack; e.g., slot machine); (b) based on the amount of the bet required at the game (e.g., the mobile device may initiate communication with a game only if the minimum bet required is less than $25; e.g., the mobile device may initiate communication with a game only if the minimum bet required is greater than $1); (c) the availability of a spot at the game; (d) based on the presence of a particular dealer (e.g., the mobile device may initiate communication with a game if dealer Joe Smith is dealing); (e) based on historical outcomes of the game (e.g., the mobile device may initiate communication with a game if the last 5 games played were winning games; e.g., the mobile device may initiate communication with a game if primary players at the game have lost more than $100 in the last hour); (f) based on the proximity of the game to the mobile device; (g) based on the location of the game; (h) based on the location of the mobile device; and so on.

In various embodiments, the mobile device may initiate communication with a game automatically once a triggering condition has been met. For example, when the mobile device comes within ten feet of a blackjack game, communication may be automatically initiated between the game and the mobile device. Communication may be triggered without input from the player with the gaming device. The triggering conditions may, however, have been previously entered or defined by the player with the mobile device.

The mobile device may have various ways of determining if the mobile device is proximate to a game. The mobile device may include a location sensor or detector. For example, the mobile device may include a GPS reader. For example, the mobile device may receive signals from multiple fixed beacons with known locations and triangulate its own location based on arrival times of the signals from the fixed beacons. The mobile device may store records of the locations of various games. For example, the mobile device may include an internal map detailing the locations of various games. If the mobile device determines that it is at a particular location and finds that the particular location happens to be close to the location of a game (e.g., as determined from the internal map), then the mobile device may determine that the mobile device is proximate to the game. The mobile device may thereby initiate communication with the game.

In various embodiments, a game (e.g., a gaming device; e.g., a table game) may include a beacon or antenna that broadcasts signals within a short range. For example, a game may include a radio frequency identification (RFID) tag. The signal broadcast by the game may be detectable within a certain radius of the game. The mobile device may include a receiver which is capable of detecting the signal broadcast from the game. If the mobile device detects the signal, the mobile device may initiate communication with the game.

In various embodiments, a game (e.g., a gaming device; e.g., a table game) may initiate communication with a mobile device. In various embodiments, a game may detect when the mobile device is proximate. For example, the mobile device may contain an antenna that broadcasts signals within a short radius of the mobile device. For example, the mobile device may include a radio frequency identification (RFID) tag. A game may detect the presence of the tag and may initiate communication with the mobile device.

In various embodiments, the mobile device may broadcast signals. The signals may be detected at fixed detectors at known locations, e.g., at known locations in a casino. The position of the mobile device may then be triangulated using methods well known to those skilled in the art. For example, based on the travel time of the signal to a fixed detector, a circle may be drawn around the detector indicating possible locations of the mobile device. With several detectors in place, multiple circles may be drawn. The mobile device may be assumed to be located where the circles all intersect or come close to intersecting. The casino server may be in communication with the detectors. The casino server may thereby derive the location of the mobile device. The casino server may compare the location of the mobile device to known locations of a game. If the mobile device is found to be proximate to a game, the casino may alert the game and/or the mobile device of the proximity. The mobile device may thereupon initiate communication with the game or vice versa.

In various embodiments, a player may participate at a table game via a mobile device. The player may enter bets into the mobile device. The player may have an account balance with the casino. For example, the player may have $10,000 on deposit with the casino. As the player enters a bet, the amount of the bet may be deducted from the player's account balance. When the player wins money in a game, the amount of the win may be added to the player's account balance. In various embodiments, the player may place bets through the mobile device without such bets being revealed to other players. For example, the player with the mobile device may enter bets into the mobile device (e.g., by keying in an amount of the bet) without having to actually place chips on a gaming table. The player with the mobile device thus avoids a situation where other players can see how many chips are being bet by the player with the mobile device. The ability to place a bet without the amount of the bet being revealed to other players (or to spectators) may be important to a player. A player who is betting a lot of money may wish to avoid attracting attention of potential thieves, for example. A player may also benefit from not having to carry large amounts of money away from a table. For example, a player may win $40,000 at a table. Rather than gathering his $40,000 in chips and leaving, the player may have his winnings stored in his account with the casino, where they cannot easily be stolen.

The ability of a mobile device to communicate with a game and to allow the player with the mobile device to participate in the game may offer additional benefits. In some embodiments, a table game may be full. For example, every seat at a blackjack table may be currently occupied by players. The player with the mobile device may nevertheless be able to participate in a game at the table. For example, the dealer may deal an extra hand for the player with the mobile device and place such a hand in a spot with no seat in front of it (e.g., in a spot close to the dealer).

In various embodiments, a player may use a handheld device whether the device is used to play a primary game (e.g., against the dealer) or whether the device is used to play a secondary game.

In various embodiments, a player participating in table game using a mobile device may send a tip to the dealer of the game using the mobile device. For example, the player may use input devices (e.g., keys; e.g., a touch screen) on the mobile device to indicate a desire to provide a tip and to indicate an amount of a tip. The amount of the tip may be deducted from an account balance that the player has with the casino. The amount of the tip may be credited to an account of the dealer. The dealer may be authorized to take an amount of chips equal to the tip from the table and put such chips in his pocket, for example. Using a mobile device, a player may indicate: (a) an amount of a tip to provide; (b) a message to be associated with the tip (e.g., "Hi, this tip is from Joe"; e.g., "Hi, thanks for the cards last hand!"); (c) a dealer to which to provide the tip (e.g., the player may be simultaneously participating in games at two or more tables and may need to specify a dealer); (d) whether or not the tip will be provided anonymously; and so on. In various embodiments, when a tip is sent to a dealer, the dealer is informed of the originator of the tip. In this way, the player sending the tip can receive his due appreciation from the dealer. A screen at a game table may provide a message indicating who provided the tip. For example, the screen may display a message for the dealer saying, "John Brown just gave you a $5 tip." In some embodiments, the dealer may view a picture of the player providing the tip. In this way, the dealer may be able to see visually who among the players standing near the table provided the tip. In various embodiments, a dealer may receive a message saying that a tip came from a mobile device player in the area. For example, the message might say, “a mobile device player in the area has just given you a tip of $1”.

In various embodiments, a player may participate in a game via a remote device or terminal. A player may participate via a fixed terminal containing a display screen, processor, memory, and communication device, for example. A player may also participate via a mobile device. In various embodiments, a remote terminal can play a game on behalf of the player. In various embodiments, a remote device may make game decisions on behalf of the player. Such game decisions may include decisions of whether to hit or stand in blackjack and decisions on which cards to draw in a game of video poker. In various embodiments, a remote device may make decisions as to how much to bet. Decisions about amounts to bet may include decisions about how much to bet at the start of a game, decisions about whether or not to add to a bet (e.g., decisions about whether to double down in a game of blackjack) and decisions about how much to bet during the course of a game (e.g., during the course of a game of poker).

The player at the remote terminal may authorize the remote device to make decision in a game on his behalf. The player may, for example, type in his initials to indicate that he is authorizing the terminal to make game decisions on his behalf. The player may specify constraints or parameters for the decisions. For example, the player may specify an amount of a bet to be made on any given game, a maximum amount of a bet to be made on any given game, a total number of games to be played, and so on. In some embodiments, a player may authorize the remote device to make bets on games until the player has won or lost a certain amount. For example, the player may authorize the device to continue betting on behalf of the player until the player has either doubled his current bankroll (e.g., an amount the player has on deposit with the casino) or until the player has lost half of his bankroll. In various embodiments, the player may specify a strategy to be used in a game. For example, the player may specify what action should be taken in a game of blackjack should the player have 10 points and should the dealer have a three face up. In some embodiments, the player may select from two or more pre-defined strategies. For example, a player may tell indicate that he wishes to use a predefined “risky” strategy or a predefined ‘conservative” strategy. In some embodiments, the player may authorize the terminal to play according to an optimal strategy and/or to play according to a strategy that maximizes a parameter, such as an expected amount to be won from a game.

A player at a remote terminal may specify various rules for betting. Rules for betting may include one or more of the following; (a) the terminal is to bet a fixed amount on every game (e.g., $2 on every game); (b) the terminal is to bet an amount on a given game which depends on the result (e.g., win, lose) of the prior game; (c) the terminal is to bet an amount which doubles after every loss, but which is $1 after every win; (d) the terminal is to bet until X amount in total is won; (e) the terminal is to bet until X amount in total is lost; (f) the terminal is always to bet the maximum possible amount; (g) the terminal is to bet X pay-lines (e.g., in a slot machine game); and so on. Rules for betting may further include a number of games to play at once (e.g., 3 games are to be played at once; an amount of time to wait between playing games, and so on. If the player at the remote terminal is a secondary player, rules for the terminal to follow may include rules detailing the way primary players will be selected. Rules for selecting primary players may include rules for selecting primary players based on demographic information; rules for selecting primary players based on the games being played by the primary players; rules for selecting primary players based on historical outcomes of the players; rules for selecting primary players based on amounts being wagered by the primary players; rules for selecting primary players based on a strategy being used by the primary players, and so on.

In various embodiments, a mobile device may allow a player to participate in a nearby game (e.g., as a secondary player), or to play in a nearby game as a primary player. A mobile device may also allow a player to view statistics about a nearby game, such as who is playing, how many hands have been won by players at the table in the last hour, how many hands have been won by dealers in the last hour, how much money in tips the dealer has received in the last 15 minutes, what the combined gross winnings are for the table over the last hour, and so on.

A mobile device may indicate to a player which games are nearby and/or which games are available for the player to play in or participate in. The mobile device may provide a list of available games for the player to play or participate in. For example, the mobile device may display the following text: “$25 Blackjack game with four primary players; $10 blackjack game with 6 primary players; $5 roulette table with 5 primary players; $1 Monopoly Slot Machine; $0.25 Video Poker Machine . . . .” Thus, the player holding the mobile device may be able to choose one of the list tables or gaming devices so that he may participate in the games at such tables or gaming devices. Once the secondary player has chosen a game or table, he may also be able to choose a particular primary player in whose games to participate. For example, after the player has chosen a table, the mobile device may provide a list of the names of primary players at that table along with one or more data points or statistics about the primary players (e.g., net winnings in the last hour; e.g., age). The player with the mobile device may then get a chance to choose a primary player in whose game to participate. In various embodiments, a player with a mobile device may also view a list of games where he can play as a primary player. For example, a list may read, “$10 Craps Table, one spot open; $5 Blackjack Table, 3 spots open . . . .” In various embodiments, if there are games or tables nearby but no available spots, the player with the mobile device may have the opportunity to join a waiting list to either player in a game or participate in a game. A player may then have the opportunity to periodically view his place on the waiting list, e.g., by clicking on a “view waiting list” button on his mobile device.

A list of nearby games or tables may be presented in various formats to a player holding a mobile device. Some formats of the list may include text, such as text descriptions of the various games. Some formats of the list may include visual representations of a game, of a primary player at the game, of a dealer, or of any other aspect of a game. For example, a mobile device may present to a player holding a mobile device a list consisting of a set of pictures of dealers. The dealers shown in the pictures may be the very dealers who are currently working at nearby games available for the player’s participation. A mobile device may present a list of games by presenting: (a) pictures of dealers; (b) pictures of primary players at the games; (c) pictures of the games themselves (e.g., pictures of gaming tables taken from overhead; e.g., pictures of gaming devices); (d) pictures of games in progress (e.g., pictures of hands laid out after each primary player has received cards in a game of blackjack); (e) avatars or other simulated depictions of dealers or primary players; (f) simulate depictions of games; (g) pictures of game indicia; (h) simulated representations of game indicia; or any other visual representation of a game, or any other visual representation of an aspect of a game, or any other visual representation. In various embodiments, a list of nearby games may include video feeds from the games. For example, a list may include a series of small windows or icons. Inside the windows may be playing video feed from the action at the games represented. For example, a first window may contain a miniature video feed from a first blackjack table which is near to the mobile device. A second window may contain a second miniature video feed from a second blackjack table which is near to the mobile device. A third window may contain a third miniature video feed from a slot machine that is near to the mobile device. Windows may also include simulated renditions of games. A player holding a mobile device may have the opportunity to click on any of the windows and to join or participate in the game shown in the window.

In various embodiments, when a player with a mobile device participates in a game at a nearby table or game, the player may get a video feed showing the action at the table. The video feed may come from a camera which is over the table and looking down upon the table, for example. The player may also watch on his mobile device a simulated reenactment of the action that transpires at the table. A player holding a mobile device may also watch on the device a video feed of a gaming device (e.g., a slot machine) in whose games he is participating. A player holding a mobile device may also play as a primary player in a game at a table, such as in a game of a nearby table. The player may similarly view video feeds of the action at the table, and/or may view simulated renditions of the action at the table. A player holding a mobile device may, in various embodiments, see text description of the action in games in which he is playing or participating. For example, the mobile device may display, "Your primary player just got a Jack of Spades and 5 of hearts, for a starting hand of 15 . . . ."

In various embodiments, a player holding a mobile device may link to a nearby table or gaming device. The player may play games which are based on the games of the nearby table or gaming device. However, the player's games may not necessarily be based on the final outcomes which occur at the nearby table or gaming device. Rather, the player's games may utilize intermediate outcomes or other random or non-random occurrences from the games at the table or gaming device. For example, the numbers rolled on a pair of dice at a nearby craps table may be used as a random number to select a roulette outcome for the player with the mobile device. As another example, a random number generated at a nearby slot machine may be used to generate a different outcome on the mobile device from the outcome ultimately generated at the slot machine. Thus, a player may utilize some information from nearby games, but may ultimately play a unique game himself Random Generators In various embodiments, a card shoe may automatically deal cards. In various embodiments, a card show may automatically deal cards that are face up so that the cards are visible to a camera that is located above the cards. In various embodiments, cards may be placed into a card shoe face-up. In this way, the cards may be automatically dealt face-up. In various embodiments, a card shoe may show cards without expelling the cards from the shoe. The card shoe may, for example, maintain two internal stacks of cards. Cards may be transferred from the first stack to the second stack, each card shown through a viewing window of the shoe as it is transferred. Once the first stack is depleted, the second stack may be shuffled and put in the place of the first stack. The card from the newly shuffled first stack may then be transferred once again to the place of the second stack. In this way cards may be repeatedly shuffled and dealt without the necessity of a human gathering up expelled cards and placing them back into the shoe. As will be appreciated, many other card shoes may be used. Any card shoe capable of automatically dealing cards may be used, for example. Further, a card shoe may be used in conjunction with any device which can make cards visible to a camera, e.g., by flipping cards over once dealt. A card shoe may be used in conjunction with a card reader. Cards may contain special markings, such as bar codes or other patterns which are machine readable, and which serve to identify the rank and suit of the cards. Cards may contain RFID tags which offers signals that identify the rank and suit of the cards.

In various embodiments, a card shoe may deal or reveal cards with variable speed. For example, a card shoe may be capable of dealing cards at a rate between 5 cards per second and 1 card every 3 seconds. The card shoe may include controls which allow a human and/or a computer to increase or to decrease the rate at which cards are dealt. In various embodiments, a card shoe may be slowed down if the card shoe is generating cards for a game with a relatively slow pace. For example, a card shoe may be slowed down when a game using the cards is a high stakes baccarat game. A card shoe may be sped up when a game using the cards is a game of blackjack with many experienced players.

In various embodiments, the cards dealt by a card shoe may serve as a basis for the play of one or more games. For example, a remote player may be involved in a game of video poker. The cards used in the game of video poker may first be dealt from the cards shoes. The rank and suit of the cards dealt may be captured, e.g., by an overhead camera. Depictions of the cards may then be recreated at a remote terminal of the player.

In various embodiments, a card shoe may be under manual control. For example, a human or computer may indicate to the card shoe when to deal a new card. In this way, a new card may be dealt only when necessary in a game. For example, if a player is using the cards dealt from a card shoe for a game of video poker then the remote terminal of the player may instruct the card shoe to deal new cards only when the player has indicated which cards to discard from an initial hand. The cards dealt from the shoe may then be used as replacement cards for the cards discarded. Further, the shoe may be instructed only to deal as many cards as are needed to replace the cards being discarded by the player.

In various embodiments, a card shoe may deal cards at a constant rate. In various embodiments, a card shoe may deal cards according to a set schedule. The card shoe may, for example, deal one card every second. Any player and/or any game may be welcome to access the cards dealt from the card shoe. For example, a player at a remote terminal may require 10 cards for a game of blackjack. The terminal may then retrieve data about the next 10 cards dealt from a card shoe. The data about the cards may then be used to recreate images of the cards, to deal representations of cards, and to determine whether the player won in the game of blackjack or not.

In various embodiments, data about cards dealt from a card shoe may be stored. The data may be stored at a casino server, at a remote terminal conducting games for players, or at any other location. When data about cards are needed for a game, the data may be retrieved. Data may be retrieved about cards that had been dealt in the past, such as 10 minutes prior to a game being conducted, such as 1 day prior to a game being conducted, or such as a year prior to a game being conducted.

Cards dealt from a card shoe may be read in various ways. Image processing algorithms may recognize the characteristic card patterns or images. For example, an image processing algorithm may be used to count the number of pips on a card and/or to determine the suit of the card from the shape of the pips. For example, optical character recognition technology may be used to discern the rank of a card based on a letter or numeral printed on the card. In various embodiments, a card may include a bar code or other pattern. A laser may be used to read the bar code. A card may contain an RFID chip or other signaling device for communicating the identity of the card.

In various embodiments, a live human dealer may deal cards. The dealer may deal cards for a live game at a casino. In various embodiments, a dealer may simply deal cards. There may be no live players, e.g., primary players, near the dealer. However, the cards dealt by the dealer may be used as the basis for other games, such as for remote games. Accordingly, in some embodiments, a human dealer may deal cards face up. The cards may be read by a camera or other device. In some embodiments, the dealer may key in the identities of the cards. The cards may then be used in the games of remote players.

In some embodiments, multiple card shoes, live human dealers, or other card dealing entities may deal cards. In some embodiments, a first remote game may use cards from a first card shoe and a second remote game may use cards form a second card shoe. In some embodiments, a first remote game may use cards from two or more card shoes. For example, a remote game may use three cards dealt from a first shoe and two cards dealt from a second shoe in order to create an initial hand of poker. It will be appreciated that the use of cards from multiple shoes may result in the possibility of different outcomes. For example, if cards are used from a single shoe containing only one deck in a game of poker, hands with five-of-a-kind may not be possible. However, if cards are used from two different shoes, then a five-of-a-kind hand may be possible even if both shoes are only dealing a single deck of cards.

In some embodiments, a game and/or a player may use cards in alternating fashion from two shoes. For example, a game may use the first, third, and fifth cards dealt from a first shoe, and a second and fourth cards dealt from a second shoe. In various embodiments, a single game may use cards from any number of shoes, such as from five different shoes. In various embodiments, the same card may be used in two different games. For example, a card dealt from a shoe may be used in a remote game of blackjack and in a remote game of video poker. In various embodiments, a card dealt from a shoe may be used in a first game of blackjack and in a second game of blackjack. In various embodiments, historical data about cards dealt from a shoe or about cards dealt by a human dealer may be recorded. The historical data may be made available for viewing, for searching, for analysis, or for any other use by a player. A player may select a shoe to use for a game. For example, a player may view data about the last 100 cards dealt at each of two shoes. The player may decide that the second shoe is the luckier shoe because it has dealt cards that have lead more often to player wins in a game of blackjack.

In various embodiments, a card shoe may deal to a certain penetration and no more. For example, a card shoe may contain 312 cards. However, following a shuffle, the card shoe may deal less than the full 312 cards in the shoe. This may prevent a player from counting cards. For example, a card shoe with 312 cards may only deal 100 of the cards before reshuffling. In some embodiments, a card shoe may continuously shuffle cards. For example, following the deal of a set of cards, each card may be randomly inserted into the remainder of the deck. For example, following each deal, the entire deck of cards may be reshuffled.

In various embodiments, a card shoe or other card dealing device may have an associated applications programming interface (API). The API may include various commands that may be given by remote terminals to the shuffler. There may be commands for dealing a new card, for shuffling, for increasing the dealing speed, and for decreasing the dealing speed, among other commands. In various embodiments, an API may define the way in which a card shoe will communicate to a remote terminal which cards have been dealt. For example, the API may allow a remote terminal to understand a particular sequence of data as the ace of spades.

In various embodiments, one or more APIs may define the communication between a card shoe and a casino server. The casino server may, in turn, relay information about cards dealt to a terminal which is conducting a game for a player. In various embodiments, one or more APIs may define the communication between a server and a terminal. The APIs may define commands by which the terminal can request a card from the server, can request an increase in dealing speed, can request a decrease in dealing speed, or can make any other command or request.

Various games employ the use of dice. Examples include craps and Sic Bo. In various embodiments, machines may be used to roll dice automatically. A reader may determine the results of the dice rolls. For example, an image may capture the rolls of the dice and may determine what number has been rolled on each die. Data about what number has been rolled on a die or dice may be transmitted to a remote terminal. The remote terminal may conduct a game using data from the dice. For example, the remote terminal may use data about what numbers were rolled on three dice in order to determine the results of a game of Sic Bo played by a remote player.

In various embodiments, a basket may include one or more dice. The basket could be a cylinder, a tube, a parallelepiped, or any other enclosure, including any enclosure with two flat opposing surfaces. The basket may be transparent in one or more of its surfaces. In various embodiments, the entire basket may be transparent. In various embodiments, the basket may include two normal resting positions. In a first resting position, one of two flat opposing surfaces is parallel to the ground and is the closest surface to the ground. In a second resting position, the other of the two flat opposing surfaces is parallel to the ground and is the closest surface to the ground. As will be appreciated, in each of these two resting positions, the dice within the basket will most likely come to rest on the lower of the two flat opposing surfaces (i.e., the surface closest to the ground). When the basket has come to one of the normal resting positions, the dice within the basket may be read by a reader. Once the dice have been read, the basket may be flipped 180 degrees so that the surface that was closest to the ground is now closest to the sky, and the surface that was closest to the sky is now closest to the ground. The flipping of the basket should then cause the dice to fall to the surface that is now closest to the ground. The dice will presumably fall in a chaotic or unpredictable way so that when they land on the new bottom surface, a new set of random numbers will have been generated. In various embodiments, the basket may be controlled by a stepper motor. The stepper motor may accurately control the flipping of the basket so that, at rest, the opposing flat surfaces can be parallel to the ground. It will be appreciated that in various embodiments, other basket shapes may be used. For example, the basket may include a single surface which is always held substantially parallel to the ground. To randomize the dice, the basket may be shaken. In various embodiments, the dice contained in the basket may include RFID tags. Each face of the die may include its own RFID tag, for example, a detector located above the basket may detect which RFID tag is the closest of the six on a given die and may thereupon determine which number has been rolled on the die, for example.

In various embodiments, a random event may be used to supply data for use in one or more games. For example, as described herein, the shuffling and dealing of cards may determine a number of random events. The results of the random events may include which cards end up being dealt. In various embodiments, the random events may generate results from a limited set of enumerated outcomes. For example, the result of the roll of a die is an outcome from the set of integers 1, 2, 3, 4, 5, and 6. For example, the result of the dealing of a card from a standard set of 52 cards is a card that with one of only 52 unique identities. In various embodiments, data describing one of a first set of enumerated outcomes may be transformed into data describing one of a second set of enumerated outcomes. In various embodiments, several outcomes from a first set may be combined to create one outcome from a second set of possible enumerated outcomes. In various embodiments, one outcome from a first set of enumerated outcomes may be decomposed into several outcomes from a second set of enumerated outcomes. For example, a first random event may be the dealing of a card. A card may be used to generate the outcomes of two dice. For example, the two of clubs may correspond to a roll of two dice where each die shows the number 1 on its top face.

In another example, three dice are rolled. The three dice are used to define the rank and suit of a card. For example, a first die is rolled. If the first die shows a one, then the card is a club. If the first die shows a two, then the card is a heart. If the first die shows a three, then the card is a diamond. If the first die shows a four, then the card is a spade. If the first die shows a five or a six, then the die is rolled again until it shows a 1 through 4. The second die is then rolled. If the second die shows a one, two, or three, then the third die is rolled. If the second die shows a four, five, or six, then the second die is rolled again. The second die is continually rolled until the second die shows a 1 through 3. If the second die shows a three and the third die shows a 2 through 6, then the second and third die are rolled again. In other words, the second die will have to be rolled again until it shows a 1 through 3. The third die will also be rolled again under the same circumstances as it had been originally. If, however, the second die shows a three and the third die shows a 1, then the rolling stops. In the end, if the second die shows a 1, then the card rank will be ace if the third die shows a 1, 2 if the third die shows a 2, 3 if the third die shows a 3, four if the third die shows a 4, five if the third die shows a 5, and six if the third dies shows a six. If second die shows a 2, then the card rank will be 7 if the third die shows a 1, 8 if the third die shows a 2, 9 if the third die shows a 3, 10 if the third die shows a 4, jack if the third die shows a 5, and queen if the third die shows a six. If the second die shows a 3 and the third die shows a 1, then the rank of the card will be king. No other dice combinations are possible since the dice would have been re-rolled if such combinations occurred.

It will be appreciated that there may be many other algorithms for transforming data describing one set of enumerated outcomes into data describing another set of enumerated outcomes. Any other such system may be used. Thus, in various embodiments, cards dealt from a shoe may be used to conduct a game of craps. Dice rolled in a basket may be used to conduct a game of video poker. Coin flips may be used to conduct a game of Sic Bo or casino war. In general, any set of outcomes may be used, either individually or in combination, to generate data describing any other set of outcomes.

In some embodiments, a player may select a source and/or algorithm for determining an outcome of a game. For example, a player may choose a particular random number generator from a set of possible random number generators to be used in a particular game. A player may select a source of information that may be used as input to an algorithm, an algorithm to be used, choose between a physical action producing a result and an electronic generation of a virtual result, and so on Verification of Random Event Generators In various embodiments, a player may be engaged in a game that relies upon data from random events. The random events may occur at a location separate from the location of the player. For example, the player may play a game on his mobile gaming device in New Jersey, where such game relies upon random events that occurred in Nevada. The random events may also occur at a different time from the time when the player is playing. For example, a player may play a game of video poker. The cards the player receives may be based on cards dealt three weeks ago from a card shoe in a casino warehouse. The random events may also occur in a different type of game than that being played by the player. For example, the random events may occur in a game of craps, while the player is playing a game of blackjack.

In various embodiments, a player may wish to verify the authenticity of random events which determine the outcomes and payouts of the player's game. For example, if the player repeatedly loses games, the player may come to suspect that the outcomes of his games where not generated fairly. The player may therefore wish to receive some assurance that the outcomes were, in fact, generated fairly.

In various embodiments, a player may request to see verification of an outcome, payout, and/or result of a random event. The player may use one or more input keys, buttons, or devices to request authentication. For example, an area on the touch screen of a player's mobile gaming device may include a button. The button may be labeled "authenticate," "verify game outcome," "check outcome," "view source of outcome," or other labels. The player may touch the button in order to view or otherwise receive information about the outcome, payout and/or result of his game.

In some embodiments, video may be generated depicting the manner by which random events generated the results used in the player's game. For example, when random events are used to generate results, the events may be filmed. For example, the rolling of dice may be filmed. As another example, the dealing of cards may be filmed. The film may be stored, e.g., as a digital file in a database of the casino. The film may be indexed or otherwise labeled in such a way that it is associated with a particular result or event. For example, the file name of a video file may be "Event 93048200 of Dec. 13, 2010".

In various embodiments, a player may request to see video depicting the random events which generated the results used in the player's game. The player may then be shown the video. The video may show cards being dealt, dice being rolled, roulette wheels being spun, or whatever was the source of the results that led to the outcome of the player's game. The video may be transmitted from the casino server to the player's mobile gaming device, for example. The mobile gaming device may show the video to the player on its display screen.

Digitally Signed by an Inspecting Authority

In various embodiments, a random number or description of a random event may be signed by an authority. The signature may take the form of a digital signature. The digital signature may serve as an endorsement or verification by the inspecting authority that the random number or data was randomly generated according to some predefined or pre-established parameters. For example, the digital signature may serve as verification that the random number or random data was in fact randomly generated according to some probability distribution or using some fair physical device (e.g., a fairly balanced die). In various embodiments, a digital signature may be affixed to group or sequence of data. For example, in some embodiments, a digital signature may be affixed to a sequence of 1000 random numbers representing rolls of two dice. The digital signature may serve as verification or endorsement that the numbers are fair.

In various embodiments, the authority may be a gaming regulator, another governmental entity, a commission elected by gaming companies, a non-profit organization, an audit firm, a programming expert, a cryptography expert, or any other authority. The authority may verify the fairness of numbers or random data in a variety of ways. The authority may perform statistical tests to verify that the numbers or data conform to an anticipated statistical distribution. The authority may borrow the computer processor used to generate the data or numbers in the first place. The authority may physically inspect the processor or may use the processor to perform separate tests. The authority may inspect physical devices, such as dice, cards, and roulette wheels in order to make sure such devices are fair (e.g., are equally weighted or balanced). An authority may inspect a card deck, for example, to ensure that the deck contains all the cards it should. In some embodiments, an authority may include a computer program or algorithm. For example, a program may automatically perform tests on groups of random numbers to verify that such numbers follow an anticipated statistical distribution. If the numbers do follow the distribution, then the program may apply a digital signature to the numbers.

Time Stamp Somehow Serves as the Input to a Game

In various embodiments, random numbers or random data may be time stamped. Applying a time stamp to a set of data may include cryptographically encoding an indication of a time together with the data. Thus, through a process of decoding the combined time and random data, it may be verifiable that the data was generated at a particular time.

In various embodiments, information contained in a time stamp may be used as an input into a game. For example, a time indicated by the time stamp (e.g., the time at which the corresponding data was generated) may serve as the input for a game. The time may be used as a seed for a random number generator. Digits or numerals in the time may be used as outcomes in and of themselves. For example, the "tens" digit for the minutes and the "tens" digits for the seconds reading may be used to represent rolls of dice. This may be convenient, because such digits may range from 0 to 5, which can be mapped to the numbers 1 through 6 on a typical die. As will be appreciated, a time reading may be used in various other fashions to provide game inputs.

In various embodiments, a date may be stamped onto one or more random outcomes or onto random data. A date may be incorporated into a time stamp, for example.

Hash Identity of Player Who Generated Data with the Data Itself

In various embodiments, the identity of a player (e.g., of a primary player) who achieved a particular outcome, who was present while certain data was generated, or who was otherwise connected to the generation of data, may be tied to the data. For example, a set of random data that was generated in the games of a particular primary player may be tied or linked to the identity of the particular primary player. The linking process may involve hashing algorithms, cryptographic algorithms, algorithms for digital signatures, or other algorithms or processes. For example, identifying data for the primary player (e.g., a name written in ordinary letters; e.g., a player tracking card number) may be combined with the randomly generated data. The combined data may be used as input to a hashing algorithm in order to generate a condensed output data string. Meanwhile, plaintext version of the combined identifying data and random data may be maintained. By reapplying the hashing algorithm to the plaintext version, it should be possible to verify that the same hash key is generated. Thus, if the plaintext version of the combined identifying data and the randomly generated data are kept together with the hash key, it may be mathematically verifiable that the particular primary player was the one who was linked to that random data. As will be appreciated, many other algorithms may be used to associate a player with randomly generated data or with other data, including gaming related data.

Auditing

Various methods may be used to verify one or more of the following: (a) a particular outcome or other data was generated fairly; (b) a particular outcome or other data was generated in a particular game; (c) a particular outcome or other data was generated at a particular time; (d) a particular outcome or other data was generated by a particular person.

Game stores separate record of all outcomes generated (server can too)

Statistical Checks

Video

In various embodiments, video footage may be captured of the outcome generation. The video footage may include footage of a gaming table, footage of a slot machine, footage of a gaming device, footage of a mobile gaming device, footage of a betting terminal, or any other footage. In some embodiments, video footage may be captured of a screen of computer, such as where the computer is being used to generate outcomes and outputs of the generating program are sent to the computer screen.

In various embodiments, video footage may capture salient information related to the time, place, people, or other circumstances involved with generating an outcome. A gaming table may have a unique identifier or distinctive pattern featured at the table. Video footage of the gaming table may capture the unique identifier. Thus, any outcomes shown in the video can be tied to that gaming table. Similarly, in various embodiments, a slot machine or other gaming device or other device may include a unique identifier or another distinctive feature. The identifier or distinctive feature may appear in video footage of the gaming device. Thus, outcomes in the video may be tied to the gaming device.

In various embodiments, video footage may capture a person involved in generating an outcome. The person may be a dealer, croupier, other casino employee, or other person. The person may wear a name tag, a badge, or other means of identification. The person's face may be visible in the video. Using any of these or other identifying features, a person in a video may be tied to the generation of an outcome.

In various embodiments, a distinctive feature of a place may be captured in a video. For example, a casino may have a unique painting, window design, sculpture, tile pattern, architectural feature, or other unique or distinctive feature. Such features may be captured by a video when footage of outcomes is captured. The presence of distinctive features in the video may allow the outcome appearing in the video to be tied to a particular place.

In various embodiments, video footage may include a time indicator. Thus, video footage may include footage of a clock, footage of a window or the outside (where, for example, time may be approximated from the lighting), footage of an area with foot traffic that varies by time of day (e.g., footage of an eating area), or any other video footage that may provide an indication of time. From such video footage, an outcome or other data may be tied to a time.

Random Seed Stored

In various embodiments, a seed used to generate an outcome, random number, or other data may be stored. The outcome may be generated from the seed according to an outcome generating algorithm. The seed may be stored in conjunction with the outcome. Thus, at a later time, it may be possible to apply the same outcome generating algorithm to the seed in order to yield the same outcome.

Time Stamp

In various embodiments, a time stamp may be applied to an outcome or to other random data or to other data. In creating a time stamp, a text description of the outcome or data may be combined with a text description of a time, e.g., the time during which the outcome was generated. The combined text may be encrypted with a private key of trusted authority (e.g., of the casino which as generated the outcome or random data). The encrypted bundle of time and outcome may then be decrypted with the public key of the trusted authority. This may allow verification that outcome is authentic and was generated at the indicated time.

Other Stamps

In various embodiments, information about a person who has generated an outcome may be cryptographically tied with an outcome or other random data or other data. In various embodiments, the name of a player (e.g., a primary player) who played a game in which an outcome was generated may be tied to an outcome. A text description of the outcome may be combined with the player's name, written in text. The two may be encrypted together using a private key of a trusted authority (e.g., of a casino). By later decrypting the combined bundle of outcome and name using the trusted authority's public key, it may be verified that the outcome and name are in fact tied together.

In a similar fashion, information about an outcome, random data, or other data may be bundled with information about a place, a game, or any other pertinent information. The bundle may be encrypted using a private key. Other digital signature protocols may also be used.

Player Requests Verification

In various embodiments, a player may wish to check the circumstances under which an outcome was generated. A player may first request to see details, such as the time or place where the outcome was generated. A gaming device, mobile gaming device, or other device may have these details stored in conjunction with the outcome, and so may present the details to the player. However, the player may wish for further verification. Thus, the gaming device (or other device) may recall a digitally signed version of the outcome coupled with other details. The gaming device may show the player a representation of the digitally signed details, such as a string of bits. Of course, the string of bits may be unintelligible to the player. However, the gaming device may then graphically represent a process of decryption, e.g., where a public key of a trusted authority is being used to convert the string of bits into a plaintext description of the outcome and other details pertaining to the outcome. The representation of the process may take the form of a graphic or animation, such as an animation of a person unlocking a safe. When the safe is unlocked, the person removes a document which shows, e.g., a description or illustration of the outcome together with a description of a time, place, or other details surrounding the generation of the outcome.

In various embodiments, a player may summon a casino representative. The player may ask the casino representative to verify the circumstances of an outcome's generation. The casino representative may insert a card, USB drive, or other object into the player's gaming device. The object inserted may store a public key or other key which may be used to reveal the plaintext of a digitally signed document. In this way, a digitally signed document containing details surrounding an outcome's generation may be revealed to the player.

Video Tagging

In various embodiments, video footage of an outcome may be made as the outcome is generated. For example, video footage may be taken of a table game as cards or dealt, as dice are rolled, or as a roulette wheel is spun and comes to rest. Video footage may also be taken of gaming devices as they generate outcomes. Video may be captured by security cameras, by cameras dedicated to filming games, or by other cameras or image capturing devices. In various embodiments, an animation or cartoon may be stored which illustrates the generation of an outcome, though the animation may not be actual video footage. Rather, the animation may be an illustrative representation of the generation of an outcome.

In various embodiments, video footage may be provided with various tags. Tags may include or may represent information about the video footage and/or about the contents of the video footage. A tag may indicate one or more of: (a) a time the footage was taken; (b) a place the footage was taken; (c) an outcome that appears in the footage; (d) an amount won in a game that appears in the footage; (e) a first set of cards shown in the footage; (f) a second set of cards shown in the footage; (g) an amount of a bet that was made for the game depicted in the footage; (h) a length of the video footage; (i) a speed of the video footage (e.g., true action; e.g., slow motion); (j) an identity of a person in the footage; (k) a role of a person in the footage (e.g., player; e.g., dealer; e.g., spectator; e.g., attendant); (l) an identifier of a gaming device shown in the footage; (m) a description of the game shown in the footage (e.g., jacks or better video poker; e.g., Pyramid Craze Slot Machines); (n) a strategy used in the game shown in the footage; or any other information related to the footage.

Tags may be used to index and/or to search the video footage. Tags may also be used to tie video footage to a particular outcome. For example, a secondary player may receive a particular outcome that had previously been generated in the game of the primary player. If the secondary player wishes to view video footage of the generation of the outcome, the video footage may be retrieved because a tag in the video footage indicates that the video footage is of the pertinent outcome.

Video footage may be searched based on a number of search criteria. A player or other party may wish to watch video footage of all outcomes generated at a particular gaming device during a particular one-hour period. A player or other party may wish to watch video footage of all jackpot outcomes that were generated across a casino within the past day. A player may wish to watch video footage of all the outcomes generated by a particular primary player. Such requests or desires may be satisfied based on a tag search of video footage, for example.

The process of tagging videos may occur in various ways. In some embodiments, a person, such as a casino employee, may manually watch videos and record information from the videos (e.g., outcomes that occurred). In various embodiments, a device that was involved in generating a particular outcome may record information about the outcome, information about the player using the gaming device (e.g., using information obtained from a player tracking card), time and date information, and any other information. The gaming device may transmit such information to a casino server. The casino server may receive video footage that was taken of the gaming device. The casino server may recognize that the video footage and the information received from the gaming device represent the same event (e.g., because the footage was taken at the time that the event was noted to occur; e.g., because the camera which took the footage is known to point at the gaming device). The casino server may then associate the video footage with the information.

Random Number Generators

In various embodiments, players may play or participate in games that utilize or are based on random number generators. The random number generators may use a physical or mechanical process, such as the rolling of dice, spinning of a wheel, the shuffling of cards, or the spinning of reels, for example. The random number generators may use an electronic process, such as a computer algorithm for random number generation. Random numbers may be generated in the context of an actual game (e.g., where a primary player has real money at risk), or in an isolated environment, for example.

A player who plays at a betting terminal, a mobile gaming device, or at another device may utilize random numbers or random outcomes that have not been generated at his own device. For example, a player with a mobile gaming device may utilize random numbers that have been generated at a stationary gaming device.

In various embodiments, a player may utilize (e.g., in his games) random numbers from more than one origin. For example, a player at a mobile gaming device may play a first game that generates an outcome based on a random number received from a first stationary gaming device. The player may then play a second game that generates an outcome based on a random number received from a second, different stationary gaming device. In similar fashion, the player may play a number of different games. For each game, a random number may be received from a different source (e.g., from a different random number generator). In various embodiments, sources may be reused. For example, a player's mobile gaming device may obtain random numbers from any one of ten different random number generators. However, after playing a large number of games, the player may have received multiple random numbers from each source.

In various embodiments, a random number generator may be unavailable to provide a player with random numbers. For example, a gaming device may be in use by a first player, and certain regulations or procedures may preclude use of the same gaming device to provide random numbers to a second player. Thus, in various embodiments, a casino server (or other entity) may determine when one or more random number generators that are available to provide random numbers to a given player. The casino server may then direct one or more of such random number generators to provide the player (e.g., the player's mobile gaming device) with one or more random numbers. The casino server may itself relay the random numbers to the player. The casino server may determine an available random number generator based on one or more of the following criteria: (a) the random number generator is not currently generating random numbers for a player; (b) the random number generator is powered on (e.g., the random number generator is part of a stationary gaming device); (c) the random number generator has an attendant (e.g., a casino employee is present to roll dice to generate random dice rolls); and/or any other criteria.

In various embodiments, a casino server or other entity may select a random number generator based on the type of random numbers that are required for a player's purposes and based on the types of random numbers that can be provided by the random number generator. For example, if the player wishes to play a game of craps, a generator may generate numbers corresponding to the role of two dice.

In various embodiments, the use by a player of more than one random number generator reduces the chances that a player or that a casino will be harmed by a faulty (e.g., biased) random number generator.

In various embodiments, the same random number generator may be used to supply random numbers for multiple different games. The games may be of different types. For example, one of the games may be craps. Another of the games may be video poker. In various embodiments, the same random number may be supplied to two players playing different types of games. Where the same random number is used for different games, the risk that a faulty random number generator will simultaneously work to the disadvantage of all players is reduced. Similarly, where the same random number is used for different games, the risk that a faulty random number generator will simultaneously work to the advantage of all players (and thus to the disadvantage of the casino) is reduced.

Variable Inputs to Outcome Generators

In various embodiments, a machine, device, or other entity that generates random outcomes may be under the control of a player. The control may be either direct or indirect. For example, a player may have the opportunity to physically spin a roulette wheel so as to generate a random roulette outcome. For example, the player may have the opportunity to physically jostle a basket with dice so as to generate a new roll of the dice. A player may exert indirect control over a machine that generates random outcomes by sending commands to the machine. Commands may be sent via a terminal, such as via a mobile device. For example, a player may press a button at a remote terminal that instructs a machine-controlled roulette wheel to spin. The remote terminal may relay the request of the player to the casino server. The casino server may, in turn, instruct the machine controlling the roulette wheel to spin the roulette wheel.

In various embodiments, a player may not only issue commands to generate an outcome but may also issue commands as to how the outcome should be generated. The player may specify, for example, a degree of physical force that will be applied with an outcome generating device. For example, a player may specify that speed (e.g., in terms of revolutions per second) with which a roulette wheel will be spun. A player may specify that amount of time that a basket with dice will be shaken before the dice are allowed to come to rest. A player may specify the amount of timecards must be shuffled before they can be dealt. Thus, in various embodiments, a player may specify inputs that fall along a range of possible inputs. For example, the speed or the force with which a roulette wheel is spun may vary over a continuous range. The player may specify a speed or force. The player may specify a force using a dial, a mouse, or another input device which can provide a continuous range of inputs. For example, a player may use a mouse to manipulate the level of a bar on a display screen of the terminal. If the bar is at a high level, then a roulette wheel will be spun with a high initial speed. If the bar is at a low level, then the bar will be spun with a low initial speed.

In various embodiments, a player's status may determine what kind of control he is allowed to exert over an outcome generating device. For example, in various embodiments, if a player is a high-roller (e.g., if the player places more than a predetermined total amount of wagers per visit to a casino), then the player may be allowed to define a variable input into an outcome generating device. However, a player who is not a high-roller may be allowed only to tell a device whether or not to generate an outcome.

Index of Gaming Data

In various embodiments one or more statistics may be used to summarize a set of games, outcomes, player earnings, or other occurrences at a casino. The statistic may be called an index. Thus, for example, there may be a "Roulette Red Index" which summarizes the proportion of the time that roulette wheels across the casino have landed on red in a given time period. There may be a "Blackjack Index" which summarizes the proportion of times that a Blackjack has been dealt to a player across the casino. Other indexes may summarize data about: (a) the number of times a particular outcome has occurred (e.g., the number of times the a jackpot outcome has occurred); (b) the amount of money one or more players have won (e.g., the average amount of money slot machine players have won in the last hour); (c) the number of times a particular symbol has occurred (e.g., the number of times a "cherry" symbol has occurred at a bank of slot machines); (d) the number of times a particular intermediate outcome has occurred (e.g., the number of times a particular starting hand of video poker has occurred); (e) the number of times a player has achieved a certain hand (e.g., the number of times a player of Texas Hold'em has achieved a full-house; e.g., the number of times a player at blackjack has achieved a point total of 20); (f) the number of times a dealer has achieved a certain outcome (e.g., the number of times a dealer has achieved a point total of 20 in a game of blackjack); (h) the number of times a particular score has been reached in a game of sports (e.g., in a game of sports on which players can bet in a sports book); (i) the number of players who have won more than $100; and so on. An index may summarize data from a given time period, such as from the current day. For example, an index may summarize the proportion of times that a seven has been rolled on the first roll in craps during the current day. An index may summarize data in absolute numbers. For example, an index may describe the total number of spins at a roulette wheel that have resulted in the number 12 during the current day. Such an index may be called the "12" index, for example. An index may summarize data as a proportion. The index may indicate a ratio of the occurrence of one outcome to the occurrence of another outcome. The index may indicate the ratio of the occurrence of one outcome to a number of games played. For example, an index value of 2.7% may indicate that the number 12 has occurred in 2.7% of roulette spins during the current day.

In various embodiments, an index may summarize data from a particular area of a casino. For example, an index may summarize player winnings from the first floor of a casino, or from a particular bank of slot machines. An index may summarize data from a particular type of machine. An index may summarize data from slot machines. An index may summarize data from video poker machines. An index may summarize data from table games. An index may summarize data from progressive slot machines. An index may summarize data from video slot machines.

In various embodiments, an index may include a weighting of certain events, games, or outcomes over others. An outcome may be weighted depending on the number of bets that have been placed on it. For example, if the number 17 occurs at a roulette wheel with 5 people playing, the "17" index may increase by 5 times as much as does the "8" index when it occurs at another roulette wheel at which only one person is betting. In various embodiments, game or outcome may be weighted in the index based on the size of the wager placed on the game or index. For example, if a person bets $100 and receives a blackjack, a "blackjack" index may go up by 10 times as much as it would when a person places a $10 bet and receives a blackjack. A game or outcome may also be weighted according to the size of one or more payouts that are possible in the game. For example, an outcome at a game which has a jackpot of $10,000 may receive twice the weighting as does an outcome which has a jackpot of $5,000.

In various embodiments, there may be an index associated with a particular player. For example, a primary player may have an index. A secondary player may decide whether or not to participate in the games of the primary player based on the level of the index.

In some embodiments, there may be an index for a group of players. For example, there may be an index for all players within a certain age range, for all people from a certain geographic location, for all people of a certain gender, for all people that prefer a particular type of game (e.g., blackjack), and so on. In some embodiments, there may be an index for groups of players based on their amounts wagered. For example, a "large cap" index may summarize statistics about players who bet $25 or more per game. A "small cap" index may summarize statistics about all other players.

Improved Odds and Commission

In various embodiments, a player may be given improved payout odds on a game in return for paying a fixed commission. For example, in a game of roulette, a player who has bet $1 on a winning number might typically receive his $1 back plus an additional $35. In some embodiments, the payout for achieving a winning number in a game of roulette might increase to $37. In this way, a player could expect to lose $1 with probability 37/38, and to make $37 with probability 1/38, assuming an American roulette wheel with 38 spaces on it. The player would thus have expected winnings and expected losses of 0, making the bet a bet with true odds. However, in general, a casino may wish to maintain a house advantage on a bet so as to generate profits for the casino. Accordingly, the casino may offer a payout of $37 when the player wins but may charge the player a $2 commission whenever the player wins. Thus, the casino may maintain a house advantage by charging a commission even though the bet was made at true odds.

Thus, in various embodiments, a player may place a bet with true odds. In other words, a player may place a bet such that his expectation from the game is zero. However, for one or more outcomes, the player may owe a commission to the casino. The commission may be deducted from the amount paid in a winning outcome.

In various embodiments, a player may make a bet with a positive expectation. In other words, the player may make a bet such that the player has an advantage, i.e., such that the player can expect to win, on average, more than the amount of his bet. However, the house may profit from the game by charging a commission to play the game. The commission may exceed the amount that the player might expect to profit from the game. For example, a player may make a $1 bet in a game in which the player can expect to win $1.05, on average. Thus, the player has an advantage in the game. However, the casino may charge the player a $0.10 commission to play the game. Thus, accounting for the commission, the casino will still be able to profit from the game, on average.

In some embodiments, a player may make a bet in a game in which the player is guaranteed to win back more than the amount of his bet. For example, if the player places a bet of $1, the player may be guaranteed to win back at least $1.05, for a net profit of $0.05. However, the player may be charged a commission for the game. For example, the commission may be equal to $1.05. The commission may serve to make the game profitable for the casino when the commission is taken into account.

Displaying Data

Any data generated or gathered at a casino or from any other source may be displayed to one or more players. The data may also be displayed for viewing by one or more casino representatives. Data may also be communicated in other ways, such as through announcements over a public address system, or such as over radio waves. As described herein, the data displayed may include data about historical outcomes, summary statistics, data about the performance of one or more players, data about the performance of one or more gaming devices, data about the performances of one or more dealers, data about the size of one or more jackpots, data about data trends, data about one or more outcomes, data about one or more historical outcomes, and so on.

Data may be displayed in a number of areas. Data may be displayed: (a) on the display screens of gaming devices (e.g., on the display screens of gaming devices that are not currently in use); (b) on wall-mounted monitors; (c) on electronic signs; (d) on walls, ceilings, or other services via projection displays; (e) on the screens of terminals at which secondary players participate in games; (f) on the screens of mobile devices; (g) on the televisions screens of hotel-room televisions; (h) on display screens inside elevators; and so on. Data or representations of data (e.g., graphs, tables, etc.) may be printed on paper or other materials and may be distributed or otherwise made available. Data may be printed on restaurant menus. For example, a restaurant menu may feature the name of the primary player who won the most consecutive games of blackjack during the day. Data may be posted on signs located above gaming devices. For example, a sign above a gaming device may indicate that the gaming device has paid out more than $2000 in the past 24 hours. Data may be displayed on signs located above banks of gaming devices. For example, above a bank of gaming devices, a sign may indicate the name of the player who has had the best record of winnings at the bank of gaming devices within the past 24 hours.

In various embodiments, data gathered or recorded may be made available on a network, such as on the Internet. A person may access the data by going to a particular address on the network, such as to a particular Uniform Resource Locator (URL) address. The address may contain data viewable in a particular format, such as in HTML format. The data may be accessible by an Internet browser, such as via Internet Explorer®. In various embodiments, data may be accessible through various links. Each link may lead to a different address on the network. A given link may provide access to data of a certain type. For example, a given link may lead to data about individual players' performances. Another link might provide access to data about the performances of gaming devices. Another link might provide access to data about the performance of a dealer. In various embodiments, a first link might lead to data gathered at a first casino (e.g., data about games at the first casino) and a second link might lead to data gathered at a second casino.

In various embodiments, a casino that is associated with a hotel might transmit gaming data over one or more television channels. For example, a channel on a cable television system might be devoted to providing or displaying casino data. In some embodiments, a first channel might be devoted to a first type of data, a second channel to a second type of data, and so on. For example, a first channel might display data about the outcomes generated at a set of blackjack tables. A second channel might display data about the outcomes generated at a set of roulette tables.

In various embodiments, data may be displayed with a certain prominence if the data is of a certain level of significance. For example, a casino may contain a large sign in a central location that is widely visible throughout the casino. The sign may be used to display only the most significant data. For example, the sign may display the last ten people to have won more than $1000. The casino may contain further signs in less prominent locations. For example, a digital sign may be visible only in the general area of a particular bank of slot machines. The sign may display the names of the last ten players to win more than $100 at the bank of slot machines. Thus, in various embodiments, data may be displayed at a particular location if the data has been gathered in the vicinity, such as at nearby gaming devices or table games.

In various embodiments, deductions or conclusions based on data may be displayed. For example, suppose that during the last 15 minutes, blackjack players across a casino have won 60% of the blackjack games played. The deduction may be made that blackjack players in general are on a hot streak. Thus, a message may be displayed (e.g., on a sign; e.g., on the screen of a mobile device; e.g., on the screen of a terminal) that blackjack players are hot. Examples of other messages include, "Dealer Joe Smith is dealing great hands tonight," "Sue Baker is having the night of her life," "Red is the in color at roulette," "Billy Bob just won a doozy of a jackpot at slots," "Sue Smith is going home rich tonight," and so on.

In various embodiments, data may be printed on pamphlets, receipts, or other paper document or material. A player or other person may desire a certain type of data. For example, a player may wish to have a record of his own outcomes for a period of time. For example, a player may wish to have a record of all the hands of video poker he has been dealt throughout the day. Accordingly, the player may request such a record. For example, the player might go to a casino cage and provide identification (e.g., in the form of a player tracking card). The casino cage may access data stored about the player on the casino server. The casino may then print out data about the player's outcomes from the day. The casino may then provide the player with the records. In various embodiments, a first person might wish to have a record of data about one or more other people. For example, the person might want a pamphlet showing the results of the top 100 players at the casino for the day. The pamphlet might show a name or alias of each of the 100 people together with an amount won by each person. In various embodiments, a person might want a record about a particular machine, a particular dealer, a particular sector of a casino, a particular gaming table, or a particular group of people. The record may contain data about the requested people, device, or entity, such data including outcomes achieved, winnings, losses, number of games won in a row, number of games lost in a row, strategy used, and so on.

In various embodiments, an alert may be generated based on events or outcomes that occur in a game or at a casino. For example, a secondary player may wish to be alerted when any primary player has won more than 5 games in a row at a slot machine. Accordingly, the casino server, the device of the secondary player (e.g., a mobile gaming device), or any other device, may track data as it is received (e.g., from gaming devices). The casino server may process the data and determine whether alert criteria have been met. For example, the casino server may determine whether a win for a primary player constitutes a fifth consecutive win by examining data from the most recent game of the primary player plus data from the four prior games of the primary player. If all of the games were winning games for the primary player, then the casino server may generate an alert for the secondary player. An alert may take the form of a message transmitted to a secondary player. For example, a text message may pop up on the screen of a mobile gaming device of the secondary player. An alert may also be displayed or broadcast for a wider audience. For example, an alert may be broadcast on an electronic sign hanging in a casino. An alert may also be broadcast over radio or other channel for audio broadcasts.

Trends

In various embodiments, a trend may comprise a set of games or outcomes that have a common characteristic and which occur proximate in time and/or which occur consecutively. Common characteristics of outcomes may include: (a) the outcomes are all the same; (b) the outcomes have one or more common symbols; (c) the outcomes have the same associated payout; (d) the outcomes have a positive associated payout; (d) the outcome all have a payout above a certain level (e.g., above 10 units); (e) the outcomes all lead to bonus rounds; (f) the outcomes are all losing outcomes; (g) the outcomes are all winning outcomes; (h) the outcomes are all near-misses; and so on. Common characteristics of games may include: (a) the games have the same outcome; (b) the games have the same payout; (c) the games have a common intermediate outcome (e.g., games of video poker all start out with three cards to a flush); (d) the games all have winning payouts; (e) the games all have losing payouts; (f) the games each contain multiple winning outcomes; (g) the games all reached bonus rounds; (h) the games were all near-misses, and so on.

In various embodiments, a player may bet that a trend will continue. A player may bet that an outcome which will be generated in the future will share a common characteristic with a set of outcomes that had been generated in the past. For example, a player may bet that the same outcome which has occurred in the last five games at a craps table (e.g., the pass line has won) will occur in the sixth game. For example, a player may bet that a point total that a dealer has achieved in the last 5 games of blackjack (e.g., a point total of 18) will be achieved by a dealer in the next game of blackjack. In various embodiments, a player may bet that a trend will continue for a particular length of time. For example, a player may bet that a trend will continue for three more games. A player may bet on the exact number of games for which a trend will continue. For example, a player may bet that a trend will continue for the next two games before the trend is broken. A player may bet on a minimum number of games for which a trend will continue. For example, a player may bet that a trend will continue for a minimum of the next five games. A player may also bet on the maximum number of games that a trend will continue. For example, a player may bet that a trend will continue for no more than 3 games. In various embodiments, a player may bet that a trend will not continue. The player may bet that an outcome which will be generated in the future will not share a common characteristic with a set of outcomes that had been generated in the past.

In various embodiments, a player may bet on the continuance or discontinuance of a trend that had occurred in the past. For example, a secondary player may find a series of consecutive games of roulette played by a primary player in which the outcome was red for 10 consecutive games. The secondary player may not be informed of the results of the game following the 10 consecutive games of red. However, the results of the 11th game may be on record (e.g., in a memory of the casino server). The secondary player may then place a bet on the continuance of the trend. For example, the secondary player may place a bet that the 11th game also resulted in a red outcome. For example, the secondary player may place a bet that the next five games also resulted in a red outcome. The secondary player may also bet on the discontinuance of the trend. For example, the secondary player may bet that the 11th game would not result in a red outcome.

In various embodiments, a trend may describe a number of consecutive wins or a number of consecutive losses. The consecutive wins or losses may represent those of a player, those of a dealer, those of a particular gaming device and/or those of a particular type of game. For example, a statistic may describe the number of consecutive games that have been won at a particular slot machine, regardless of who has played those games. For example, a statistic may describe the number of consecutive games that a dealer has won at a blackjack table. A player, such as a secondary player, may bet on the continuance or the discontinuance of a trend of consecutive winnings and losses. For example, a secondary player may bet that a primary player who has just lost 10 games in a row will lose the 11th game in a row. For example, a secondary player may bet that a craps game will end up with the pass-line bet losing even though the pass-line bet has won for the past 10 games.

In various embodiments, a trend may describe a regular pattern of characteristics among a series of outcomes. The pattern of characteristics need not be such that each outcome has the same characteristic. Rather, the pattern may indicate a regularly varying set of characteristics. For example, a trend may consist of a series of outcomes at a roulette wheel such that every second outcome is a red outcome, and every outcome between red outcomes is a black outcome. In other words, the trend represents a pattern whereby after each red outcome a black outcome occurs, and after each black outcome a red outcome occurs. A player, such as a secondary player, may bet on the continuance of such a trend. For example, if the most recent outcome has been a red outcome, then the player may bet that the next outcome will be a black outcome. A player may bet that such a trend will continue for multiple outcomes. For example, a player may bet that outcomes will alternate between red and black for the next 10 consecutive outcomes.

In various embodiments, a trend may include any pattern. A player may bet on the continuance or discontinuance of any pattern. The player may bet that a pattern will continue for any number of games in the future, or that the pattern will discontinue at a designated point in the future. A payout provided to a player who has bet correctly may depend on the nature of the pattern and on the number of games or outcomes into the future that the player has bet the pattern will continue. For example, a winning player who has bet that a pattern will continue relatively far into the future may receive a higher payout than does a player who has bet that a pattern will continue one or only a few games into the future. For example, if each outcome that would continue a pattern is a relatively rare outcome (e.g., the player has bet that a pattern of green outcomes occurring will continue at a roulette wheel), then the player may receive a larger payout than does a player who bets on the continuation of a pattern with relatively common outcomes (e.g., a pattern of blackjack games where the dealer wins).

In various embodiments, a secondary player may bet on a trend or pattern in the winnings of a primary player. For example, a secondary player may bet that a primary player will have positive net winnings for each of the next four five-minute periods. The primary player may have achieved positive net winnings for the prior 10 five-minute periods, or the secondary player may simply be betting on a new trend occurring. In various embodiments, a secondary player may bet on a trend in a primary player's balance or bankroll. For example, a secondary player may bet that a primary player's bankroll will increase in every ten minute period for the next hour. In various embodiments, a secondary player may bet on a see-saw trend in the winnings or in the bankroll of a primary player. For example, a secondary player may bet that the bankroll of a primary player will increase in the next five-minute period, decrease in the following five-minute period, then increase in the following five-minute period, and so on. In various embodiments, a secondary player may bet that the bankroll of a primary player (or the bankroll of another secondary player) will reach certain points, one after the other. There may, however, be no particular designated time period when the bankroll has to reach the points. For example, a secondary player may bet that the bankroll of a primary player will reach 100, then will reach 50, then will reach 150, then will reach 25, then will reach 155, and so on. The secondary player may win if the primary player's bankroll reaches those points in order. However, the secondary player may lose his bet if the bankroll of the primary player reaches the points out of order. For example, the secondary player may lose his bet if the primary player's bankroll reaches 155 before it reaches 25. Embodiments described herein with respect to a bankroll may also apply to a balance at a gaming device, to an amount of chips at a gaming table, to an amount of net winnings, and so on. For example, a secondary player may bet that the net winnings of a primary player will reach a first point, followed by a second point, followed by a third point, and so on.

Sports

In various embodiments, data may be gathered for sports. For example, data may include a sports score, a number of yards rushed by a particular player in a game of football, a number of runs hit by a particular baseball player, a number of aces served by a tennis player, a number under par achieved by a golf player, and so on. Data may be aggregated over various games. For example, the total runs hit by any player in major league baseball during a particular day may be added up and may define the value of a statistic. A secondary player may bet on values of the statistic. Other exemplary data may include the number of punches connected in a boxing match, the number or three-pointers shot in a game of basketball, the number of collisions in a car race, and so on.

Secondary Player Chooses a Characteristic of a Game

In various embodiments, a secondary player may designate a category for a game of a primary player in which to participate, such that a game falling into the category has certain characteristics. The game may be a game with a certain beginning state. The game may be a game for which certain resolutions have occurred for events in the game. In some embodiments, a secondary player may designate a particular starting hand or category of starting hand in a game of video poker. For example, a secondary player may designate a hand that includes three cards of the same rank. Accordingly, the casino server may search for a game of a primary player which has featured a starting hand with three cards of the same rank. In some embodiments, the secondary player may designate a particular starting point total in a game of blackjack. Accordingly, the casino server may search for a game of a primary player which has featured a starting hand with the particular starting point total. For example, a secondary player may designate a particular dealer up-card in a game of blackjack. Accordingly, the casino server may search for a game of a primary player in which the designated dealer up-card has been dealt. In some embodiments, a secondary player may designate a category of game at a slot machine in which a "cherry" symbol has occurred on the first reel of the slot machine. Accordingly, the casino server may search for a game of a primary player in which a "cherry" symbol has occurred on the first reel of the slot machine. In various embodiments, a secondary player may place a constraint on games in which he wishes to participate. The casino server may then find one or more games for the secondary player meeting such constraints. In some embodiments, the secondary player may place a constraint such that the primary player has won at least X amount in the game. In some embodiments, the secondary player may place a constraint on the game such that the primary player has received a particular card in the game. As will be appreciated, many other constraints may be placed on the game.

Adjusting Game Rules for a Game that has been Chosen for a Particular Characteristic In various embodiments, a category of game that a secondary player has designated may have an increased likelihood of ending with a particular outcome than does a game chosen purely at random. In various embodiments, a category of game that a secondary player has designated may have an increased likelihood of ending with a particular outcome than does a game started from scratch. For example, if a secondary player indicates a desire to participate in a slot machine game where the first symbol is "cherry," then the secondary player may be more likely to finish the game with a winning outcome than he would be had he participated in a game started from scratch. For example, if a secondary player indicates a desire to participate in a video poker game where the initial hand contains three cards of the same rank, then the secondary player is guaranteed, if he so desires, to finish the game with three-of-a-kind.

Thus, in various embodiments, when a secondary player has the opportunity to participate in a certain category of game designated by the secondary player, the secondary player may derive an increased advantage in the game, all else being equal. For example, the secondary player may assure that he will participate in a winning game by designating a category of game that will always be winning. In various embodiments, the house may alter a game chosen according to a secondary player's designation in such a way as to increase the house advantage in the game. The house may alter the game in such a way as to provide the house with an equal or approximately equal advantage to what the house would have had if a game had been started from scratch. For example, if the house normally has an advantage of 5% in a slot machine game, and a secondary player chooses to play a particular game in which a "cherry" symbol will occur on the first reel, then the house may alter the probabilities of various subsequent symbols, payouts associated with one or more outcomes, or required bet amounts in such a way as to maintain the house advantage for the game near 5%.

In some embodiments, a secondary player may choose a constraint on a game. For example, a secondary player may apply a constraint on a game such that the game must be a game of blackjack in which the initial hand has a point total of 11. The house may make an alteration to the game such that the probabilities of various outcomes of the games shift in the favor of the house. For example, in the aforementioned example of a blackjack game in which the initial primary player hand has a point total of 11, the house may alter the remaining portion of the deck of cards by removing all ten-valued cards. This may shift the advantage towards the house (though not necessarily make the house the favorite) because it would lessen the player's chance of achieving 21 points and would also lessen the dealer's chance of busting. Thus, the house may have made an alteration to the game that decreases the player's chance of achieving a particular outcome or category of outcome. At the same time, the alteration may increase the player's chance of achieving a particular outcome or category of outcome (e.g., a hand with less than a 21 point total). In various embodiments, the house may make an alteration to a game in order to increase or decrease the probability of one or more outcomes. In various embodiments, the house may alter a probability directly (e.g., by changing probabilities used in a random number generator used to create game outcomes), or may make an alteration which has the effect of altering a probability of an outcome (e.g., the house adds or removes cards from a deck of cards which has the effect of changing the probability of an outcome).

In some embodiments, a payout associated with an outcome may change. For example, suppose a secondary player indicates a desire to participate in a game in which the point total for the primary player's initial hand was 11. In response, the house may reduce the payout associated with a player win. Rather than paying $10, for example, a winning outcome may only pay $10.

In some embodiments, a required bet amount may change. For example, suppose a secondary player wishes to participate in a slot machine game in which the first two symbols are "bell" symbols. Rather than requiring the secondary player to bet $1, as might be typical for the game, the house may require the secondary player to bet $5. Meanwhile, the payouts may not change vis-à-vis a game in which the secondary player set no particular constraint.

In some embodiments, a rule of the game may change. For example, a secondary player wishes to participate in a game of blackjack in which the dealer begins with a point total of 13. A rule may change which allows the dealer to make any decision at any time, including hitting with an 18 if a player has a 19. By changing a rule of a game, the house may effectively alter the probabilities of one or more outcomes.

In some embodiments, a payout ratio may change. For example, a particular outcome may pay 5 to 1 given a constraint imposed by a secondary player, whereas ordinarily the same outcome might pay 20 to 1.

In various embodiments, changes made to rules, probabilities, payouts, and payout ratios may favor the player. For example, the secondary player may apply a constraint to a game which is unfavorable to the secondary player. For example, the secondary player may indicate a desire to participate in a game of blackjack where he begins with a point total of 15, with no aces. Such a starting hand is considered a bad hand and significantly lowers the secondary player's chances of winning. According, for example, a payout associated with a player win may be increased so as to compensate the secondary player for the disadvantageous starting hand.

It should be recognized that while some example embodiments may refer to a secondary player and/or a secondary game, some embodiments may not include such a secondary game and/or player, but rather some embodiments may include a single game and/or player. For example, a single player may select to play a game having a desired set of opening cards and/or other characteristics. That game may not be a game played by another player, but as an alternative may be a game generated for the player.

In various embodiments, a secondary player may indicate desired odds for achieving one or more outcomes in a game. In various embodiments, a secondary player may indicate desired odds for achieving any of a set of outcomes, such as desired odds for achieving any winning outcome. For example, a secondary player may indicate that he wants his odds of achieving a winning outcome to be 1:2, i.e., he wishes to achieve one winning outcome for every two losing outcomes, on average. The casino may accordingly select a set of games of a primary player such that within the set of games, there is one winning game for every two losing games. The casino may then randomly select a game from among the set of games and allow the secondary player to participate in the selected game. In various embodiments, the casino may adjust or determine a payout of an outcome of a game in response to the secondary player selecting the odds for an outcome of the game. Note that the payout adjustment need not necessarily occur for the same outcome for which the secondary player has selected odds. For example, the secondary player may indicate desired odds for a first outcome and the casino may adjust the payout for a second outcome. In various embodiments, the casino may adjust the payout for one or more outcomes so as to counteract the advantage that the secondary player may obtain from selecting the odds of an outcome. For example, if the secondary player indicates desired odds for achieving an outcome, where such odds are greater than the standard or typical odds of achieving such outcome, then the casino may reduce a payout for one or more outcomes from what the typical payout would be. If a secondary player indicates desired odds for an outcome, where such odds work to the secondary player's disadvantage (e.g., the secondary player has indicated desired odds for a winning outcome that are less than the typical odds for the winning outcome) then the casino may change a payout associated with one or more outcomes in the secondary player's favor, e.g., the casino may increase one or more payouts. In some embodiments, the casino may adjust one or more payouts so as to maintain a constant or near constant house advantage. For example, the casino may change payouts so as to assure that the house advantage after adjustments in the odds of an outcome and in payouts is nearly the same as the house advantage was before the adjustments in odds and payouts. In some embodiments, if the secondary player indicates a desire for increased odds of a first outcome, then the casino may decrease the odds of a second outcome. For example, the casino may find a set of games of a primary player in which the first outcome occurs more than usual, but in which the second outcome occurs less than usual. The casino may then select a game at random from the set of games so as to allow the secondary player to participate. It will be appreciated that in the embodiments described herein, the secondary player could just as readily indicate a desired probability for one or more outcomes instead of indicating desired odds. It will be appreciated that a simple mathematical transformation can transform odds into probabilities, and vice versa.

In various embodiments, a secondary player may indicate desired payout for an outcome. For example, the secondary player may indicate a desire for a payout that is greater than the payout ordinarily associated with the outcome. Accordingly, the casino may adjust the probability of the outcome occurring. For example, the casino may reduce the probability of the outcome occurring. In various embodiments, the casino may reduce the probability of an outcome by selecting a pool of games of one or more primary players in which the outcome has occurred less frequently than would ordinarily be expected. The casino may then select a game at random from among the pool of games and allow the secondary player to participate in the selected game. In various embodiments, the casino may adjust the probability of an outcome that is different from the outcome whose payout the secondary player has asked to be adjusted. For example, the secondary player may indicate that he wishes to increase the payout for a first outcome. The casino may then adjust the probability of a second outcome. The second outcome may be a winning outcome. In various embodiments, the casino may make an adjustment to the probability of occurrence of one or more outcomes so as to counteract adjustments made to payouts in the secondary player's favor. In various embodiments, the casino seeks to maintain the same or nearly the same house advantage before and after any adjustments made by the secondary player and the house. For example, if a house advantage is ordinarily 5% for a game, then the house may seek to counteract any adjustments made to payouts by the secondary player so as to maintain the house advantage for the game at 5%.

In various embodiments, a secondary player may set a payout, a probability, and/or odds using a dial. The dial may allow the secondary player to adjust a setting along a continuum or near continuum by turning the dial to the appropriate degree. The secondary player might also use a scroll bar, a mouse, an arrow key, or any other input device in order to indicate a setting. In response to the secondary player adjusting a first setting, the house may adjust a second setting so as, for example, to maintain a constant house advantage. The house may adjust a setting for a probability by selecting an appropriate pool of games of a primary player such that a frequency of occurrence of one or more outcomes is equal to a desired frequency. The house may adjust a payout by simply providing a different payout than is typical in the event of the occurrence of a particular outcome.

In various embodiments, the house may change the odds of one or more outcomes by altering the composition of a deck of cards. For example, the house may add or remove cards from a deck of cards. In some embodiments, a secondary player may designate a particular category of starting hand of a game. For example, in a game of blackjack, a secondary player may indicate a desire to start with a point total of 18. The house may adjust the composition of the unused portion of the deck in response. For example, the house may add cards with rank three to the deck in order to lessen the dealer's chances of busting.

In some embodiments, a secondary player may indicate a desired starting hand for both the secondary player and for the dealer. For example, the secondary player may indicate a starting point total for the secondary player and the secondary player may indicate a particular up-card for the dealer. In some embodiments, the secondary player may indicate a starting hand for the secondary player and a complete starting hand for the dealer. In some embodiments, the secondary player may indicate a starting hand plus an additional card for the secondary player. For example, the secondary player may indicate a starting hand with two nines plus an additional card of a 10 (e.g., after the secondary has split his initial two cards). In some embodiments, a secondary player may indicate a starting hand for the dealer plus an additional card. In some embodiments, a secondary player may indicate any sequence of initial cards for the primary player and/or any sequence of initial cards for the dealer. The secondary player may specify a point total, a number of cards, the ranks of cards, particular cards (e.g., both rank and suit) and so on. For any indications provided by the secondary player, the casino may search for a game of a primary player that suits the indications. For example, if the secondary player has indicated a desire to participate in a game where a primary player has a starting point total of 18, then the house may search for a game of a primary player with the starting point total of 18.

Records of Performance

In various embodiments, a viewable record may be created for a primary player. The record may include historical performance metrics for the primary player. The record may constitute a profit and loss statement for the primary player. The record may include an indication of an amount won by the primary player over a certain period of time. The record may include an indication of an amount lost by the primary player over a certain period of time. The record may include an indication of a total amount wagered by the primary player over a certain period of time. The time period covered by the record may be: (a) a particular hour; (b) a particular day; (c) a particular week; (d) a particular weekend; (e) the duration of a primary player's stay at a casino; (f) the duration of a primary player's play session at a casino; (g) the duration of a primary player's session at a particular gaming device; and so on. The record may include a breakdown of performance metrics into various categories. The record may show performance metrics by time period, by wager amount, by gaming device, by dealer, by casino, by type of gaming device (e.g., reel slot machine versus video slot machine), or by any other category. For example, the record may include a first set of data describing the primary player's winnings at blackjack during the last day, a second set of data describing the primary player's winnings at video poker during the last day, a third set of data describing the primary player's winnings at roulette during the last day, and so on. In some embodiments, the record may include a listing of individual games played by a primary player (e.g., all games played by the primary player). The listing may include data associated with each game, including an amount wagered, an amount won, an amount lost, an outcome received, a time of the game, a decision made, an initial hand received in the game, a final hand received in the game, an action by a dealer, a hand of an opponent, a decision of an opponent, an amount raised, and so on. The listing may segregate games into different categories. For example, data about all games played at a slot machine may be listed together, while data about all games played at a table game may be listed together.

The record for a primary player may be viewable by the primary player. For example, the primary player may be able to call up a view of the record on the screen of any gaming device, any terminal, any mobile device, any Internet connected device, and so on. The record may be printable, for example, onto a cashless gaming ticket. In some embodiments, the record for a primary player may be viewable by a secondary player. For example, the secondary player may search for the name of a primary player and then view the record for the primary player.

In various embodiments, a primary player may specify limits. The limits may be visible in the record of the primary player. A limit may include a stop limit. The limit may force or encourage the primary player to stop playing if certain criteria are met. For example, the limit may encourage the primary player to stop playing if he has lost $100. In various embodiments, an alert may be sent to a primary player once performance metrics of the primary player meet certain criteria. For example, an alert might be sent to the primary player once the primary player has accumulated winnings of $500. The alert may tell the primary player that he wanted to stop playing once his winnings reached $500.

In some embodiments, a secondary player may receive an alert based on the performance of a primary player. For example, the secondary player may receive an alert when a primary player has won 10 games in a row, when a primary player has lost 10 games in a row, when a primary player's fortunes have swung back and forth three times between winnings and losses, and/or when any other condition has been met. In various embodiments, a secondary player may specify an alert condition. The secondary player may then be alerted if the alert condition is met. For example, once a primary player satisfies an alert condition, the secondary player may be alerted that the primary player has satisfied the secondary player's alert condition. The secondary player may then be given the opportunity to participate in the next game of the primary player. A secondary player may be alerted if a primary player has just won a large payout, if the primary player has won a designated number of large payouts in a particular period of time, if the primary player has won more than a certain amount in the prior hour, and so on. A secondary player may be alerted if a primary player has lost more than a certain amount in the last hour, if the secondary player has had more than 90% of his outcomes be losing outcomes in the last 30 minutes, if the primary player has just had a near miss, and so on.

Data from One Game Used in Another

Various embodiments describe the use of data in a gaming context, such as in the context of casino gaming, mobile gaming, charity bingo, or on-line gaming. In various embodiments, data generated in a first game may be used in a second game. For example, a set of data may be generated in a first game. The set of data may be used to determine an outcome of the first game. The same set of data may also be used to determine an outcome of a second game. For example, in a game of blackjack, 14 cards may be dealt. Data indicating the ranks and suits of the 14 cards may be recorded. Such data may later be used to conduct a game of video poker. In conducting the game of video poker, data about a first 5 of the 14 cards may be presented to a player, leaving 9 cards remaining. The player may select 3 discards, after which data about 3 replacement cards may be presented to the player from the data about the 9 cards remaining. In various embodiments, data in a first game may be generated through physical means. Generation of data through physical means may include generating data through a process that is not solely based on the manipulation of electrons and photons. The generation of data through physical means may include the generating an outcome at a roulette wheel, the dealing of one or more cards from a deck of cards, the rolling of a die, or any other physical or partly physical process. The generation of data through physical means may include the generation of a roulette outcome through the manual spinning of a roulette wheel, e.g., by a casino employee. The generation of data through physical means may include the generation of a roulette outcome through the automatic spinning of a roulette wheel, e.g., by computer controlled motors. The generation of data through physical means may include the rolling of dice by a human, such as a craps player. The generation of data through physical means may include the rolling of dice automatically, e.g., through the motorized spinning of a transparent enclosure containing dice.

In various embodiments, the outcomes and/or the resolutions of events in a first game may be used as inputs for generating outcomes and or resolutions of events in a second game. For example, the outcomes and/or resolutions of events in a first game may serve as random numbers for use in an algorithm for generating outcomes and/or resolutions in a second game. In some embodiments, the outcomes and/or resolutions of events in a first game may be directly used as outcomes or resolutions in a second game (e.g., without any further transformations). In various embodiments, a first game may include a game of a player or a game that has been conducted automatically (e.g., without participation by any player). In various embodiments, a first game may include a game where outcomes or resolutions have been generated through physical processes (e.g., as opposed to electronic processes). For example, the first game may include outcomes or resolutions that have been generated through a roll of dice, through a spin of a roulette wheel, through the dealing of cards, or through any other physical process.

Readers

Data may be recorded from a first game in various ways. In some embodiments, a human may manually enter data from a game. For example, a casino employee may use a keyboard to key in the numbers 4 and 3, representing the numbers rolled on two dice in a game of craps. In some embodiments, a sensor or reader may detect and record data from a game. A roulette reader may detect and record the spaces in which a roulette ball has landed following a spin of a roulette wheel. An exemplary roulette sensing apparatus is described in U.S. Pat. No. 4,396,193 to Reinhardt, et al., entitled "Roulette wheel directional sensing apparatus". U.S. Pat. No. 4,396,193 is hereby incorporated herein by reference. A card shoe may be equipped with sensors and/or algorithms for reading cards dealt from the shoe and determining data about the cards, such as rank and suit. An exemplary such card shoe is described in U.S. Pat. No. 7,029,009 to Grauzer, et al., entitled "Playing card dealing shoe with automated internal card feeding and card reading." U.S. Pat. No. 7,029,009 is hereby incorporated herein by reference. In various embodiments, a camera may capture images of a game being played. Data may be extracted from such images, including data about cards dealt, data about rolls of dice, and data about a number generated at a roulette wheel. Such data may be extracted using image processing algorithms, for example. U.S. Pat. No. 4,531,187 to Uhland, entitled "Game monitoring apparatus" describes a "means for optically monitoring the cards played" in a game. U.S. Pat. No. 4,531,187 is hereby incorporated herein by reference.

Camera

In various embodiments, a camera may record footage of a first game being played. For example, a camera may record footage of dice being rolled, of cards being dealt, of a roulette wheel being spun, and so on. In various embodiments, the footage may be stored. In various embodiments, the footage may be stored in association with one or more tags or other data, including a date during which the filmed game was played, a time during which the game was played, a game identifier, an identifier for a player in the game (e.g., a player's name), an identifier for a dealer in the game, a location of the game, a casino in which the game was played, an indication of the type of game being played (e.g., blackjack; e.g.; craps), and so on. Subsequent to the video footage being recorded, a player involved in a second game may indicate a desire to see the video footage. The player in the second game may be involved in a game that uses data from the game depicted in the video footage. For example, the player involved in the second game may be involved in a game of video poker that uses the same cards originally dealt in a game of blackjack. The player may desire to see film footage of the game of blackjack. The player may desire to see the film footage so as to verify that the cards dealt in the game of blackjack, which are the same cards now being used in his own game, were dealt fairly. Any tags stored in association with the video footage may aid the house or casino in retrieving the video footage upon a player's request. For example, data used in a second game may be tagged with an identifier of a first game. A player in the second game may request to see video footage of how that data was generated in the first game. Accordingly, a casino may search for video footage that is stored in association with the identifier. Any such video footage may then be retrieved and shown to the player in the second game.

Skins

In various embodiments, data generated in a first game may be used in a second game. One or more algorithms may be used to transform the data from the first game into data suitable for use in the second game. For example, data from a first game may include number in a first range. Data suitable for use in a second game may include numbers in a second range. Accordingly, for example, data from the first range may be mapped to the second range using a mathematical transformation, such as multiplication or division by a constant. For example, data from a first game may include data about cards dealt in the first game (e.g., the first game is game of blackjack). Such data may take the form of numbers, where the numbers 1 through 52 each represent a different card in a standard deck of 52 cards. Data required for the second game may include numerical data in the range of 1 to 6, since the second game may be a dice game (e.g., craps). Accordingly, data from the range of 1 to 52 may be mapped to data in the range of 1 to 6. The mapping may occur as follows. It will be appreciated that many other mappings are possible. A number from 1 to 52 is completely discarded if the number is 49, 50, 51, or 52. If a number is discarded, a second number is then used (e.g., a number representing a different card that was dealt in the first game). If a number is not discarded, the number is divided by eight and the result is rounded up to the nearest integer. Thus, the number 1 will map to the number 1, the number 2 will map to the number 1, the number 8 will map to the number 1, the number 9 will map to the number 2, the number 17 will map to the number 3, and the number 48 will map to the number 6. A mapping has thus been accomplished from a game of cards to a game of dice. Two or more cards may be used from the game of cards (more than two cards may be needed if one of the cards is represented by a number greater than 48) to conduct a roll of dice in a game of craps.

Once data suitable for use in the second game is obtained, an appropriate skin may be used with the second game. The skin may include graphics and play patterns that make the second game more familiar to the player of the second game. For example, once data has been generated which includes numbers between 1 and 6, the casino (or a device of the casino, such as a gaming device) may be used to graphically render the generation of outcomes that corresponds to the data. For example, if numbers 3 and 6 have been generated as data suitable for a second game, the casino may show graphical depictions of the numbers 3 and 6 being rolled on a pair of dice. Thus, the player may engage in a game of craps.

Note that in various embodiments, data used in a second game may be based on data that has been derived from a first game which was played in the past. Thus, the outcome of the second game may be pre-determined, in some sense. However, since the player of the second game may not be familiar with the first game, or since the player may not be familiar with the algorithm used to transform data from the first game into data used in the second game, the player may be unable to take advantage of advanced knowledge of the outcome of the second game.

In various embodiments, data generated in a first game may be used in a second game that is played on a gaming device. The gaming device may be a slot machine, video poker machine, video bingo machine, mobile gaming device (e.g., a mobile gaming device as defined by Nevada bill AB 471), and so on. In various embodiments, data generated in a first game may be used in a second game that is played over a network. Data generated in a first game may be used in Internet gaming, such as in conducting a second game at an on-line casino. Similarly, video footage from the first game may be available for a player who participates in the second game at the on-line casino. By viewing the video footage, the player may become more confident that the data being used in the second game was generated fairly.

Auditing the Data Generated in the First Game

In various embodiments, data generated at a first game, or a first series of games may be tested or audited to provide verification that the data is fair. In various embodiments, a test may be performed to verify that the data conforms to some statistical distribution. The statistical distribution may be a distribution that is generally thought to govern in the one or more random processes used to generate the data. For example, a set of data may include data about 10,000 outcomes generated at one of a group of roulette wheels, each roulette wheel having 38 spaces. An applicable statistical distribution may predict that each possible outcome of the roulette wheel would occur approximately once every 38 outcomes, or approximately 263 times out of the data set of 10,000 outcomes. Thus, a test of the data about the 10,000 outcomes might test that each of the 38 possible outcomes of a roulette wheel occurred approximately 263 times out of the 10,000 outcomes. The tests may allow for some deviation. For example, it may be considered acceptable for an outcome to occur from 213 to 313 times. However, if an outcome occurs a number of times that is not between 213 and 313, then the data may be considered suspicious. Data may be required to pass one or more tests, such as tests of statistical distribution, before the data will be permitted to be used in a second game.

Hands as Entry into a Jackpot

Everyone Bets on One Side or the Other

In various embodiments, a single game may allow the participation of two or more secondary players. In various embodiments, the single game may allow the participation of players across an entire casino. The single game may be prominently featured or publicized. For example, the progress of the game may be shown on prominent display screens or monitors throughout a casino. The game may be played on an elevated stage or platform that is visible to many. In various embodiments, the game may allow participation by secondary players in real time. For example, a secondary player may place a bet on the game, the game may occur, and then the secondary player may be paid based on the outcome of the game and the bet of the secondary player. In various embodiments, the game may be played by a primary player. In various embodiments, the game may be played by a primary dealer and the house, or a representative of the casino. For example, the game may include a primary player and a dealer. In various embodiments, the game may be generated electronically. The game may be a game played on a gaming device by a primary player. The game may be played entirely electronically.

In various embodiments, a given secondary player may place a bet that the primary player will win. In various embodiments, the secondary player may place a bet that the house will win. Among all secondary players placing bets on the game, some may bet on the primary player, and some may bet on the house. In various embodiments, secondary players may bet on other events as well. For example, secondary players may bet that particular cards will fall, that a particular point total will be achieved, that a particular roll of dice will occur and so. The featured game may be any suitable game, such as blackjack, craps, baccarat, roulette, video poker, or any other suitable game.

In various embodiments, a game may allow the participation of a small group of players. For example, a game may allow the participation of eight secondary players. The secondary players may all be players at one gaming table, in one area of a casino, in one restaurant, or may all be grouped together in some other way. One of the group of players may play the featured game. The other players may then act as secondary players and participate in the featured game. In various embodiments, the player who plays the feature game may rotate amongst the group of players.

Bet on Particular Cards

In various embodiments, a secondary player may bet on a particular events that will occur in a game. The secondary player may bet that a particular roll of the dice will occur, or that the dealer will bust in a game of blackjack.

In various embodiments, a secondary player may bet on particular cards that will occur in the featured game. For example, a secondary player may bet that an ace of spades and a king of hearts will be dealt in the featured game. If the ace of spades and king of hearts do appear in the game, the secondary player may win a significant multiple of his bet, e.g., ten times his bet. The amount that a secondary player wins may be based on the probability with which the resolution of the events the player is betting on is likely to occur. For example, if the secondary player bets on an event resolution with a small probability of occurrence, the secondary player may stand to win relatively more. In various embodiments, the amount that a secondary player stands to win may depend on the specificity with which he specifies the event resolutions of a featured game. For example, a secondary player may stand to win more if he correctly specifies ranks and suits of a set of cards in a featured game than if he simply specifies ranks.

In various embodiments, a secondary player may bet that a particular card will be dealt in the featured game. In various embodiments, a secondary player may bet on a particular combination of cards that will be dealt in the featured game. In various embodiments, a secondary player may bet on an order with which cards will be dealt. For example, a secondary player may bet that an ace will be dealt first, followed by a ten, followed by a queen. In various embodiments, a secondary player may bet on cards that will occur in a player hand. In various embodiments, a secondary player may bet on cards that will occur in a dealer hand. In various embodiments, a secondary player may bet on a first set of cards that will occur in a player hand and on a second set of cards that will occur in a dealer hand. For example, a secondary player may bet that a player will receive a jack of diamonds and a nine of hearts and that a dealer will receive a seven of clubs, two of hearts, and queen of clubs.

In various embodiments, a secondary player may specify each card that will be dealt in the featured game. The secondary player may win only if each specified card is dealt.

In various embodiments, a secondary player may participate in his own game as a primary player. At the same time, the secondary player may bet on the featured game as a secondary player. One or more events that occur in the secondary player's own game may serve to specify the secondary player's bet on the featured game. For example, the secondary player may play a game of blackjack where he receives the ace of spades and the ten of hearts. By receiving such cards, the secondary player may automatically be betting that the primary player in the featured game will also receive the ace of spades and the ten of hearts. Thus, the secondary player's own hand may serve as a specification of a bet placed in a game played by a different player (i.e., the primary player). A hand, a set of cards, a roll of the dice, or any other event in which a secondary participates (e.g., as a primary player) may serve as an entry, ticket, or bet into another game (e.g., into a featured game).

Pari-Mutuel Betting

In various embodiments, betting on a featured game may be pari-mutuel. The house may take a percentage of all bets placed. The pool of bets may then be given to the player or players who have correctly specified the resolution an event in the featured game. For example, the pool of all bets may go to the player who correctly specifies the most cards that are dealt in the featured game. For tied players, the pool may be divided equally and/or in proportion to the bets placed by the tied players.

Progressive Betting

In various embodiments, betting on a featured game may be progressive. All or a portion of bets placed by secondary players may go into a pool. The pool may be won by any secondary player who correctly specifies the resolution of one or more events in the featured game. For example, a secondary player may win the pool for correctly specifying each card that is dealt to the primary player and each card that is dealt to the dealer in a game of blackjack. If there is not a winner of the pool, then the pool may carry over to the next game.

In various embodiments, a secondary player may win a portion of the pool for correctly specifying the resolution of some events but not others, or for being off by a small amount from correctly specifying event resolutions. For example, if a secondary player correctly specifies all but one of the cards dealt in a game, the secondary player may win 10% of all bets placed on the game. As another example, if a secondary player correctly specifies all the suits of the cards dealt but not all the ranks, then the secondary player may win 5% of the pool. As another example, if the secondary player correctly specifies all but one card and specifies the correct rank but incorrect suit on the remaining card, then the player may win 20% of the pool.

In various embodiments, where there is a progressive pool, a secondary player's own game (e.g., a game in which the secondary player serves as a primary player) may serve to determine the secondary player's entry into the featured game.

Fixed Odds Game

In various embodiments, a bet made by a secondary player in a featured game may be made according to fixed odds. For example, the secondary player may bet that certain events will transpire in the primary game and may receive a fixed payout based on those events. The secondary player may receive different levels of fixed payouts depending on how close the secondary player came to specifying the events that transpired in the featured game.

Player in the Spotlight

The featured game may be a game in which an ordinary casino patron is playing. A particular primary player may play the featured game for some number of games. Then, another primary player may play in the featured game. In various embodiments, a primary player need not make any special efforts to be in the featured game. Instead, for example, a cameraman may travel around a casino, alternately filming different primary players involved in games. The game of the primary player currently being filmed may be the featured game.

Featured Game on a Mobile Device

In various embodiments, the featured game may be presented on a mobile gaming device. For example, a secondary player may watch the progress and the events of the featured game on his mobile gaming device. The secondary player may also place bets on the featured game using his mobile gaming device. In various embodiments, the featured game may be presented on any device, including on a gaming device. For example, a secondary player may watch the featured game on a display screen of a slot machine. The secondary player may even place bets on the featured game using the slot machine interface.

Bet on any Game

In various embodiments, a secondary player may bet on events within any particular game, including betting on the outcome of any particular game. The secondary player need not be restricted to betting only on a prominently featured game. The secondary player may, for example, decide that he would like to bet on a particular primary player of blackjack who is currently playing at a blackjack table within a casino. The secondary player may then specify, for example, one or more cards that will be dealt in that game. If the secondary player is correct then the secondary player may win a payout.

In various embodiments, a secondary player may bet on an event or events (including an outcome) within a plurality of games. The secondary player may thus stand to win any of the plurality of games has an event resolution that was correctly specified by the secondary player. For example, the secondary player may bet that any player at a blackjack table will get two aces as his first two cards in the next game of blackjack. The secondary player may then win money if any of the players at the blackjack table does in fact get two aces as his first two cards in the next game of blackjack. In various embodiments, the secondary player may win a payout that is based on the number of games in which his specified resolutions actually occurred. In the aforementioned example, the secondary player may win a first amount if the event resolution he specified occurred in one game and may win a second amount if the event resolution he specified occurred in two games. The second amount may be greater than the first amount. The secondary player may win a special jackpot if the event resolution he specified occurred in all games. In various embodiments, the payout received by a secondary player for specifying an event resolution in a plurality of games may depend on the number of games. If the event specified by the secondary player occurs in one of five games the secondary player may win more than if the event had occurred in one of 25 games.

Specify Event Resolutions that May Apply in Multiple Games

In various embodiments, a secondary player may specify one or more event resolutions, or an outcome. The secondary player may specify, for example, a set of cards that may be dealt, a set of numbers that may be rolled on dice, a number that will arise in roulette, and so on. The event resolutions specified by the secondary player may then apply in a plurality of featured games. For example, the event resolutions may apply in a series of consecutive featured games.

As an example, a secondary player may specify that a primary player in blackjack will receive the two of hearts, ten of clubs and nine of diamonds. The secondary player may further specify that the dealer will receive an ace of spades and a king of spades. The secondary player may then win a prize if the specified cards are dealt to the specified parties (i.e., player and dealer) in any of the next 100 featured games of blackjack.

In various embodiments, the secondary player may be required to make a bet for every featured game in which he participates as a secondary player (e.g., for every game in which he is eligible to win a payout or jackpot). In various embodiments, the secondary player may receive free entry as a secondary player into the featured game so long as the secondary player also is playing in his own game (e.g., in the capacity of a primary player). Where the secondary player receives free entry, a portion of his wager in the secondary player's own game may be used to fund the prize pool or payout in the featured game. For example, 1 cent may come from every secondary player's bet in his/her own game and contribute towards the prize pool of the featured game. The prize pool may build up as a progressive prize until it is won by one of the secondary players.

Specifying the Outcome of Event Resolutions

A secondary player may specify the outcome of event resolutions in various ways. In various embodiments, the secondary player may himself choose particular resolutions. For example, the secondary player may choose particular cards that he thinks will be dealt in the featured game. For example, the secondary player may choose particular numbers that he thinks will be rolled in a featured craps game. In various embodiments, the secondary player does not himself choose an event resolution or outcome. Rather, an event resolution in the secondary player's own game (e.g., a game in which the secondary player is serving as a primary player) may determine what event resolution or outcome in the featured game wins for the secondary player. In various embodiments, an event resolution or outcome in the featured game must match an event resolution or outcome in the secondary player's own game in order for the secondary player to win a payout or prize from the featured game. For example, the secondary player may be playing a game of blackjack (as a primary player). At the same time, the secondary player may place a $1 bet on a featured game of blackjack. The secondary player may win a $10,000 payout if every card dealt in the featured game matches, by rank and suit, every card dealt in the game of the secondary player.

In various embodiments, a secondary player describes the configuration of a game (e.g., of a hand). The description by the secondary player may include a description of what the primary player will have and a description of what the dealer will have. Following the secondary player's description of a configuration, there may be some period of time, or some number of plays during which games are monitored. The games monitored may be featured games or any suitable games within a casino or even outside the casino. The secondary player may win if any of the monitored games then matches the description originally set forth by the secondary player. If the secondary player wins, the secondary player may win a progressive prize.

The following is a list of embodiments, not claims. Various embodiments include:

A. A method comprising:
receiving a first bet;
receiving a first description of a first set of cards;
receiving a second description of a second set of cards;
determining a third description of a third set of cards that are dealt to a first player in a first game;
determining a fourth description of a fourth set of cards that are dealt to a first dealer in the first game; and
providing a payout based on the first bet if the third description of the third set of cards matches first description of the first set of cards and if the fourth description of the fourth set of cards matches the second description of the second set of cards.

B. The method of embodiment A in which the first description includes a description of the rank and suit of each of the first set of cards.

C. The method of embodiment B in which providing a payout includes providing a payout based on the first bet if the third description of the third set of cards includes a description of the rank and suit of each of the first set of cards and if the fourth description of the fourth set of cards matches the second description of the second set of cards.

D. The method of embodiment A in which the first game is a game of blackjack.

E. The method of embodiment A, further including:
receiving a second bet;
receiving a fifth description of a fifth set of cards;
receiving a sixth description of a sixth set of cards; and
providing a payout based on the second bet if the third description of the third set of cards matches the fifth description of the fifth set of cards and if the fourth description of the fourth set of cards matches the sixth description of the sixth set of cards.

F. The method of embodiment A in which the first set of cards is dealt to a second player in a second game, and in which the second set of cards is dealt to a dealer in the second game.

G. The method of embodiment A further including:
receiving a second bet;
determining a fifth description of a fifth set of cards that are dealt to a second player in a second game;
determining a sixth description of a sixth set of cards that are dealt to a second dealer in the second game; and
providing a payout based on the second bet if the fifth description of the fifth set of cards matches first description of the first set of cards and if the sixth description of the sixth set of cards matches the second description of the second set of cards.

H. The method of embodiment A in which the first bet, the first description, and the second description are all received from a second player, and in which the step of providing includes:
providing a payout to the second player based on the first bet if the third description of the third set of cards matches first description of the first set of cards and if the fourth description of the fourth set of cards matches the second description of the second set of cards.

I. A method comprising:
initializing a progressive prize pool at a first value;
receiving a first bet from a first player;
setting the progressive prize pool at a second value which is based on the first value and the first bet;
receiving from the first player a first description of a first set of cards;
receiving a second bet from a second player;
setting the progressive prize pool at a third value which is based on the second value and the second bet;
receiving from the second player a second description of a second set of cards;
determining a third description of a third set of cards that are dealt in a first game;
providing the progressive prize pool to the first player if the third description of the third set of cards matches the first description of the first set of cards; and
providing the progressive prize pool to the second player if the third description of the third set of cards matches the second description of the second set of cards.

J. The method of embodiment I further including:
receiving a third bet from a third player;
setting the progressive prize pool at a fourth value which is based on the third value and the third bet;
receiving from the third player a fourth description of a fourth set of cards;
determining a fifth description of a fifth set of cards that are dealt in a second game; and
providing the progressive prize pool to the third player if the fourth description of the fourth set of cards matches the fifth description of the fifth set of cards.

K. A method comprising:
receiving from a first player a first description of a first set of cards;
determining a second description of a second set of cards that are dealt in a first game played by a second player;
determining a third description of a third set of cards that are dealt in a second game played by a third player; and
providing a payout to the first player if the first description of the first set of cards matches either the second description of the second set of cards or the third description of the third set of cards.

L. The method of embodiment K in which the second game is played after the first game.

M. The method of embodiment K in which the third player is the same as the second player.

N. The method of embodiment K further including:
  receiving an indication that the first player participates in a third game at about the same time that the first game is played; and
  receiving an indication that the first player participates in a fourth game at about the same time that the second game is played.

O. The method of embodiment K in which the third game is different from the first game, and in which the fourth game is different from the second game.

P. An apparatus comprising:
  six display screens;
  an elevated, flat horizontal surface (e.g., a desktop);
  a microphone;
  a speaker;
  a keyboard;
  a telephone;
  a telephone keypad;
  a computer mouse;
  a computer memory; and
  a computer processor, the computer processor operable to:
  receive first information from a server (e.g., information describing a game event; e.g., a random number);
  generate second information based on the first information (e.g., generate an image that represents the information; e.g., translate the random number received from the server into a game result, such as a card drawn);
  present the second information via at least one of the speaker and the six display screens;
  receive third information from at least one of the microphone, the keyboard, the telephone, and the computer mouse (e.g., the third information may be an indication of a strategy chosen by the player to be used in a game);
  present the third information (e.g., display an indication of which cards the player has chosen to hold or discard in a game of video poker);
  generate fourth information based on the second information and based on the third information (e.g., generate instructions for the server asking the server to determine replacement cards); and
  transmit the fourth information to the server.

Q. A system comprising:
  a physical event generator;
  an information capturing device operable to record physical events generated by the physical event generator;
  a plurality of terminals; and
  a server, the server operable to:
  receive first information about recorded physical events from the information capturing device;
  determine second information based on the first information;
  transmit second information to at least one of the plurality of terminals;
  receive third information from at least one of the plurality of terminals; and
  update a record based on the third information.

The following applications are hereby incorporated by reference herein in their entirety: U.S. patent application Ser. No. 11/467,078, filed Aug. 24, 2006; U.S. patent application Ser. No. 11/468,809, filed Aug. 31, 2006; U.S. patent application Ser. No. 11/470,250, filed Sep. 5, 2006; U.S. patent application Ser. No. 11/533,300, filed Sep. 19, 2006; U.S. patent application Ser. No. 11/539,518, filed Oct. 6, 2006; U.S. patent application Ser. No. 11/618,426, filed Dec. 29, 2006; U.S. patent application Ser. No. 11/674,232, filed Feb. 13, 2007; U.S. patent application Ser. No. 11/680,764, filed Mar. 1, 2007; U.S. patent application Ser. No. 11/697,024, filed Apr. 5, 2007; and U.S. patent application Ser. No. 11/733,902, filed Apr. 11, 2007.

When a player is near a dealer, the dealer is told. The dealer can greet the player by name.

In various embodiments, when a player comes near a dealer, the dealer may be told. In various embodiments, when a player comes within a predetermined range of the dealer, the dealer may be told. A predetermined range may be, for example, 5 feet, 10 feet, 20 feet, or any other predetermined range. In various embodiments, a dealer may be told of a player's proximity in various ways. A screen at the dealer's table may display a message for the dealer indicating that the player is near. In various embodiments, a dealer may wear headphones which receive an electronic (e.g., wireless) audio feed from a casino server or from a casino employee. When a player arrives near the dealer, the dealer may be told via a voice in his headphones. For example, a voice message may say to the dealer, "John Smith has just arrived to your right. He is a 65-year-old male. Say 'hi' to him." In various embodiments, the player's presence near the dealer may be detected in various ways. The player may be carrying a mobile device, for example.

When a player is near to a dealer, the dealer may take various actions. The dealer may greet the player, such as by name. The dealer may ask the player whether the player would like to join the table for a game. The dealer may ask the player whether he would like to link to the table using his mobile device. The player would then, for example, be able to participate in a game at the table as a secondary player, or to play as a primary player without sitting down. The dealer may offer the player a special incentive to play. For example, the dealer may offer two extra comp points per dollar wagered for the first hour if the player sits down. The dealer may mention other events in the player's life. For example, the dealer may congratulate the player on a large payout he received recently, on a recent birthday, on a recent move to another state, or on anything else about which the dealer (or the casino) may have information. A dealer may be trained to interact with a player in a particular way (e.g., to greet the player by name). In various embodiments, a dealer may be prompted in real time or near real time as to what to say to a player. For example, a message may appear on a screen at the dealer's table telling the dealer to congratulate the player on getting married recently. In various embodiments, a dealer may be provided with general information about a player. It may then be left to the dealer to improvise a greeting or other conversation with the player.

In various embodiments, a game table, gaming device, or other object may be programmed or configured to greet a player or otherwise interact with a player as the player walks by. For example, when a player comes within ten feet of a gaming table, a voice may be broadcast from a speaker on the gaming table. The voice may say, "won't you come sit and play for a while, Mr. Smith?" A gaming table or other object may say various things to a player, including referring to a recent event in the player's life or saying anything else.

In various embodiments, a casino employee may speak to a player via a gaming table or gaming device. A player may come within a predetermined distance of a gaming table. The gaming table may detect the presence of the player. The gaming table may then alert a remote casino representative. The remote casino representative may be sitting at a computer terminal which may be in communication with the casino server. The computer terminal may display information about the player to the casino representative. The casino representative may then begin speaking to the player using a microphone. The casino representative's voice may then be transmitted over a network (e.g., over a casino network or over the Internet) to the gaming table. The casino representative's voice may then be broadcast from a speaker at the gaming table. The gaming table may also capture voice or video from the player (e.g., using microphones or cameras), and transmit this back to the casino representative. In this way, the casino representative may have a conversation with the player. To the player, it may appear as if the table is talking to him.

Betting Futures

In various embodiments, a player may bet on events that will occur in the future. In various embodiments, a player may bet on events that will be resolved in the future. In various embodiments, a player may bet on a sequence of events that will begin at a first time in the future and will end at a second, later time in the future. In various embodiments, player may bet on a sequence of events that will begin presently and will end in the future. In various embodiments, a player may bet on a sequence of events that have begun in the past but which will resolve in the future. Various embodiments described herein may pertain to bets on events that will occur in the future, including sequences of events that will both begin and end in the future.

In various embodiments, a player may bet on the number of "red" outcomes that will occur at a given roulette wheel over a particular 24-hour period beginning one week in the future. The player may, for example, place a bet by giving money or casino chips to a casino employee. The player may provide parameters of his bet. For example, the player may specify the beginning and ending times in between which his bet is applicable. The player may specify what events he is betting on. For example, the player may specify that he is betting that "red" outcomes will exceed "black" outcomes between the beginning and ending times of the bet. After the ending time (e.g., one week in the future), the casino may determine whether the player has won his bet or not. For example, the casino may check records of which roulette outcomes have actually occurred between the beginning and ending times specified by the player. The casino may thereby determine, for example, whether more "red" outcomes have occurred than "black" outcomes between the beginning and ending time periods. If the player has won the bet, then the casino may pay the player based on a predetermined pay schedule, based on the a-priori odds of the player winning the bet, based on the bet amount and/or based on any other factor.

In various embodiments, a player may provide details of his bet via a betting terminal. The player may navigate a series of menus, for example, to select or specify parameters of his bet. For example, one menu may allow a player to select a game. Another menu may allow the player to select a time period in the future during which the player's bet will apply. Another menu may allow the player to select the particular aspects of the game on which the player is betting. For example, a player may bet that a particular outcome of the game will occur so many times during a chosen time period. As another example, a player may bet that a primary player (e.g., as opposed to the house) will win some percentage of the time during the chosen time period.

In various embodiments, once the period over which the bet applies has ended, the player may claim a payout if a payout is due. For example, suppose that the player has won $100. The player may then visit a cage or desk at a casino, provide evidence of his identity (e.g., a license; e.g., a fingerprint; e.g., a birth certificate; e.g., a social security card; e.g., a passport), and collect his payout.

In some embodiments, a player who has placed a bet on one or more events that will resolve in the future may receive documentation of the bet. For example, the player may receive a receipt or ticket that includes details of the bet. The document may include a bet amount, a time period over which the bet is applicable, a payout table, and/or any other details of the bet. In some embodiments, the document may include an identifier, such as an alphanumeric character sequence or a bar code. The identifier may allow a casino attendant or casino server to match the identifier to a record of the bet stored in a database. For example, the casino may use the identifier to look up stored details about the bet.

In various embodiments, a casino may store a record of a bet made by the player. The record of the bet may be tied to a player identifier, such as to a player tracking card number. The player may then need only present the identifier, such as his player tracking card, in order to receive his appropriate payout from the bet.

In various embodiments, a player may claim a payout or other prize stemming from a bet at a betting terminal. For example, a player may insert his player tracking card number into a betting terminal. The terminal may determine, based on the tracking card number, whether there are any outstanding payouts owed to a player. If there are, the betting terminal may provide payment to the player. In some embodiments, the betting terminal may perform a security check to make sure that the person who has inserted the player tracking card is in fact the owner of the tracking card. Thus, for example, the betting terminal may ask the person to answer a secret question, to recall details of the bet, or to provide any other verification of his identity.

In various embodiments, a slot machine or other gaming device may provide payment to a player based on a bet the player had previously made pertaining to future events (e.g., events which have since transpired). For example, the player may insert his player tracking card into the slot machine. The slot machine may determine the player's identity and may then credit the player with the appropriate payout.

Tracking Bets

In various embodiments, a player's bet on a sequence of events may be tracked or monitored as the sequence of events unfolds. For example, on Sep. 17, 2012, a player may bet that at least 1000 blackjacks or naturals will occur at all blackjack tables in a casino during Sep. 24, 2012. On Sep. 24, 2012, the player may be able to begin tracking statistics relevant to his bet. In this case, for example, the player may be able to track how many blackjacks have occurred at all blackjack tables at the casino since the beginning of the day. For example, the player may watch a constantly updating statistic showing that 610 . . . 611 . . . 612 . . . blackjacks have occurred thus far in the day. Following the statistic may be exciting for the player as the player hopes for the statistic to reach the point where he will have won his bet prior to the end of the day.

In various embodiments, a player may be able to track the progress of his bet in various ways. For example, a player may log onto the Internet, provide identifying information (e.g., a player tracking card number) and may then be shown statistics relevant to bets that he has in progress. In another example, a player at a casino hotel may be able to view the progress of his outstanding bets on casino television. In various embodiments, a player may be able to visit any betting terminal, provide identifying information, and view a statistic related to his bet. In various embodiments, a player may be able to visit a slot machine or other gaming device to view statistics related to his bet. A player may be able to call a particular phone number to view statistics related to his bet. In some embodiments, monitors or sign boards located within a casino may show common statistics that may be of interest to a players.

Futures Payout Structure

In various embodiments, a player may make a bet whose payout varies in a linear fashion (or in an affine fashion) with the value of a statistic. For example, the player may receive one unit of payout (e.g., one dollar) per one unit value of the statistic. Thus, for example, a player may bet on the number of times that the outcome "00" will occur at a casino in a one-day period. The player may be paid one dollar for every time over 50 that the outcome "00" occurs during that one-day period. For example, should the outcome "00" occur 60 times during the one-day period, the player may receive $10.

In various embodiments, a player may lose money in a linear fashion (or in an affine fashion) with the value of a statistic. For example, a player may owe one unit of currency per unit by which a statistic is less than a reference value. For example, a player may owe one dollar for every time less than 50 that the outcome "00" occurs during a day. For example, if the outcome "00" occurs only 45 times in a day, then the player may owe the casino $5.

In various embodiments, a player may win or lose money based on a non-linear function of a statistic. For example, a player may win money in proportion to the square of the amount by which a statistic exceeds a reference value (e.g., the player wins $1 if "00" occurs 51 times, $4 if "00" occurs 52 times, $9 if "00" occurs 53 times, and so on).

Marking to Market

In various embodiments, a bet that a player has made based on a sequence of events may be partially paid or resolved based on a partial sequence of events that have occurred already. The partial payment may represent an amount that the player (or casino) is now certain to win. For example, if the player is to receive $1 for every time over 1000 that the house busts in blackjack during a given 12-hour period, and the house has already busted 1010 times, then the player may be guaranteed to receive at least $10. Therefore, the player may be paid $10 even before the 12-hour period has ended. The player may receive additional payments later if the house busts additional times during the 12-hour period.

In some embodiments, a partial payment may represent an expected amount that a player or casino will receive at the end of the period over which the bet applies. For example, halfway through a period over which a bet applies, standard probabilistic models may predict that a casino would expect to win $40 from a player based on events that have already transpired during the first half of a betting period. Thus, the casino may collect $40 from the player. Should events during the second half of the betting period go in the player's favor, the casino may pay back money to the player, perhaps even paying the player more than the $40. However, should events go against the player during the second half of the betting period, the player may owe further money to the casino by the end of the betting period. In various embodiments, partial payments may reduce a risk borne by a casino that a player will not pay what he owes. For example, if a player accumulates a large debt to a casino, the casino may run the risk that the player will disappear without paying the debt. Thus, in various embodiments, the casino may collect smaller payments from the player so as to reduce the possibility that the player will ever amass a large debt to the casino.

Settling

In various embodiments, a player may wish to be released from the obligations of a bet prior to the end of the time period during which the relevant events will resolve. For example, a player may have placed a bet on the number of times a jackpot will occur during the entire month of October. For example, the player may bet $100 that at least 40 jackpots will be won throughout a casino in the month of October. However, on October 15, the player may decide that he no longer wishes to wait until the end of October. Accordingly, the player may ask the casino to pay him some amount based on the number of jackpots that have been won thus far in the month of October. The payment provided by the casino may be relatively greater if it appears fairly likely that the player will win (e.g., if 35 jackpots have already been won in just the first half of the month), and may be relatively less if it appears fairly likely that the player will not win (e.g., if 5 jackpots have already been won in just the first half of the month). The amount of the payment may be based on a probabilistic model which may be used to determine an expected amount the player is likely to win. For example, if the player has bet $100 and stands to either win $200 or win $0, and if it is deemed that there is a 40% chance the player will win, then the player may be paid $80, representing his expected winnings from the bet.

In various embodiments, a player may express a desire to terminate a bet or to be released from a bet. The casino may determine an amount the player may receive for certain in lieu of continuing to wait for the bet to be resolved. The player may then decide whether he is willing to accept the amount determined by the casino or not. If so, the player may indicate his acceptance. The player may then receive an immediate payment and the bet may thereby terminate.

Examples of Future Bets

As some examples, a first player may bet on one or more of the following during a period of time (e.g., a period of time beginning and ending in the future; e.g., a period of time beginning in the present and ending in the future; e.g., a period of time that began in the past and will end in the future; e.g., a period of time that began in the past and ended in the past; e.g., a period of time that began in the past and ends in the present): (a) the number "12" will occur at a particular roulette wheel 100 times; (b) the number "4" will occur at any roulette wheel at a casino a total of 1000 times; (c) the number of times that an even number will occur at a particular roulette wheel (e.g., the player may be paid more the more that an even number occurs); (d) the number of times that a bet on the banker will win in a game of baccarat; (e) the number of times that a bet on a player will win in a game of baccarat; (f) the most aces that are dealt to one player in a game of blackjack (g) the largest number of consecutive sevens that will be rolled at a particular craps table; (h) the number of times any player will bust in a game of blackjack across a casino; (i) the amount by which "red" outcomes will exceed "black" outcomes across a casino in a game of roulette (e.g., if there are 1200 "red" outcomes and 1100 "black" outcomes, then red outcomes have exceed black outcomes by 100); (j) the largest number of consecutive games at a slot machine that any player will win; (k) the most bonus rounds that will be achieved by an individual slot machine; and any other result of a sequence of events; and any other statistic describing a sequence of events; and any other value of a statistic describing a sequence of events.

Future as Hedge

In various embodiments, a player may place a first bet on a series of games, outcomes, or other events that will end at some future time. For example, the player may place a bet that the number of "red" outcomes will exceed the number of "black" outcomes over the next 10 hour period across all roulette games in a casino. As another example, a player may bet on the number of royal flushes that will be dealt across the casino over the next 4-hour period. The player may stand to win $100 for every royal flush over 12 that is dealt.

At some point after having placed a bet, but before the time period covered by the bet has ended, the player may become worried about the final outcome of his bet. For example, the player may expect to win money (e.g., "red" outcomes may currently exceed "black" outcomes) but may worry that the tides will turn against him (e.g., there will by a string of predominantly "black" outcomes). In some embodiments, a player may have a bet that covers a period going ten hours into the future. However, the player may wish to know what his payout will be by the time only six hours have passed, without any uncertainty in the last four hours of the period. Thus, in various embodiments, the player may have the opportunity to guard against possible negative turns of events during a period on which he has bet. In various embodiments, a player may have the opportunity to guard against uncertainty stemming from a bet.

In some embodiments, a player makes a first bet. The bet pays $10 for every single "red" outcome that occurs in excess of the "black" outcomes at roulette tables across the casino in the next 10 hours. For example, the bet will pay $100 if there are 550 "red" outcomes and 540 "black" outcomes. The player will also lose $10 for every single "black" outcome that occurs in excess of "red" outcomes. Thus, for example, the player may lose $80 if there are 532 "red" outcomes and 540 "black" outcomes. Thus, the player's bet may function like a spread bet. The player then makes a second bet that can cancel out or hedge a portion of the first bet. For example, the player may make a second bet that, during the second half of the 10-hour period (i.e., the latter five hours of the period), "black" outcomes will exceed "red" outcomes. The player may, in this second bet, stand to win $10 for every "black" outcome that occurs in excess of a "red" outcome, but may stand to lose $10 for every "red" outcome in excess of black outcomes.

To illustrate the effects of the second bet, suppose after the first five-hours of the period of the first bet, there have been 220 "red" outcomes and 200 "black" outcomes. "Red" outcomes thus exceed "black" outcomes by 20, and if this state of affairs were to hold for the remainder of the period (i.e., for the next five hours), then the player would win $200. However, the player may worry that "black" outcomes will begin to predominate. The player may wish to lock in his $200. The second bet described above may alleviate the player's concern. Suppose in the second half of the period of the first bet, which corresponds to the entire period of the second bet, that "black" outcomes outnumber "red" outcomes by 50. The player will then owe $300 for the first bet. However, the player will win $500 for his second bet. Thus, the player will still be ahead by $200, the same amount that he was ahead after the first half of the period covered by the first bet. Suppose as an alternative scenario, in the second half of the period of the first bet, "red" outcomes outnumber "black" outcomes by 50. Then, from the first bet, the player will win $700, but from the second bet the player will lose $500. The player will still be ahead by $200. It can therefore be seen that the second bet has effectively hedged the second half of the period of the first bet, so as to lock in what the player has won or lost after the first half of the period covered by the first bet. The hedging mechanism may serve to shorten the life of a bet, to alleviate worry or uncertainty, to lock in a gain, to guard against further loss, or any other function.

In some embodiments, a second bet may not be a perfect offset or hedge against a first bet. Rather the second bet may offset some component or risk inherent within the first bet. For example, a player may make a first bet on the number of royal flush hands that will occur across a casino. The player may stand to win $10 for every royal flush that is achieved in excess of 20 in the next 5-hour period. However, the player may owe $10 for every unit by which the number of royal flushes falls short of 20. The player may be comfortable with his chances as long as there are plenty of people playing video poker. However, the player may worry that if few people play video poker, it will be almost impossible for him to win the bet. Therefore, the player may make another bet that depends on the number of people who will play video poker across a casino. The player may make a bet that defines a person playing as anyone who begins a gaming session and plays at least 10 games of video poker. The player may stand to win $1 for every person less than 1000 who plays. The player may stand to lose $1 for every person more than 1000 who plays. Thus, if there are few players, the player is less likely to win his bet on the number of royal flushes. However, the player will win his bet on the number of players. Thus, the player has hedged out the risk of there being too few players to bring a large number of royal flushes. The player's main desire is to gamble that games which are played will result in royal flushes.

In another example, a player places a bet on the number of times a dealer will bust in any game of blackjack across a casino. Aside from the inherent uncertainties in the card ordering, which will influence the result of the player's bet, there are other uncertainties that may influence the player's bet. One uncertainty is the number of players who will play blackjack. For example, if very few players play, there will just be fewer games in general and thus the dealer will tend to bust less. Another uncertainty is the speed of play. Some dealers may tend to keep the games going fast, and so may tend to play a large number of games and may thereby bust more often. However, other dealers may proceed more slowly and may therefore tend to bust less often. Another uncertainty is the strategy that players use. If players tend to "hit" a lot, then the players themselves may bust frequently. Once all players in a game have busted, the dealer need not deal himself cards, and so the dealer need not bust. Each of these uncertainties may impact the outcome of the player's bet. Therefore, in various embodiments, the player may place bets which hedge out these various risk factors in his original bet. For example, the player may make a bet that depends only on the number of times that players hit. In this way, a player may better isolate the particular risk or uncertainty on which he would like to bet.

In various embodiments, a player may place bets on one or more of the following: (a) the number of players that will play a particular type of game; (b) the average number of games of a particular type of game that will be played by players playing that type of game; (c) the number of gaming devices that will be used; (d) the number of players playing max coins at a slot machine (e.g., the number of players eligible to win the jackpot); (e) the strategy or strategies that will be used by a player; (f) the total number of a particular type of game that will be played (e.g., across a casino in a given period of time); (g) the rate of play of a game (e.g., the number of blackjack hands that will be dealt per hour); (h) the average amount that players will bet in a game; (i) the number of a particular outcome that will occur during a particular time period in the future; (j) the number by which the frequency of one outcome will exceed the frequency of another outcome at some time in the future; or on any other event or sequence of events. The bets made by a player may serve to hedge, reduce, alleviate, insure against, or otherwise mitigate risks or uncertainties associated with other bets of the player.

Docking an MP3 Player at a Gaming Device

In various embodiments, a player may dock a music player into a device, such as a gaming device, slot machine, video poker machine, or betting terminal. The music player may include an Apple iPod, a Sandisk Sansa, or any other MP3 player. The music player may be connected to the device via one or more electrical wires or cables, via an electrical connector, or via any other connection. The music player may be wirelessly connected to the gaming device. Music from the music player may then be played through speakers of the gaming device.

In various embodiments, a player may configure his music player and/or the device to play certain music at certain times. For example, the player may configure his music player to play a first song when the player wins, and to play a second song when the player loses. Various snippets of the songs may be played at once. For example, a first ten seconds of a first song may be played when a player wins. A second ten seconds of the first song may be played when the player wins again. In between, if the player loses, a first ten seconds of a second song may be played.

In some embodiments, the player may configure his music player with which songs will be played under which circumstances. For example, the player may designate a winning song, a losing song, a jackpot song, a song that will be played while the reels are spinning, a song that will be played while the player is deciding on a strategy, and so on. The player may designate such songs beforehand using software downloaded from a casino (e.g., from the casino to which the player will pay a visit) from the manufacturer of the music player (e.g., from Apple if the music player is an iPod) or from any other source.

Example Roulette Game

In some embodiments, one or more surface computing device, such as a Microsoft Surface, a tablet computing device, such as an iPad, and so on may be used to perform one or more actions and/or display information. For example, in one embodiment, a surface computing device may be used to display events in a game (e.g., a live game, a virtual game, a game playable by a community of people, and so on). In some embodiments, multiple such devices may be used in a single game to display copies of the game, to display distinct elements of the game, and so on. A surface computing device may include a computing device designed to appear similar to a surface, such as a table.

In some embodiments, elements of a card game may be displayed on one or more such devices. Such a card game may be played remotely, e.g., by a primary player at a table, and or maybe a virtual game not played by any other player. Players may make bets on such a card game, e.g., using a mobile gaming device. Outcomes of games may be displayed on a video display (e.g. and led tv). In some embodiments, a game of baccarat may be played in such a manner with elements of the game displayed on a surface computing device and/or other display (e.g., card plays in a live game). Players using mobile gaming devices may place bets on a player hand and/or a dealer hand for the game being displayed on the surface computing device and/or display screen.

In some embodiments, a roulette game may be played using such a surface computing device. For example, a multi reel roulette game may be played. In some embodiments, a first surface computing device may display information regarding a first roulette wheel (e.g., an image of the wheel spinning, an outcome of the wheel, statistics about the wheel, and so on). The wheel may be a video of a real wheel, a virtual wheel, and so on. In some embodiments, a second surface computing device may display information about a second roulette wheel. In some embodiments, any number (e.g., 5), separate surface computing devices may display information about such a number of roulette wheels. In such a manner, a surface computing device may be placed as desired to provide the functionality of a roulette wheel at a roulette table.

In some embodiments, one or more players may make wagers on the outcomes of one or more spins of one or more roulette wheels displayed using one or more surface computing devices. For example, such a wager may include a wager on a next spin of a next wheel to stop, a wager on a pattern over a series of next spins, a wager on an ordered series of results of the next X number of results, a wager, that a number will appear some number of time in some number of spins, a wager on a result of a particular wheel, a wager on an aggregate of data over the course of a plurality of spins of one or more of the wheels, a wager on a pattern of colors, a wager on a count of colors over a time period, a wager on outcomes over a time period, and so on.

In some embodiments, a roulette wheel may be spun in response to a wager being placed on the roulette wheel. In some embodiments, roulette wheels may be spun and/or stopped periodically. For example, a roulette wheel of the plurality of roulette wheels may be stopped once every minute. In some embodiments, roulette wheels may be spun and/or stopped continually, periodically, as desired, in response to bets, on a schedule, and so on.

An outcome of one or more of the roulette wheel spins may be used to determine an outcome of one or more of the placed wagers. In some embodiments, previously played and/or currently played games may be used to determine outcomes of spins. In some embodiments, newly created random numbers from a random number generator may be used to determine outcomes of spins. In some embodiments, aggregated information and/or historic information about past outcomes may be displayed to a user (e.g., on a mobile gaming device, on a surface computing device, on a display device, and so on).

The following is a list of embodiments, not claims:

A. An apparatus (e.g., a casino server) comprising a computing device operable to:
   - determine a first amount of consideration (i.e., anything of true value or such as cash or gaming chips that are redeemable for cash) bet by a first player on a first game;
   - determine a second amount of consideration won by the first player from the first game (e.g., determine a payout of the first game);
   - determine a third amount of consideration bet by a second player on a second game;
   - determine a fourth amount of consideration won by the second player from the second game;
   - determine a first performance metric for the first player based on at least one of (a) the first amount of consideration and (b) the second amount of consideration (the first performance metric may include any statistic, numerical indicator, or other indicator describing or summarizing the performance of the first player);

determine a second performance metric for the second player based on at least one of (a) the third amount of consideration and (b) the fourth amount of consideration;

determine whether the first performance metric is superior to the second performance metric (the first performance metric may be superior to the second performance metric in that it better satisfies the goal or objective of a contest or competition between the first and second players—e.g., the goal of a contest may be to win more money than the other player); and award a prize to the first player based on whether the first performance metric is superior to the second performance metric. The prize may take the form of a monetary payout, merchandise, services, or any other prize.

B. The apparatus of embodiment A in which to determine a first amount of consideration includes to determine a first amount of dollars bet by a first player on a first game.

C. The apparatus of embodiment A in which to determine a first performance metric includes to determine a net amount of money won by the by first player based on at least one of (a) the first amount of consideration and (b) the second amount of consideration. The first performance metric may describe a net amount of money won by the first player during some period of time while gambling. For example, the first performance metric may describe all amounts won less all amounts wagered during a period of times.

D. The apparatus of embodiment A in which to determine a first performance metric includes to determine a difference between the second amount of consideration and the first amount of consideration. The first performance metric may represent the first player's winnings from the first game less the amount bet by the first player.

E. The apparatus of embodiment A in which to determine a first performance metric includes to determine a total amount of consideration won by the first player during a particular time period, in which the total amount of consideration includes the second amount of consideration. The first performance metric may represent a sum of all amounts won during the particular time period.

F. The apparatus of embodiment A in which to determine a first performance metric includes to determine a highest amount of consideration won by the first player in an individual game during a particular time period, in which the highest amount of consideration takes into account the second amount of consideration. The first performance metric may represent the highest payout won by the first player during the particular period of time. The highest payout may be determined from among all payouts achieved by the first player during the second period of time, including the payout which provides the second amount of consideration.

G. The apparatus of embodiment A in which to determine whether the first performance metric is superior to the second performance metric includes to determine whether a numerical value of the first performance metric exceeds a numerical value of the second performance metric.

H. The apparatus of embodiment A in which to award a prize includes to award a monetary prize to the first player if the first performance metric is superior to the second performance metric.

I. The apparatus of embodiment A in which to determine a first amount of consideration bet by a first player on a first game includes to:

receive a numerical identifier from a tracking card that has been inserted into a gaming device;

associate the numerical identifier with a name of the first player; and receive from the gaming device an indication of the first amount of consideration.

J. The apparatus of embodiment A in which the computing device is further operable to:

cause to be displayed a first identifier of the first player; and cause to be displayed a second identifier of the second player.

Thus, for example, the apparatus may show the current standings of the first player and the second player within a tournament, contest, or competition. The players may be listed according to who is in the lead. For example, the player in the lead may be listed first. In various embodiments, the first player and the second player may be listed together with the names of other players in the same competition.

K. The apparatus of embodiment J in which to cause to be displayed a first identifier of the first player includes to cause to be displayed a first identifier of the first player in conjunction with the first performance metric for the first player. Thus, for example, players may be listed together with an indication of how well they have performed or scored so far. For example, if the object of a tournament is to accumulate the most winnings of any competitor, then player names may be displayed together with the amounts won so far by those players.

L. The apparatus of embodiment J in which the first identifier is caused to be displayed before the second identifier if the first performance metric is superior to the second performance metric.

M. The apparatus of embodiment J in which to cause to be displayed a first identifier includes to instruct a public signboard to display the first identifier of the first player. A list of standings of competitors in a tournament may be displayed in public in one or more areas. In this way, players in the tournament may see how much progress they must make in order to catch the leaders, for example. Also, non-participants may still follow the progress of the tournament and root for their favorite players, for example.

Relative Bet

N. An apparatus comprising a computing device operable to:

determine a first bet made by a first player;

receive from the first player a designation of a second player;

receive from the first player a designation of a third player;

receive from the first player an indication of which of the second and third players that the first bet is made on;

determine a second bet made by the second player;

determine a first outcome stemming from the second bet (e.g., the outcome of the game on which the second bet was made);

determine a third bet made by the third player;

determine a second outcome stemming from the third bet;

determine a first performance metric for the second player based on at least one of (a) the second bet and (b) the first outcome;

determine a second performance metric for the third player based on at least one of (a) the third bet and (b) the second outcome;

determine whether the first performance metric is superior to the second performance metric; and provide to the first player a payment based on the first bet, the indication of which of the second and third players that the first bet is made on, and whether the first performance metric is superior to the second performance metric.

In various embodiments, the first player bets that either the second player or the third player will perform better according to some metric. The first player may bet, for example, that the second player will win more money than does the third player.

O. The apparatus of embodiment N in which to provide to the first player a payment includes to provide to the first player a payment of twice the amount of the first bet if the indication is that the first bet is made on the second player and if the first performance metric is superior to the second performance metric.

P. The apparatus of embodiment N in which to determine a first performance metric for the second player includes to:

determine a first payout associated with the first outcome; and determine a difference between the first payout and the second bet.

Thus, for example, the first performance metric may represent a net amount won by the second player, e.g., a difference between the first payout and the second bet.

Q. The apparatus of embodiment N in which to determine a first performance metric for the second player includes to:

determine an amount won by the second player over a time period during which the second player made the second bet.

R. The apparatus of embodiment N in which to determine a first performance metric for the second player includes to:

determine a number of outcomes of a particular type that the second player receives during a time period which includes the time period during which the second player receives the first outcome.

S. An apparatus (e.g., a mobile gaming device; e.g., a stationary gaming device) comprising a computing device operable to:

receive from a second player a designation of a first player;

receive a bet from the second player;

receive an indication of a first outcome received by the first player in a game;

provide to the second player a second outcome that is equivalent to the first outcome;

receive an indication of a decision made by the first player in the game;

determine whether the second player wishes to automatically copy the decision;

cause to be displayed, if the second player does wish to automatically copy the decision, a first background color;

cause to be displayed, if the second player does not wish to automatically copy the decision, a second background color;

provide a third outcome for the second player; and determine a payment for the second player based on an amount of the bet and based on the third outcome.

In various embodiments, a second player may "piggy-back" upon the outcomes achieved by a first player. The second player may receive the benefit of the same outcomes. The second player may even choose to automatically copy or mimic the decisions made by the first player, so that final outcomes achieved by the second player are the same as those achieved by the first player. To automatically follow the decisions made by the first player, the second player may put his player device (e.g., mobile gaming device) into a particular mode or state. The device may then display a first background color indicating that decisions of the first player will be followed automatically. If the second player does not wish to automatically follow the decisions of the first player, however, then second player may put his device into a different mode. In this different mode, the device may allow the second player to input his own decisions or to at least confirm decisions made by the first player. In this different mode, the device may display a different background color.

T. The apparatus of embodiment S in which the computing device is further operable to:

receive, if the second player does wish to automatically copy the decision, an indication of a fourth outcome received by the first player in the game, in which to provide a third outcome includes to provide a third outcome for the second player that is equivalent to the fourth outcome.

A. An apparatus comprising:

at least one processor configured to execute a plurality of instructions; and at least one machine readable medium on which the plurality of instructions are stored, in which the plurality of instructions, when executed by the at least one process cause the at least one process to:

deceive data about a plurality of games played over a first period of time;

determine a subset of the data that represents games that meet at least one first criteria;

provide information related to the subset of the data to a mobile gaming device configured to enable a player to wager on games based on the subset of data.

A.1. The apparatus of claim A, in which the at least one first criteria includes at least one time during which games were played.

A.1.1. The apparatus of claim A.1, in which the time includes a plurality of times that are non-consecutive.

A.2. The apparatus of claim A, in which the at least one first criteria includes at least one demographic regarding a player of a game.

A.3. The apparatus of claim A, in which the at least one first criteria includes at least one game type.

A.4. The apparatus of claim A, in which the at least one first criteria includes at least one machine type.

A.5. The apparatus of claim A, in which the at least one first criteria includes at least one game manufacturer.

A.6. The apparatus of claim A, in which the at least one first criteria includes at least one game location.

A.7. The apparatus of claim A, in which the at least one first criteria includes at least one game result.

A.8. The apparatus of claim A, in which the instructions, when executed by the at least one processor, cause the at least one processor to further:

receive an indication of a bet related to the subset of data;

determine an outcome of the bet based on at least part of the subset of data; and provide an indication of the outcome to the mobile gaming device.

A.8.1. The apparatus of claim A.8, in which the bet includes a bet on an outcome of a game represented in the subset of data.

A.8.1.1. The apparatus of claim A.8.1, in which the game includes at least one of a card game, a slot game, a dice game, a roulette game, a poker game, a craps game, and a keno game.

A.8.2. The apparatus of claim A.8, in which the bet includes a bet on a comparison of information represented by the data.

A.8.2.1. The apparatus of claim A.8.2, in which the comparison includes at least one of comparison of wins and losses, a comparison of characteristics of outcomes, and a comparison of amounts won and amounts lost.

B. An apparatus comprising:

at least one processor configured to execute a plurality of instructions; and at least one machine readable medium on which the plurality of instructions are stored, in which the plurality of instructions, when executed by the at least one process cause the at least one process to:

receive data describing a plurality of games that have been played;

receive an indication of at least one of pattern of events and a trend;

determine if the data includes the at least one of the pattern of the events and the trend; and if the data includes the at least one of the pattern of events and the trend, provide an indication that the data includes the at least one of the pattern of events and the trend to a mobile gaming device.

B.1. The apparatus of claim B, in which the at least one of the pattern of events and the trend includes the pattern of events;

B.1.1. The apparatus of claim B.1, in which the pattern of events includes a pattern of outcomes in a sequence of games.

B.2. The apparatus of claim B, in which the at least one of the pattern of events and the trend includes the trend.

B.2.1. The apparatus of claim B.2, in which the trend includes a trend related to an amount of wins and losses in the plurality of games.

B.3. The apparatus of claim B, in which receiving the indication of the at least one of the pattern of events and the trend includes receiving the indication from the mobile gaming device.

B.4. The apparatus of claim B, in which the instructions, when executed by the at least one processor, cause the at least one processor to:

receive an indication of a bet to be placed on at least one game, in which the bet is to be placed on the at least one game after it is determined that the data includes the at least one of the pattern of events and the trend.

B.4.1. The apparatus of claim B.4, in which the indication of the bet is received with the indication of the at least one of the pattern of events and the trend.

B.4.2. The apparatus of claim B.4, in which the indication of the bet is received after indication is provided to the mobile gaming device.

B.4.3. The apparatus of claim B.4, in which the instructions, when executed by the at least one processor, cause the at least one processor to:

determine an outcome of the bet; and provide an indication of the outcome to the mobile gaming device.

B.4.4. The apparatus of claim B.4, in which the instructions, when executed by the at least one processor, cause the at least one processor to:

receiving an indication of an event related to the at least one game;

determine an outcome of the bet based on the event; and provide an indication of the outcome to the mobile gaming device.

B.4.5. The apparatus of claim B.4, in which the bet includes at least one of a bet that the pattern of events will continue, a bet that the trend will continue, a bet that the pattern of events will not continue, and a bet that the trend will not continue.

C. An apparatus comprising:

a machine readable medium having stored thereon a plurality of instructions that when executed cased the apparatus to perform a method comprising:

presenting, to a player, a plurality of sources that may be used to determine a random outcome of a wager, in which the sources are unrelated to elements of the game;

For example, a source may include a random number generator, a horse race, a card draw, a dice role, and so on. Such source may be similar for any game. A game, for example, may include a card game. The possible sources may or may not be unique or related to the game (e.g., a deck for a card game may be related, a dice for a card game may be unrelated.).

receiving, from the player, a selection a first source of the plurality of sources;

receiving an indication that an outcome of a game played by the first player should be determined;

determining the outcome of the game based on a happening related to the first source; and presenting the outcome to the player.

The invention claimed is:

1. An apparatus comprising:

a plurality of sensing devices configured to detect outcomes from a plurality of sets of a same number of games and communicate the outcomes over a communication network, in which sets of the plurality of sets are consecutive and mutually exclusive; and a computing device configured to control:

receiving the outcomes, from the plurality of sensing devices, over the communication network;

aggregating the outcomes from each set of the plurality of sets of the same number of games into aggregated outcomes, in which the aggregating the outcomes includes making a respective comparison for each set of the plurality of sets of at least one of first outcomes and second outcomes in the games and wins and losses in the games;

enabling, over the communication network, wagering at a mobile client device based on location determination information received over the communication network from the mobile client device and indicating a current location of the mobile client device;

receiving, from the mobile client device over the communication network, during play of the plurality of sets, a wager defined by the aggregated outcomes from first games of first sets of the plurality of sets, in which the wager is for remaining games in the plurality of sets;

for each of the remaining games, determining whether a suboutcome of the wager is a winning suboutcome based on aggregated outcomes of the remaining games; and determining whether the wager is a winning wager based on a number of winning suboutcomes determined from the remaining games.

2. The apparatus of claim 1, in which whether a suboutcome is determined to be a winning suboutcome is based on determining whether the outcomes of the remaining games satisfy a condition selected by a player.

3. The apparatus of claim 2, in which the condition includes a comparison between a number of outcomes of one type to a number of outcomes of another type.

4. The apparatus of claim 3, in which the comparison includes at least one of a greater than, a less than, or an equal to, in which the condition includes at least one of a number of a particular outcome, and a number of results have a first parameter.

5. The apparatus of claim 4, in which the comparison includes a greater than and in which a first condition includes outcomes that are a given first outcome in a given game, and a second condition includes outcomes that are given second outcomes in the given game.

6. The apparatus of claim 3, in which each comparison includes at least one of a greater than, a less than, or equal to.

7. The apparatus of claim 1, in which the games include common games for which at least some are used to determine results of wagers by a plurality of other players.

8. The apparatus of claim 1, in which an identity of the remaining games is determined out of a larger ongoing sequence of games in response to placement of the wager such that a first game in a series of the remaining games occurs as a next game in the sequence of games.

9. The apparatus of claim 1, in which the computing device is configured to control receiving a number of suboutcomes for the remaining games selected by a player.

10. The apparatus of claim 1, in which each sensing device includes a camera.

11. The apparatus of claim 1, in which whether each suboutcome is a winning suboutcome is based on whether a comparison is true for a respective game.

12. The apparatus of claim 11, in which whether the wager is a winning wager is based on whether every suboutcome is a winning suboutcome.

13. The apparatus of claim 1, in which whether a suboutcome is determined to be a winning outcome is based on whether there are more first outcomes than second outcomes in a set of games.

14. A method comprising:

controlling, by at least one processor:

detecting, by a plurality of sensing devices, outcomes from a plurality of sets of a same number of games;

communicating the outcomes over a communication network, in which sets of the plurality of sets are consecutive and mutually exclusive;

receiving the outcomes, from the plurality of sensing devices, over the communication network;

aggregating the outcomes from each set of the plurality of sets of the same number of games into aggregated outcomes, in which the aggregating the outcomes includes making a respective comparison for each set of the plurality of sets of at least one of first outcomes and second outcomes in the games and wins and losses in the games;

enabling, over the communication network, wagering at a mobile client device based on location determination information received over the communication network from the mobile client device and indicating a current location of the mobile client device;

receiving, from the mobile client device over the communication network, during play of the plurality of sets, a wager defined by the aggregated outcomes from first games of first sets of the plurality of sets, in which the wager is for remaining games in the plurality of sets;

for each of the remaining games, determining whether a suboutcome of the wager is a winning suboutcome based on aggregated outcomes of the remaining games; and determining whether the wager is a winning wager based on a number of winning suboutcomes determined from the remaining games.

15. The method of claim 14, in which whether a suboutcome is determined to be a winning suboutcome is based on determining whether the outcomes of the remaining games satisfy a condition selected by a player.

16. The method of claim 15, in which the condition includes a comparison between a number of outcomes of one type to a number of outcomes of another type.

17. The method of claim 16, in which the comparison includes at least one of a greater than, a less than, or an equal to, in which the condition includes at least one of a number of a particular outcome, and a number of results have a first parameter.

18. The method of claim 17, in which the comparison includes a greater than and in which a first condition includes outcomes that are a given first outcome in a given game, and a second condition includes outcomes that are given second outcomes in the given game.

19. The method of claim 14, in which the games include common games for which at least some are used to determine results of wagers by a plurality of other players.

20. A non-transitory storage medium configured to store instructions which, when executed by at least one processor, control:

detecting, by a plurality of sensing devices, outcomes from a plurality of sets of a same number of games, in which sets of the plurality of sets are consecutive and mutually exclusive;

aggregating the outcomes from each set of the plurality of sets of the same number of games into aggregated outcomes, in which the aggregating the outcomes includes making a respective comparison for each set of the plurality of sets of at least one of first outcomes and second outcomes in the games and wins and losses in the games;

enabling, over a communication network, wagering at a mobile client device based on location determination information received over the communication network from the mobile client device and indicating a current location of the mobile client device;

receiving, from the mobile client device over the communication network, during play of the plurality of sets, a wager defined by the aggregated outcomes from first games of first sets of the plurality of sets, in which the wager is for remaining games in the plurality of sets;

for each set of the remaining games, determining whether a suboutcome of the wager is a winning suboutcome based on the aggregated outcomes of the remaining games; and determining whether the wager is a winning wager based on a number of winning suboutcomes determined from the remaining games.

* * * * *